(12) United States Patent
Mase et al.

(10) Patent No.: US 7,568,067 B1
(45) Date of Patent: Jul. 28, 2009

(54) METHOD FOR CONTROLLING MAGNETIC TAPE UNIT

(75) Inventors: Tomonori Mase, Yokohama (JP); Yukio Taniyama, Kawasaki (JP); Shoichi Okumura, Kawasaki (JP); Osamu Shimura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/539,805

(22) Filed: Mar. 30, 2000

(30) Foreign Application Priority Data

| Aug. 6, 1999 | (JP) | ................................. 11-223587 |
| Oct. 8, 1999 | (JP) | ................................. 11-287603 |
| Feb. 29, 2000 | (JP) | ............................ 2000-054019 |

(51) Int. Cl.
*G06F 12/02* (2006.01)
*G06F 9/455* (2006.01)

(52) U.S. Cl. ........................................ 711/111; 703/24

(58) Field of Classification Search ........................ None
See application file for complete search history.

(56) References Cited

U.S. PATENT DOCUMENTS

| 5,034,914 A * | 7/1991 | Osterlund ..................... 710/52 |
| 5,485,321 A * | 1/1996 | Leonhardt et al. .............. 360/48 |
| 6,026,468 A | 2/2000 | Mase et al. .................. 711/111 |
| 6,341,329 B1 * | 1/2002 | LeCrone et al. ............. 711/112 |
| 6,343,342 B1 * | 1/2002 | Carlson ....................... 711/112 |
| 6,389,503 B1 * | 5/2002 | Georgis et al. .................. 711/4 |

FOREIGN PATENT DOCUMENTS

| JP | 63-317950 | 12/1988 |
| JP | 7-44324 | 2/1995 |
| JP | 7-319629 | 12/1995 |
| JP | 8-45244 | 2/1996 |
| JP | 11-66730 | 3/1999 |

OTHER PUBLICATIONS

Japanese Patent Office Notice of Rejection issued May 15, 2006 for corresponding Japanese Patent Application No. 2000-054019.

* cited by examiner

*Primary Examiner*—Denise Tran
(74) *Attorney, Agent, or Firm*—Staas & Halsey LLP

(57) ABSTRACT

A tape operation relating to EOF identification in an open process for a file is emulated, whereby the tape operation in the open process is simplified. Consequently, open-process, close-process performance, and process performance of a system accessing to a magnetic tape unit can be improved. In a method of this invention, a position of a head relative to a magnetic tape is fixed at a predetermined position in the open process for a file recorded on the magnetic tape, and when a command is received from a command issuing apparatus, emulation in which a tape operation according the command is virtually carried out in the magnetic tape unit without making said magnetic tape unit carry out a real tape operation, is executed.

22 Claims, 215 Drawing Sheets

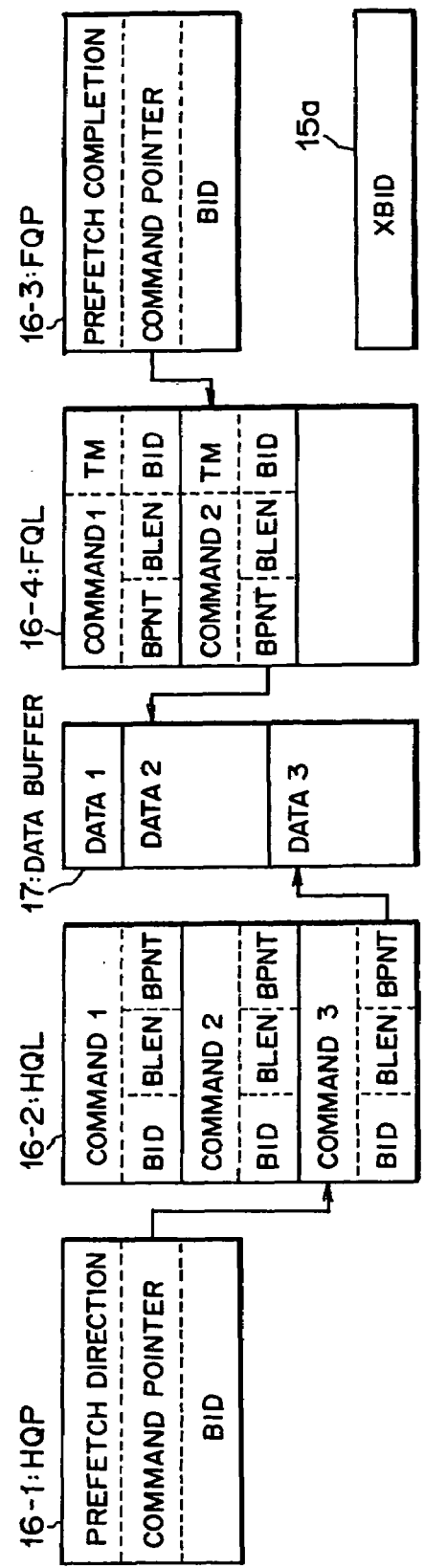
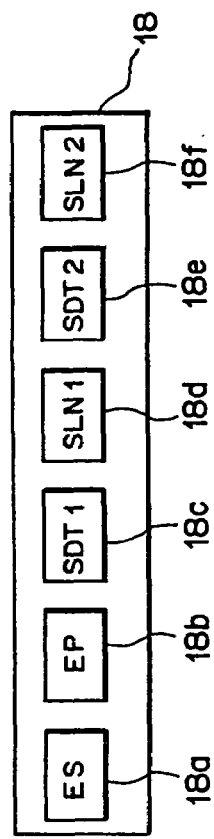
FIG. 2(A)
FIG. 2(B)

FIG. 5

| PROCESS A10 | | | | PROCESS B10 | | | | | | | PROCESS ID |
|---|---|---|---|---|---|---|---|---|---|---|---|
| CONDITIONS | | RE-POSITION | OPERATION | UPDATE XBID | CONDITIONS | UPDATE ES | UPDATE EP | TM FLAG | SAVE AREA PROCESS | BLEN | BID | |
| ES | EP | | | | | | | | | | | |
| 0 | -4 | -- | REAL READ | XBID+1 | TM | 1 | -3 | 1 | -- | 0 | XBID | 1000 |
| | | | | | OTHERS | 0 | -4 | 0 | -- | LEN | | 1001 |
| 1 | -3 | -- | REAL READ | XBID+1 | EOF | 2 | -2 | 0 | SDT1←BUF ;SLN1←LEN | LEN | XBID | 1100 |
| | | | | | TM | 1 | -3 | 1 | -- | 0 | | 1101 |
| | | | | | OTHERS | 0 | -4 | 0 | -- | LEN | | 1102 |
| 2 | -2 | -- | REAL READ | XBID+1 | EOF | 3 | -1 | 0 | SDT2←BUF ;SLN2←LEN | LEN | XBID | 1200 |
| | | | | | TM | 1 | -3 | 1 | -- | 0 | | 1201 |
| | | | | | OTHERS | 0 | -4 | 0 | -- | LEN | | 1202 |
| 3 | -1 | -- | REAL READ | XBID+1 | TM | 4 | 0 | 1 | -- | 0 | XBID | 1300 |
| | | | | | OTHERS | 0 | -4 | 0 | -- | LEN | | 1301 |
| 4 | -4 | -- | EMULATE | -- | -- | 4 | -3 | 1 | -- | 0 | XBID + EP | 1400 |
| | -3 | -- | EMULATE | -- | -- | 4 | -2 | 0 | BUF←SDT1; | SLN1 | | 1410 |
| | -2 | -- | EMULATE | -- | -- | 4 | -1 | 0 | BUF←SDT2; | SLN2 | | 1420 |
| | -1 | -- | EMULATE | -- | -- | 4 | 0 | 1 | -- | 0 | | 1430 |
| | 0 | -- | REAL READ | XBID+1 | EOF | 2 | -2 | 0 | SDT1←BUF ;SLN1←LEN | -- | XBID | 1440 |
| | | | | | TM | 5 | +1 | 1 | -- | -- | | 1441 |
| | | | | | OTHERS | 0 | -4 | 0 | -- | -- | | 1442 |
| 5 | +1 | -- | REAL READ | XBID+1 | EOF | 2 | -2 | 0 | SDT1←BUF ;SLN1←LEN | -- | XBID | 1500 |
| | | | | | TM | 1 | -3 | 1 | -- | -- | | 1501 |
| | | | | | OTHERS | 0 | -4 | 0 | -- | -- | | 1502 |
| 6 | -4 | -- | EMULATE | -- | -- | 6 | -3 | 1 | -- | 0 | XBID + EP | 1600 |
| | -3 | -- | EMULATE | -- | -- | 6 | -2 | 0 | BUF←SDT1; | SLN1 | | 1610 |
| | -2 | -- | EMULATE | -- | -- | 6 | -1 | 0 | BUF←SDT2; | SLN2 | | 1620 |
| | -1 | -- | EMULATE | -- | -- | 6 | 0 | 1 | -- | 0 | | 1630 |
| | 0 | -- | EMULATE | -- | -- | 6 | +1 | 1 | -- | 0 | | 1640 |
| | +1 | XBID +EP | REAL READ | XBID+1 | TM | 1 | -3 | 1 | -- | 0 | XBID | 1650 |
| | | | | | OTHERS | 0 | -4 | 0 | -- | LEN | | 1651 |

FIG. 7

| PROCESS A20 | | | | PROCESS B20 | | | | | | | PROCESS ID |
|---|---|---|---|---|---|---|---|---|---|---|---|
| CONDITIONS | | RE-POSITION | OPERATION | UPDATE XBID | CONDITIONS | UPDATE ES | UPDATE EP | TM FLAG | SAVE AREA PROCESS | BLEN | BID | |
| ES | EP | | | | | | | | | | | |
| 0 | -4 | -- | REAL RB | XBID-1 | TM | 0 | -4 | 1 | -- | 0 | XBID | 2000 |
| | | | | | OTHERS | 0 | -4 | 0 | -- | 0 | | 2001 |
| 1 | -3 | -- | REAL RB | XBID-1 | TM | 0 | -4 | 1 | -- | 0 | XBID | 2100 |
| | | | | | OTHERS | 0 | -4 | 0 | -- | 0 | | 2101 |
| 2 | -2 | -- | REAL RB | XBID-1 | TM | 0 | -4 | 1 | -- | 0 | XBID | 2200 |
| | | | | | OTHERS | 0 | -4 | 0 | -- | 0 | | 2201 |
| 3 | -1 | -- | REAL RB | XBID-1 | TM | 0 | -4 | 1 | -- | 0 | XBID | 2300 |
| | | | | | OTHERS | 0 | -4 | 0 | -- | 0 | | 2301 |
| 4 | -4 | XBID + EP | REAL RB | XBID-1 | TM | 0 | -4 | 1 | -- | 0 | XBID | 2400 |
| | | | | | OTHERS | 0 | -4 | 0 | -- | 0 | | 2401 |
| | -3 | -- | EMULATE | -- | -- | -- | -4 | 1 | -- | 0 | XBID + EP | 2410 |
| | -2 | -- | EMULATE | -- | -- | -- | -3 | 0 | -- | 0 | XBID + EP | 2420 |
| | -1 | -- | EMULATE | -- | -- | -- | -2 | 0 | -- | 0 | | 2430 |
| | 0 | -- | EMULATE | -- | -- | -- | -1 | 1 | -- | 0 | XBID | 2440 |
| 5 | +1 | -- | REAL RB | XBID-1 | -- | 6 | 0 | 1 | -- | 0 | XBID | 2500 |
| 6 | -4 | XBID + EP | REAL RB | XBID-1 | TM | 0 | -4 | 1 | -- | 0 | XBID | 2600 |
| | | | | | OTHERS | 0 | -4 | 0 | -- | 0 | | 2601 |
| | -3 | -- | EMULATE | -- | -- | -- | -4 | 1 | -- | 0 | XBID + EP | 2610 |
| | -2 | -- | EMULATE | -- | -- | -- | -3 | 0 | -- | 0 | XBID + EP | 2620 |
| | -1 | -- | EMULATE | -- | -- | -- | -2 | 0 | -- | 0 | | 2630 |
| | 0 | -- | EMULATE | -- | -- | -- | -1 | 1 | -- | 0 | XBID + EP | 2640 |
| | +1 | -- | EMULATE | -- | -- | -- | 0 | 1 | -- | 0 | | 2650 |

FIG. 9

| PROCESS A30 | | | | PROCESS B30 | | | | | | | PROCESS ID |
|---|---|---|---|---|---|---|---|---|---|---|---|
| CONDITIONS | | RE-POSITION | OPERATION | UPDATE XBID | CONDITIONS | UPDATE ES | UPDATE EP | TM FLAG | SAVE AREA PROCESS | BLEN | BID | |
| ES | EP | | | | | | | | | | | |
| 0 | -4 | -- | REAL WR | XBID+1 | -- | 0 | -4 | -- | -- | LEN | XBID | 3000 |
| 1 | -3 | -- | REAL WR | XBID+1 | EOF | 2 | -2 | -- | SDT1←BUF ;SLN1←LEN | LEN | XBID | 3100 |
| | | | | | OTHERS | 0 | -4 | -- | -- | LEN | | 3101 |
| 2 | -2 | -- | REAL WR | XBID+1 | EOF | 3 | -1 | -- | SDT2←BUF ;SLN2←LEN | LEN | XBID | 3200 |
| | | | | | OTHERS | 0 | -4 | -- | -- | LEN | | 3201 |
| 3 | -1 | -- | REAL WR | XBID+1 | -- | 0 | -4 | -- | -- | LEN | XBID | 3300 |
| 4 | -4 | XBID + EP | REAL WR | XBID+1 | -- | 0 | -4 | -- | -- | LEN | XBID | 3400 |
| | -3 | | REAL WR | XBID+1 | EOF | 2 | -2 | -- | SDT1←BUF ;SLN1←LEN | LEN | XBID | 3410 |
| | | | | | OTHERS | 0 | -4 | -- | -- | LEN | | 3411 |
| | -2 | | REAL WR | XBID+1 | EOF | 3 | -1 | -- | SDT2←BUF ;SLN2←LEN | LEN | XBID | 3420 |
| | | | | | OTHERS | 0 | -4 | -- | -- | LEN | | 3421 |
| | -1 | | REAL WR | XBID+1 | -- | 0 | -4 | -- | -- | LEN | XBID | 3430 |
| | 0 | -- | REAL WR | XBID+1 | EOF | 2 | -2 | -- | SDT1←BUF ;SLN1←LEN | LEN | XBID | 3140 |
| | | | | | OTHERS | 0 | -4 | -- | -- | LEN | | 3141 |
| 5 | +1 | -- | REAL WR | XBID+1 | EOF | 2 | -2 | -- | SDT1←BUF ;SLN1←LEN | LEN | XBID | 3500 |
| | | | | | OTHERS | 0 | -4 | -- | -- | LEN | | 3501 |
| 6 | -4 | XBID + EP | REAL WR | XBID+1 | -- | 0 | -4 | -- | -- | LEN | XBID | 3600 |
| | -3 | | REAL WR | XBID+1 | EOF | 2 | -2 | -- | SDT1←BUF ;SLN1←LEN | LEN | XBID | 3610 |
| | | | | | OTHERS | 0 | -4 | -- | -- | LEN | | 3611 |
| | -2 | | REAL WR | XBID+1 | EOF | 3 | -1 | -- | SDT2←BUF ;SLN2←LEN | LEN | XBID | 3620 |
| | | | | | OTHERS | 0 | -4 | -- | -- | LEN | | 3621 |
| | -1 | | REAL WR | XBID+1 | -- | 0 | -4 | -- | -- | LEN | XBID | 3630 |
| | 0 | -- | REAL WR | XBID+1 | EOF | 2 | -2 | -- | SDT1←BUF ;SLN1←LEN | LEN | XBID | 3640 |
| | | | | | OTHERS | 0 | -4 | -- | -- | LEN | | 3641 |
| | +1 | XBID + EP | REAL WR | XBID+1 | EOF | 2 | -2 | -- | SDT1←BUF ;SLN1←LEN | LEN | XBID | 3650 |
| | | | | | OTHERS | 0 | -4 | -- | -- | LEN | | 3651 |

FIG. 11

| PROCESS A40 | | | | | PROCESS B40 | | | | | | | PROCESS ID |
|---|---|---|---|---|---|---|---|---|---|---|---|---|
| CONDITIONS | | RE-POSITION | OPERATION | UPDATE XBID | CONDITIONS | UPDATE ES | UPDATE EP | TM FLAG | SAVE AREA PROCESS | BLEN | BID | |
| ES | EP | | | | | | | | | | | |
| 0 | -4 | -- | REAL BSP | XBID-1 | -- | 0 | -4 | 0 | -- | 0 | XBID | 4000 |
| 1 | -3 | -- | REAL BSP | XBID-1 | -- | 0 | -4 | 0 | -- | 0 | XBID | 4100 |
| 2 | -2 | -- | REAL BSP | XBID-1 | -- | 0 | -4 | 0 | -- | 0 | XBID | 4200 |
| 3 | -1 | -- | REAL BSP | XBID-1 | -- | 0 | -4 | 0 | -- | 0 | XBID | 4300 |
| 4 | -4 | XBID + EP | REAL BSP | XBID-1 | -- | 0 | -4 | 0 | -- | 0 | XBID | 4400 |
| | -3 | -- | EMULATE | -- | -- | 4 | -4 | 1 | -- | 0 | XBID + EP | 4410 |
| | -2 | -- | EMULATE | -- | -- | 4 | -3 | 0 | -- | 0 | | 4420 |
| | -1 | -- | EMULATE | -- | -- | 4 | -2 | 0 | -- | 0 | | 4430 |
| | 0 | -- | EMULATE | -- | -- | 4 | -1 | 1 | -- | 0 | | 4440 |
| 5 | +1 | -- | REAL BSP | XBID-1 | -- | 6 | 0 | 1 | -- | 0 | XBID | 4500 |
| 6 | -4 | XBID + EP | REAL BSP | XBID-1 | -- | 0 | -4 | 0 | -- | 0 | XBID | 4600 |
| | -3 | -- | EMULATE | -- | -- | 4 | -4 | 1 | -- | 0 | XBID + EP | 4610 |
| | -2 | -- | EMULATE | -- | -- | 4 | -3 | 0 | -- | 0 | | 4620 |
| | -1 | -- | EMULATE | -- | -- | 4 | -2 | 0 | -- | 0 | | 4630 |
| | 0 | -- | EMULATE | -- | -- | 4 | -1 | 1 | -- | 0 | | 4640 |
| | +1 | -- | EMULATE | -- | -- | 4 | 0 | 1 | -- | 0 | | 4650 |

FIG. 13

| PROCESS A50 | | | | | PROCESS B50 | | | | | | | PROCESS ID |
|---|---|---|---|---|---|---|---|---|---|---|---|---|
| CONDITIONS | | RE-POSITION | OPERATION | UPDATE XBID | CONDITIONS | UPDATE ES | UPDATE EP | TM FLAG | SAVE AREA PROCESS | BLEN | BID | |
| ES | EP | | | | | | | | | | | |
| 0 | -4 | -- | REAL BACK SPACE | XBID-1 | -- | 0 | -4 | -- | -- | -- | XBID | 5000 |
| 1 | -3 | -- | REAL BACK SPACE | XBID-1 | -- | 0 | -4 | -- | -- | -- | XBID | 5100 |
| 2 | -2 | -- | REAL BACK SPACE | XBID-1 | -- | 0 | -4 | -- | -- | -- | XBID | 5200 |
| 3 | -1 | -- | REAL BACK SPACE | XBID-1 | -- | 0 | -4 | -- | -- | -- | XBID | 5300 |
| 4 | -4 | XBID + EP | REAL BACK SPACE | XBID-1 | -- | 0 | -4 | -- | -- | -- | XBID | 5400 |
| 4 | -3 | -- | EMULATE | -- | -- | 4 | -4 | -- | -- | -- | XBID + EP | 5410 |
| 4 | -2 | -- | EMULATE | -- | -- | 4 | -3 | -- | -- | -- | XBID + EP | 5420 |
| 4 | -1 | -- | EMULATE | -- | -- | 4 | -2 | -- | -- | -- | XBID + EP | 5430 |
| 4 | 0 | -- | EMULATE | -- | -- | 4 | -1 | -- | -- | -- | XBID + EP | 5440 |
| 5 | +1 | -- | REAL BACK SPACE | XBID-1 | -- | 6 | 0 | -- | -- | -- | XBID | 5500 |
| 6 | -4 | XBID + EP | REAL BACK SPACE | XBID-1 | -- | 0 | -4 | -- | -- | -- | XBID | 5600 |
| 6 | -3 | -- | EMULATE | -- | -- | 6 | -4 | -- | -- | -- | XBID + EP | 5610 |
| 6 | -2 | -- | EMULATE | -- | -- | 6 | -3 | -- | -- | -- | XBID + EP | 5620 |
| 6 | -1 | -- | EMULATE | -- | -- | 6 | -2 | -- | -- | -- | XBID + EP | 5630 |
| 6 | 0 | -- | EMULATE | -- | -- | 6 | -1 | -- | -- | -- | XBID + EP | 5640 |
| 6 | +1 | -- | EMULATE | -- | -- | 6 | 0 | -- | -- | -- | XBID + EP | 5650 |

FIG. 15

| PROCESS A60 | | | | PROCESS B60 | | | | | | | PROCESS ID |
|---|---|---|---|---|---|---|---|---|---|---|---|
| CONDITIONS | | RE-POSITION | OPERATION | UPDATE XBID | CONDITIONS | UPDATE ES | UPDATE EP | TM FLAG | SAVE AREA PROCESS | BLEN | BID | |
| ES | EP | | | | | | | | | | | |
| 0 | -4 | -- | REAL READ | XBID+1 | TM | 1 | -3 | 1 | -- | -- | XBID | 6000 |
| | | | | | OTHERS | 0 | -4 | 0 | -- | -- | | 6001 |
| 1 | -3 | -- | REAL READ | XBID+1 | EOF | 2 | -2 | 0 | SDT1←BUF ;SLN1←LEN | -- | XBID | 6100 |
| | | | | | TM | 1 | -3 | 1 | -- | -- | | 6101 |
| | | | | | OTHERS | 0 | -4 | 0 | -- | -- | | 6102 |
| 2 | -2 | -- | REAL READ | XBID+1 | EOF | 3 | -1 | 0 | SDT2←BUF ;SLN2←LEN | -- | XBID | 6200 |
| | | | | | TM | 1 | -3 | 1 | -- | -- | | 6201 |
| | | | | | OTHERS | 0 | -4 | 0 | -- | -- | | 6202 |
| 3 | -1 | -- | REAL READ | XBID+1 | TM | 4 | 0 | 1 | -- | -- | XBID | 6300 |
| | | | | | OTHERS | 0 | -4 | 0 | -- | -- | | 6301 |
| 4 | -4 | -- | EMULATE | -- | -- | 4 | -3 | 1 | -- | -- | XBID + EP | 6400 |
| | -3 | -- | EMULATE | -- | -- | 4 | -2 | 0 | -- | -- | | 6410 |
| | -2 | -- | EMULATE | -- | -- | 4 | -1 | 0 | -- | -- | | 6420 |
| | -1 | -- | EMULATE | -- | -- | 4 | 0 | 1 | -- | -- | | 6430 |
| | 0 | -- | REAL READ | XBID+1 | EOF | 2 | -2 | 0 | SDT1←BUF ;SLN1←LEN | -- | XBID | 6440 |
| | | | | | TM | 5 | +1 | 1 | -- | -- | | 6441 |
| | | | | | OTHERS | 0 | -4 | 0 | -- | -- | | 6442 |
| 5 | +1 | -- | REAL READ | XBID+1 | EOF | 2 | -2 | 0 | SDT1←BUF ;SLN1←LEN | -- | XBID | 6500 |
| | | | | | TM | 1 | -3 | 1 | -- | -- | | 6501 |
| | | | | | OTHERS | 0 | -4 | 0 | -- | -- | | 6502 |
| 6 | -4 | -- | EMULATE | -- | -- | 6 | -3 | 1 | -- | -- | XBID + EP | 6600 |
| | -3 | -- | EMULATE | -- | -- | 6 | -2 | 0 | -- | -- | | 6610 |
| | -2 | -- | EMULATE | -- | -- | 6 | -1 | 0 | -- | -- | | 6620 |
| | -1 | -- | EMULATE | -- | -- | 6 | 0 | 1 | -- | -- | | 6630 |
| | 0 | -- | EMULATE | -- | -- | 6 | +1 | 1 | -- | -- | | 6640 |
| | +1 | XBID +EP | REAL READ | XBID+1 | TM | 1 | -3 | 1 | -- | -- | XBID | 6650 |
| | | | | | OTHERS | 0 | -4 | 0 | -- | -- | | 6651 |

FIG. 17

| PROCESS A70 | | | | PROCESS B70 | | | | | | | PROCESS ID |
|---|---|---|---|---|---|---|---|---|---|---|---|
| CONDITIONS | | RE-POSITION | OPERATION | UPDATE XBID | CONDITIONS | UPDATE ES | UPDATE EP | TM FLAG | SAVE AREA PROCESS | BLEN | BID | |
| ES | EP | | | | | | | | | | | |
| 0 | -4 | -- | REAL READ | XBID+1 | TM | 1 | -3 | 1 | -- | -- | XBID | 7000 |
| | | | | | OTHERS | 0 | -4 | 0 | -- | -- | | 7001 |
| 1 | -3 | -- | REAL READ | XBID+1 | EOF | 2 | -2 | 0 | SDT1←BUF ;SLN1←LEN | -- | XBID | 7100 |
| | | | | | TM | 1 | -3 | 1 | -- | -- | | 7101 |
| | | | | | OTHERS | 0 | -4 | 0 | -- | -- | | 7102 |
| 2 | -2 | -- | REAL READ | XBID+1 | EOF | 3 | -1 | 0 | SDT2←BUF ;SLN2←LEN | -- | XBID | 7200 |
| | | | | | TM | 1 | -3 | 1 | -- | -- | | 7201 |
| | | | | | OTHERS | 0 | -4 | 0 | -- | -- | | 7202 |
| 3 | -1 | -- | REAL READ | XBID+1 | TM | 4 | 0 | 1 | -- | -- | XBID | 7300 |
| | | | | | OTHERS | 0 | -4 | 0 | -- | -- | | 7301 |
| 4 | -4 | -- | EMULATE | -- | -- | 4 | -3 | 1 | -- | -- | XBID + EP | 7400 |
| | -3 | -- | EMULATE | -- | -- | 4 | -2 | 0 | -- | -- | | 7410 |
| | -2 | -- | EMULATE | -- | -- | 4 | -1 | 0 | -- | -- | | 7420 |
| | -1 | -- | EMULATE | -- | -- | 4 | 0 | 1 | -- | -- | | 7430 |
| | 0 | -- | REAL READ | XBID+1 | EOF | 2 | -2 | 0 | SDT1←BUF ;SLN1←LEN | -- | XBID | 7440 |
| | | | | | TM | 5 | +1 | 1 | -- | -- | | 7441 |
| | | | | | OTHERS | 0 | -4 | 0 | -- | -- | | 7442 |
| 5 | +1 | -- | REAL READ | XBID+1 | EOF | 2 | -2 | 0 | SDT1←BUF ;SLN1←LEN | -- | XBID | 7500 |
| | | | | | TM | 1 | -3 | 1 | -- | -- | | 7501 |
| | | | | | OTHERS | 0 | -4 | 0 | -- | -- | | 7502 |
| 6 | -4 | -- | EMULATE | -- | -- | 6 | -3 | 1 | -- | -- | XBID + EP | 7600 |
| | -3 | -- | EMULATE | -- | -- | 6 | -2 | 0 | -- | -- | | 7610 |
| | -2 | -- | EMULATE | -- | -- | 6 | -1 | 0 | -- | -- | | 7620 |
| | -1 | -- | EMULATE | -- | -- | 6 | 0 | 1 | -- | -- | | 7630 |
| | 0 | -- | EMULATE | -- | -- | 6 | +1 | 1 | -- | -- | | 7640 |
| | +1 | XBID +EP | REAL READ | XBID+1 | TM | 1 | -3 | 1 | -- | -- | XBID | 7650 |
| | | | | | OTHERS | 0 | -4 | 0 | -- | -- | | 7651 |

FIG. 19

| PROCESS A80 | | | | PROCESS B80 | | | | | | | PROCESS ID |
|---|---|---|---|---|---|---|---|---|---|---|---|
| CONDITIONS | | RE-POSITION | OPERATION | UPDATE XBID | CONDITIONS | UPDATE ES | UPDATE EP | TM FLAG | SAVE AREA PROCESS | BLEN | BID | |
| ES | EP | | | | | | | | | | | |
| 0 | -4 | -- | REAL WTM | XBID+1 | -- | 1 | -3 | 1 | -- | 0 | XBID | 8000 |
| 1 | -3 | -- | REAL WTM | XBID+1 | -- | 1 | -3 | 1 | -- | 0 | XBID | 8100 |
| 2 | -2 | -- | REAL WTM | XBID+1 | -- | 1 | -3 | 1 | -- | 0 | XBID | 8200 |
| 3 | -1 | -- | REAL WTM | XBID+1 | -- | 4 | 0 | 1 | -- | 0 | XBID | 8300 |
| 4 | -4 | XBID + EP | REAL WTM | XBID+1 | -- | 1 | -3 | 1 | -- | 0 | XBID | 8400 |
| | -3 | XBID + EP | REAL WTM | XBID+1 | -- | 1 | -3 | 1 | -- | 0 | XBID | 8410 |
| | -2 | XBID + EP | REAL WTM | XBID+1 | -- | 1 | -3 | 1 | -- | 0 | XBID | 8420 |
| | -1 | -- | EMULATE | -- | -- | 4 | 0 | 1 | -- | 0 | XBID + EP | 8430 |
| | 0 | -- | REAL WTM | XBID+1 | -- | 5 | +1 | 1 | -- | 0 | XBID | 8440 |
| 5 | +1 | -- | REAL WTM | XBID+1 | -- | 1 | -3 | 1 | -- | 0 | XBID | 8500 |
| 6 | -4 | XBID + EP | REAL WTM | XBID+1 | -- | 1 | -3 | 1 | -- | 0 | XBID | 8600 |
| | -3 | XBID + EP | REAL WTM | XBID+1 | -- | 1 | -3 | 1 | -- | 0 | XBID | 8610 |
| | -2 | XBID + EP | REAL WTM | XBID+1 | -- | 1 | -3 | 1 | -- | 0 | XBID | 8620 |
| | -1 | XBID + EP | REAL WTM | XBID+1 | -- | 1 | -3 | 1 | -- | 0 | XBID | 8630 |
| | 0 | -- | EMULATE | -- | -- | 6 | +1 | 1 | -- | 0 | XBID + EP | 8640 |
| | +1 | XBID + EP | REAL WTM | XBID+1 | -- | 1 | -3 | 1 | -- | 0 | XBID | 8650 |

FIG. 20

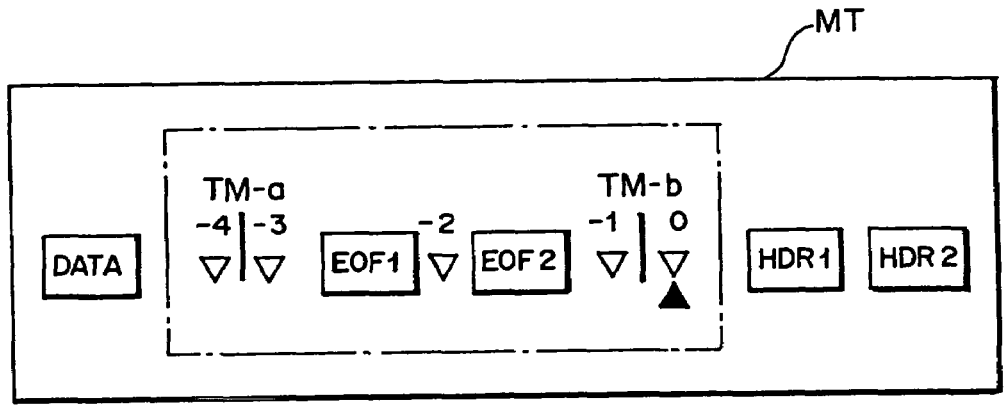

EMULATE IF RB, BPS OR BSPF IS EXECUTED WHEN ES=4 AND EP=0

EMULATE IF RD, RB, BSP, BSPF, SP, FSPF OR WTM IS EXECUTED WHEN ES=4 AND EP=-1

EMULATE IF RD, RB, BSP, BSPF, SP OR FSPF IS EXECUTED WHEN ES=4 AND EP=-2

EMULATE IF RD, RB, BSP, BSPF, SP OR FSPF IS EXECUTED WHEN ES=4 AND EP=-3

EMULATE IF RD, SP OR FSPF IS EXECUTED WHEN ES=4 AND EP=-4

FIG. 21

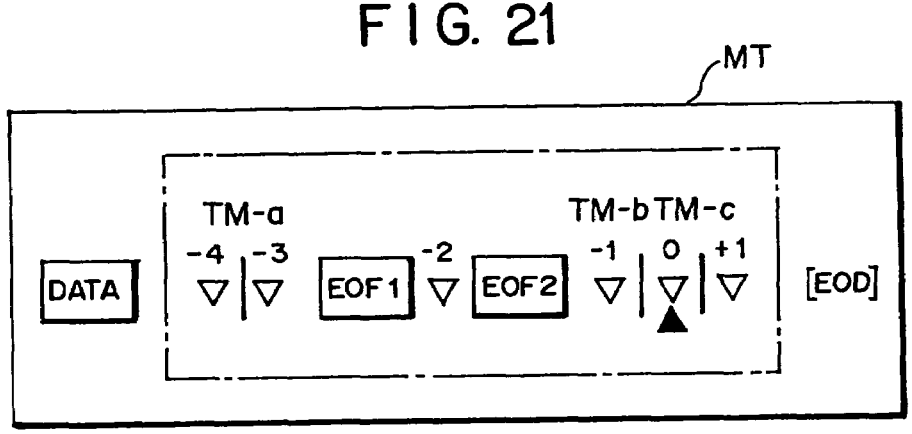

EMULATE IF RB, BSP OR BSPF IS EXECUTED WHEN ES=6 AND EP=+1

EMULATE IF RD, RB, BSP, BSPF, SP FSPF OR WTM IS EXECUTED WHEN ES=6 AND EP=0

EMULATE IF RD, RB, BSP, BSPF, SP OR FSPF IS EXECUTED WHEN ES=6 AND EP=-1

EMULATE IF RD, RB, BSP, BSPF, SP OR FSPF IS EXECUTED WHEN ES=6 AND EP=-2

EMULATE IF RD, RB, BSP, BSPF, SP OR FSPF IS EXECUTED WHEN ES=6 AND EP=-3

EMULATE IF RD, SP OR FSPF IS EXECUTED WHEN ES=6 AND EP=-4

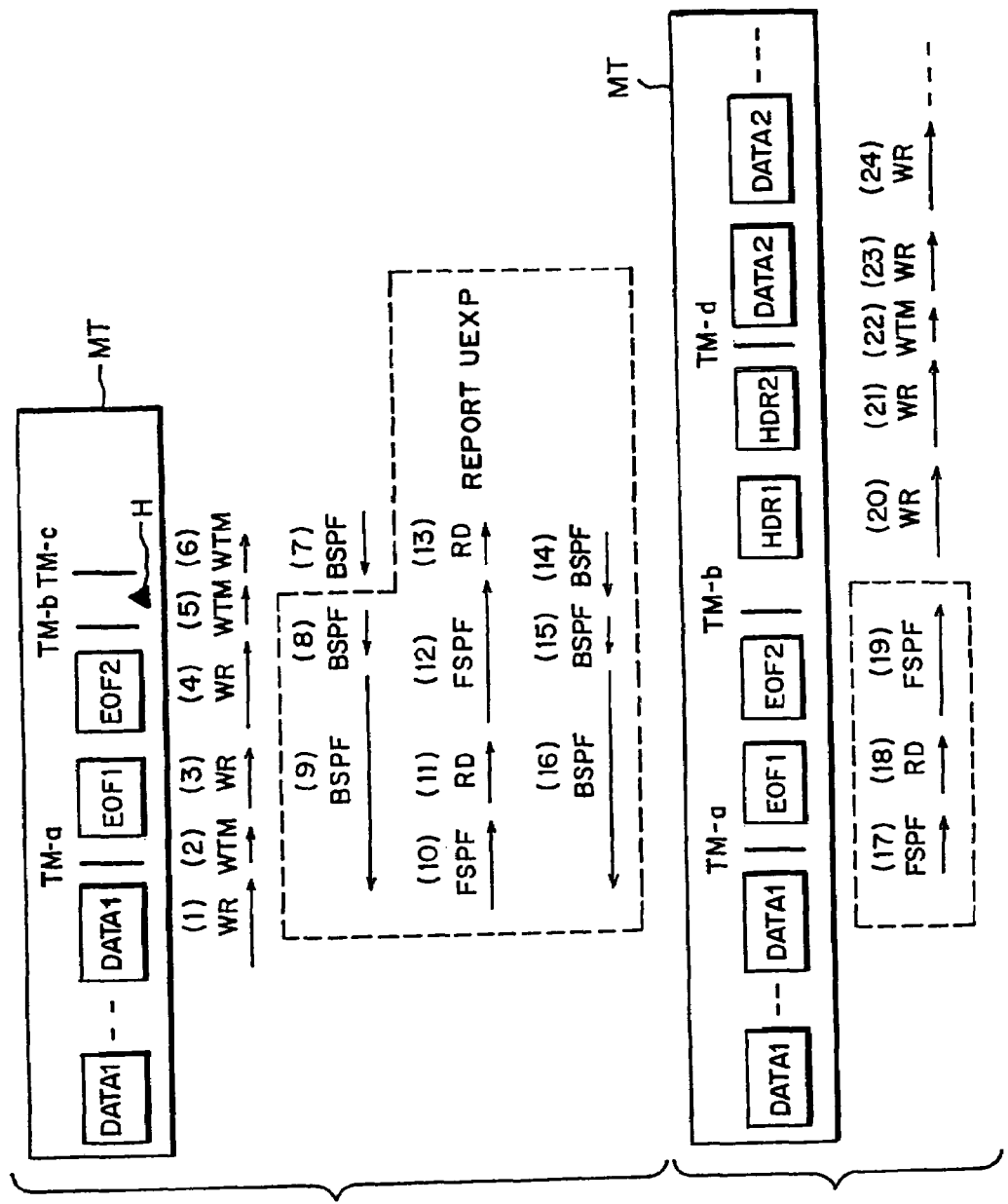

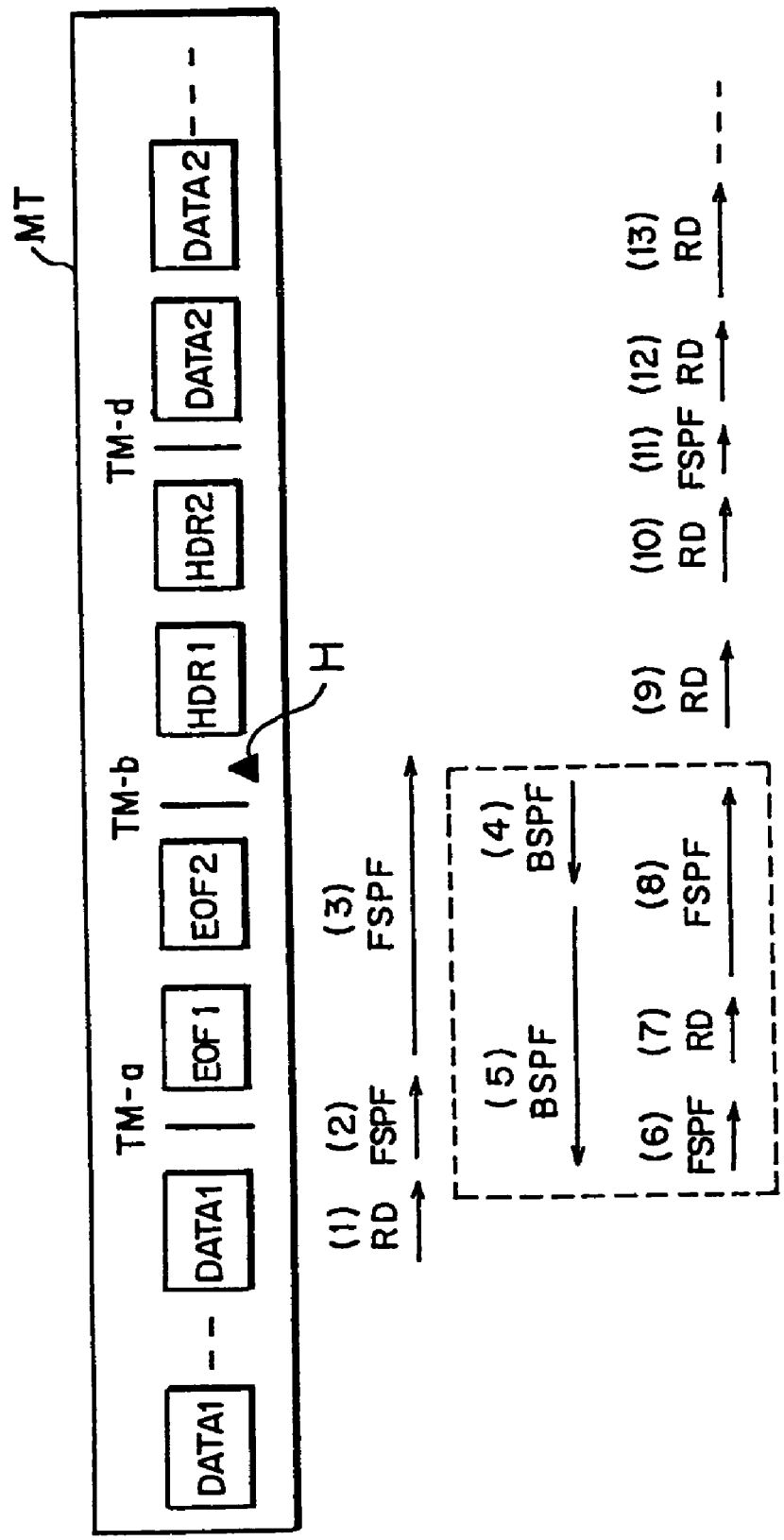

FIG.63

| COMMAND | WITHOUT EMULATION | WITH EMULATION | REMARKS |
|---|---|---|---|
| WR | 0.000731 | 0.000731 | (1) |
| WTM | 0.713581 | 0.713581 | (2) |
| WR | 0.003502 | 0.003502 | (3) |
| WR | 0.000641 | 0.000641 | (4) |
| WTM | 0.596851 | 0.596851 | (5) |
| WTM | 0.298012 | 0.298012 | (6) |
| BSPF | 0.000548 | 0.000548 | (7) |
| NOP | 0.460880 | 0.460880 | |
| LDSP | 0.000521 | 0.000521 | |
| LDSP | 0.000469 | 0.000469 | |
| LDSP | 0.000493 | 0.000493 | |
| NOP | 0.000524 | 0.000524 | |
| SNIO | 0.002945 | 0.002945 | |
| RDVC | 0.000580 | 0.000580 | |
| NOP | 0.000529 | 0.000529 | |
| SNS | 0.002731 | 0.002731 | |
| LDSP | 0.000420 | 0.000420 | |
| BSPF | 0.000583 | 0.000500 | (8) |
| BSPF | 0.291417 | 0.000500 | (9) |
| FSPF | 0.291342 | 0.000500 | (10) |
| RD | 0.531535 | 0.000500 | (11) |
| FSPF | 1.410659 | 0.000500 | (12) |
| RD | 0.581191 | 0.000500 | (13) |
| BSPF | 0.000606 | 0.000500 | (14) |
| BSPF | 0.455999 | 0.000500 | (15) |
| BSPF | 0.293099 | 0.000500 | (16) |
| FSPF | 0.290969 | 0.000500 | (17) |
| RD | 0.531411 | 0.000500 | (18) |
| FSPF | 1.414089 | 0.000500 | (19) |
| NOP | 0.290595 | 0.000500 | |
| WR | 0.000615 | 0.000615 | (20) |
| WR | 0.000615 | 0.000615 | (21) |
| WTM | 0.639278 | 0.639278 | (22) |
| WR | 0.003324 | 0.003324 | (23) |
| WR | 0.000641 | 0.000641 | (24) |
| TOTAL | 9.111926 | 2.734931 | SECOND |

FIG.64

| COMMAND | WITHOUT EMULATION | WITH EMULATION | REMARKS |
|---|---|---|---|
| RD | 0.001561 | 0.001561 | (1) |
| FSPF | 0.453726 | 0.453726 | (2) |
| FSPF | 0.453545 | 0.453545 | (3) |
| NOP | 0.293952 | 0.293952 | |
| LDSP | 0.000525 | 0.000525 | |
| LDSP | 0.000456 | 0.000456 | |
| LDSP | 0.000492 | 0.000492 | |
| NOP | 0.000498 | 0.000498 | |
| SNIO | 0.002933 | 0.002933 | |
| RDVC | 0.000591 | 0.000591 | |
| NOP | 0.000495 | 0.000495 | |
| SNS | 0.002706 | 0.002706 | |
| LDSP | 0.000425 | 0.000425 | |
| BSPF | 0.000581 | 0.000500 | (4) |
| BSPF | 0.457145 | 0.000500 | (5) |
| FSPF | 0.290540 | 0.000500 | (6) |
| RD | 0.531764 | 0.000500 | (7) |
| FSPF | 1.409729 | 0.000500 | (8) |
| RD | 0.369065 | 0.369065 | (9) |
| RD | 0.003179 | 0.003179 | (10) |
| FSPF | 0.657888 | 0.657888 | (11) |
| NOP | 0.454188 | 0.454188 | |
| RD | 0.127053 | 0.127053 | (12) |
| RD | 0.001793 | 0.001793 | (13) |
| TOTAL | 5.514830 | 2.827571 | SECOND |

FIG.65

| COMMAND | WITHOUT EMULATION | WITH EMULATION | REMARKS |
|---|---|---|---|
| WR | 0.000700 | 0.000700 | (1) |
| WTM | 0.713500 | 0.713500 | (2) |
| WR | 0.003500 | 0.003500 | (3) |
| WR | 0.000600 | 0.000600 | (4) |
| WTM | 0.596800 | 0.596800 | (5) |
| WTM | 0.298000 | 0.298000 | (6) |
| BSPF | 0.000500 | 0.000500 | (7) |
| NOP | 0.460800 | 0.460800 | |
| LDSP | 0.000500 | 0.000500 | |
| LDSP | 0.000500 | 0.000500 | |
| NOP | 0.000500 | 0.000500 | |
| NOP | 0.000500 | 0.000500 | |
| SNS | 0.002900 | 0.002900 | |
| LDSP | 0.000500 | 0.000500 | |
| BSPF | 0.000500 | 0.000500 | (8) |
| BSPF | 0.291400 | 0.000500 | (9) |
| FSPF | 0.291300 | 0.000500 | (10) |
| RD | 0.531500 | 0.000500 | (11) |
| FSPF | 1.410600 | 0.000500 | (12) |
| RD | 0.581100 | 0.000500 | (13) |
| BSPF | 0.000600 | 0.000500 | (14) |
| LDSP | 0.000500 | 0.000500 | |
| WR | 0.000600 | 0.000600 | (15) |
| WR | 0.000600 | 0.000600 | (16) |
| WTM | 0.639200 | 0.639200 | (17) |
| WR | 0.003300 | 0.003300 | (18) |
| WR | 0.000600 | 0.000600 | (19) |
| TOTAL | 5.831600 | 2.728100 | SECOND |

FIG.66

| COMMAND | WITHOUT EMULATION | WITH EMULATION | REMARKS |
|---|---|---|---|
| RD | 0.001500 | 0.001500 | (1) |
| RD | 0.581100 | 0.581100 | (2) |
| RD | 0.531700 | 0.531700 | (3) |
| FSPF | 1.409700 | 1.409700 | (4) |
| BSPF | 0.000500 | 0.000500 | (5) |
| BSPF | 0.457100 | 0.000500 | (6) |
| FSPF | 0.290900 | 0.000500 | (7) |
| SP | 0.531400 | 0.000500 | (8) |
| RD | 0.531400 | 0.000500 | (9) |
| FSPF | 0.141400 | 0.000500 | (10) |
| LDSP | 0.000500 | 0.000500 | |
| LDSP | 0.000500 | 0.000500 | |
| NOP | 0.000500 | 0.000500 | |
| LDSP | 0.000500 | 0.000500 | |
| BSPF | 0.000500 | 0.000500 | (11) |
| BSPF | 0.457100 | 0.000500 | (12) |
| FSPF | 0.290500 | 0.000500 | (13) |
| RD | 0.531700 | 0.000500 | (14) |
| FSPF | 1.409700 | 0.000500 | (15) |
| RD | 0.369000 | 0.369000 | (16) |
| RD | 0.003100 | 0.003100 | (17) |
| LDSP | 0.000500 | 0.000500 | |
| FSPF | 0.657800 | 0.657800 | (18) |
| NOP | 0.454100 | 0.454100 | |
| LDSP | 0.000500 | 0.000500 | |
| RD | 0.127000 | 0.127000 | (19) |
| RD | 0.001700 | 0.001700 | (20) |
| TOTAL | 8.781900 | 4.145200 | SECOND |

|  | RD | RB | BSP | BSPF | SP | FSPF | WTM |
|---|---|---|---|---|---|---|---|
| 0 | × | ○ | ○ | ○ | × | × | × |
| -1 | ○ | ○ | ○ | ○ | ○ | ○ | ○ |
| -2 | ◎ | ○ | ○ | ○ | ○ | ○ | × |
| -3 | ◎ | ○ | ○ | ○ | ○ | ○ | × |
| -4 | ○ | × | × | × | ○ | ○ | × |

◎ : EMULATION POSSIBLE ( INVOLVING DATA TRANSFER )
○ : EMULATION POSSIBLE
× : EMULATION IMPOSSIBLE ( REAL OPERATION NECESSARY )

|     | RD | RB | BSP | BSPF | SP | FSPF | WTM |
|-----|----|----|----|----|----|----|----|
| +1  | ×  | ○  | ○  | ○  | ×  | ×  | ×  |
| 0   | ○  | ○  | ○  | ○  | ○  | ○  | ○  |
| -1  | ○  | ○  | ○  | ○  | ○  | ○  | ×  |
| -2  | ◎  | ○  | ○  | ○  | ○  | ○  | ×  |
| -3  | ◎  | ○  | ○  | ○  | ○  | ○  | ×  |
| -4  | ○  | ×  | ×  | ×  | ○  | ○  | ×  |

◎ : EMULATION POSSIBLE ( INVOLVING DATA TRANSFER )
○ : EMULATION POSSIBLE
× : EMULATION IMPOSSIBLE ( REAL OPERATION NECESSARY )

|    | RD | RB | BSP | BSPF | SP | FSPF | WTM |
|----|----|----|-----|------|----|------|-----|
| 0  | ×  | ○  | ○   | ○    | ×  | ×    | ×   |
| -1 | ○  | ○  | ○   | ○    | ○  | ○    | ○   |
| -2 | ×  | ○  | ○   | ○    | ○  | ○    | ×   |
| -3 | ◎  | ○  | ○   | ○    | ○  | ○    | ×   |
| -4 | ○  | ×  | ×   | ×    | ○  | ○    | ×   |

◎ : EMULATION POSSIBLE (INVOLVING DATA TRANSFER)
○ : EMULATION POSSIBLE
× : EMULATION IMPOSSBLE (REAL OPERATION NECESSARY)

|    | RD | RB | BSP | BSPF | SP | FSPF | WTM |
|----|----|----|-----|------|----|------|-----|
| +1 | × | ○ | ○ | ○ | × | × | × |
| 0  | ○ | ○ | ○ | ○ | ○ | ○ | ○ |
| -1 | ○ | ○ | ○ | ○ | ○ | ○ | × |
| -2 | × | ○ | ○ | ○ | ○ | ○ | × |
| -3 | ◎ | ○ | ○ | ○ | ○ | ○ | × |
| -4 | ○ | × | × | × | ○ | ○ | × |

◎ : EMULATION POSSIBLE ( INVOLVING DATA TRANSFER )
○ : EMULATION POSSIBLE
× : EMULATION IMPOSSIBLE ( REAL OPERATION NECESSARY )

|    | RD | RB | BSP | BSPF | SP | FSPF | WTM |
|----|----|----|----|----|----|----|----|
| 0  | ×  | ○  | ○  | ○  | ×  | ×  | ×  |
| -1 | ○  | ○  | ○  | ○  | ○  | ○  | ○  |
| -2 | ◎  | ○  | ○  | ○  | ○  | ○  | ×  |
| -3 | ×  | ○  | ○  | ○  | ○  | ○  | ×  |
| -4 | ○  | ×  | ×  | ×  | ○  | ○  | ×  |

◎ : EMULATION POSSIBLE (INVOLVING DATA TRANSFER)
○ : EMULATION POSSIBLE
× : EMULATION IMPOSSIBLE (REAL OPERATION NECESSARY)

|    | RD | RB | BSP | BSPF | SP | FSPF | WTM |
|----|----|----|-----|------|----|------|-----|
| +1 | ×  | ○  | ○   | ○    | ×  | ×    | ×   |
| 0  | ○  | ○  | ○   | ○    | ○  | ○    | ○   |
| -1 | ○  | ○  | ○   | ○    | ○  | ○    | ×   |
| -2 | ◎  | ○  | ○   | ○    | ○  | ○    | ×   |
| -3 | ×  | ○  | ○   | ○    | ○  | ○    | ×   |
| -4 | ○  | ×  | ×   | ×    | ○  | ○    | ×   |

◎ : EMULATION POSSIBLE ( INVOLVING DATA TRANSFER )
○ : EMULATION POSSIBLE
× : EMULATION IMPOSSIBLE ( REAL OPERATION NECESSARY )

|    | RD | RB | BSP | BSPF | SP | FSPF | WTM |
|----|----|----|-----|------|----|------|-----|
| 0  | ×  | ○  | ○   | ○    | ×  | ×    | ×   |
| -1 | ○  | ○  | ○   | ○    | ○  | ○    | ○   |
| -2 | ×  | ○  | ○   | ○    | ○  | ○    | ×   |
| -3 | ×  | ○  | ○   | ○    | ○  | ○    | ×   |
| -4 | ○  | ×  | ×   | ×    | ○  | ○    | ×   |

○ : EMULATION POSSIBLE
× : EMULATION IMPOSSIBLE (REAL OPERATION NECESSARY)

|    | RD | RB | BSP | BSPF | SP | FSPF | WTM |
|----|----|----|-----|------|----|------|-----|
| +1 | ×  | ○  | ○   | ○    | ×  | ×    | ×   |
| 0  | ○  | ○  | ○   | ○    | ○  | ○    | ○   |
| -1 | ○  | ○  | ○   | ○    | ○  | ○    | ×   |
| -2 | ×  | ○  | ○   | ○    | ○  | ○    | ×   |
| -3 | ×  | ○  | ○   | ○    | ○  | ○    | ×   |
| -4 | ○  | ×  | ×   | ×    | ○  | ○    | ×   |

○ : EMULATION POSSIBLE
× : EMULATION IMPOSSIBLE ( REAL OPERATION NECESSARY )

F I G. 82
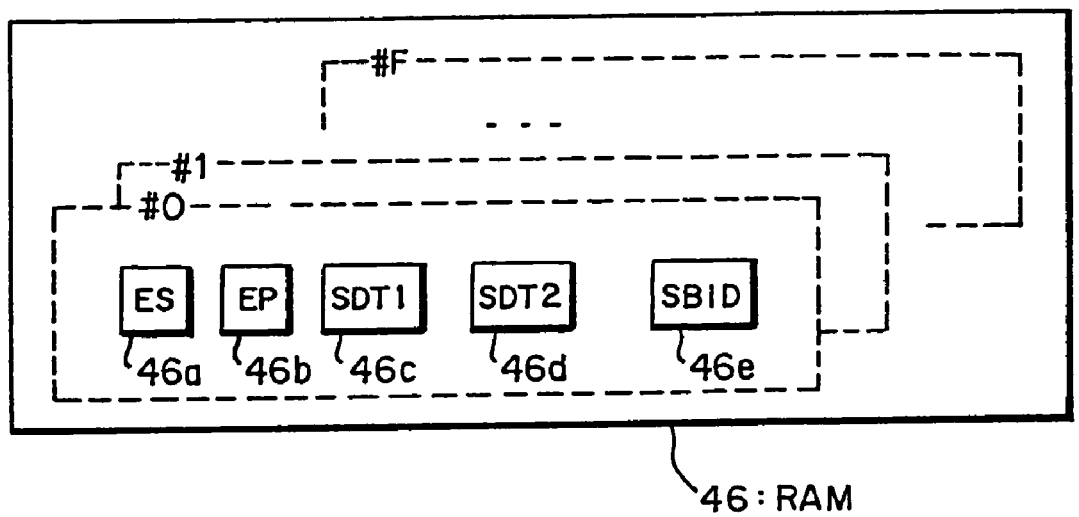

FIG. 84

| PRE - PROCESS | | | | OPERATION | POST - PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 00 | -- | -- | -- | REAL READ | TM | -- | SBID←REAL BID | 10 | -- | 1.00.00 |
| | | | | | OTHERS | -- | -- | 00 | -- | 1.00.01 |
| 10 | -- | -- | -- | REAL READ | EOF | SDT1 | -- | 20 | -- | 1.10.00 |
| | | | | | TM | -- | SBID←REAL BID | 10 | -- | 1.10.01 |
| | | | | | OTHERS | -- | -- | 00 | -- | 1.10.02 |
| 20 | -- | -- | -- | REAL READ | EOF | SDT2 | -- | 30 | -- | 1.20.00 |
| | | | | | TM | -- | SBID←REAL BID | 10 | -- | 1.20.01 |
| | | | | | OTHERS | -- | -- | 00 | -- | 1.20.02 |
| 30 | -- | -- | -- | REAL READ | TM | -- | SBID←REAL BID WHEN (REAL BID)-(SBID)=3 | 40 | 0 | 1.30.00 |
| | | | | | OTHERS | -- | -- | 00 | -- | 1.30.01 |
| 40 | -4 | -- | -- | EMULATE | -- | -- | -- | 40 | -3 | 1.40.00 |
| | -3 | -- | SDT1 | EMULATE | -- | -- | -- | 40 | -2 | 1.40.10 |
| | -2 | -- | SDT2 | EMULATE | -- | -- | -- | 40 | -1 | 1.40.20 |
| | -1 | -- | -- | EMULATE | -- | -- | -- | 40 | 0 | 1.40.30 |
| | 0 | -- | -- | REAL READ | EOF | SDT1 | -- | 20 | -- | 1.40.40 |
| | | | | | TM | -- | SBID←REAL BID WHEN (REAL BID)-(SBID)=1 | 50 | -- | 1.40.41 |
| | | | | | OTHERS | -- | -- | 00 | -- | 1.40.42 |
| 50 | -- | -- | -- | REAL READ | EOF | SDT1 | -- | 20 | -- | 1.50.00 |
| | | | | | TM | -- | SBID←REAL BID | 10 | -- | 1.50.01 |
| | | | | | OTHERS | -- | -- | 00 | -- | 1.50.02 |
| 60 | -4 | -- | -- | EMULATE | -- | -- | -- | 60 | -3 | 1.60.00 |
| | -3 | -- | SDT1 | EMULATE | -- | -- | -- | 60 | -2 | 1.60.10 |
| | -2 | -- | SDT2 | EMULATE | -- | -- | -- | 60 | -1 | 1.60.20 |
| | -1 | -- | -- | EMULATE | -- | -- | -- | 60 | 0 | 1.60.30 |
| | 0 | -- | -- | EMULATE | -- | -- | -- | 60 | +1 | 1.60.40 |
| | +1 | SBID+EP | -- | REAL READ | EOF | SDT1 | SBID+1 | 20 | -- | 1.60.50 |
| | | | | | TM | -- | SBID←REAL BID | 10 | -- | 1.60.51 |
| | | | | | OTHERS | -- | -- | 00 | -- | 1.60.52 |

FIG. 85

| PRE – PROCESS | | | | OPERATION | POST – PROCESS | | | ES | EP | PROCESS ID |
|---|---|---|---|---|---|---|---|---|---|---|
| ES | EP | RE-POSITION | RESTORE | | BLOCK | SAVE | BID PROCESS | | | |
| 31 | -- | -- | -- | REAL READ | TM | -- | SBID←REAL BID WHEN (REAL BID)-(SBID)=3 | 41 | 0 | 1.31.00 |
| | | | | | OTHERS | -- | -- | 00 | -- | 1.31.01 |
| 41 | -4 | -- | -- | EMULATE | -- | -- | -- | 41 | -3 | 1.41.00 |
| | -3 | -- | SDT1 | EMULATE | -- | -- | -- | 41 | -2 | 1.41.10 |
| | -2 | SBID+EP | -- | REAL READ | EOF | SDT2 | SBID-3 | 30 | -- | 1.41.20 |
| | | | | | OTHERS | -- | -- | 00 | -- | 1.41.21 |
| | -1 | -- | -- | EMULATE | -- | -- | -- | 41 | 0 | 1.41.30 |
| | 0 | -- | -- | REAL READ | EOF | SDT1 | -- | 20 | -- | 1.41.40 |
| | | | | | TM | -- | SBID←REAL BID WHEN (REAL BID)-(SBID)=1 | 51 | -- | 1.41.41 |
| | | | | | OTHERS | -- | -- | 00 | -- | 1.41.42 |
| 51 | -- | -- | -- | REAL READ | EOF | SDT1 | -- | 20 | -- | 1.51.00 |
| | | | | | TM | -- | SBID←REAL BID | 10 | -- | 1.51.01 |
| | | | | | OTHERS | -- | -- | 00 | -- | 1.51.02 |
| 61 | -4 | -- | -- | EMULATE | -- | -- | -- | 61 | -3 | 1.61.00 |
| | -3 | -- | SDT1 | EMULATE | -- | -- | -- | 61 | -2 | 1.61.10 |
| | -2 | SBID+EP | -- | REAL READ | EOF | SDT2 | SBID-3 | 30 | -- | 1.61.20 |
| | | | | | OTHERS | -- | -- | 00 | -- | 1.61.21 |
| | -1 | -- | -- | EMULATE | -- | -- | -- | 61 | 0 | 1.61.30 |
| | 0 | -- | -- | EMULATE | -- | -- | -- | 61 | +1 | 1.61.40 |
| | +1 | SBID+EP | -- | REAL READ | EOF | SDT1 | SBID+1 | 20 | -- | 1.61.50 |
| | | | | | TM | -- | SBID←REAL BID | 10 | -- | 1.61.51 |
| | | | | | OTHERS | -- | -- | 00 | -- | 1.61.52 |

FIG. 86

| PRE − PROCESS | | | OPERATION | POST − PROCESS | | | POST − PROCESS | | PROCESS ID |
|---|---|---|---|---|---|---|---|---|---|
| ES | EP | RE-POSITION | RESTORE | | BLOCK | SAVE | BID PROCESS | ES | EP | |
| 22 | -- | -- | -- | REAL READ | EOF | SDT2 | -- | 32 | -- | 1.22.00 |
| | | | | | TM | -- | SBID←REAL BID | 10 | -- | 1.22.01 |
| | | | | | OTHERS | -- | -- | 00 | -- | 1.22.02 |
| 32 | -- | -- | -- | REAL READ | TM | -- | SBID←REAL BID WHEN (REAL BID)−(SBID)=3 | 42 | 0 | 1.32.00 |
| | | | | | OTHERS | -- | -- | 00 | -- | 1.32.01 |
| 42 | -4 | -- | -- | EMULATE | -- | -- | -- | 42 | -3 | 1.42.00 |
| | -3 | SBID+EP | -- | REAL READ | EOF | SDT1 | SBID-3 | 20 | -- | 1.42.10 |
| | | | | | OTHERS | -- | -- | 00 | -- | 1.42.11 |
| | -2 | -- | SDT2 | EMULATE | -- | -- | -- | 42 | -1 | 1.42.20 |
| | -1 | -- | -- | EMULATE | -- | -- | -- | 42 | 0 | 1.42.30 |
| | 0 | -- | -- | REAL READ | EOF | SDT1 | -- | 20 | -- | 1.42.40 |
| | | | | | TM | -- | SBID←REAL BID WHEN (REAL BID)−(SBID)=1 | 52 | -- | 1.42.41 |
| | | | | | OTHERS | -- | -- | 00 | -- | 1.42.42 |
| 52 | -- | -- | -- | REAL READ | EOF | SDT1 | -- | 20 | -- | 1.52.00 |
| | | | | | TM | -- | SBID←REAL BID | 10 | -- | 1.52.01 |
| | | | | | OTHERS | -- | -- | 00 | -- | 1.52.02 |
| 62 | -4 | -- | -- | EMULATE | -- | -- | -- | 62 | -3 | 1.62.00 |
| | -3 | SBID+EP | -- | REAL READ | EOF | SDT1 | SBID-3 | 20 | -- | 1.62.10 |
| | | | | | OTHERS | -- | -- | 00 | -- | 1.62.11 |
| | -2 | -- | SDT2 | EMULATE | -- | -- | -- | 62 | -1 | 1.62.20 |
| | -1 | -- | -- | EMULATE | -- | -- | -- | 62 | 0 | 1.62.30 |
| | 0 | -- | -- | EMULATE | -- | -- | -- | 62 | +1 | 1.62.40 |
| | +1 | SBID+EP | -- | REAL READ | EOF | SDT1 | SBID+1 | 20 | -- | 1.62.50 |
| | | | | | TM | -- | SBID←REAL BID | 10 | -- | 1.62.51 |
| | | | | | OTHERS | -- | -- | 00 | -- | 1.62.52 |

FIG. 87

| PRE - PROCESS | | | OPERATION | POST - PROCESS | | | | | PROCESS ID |
|---|---|---|---|---|---|---|---|---|---|
| ES | EP | RE-POSITION | RESTORE | | BLOCK | SAVE | BID PROCESS | ES | EP | |
| 33 | -- | -- | -- | REAL READ | TM | -- | SBID←REAL BID WHEN (REAL BID)-(SBID)=3 | 43 | 0 | 1.33.00 |
| | | | | | OTHERS | -- | -- | 00 | -- | 1.33.01 |
| 43 | -4 | -- | -- | EMULATE | -- | -- | -- | 43 | -3 | 1.43.00 |
| | -3 | SBID+EP | -- | REAL READ | EOF | SDT1 | SBID-3 | 20 | -- | 1.43.10 |
| | | | | | OTHERS | -- | -- | 00 | -- | 1.43.11 |
| | -2 | SBID+EP | -- | REAL READ | EOF | SDT2 | SBID-3 | 32 | -- | 1.43.20 |
| | | | | | OTHERS | -- | -- | 00 | -- | 1.43.21 |
| | -1 | -- | -- | EMULATE | -- | -- | -- | 43 | 0 | 1.43.30 |
| | 0 | -- | -- | REAL READ | EOF | SDT1 | -- | 20 | -- | 1.43.40 |
| | | | | | TM | -- | SBID←REAL BID WHEN (REAL BID)-(SBID)=1 | 53 | -- | 1.43.41 |
| | | | | | OTHERS | -- | -- | 00 | -- | 1.43.42 |
| 53 | -- | -- | -- | REAL READ | EOF | SDT1 | -- | 20 | -- | 1.53.00 |
| | | | | | TM | -- | SBID←REAL BID | 10 | -- | 1.53.01 |
| | | | | | OTHERS | -- | -- | 00 | -- | 1.53.02 |
| 63 | -4 | -- | -- | EMULATE | -- | -- | -- | 63 | -3 | 1.63.00 |
| | -3 | SBID+EP | -- | REAL READ | EOF | SDT1 | SBID-3 | 20 | -- | 1.63.10 |
| | | | | | OTHERS | -- | -- | 00 | -- | 1.63.11 |
| | -2 | SBID+EP | -- | REAL READ | EOF | SDT2 | SBID-3 | 32 | -- | 1.63.20 |
| | | | | | OTHERS | -- | -- | 00 | -- | 1.63.21 |
| | -1 | -- | -- | EMULATE | -- | -- | -- | 63 | 0 | 1.63.30 |
| | 0 | -- | -- | EMULATE | -- | -- | -- | 63 | +1 | 1.63.40 |
| | +1 | SBID+EP | -- | REAL READ | EOF | SDT1 | SBID+1 | 20 | -- | 1.63.50 |
| | | | | | TM | -- | SBID←REAL BID | 10 | -- | 1.63.51 |
| | | | | | OTHERS | -- | -- | 00 | -- | 1.63.52 |

FIG. 88

| PRE – PROCESS | | | | OPERATION | POST – PROCESS | | | | | PROCESS |
|---|---|---|---|---|---|---|---|---|---|---|
| ES | EP | RE-POSITION | RESTORE | | BLOCK | SAVE | BID PROCESS | ES | EP | ID |
| 00 | -- | -- | -- | REAL RB | -- | -- | -- | 00 | -- | 2.00.00 |
| 10 | -- | -- | -- | REAL RB | -- | -- | -- | 00 | -- | 2.10.00 |
| 20 | -- | -- | -- | REAL RB | -- | -- | -- | 00 | -- | 2.20.00 |
| 30 | -- | -- | -- | REAL RB | -- | -- | -- | 00 | -- | 2.30.00 |
| 40 | -4 | SBID←EP | -- | REAL RB | -- | -- | -- | 00 | -- | 2.40.00 |
| | -3 | -- | -- | EMULATE | -- | -- | -- | 40 | -4 | 2.40.10 |
| | -2 | -- | -- | EMULATE | -- | -- | -- | 40 | -3 | 2.40.20 |
| | -1 | -- | -- | EMULATE | -- | -- | -- | 40 | -2 | 2.40.30 |
| | 0 | -- | -- | EMULATE | -- | -- | -- | 40 | -1 | 2.40.40 |
| 50 | -- | -- | -- | REAL RB | TM | -- | SBID←REAL BID WHEN (SBID)-(REAL BID)=1 | 60 | 0 | 2.50.00 |
| 60 | -4 | SBID←EP | -- | REAL RB | -- | -- | -- | 00 | -- | 2.60.00 |
| | -3 | -- | -- | EMULATE | -- | -- | -- | 60 | -4 | 2.60.10 |
| | -2 | -- | -- | EMULATE | -- | -- | -- | 60 | -3 | 2.60.20 |
| | -1 | -- | -- | EMULATE | -- | -- | -- | 60 | -2 | 2.60.30 |
| | 0 | -- | -- | EMULATE | -- | -- | -- | 60 | -1 | 2.60.40 |
| | +1 | -- | -- | EMULATE | -- | -- | -- | 60 | 0 | 2.60.50 |

FIG.89

| PRE-PROCESS ||| OPERATION | POST-PROCESS |||| PROCESS ID |
|---|---|---|---|---|---|---|---|---|
| ES | EP | RE-POSITION / RESTORE | | BLOCK | SAVE | BID PROCESS | ES | EP | |
| 31 | -- | -- / -- | REAL RB | -- | -- | -- | 00 | -- | 2.31.00 |
| 41 | -4 | SBID←EP / -- | REAL RB | -- | -- | -- | 00 | -- | 2.41.00 |
|    | -3 | -- / -- | EMULATE | -- | -- | -- | 41 | -4 | 2.41.10 |
|    | -2 | -- / -- | EMULATE | -- | -- | -- | 41 | -3 | 2.41.20 |
|    | -1 | -- / -- | EMULATE | -- | -- | -- | 41 | -2 | 2.41.30 |
|    | 0  | -- / -- | EMULATE | -- | -- | -- | 41 | -1 | 2.41.40 |
| 51 | -- | -- / -- | REAL RB | TM | -- | SBID←REAL BID WHEN (SBID)−(REAL BID)=1 | 61 | 0 | 2.51.00 |
| 61 | -4 | SBID←EP / -- | REAL RB | -- | -- | -- | 00 | -- | 2.61.00 |
|    | -3 | -- / -- | EMULATE | -- | -- | -- | 61 | -4 | 2.61.10 |
|    | -2 | -- / -- | EMULATE | -- | -- | -- | 61 | -3 | 2.61.20 |
|    | -1 | -- / -- | EMULATE | -- | -- | -- | 61 | -2 | 2.61.30 |
|    | 0  | -- / -- | EMULATE | -- | -- | -- | 61 | -1 | 2.61.40 |
|    | +1 | -- / -- | EMULATE | -- | -- | -- | 61 | 0  | 2.61.50 |

FIG. 90

| PRE - PROCESS | | | | POST - PROCESS | | | | | |
|---|---|---|---|---|---|---|---|---|---|
| ES | EP | RE-POSITION | RESTORE | OPERATION | BLOCK | SAVE | BID PROCESS | ES | EP | PROCESS ID |
| 32 | -- | -- | -- | REAL RB | -- | -- | -- | 00 | -- | 2.32.00 |
| 42 | -4 | SBID←EP | -- | REAL RB | -- | -- | -- | 00 | -- | 2.42.00 |
|    | -3 | -- | -- | EMULATE | -- | -- | -- | 42 | -4 | 2.42.10 |
|    | -2 | -- | -- | EMULATE | -- | -- | -- | 42 | -3 | 2.42.20 |
|    | -1 | -- | -- | EMULATE | -- | -- | -- | 42 | -2 | 2.42.30 |
|    | 0  | -- | -- | EMULATE | -- | -- | -- | 42 | -1 | 2.42.40 |
| 52 | -- | -- | -- | REAL RB | TM | -- | SBID←REAL BID WHEN (SBID)-(REAL BID)=1 | 62 | 0 | 2.52.00 |
| 62 | -4 | SBID←EP | -- | REAL RB | -- | -- | -- | 00 | -- | 2.62.00 |
|    | -3 | -- | -- | EMULATE | -- | -- | -- | 62 | -4 | 2.62.10 |
|    | -2 | -- | -- | EMULATE | -- | -- | -- | 62 | -3 | 2.62.20 |
|    | -1 | -- | -- | EMULATE | -- | -- | -- | 62 | -2 | 2.62.30 |
|    | 0  | -- | -- | EMULATE | -- | -- | -- | 62 | -1 | 2.62.40 |
|    | +1 | -- | -- | EMULATE | -- | -- | -- | 62 | 0  | 2.62.50 |

FIG.91

| PRE – PROCESS | | | | | POST – PROCESS | | | | PROCESS ID |
|---|---|---|---|---|---|---|---|---|---|
| ES | EP | RE-POSITION | RESTORE | OPERATION | BLOCK | SAVE | BID PROCESS | ES | EP | |
| 33 | -- | -- | -- | REAL RB | -- | -- | -- | 00 | -- | 2.33.00 |
| 43 | -4 | SBID+EP | -- | REAL RB | -- | -- | -- | 00 | -- | 2.43.00 |
| | -3 | -- | -- | EMULATE | -- | -- | -- | 43 | -4 | 2.43.10 |
| | -2 | -- | -- | EMULATE | -- | -- | -- | 43 | -3 | 2.43.20 |
| | -1 | -- | -- | EMULATE | -- | -- | -- | 43 | -2 | 2.43.30 |
| | 0 | -- | -- | EMULATE | -- | -- | -- | 43 | -1 | 2.43.40 |
| 53 | -- | -- | -- | REAL RB | TM | -- | SBID←REAL BID WHEN (SBID)-(REAL BID)=1 | 63 | 0 | 2.53.00 |
| 63 | -4 | SBID+EP | -- | REAL RB | -- | -- | -- | 00 | -- | 2.63.00 |
| | -3 | -- | -- | EMULATE | -- | -- | -- | 63 | -4 | 2.63.10 |
| | -2 | -- | -- | EMULATE | -- | -- | -- | 63 | -3 | 2.63.20 |
| | -1 | -- | -- | EMULATE | -- | -- | -- | 63 | -2 | 2.63.30 |
| | 0 | -- | -- | EMULATE | -- | -- | -- | 63 | -1 | 2.63.40 |
| | +1 | -- | -- | EMULATE | -- | -- | -- | 63 | 0 | 2.63.50 |

FIG. 92

| PRE - PROCESS | | | | OPERATION | POST - PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 00 | -- | -- | -- | REAL WR | -- | -- | -- | 00 | -- | 3.00.00 |
| 10 | -- | -- | -- | REAL WR | EOF | SDT1 | -- | 20 | -- | 3.10.00 |
| | | | -- | | OTHERS | -- | -- | 00 | -- | 3.10.01 |
| 20 | -- | -- | -- | REAL WR | EOF | SDT2 | -- | 30 | -- | 3.20.00 |
| | | | -- | | OTHERS | -- | -- | 00 | -- | 3.20.01 |
| 30 | -- | -- | -- | REAL WR | -- | -- | -- | 00 | -- | 3.30.00 |
| 40 | -4 | SBID+EP | -- | REAL WR | -- | -- | -- | 00 | -- | 3.40.00 |
| | -3 | | -- | REAL WR | EOF | SDT1 | SBID-3 | 20 | -- | 3.40.10 |
| | | | -- | | OTHERS | -- | -- | 00 | -- | 3.40.11 |
| | -2 | | -- | REAL WR | EOF | SDT2 | SBID-3 | 30 | -- | 3.40.20 |
| | | | -- | | OTHERS | -- | -- | 00 | -- | 3.40.21 |
| | -1 | | -- | REAL WR | -- | -- | -- | 00 | -- | 3.40.30 |
| | 0 | -- | -- | REAL WR | EOF | SDT1 | -- | 20 | -- | 3.40.40 |
| | | | -- | | OTHERS | -- | -- | 00 | -- | 3.40.41 |
| 50 | -- | -- | -- | REAL WR | EOF | SDT1 | -- | 20 | -- | 3.50.00 |
| | | | -- | | OTHERS | -- | -- | 00 | -- | 3.50.01 |
| 60 | -4 | SBID+EP | -- | REAL WR | -- | -- | -- | 00 | -- | 3.60.00 |
| | -3 | | -- | REAL WR | EOF | SDT1 | SBID-3 | 20 | -- | 3.60.10 |
| | | | -- | | OTHERS | -- | -- | 00 | -- | 3.60.11 |
| | -2 | | -- | REAL WR | EOF | SDT2 | SBID-3 | 30 | -- | 3.60.20 |
| | | | -- | | OTHERS | -- | -- | 00 | -- | 3.60.21 |
| | -1 | | -- | REAL WR | -- | -- | -- | 00 | -- | 3.60.30 |
| | 0 | -- | -- | REAL WR | EOF | SDT1 | -- | 20 | -- | 3.60.40 |
| | | | -- | | OTHERS | -- | -- | 00 | -- | 3.60.41 |
| | +1 | SBID+EP | -- | REAL WR | EOF | SDT1 | SBID+1 | 20 | -- | 3.60.50 |
| | | | -- | | OTHERS | -- | -- | 00 | -- | 3.60.51 |

FIG. 93

| PRE - PROCESS | | | | OPERATION | POST - PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 31 | -- | -- | -- | REAL WR | -- | -- | -- | 00 | -- | 3.31.00 |
| 41 | -4 | SBID+EP | -- | REAL WR | -- | -- | -- | 00 | -- | 3.41.00 |
| | -3 | | -- | REAL WR | EOF | SDT1 | SBID-3 | 20 | -- | 3.41.10 |
| | | | | | OTHERS | -- | -- | 00 | -- | 3.41.11 |
| | -2 | | -- | REAL WR | EOF | SDT2 | SBID-3 | 30 | -- | 3.41.20 |
| | | | | | OTHERS | -- | -- | 00 | -- | 3.41.21 |
| | -1 | | -- | REAL WR | -- | -- | -- | 00 | -- | 3.41.30 |
| | 0 | -- | -- | REAL WR | EOF | SDT1 | -- | 20 | -- | 3.41.40 |
| | | | | | OTHERS | -- | -- | 00 | -- | 3.41.41 |
| 51 | -- | -- | -- | REAL WR | EOF | SDT1 | -- | 20 | -- | 3.51.00 |
| | | | | | OTHERS | -- | -- | 00 | -- | 3.51.01 |
| 61 | -4 | SBID+EP | -- | REAL WR | -- | -- | -- | 00 | -- | 3.61.00 |
| | -3 | | -- | REAL WR | EOF | SDT1 | SBID-3 | 20 | -- | 3.61.10 |
| | | | | | OTHERS | -- | -- | 00 | -- | 3.61.11 |
| | -2 | | -- | REAL WR | EOF | SDT2 | SBID-3 | 30 | -- | 3.61.20 |
| | | | | | OTHERS | -- | -- | 00 | -- | 3.61.21 |
| | -1 | | -- | REAL WR | -- | -- | -- | 00 | -- | 3.61.30 |
| | 0 | -- | -- | REAL WR | EOF | SDT1 | -- | 20 | -- | 3.61.40 |
| | | | | | OTHERS | -- | -- | 00 | -- | 3.61.41 |
| | +1 | SBID+EP | -- | REAL WR | EOF | SDT1 | SBID+1 | 20 | -- | 3.61.50 |
| | | | | | OTHERS | -- | -- | 00 | -- | 3.61.51 |

FIG. 94

| PRE - PROCESS | | | | OPERATION | POST - PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 22 | -- | -- | -- | REAL WR | EOF | SDT2 | -- | 32 | -- | 3.22.00 |
|  |  |  | -- |  | OTHERS | -- | -- | 00 | -- | 3.22.01 |
| 32 | -- | -- | -- | REAL WR | -- | -- | -- | 00 | -- | 3.32.00 |
| 42 | -4 | SBID+EP | -- | REAL WR | -- | -- | -- | 00 | -- | 3.42.00 |
|  | -3 |  | -- | REAL WR | EOF | SDT1 | SBID-3 | 20 | -- | 3.42.10 |
|  |  |  | -- |  | OTHERS | -- | -- | 00 | -- | 3.42.11 |
|  | -2 |  | -- | REAL WR | EOF | SDT2 | SBID-3 | 32 | -- | 3.42.20 |
|  |  |  | -- |  | OTHERS | -- | -- | 00 | -- | 3.42.21 |
|  | -1 |  | -- | REAL WR | -- | -- | -- | 00 | -- | 3.42.30 |
|  | 0 | -- | -- | REAL WR | EOF | SDT1 | -- | 20 | -- | 3.42.40 |
|  |  |  | -- |  | OTHERS | -- | -- | 00 | -- | 3.42.41 |
| 52 | -- | -- | -- | REAL WR | EOF | SDT1 | -- | 20 | -- | 3.52.00 |
|  |  |  | -- |  | OTHERS | -- | -- | 00 | -- | 3.52.01 |
| 62 | -4 | SBID+EP | -- | REAL WR | -- | -- | -- | 00 | -- | 3.62.00 |
|  | -3 |  | -- | REAL WR | EOF | SDT1 | SBID-3 | 20 | -- | 3.62.10 |
|  |  |  | -- |  | OTHERS | -- | -- | 00 | -- | 3.62.11 |
|  | -2 |  | -- | REAL WR | EOF | SDT2 | SBID-3 | 32 | -- | 3.62.20 |
|  |  |  | -- |  | OTHERS | -- | -- | 00 | -- | 3.62.21 |
|  | -1 |  | -- | REAL WR | -- | -- | -- | 00 | -- | 3.62.30 |
|  | 0 | -- | -- | REAL WR | EOF | SDT1 | -- | 20 | -- | 3.62.40 |
|  |  |  | -- |  | OTHERS | -- | -- | 00 | -- | 3.62.41 |
|  | +1 | SBID+EP | -- | REAL WR | EOF | SDT1 | SBID+1 | 20 | -- | 3.62.50 |
|  |  |  | -- |  | OTHERS | -- | -- | 00 | -- | 3.62.51 |

FIG. 95

| PRE − PROCESS ||| | OPERATION | POST − PROCESS |||| ES | EP | PROCESS ID |
|---|---|---|---|---|---|---|---|---|---|---|
| ES | EP | RE-POSITION | RESTORE | | BLOCK | SAVE | BID PROCESS | | | |
| 33 | -- | -- | -- | REAL WR | -- | -- | -- | 00 | -- | 3.33.00 |
| 43 | -4 | SBID+EP | -- | REAL WR | -- | -- | -- | 00 | -- | 3.43.00 |
| | -3 | | -- | REAL WR | EOF | SDT1 | SBID-3 | 20 | -- | 3.43.10 |
| | | | | | OTHERS | -- | -- | 00 | -- | 3.43.11 |
| | -2 | | -- | REAL WR | EOF | SDT2 | SBID-3 | 32 | -- | 3.43.20 |
| | | | | | OTHERS | -- | -- | 00 | -- | 3.43.21 |
| | -1 | | -- | REAL WR | -- | -- | -- | 00 | -- | 3.43.30 |
| | 0 | -- | -- | REAL WR | EOF | SDT1 | -- | 20 | -- | 3.43.40 |
| | | | | | OTHERS | -- | -- | 00 | -- | 3.43.41 |
| 53 | -- | -- | -- | REAL WR | EOF | SDT1 | -- | 20 | -- | 3.53.00 |
| | | | | | OTHERS | -- | -- | 00 | -- | 3.53.01 |
| 63 | -4 | SBID+EP | -- | REAL WR | -- | -- | -- | 00 | -- | 3.63.00 |
| | -3 | | -- | REAL WR | EOF | SDT1 | SBID-3 | 20 | -- | 3.63.10 |
| | | | | | OTHERS | -- | -- | 00 | -- | 3.63.11 |
| | -2 | | -- | REAL WR | EOF | SDT2 | SBID-3 | 32 | -- | 3.63.20 |
| | | | | | OTHERS | -- | -- | 00 | -- | 3.63.21 |
| | -1 | | -- | REAL WR | -- | -- | -- | 00 | -- | 3.63.30 |
| | 0 | -- | -- | REAL WR | EOF | SDT1 | -- | 20 | -- | 3.63.40 |
| | | | | | OTHERS | -- | -- | 00 | -- | 3.63.41 |
| | +1 | SBID+EP | -- | REAL WR | EOF | SDT1 | SBID+1 | 20 | -- | 3.63.50 |
| | | | | | OTHERS | -- | -- | 00 | -- | 3.63.51 |

FIG. 96

| PRE – PROCESS | | | | OPERATION | POST – PROCESS | | | ES | EP | PROCESS ID |
|---|---|---|---|---|---|---|---|---|---|---|
| ES | EP | RE-POSITION | RESTORE | | BLOCK | SAVE | BID PROCESS | | | |
| 00 | -- | -- | -- | REAL BSP | -- | -- | -- | 00 | -- | 4.00.00 |
| 10 | -- | -- | -- | REAL BSP | -- | -- | -- | 00 | -- | 4.10.00 |
| 20 | -- | -- | -- | REAL BSP | -- | -- | -- | 10 | -- | 4.20.00 |
| 30 | -- | -- | -- | REAL BSP | -- | -- | -- | 20 | -- | 4.30.00 |
| 40 | -4 | SBID+EP | -- | REAL BSP | -- | -- | -- | 00 | -- | 4.40.00 |
| | -3 | -- | -- | EMULATE | -- | -- | -- | 40 | -4 | 4.40.10 |
| | -2 | -- | -- | EMULATE | -- | -- | -- | 40 | -3 | 4.40.20 |
| | -1 | -- | -- | EMULATE | -- | -- | -- | 40 | -2 | 4.40.30 |
| | 0 | -- | -- | EMULATE | -- | -- | -- | 40 | -1 | 4.40.40 |
| 50 | -- | -- | -- | REAL BSP | TM | -- | SBID←REAL BID WHEN (SBID)-(REAL BID)=1 | 60 | 0 | 4.50.00 |
| 60 | -4 | SBID+EP | -- | REAL BSP | -- | -- | -- | 00 | -- | 4.60.00 |
| | -3 | -- | -- | EMULATE | -- | -- | -- | 60 | -4 | 4.60.10 |
| | -2 | -- | -- | EMULATE | -- | -- | -- | 60 | -3 | 4.60.20 |
| | -1 | -- | -- | EMULATE | -- | -- | -- | 60 | -2 | 4.60.30 |
| | 0 | -- | -- | EMULATE | -- | -- | -- | 60 | -1 | 4.60.40 |
| | +1 | -- | -- | EMULATE | -- | -- | -- | 60 | 0 | 4.60.50 |

FIG. 97

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 31 | -- | -- | -- | REAL BSP | -- | -- | -- | 20 | -- | 4.31.00 |
| 41 | -4 | SBID+EP | -- | REAL BSP | -- | -- | -- | 00 | -- | 4.41.00 |
| | -3 | -- | -- | EMULATE | -- | -- | -- | 41 | -4 | 4.41.10 |
| | -2 | -- | -- | EMULATE | -- | -- | -- | 41 | -3 | 4.41.20 |
| | -1 | -- | -- | EMULATE | -- | -- | -- | 41 | -2 | 4.41.30 |
| | 0 | -- | -- | EMULATE | -- | -- | -- | 41 | -1 | 4.41.40 |
| 51 | -- | -- | -- | REAL BSP | TM | -- | SBID←REAL BID WHEN (SBID)-(REAL BID)=1 | 61 | 0 | 4.51.00 |
| 61 | -4 | SBID+EP | -- | REAL BSP | -- | -- | -- | 00 | -- | 4.61.00 |
| | -3 | -- | -- | EMULATE | -- | -- | -- | 61 | -4 | 4.61.10 |
| | -2 | -- | -- | EMULATE | -- | -- | -- | 61 | -3 | 4.61.20 |
| | -1 | -- | -- | EMULATE | -- | -- | -- | 61 | -2 | 4.61.30 |
| | 0 | -- | -- | EMULATE | -- | -- | -- | 61 | -1 | 4.61.40 |
| | +1 | -- | -- | EMULATE | -- | -- | -- | 61 | 0 | 4.61.50 |

FIG. 98

| PRE - PROCESS | | | | OPERATION | POST - PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 22 | -- | -- | -- | REAL BSP | -- | -- | -- | 10 | -- | 4.22.00 |
| 32 | -- | -- | -- | REAL BSP | -- | -- | -- | 22 | -- | 4.32.00 |
| 42 | -4 | SBID+EP | -- | REAL BSP | -- | -- | -- | 00 | -- | 4.42.00 |
| | -3 | -- | -- | EMULATE | -- | -- | -- | 42 | -4 | 4.42.10 |
| | -2 | -- | -- | EMULATE | -- | -- | -- | 42 | -3 | 4.42.20 |
| | -1 | -- | -- | EMULATE | -- | -- | -- | 42 | -2 | 4.42.30 |
| | 0 | -- | -- | EMULATE | -- | -- | -- | 42 | -1 | 4.42.40 |
| 52 | -- | -- | -- | REAL BSP | TM | -- | SBID←REAL BID WHEN (SBID)-(REAL BID)=1 | 62 | 0 | 4.52.00 |
| 62 | -4 | SBID+EP | -- | REAL BSP | -- | -- | -- | 00 | -- | 4.62.00 |
| | -3 | -- | -- | EMULATE | -- | -- | -- | 62 | -4 | 4.62.10 |
| | -2 | -- | -- | EMULATE | -- | -- | -- | 62 | -3 | 4.62.20 |
| | -1 | -- | -- | EMULATE | -- | -- | -- | 62 | -2 | 4.62.30 |
| | 0 | -- | -- | EMULATE | -- | -- | -- | 62 | -1 | 4.62.40 |
| | +1 | -- | -- | EMULATE | -- | -- | -- | 62 | 0 | 4.62.50 |

FIG. 99

| PRE – PROCESS ||||  OPERATION | POST – PROCESS |||| ES | EP | PROCESS ID |
|---|---|---|---|---|---|---|---|---|---|---|
| ES | EP | RE-POSITION | RESTORE | | BLOCK | SAVE | BID PROCESS | | | |
| 33 | -- | -- | -- | REAL BSP | -- | -- | -- | 22 | -- | 4.33.00 |
| 43 | -4 | SBID+EP | -- | REAL BSP | -- | -- | -- | 00 | -- | 4.43.00 |
| | -3 | -- | -- | EMULATE | -- | -- | -- | 43 | -4 | 4.43.10 |
| | -2 | -- | -- | EMULATE | -- | -- | -- | 43 | -3 | 4.43.20 |
| | -1 | -- | -- | EMULATE | -- | -- | -- | 43 | -2 | 4.43.30 |
| | 0 | -- | -- | EMULATE | -- | -- | -- | 43 | -1 | 4.43.40 |
| 53 | -- | -- | -- | REAL BSP | TM | -- | SBID←REAL BID WHEN (SBID)-(REAL BID)=1 | 63 | 0 | 4.53.00 |
| 63 | -4 | SBID+EP | -- | REAL BSP | -- | -- | -- | 00 | -- | 4.63.00 |
| | -3 | -- | -- | EMULATE | -- | -- | -- | 63 | -4 | 4.63.10 |
| | -2 | -- | -- | EMULATE | -- | -- | -- | 63 | -3 | 4.63.20 |
| | -1 | -- | -- | EMULATE | -- | -- | -- | 63 | -2 | 4.63.30 |
| | 0 | -- | -- | EMULATE | -- | -- | -- | 63 | -1 | 4.63.40 |
| | +1 | -- | -- | EMULATE | -- | -- | -- | 63 | 0 | 4.63.50 |

FIG. 100

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 00 | -- | -- | -- | REAL BSPF | -- | -- | -- | 00 | -- | 5.00.00 |
| 10 | -- | -- | -- | REAL BSPF | -- | -- | -- | 00 | -- | 5.10.00 |
| 20 | -- | -- | -- | REAL BSPF | -- | -- | -- | 00 | -- | 5.20.00 |
| 30 | -- | -- | -- | REAL BSPF | -- | -- | -- | 00 | -- | 5.30.00 |
| 40 | -4 | SBID+EP | -- | REAL BSPF | -- | -- | -- | 00 | -- | 5.40.00 |
| | -3 | -- | -- | EMULATE | -- | -- | -- | 40 | -4 | 5.40.10 |
| | -2 | -- | -- | EMULATE | -- | -- | -- | 40 | -4 | 5.40.20 |
| | -1 | -- | -- | EMULATE | -- | -- | -- | 40 | -4 | 5.40.30 |
| | 0 | -- | -- | EMULATE | -- | -- | -- | 40 | -1 | 5.40.40 |
| 50 | -- | -- | -- | REAL BSPF | TM | -- | SBID←REAL BID WHEN (SBID)-(REAL BID)=1 | 60 | 0 | 5.50.00 |
| 60 | -4 | SBID+EP | -- | REAL BSPF | -- | -- | -- | 00 | -- | 5.60.00 |
| | -3 | -- | -- | EMULATE | -- | -- | -- | 60 | -4 | 5.60.10 |
| | -2 | -- | -- | EMULATE | -- | -- | -- | 60 | -4 | 5.60.20 |
| | -1 | -- | -- | EMULATE | -- | -- | -- | 60 | -4 | 5.60.30 |
| | 0 | -- | -- | EMULATE | -- | -- | -- | 60 | -1 | 5.60.40 |
| | +1 | -- | -- | EMULATE | -- | -- | -- | 60 | 0 | 5.60.50 |

FIG. 101

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 31 | -- | -- | -- | REAL BSPF | -- | -- | -- | 00 | -- | 5.31.00 |
| 41 | -4 | SBID+EP | -- | REAL BSPF | -- | -- | -- | 00 | -- | 5.41.00 |
| | -3 | -- | -- | EMULATE | -- | -- | -- | 41 | -4 | 5.41.10 |
| | -2 | -- | -- | EMULATE | -- | -- | -- | 41 | -4 | 5.41.20 |
| | -1 | -- | -- | EMULATE | -- | -- | -- | 41 | -4 | 5.41.30 |
| | 0 | -- | -- | EMULATE | -- | -- | -- | 41 | -1 | 5.41.40 |
| 51 | -- | -- | -- | REAL BSPF | TM | -- | SBID←REAL BID WHEN (SBID)-(REAL BID)=1 | 61 | 0 | 5.51.00 |
| 61 | -4 | SBID+EP | -- | REAL BSPF | -- | -- | -- | 00 | -- | 5.61.00 |
| | -3 | -- | -- | EMULATE | -- | -- | -- | 61 | -4 | 5.61.10 |
| | -2 | -- | -- | EMULATE | -- | -- | -- | 61 | -4 | 5.61.20 |
| | -1 | -- | -- | EMULATE | -- | -- | -- | 61 | -4 | 5.61.30 |
| | 0 | -- | -- | EMULATE | -- | -- | -- | 61 | -1 | 5.61.40 |
| | +1 | -- | -- | EMULATE | -- | -- | -- | 61 | 0 | 5.61.50 |

FIG. 102

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 22 | -- | -- | -- | REAL BSPF | -- | -- | -- | 00 | -- | 5.22.00 |
| 32 | -- | -- | -- | REAL BSPF | -- | -- | -- | 00 | -- | 5.32.00 |
| 42 | -4 | SBID+EP | -- | REAL BSPF | -- | -- | -- | 00 | -- | 5.42.00 |
| | -3 | -- | -- | EMULATE | -- | -- | -- | 42 | -4 | 5.42.10 |
| | -2 | -- | -- | EMULATE | -- | -- | -- | 42 | -4 | 5.42.20 |
| | -1 | -- | -- | EMULATE | -- | -- | -- | 42 | -4 | 5.42.30 |
| | 0 | -- | -- | EMULATE | -- | -- | -- | 42 | -1 | 5.42.40 |
| 52 | -- | -- | -- | REAL BSPF | TM | -- | SBID←REAL BID WHEN (SBID)-(REAL BID)=1 | 62 | 0 | 5.52.00 |
| 62 | -4 | SBID+EP | -- | REAL BSPF | -- | -- | -- | 00 | -- | 5.62.00 |
| | -3 | -- | -- | EMULATE | -- | -- | -- | 62 | -4 | 5.62.10 |
| | -2 | -- | -- | EMULATE | -- | -- | -- | 62 | -4 | 5.62.20 |
| | -1 | -- | -- | EMULATE | -- | -- | -- | 62 | -4 | 5.62.30 |
| | 0 | -- | -- | EMULATE | -- | -- | -- | 62 | -1 | 5.62.40 |
| | +1 | -- | -- | EMULATE | -- | -- | -- | 62 | 0 | 5.62.50 |

FIG. 103

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 33 | -- | -- | -- | REAL BSPF | -- | -- | -- | 00 | -- | 5.33.00 |
| 43 | -4 | SBID+EP | -- | REAL BSPF | -- | -- | -- | 00 | -- | 5.43.00 |
|  | -3 | -- | -- | EMULATE | -- | -- | -- | 43 | -4 | 5.43.10 |
|  | -2 | -- | -- | EMULATE | -- | -- | -- | 43 | -4 | 5.43.20 |
|  | -1 | -- | -- | EMULATE | -- | -- | -- | 43 | -4 | 5.43.30 |
|  | 0 | -- | -- | EMULATE | -- | -- | -- | 43 | -1 | 5.43.40 |
| 53 | -- | -- | -- | REAL BSPF | TM | -- | SBID←REAL BID WHEN (SBID)-(REAL BID)=1 | 63 | 0 | 5.53.00 |
| 63 | -4 | SBID+EP | -- | REAL BSPF | -- | -- | -- | 00 | -- | 5.63.00 |
|  | -3 | -- | -- | EMULATE | -- | -- | -- | 63 | -4 | 5.63.10 |
|  | -2 | -- | -- | EMULATE | -- | -- | -- | 63 | -4 | 5.63.20 |
|  | -1 | -- | -- | EMULATE | -- | -- | -- | 63 | -4 | 5.63.30 |
|  | 0 | -- | -- | EMULATE | -- | -- | -- | 63 | -1 | 5.63.40 |
|  | +1 | -- | -- | EMULATE | -- | -- | -- | 63 | 0 | 5.63.50 |

FIG. 104

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 00 | -- | -- | -- | REAL SP | TM | -- | SBID←REAL BID | 10 | -- | 6.00.00 |
| | | | | | OTHERS | -- | -- | 00 | -- | 6.00.01 |
| 10 | -- | -- | -- | REAL SP | EOF | -- | -- | 22 | -- | 6.10.00 |
| | | | | | TM | -- | SBID←REAL BID | 10 | -- | 6.10.01 |
| | | | | | OTHERS | -- | -- | 00 | -- | 6.10.02 |
| 20 | -- | -- | -- | REAL SP | EOF | -- | -- | 31 | -- | 6.20.00 |
| | | | -- | | TM | -- | SBID←REAL BID | 10 | -- | 6.20.01 |
| | | | -- | | OTHERS | -- | -- | 00 | -- | 6.20.02 |
| 30 | -- | -- | -- | REAL SP | TM | -- | SBID←REAL BID WHEN (REAL BID)−(SBID)=3 | 40 | 0 | 6.30.00 |
| | | | -- | | OTHERS | -- | -- | 00 | -- | 6.30.01 |
| 40 | −4 | -- | -- | EMULATE | -- | -- | -- | 40 | −3 | 6.40.00 |
| | −3 | -- | -- | EMULATE | -- | -- | -- | 40 | −2 | 6.40.10 |
| | −2 | -- | -- | EMULATE | -- | -- | -- | 40 | −1 | 6.40.20 |
| | −1 | -- | -- | EMULATE | -- | -- | -- | 40 | 0 | 6.40.30 |
| | 0 | -- | -- | REAL SP | EOF | -- | -- | 22 | -- | 6.40.40 |
| | | | | | TM | -- | SBID←REAL BID WHEN (REAL BID)−(SBID)=1 | 50 | -- | 6.40.41 |
| | | | -- | | OTHERS | -- | -- | 00 | -- | 6.40.42 |
| 50 | -- | -- | -- | REAL SP | EOF | -- | -- | 22 | -- | 6.50.00 |
| | | | -- | | TM | -- | SBID←REAL BID | 10 | -- | 6.50.01 |
| | | | -- | | OTHERS | -- | -- | 00 | -- | 6.50.02 |
| 60 | −4 | -- | -- | EMULATE | -- | -- | -- | 60 | −3 | 6.60.00 |
| | −3 | -- | -- | EMULATE | -- | -- | -- | 60 | −2 | 6.60.10 |
| | −2 | -- | -- | EMULATE | -- | -- | -- | 60 | −1 | 6.60.20 |
| | −1 | -- | -- | EMULATE | -- | -- | -- | 60 | 0 | 6.60.30 |
| | 0 | -- | -- | EMULATE | -- | -- | -- | 60 | +1 | 6.60.40 |
| | +1 | SBID+EP | -- | REAL SP | EOF | -- | SBID+1 | 22 | -- | 6.60.50 |
| | | | | | TM | -- | SBID←REAL BID | 10 | -- | 6.60.51 |
| | | | | | OTHERS | -- | -- | 00 | -- | 6.60.52 |

FIG. 105

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 31 | -- | -- | -- | REAL SP | TM | -- | SBID←REAL BID WHEN (REAL BID)-(SBID)=3 | 41 | 0 | 6.31.00 |
| | | | | | OTHERS | -- | -- | 00 | -- | 6.31.01 |
| 41 | -4 | -- | -- | EMULATE | -- | -- | -- | 41 | -3 | 6.41.00 |
| | -3 | -- | -- | EMULATE | -- | -- | -- | 41 | -2 | 6.41.10 |
| | -2 | -- | -- | EMULATE | -- | -- | -- | 41 | -1 | 6.41.20 |
| | -1 | -- | -- | EMULATE | -- | -- | -- | 41 | 0 | 6.41.30 |
| | 0 | -- | -- | REAL SP | EOF | -- | -- | 22 | -- | 6.41.40 |
| | | | | | TM | -- | SBID←REAL BID WHEN (REAL BID)-(SBID)=1 | 51 | -- | 6.41.41 |
| | | | | | OTHERS | -- | -- | 00 | -- | 6.41.42 |
| 51 | -- | -- | -- | REAL SP | EOF | -- | -- | 22 | -- | 6.51.00 |
| | | | | | TM | -- | SBID←REAL BID | 10 | -- | 6.51.01 |
| | | | | | OTHERS | -- | -- | 00 | -- | 6.51.02 |
| 61 | -4 | -- | -- | EMULATE | -- | -- | -- | 61 | -3 | 6.61.00 |
| | -3 | -- | -- | EMULATE | -- | -- | -- | 61 | -2 | 6.61.10 |
| | -2 | -- | -- | EMULATE | -- | -- | -- | 61 | -1 | 6.61.20 |
| | -1 | -- | -- | EMULATE | -- | -- | -- | 61 | 0 | 6.61.30 |
| | 0 | -- | -- | EMULATE | -- | -- | -- | 61 | +1 | 6.61.40 |
| | +1 | SBID+EP | -- | REAL SP | EOF | -- | SBID+1 | 22 | -- | 6.61.50 |
| | | | | | TM | -- | SBID←REAL BID | 10 | -- | 6.61.51 |
| | | | | | OTHERS | -- | -- | 00 | -- | 6.61.52 |

FIG. 106

| PRE – PROCESS | | | | OPERATION | POST – PROCESS | | | ES | EP | PROCESS ID |
|---|---|---|---|---|---|---|---|---|---|---|
| ES | EP | RE-POSITION | RESTORE | | BLOCK | SAVE | BID PROCESS | | | |
| 22 | -- | -- | -- | REAL SP | EOF | -- | -- | 33 | -- | 6.22.00 |
| | | | | | TM | -- | SBID←REAL BID | 10 | -- | 6.22.01 |
| | | | | | OTHERS | -- | -- | 00 | -- | 6.22.02 |
| 32 | -- | -- | -- | REAL SP | TM | -- | SBID←REAL BID WHEN (REAL BID)-(SBID)=3 | 42 | 0 | 6.32.00 |
| | | | | | OTHERS | -- | -- | 00 | -- | 6.32.01 |
| 42 | -4 | -- | -- | EMULATE | -- | -- | -- | 42 | -3 | 6.42.00 |
| | -3 | -- | -- | EMULATE | -- | -- | -- | 42 | -2 | 6.42.10 |
| | -2 | -- | -- | EMULATE | -- | -- | -- | 42 | -1 | 6.42.20 |
| | -1 | -- | -- | EMULATE | -- | -- | -- | 42 | 0 | 6.42.30 |
| | 0 | -- | -- | REAL SP | EOF | -- | -- | 22 | -- | 6.42.40 |
| | | | | | TM | -- | SBID←REAL BID WHEN (REAL BID)-(SBID)=1 | 52 | -- | 6.42.41 |
| | | | | | OTHERS | -- | -- | 00 | -- | 6.42.42 |
| 52 | -- | -- | -- | REAL SP | EOF | -- | -- | 22 | -- | 6.52.00 |
| | | | | | TM | -- | SBID←REAL BID | 10 | -- | 6.52.01 |
| | | | | | OTHERS | -- | -- | 00 | -- | 6.52.02 |
| 62 | -4 | -- | -- | EMULATE | -- | -- | -- | 62 | -3 | 6.62.00 |
| | -3 | -- | -- | EMULATE | -- | -- | -- | 62 | -2 | 6.62.10 |
| | -2 | -- | -- | EMULATE | -- | -- | -- | 62 | -1 | 6.62.20 |
| | -1 | -- | -- | EMULATE | -- | -- | -- | 62 | 0 | 6.62.30 |
| | 0 | -- | -- | EMULATE | -- | -- | -- | 62 | +1 | 6.62.40 |
| | +1 | SBID+EP | -- | REAL SP | EOF | -- | SBID+1 | 22 | -- | 6.62.50 |
| | | | | | TM | -- | SBID←REAL BID | 10 | -- | 6.62.51 |
| | | | | | OTHERS | -- | -- | 00 | -- | 6.62.52 |

FIG. 107

| PRE – PROCESS | | | OPERATION | POST – PROCESS | | | | | PROCESS ID |
|---|---|---|---|---|---|---|---|---|---|
| ES | EP | RE-POSITION | RESTORE | | BLOCK | SAVE | BID PROCESS | ES | EP | |
| 33 | -- | -- | -- | REAL SP | TM | -- | SBID←REAL BID WHEN (REAL BID)-(SBID)=3 | 43 | 0 | 6.33.00 |
| | | | | | OTHERS | -- | -- | 00 | -- | 6.33.01 |
| 43 | -4 | -- | -- | EMULATE | -- | -- | -- | 43 | -3 | 6.43.00 |
| | -3 | -- | -- | EMULATE | -- | -- | -- | 43 | -2 | 6.43.10 |
| | -2 | -- | -- | EMULATE | -- | -- | -- | 43 | -1 | 6.43.20 |
| | -1 | -- | -- | EMULATE | -- | -- | -- | 43 | 0 | 6.43.30 |
| | 0 | -- | -- | REAL SP | EOF | -- | -- | 22 | -- | 6.43.40 |
| | | | | | TM | -- | SBID←REAL BID WHEN (REAL BID)-(SBID)=1 | 53 | -- | 6.43.41 |
| | | | | | OTHERS | -- | -- | 00 | -- | 6.43.42 |
| 53 | -- | -- | -- | REAL SP | EOF | -- | -- | 22 | -- | 6.53.00 |
| | | | | | TM | -- | SBID←REAL BID | 10 | -- | 6.53.01 |
| | | | | | OTHERS | -- | -- | 00 | -- | 6.53.02 |
| 63 | -4 | -- | -- | EMULATE | -- | -- | -- | 63 | -3 | 6.63.00 |
| | -3 | -- | -- | EMULATE | -- | -- | -- | 63 | -2 | 6.63.10 |
| | -2 | -- | -- | EMULATE | -- | -- | -- | 63 | -1 | 6.63.20 |
| | -1 | -- | -- | EMULATE | -- | -- | -- | 63 | 0 | 6.63.30 |
| | 0 | -- | -- | EMULATE | -- | -- | -- | 63 | +1 | 6.63.40 |
| | +1 | SBID+EP | -- | REAL SP | EOF | -- | SBID+1 | 22 | -- | 6.63.50 |
| | | | | | TM | -- | SBID←REAL BID | 10 | -- | 6.63.51 |
| | | | | | OTHERS | -- | -- | 00 | -- | 6.63.52 |

FIG. 108

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 00 | -- | -- | -- | REAL FSPF | TM | -- | SBID←REAL BID | 10 | -- | 7.00.00 |
| | | | | | OTHERS | -- | -- | 00 | -- | 7.00.01 |
| 10 | -- | -- | -- | REAL FSPF | TM | -- | SBID←REAL BID WHEN (REAL BID)-(SBID)=3 | 43 | 0 | 7.10.00 |
| | | | | | | -- | SBID←REAL BID WHEN (REAL BID)-(SBID)≠3 | 10 | -- | 7.10.01 |
| | | | | | OTHERS | -- | -- | 00 | -- | 7.10.02 |
| 20 | -- | -- | -- | REAL FSPF | TM | -- | SBID←REAL BID WHEN (REAL BID)-(SBID)=3 | 41 | 0 | 7.20.00 |
| | | | | | | -- | SBID←REAL BID WHEN (REAL BID)-(SBID)≠3 | 10 | -- | 7.20.01 |
| | | | | | OTHERS | -- | -- | 00 | -- | 7.20.02 |
| 30 | -- | -- | -- | REAL FSPF | TM | -- | SBID←REAL BID WHEN (REAL BID)-(SBID)=3 | 40 | 0 | 7.30.00 |
| | | | | | | -- | SBID←REAL BID WHEN (REAL BID)-(SBID)≠3 | 10 | -- | 7.30.01 |
| | | | | | OTHERS | -- | -- | 00 | -- | 7.30.02 |
| 40 | -4 | -- | -- | EMULATE | -- | -- | -- | 40 | -3 | 7.40.00 |
| | -3 | -- | -- | EMULATE | -- | -- | -- | 40 | 0 | 7.40.10 |
| | -2 | -- | -- | EMULATE | -- | -- | -- | 40 | 0 | 7.40.20 |
| | -1 | -- | -- | EMULATE | -- | -- | -- | 40 | 0 | 7.40.30 |
| | 0 | -- | -- | REAL FSPF | TM | -- | SBID←REAL BID WHEN (REAL BID)-(SBID)=3 | 43 | 0 | 7.40.40 |
| | | | | | | -- | SBID←REAL BID WHEN (REAL BID)-(SBID)=1 | 50 | -- | 7.40.41 |
| | | | | | | -- | SBID←REAL BID WHEN (REAL BID)-(SBID)≠1AND3 | 10 | -- | 7.40.42 |
| | | | | | OTHERS | -- | | 00 | -- | 7.40.43 |
| 50 | -- | -- | -- | REAL FSPF | TM | -- | SBID←REAL BID WHEN (REAL BID)-(SBID)=3 | 43 | 0 | 7.50.00 |
| | | | | | | -- | SBID←REAL BID WHEN (REAL BID)-(SBID)≠3 | 10 | -- | 7.50.01 |
| | | | | | OTHERS | -- | -- | 00 | -- | 7.50.02 |
| 60 | -4 | -- | -- | EMULATE | -- | -- | -- | 60 | -3 | 7.60.00 |
| | -3 | -- | -- | EMULATE | -- | -- | -- | 60 | 0 | 7.60.10 |
| | -2 | -- | -- | EMULATE | -- | -- | -- | 60 | 0 | 7.60.20 |
| | -1 | -- | -- | EMULATE | -- | -- | -- | 60 | 0 | 7.60.30 |
| | 0 | -- | -- | EMULATE | -- | -- | -- | 60 | +1 | 7.60.40 |
| | +1 | SBID+EP | -- | REAL FSPF | TM | -- | SBID←REAL BID WHEN (REAL BID)-(SBID)=3 | 43 | 0 | 7.60.50 |
| | | | | | | -- | SBID←REAL BID WHEN (REAL BID)-(SBID)≠3 | 10 | -- | 7.60.51 |
| | | | | | OTHERS | -- | -- | 00 | -- | 7.60.52 |

FIG. 109

| PRE – PROCESS | | | OPERATION | POST – PROCESS | | | | | PROCESS ID |
|---|---|---|---|---|---|---|---|---|---|
| ES | EP | RE-POSITION | RESTORE | | BLOCK | SAVE | BID PROCESS | ES | EP | |
| 31 | -- | -- | -- | REAL FSPF | TM | -- | SBID←REAL BID WHEN (REAL BID)−(SBID)=3 | 41 | 0 | 7.31.00 |
|  |  |  |  |  |  | -- | SBID←REAL BID WHEN (REAL BID)−(SBID)≠3 | 10 | -- | 7.31.01 |
|  |  |  |  |  | OTHERS | -- | -- | 00 | -- | 7.31.02 |
| 41 | -4 | -- | -- | EMULATE | -- | -- | -- | 41 | -3 | 7.41.00 |
|  | -3 | -- | -- | EMULATE | -- | -- | -- | 41 | 0 | 7.41.10 |
|  | -2 | -- | -- | EMULATE | -- | -- | -- | 41 | 0 | 7.41.20 |
|  | -1 | -- | -- | EMULATE | -- | -- | -- | 41 | 0 | 7.41.30 |
|  | 0 | -- | -- | REAL FSPF | TM | -- | SBID←REAL BID WHEN (REAL BID)−(SBID)=3 | 43 | 0 | 7.41.40 |
|  |  |  |  |  |  | -- | SBID←REAL BID WHEN (REAL BID)−(SBID)=1 | 51 | -- | 7.41.41 |
|  |  |  |  |  |  | -- | SBID←REAL BID WHEN (REAL BID)−(SBID)≠1AND3 | 10 | -- | 7.41.42 |
|  |  |  |  |  | OTHERS | -- | -- | 00 | -- | 7.41.43 |
| 51 | -- | -- | -- | REAL FSPF | TM | -- | SBID←REAL BID WHEN (REAL BID)−(SBID)=3 | 43 | 0 | 7.51.00 |
|  |  |  |  |  |  | -- | SBID←REAL BID WHEN (REAL BID)−(SBID)≠3 | 10 | -- | 7.51.01 |
|  |  |  |  |  | OTHERS | -- | -- | 00 | -- | 7.51.02 |
| 61 | -4 | -- | -- | EMULATE | -- | -- | -- | 61 | -3 | 7.61.00 |
|  | -3 | -- | -- | EMULATE | -- | -- | -- | 61 | 0 | 7.61.10 |
|  | -2 | -- | -- | EMULATE | -- | -- | -- | 61 | 0 | 7.61.20 |
|  | -1 | -- | -- | EMULATE | -- | -- | -- | 61 | 0 | 7.61.30 |
|  | 0 | -- | -- | EMULATE | -- | -- | -- | 61 | +1 | 7.61.40 |
|  | +1 | SBID+EP | -- | REAL FSPF | TM | -- | SBID←REAL BID WHEN (REAL BID)−(SBID)=3 | 43 | 0 | 7.61.50 |
|  |  |  |  |  |  | -- | SBID←REAL BID WHEN (REAL BID)−(SBID)≠3 | 10 | -- | 7.61.51 |
|  |  |  |  |  | OTHERS | -- | -- | 00 | -- | 7.61.52 |

FIG. 110

| PRE - PROCESS | | | | OPERATION | POST - PROCESS | | | ES | EP | PROCESS ID |
|---|---|---|---|---|---|---|---|---|---|---|
| ES | EP | RE-POSITION | RESTORE | | BLOCK | SAVE | BID PROCESS | | | |
| 22 | -- | -- | -- | REAL FSPF | TM | -- | SBID←REAL BID WHEN (REAL BID)-(SBID)=3 | 43 | 0 | 7.22.00 |
| | | | | | | -- | SBID←REAL BID WHEN (REAL BID)-(SBID)≠3 | 10 | -- | 7.22.01 |
| | | | | | OTHERS | -- | -- | 00 | -- | 7.22.02 |
| 32 | -- | -- | -- | REAL FSPF | TM | -- | SBID←REAL BID WHEN (REAL BID)-(SBID)=3 | 42 | 0 | 7.32.00 |
| | | | | | | -- | SBID←REAL BID WHEN (REAL BID)-(SBID)≠3 | 10 | -- | 7.32.01 |
| | | | | | OTHERS | -- | -- | 00 | -- | 7.32.02 |
| 42 | -4 | -- | -- | EMULATE | -- | -- | -- | 42 | -3 | 7.42.00 |
| | -3 | -- | -- | EMULATE | -- | -- | -- | 42 | 0 | 7.42.10 |
| | -2 | -- | -- | EMULATE | -- | -- | -- | 42 | 0 | 7.42.20 |
| | -1 | -- | -- | EMULATE | -- | -- | -- | 42 | 0 | 7.42.30 |
| | 0 | -- | -- | REAL FSPF | TM | -- | SBID←REAL BID WHEN (REAL BID)-(SBID)=3 | 43 | 0 | 7.42.40 |
| | | | | | | -- | SBID←REAL BID WHEN (REAL BID)-(SBID)=1 | 52 | -- | 7.42.41 |
| | | | | | | -- | SBID←REAL BID WHEN (REAL BID)-(SBID)≠1AND3 | 10 | -- | 7.42.42 |
| | | | | | OTHERS | -- | -- | 00 | -- | 7.42.43 |
| 52 | -- | -- | -- | REAL FSPF | TM | -- | SBID←REAL BID WHEN (REAL BID)-(SBID)=3 | 43 | 0 | 7.52.00 |
| | | | | | | -- | SBID←REAL BID WHEN (REAL BID)-(SBID)≠3 | 10 | -- | 7.52.01 |
| | | | | | OTHERS | -- | -- | 00 | -- | 7.52.02 |
| 62 | -4 | -- | -- | EMULATE | -- | -- | -- | 62 | -3 | 7.62.00 |
| | -3 | -- | -- | EMULATE | -- | -- | -- | 62 | 0 | 7.62.10 |
| | -2 | -- | -- | EMULATE | -- | -- | -- | 62 | 0 | 7.62.20 |
| | -1 | -- | -- | EMULATE | -- | -- | -- | 62 | 0 | 7.62.30 |
| | 0 | -- | -- | EMULATE | -- | -- | -- | 62 | +1 | 7.62.40 |
| | +1 | SBID+EP | -- | REAL FSPF | TM | -- | SBID←REAL BID WHEN (REAL BID)-(SBID)=3 | 43 | 0 | 7.62.50 |
| | | | | | | -- | SBID←REAL BID WHEN (REAL BID)-(SBID)≠3 | 10 | -- | 7.62.51 |
| | | | | | OTHERS | -- | -- | 00 | -- | 7.62.52 |

FIG. 111

| PRE - PROCESS | | | | OPERATION | POST - PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 33 | -- | -- | -- | REAL FSPF | TM | -- | SBID←REAL BID WHEN (REAL BID)-(SBID)=3 | 43 | 0 | 7.33.00 |
| | | | | | | -- | SBID←REAL BID WHEN (REAL BID)-(SBID)≠3 | 10 | -- | 7.33.01 |
| | | | | | OTHERS | -- | -- | 00 | -- | 7.33.02 |
| 43 | -4 | -- | -- | EMULATE | -- | -- | -- | 43 | -3 | 7.43.00 |
| | -3 | -- | -- | EMULATE | -- | -- | -- | 43 | 0 | 7.43.10 |
| | -2 | -- | -- | EMULATE | -- | -- | -- | 43 | 0 | 7.43.20 |
| | -1 | -- | -- | EMULATE | -- | -- | -- | 43 | 0 | 7.43.30 |
| | 0 | -- | -- | REAL FSPF | TM | -- | SBID←REAL BID WHEN (REAL BID)-(SBID)=3 | 43 | 0 | 7.43.40 |
| | | | | | | -- | SBID←REAL BID WHEN (REAL BID)-(SBID)=1 | 53 | -- | 7.43.41 |
| | | | | | | -- | SBID←REAL BID WHEN (REAL BID)-(SBID)≠1AND3 | 10 | -- | 7.43.42 |
| | | | | | OTHERS | -- | -- | 00 | -- | 7.43.43 |
| 53 | -- | -- | -- | REAL FSPF | TM | -- | SBID←REAL BID WHEN (REAL BID)-(SBID)=3 | 43 | 0 | 7.53.00 |
| | | | | | | -- | SBID←REAL BID WHEN (REAL BID)-(SBID)≠3 | 10 | -- | 7.53.01 |
| | | | | | OTHERS | -- | -- | 00 | -- | 7.53.02 |
| 63 | -4 | -- | -- | EMULATE | -- | -- | -- | 63 | -3 | 7.63.00 |
| | -3 | -- | -- | EMULATE | -- | -- | -- | 63 | 0 | 7.63.10 |
| | -2 | -- | -- | EMULATE | -- | -- | -- | 63 | 0 | 7.63.20 |
| | -1 | -- | -- | EMULATE | -- | -- | -- | 63 | 0 | 7.63.30 |
| | 0 | -- | -- | EMULATE | -- | -- | -- | 63 | +1 | 7.63.40 |
| | +1 | SBID+EP | -- | REAL FSPF | TM | -- | SBID←REAL BID WHEN (REAL BID)-(SBID)=3 | 43 | 0 | 7.63.50 |
| | | | | | | -- | SBID←REAL BID WHEN (REAL BID)-(SBID)≠3 | 10 | -- | 7.63.51 |
| | | | | | OTHERS | -- | -- | 00 | -- | 7.63.52 |

FIG. 112

| PRE - PROCESS | | | | OPERATION | POST - PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 00 | -- | -- | -- | REAL WTM | -- | -- | SBID←REAL BID | 10 | -- | 8.00.00 |
| 10 | -- | -- | -- | REAL WTM | -- | -- | SBID←REAL BID | 10 | -- | 8.10.00 |
| 20 | -- | -- | -- | REAL WTM | -- | -- | SBID←REAL BID | 10 | -- | 8.20.00 |
| 30 | -- | -- | -- | REAL WTM | -- | -- | SBID←REAL BID WHEN (REAL BID)−(SBID)=3 | 40 | 0 | 8.30.00 |
| 40 | −4 | SBID+EP | -- | REAL WTM | -- | -- | | 10 | -- | 8.40.00 |
| | −3 | SBID+EP | -- | REAL WTM | -- | -- | SBID←REAL BID | 10 | -- | 8.40.10 |
| | −2 | SBID+EP | -- | REAL WTM | -- | -- | SBID←REAL BID | 10 | -- | 8.40.20 |
| | −1 | -- | -- | EMULATE | -- | -- | -- | 40 | 0 | 8.40.30 |
| | 0 | -- | -- | REAL WTM | -- | -- | SBID←REAL BID WHEN (REAL BID)−(SBID)=1 | 50 | -- | 8.40.40 |
| 50 | -- | -- | -- | REAL WTM | -- | -- | SBID←REAL BID | 10 | -- | 8.50.00 |
| 60 | −4 | SBID+EP | -- | REAL WTM | -- | -- | SBID←REAL BID | 10 | -- | 8.60.00 |
| | −3 | SBID+EP | -- | REAL WTM | -- | -- | SBID←REAL BID | 10 | -- | 8.60.10 |
| | −2 | SBID+EP | -- | REAL WTM | -- | -- | SBID←REAL BID | 10 | -- | 8.60.20 |
| | −1 | SBID+EP | -- | REAL WTM | -- | -- | SBID←REAL BID | 10 | -- | 8.60.30 |
| | 0 | -- | -- | EMULATE | -- | -- | -- | 60 | +1 | 8.60.40 |
| | +1 | SBID+EP | -- | REAL WTM | -- | -- | SBID←REAL BID | 10 | -- | 8.60.50 |

FIG. 113

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 31 | -- | -- | -- | REAL WTM | -- | -- | SBID←REAL BID WHEN (REAL BID)-(SBID)=3 | 41 | 0 | 8.31.00 |
| 41 | -4 | SBID+EP | -- | REAL WTM | -- | -- | SBID←REAL BID | 10 | -- | 8.41.00 |
| | -3 | SBID+EP | -- | REAL WTM | -- | -- | SBID←REAL BID | 10 | -- | 8.41.10 |
| | -2 | SBID+EP | -- | REAL WTM | -- | -- | SBID←REAL BID | 10 | -- | 8.41.20 |
| | -1 | -- | -- | EMULATE | -- | -- | -- | 41 | 0 | 8.41.30 |
| | 0 | -- | -- | REAL WTM | -- | -- | SBID←REAL BID WHEN (REAL BID)-(SBID)=1 | 51 | -- | 8.41.40 |
| 51 | -- | -- | -- | REAL WTM | -- | -- | SBID←REAL BID | 10 | -- | 8.51.00 |
| 61 | -4 | SBID+EP | -- | REAL WTM | -- | -- | SBID←REAL BID | 10 | -- | 8.61.00 |
| | -3 | SBID+EP | -- | REAL WTM | -- | -- | SBID←REAL BID | 10 | -- | 8.61.10 |
| | -2 | SBID+EP | -- | REAL WTM | -- | -- | SBID←REAL BID | 10 | -- | 8.61.20 |
| | -1 | SBID+EP | -- | REAL WTM | -- | -- | SBID←REAL BID | 10 | -- | 8.61.30 |
| | 0 | -- | -- | EMULATE | -- | -- | -- | 61 | +1 | 8.61.40 |
| | +1 | SBID+EP | -- | REAL WTM | -- | -- | SBID←REAL BID | 10 | -- | 8.61.50 |

FIG. 114

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 22 | -- | -- | -- | REAL WTM | -- | -- | SBID←REAL BID | 10 | -- | 8.22.00 |
| 32 | -- | -- | -- | REAL WTM | -- | -- | SBID←REAL BID WHEN (REAL BID)-(SBID)=3 | 42 | 0 | 8.32.00 |
| 42 | -4 | SBID+EP | -- | REAL WTM | -- | -- | SBID←REAL BID | 10 | -- | 8.42.00 |
| | -3 | SBID+EP | -- | REAL WTM | -- | -- | SBID←REAL BID | 10 | -- | 8.42.10 |
| | -2 | SBID+EP | -- | REAL WTM | -- | -- | SBID←REAL BID | 10 | -- | 8.42.20 |
| | -1 | -- | -- | EMULATE | -- | -- | -- | 42 | 0 | 8.42.30 |
| | 0 | -- | -- | REAL WTM | -- | -- | SBID←REAL BID WHEN (REAL BID)-(SBID)=1 | 52 | -- | 8.42.40 |
| 52 | -- | -- | -- | REAL WTM | -- | -- | SBID←REAL BID | 10 | -- | 8.52.00 |
| 62 | -4 | SBID+EP | -- | REAL WTM | -- | -- | SBID←REAL BID | 10 | -- | 8.62.00 |
| | -3 | SBID+EP | -- | REAL WTM | -- | -- | SBID←REAL BID | 10 | -- | 8.62.10 |
| | -2 | SBID+EP | -- | REAL WTM | -- | -- | SBID←REAL BID | 10 | -- | 8.62.20 |
| | -1 | SBID+EP | -- | REAL WTM | -- | -- | SBID←REAL BID | 10 | -- | 8.62.30 |
| | 0 | -- | -- | EMULATE | -- | -- | -- | 62 | +1 | 8.62.40 |
| | +1 | SBID+EP | -- | REAL WTM | -- | -- | SBID←REAL BID | 10 | -- | 8.62.50 |

FIG. 115

| PRE – PROCESS | | | OPERATION | POST – PROCESS | | | | | PROCESS ID |
|---|---|---|---|---|---|---|---|---|---|
| ES | EP | RE-POSITION | RESTORE | | BLOCK | SAVE | BID PROCESS | ES | EP | |
| 33 | -- | -- | -- | REAL WTM | -- | -- | SBID←REAL BID WHEN (REAL BID)-(SBID)=3 | 42 | 0 | 8.33.00 |
| 43 | -4 | SBID+EP | -- | REAL WTM | -- | -- | SBID←REAL BID | 10 | -- | 8.43.00 |
| | -3 | SBID+EP | -- | REAL WTM | -- | -- | SBID←REAL BID | 10 | -- | 8.43.10 |
| | -2 | SBID+EP | -- | REAL WTM | -- | -- | SBID←REAL BID | 10 | -- | 8.43.20 |
| | -1 | -- | -- | EMULATE | -- | -- | -- | 43 | 0 | 8.43.30 |
| | 0 | -- | -- | REAL WTM | -- | -- | SBID←REAL BID WHEN (REAL BID)-(SBID)=1 | 53 | -- | 8.43.40 |
| 53 | -- | -- | -- | REAL WTM | -- | -- | SBID←REAL BID | 10 | -- | 8.53.00 |
| 63 | -4 | SBID+EP | -- | REAL WTM | -- | -- | SBID←REAL BID | 10 | -- | 8.63.00 |
| | -3 | SBID+EP | -- | REAL WTM | -- | -- | SBID←REAL BID | 10 | -- | 8.63.10 |
| | -2 | SBID+EP | -- | REAL WTM | -- | -- | SBID←REAL BID | 10 | -- | 8.63.20 |
| | -1 | SBID+EP | -- | REAL WTM | -- | -- | SBID←REAL BID | 10 | -- | 8.63.30 |
| | 0 | -- | -- | EMULATE | -- | -- | -- | 63 | +1 | 8.63.40 |
| | +1 | SBID+EP | -- | REAL WTM | -- | -- | SBID←REAL BID | 10 | -- | 8.63.50 |

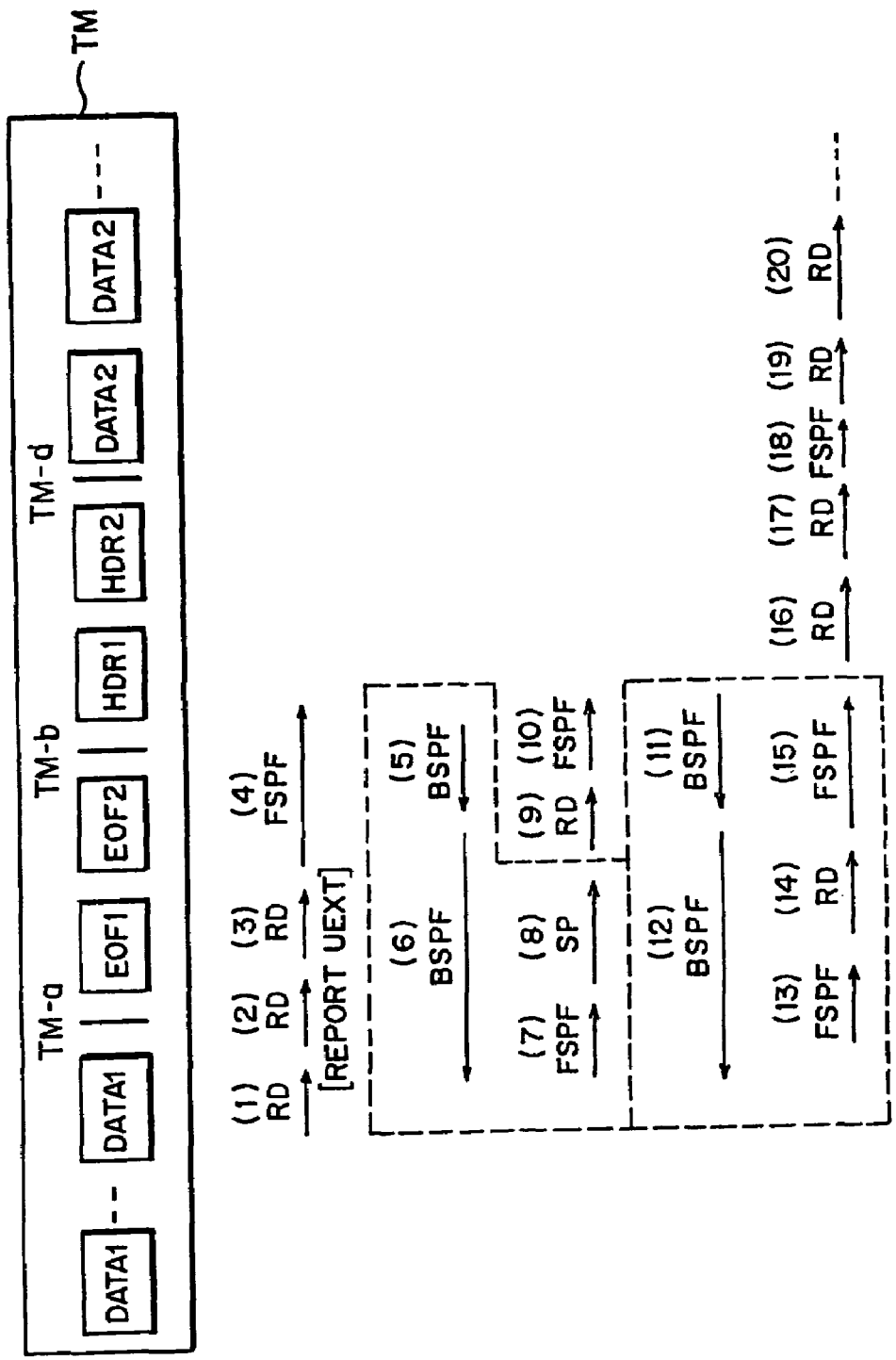

FIG.173

| COMMAND | WITHOUT EMULATION | WITH EMULATION | REMARKS |
|---|---|---|---|
| RD | 0.001561 | 0.001561 | (1) |
| FSPF | 0.453726 | 0.453726 | (2) |
| FSPF | 0.453545 | 0.453545 | (3) |
| NOP | 0.293952 | 0.293952 | |
| LDSP | 0.000525 | 0.000525 | |
| LDSP | 0.000456 | 0.000456 | |
| LDSP | 0.000492 | 0.000492 | |
| NOP | 0.000498 | 0.000498 | |
| SNIO | 0.002933 | 0.002933 | |
| RDVC | 0.000591 | 0.000591 | |
| NOP | 0.000495 | 0.000495 | |
| SNS | 0.002706 | 0.002706 | |
| LDSP | 0.000425 | 0.000425 | |
| BSPF | 0.000581 | 0.000500 | (4) |
| BSPF | 0.457145 | 0.000500 | (5) |
| FSPF | 0.290540 | 0.000500 | (6) |
| RD | 0.531764 | 0.531764 | (7) |
| FSPF | 1.409729 | 1.409729 | (8) |
| RD | 0.369065 | 0.369065 | (9) |
| RD | 0.003179 | 0.003179 | (10) |
| FSPF | 0.657888 | 0.657888 | (11) |
| NOP | 0.454188 | 0.454188 | |
| RD | 0.127053 | 0.127053 | (12) |
| RD | 0.001793 | 0.001793 | (13) |
| TOTAL | 5.514830 | 4.768064 | SECOND |

FIG.174

| COMMAND | WITHOUT EMULATION | WITH EMULATION | REMARKS |
|---|---|---|---|
| RD | 0.001500 | 0.001500 | (1) |
| RD | 0.581100 | 0.581100 | (2) |
| RD | 0.531700 | 0.531700 | (3) |
| FSPF | 1.409700 | 1.409700 | (4) |
| BSPF | 0.000500 | 0.000500 | (5) |
| BSPF | 0.457100 | 0.000500 | (6) |
| FSPF | 0.290900 | 0.000500 | (7) |
| SP | 0.531400 | 0.000500 | (8) |
| RD | 0.531400 | 0.531400 | (9) |
| FSPF | 0.141400 | 0.141400 | (10) |
| LDSP | 0.000500 | 0.000500 | |
| LDSP | 0.000500 | 0.000500 | |
| NOP | 0.000500 | 0.000500 | |
| LDSP | 0.000500 | 0.000500 | |
| BSPF | 0.000500 | 0.000500 | (11) |
| BSPF | 0.457100 | 0.000500 | (12) |
| FSPF | 0.290500 | 0.000500 | (13) |
| RD | 0.531700 | 0.000500 | (14) |
| FSPF | 1.409700 | 0.000500 | (15) |
| RD | 0.369000 | 0.369000 | (16) |
| RD | 0.003100 | 0.003100 | (17) |
| LDSP | 0.000500 | 0.000500 | |
| FSPF | 0.657800 | 0.657800 | (18) |
| NOP | 0.454100 | 0.454100 | |
| LDSP | 0.000500 | 0.000500 | |
| RD | 0.127000 | 0.127000 | (19) |
| RD | 0.001700 | 0.001700 | (20) |
| TOTAL | 8.781900 | 4.817000 | SECOND |

| PROCESS A1 | | PROCESS B1 | | | | PROCESS C1 |
|---|---|---|---|---|---|---|
| OPERATION | UPDATE XBID | CONDITIONS | TM FLAG | BLEN | BID | |
| REAL READ | XBID + 1 | TM | 1 | 0 | XBID | REGISTER BID IN FQL<br>REGISTER BPNT IN FQL<br>REGISTER BLEN IN FQL<br>REGISTER TM FLAG IN FQL<br>UPDATE FQP POINTER<br>BPNT ← BPNT + BLEN |
| | | OTHERS | 0 | LEN | | |

| PROCESS A2 | | PROCESS B2 | | | | PROCESS C2 |
|---|---|---|---|---|---|---|
| OPERATION | UPDATE XBID | CONDITIONS | TM FLAG | BLEN | BID | |
| REAL READ BACKWARD | XBID - 1 | TM | 1 | 0 | XBID | REGISTER BID IN FQL REGISTER BPNT IN FQL REGISTER BLEN IN FQL REGISTER TM FLAG IN FQL UPDATE FQP POINTER BPNT ← BPNT + BLEN |
| | | OTHERS | 0 | LEN | | |

| PROCESS A3 | | PROCESS B3 | | | | PROCESS C3 |
|---|---|---|---|---|---|---|
| OPERATION | UPDATE XBID | CONDITIONS | TM FLAG | BLEN | BID | |
| REAL WRITE | XBID + 1 | -- | -- | LEN | XBID | REGISTER BID IN FQL<br>REGISTER BPNT IN FQL<br>REGISTER BLEN IN FQL<br>UPDATE FQP POINTER<br>BPNT ← BPNT + BLEN |

FIG. 190
RELATED ART

```
        ( BSP )
           ↓
  ┌──────────────────┐
  │ REAL BACK SPACE  │ ── [PROCESS A4]
  │    XBID - 1      │
  └──────────────────┘
           ↓
  ┌──────────────────┐
  │   BID ← XBID     │ ── [PROCESS B4]
  └──────────────────┘
           ↓
  ┌──────────────────┐
  │ REGISTER BID IN FQL │ ── [PROCESS C4]
  │ UPDATE FQP POINTER  │
  └──────────────────┘
           ↓
       ( RETURN )
```

FIG. 191
RELATED ART

| PROCESS A4 | | PROCESS B4 | | | | PROCESS C4 |
|---|---|---|---|---|---|---|
| OPERATION | UPDATE XBID | CONDITIONS | TM FLAG | BLEN | BID | |
| REAL BACK SPACE | XBID-1 | -- | -- | -- | XBID | REGISTER BID IN FQL UPDATE FQP POINTER |

| PROCESS A5 | | PROCESS B5 | | | | PROCESS C5 |
|---|---|---|---|---|---|---|
| OPERATION | UPDATE XBID | CONDITIONS | TM FLAG | BLEN | BID | |
| REAL BACK SPACE | XBID−1 | -- | -- | -- | XBID | REGISTER BID IN FQL UPDATE FQP POINTER |

FIG. 194
RELATED ART

```
    ( SP )
       ↓
┌─────────────────────┐
│  REAL FORWARD SPACE │─── [PROCESS A6]
│      XBID + 1       │
└─────────────────────┘
       ↓
┌─────────────────────┐
│    BID ← XBID       │─── [PROCESS B6]
└─────────────────────┘
       ↓
┌─────────────────────┐
│ REGISTER BID IN FQL │─── [PROCESS C6]
│  UPDATE FQP POINTER │
└─────────────────────┘
       ↓
    ( RETURN )
```

FIG. 195
RELATED ART

| PROCESS A6 | | PROCESS B6 | | | | PROCESS C6 |
|---|---|---|---|---|---|---|
| OPERATION | UPDATE XBID | CONDITIONS | TM FLAG | BLEN | BID | |
| REAL FORWARD SPACE | XBID+1 | -- | -- | -- | XBID | REGISTER BID IN FQL UPDATE FQP POINTER |

| PROCESS A7 | | PROCESS B7 | | | | PROCESS C7 |
|---|---|---|---|---|---|---|
| OPERATION | UPDATE XBID | CONDITIONS | TM FLAG | BLEN | BID | |
| REAL FORWARD SPACE | XBID+1 | -- | -- | -- | XBID | REGISTER BID IN FQL UPDATE FQP POINTER |

| PROCESS A8 | | PROCESS B8 | | | | PROCESS C8 |
|---|---|---|---|---|---|---|
| OPERATION | UPDATE XBID | CONDITIONS | TM FLAG | BLEN | BID | |
| REAL WRITE TAPE MARK | XBID+1 | -- | 1 | -- | XBID | REGISTER BID IN FQL REGISTER TM FLAG IN FQL UPDATE FQP POINTER |

FIG. 204

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 00 | -- | -- | -- | REAL READ | TM | -- | SBID←REAL BID | 10 | -- | 1.00.00 |
| | | | | | OTHERS | -- | -- | 00 | -- | 1.00.01 |
| 10 | -- | -- | -- | REAL READ | EOF | SDT1 | -- | 20 | -- | 1.10.00 |
| | | | | | TM | -- | SBID←REAL BID | 10 | -- | 1.10.01 |
| | | | | | OTHERS | -- | -- | 00 | -- | 1.10.02 |
| 20 | -- | -- | -- | REAL READ | EOF | SDT2 | -- | 30 | -- | 1.20.00 |
| | | | | | TM | -- | SBID←REAL BID | 10 | -- | 1.20.01 |
| | | | | | OTHERS | -- | -- | 00 | -- | 1.20.02 |
| 30 | -- | -- | -- | REAL READ | TM | -- | SBID←REAL BID WHEN (REAL BID)-(SBID)=3 | 40 | 0 | 1.30.00 |
| | | | | | OTHERS | -- | -- | 00 | -- | 1.30.01 |
| 40 | -4 | -- | -- | EMULATE | -- | -- | -- | 40 | -3 | 1.40.00 |
| | -3 | -- | SDT1 | EMULATE | -- | -- | -- | 40 | -2 | 1.40.10 |
| | -2 | -- | SDT2 | EMULATE | -- | -- | -- | 40 | -1 | 1.40.20 |
| | -1 | -- | -- | EMULATE | -- | -- | -- | 40 | 0 | 1.40.30 |
| | 0 | -- | -- | REAL READ | EOF | SDT1 | -- | 20 | -- | 1.40.40 |
| | | | | | TM | -- | SBID←REAL BID WHEN (REAL BID)-(SBID)=1 | 50 | -- | 1.40.41 |
| | | | | | OTHERS | -- | -- | 00 | -- | 1.40.42 |
| | | | | | EOD | -- | -- | 80 | +1 | 1.40.43 |
| 50 | -- | -- | -- | REAL READ | EOF | SDT1 | -- | 20 | -- | 1.50.00 |
| | | | | | TM | -- | SBID←REAL BID | 10 | -- | 1.50.01 |
| | | | | | OTHERS | -- | -- | 00 | -- | 1.50.02 |
| 60 | -4 | -- | -- | EMULATE | -- | -- | -- | 60 | -3 | 1.60.00 |
| | -3 | -- | SDT1 | EMULATE | -- | -- | -- | 60 | -2 | 1.60.10 |
| | -2 | -- | SDT2 | EMULATE | -- | -- | -- | 60 | -1 | 1.60.20 |
| | -1 | -- | -- | EMULATE | -- | -- | -- | 60 | 0 | 1.60.30 |
| | 0 | -- | -- | EMULATE | -- | -- | -- | 60 | +1 | 1.60.40 |
| | +1 | SBID+EP | -- | REAL READ | EOF | SDT1 | SBID+1 | 20 | -- | 1.60.50 |
| | | | | | TM | -- | SBID←REAL BID | 10 | -- | 1.60.51 |
| | | | | | OTHERS | -- | -- | 00 | -- | 1.60.52 |

FIG. 205

| PRE - PROCESS ||| | OPERATION | POST - PROCESS |||| ES | EP | PROCESS ID |
|---|---|---|---|---|---|---|---|---|---|---|
| ES | EP | RE-POSITION | RESTORE | | BLOCK | SAVE | BID PROCESS ||||
| 70 | -4 | -- | -- | EMULATE | -- | -- | -- | 70 | -3 | 1.70.00 |
| | -3 | -- | SDT1 | EMULATE | -- | -- | -- | 70 | -2 | 1.70.10 |
| | -2 | -- | SDT2 | EMULATE | -- | -- | -- | 70 | -1 | 1.70.20 |
| | -1 | -- | -- | EMULATE | -- | -- | -- | 70 | 0 | 1.70.30 |
| | 0 | -- | -- | EMULATE | -- | -- | -- | 70 | +1 | 1.70.40 |
| | +1 | WTM | -- | REAL READ | EOF | SDT1 | SBID+1 | 20 | -- | 1.70.50 |
| | | | | | TM | -- | SBID←REAL BID | 10 | -- | 1.70.51 |
| | | | | | OTHERS | -- | -- | 00 | -- | 1.70.52 |
| 80 | -4 | -- | -- | EMULATE | -- | -- | -- | 80 | -3 | 1.80.00 |
| | -3 | -- | SDT1 | EMULATE | -- | -- | -- | 80 | -2 | 1.80.10 |
| | -2 | -- | SDT2 | EMULATE | -- | -- | -- | 80 | -1 | 1.80.20 |
| | -1 | -- | -- | EMULATE | -- | -- | -- | 80 | 0 | 1.80.30 |
| | 0 | -- | -- | EMULATE | -- | -- | -- | 80 | +1 | 1.80.40 |
| | +1 | -- | -- | REAL READ | EOD | -- | -- | 00 | -- | 1.80.50 |

FIG. 206

| PRE - PROCESS | | | | OPERATION | POST - PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 31 | -- | -- | -- | REAL READ | TM | -- | SBID←REAL BID WHEN (REAL BID)-(SBID)=3 | 41 | 0 | 1.31.00 |
| | | | | | OTHERS | -- | -- | 00 | -- | 1.31.01 |
| 41 | -4 | -- | -- | EMULATE | -- | -- | -- | 41 | -3 | 1.41.00 |
| | -3 | -- | SDT1 | EMULATE | -- | -- | -- | 41 | -2 | 1.41.10 |
| | -2 | SBID+EP | -- | REAL READ | EOF | SDT2 | SBID-3 | 30 | -- | 1.41.20 |
| | | | | | OTHERS | -- | -- | 00 | -- | 1.41.21 |
| | -1 | -- | -- | EMULATE | -- | -- | -- | 41 | 0 | 1.41.30 |
| | 0 | -- | -- | REAL READ | EOF | SDT1 | -- | 20 | -- | 1.41.40 |
| | | | | | TM | -- | SBID←REAL BID WHEN (REAL BID)-(SBID)=1 | 51 | -- | 1.41.41 |
| | | | | | OTHERS | -- | -- | 00 | -- | 1.41.42 |
| | | | | | EOD | -- | -- | 81 | +1 | 1.41.43 |
| 51 | -- | -- | -- | REAL READ | EOF | SDT1 | -- | 20 | -- | 1.51.00 |
| | | | | | TM | -- | SBID←REAL BID | 10 | -- | 1.51.01 |
| | | | | | OTHERS | -- | -- | 00 | -- | 1.51.02 |
| 61 | -4 | -- | -- | EMULATE | -- | -- | -- | 61 | -3 | 1.61.00 |
| | -3 | -- | SDT1 | EMULATE | -- | -- | -- | 61 | -2 | 1.61.10 |
| | -2 | SBID+EP | -- | REAL READ | EOF | SDT2 | SBID-3 | 30 | -- | 1.61.20 |
| | | | | | OTHERS | -- | -- | 00 | -- | 1.61.21 |
| | -1 | -- | -- | EMULATE | -- | -- | -- | 61 | 0 | 1.61.30 |
| | 0 | -- | -- | EMULATE | -- | -- | -- | 61 | +1 | 1.61.40 |
| | +1 | SBID+EP | -- | REAL READ | EOF | SDT1 | SBID+1 | 20 | -- | 1.61.50 |
| | | | | | TM | -- | SBID←REAL BID | 10 | -- | 1.61.51 |
| | | | | | OTHERS | -- | -- | 00 | -- | 1.61.52 |

FIG. 207

| PRE – PROCESS | | | | OPERATION | POST – PROCESS | | | POST-ES | POST-EP | PROCESS ID |
|---|---|---|---|---|---|---|---|---|---|---|
| ES | EP | RE-POSITION | RESTORE | | BLOCK | SAVE | BID PROCESS | ES | EP | |
| 71 | -4 | -- | -- | EMULATE | -- | -- | -- | 71 | -3 | 1.71.00 |
|  | -3 | -- | SDT1 | EMULATE | -- | -- | -- | 71 | -2 | 1.71.10 |
|  | -2 | WTM SBID+EP | -- | REAL READ | EOF | SDT2 | SBID-3 | 30 | -- | 1.71.20 |
|  |  |  |  |  | OTHERS | -- | -- | 00 | -- | 1.71.21 |
|  | -1 | -- | -- | EMULATE | -- | -- | -- | 71 | 0 | 1.71.30 |
|  | 0 | -- | -- | EMULATE | -- | -- | -- | 71 | +1 | 1.71.40 |
|  | +1 | WTM | -- | REAL READ | EOF | SDT1 | -- | 20 | -- | 1.71.50 |
|  |  |  |  |  | TM | -- | SBID←REAL BID | 10 | -- | 1.71.51 |
|  |  |  |  |  | OTHERS | -- | -- | 00 | -- | 1.71.52 |
| 81 | -4 | -- | -- | EMULATE | -- | -- | -- | 81 | -3 | 1.81.00 |
|  | -3 | -- | SDT1 | EMULATE | -- | -- | -- | 81 | -2 | 1.81.10 |
|  | -2 | SBID+EP | -- | REAL READ | EOF | SDT2 | SBID-3 | 30 | -- | 1.81.20 |
|  |  |  |  |  | OTHERS | -- | -- | 00 | -- | 1.81.21 |
|  | -1 | -- | -- | EMULATE | -- | -- | -- | 81 | 0 | 1.81.30 |
|  | 0 | -- | -- | EMULATE | -- | -- | -- | 81 | +1 | 1.81.40 |
|  | +1 | -- | -- | REAL READ | EOD | -- | -- | 00 | -- | 1.81.50 |

FIG. 208

| PRE - PROCESS | | | | OPERATION | POST - PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 22 | -- | -- | -- | REAL READ | EOF | SDT2 | -- | 32 | -- | 1.22.00 |
| | | | | | TM | -- | SBID←REAL BID | 10 | -- | 1.22.01 |
| | | | | | OTHERS | -- | -- | 00 | -- | 1.22.02 |
| 32 | -- | -- | -- | REAL READ | TM | -- | SBID←REAL BID WHEN (REAL BID)-(SBID)=3 | 42 | 0 | 1.32.00 |
| | | | | | OTHERS | -- | -- | 00 | -- | 1.32.01 |
| 42 | -4 | -- | -- | EMULATE | -- | -- | -- | 42 | -3 | 1.42.00 |
| | -3 | SBID+EP | -- | REAL READ | EOF | SDT1 | SBID-3 | 20 | -- | 1.42.10 |
| | | | | | OTHERS | -- | -- | 00 | -- | 1.42.11 |
| | -2 | -- | SDT2 | EMULATE | -- | -- | -- | 42 | -1 | 1.42.20 |
| | -1 | -- | -- | EMULATE | -- | -- | -- | 42 | 0 | 1.42.30 |
| | 0 | -- | -- | REAL READ | EOF | SDT1 | -- | 20 | -- | 1.42.40 |
| | | | | | TM | -- | SBID←REAL BID WHEN (REAL BID)-(SBID)=1 | 52 | -- | 1.42.41 |
| | | | | | OTHERS | -- | -- | 00 | -- | 1.42.42 |
| | | | | | EOD | -- | -- | 82 | +1 | 1.42.43 |
| 52 | -- | -- | -- | REAL READ | EOF | SDT1 | -- | 20 | -- | 1.52.00 |
| | | | | | TM | -- | SBID←REAL BID | 10 | -- | 1.52.01 |
| | | | | | OTHERS | -- | -- | 00 | -- | 1.52.02 |
| 62 | -4 | -- | -- | EMULATE | -- | -- | -- | 62 | -3 | 1.62.00 |
| | -3 | SBID+EP | -- | REALREAD | EOF | SDT1 | SBID-3 | 20 | -- | 1.62.10 |
| | | | | | OTHERS | -- | -- | 00 | -- | 1.62.11 |
| | -2 | -- | SDT2 | EMULATE | -- | -- | -- | 62 | -1 | 1.62.20 |
| | -1 | -- | -- | EMULATE | -- | -- | -- | 62 | 0 | 1.62.30 |
| | 0 | -- | -- | EMULATE | -- | -- | -- | 62 | +1 | 1.62.40 |
| | +1 | SBID+EP | -- | REALREAD | EOF | SDT1 | SBID+1 | 20 | -- | 1.62.50 |
| | | | | | TM | -- | SBID←REAL BID | 10 | -- | 1.62.51 |
| | | | | | OTHERS | -- | -- | 00 | -- | 1.62.52 |

FIG. 209

| PRE - PROCESS | | | | OPERATION | POST - PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 72 | -4 | -- | -- | EMULATE | -- | -- | -- | 72 | -3 | 1.72.00 |
| | -3 | WTM SBID+EP | -- | REAL READ | EOF | SDT1 | SBID-3 | 20 | -- | 1.72.10 |
| | | | | | OTHERS | -- | -- | 00 | -- | 1.72.11 |
| | -2 | -- | SDT2 | EMULATE | -- | -- | -- | 72 | -1 | 1.72.20 |
| | -1 | -- | -- | EMULATE | -- | -- | -- | 72 | 0 | 1.72.30 |
| | 0 | -- | -- | EMULATE | -- | -- | -- | 72 | +1 | 1.72.40 |
| | +1 | WTM | -- | REAL READ | EOF | SDT1 | SBID+1 | 20 | -- | 1.72.50 |
| | | | | | TM | -- | SBID←REAL BID | 10 | -- | 1.72.51 |
| | | | | | OTHERS | -- | -- | 00 | -- | 1.72.52 |
| 82 | -4 | -- | -- | EMULATE | -- | -- | -- | 82 | -3 | 1.82.00 |
| | -3 | SBID+EP | -- | REAL READ | EOF | SDT1 | SBID-3 | 20 | -- | 1.82.10 |
| | | | | | OTHERS | -- | -- | 00 | -- | 1.82.11 |
| | -2 | -- | SDT2 | EMULATE | -- | -- | -- | 82 | -1 | 1.82.20 |
| | -1 | -- | -- | EMULATE | -- | -- | -- | 82 | 0 | 1.82.30 |
| | 0 | -- | -- | EMULATE | -- | -- | -- | 82 | +1 | 1.82.40 |
| | +1 | -- | -- | REAL READ | EOD | -- | -- | 00 | -- | 1.82.50 |

FIG. 210

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 33 | -- | -- | -- | REAL READ | TM | -- | SBID←REAL BID WHEN (REAL BID)-(SBID)=3 | 43 | 0 | 1.33.00 |
| | | | | | OTHERS | -- | -- | 00 | -- | 1.33.01 |
| 43 | -4 | -- | -- | EMULATE | -- | -- | -- | 43 | -3 | 1.43.00 |
| | -3 | SBID+EP | -- | REAL READ | EOF | SDT1 | SBID-3 | 20 | -- | 1.43.10 |
| | | | | | OTHERS | -- | -- | 00 | -- | 1.43.11 |
| | -2 | SBID+EP | -- | REAL READ | EOF | SDT2 | SBID-3 | 32 | -- | 1.43.20 |
| | | | | | OTHERS | -- | -- | 00 | -- | 1.43.21 |
| | -1 | -- | -- | EMULATE | -- | -- | -- | 43 | 0 | 1.43.30 |
| | 0 | -- | -- | REAL READ | EOF | SDT1 | -- | 20 | -- | 1.43.40 |
| | | | | | TM | -- | SBID←REAL BID WHEN (REAL BID)-(SBID)=1 | 53 | -- | 1.43.41 |
| | | | | | OTHERS | -- | -- | 00 | -- | 1.43.42 |
| | | | | | EOD | -- | -- | 83 | +1 | 1.43.43 |
| 53 | -- | -- | -- | REAL READ | EOF | SDT1 | -- | 20 | -- | 1.53.00 |
| | | | | | TM | -- | SBID←REAL BID | 10 | -- | 1.53.01 |
| | | | | | OTHERS | -- | -- | 00 | -- | 1.53.02 |
| 63 | -4 | -- | -- | EMULATE | -- | -- | -- | 63 | -3 | 1.63.00 |
| | -3 | SBID+EP | -- | REAL READ | EOF | SDT1 | SBID-3 | 20 | -- | 1.63.10 |
| | | | | | OTHERS | -- | -- | 00 | -- | 1.63.11 |
| | -2 | SBID+EP | -- | REAL READ | EOF | SDT2 | SBID-3 | 32 | -- | 1.63.20 |
| | | | | | OTHERS | -- | -- | 00 | -- | 1.63.21 |
| | -1 | -- | -- | EMULATE | -- | -- | -- | 63 | 0 | 1.63.30 |
| | 0 | -- | -- | EMULATE | -- | -- | -- | 63 | +1 | 1.63.40 |
| | +1 | SBID+EP | -- | REAL READ | EOF | SDT1 | SBID+1 | 20 | -- | 1.63.50 |
| | | | | | TM | -- | SBID←REAL BID | 10 | -- | 1.63.51 |
| | | | | | OTHERS | -- | -- | 00 | -- | 1.63.52 |

FIG. 211

| PRE – PROCESS | | | OPERATION | POST – PROCESS | | | | | PROCESS ID |
|---|---|---|---|---|---|---|---|---|---|
| ES | EP | RE-POSITION | RESTORE | | BLOCK | SAVE | BID PROCESS | ES | EP | |
| 73 | -4 | -- | -- | EMULATE | -- | -- | -- | 73 | -3 | 1.73.00 |
| | -3 | WTM SBID+EP | -- | REAL READ | EOF | SDT1 | SBID-3 | 20 | -- | 1.73.10 |
| | | | | | OTHERS | -- | -- | 00 | -- | 1.73.11 |
| | -2 | WTM SBID+EP | -- | REAL READ | EOF | SDT2 | SBID-3 | 32 | -- | 1.73.20 |
| | | | | | OTHERS | -- | -- | 00 | -- | 1.73.21 |
| | -1 | -- | -- | EMULATE | -- | -- | -- | 73 | 0 | 1.73.30 |
| | 0 | -- | -- | EMULATE | -- | -- | -- | 73 | +1 | 1.73.40 |
| | +1 | WTM | -- | REAL READ | EOF | SDT1 | SBID+1 | 20 | -- | 1.73.50 |
| | | | | | TM | -- | SBID←REAL BID | 10 | -- | 1.73.51 |
| | | | | | OTHERS | -- | -- | 00 | -- | 1.73.52 |
| 83 | -4 | -- | -- | EMULATE | -- | -- | -- | 83 | -3 | 1.83.00 |
| | -3 | SBID+EP | -- | REAL READ | EOF | SDT1 | SBID-3 | 20 | -- | 1.83.10 |
| | | | | | OTHERS | -- | -- | 00 | -- | 1.83.11 |
| | -2 | SBID+EP | -- | REAL READ | EOF | SDT2 | SBID-3 | 32 | -- | 1.83.20 |
| | | | | | OTHERS | -- | -- | 00 | -- | 1.83.21 |
| | -1 | -- | -- | EMULATE | -- | -- | -- | 83 | 0 | 1.83.30 |
| | 0 | -- | -- | EMULATE | -- | -- | -- | 83 | +1 | 1.83.40 |
| | +1 | -- | -- | REAL READ | EOD | -- | -- | 00 | -- | 1.83.50 |

FIG. 212

| PRE – PROCESS | | | OPERATION | POST – PROCESS | | | | | PROCESS ID |
|---|---|---|---|---|---|---|---|---|---|
| ES | EP | RE-POSITION | RESTORE | | BLOCK | SAVE | BID PROCESS | ES | EP | |
| 00 | -- | -- | -- | REAL RB | -- | -- | -- | 00 | -- | 2.00.00 |
| 10 | -- | -- | -- | REAL RB | -- | -- | -- | 00 | -- | 2.10.00 |
| 20 | -- | -- | -- | REAL RB | -- | -- | -- | 00 | -- | 2.20.00 |
| 30 | -- | -- | -- | REAL RB | -- | -- | -- | 00 | -- | 2.30.00 |
| 40 | -4 | SBID+EP | -- | REAL RB | -- | -- | -- | 00 | -- | 2.40.00 |
| | -3 | -- | -- | EMULATE | -- | -- | -- | 40 | -4 | 2.40.10 |
| | -2 | -- | -- | EMULATE | -- | -- | -- | 40 | -3 | 2.40.20 |
| | -1 | -- | -- | EMULATE | -- | -- | -- | 40 | -2 | 2.40.30 |
| | 0 | -- | -- | EMULATE | -- | -- | -- | 40 | -1 | 2.40.40 |
| 50 | -- | -- | -- | REAL RB | TM | -- | SBID←REAL BID WHEN (SBID)-(REAL BID)=1 | 60 | 0 | 2.50.00 |
| 60 | -4 | SBID+EP | -- | REAL RB | -- | -- | -- | 00 | -- | 2.60.00 |
| | -3 | -- | -- | EMULATE | -- | -- | -- | 60 | -4 | 2.60.10 |
| | -2 | -- | -- | EMULATE | -- | -- | -- | 60 | -3 | 2.60.20 |
| | -1 | -- | -- | EMULATE | -- | -- | -- | 60 | -2 | 2.60.30 |
| | 0 | -- | -- | EMULATE | -- | -- | -- | 60 | -1 | 2.60.40 |
| | +1 | -- | -- | EMULATE | -- | -- | -- | 60 | 0 | 2.60.50 |
| 70 | -4 | WTM SBID+EP | -- | REAL RB | -- | -- | -- | 00 | -- | 2.70.00 |
| | -3 | -- | -- | EMULATE | -- | -- | -- | 70 | -4 | 2.70.10 |
| | -2 | -- | -- | EMULATE | -- | -- | -- | 70 | -3 | 2.70.20 |
| | -1 | -- | -- | EMULATE | -- | -- | -- | 70 | -2 | 2.70.30 |
| | 0 | -- | -- | EMULATE | -- | -- | -- | 70 | -1 | 2.70.40 |
| | +1 | -- | -- | EMULATE | -- | -- | -- | 70 | 0 | 2.70.50 |
| 80 | -4 | SBID+EP | -- | REAL RB | -- | -- | -- | 00 | -- | 2.80.00 |
| | -3 | -- | -- | EMULATE | -- | -- | -- | 80 | -4 | 2.80.10 |
| | -2 | -- | -- | EMULATE | -- | -- | -- | 80 | -3 | 2.80.20 |
| | -1 | -- | -- | EMULATE | -- | -- | -- | 80 | -2 | 2.80.30 |
| | 0 | -- | -- | EMULATE | -- | -- | -- | 80 | -1 | 2.80.40 |
| | +1 | -- | -- | EMULATE | -- | -- | -- | 80 | 0 | 2.80.50 |

FIG. 213

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 31 | -- | -- | -- | REAL RB | -- | -- | -- | 00 | -- | 2.31.00 |
| 41 | -4 | SBID+EP | -- | REAL RB | -- | -- | -- | 00 | -- | 2.41.00 |
| | -3 | -- | -- | EMULATE | -- | -- | -- | 41 | -4 | 2.41.10 |
| | -2 | -- | -- | EMULATE | -- | -- | -- | 41 | -3 | 2.41.20 |
| | -1 | -- | -- | EMULATE | -- | -- | -- | 41 | -2 | 2.41.30 |
| | 0 | -- | -- | EMULATE | -- | -- | -- | 41 | -1 | 2.41.40 |
| 51 | -- | -- | -- | REAL RB | TM | -- | SBID←REAL BID WHEN (SBID)-(REAL BID)=1 | 61 | 0 | 2.51.00 |
| 61 | -4 | SBID+EP | -- | REAL RB | -- | -- | -- | 00 | -- | 2.61.00 |
| | -3 | -- | -- | EMULATE | -- | -- | -- | 61 | -4 | 2.61.10 |
| | -2 | -- | -- | EMULATE | -- | -- | -- | 61 | -3 | 2.61.20 |
| | -1 | -- | -- | EMULATE | -- | -- | -- | 61 | -2 | 2.61.30 |
| | 0 | -- | -- | EMULATE | -- | -- | -- | 61 | -1 | 2.61.40 |
| | +1 | -- | -- | EMULATE | -- | -- | -- | 61 | 0 | 2.61.50 |
| 71 | -4 | WTM SBID+EP | -- | REAL RB | -- | -- | -- | 00 | -- | 2.71.00 |
| | -3 | -- | -- | EMULATE | -- | -- | -- | 71 | -4 | 2.71.10 |
| | -2 | -- | -- | EMULATE | -- | -- | -- | 71 | -3 | 2.71.20 |
| | -1 | -- | -- | EMULATE | -- | -- | -- | 71 | -2 | 2.71.30 |
| | 0 | -- | -- | EMULATE | -- | -- | -- | 71 | -1 | 2.71.40 |
| | +1 | -- | -- | EMULATE | -- | -- | -- | 71 | 0 | 2.71.50 |
| 81 | -4 | SBID+EP | -- | REAL RB | -- | -- | -- | 00 | -- | 2.81.00 |
| | -3 | -- | -- | EMULATE | -- | -- | -- | 81 | -4 | 2.81.10 |
| | -2 | -- | -- | EMULATE | -- | -- | -- | 81 | -3 | 2.81.20 |
| | -1 | -- | -- | EMULATE | -- | -- | -- | 81 | -2 | 2.81.30 |
| | 0 | -- | -- | EMULATE | -- | -- | -- | 81 | -1 | 2.81.40 |
| | +1 | -- | -- | EMULATE | -- | -- | -- | 81 | 0 | 2.81.50 |

FIG. 214

| PRE - PROCESS ||| OPERATION | POST - PROCESS |||  ES | EP | PROCESS ID |
|---|---|---|---|---|---|---|---|---|---|
| ES | EP | RE-POSITION | RESTORE | | BLOCK | SAVE | BID PROCESS | | | |
| 32 | -- | -- | -- | REAL RB | -- | -- | -- | 00 | -- | 2.32.00 |
| 42 | -4 | SBID+EP | -- | REAL RB | -- | -- | -- | 00 | -- | 2.42.00 |
| | -3 | -- | -- | EMULATE | -- | -- | -- | 42 | -4 | 2.42.10 |
| | -2 | -- | -- | EMULATE | -- | -- | -- | 42 | -3 | 2.42.20 |
| | -1 | -- | -- | EMULATE | -- | -- | -- | 42 | -2 | 2.42.30 |
| | 0 | -- | -- | EMULATE | -- | -- | -- | 42 | -1 | 2.42.40 |
| 52 | -- | -- | -- | REAL RB | TM | -- | SBID←REAL BID WHEN (SBID)-(REAL BID)=1 | 62 | 0 | 2.52.00 |
| 62 | -4 | SBID+EP | -- | REAL RB | -- | -- | -- | 00 | -- | 2.62.00 |
| | -3 | -- | -- | EMULATE | -- | -- | -- | 62 | -4 | 2.62.10 |
| | -2 | -- | -- | EMULATE | -- | -- | -- | 62 | -3 | 2.62.20 |
| | -1 | -- | -- | EMULATE | -- | -- | -- | 62 | -2 | 2.62.30 |
| | 0 | -- | -- | EMULATE | -- | -- | -- | 62 | -1 | 2.62.40 |
| | +1 | -- | -- | EMULATE | -- | -- | -- | 62 | 0 | 2.62.50 |
| 72 | -4 | WTM SBID+EP | -- | REAL RB | -- | -- | -- | 00 | -- | 2.72.00 |
| | -3 | -- | -- | EMULATE | -- | -- | -- | 72 | -4 | 2.72.10 |
| | -2 | -- | -- | EMULATE | -- | -- | -- | 72 | -3 | 2.72.20 |
| | -1 | -- | -- | EMULATE | -- | -- | -- | 72 | -2 | 2.72.30 |
| | 0 | -- | -- | EMULATE | -- | -- | -- | 72 | -1 | 2.72.40 |
| | +1 | -- | -- | EMULATE | -- | -- | -- | 72 | 0 | 2.72.50 |
| 82 | -4 | SBID+EP | -- | REAL RB | -- | -- | -- | 00 | -- | 2.82.00 |
| | -3 | -- | -- | EMULATE | -- | -- | -- | 82 | -4 | 2.82.10 |
| | -2 | -- | -- | EMULATE | -- | -- | -- | 82 | -3 | 2.82.20 |
| | -1 | -- | -- | EMULATE | -- | -- | -- | 82 | -2 | 2.82.30 |
| | 0 | -- | -- | EMULATE | -- | -- | -- | 82 | -1 | 2.82.40 |
| | +1 | -- | -- | EMULATE | -- | -- | -- | 82 | 0 | 2.82.50 |

FIG. 215

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 33 | -- | -- | -- | REAL RB | -- | -- | -- | 00 | -- | 2.33.00 |
| 43 | -4 | SBID+EP | -- | REAL RB | -- | -- | -- | 00 | -- | 2.43.00 |
| | -3 | -- | -- | EMULATE | -- | -- | -- | 43 | -4 | 2.43.10 |
| | -2 | -- | -- | EMULATE | -- | -- | -- | 43 | -3 | 2.43.20 |
| | -1 | -- | -- | EMULATE | -- | -- | -- | 43 | -2 | 2.43.30 |
| | 0 | -- | -- | EMULATE | -- | -- | -- | 43 | -1 | 2.43.40 |
| 53 | -- | -- | -- | REAL RB | TM | -- | SBID←REAL BID WHEN (SBID)−(REAL BID)=1 | 63 | 0 | 2.53.00 |
| 63 | -4 | SBID+EP | -- | REAL RB | -- | -- | -- | 00 | -- | 2.63.00 |
| | -3 | -- | -- | EMULATE | -- | -- | -- | 63 | -4 | 2.63.10 |
| | -2 | -- | -- | EMULATE | -- | -- | -- | 63 | -3 | 2.63.20 |
| | -1 | -- | -- | EMULATE | -- | -- | -- | 63 | -2 | 2.63.30 |
| | 0 | -- | -- | EMULATE | -- | -- | -- | 63 | -1 | 2.63.40 |
| | +1 | -- | -- | EMULATE | -- | -- | -- | 63 | 0 | 2.63.50 |
| 73 | -4 | WTM SBID+EP | -- | REAL RB | -- | -- | -- | 00 | -- | 2.73.00 |
| | -3 | -- | -- | EMULATE | -- | -- | -- | 73 | -4 | 2.73.10 |
| | -2 | -- | -- | EMULATE | -- | -- | -- | 73 | -3 | 2.73.20 |
| | -1 | -- | -- | EMULATE | -- | -- | -- | 73 | -2 | 2.73.30 |
| | 0 | -- | -- | EMULATE | -- | -- | -- | 73 | -1 | 2.73.40 |
| | +1 | -- | -- | EMULATE | -- | -- | -- | 73 | 0 | 2.73.50 |
| 83 | -4 | SBID+EP | -- | REAL RB | -- | -- | -- | 00 | -- | 2.83.00 |
| | -3 | -- | -- | EMULATE | -- | -- | -- | 83 | -4 | 2.83.10 |
| | -2 | -- | -- | EMULATE | -- | -- | -- | 83 | -3 | 2.83.20 |
| | -1 | -- | -- | EMULATE | -- | -- | -- | 83 | -2 | 2.83.30 |
| | 0 | -- | -- | EMULATE | -- | -- | -- | 83 | -1 | 2.83.40 |
| | +1 | -- | -- | EMULATE | -- | -- | -- | 83 | 0 | 2.83.50 |

FIG. 216

| PRE - PROCESS | | | OPERATION | POST - PROCESS | | | | | PROCESS ID |
|---|---|---|---|---|---|---|---|---|---|
| ES | EP | RE-POSITION | RESTORE | | BLOCK | SAVE | BID PROCESS | ES | EP | |
| 00 | -- | -- | -- | REAL WR | -- | -- | -- | 00 | -- | 3.00.00 |
| 10 | -- | -- | -- | REAL WR | EOF | SDT1 | -- | 20 | -- | 3.10.00 |
| | | | -- | | OTHERS | -- | -- | 00 | -- | 3.10.01 |
| 20 | -- | -- | -- | REAL WR | EOF | SDT2 | -- | 30 | -- | 3.20.00 |
| | | | -- | | OTHERS | -- | -- | 00 | -- | 3.20.01 |
| 30 | -- | -- | -- | REAL WR | -- | -- | -- | 00 | -- | 3.30.00 |
| 40 | -4 | SBID+EP | -- | REAL WR | -- | -- | -- | 00 | -- | 3.40.00 |
| | -3 | | -- | REAL WR | EOF | SDT1 | SBID-3 | 20 | -- | 3.40.10 |
| | | | -- | | OTHERS | -- | -- | 00 | -- | 3.40.11 |
| | -2 | | -- | REAL WR | EOF | SDT2 | SBID-3 | 30 | -- | 3.40.20 |
| | | | -- | | OTHERS | -- | -- | 00 | -- | 3.40.21 |
| | -1 | | -- | REAL WR | -- | -- | -- | 00 | -- | 3.40.30 |
| | 0 | -- | -- | REAL WR | EOF | SDT1 | -- | 20 | -- | 3.40.40 |
| | | | -- | | OTHERS | -- | -- | 00 | -- | 3.40.41 |
| 50 | -- | -- | -- | REAL WR | EOF | SDT1 | -- | 20 | -- | 3.50.00 |
| | | | -- | | OTHERS | -- | -- | 00 | -- | 3.50.01 |
| 60 | -4 | SBID+EP | -- | REAL WR | -- | -- | -- | 00 | -- | 3.60.00 |
| | -3 | | -- | REAL WR | EOF | SDT1 | SBID-3 | 20 | -- | 3.60.10 |
| | | | -- | | OTHERS | -- | -- | 00 | -- | 3.60.11 |
| | -2 | | -- | REAL WR | EOF | SDT2 | SBID-3 | 30 | -- | 3.60.20 |
| | | | -- | | OTHERS | -- | -- | 00 | -- | 3.60.21 |
| | -1 | | -- | REAL WR | -- | -- | -- | 00 | -- | 3.60.30 |
| | 0 | -- | -- | REAL WR | EOF | SDT1 | -- | 20 | -- | 3.60.40 |
| | | | -- | | OTHERS | -- | -- | 00 | -- | 3.60.41 |
| | +1 | SBID+EP | -- | REAL WR | EOF | SDT1 | SBID+1 | 20 | -- | 3.60.50 |
| | | | -- | | OTHERS | -- | -- | 00 | -- | 3.60.51 |

FIG. 217

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 70 | -4 | SBID+EP | -- | REAL WR | -- | -- | -- | 00 | -- | 3.70.00 |
| | -3 | | -- | REAL WR | EOF | SDT1 | SBID-3 | 20 | -- | 3.70.10 |
| | | | -- | | OTHERS | -- | -- | 00 | -- | 3.70.11 |
| | -2 | | -- | REAL WR | EOF | SDT2 | SBID-3 | 30 | -- | 3.70.20 |
| | | | -- | | OTHERS | -- | -- | 00 | -- | 3.70.21 |
| | -1 | | -- | REAL WR | -- | -- | -- | 00 | -- | 3.70.30 |
| | 0 | -- | -- | REAL WR | EOF | SDT1 | -- | 20 | -- | 3.70.40 |
| | | | -- | | OTHERS | -- | -- | 00 | -- | 3.70.41 |
| | +1 | WTM | -- | REAL WR | EOF | SDT1 | SBID+1 | 20 | -- | 3.70.50 |
| | | | -- | | OTHERS | -- | -- | 00 | -- | 3.70.51 |
| 80 | -4 | SBID+EP | -- | REAL WR | -- | -- | -- | 00 | -- | 3.80.00 |
| | -3 | | -- | REAL WR | EOF | SDT1 | SBID-3 | 20 | -- | 3.80.10 |
| | | | -- | | OTHERS | -- | -- | 00 | -- | 3.80.11 |
| | -2 | | -- | REAL WR | EOF | SDT2 | SBID-3 | 30 | -- | 3.80.20 |
| | | | -- | | OTHERS | -- | -- | 00 | -- | 3.80.21 |
| | -1 | | -- | REAL WR | -- | -- | -- | 00 | -- | 3.80.30 |
| | 0 | -- | -- | REAL WR | EOF | SDT1 | -- | 20 | -- | 3.80.40 |
| | | | -- | | OTHERS | -- | -- | 00 | -- | 3.80.41 |
| | +1 | WTM | -- | REAL WR | EOF | SDT1 | SBID+1 | 20 | -- | 3.80.50 |
| | | | -- | | OTHERS | -- | -- | 00 | -- | 3.80.51 |

FIG. 218

| PRE – PROCESS | | | | OPERATION | POST – PROCESS | | | ES | EP | PROCESS ID |
|---|---|---|---|---|---|---|---|---|---|---|
| ES | EP | RE-POSITION | RESTORE | | BLOCK | SAVE | BID PROCESS | | | |
| 31 | -- | -- | -- | REAL WR | -- | -- | -- | 00 | -- | 3.31.00 |
| 41 | -4 | SBID+EP | -- | REAL WR | -- | -- | -- | 00 | -- | 3.41.00 |
| | -3 | | -- | REAL WR | EOF | SDT1 | SBID-3 | 20 | -- | 3.41.10 |
| | | | | | OTHERS | -- | -- | 00 | -- | 3.41.11 |
| | -2 | | -- | REAL WR | EOF | SDT2 | SBID-3 | 30 | -- | 3.41.20 |
| | | | | | OTHERS | -- | -- | 00 | -- | 3.41.21 |
| | -1 | | -- | REAL WR | -- | -- | -- | 00 | -- | 3.41.30 |
| | 0 | -- | -- | REAL WR | EOF | SDT1 | -- | 20 | -- | 3.41.40 |
| | | | | | OTHERS | -- | -- | 00 | -- | 3.41.41 |
| 51 | -- | -- | -- | REAL WR | EOF | SDT1 | -- | 20 | -- | 3.51.00 |
| | | | | | OTHERS | -- | -- | 00 | -- | 3.51.01 |
| 61 | -4 | SBID+EP | -- | REAL WR | -- | -- | -- | 00 | -- | 3.61.00 |
| | -3 | | -- | REAL WR | EOF | SDT1 | SBID-3 | 20 | -- | 3.61.10 |
| | | | | | OTHERS | -- | -- | 00 | -- | 3.61.11 |
| | -2 | | -- | REAL WR | EOF | SDT2 | SBID-3 | 30 | -- | 3.61.20 |
| | | | | | OTHERS | -- | -- | 00 | -- | 3.61.21 |
| | -1 | | -- | REAL WR | -- | -- | -- | 00 | -- | 3.61.30 |
| | 0 | -- | -- | REAL WR | EOF | SDT1 | -- | 20 | -- | 3.61.40 |
| | | | | | OTHERS | -- | -- | 00 | -- | 3.61.41 |
| | +1 | SBID+EP | -- | REAL WR | EOF | SDT1 | SBID+1 | 20 | -- | 3.61.50 |
| | | | | | OTHERS | -- | -- | 00 | -- | 3.61.51 |

FIG. 219

| PRE - PROCESS | | | OPERATION | POST - PROCESS | | | | | PROCESS ID |
|---|---|---|---|---|---|---|---|---|---|
| ES | EP | RE-POSITION | RESTORE | | BLOCK | SAVE | BID PROCESS | ES | EP | |
| 71 | -4 | SBID+EP | -- | REAL WR | -- | -- | -- | 00 | -- | 3.71.00 |
| | -3 | | -- | REAL WR | EOF | SDT1 | SBID-3 | 20 | -- | 3.71.10 |
| | | | | | OTHERS | -- | -- | 00 | -- | 3.71.11 |
| | -2 | | -- | REAL WR | EOF | SDT2 | SBID-3 | 30 | -- | 3.71.20 |
| | | | | | OTHERS | -- | -- | 00 | -- | 3.71.21 |
| | -1 | | -- | REAL WR | -- | -- | -- | 00 | -- | 3761.30 |
| | 0 | -- | -- | REAL WR | EOF | SDT1 | -- | 20 | -- | 3.71.40 |
| | | | | | OTHERS | -- | -- | 00 | -- | 3.71.41 |
| | +1 | WTM | -- | REAL WR | EOF | SDT1 | SBID+1 | 20 | -- | 3.71.50 |
| | | | | | OTHERS | -- | -- | 00 | -- | 3.71.51 |
| 81 | -4 | SBID+EP | -- | REAL WR | -- | -- | -- | 00 | -- | 3.81.00 |
| | -3 | | -- | REAL WR | EOF | SDT1 | SBID-3 | 20 | -- | 3.81.10 |
| | | | | | OTHERS | -- | -- | 00 | -- | 3.81.11 |
| | -2 | | -- | REAL WR | EOF | SDT2 | SBID-3 | 30 | -- | 3.81.20 |
| | | | | | OTHERS | -- | -- | 00 | -- | 3.81.21 |
| | -1 | | -- | REAL WR | -- | -- | -- | 00 | -- | 3.81.30 |
| | 0 | -- | -- | REAL WR | EOF | SDT1 | -- | 20 | -- | 3.81.40 |
| | | | | | OTHERS | -- | -- | 00 | -- | 3.81.41 |
| | +1 | WTM | -- | REAL WR | EOF | SDT1 | SBID+1 | 20 | -- | 3.81.50 |
| | | | | | OTHERS | -- | -- | 00 | -- | 3.81.51 |

FIG. 220

| PRE – PROCESS ||| | OPERATION | POST – PROCESS |||| ES | EP | PROCESS ID |
|---|---|---|---|---|---|---|---|---|---|---|
| ES | EP | RE-POSITION | RESTORE | | BLOCK | SAVE | BID PROCESS | | | |
| 22 | -- | -- | -- | REAL WR | EOF | SDT2 | -- | 32 | -- | 3.22.00 |
| | | | -- | | OTHERS | -- | -- | 00 | -- | 3.22.01 |
| 32 | -- | -- | -- | REAL WR | -- | -- | -- | 00 | -- | 3.32.00 |
| 42 | -4 | SBID+EP | -- | REAL WR | -- | -- | -- | 00 | -- | 3.42.00 |
| | -3 | | -- | REAL WR | EOF | SDT1 | SBID-3 | 20 | -- | 3.42.10 |
| | | | -- | | OTHERS | -- | -- | 00 | -- | 3.42.11 |
| | -2 | | -- | REAL WR | EOF | SDT2 | SBID-3 | 32 | -- | 3.42.20 |
| | | | -- | | OTHERS | -- | -- | 00 | -- | 3.42.21 |
| | -1 | | -- | REAL WR | -- | -- | -- | 00 | -- | 3.42.30 |
| | 0 | -- | -- | REAL WR | EOF | SDT1 | -- | 20 | -- | 3.42.40 |
| | | | -- | | OTHERS | -- | -- | 00 | -- | 3.42.41 |
| 52 | -- | -- | -- | REAL WR | EOF | SDT1 | -- | 20 | -- | 3.52.00 |
| | | | -- | | OTHERS | -- | -- | 00 | -- | 3.52.01 |
| 62 | -4 | SBID+EP | -- | REAL WR | -- | -- | -- | 00 | -- | 3.62.00 |
| | -3 | | -- | REAL WR | EOF | SDT1 | SBID-3 | 20 | -- | 3.62.10 |
| | | | -- | | OTHERS | -- | -- | 00 | -- | 3.62.11 |
| | -2 | | -- | REAL WR | EOF | SDT2 | SBID-3 | 32 | -- | 3.62.20 |
| | | | -- | | OTHERS | -- | -- | 00 | -- | 3.62.21 |
| | -1 | | -- | REAL WR | -- | -- | -- | 00 | -- | 3.62.30 |
| | 0 | -- | -- | REAL WR | EOF | SDT1 | -- | 20 | -- | 3.62.40 |
| | | | -- | | OTHERS | -- | -- | 00 | -- | 3.62.41 |
| | +1 | SBID+EP | -- | REAL WR | EOF | SDT1 | SBID+1 | 20 | -- | 3.62.50 |
| | | | -- | | OTHERS | -- | -- | 00 | -- | 3.62.51 |

FIG. 221

| PRE – PROCESS | | | OPERATION | POST – PROCESS | | | | | PROCESS ID |
|---|---|---|---|---|---|---|---|---|---|
| ES | EP | RE-POSITION | RESTORE | | BLOCK | SAVE | BID PROCESS | ES | EP | |
| 72 | -4 | SBID+EP | -- | REAL WR | -- | -- | -- | 00 | -- | 3.72.00 |
| | -3 | | -- | REAL WR | EOF | SDT1 | SBID-3 | 20 | -- | 3.72.10 |
| | | | -- | | OTHERS | -- | -- | 00 | -- | 3.72.11 |
| | -2 | | -- | REAL WR | EOF | SDT2 | SBID-3 | 32 | -- | 3.72.20 |
| | | | -- | | OTHERS | -- | -- | 00 | -- | 3.72.21 |
| | -1 | | -- | REAL WR | -- | -- | -- | 00 | -- | 3.72.30 |
| | 0 | -- | -- | REAL WR | EOF | SDT1 | -- | 20 | -- | 3.72.40 |
| | | | -- | | OTHERS | -- | -- | 00 | -- | 3.72.41 |
| | +1 | WTM | -- | REAL WR | EOF | SDT1 | SBID+1 | 20 | -- | 3.72.50 |
| | | | -- | | OTHERS | -- | -- | 00 | -- | 3.72.51 |
| 82 | -4 | SBID+EP | -- | REAL WR | -- | -- | -- | 00 | -- | 3.82.00 |
| | -3 | | -- | REAL WR | EOF | SDT1 | SBID-3 | 20 | -- | 3.82.10 |
| | | | -- | | OTHERS | -- | -- | 00 | -- | 3.82.11 |
| | -2 | | -- | REAL WR | EOF | SDT2 | SBID-3 | 32 | -- | 3.82.20 |
| | | | -- | | OTHERS | -- | -- | 00 | -- | 3.82.21 |
| | -1 | | -- | REAL WR | -- | -- | -- | 00 | -- | 3.82.30 |
| | 0 | -- | -- | REAL WR | EOF | SDT1 | -- | 20 | -- | 3.82.40 |
| | | | -- | | OTHERS | -- | -- | 00 | -- | 3.82.41 |
| | +1 | WTM | -- | REAL WR | EOF | SDT1 | SBID+1 | 20 | -- | 3.82.50 |
| | | | -- | | OTHERS | -- | -- | 00 | -- | 3.82.51 |

FIG. 222

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 33 | -- | -- | -- | REAL WR | -- | -- | -- | 00 | -- | 3.33.00 |
| 43 | -4 | SBID+EP | -- | REAL WR | -- | -- | -- | 00 | -- | 3.43.00 |
| | -3 | | -- | REAL WR | EOF | SDT1 | SBID-3 | 20 | -- | 3.43.10 |
| | | | | | OTHERS | -- | -- | 00 | -- | 3.43.11 |
| | -2 | | -- | REAL WR | EOF | SDT2 | SBID-3 | 32 | -- | 3.43.20 |
| | | | | | OTHERS | -- | -- | 00 | -- | 3.43.21 |
| | -1 | | -- | REAL WR | -- | -- | -- | 00 | -- | 3.43.30 |
| | 0 | -- | -- | REAL WR | EOF | SDT1 | -- | 20 | -- | 3.43.40 |
| | | | | | OTHERS | -- | -- | 00 | -- | 3.43.41 |
| 53 | -- | -- | -- | REAL WR | EOF | SDT1 | -- | 20 | -- | 3.53.00 |
| | | | | | OTHERS | -- | -- | 00 | -- | 3.53.01 |
| 63 | -4 | SBID+EP | -- | REAL WR | -- | -- | -- | 00 | -- | 3.63.00 |
| | -3 | | -- | REAL WR | EOF | SDT1 | SBID-3 | 20 | -- | 3.63.10 |
| | | | | | OTHERS | -- | -- | 00 | -- | 3.63.11 |
| | -2 | | -- | REAL WR | EOF | SDT2 | SBID-3 | 32 | -- | 3.63.20 |
| | | | | | OTHERS | -- | -- | 00 | -- | 3.63.21 |
| | -1 | | -- | REAL WR | -- | -- | -- | 00 | -- | 3.63.30 |
| | 0 | -- | -- | REAL WR | EOF | SDT1 | -- | 20 | -- | 3.63.40 |
| | | | | | OTHERS | -- | -- | 00 | -- | 3.63.41 |
| | +1 | SBID+EP | -- | REAL WR | EOF | SDT1 | SBID+1 | 20 | -- | 3.63.50 |
| | | | | | OTHERS | -- | -- | 00 | -- | 3.63.51 |

FIG. 223

| PRE - PROCESS | | | | OPERATION | POST - PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 73 | -4 | SBID+EP | -- | REAL WR | -- | -- | -- | 00 | -- | 3.73.00 |
| | -3 | | -- | REAL WR | EOF | SDT1 | SBID-3 | 20 | -- | 3.73.10 |
| | | | | | OTHERS | -- | -- | 00 | -- | 3.73.11 |
| | -2 | | -- | REAL WR | EOF | SDT2 | SBID-3 | 32 | -- | 3.73.20 |
| | | | | | OTHERS | -- | -- | 00 | -- | 3.73.21 |
| | -1 | | -- | REAL WR | -- | -- | -- | 00 | -- | 3.73.30 |
| | 0 | -- | -- | REAL WR | EOF | SDT1 | -- | 20 | -- | 3.73.40 |
| | | | | | OTHERS | -- | -- | 00 | -- | 3.73.41 |
| | +1 | WTM | -- | REAL WR | EOF | SDT1 | SBID+1 | 20 | -- | 3.73.50 |
| | | | | | OTHERS | -- | -- | 00 | -- | 3.73.51 |
| 83 | -4 | SBID+EP | -- | REAL WR | -- | -- | -- | 00 | -- | 3.83.00 |
| | -3 | | -- | REAL WR | EOF | SDT1 | SBID-3 | 20 | -- | 3.83.10 |
| | | | | | OTHERS | -- | -- | 00 | -- | 3.83.11 |
| | -2 | | -- | REAL WR | EOF | SDT2 | SBID-3 | 32 | -- | 3.83.20 |
| | | | | | OTHERS | -- | -- | 00 | -- | 3.83.21 |
| | -1 | | -- | REAL WR | -- | -- | -- | 00 | -- | 3.83.30 |
| | 0 | -- | -- | REAL WR | EOF | SDT1 | -- | 20 | -- | 3.83.40 |
| | | | | | OTHERS | -- | -- | 00 | -- | 3.83.41 |
| | +1 | WTM | -- | REAL WR | EOF | SDT1 | SBID+1 | 20 | -- | 3.83.50 |
| | | | | | OTHERS | -- | -- | 00 | -- | 3.83.51 |

FIG. 224

| PRE - PROCESS | | | OPERATION | POST - PROCESS | | | | | PROCESS ID |
|---|---|---|---|---|---|---|---|---|---|
| ES | EP | RE-POSITION | RESTORE | | BLOCK | SAVE | BID PROCESS | ES | EP | |
| 00 | -- | -- | -- | REAL BSP | -- | -- | -- | 00 | -- | 4.00.00 |
| 10 | -- | -- | -- | REAL BSP | -- | -- | -- | 00 | -- | 4.10.00 |
| 20 | -- | -- | -- | REAL BSP | -- | -- | -- | 10 | -- | 4.20.00 |
| 30 | -- | -- | -- | REAL BSP | -- | -- | -- | 20 | -- | 4.30.00 |
| 40 | -4 | SBID+EP | -- | REAL BSP | -- | -- | -- | 00 | -- | 4.40.00 |
| | -3 | -- | -- | EMULATE | -- | -- | -- | 40 | -4 | 4.40.10 |
| | -2 | -- | -- | EMULATE | -- | -- | -- | 40 | -3 | 4.40.20 |
| | -1 | -- | -- | EMULATE | -- | -- | -- | 40 | -2 | 4.40.30 |
| | 0 | -- | -- | EMULATE | -- | -- | -- | 40 | -1 | 4.40.40 |
| 50 | -- | -- | -- | REAL BSP | TM | -- | SBID←REAL BID WHEN (SBID)-(REAL BID)=1 | 60 | 0 | 4.50.00 |
| 60 | -4 | SBID+EP | -- | REAL BSP | -- | -- | -- | 00 | -- | 4.60.00 |
| | -3 | -- | -- | EMULATE | -- | -- | -- | 60 | -4 | 4.60.10 |
| | -2 | -- | -- | EMULATE | -- | -- | -- | 60 | -3 | 4.60.20 |
| | -1 | -- | -- | EMULATE | -- | -- | -- | 60 | -2 | 4.60.30 |
| | 0 | -- | -- | EMULATE | -- | -- | -- | 60 | -1 | 4.60.40 |
| | +1 | -- | -- | EMULATE | -- | -- | -- | 60 | 0 | 4.60.50 |
| 70 | -4 | WTM SBID+EP | -- | REAL BSP | -- | -- | -- | 00 | -- | 4.70.00 |
| | -3 | -- | -- | EMULATE | -- | -- | -- | 70 | -4 | 4.70.10 |
| | -2 | -- | -- | EMULATE | -- | -- | -- | 70 | -3 | 4.70.20 |
| | -1 | -- | -- | EMULATE | -- | -- | -- | 70 | -2 | 4.70.30 |
| | 0 | -- | -- | EMULATE | -- | -- | -- | 70 | -1 | 4.70.40 |
| | +1 | -- | -- | EMULATE | -- | -- | -- | 70 | 0 | 4.70.50 |
| 80 | -4 | SBID+EP | -- | REAL BSP | -- | -- | -- | 00 | -- | 4.80.00 |
| | -3 | -- | -- | EMULATE | -- | -- | -- | 80 | -4 | 4.80.10 |
| | -2 | -- | -- | EMULATE | -- | -- | -- | 80 | -3 | 4.80.20 |
| | -1 | -- | -- | EMULATE | -- | -- | -- | 80 | -2 | 4.80.30 |
| | 0 | -- | -- | EMULATE | -- | -- | -- | 80 | -1 | 4.80.40 |
| | +1 | -- | -- | EMULATE | -- | -- | -- | 80 | 0 | 4.80.50 |

FIG. 225

| PRE – PROCESS ||| OPERATION | POST – PROCESS |||| ES | EP | PROCESS ID |
|---|---|---|---|---|---|---|---|---|---|
| ES | EP | RE-POSITION | RESTORE | | BLOCK | SAVE | BID PROCESS | | | |
| 31 | -- | -- | -- | REAL BSP | -- | -- | -- | 20 | -- | 4.31.00 |
| 41 | -4 | SBID+EP | -- | REAL BSP | -- | -- | -- | 00 | -- | 4.41.00 |
| | -3 | -- | -- | EMULATE | -- | -- | -- | 41 | -4 | 4.41.10 |
| | -2 | -- | -- | EMULATE | -- | -- | -- | 41 | -3 | 4.41.20 |
| | -1 | -- | -- | EMULATE | -- | -- | -- | 41 | -2 | 4.41.30 |
| | 0 | -- | -- | EMULATE | -- | -- | -- | 41 | -1 | 4.41.40 |
| 51 | -- | -- | -- | REAL BSP | TM | -- | SBID←REAL BID WHEN (SBID)-(REAL BID)=1 | 61 | 0 | 4.51.00 |
| 61 | -4 | SBID+EP | -- | REAL BSP | -- | -- | -- | 00 | -- | 4.61.00 |
| | -3 | -- | -- | EMULATE | -- | -- | -- | 61 | -4 | 4.61.10 |
| | -2 | -- | -- | EMULATE | -- | -- | -- | 61 | -3 | 4.61.20 |
| | -1 | -- | -- | EMULATE | -- | -- | -- | 61 | -2 | 4.61.30 |
| | 0 | -- | -- | EMULATE | -- | -- | -- | 61 | -1 | 4.61.40 |
| | +1 | -- | -- | EMULATE | -- | -- | -- | 61 | 0 | 4.61.50 |
| 71 | -4 | WTM SBID+EP | -- | REAL BSP | -- | -- | -- | 00 | -- | 4.71.00 |
| | -3 | -- | -- | EMULATE | -- | -- | -- | 71 | -4 | 4.71.10 |
| | -2 | -- | -- | EMULATE | -- | -- | -- | 71 | -3 | 4.71.20 |
| | -1 | -- | -- | EMULATE | -- | -- | -- | 71 | -2 | 4.71.30 |
| | 0 | -- | -- | EMULATE | -- | -- | -- | 71 | -1 | 4.71.40 |
| | +1 | -- | -- | EMULATE | -- | -- | -- | 71 | 0 | 4.71.50 |
| 81 | -4 | SBID+EP | -- | REAL BSP | -- | -- | -- | 00 | -- | 4.81.00 |
| | -3 | -- | -- | EMULATE | -- | -- | -- | 81 | -4 | 4.81.10 |
| | -2 | -- | -- | EMULATE | -- | -- | -- | 81 | -3 | 4.81.20 |
| | -1 | -- | -- | EMULATE | -- | -- | -- | 81 | -2 | 4.81.30 |
| | 0 | -- | -- | EMULATE | -- | -- | -- | 81 | -1 | 4.81.40 |
| | +1 | -- | -- | EMULATE | -- | -- | -- | 81 | 0 | 4.81.50 |

FIG. 226

| PRE - PROCESS | | | | OPERATION | POST - PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 22 | -- | -- | -- | REAL BSP | -- | -- | -- | 10 | -- | 4.22.00 |
| 32 | -- | -- | -- | REAL BSP | -- | -- | -- | 22 | -- | 4.32.00 |
| 42 | -4 | SBID+EP | -- | REAL BSP | -- | -- | -- | 00 | -- | 4.42.00 |
| | -3 | -- | -- | EMULATE | -- | -- | -- | 42 | -4 | 4.42.10 |
| | -2 | -- | -- | EMULATE | -- | -- | -- | 42 | -3 | 4.42.20 |
| | -1 | -- | -- | EMULATE | -- | -- | -- | 42 | -2 | 4.42.30 |
| | 0 | -- | -- | EMULATE | -- | -- | -- | 42 | -1 | 4.42.40 |
| 52 | -- | -- | -- | REAL BSP | TM | -- | SBID←REAL BID WHEN (SBID)-(REAL BID)=1 | 62 | 0 | 4.52.00 |
| 62 | -4 | SBID+EP | -- | REAL BSP | -- | -- | -- | 00 | -- | 4.62.00 |
| | -3 | -- | -- | EMULATE | -- | -- | -- | 62 | -4 | 4.62.10 |
| | -2 | -- | -- | EMULATE | -- | -- | -- | 62 | -3 | 4.62.20 |
| | -1 | -- | -- | EMULATE | -- | -- | -- | 62 | -2 | 4.62.30 |
| | 0 | -- | -- | EMULATE | -- | -- | -- | 62 | -1 | 4.62.40 |
| | +1 | -- | -- | EMULATE | -- | -- | -- | 62 | 0 | 4.62.50 |
| 72 | -4 | WTM SBID+EP | -- | REAL BSP | -- | -- | -- | 00 | -- | 4.72.00 |
| | -3 | -- | -- | EMULATE | -- | -- | -- | 72 | -4 | 4.72.10 |
| | -2 | -- | -- | EMULATE | -- | -- | -- | 72 | -3 | 4.72.20 |
| | -1 | -- | -- | EMULATE | -- | -- | -- | 72 | -2 | 4.72.30 |
| | 0 | -- | -- | EMULATE | -- | -- | -- | 72 | -1 | 4.72.40 |
| | +1 | -- | -- | EMULATE | -- | -- | -- | 72 | 0 | 4.72.50 |
| 82 | -4 | SBID+EP | -- | REAL BSP | -- | -- | -- | 00 | -- | 4.82.00 |
| | -3 | -- | -- | EMULATE | -- | -- | -- | 82 | -4 | 4.82.10 |
| | -2 | -- | -- | EMULATE | -- | -- | -- | 82 | -3 | 4.82.20 |
| | -1 | -- | -- | EMULATE | -- | -- | -- | 82 | -2 | 4.82.30 |
| | 0 | -- | -- | EMULATE | -- | -- | -- | 82 | -1 | 4.82.40 |
| | +1 | -- | -- | EMULATE | -- | -- | -- | 82 | 0 | 4.82.50 |

FIG. 227

| PRE - PROCESS | | | | OPERATION | POST - PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 33 | -- | -- | -- | REAL BSP | -- | -- | -- | 22 | -- | 4.33.00 |
| 43 | -4 | SBID+EP | -- | REAL BSP | -- | -- | -- | 00 | -- | 4.43.00 |
| | -3 | -- | -- | EMULATE | -- | -- | -- | 43 | -4 | 4.43.10 |
| | -2 | -- | -- | EMULATE | -- | -- | -- | 43 | -3 | 4.43.20 |
| | -1 | -- | -- | EMULATE | -- | -- | -- | 43 | -2 | 4.43.30 |
| | 0 | -- | -- | EMULATE | -- | -- | -- | 43 | -1 | 4.43.40 |
| 53 | -- | -- | -- | REAL BSP | TM | -- | SBID←REAL BID WHEN (SBID)-(REAL BID)=1 | 63 | 0 | 4.53.00 |
| 63 | -4 | SBID+EP | -- | REAL BSP | -- | -- | -- | 00 | -- | 4.63.00 |
| | -3 | -- | -- | EMULATE | -- | -- | -- | 63 | -4 | 4.63.10 |
| | -2 | -- | -- | EMULATE | -- | -- | -- | 63 | -3 | 4.63.20 |
| | -1 | -- | -- | EMULATE | -- | -- | -- | 63 | -2 | 4.63.30 |
| | 0 | -- | -- | EMULATE | -- | -- | -- | 63 | -1 | 4.63.40 |
| | +1 | -- | -- | EMULATE | -- | -- | -- | 63 | 0 | 4.63.50 |
| 73 | -4 | WTM SBID+EP | -- | REAL BSP | -- | -- | -- | 00 | -- | 4.73.00 |
| | -3 | -- | -- | EMULATE | -- | -- | -- | 73 | -4 | 4.73.10 |
| | -2 | -- | -- | EMULATE | -- | -- | -- | 73 | -3 | 4.73.20 |
| | -1 | -- | -- | EMULATE | -- | -- | -- | 73 | -2 | 4.73.30 |
| | 0 | -- | -- | EMULATE | -- | -- | -- | 73 | -1 | 4.73.40 |
| | +1 | -- | -- | EMULATE | -- | -- | -- | 73 | 0 | 4.73.50 |
| 83 | -4 | SBID+EP | -- | REAL BSP | -- | -- | -- | 00 | -- | 4.83.00 |
| | -3 | -- | -- | EMULATE | -- | -- | -- | 83 | -4 | 4.83.10 |
| | -2 | -- | -- | EMULATE | -- | -- | -- | 83 | -3 | 4.83.20 |
| | -1 | -- | -- | EMULATE | -- | -- | -- | 83 | -2 | 4.83.30 |
| | 0 | -- | -- | EMULATE | -- | -- | -- | 83 | -1 | 4.83.40 |
| | +1 | -- | -- | EMULATE | -- | -- | -- | 83 | 0 | 4.83.50 |

FIG. 228

| PRE - PROCESS | | | | OPERATION | POST - PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 00 | -- | -- | -- | REAL BSPF | -- | -- | -- | 00 | -- | 5.00.00 |
| 10 | -- | -- | -- | REAL BSPF | -- | -- | -- | 00 | -- | 5.10.00 |
| 20 | -- | -- | -- | REAL BSPF | -- | -- | -- | 00 | -- | 5.20.00 |
| 30 | -- | -- | -- | REAL BSPF | -- | -- | -- | 00 | -- | 5.30.00 |
| 40 | -4 | SBID+EP | -- | REAL BSPF | -- | -- | -- | 00 | -- | 5.40.00 |
| | -3 | -- | -- | EMULATE | -- | -- | -- | 40 | -4 | 5.40.10 |
| | -2 | -- | -- | EMULATE | -- | -- | -- | 40 | -4 | 5.40.20 |
| | -1 | -- | -- | EMULATE | -- | -- | -- | 40 | -4 | 5.40.30 |
| | 0 | -- | -- | EMULATE | -- | -- | -- | 40 | -1 | 5.40.40 |
| 50 | -- | -- | -- | REAL BSPF | TM | -- | SBID←REAL BID WHEN (SBID)-(REAL BID)=1 | 60 | 0 | 5.50.00 |
| 60 | -4 | SBID+EP | -- | REAL BSPF | -- | -- | -- | 00 | -- | 5.60.00 |
| | -3 | -- | -- | EMULATE | -- | -- | -- | 60 | -4 | 5.60.10 |
| | -2 | -- | -- | EMULATE | -- | -- | -- | 60 | -4 | 5.60.20 |
| | -1 | -- | -- | EMULATE | -- | -- | -- | 60 | -4 | 5.60.30 |
| | 0 | -- | -- | EMULATE | -- | -- | -- | 60 | -1 | 5.60.40 |
| | +1 | -- | -- | EMULATE | -- | -- | -- | 60 | 0 | 5.60.50 |
| 70 | -4 | WTM SBID+EP | -- | REAL BSPF | -- | -- | -- | 00 | -- | 5.70.00 |
| | -3 | -- | -- | EMULATE | -- | -- | -- | 70 | -4 | 5.70.10 |
| | -2 | -- | -- | EMULATE | -- | -- | -- | 70 | -4 | 5.70.20 |
| | -1 | -- | -- | EMULATE | -- | -- | -- | 70 | -4 | 5.70.30 |
| | 0 | -- | -- | EMULATE | -- | -- | -- | 70 | -1 | 5.70.40 |
| | +1 | -- | -- | EMULATE | -- | -- | -- | 70 | 0 | 5.70.50 |
| 80 | -4 | SBID+EP | -- | REAL BSPF | -- | -- | -- | 00 | -- | 5.80.00 |
| | -3 | -- | -- | EMULATE | -- | -- | -- | 80 | -4 | 5.80.10 |
| | -2 | -- | -- | EMULATE | -- | -- | -- | 80 | -4 | 5.80.20 |
| | -1 | -- | -- | EMULATE | -- | -- | -- | 80 | -4 | 5.80.30 |
| | 0 | -- | -- | EMULATE | -- | -- | -- | 80 | -1 | 5.80.40 |
| | +1 | -- | -- | EMULATE | -- | -- | -- | 80 | 0 | 5.80.50 |

FIG. 229

| PRE - PROCESS | | | | OPERATION | POST - PROCESS | | | ES | EP | PROCESS ID |
|---|---|---|---|---|---|---|---|---|---|---|
| ES | EP | RE-POSITION | RESTORE | | BLOCK | SAVE | BID PROCESS | | | |
| 31 | -- | -- | -- | REAL BSPF | -- | -- | -- | 00 | -- | 5.31.00 |
| 41 | -4 | SBID+EP | -- | REAL BSPF | -- | -- | -- | 00 | -- | 5.41.00 |
| | -3 | -- | -- | EMULATE | -- | -- | -- | 41 | -4 | 5.41.10 |
| | -2 | -- | -- | EMULATE | -- | -- | -- | 41 | -4 | 5.41.20 |
| | -1 | -- | -- | EMULATE | -- | -- | -- | 41 | -4 | 5.41.30 |
| | 0 | -- | -- | EMULATE | -- | -- | -- | 41 | -1 | 5.41.40 |
| 51 | -- | -- | -- | REAL BSPF | TM | -- | SBID←REAL BID WHEN (SBID)-(REAL BID)=1 | 61 | -- | 5.51.00 |
| 61 | -4 | SBID+EP | -- | REAL BSPF | -- | -- | -- | 00 | -- | 5.61.00 |
| | -3 | -- | -- | EMULATE | -- | -- | -- | 61 | -4 | 5.61.10 |
| | -2 | -- | -- | EMULATE | -- | -- | -- | 61 | -4 | 5.61.20 |
| | -1 | -- | -- | EMULATE | -- | -- | -- | 61 | -4 | 5.61.30 |
| | 0 | -- | -- | EMULATE | -- | -- | -- | 61 | -1 | 5.61.40 |
| | +1 | -- | -- | EMULATE | -- | -- | -- | 61 | 0 | 5.61.50 |
| 71 | -4 | WTM SBID+EP | -- | REAL BSPF | -- | -- | -- | 00 | -- | 5.71.00 |
| | -3 | -- | -- | EMULATE | -- | -- | -- | 71 | -4 | 5.71.10 |
| | -2 | -- | -- | EMULATE | -- | -- | -- | 71 | -4 | 5.71.20 |
| | -1 | -- | -- | EMULATE | -- | -- | -- | 71 | -4 | 5.71.30 |
| | 0 | -- | -- | EMULATE | -- | -- | -- | 71 | -1 | 5.71.40 |
| | +1 | -- | -- | EMULATE | -- | -- | -- | 71 | 0 | 5.71.50 |
| 81 | -4 | SBID+EP | -- | REAL BSPF | -- | -- | -- | 00 | -- | 5.81.00 |
| | -3 | -- | -- | EMULATE | -- | -- | -- | 81 | -4 | 5.81.10 |
| | -2 | -- | -- | EMULATE | -- | -- | -- | 81 | -4 | 5.81.20 |
| | -1 | -- | -- | EMULATE | -- | -- | -- | 81 | -4 | 5.81.30 |
| | 0 | -- | -- | EMULATE | -- | -- | -- | 81 | -1 | 5.81.40 |
| | +1 | -- | -- | EMULATE | -- | -- | -- | 81 | 0 | 5.81.50 |

FIG. 230

| PRE - PROCESS | | | OPERATION | POST - PROCESS | | | | | PROCESS ID |
|---|---|---|---|---|---|---|---|---|---|
| ES | EP | RE-POSITION | RESTORE | | BLOCK | SAVE | BID PROCESS | ES | EP | |
| 22 | -- | -- | -- | REAL BSPF | -- | -- | -- | 00 | -- | 5.22.00 |
| 32 | -- | -- | -- | REAL BSPF | -- | -- | -- | 00 | -- | 5.32.00 |
| 42 | -4 | SBID+EP | -- | REAL BSPF | -- | -- | -- | 00 | -- | 5.42.00 |
| | -3 | -- | -- | EMULATE | -- | -- | -- | 42 | -4 | 5.42.10 |
| | -2 | -- | -- | EMULATE | -- | -- | -- | 42 | -4 | 5.42.20 |
| | -1 | -- | -- | EMULATE | -- | -- | -- | 42 | -4 | 5.42.30 |
| | 0 | -- | -- | EMULATE | -- | -- | -- | 42 | -1 | 5.42.40 |
| 52 | -- | -- | -- | REAL BSPF | TM | -- | SBID←REAL BID WHEN (SBID)-(REAL BID)=1 | 62 | -- | 5.52.00 |
| 62 | -4 | SBID+EP | -- | REAL BSPF | -- | -- | -- | 00 | -- | 5.62.00 |
| | -3 | -- | -- | EMULATE | -- | -- | -- | 62 | -4 | 5.62.10 |
| | -2 | -- | -- | EMULATE | -- | -- | -- | 62 | -4 | 5.62.20 |
| | -1 | -- | -- | EMULATE | -- | -- | -- | 62 | -4 | 5.62.30 |
| | 0 | -- | -- | EMULATE | -- | -- | -- | 62 | -1 | 5.62.40 |
| | +1 | -- | -- | EMULATE | -- | -- | -- | 62 | 0 | 5.62.50 |
| 72 | -4 | WTM SBID+EP | -- | REAL BSPF | -- | -- | -- | 00 | -- | 5.72.00 |
| | -3 | -- | -- | EMULATE | -- | -- | -- | 72 | -4 | 5.72.10 |
| | -2 | -- | -- | EMULATE | -- | -- | -- | 72 | -4 | 5.72.20 |
| | -1 | -- | -- | EMULATE | -- | -- | -- | 72 | -4 | 5.72.30 |
| | 0 | -- | -- | EMULATE | -- | -- | -- | 72 | -1 | 5.72.40 |
| | +1 | -- | -- | EMULATE | -- | -- | -- | 72 | 0 | 5.72.50 |
| 82 | -4 | SBID+EP | -- | REAL BSPF | -- | -- | -- | 00 | -- | 5.82.00 |
| | -3 | -- | -- | EMULATE | -- | -- | -- | 82 | -4 | 5.82.10 |
| | -2 | -- | -- | EMULATE | -- | -- | -- | 82 | -4 | 5.82.20 |
| | -1 | -- | -- | EMULATE | -- | -- | -- | 82 | -4 | 5.82.30 |
| | 0 | -- | -- | EMULATE | -- | -- | -- | 82 | -1 | 5.82.40 |
| | +1 | -- | -- | EMULATE | -- | -- | -- | 82 | 0 | 5.82.50 |

FIG. 231

| PRE - PROCESS | | | OPERATION | POST - PROCESS | | | | | PROCESS ID |
|---|---|---|---|---|---|---|---|---|---|
| ES | EP | RE-POSITION | RESTORE | | BLOCK | SAVE | BID PROCESS | ES | EP | |
| 33 | -- | -- | -- | REAL BSPF | -- | -- | -- | 00 | -- | 5.33.00 |
| 43 | -4 | SBID+EP | -- | REAL BSPF | -- | -- | -- | 00 | -- | 5.43.00 |
|  | -3 | -- | -- | EMULATE | -- | -- | -- | 43 | -4 | 5.43.10 |
|  | -2 | -- | -- | EMULATE | -- | -- | -- | 43 | -4 | 5.43.20 |
|  | -1 | -- | -- | EMULATE | -- | -- | -- | 43 | -4 | 5.43.30 |
|  | 0 | -- | -- | EMULATE | -- | -- | -- | 43 | -1 | 5.43.40 |
| 53 | -- | -- | -- | REAL BSPF | TM | -- | SBID←REAL BID WHEN (SBID)−(REAL BID)=1 | 63 | -- | 5.53.00 |
| 63 | -4 | SBID+EP | -- | REAL BSPF | -- | -- | -- | 00 | -- | 5.63.00 |
|  | -3 | -- | -- | EMULATE | -- | -- | -- | 63 | -4 | 5.63.10 |
|  | -2 | -- | -- | EMULATE | -- | -- | -- | 63 | -4 | 5.63.20 |
|  | -1 | -- | -- | EMULATE | -- | -- | -- | 63 | -4 | 5.63.30 |
|  | 0 | -- | -- | EMULATE | -- | -- | -- | 63 | -1 | 5.63.40 |
|  | +1 | -- | -- | EMULATE | -- | -- | -- | 63 | 0 | 5.63.50 |
| 73 | -4 | WTM SBID+EP | -- | REAL BSPF | -- | -- | -- | 00 | -- | 5.73.00 |
|  | -3 | -- | -- | EMULATE | -- | -- | -- | 73 | -4 | 5.73.10 |
|  | -2 | -- | -- | EMULATE | -- | -- | -- | 73 | -4 | 5.73.20 |
|  | -1 | -- | -- | EMULATE | -- | -- | -- | 73 | -4 | 5.73.30 |
|  | 0 | -- | -- | EMULATE | -- | -- | -- | 73 | -1 | 5.73.40 |
|  | +1 | -- | -- | EMULATE | -- | -- | -- | 73 | 0 | 5.73.50 |
| 83 | -4 | SBID+EP | -- | REAL BSPF | -- | -- | -- | 00 | -- | 5.83.00 |
|  | -3 | -- | -- | EMULATE | -- | -- | -- | 83 | -4 | 5.83.10 |
|  | -2 | -- | -- | EMULATE | -- | -- | -- | 83 | -4 | 5.83.20 |
|  | -1 | -- | -- | EMULATE | -- | -- | -- | 83 | -4 | 5.83.30 |
|  | 0 | -- | -- | EMULATE | -- | -- | -- | 83 | -1 | 5.83.40 |
|  | +1 | -- | -- | EMULATE | -- | -- | -- | 83 | 0 | 5.83.50 |

FIG. 232

| PRE - PROCESS | | | | OPERATION | POST - PROCESS | | | ES | EP | PROCESS ID |
|---|---|---|---|---|---|---|---|---|---|---|
| ES | EP | RE-POSITION | RESTORE | | BLOCK | SAVE | BID PROCESS | | | |
| 00 | -- | -- | -- | REAL SP | TM | -- | SBID←REAL BID | 10 | -- | 6.00.00 |
| | | | | | OTHERS | -- | -- | 00 | -- | 6.00.01 |
| 10 | -- | -- | -- | REAL SP | EOF | -- | -- | 22 | -- | 6.10.00 |
| | | | | | TM | -- | SBID←REAL BID | 10 | -- | 6.10.01 |
| | | | | | OTHERS | -- | -- | 00 | -- | 6.10.02 |
| 20 | -- | -- | -- | REAL SP | EOF | -- | -- | 31 | -- | 6.20.00 |
| | | | | | TM | -- | SBID←REAL BID | 10 | -- | 6.20.01 |
| | | | | | OTHERS | -- | -- | 00 | -- | 6.20.02 |
| 30 | -- | -- | -- | REAL SP | TM | -- | SBID←REAL BID WHEN (REAL BID)-(SBID)=3 | 40 | 0 | 6.30.00 |
| | | | | | OTHERS | -- | -- | 00 | -- | 6.30.01 |
| 40 | -4 | -- | -- | EMULATE | -- | -- | -- | 40 | -3 | 6.40.00 |
| | -3 | -- | -- | EMULATE | -- | -- | -- | 40 | -2 | 6.40.10 |
| | -2 | -- | -- | EMULATE | -- | -- | -- | 40 | -1 | 6.40.20 |
| | -1 | -- | -- | EMULATE | -- | -- | -- | 40 | 0 | 6.40.30 |
| | 0 | -- | -- | REAL SP | EOF | -- | -- | 22 | -- | 6.40.40 |
| | | | | | TM | -- | SBID←REAL BID WHEN (REAL BID)-(SBID)=1 | 50 | -- | 6.40.41 |
| | | | | | OTHERS | -- | -- | 00 | -- | 6.40.42 |
| | | | | | EOD | -- | -- | 80 | +1 | 6.40.43 |
| 50 | -- | -- | -- | REAL SP | EOF | -- | -- | 22 | -- | 6.50.00 |
| | | | | | TM | -- | SBID←REAL BID | 10 | -- | 6.50.01 |
| | | | | | OTHERS | -- | -- | 00 | -- | 6.50.02 |
| 60 | -4 | -- | -- | EMULATE | -- | -- | -- | 60 | -3 | 6.60.00 |
| | -3 | -- | -- | EMULATE | -- | -- | -- | 60 | -2 | 6.60.10 |
| | -2 | -- | -- | EMULATE | -- | -- | -- | 60 | -1 | 6.60.20 |
| | -1 | -- | -- | EMULATE | -- | -- | -- | 60 | 0 | 6.60.30 |
| | 0 | -- | -- | EMULATE | -- | -- | -- | 60 | +1 | 6.60.40 |
| | +1 | SBID+EP | -- | REAL SP | EOF | -- | SBID+1 | 22 | -- | 6.60.50 |
| | | | | | TM | -- | SBID←REAL BID | 10 | -- | 6.60.51 |
| | | | | | OTHERS | -- | -- | 00 | -- | 6.60.52 |

FIG. 233

| PRE - PROCESS | | | | OPERATION | POST - PROCESS | | | ES | EP | PROCESS ID |
|---|---|---|---|---|---|---|---|---|---|---|
| ES | EP | RE-POSITION | RESTORE | | BLOCK | SAVE | BID PROCESS | | | |
| 70 | -4 | -- | -- | EMULATE | -- | -- | -- | 70 | -3 | 6.70.00 |
| | -3 | -- | -- | EMULATE | -- | -- | -- | 70 | -2 | 6.70.10 |
| | -2 | -- | -- | EMULATE | -- | -- | -- | 70 | -1 | 6.70.20 |
| | -1 | -- | -- | EMULATE | -- | -- | -- | 70 | 0 | 6.70.30 |
| | 0 | -- | -- | EMULATE | -- | -- | -- | 70 | +1 | 6.70.40 |
| | +1 | WTM | -- | REAL SP | EOF | -- | SBID+1 | 22 | -- | 6.70.50 |
| | | | | | TM | -- | SBID←REAL BID | 10 | -- | 6.70.51 |
| | | | | | OTHERS | -- | -- | 00 | -- | 6.70.52 |
| 80 | -4 | -- | -- | EMULATE | -- | -- | -- | 80 | -3 | 6.80.00 |
| | -3 | -- | -- | EMULATE | -- | -- | -- | 80 | -2 | 6.80.10 |
| | -2 | -- | -- | EMULATE | -- | -- | -- | 80 | -1 | 6.80.20 |
| | -1 | -- | -- | EMULATE | -- | -- | -- | 80 | 0 | 6.80.30 |
| | 0 | -- | -- | EMULATE | -- | -- | -- | 80 | +1 | 6.80.40 |
| | +1 | -- | -- | REAL SP | EOD | -- | -- | 00 | -- | 6.80.50 |

FIG. 234

| PRE - PROCESS | | | | OPERATION | POST - PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 31 | -- | -- | -- | REAL SP | TM | -- | SBID←REAL BID WHEN (REAL BID)-(SBID)=3 | 41 | 0 | 6.31.00 |
| | | | | | OTHERS | -- | -- | 00 | -- | 6.31.01 |
| 41 | -4 | -- | -- | EMULATE | -- | -- | -- | 41 | -3 | 6.41.00 |
| | -3 | -- | -- | EMULATE | -- | -- | -- | 41 | -2 | 6.41.10 |
| | -2 | -- | -- | EMULATE | -- | -- | -- | 41 | -1 | 6.41.20 |
| | -1 | -- | -- | EMULATE | -- | -- | -- | 41 | 0 | 6.41.30 |
| | 0 | -- | -- | REAL SP | EOF | -- | -- | 22 | -- | 6.41.40 |
| | | | | | TM | -- | SBID←REAL BID WHEN (REAL BID)-(SBID)=1 | 51 | -- | 6.41.41 |
| | | | | | OTHERS | -- | -- | 00 | -- | 6.41.42 |
| | | | | | EOD | -- | -- | 81 | +1 | 6.41.43 |
| 51 | -- | -- | -- | REAL SP | EOF | -- | -- | 22 | -- | 6.51.00 |
| | | | | | TM | -- | SBID←REAL BID | 10 | -- | 6.51.01 |
| | | | | | OTHERS | -- | -- | 00 | -- | 6.51.02 |
| 61 | -4 | -- | -- | EMULATE | -- | -- | -- | 61 | -3 | 6.61.00 |
| | -3 | -- | -- | EMULATE | -- | -- | -- | 61 | -2 | 6.61.10 |
| | -2 | -- | -- | EMULATE | -- | -- | -- | 61 | -1 | 6.61.20 |
| | -1 | -- | -- | EMULATE | -- | -- | -- | 61 | 0 | 6.61.30 |
| | 0 | -- | -- | EMULATE | -- | -- | -- | 61 | +1 | 6.61.40 |
| | +1 | SBID+EP | -- | REAL SP | EOF | -- | SBID+1 | 22 | -- | 6.61.50 |
| | | | | | TM | -- | SBID←REAL BID | 10 | -- | 6.61.51 |
| | | | | | OTHERS | -- | -- | 00 | -- | 6.61.52 |

FIG. 235

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 71 | -4 | -- | -- | EMULATE | -- | -- | -- | 71 | -3 | 6.71.00 |
|  | -3 | -- | -- | EMULATE | -- | -- | -- | 71 | -2 | 6.71.10 |
|  | -2 | -- | -- | EMULATE | -- | -- | -- | 71 | -1 | 6.71.20 |
|  | -1 | -- | -- | EMULATE | -- | -- | -- | 71 | 0 | 6.71.30 |
|  | 0 | -- | -- | EMULATE | -- | -- | -- | 71 | +1 | 6.71.40 |
|  | +1 | WTM | -- | REAL SP | EOF | -- | SBID+1 | 22 | -- | 6.71.50 |
|  |  |  |  |  | TM | -- | SBID←REAL BID | 10 | -- | 6.71.51 |
|  |  |  |  |  | OTHERS | -- | -- | 00 | -- | 6.71.52 |
| 81 | -4 | -- | -- | EMULATE | -- | -- | -- | 81 | -3 | 6.81.00 |
|  | -3 | -- | -- | EMULATE | -- | -- | -- | 81 | -2 | 6.81.10 |
|  | -2 | -- | -- | EMULATE | -- | -- | -- | 81 | -1 | 6.81.20 |
|  | -1 | -- | -- | EMULATE | -- | -- | -- | 81 | 0 | 6.81.30 |
|  | 0 | -- | -- | EMULATE | -- | -- | -- | 81 | +1 | 6.81.40 |
|  | +1 | -- | -- | REAL SP | EOD | -- | -- | 00 | -- | 6.81.50 |

FIG. 236

| PRE - PROCESS | | | | OPERATION | POST - PROCESS | | | ES | EP | PROCESS ID |
|---|---|---|---|---|---|---|---|---|---|---|
| ES | EP | RE-POSITION | RESTORE | | BLOCK | SAVE | BID PROCESS | | | |
| 22 | -- | -- | -- | REAL SP | EOF | -- | -- | 33 | -- | 6.22.00 |
| | | | | | TM | -- | SBID←REAL BID | 10 | -- | 6.22.01 |
| | | | | | OTHERS | -- | -- | 00 | -- | 6.22.02 |
| 32 | -- | -- | -- | REAL SP | TM | -- | SBID←REAL BID WHEN (REAL BID)-(SBID)=3 | 42 | 0 | 6.32.00 |
| | | | | | OTHERS | -- | -- | 00 | -- | 6.32.01 |
| 42 | -4 | -- | -- | EMULATE | -- | -- | -- | 42 | -3 | 6.42.00 |
| | -3 | -- | -- | EMULATE | -- | -- | -- | 42 | -2 | 6.42.10 |
| | -2 | -- | -- | EMULATE | -- | -- | -- | 42 | -1 | 6.42.20 |
| | -1 | -- | -- | EMULATE | -- | -- | -- | 42 | 0 | 6.42.30 |
| | 0 | -- | -- | REAL SP | EOF | -- | -- | 22 | -- | 6.42.40 |
| | | | | | TM | -- | SBID←REAL BID WHEN (REAL BID)-(SBID)=1 | 52 | -- | 6.42.41 |
| | | | | | OTHERS | -- | -- | 00 | -- | 6.42.42 |
| | | | | | EOD | -- | -- | 82 | +1 | 6.42.43 |
| 52 | -- | -- | -- | REAL SP | EOF | -- | -- | 22 | -- | 6.52.00 |
| | | | | | TM | -- | SBID←REAL BID | 10 | -- | 6.52.01 |
| | | | | | OTHERS | -- | -- | 00 | -- | 6.52.02 |
| 62 | -4 | -- | -- | EMULATE | -- | -- | -- | 62 | -3 | 6.62.00 |
| | -3 | -- | -- | EMULATE | -- | -- | -- | 62 | -2 | 6.62.10 |
| | -2 | -- | -- | EMULATE | -- | -- | -- | 62 | -1 | 6.62.20 |
| | -1 | -- | -- | EMULATE | -- | -- | -- | 62 | 0 | 6.62.30 |
| | 0 | -- | -- | EMULATE | -- | -- | -- | 62 | +1 | 6.62.40 |
| | +1 | SBID+EP | -- | REAL SP | EOF | -- | SBID+1 | 22 | -- | 6.62.50 |
| | | | | | TM | -- | SBID←REAL BID | 10 | -- | 6.62.51 |
| | | | | | OTHERS | -- | -- | 00 | -- | 6.62.52 |

FIG. 237

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 72 | -4 | -- | -- | EMULATE | -- | -- | -- | 72 | -3 | 6.72.00 |
| | -3 | -- | -- | EMULATE | -- | -- | -- | 72 | -2 | 6.72.10 |
| | -2 | -- | -- | EMULATE | -- | -- | -- | 72 | -1 | 6.72.20 |
| | -1 | -- | -- | EMULATE | -- | -- | -- | 72 | 0 | 6.72.30 |
| | 0 | -- | -- | EMULATE | -- | -- | -- | 72 | +1 | 6.72.40 |
| | +1 | WTM | -- | REAL SP | EOF | -- | SBID+1 | 22 | -- | 6.72.50 |
| | | | | | TM | -- | SBID←REAL BID | 10 | -- | 6.72.51 |
| | | | | | OTHERS | -- | -- | 00 | -- | 6.72.52 |
| 82 | -4 | -- | -- | EMULATE | -- | -- | -- | 82 | -3 | 6.82.00 |
| | -3 | -- | -- | EMULATE | -- | -- | -- | 82 | -2 | 6.82.10 |
| | -2 | -- | -- | EMULATE | -- | -- | -- | 82 | -1 | 6.82.20 |
| | -1 | -- | -- | EMULATE | -- | -- | -- | 82 | 0 | 6.82.30 |
| | 0 | -- | -- | EMULATE | -- | -- | -- | 82 | +1 | 6.82.40 |
| | +1 | -- | -- | REAL SP | EOD | -- | -- | 00 | -- | 6.82.50 |

FIG. 238

| PRE – PROCESS | | | | OPERATION | POST – PROCESS | | | ES | EP | PROCESS ID |
|---|---|---|---|---|---|---|---|---|---|---|
| ES | EP | RE-POSITION | RESTORE | | BLOCK | SAVE | BID PROCESS | | | |
| 33 | -- | -- | -- | REAL SP | TM | -- | SBID←REAL BID WHEN (REAL BID)-(SBID)=3 | 43 | 0 | 6.33.00 |
| | | | | | OTHERS | -- | -- | 00 | -- | 6.33.01 |
| 43 | -4 | -- | -- | EMULATE | -- | -- | -- | 43 | -3 | 6.43.00 |
| | -3 | -- | -- | EMULATE | -- | -- | -- | 43 | -2 | 6.43.10 |
| | -2 | -- | -- | EMULATE | -- | -- | -- | 43 | -1 | 6.43.20 |
| | -1 | -- | -- | EMULATE | -- | -- | -- | 43 | 0 | 6.43.30 |
| | 0 | -- | -- | REAL SP | EOF | -- | -- | 22 | -- | 6.43.40 |
| | | | | | TM | -- | SBID←REAL BID WHEN (REAL BID)-(SBID)=1 | 53 | -- | 6.43.41 |
| | | | | | OTHERS | -- | -- | 00 | -- | 6.43.42 |
| | | | | | EOD | -- | -- | 83 | +1 | 6.43.43 |
| 53 | -- | -- | -- | REAL SP | EOF | -- | -- | 22 | -- | 6.53.00 |
| | | | | | TM | -- | SBID←REAL BID | 10 | -- | 6.53.01 |
| | | | | | OTHERS | -- | -- | 00 | -- | 6.53.02 |
| 63 | -4 | -- | -- | EMULATE | -- | -- | -- | 63 | -3 | 6.63.00 |
| | -3 | -- | -- | EMULATE | -- | -- | -- | 63 | -2 | 6.63.10 |
| | -2 | -- | -- | EMULATE | -- | -- | -- | 63 | -1 | 6.63.20 |
| | -1 | -- | -- | EMULATE | -- | -- | -- | 63 | 0 | 6.63.30 |
| | 0 | -- | -- | EMULATE | -- | -- | -- | 63 | +1 | 6.63.40 |
| | +1 | SBID+EP | -- | REAL SP | EOF | -- | SBID+1 | 22 | -- | 6.63.50 |
| | | | | | TM | -- | SBID←REAL BID | 10 | -- | 6.63.51 |
| | | | | | OTHERS | -- | -- | 00 | -- | 6.63.52 |

FIG. 239

| PRE – PROCESS | | | | OPERATION | POST – PROCESS | | | ES | EP | PROCESS ID |
|---|---|---|---|---|---|---|---|---|---|---|
| ES | EP | RE-POSITION | RESTORE | | BLOCK | SAVE | BID PROCESS | | | |
| 73 | -4 | -- | -- | EMULATE | -- | -- | -- | 73 | -3 | 6.73.00 |
| | -3 | -- | -- | EMULATE | -- | -- | -- | 73 | -2 | 6.73.10 |
| | -2 | -- | -- | EMULATE | -- | -- | -- | 73 | -1 | 6.73.20 |
| | -1 | -- | -- | EMULATE | -- | -- | -- | 73 | 0 | 6.73.30 |
| | 0 | -- | -- | EMULATE | -- | -- | -- | 73 | +1 | 6.73.40 |
| | +1 | WTM | -- | REAL SP | EOF | -- | SBID+1 | 22 | -- | 6.73.50 |
| | | | | | TM | -- | SBID←REAL BID | 10 | -- | 6.73.51 |
| | | | | | OTHERS | -- | -- | 00 | -- | 6.73.52 |
| 83 | -4 | -- | -- | EMULATE | -- | -- | -- | 83 | -3 | 6.83.00 |
| | -3 | -- | -- | EMULATE | -- | -- | -- | 83 | -2 | 6.83.10 |
| | -2 | -- | -- | EMULATE | -- | -- | -- | 83 | -1 | 6.83.20 |
| | -1 | -- | -- | EMULATE | -- | -- | -- | 83 | 0 | 6.83.30 |
| | 0 | -- | -- | EMULATE | -- | -- | -- | 83 | +1 | 6.83.40 |
| | +1 | -- | -- | REAL SP | EOD | -- | -- | 00 | -- | 6.83.50 |

FIG. 240

| PRE - PROCESS ||||  OPERATION | POST - PROCESS |||||| PROCESS ID |
|---|---|---|---|---|---|---|---|---|---|---|
| ES | EP | RE-POSITION | RESTORE | | BLOCK | SAVE | BID PROCESS | ES | EP | |
| 00 | -- | -- | -- | REAL FSPF | TM | -- | SBID←REAL BID | 10 | -- | 7.00.00 |
| | | | | | OTHERS | -- | -- | 00 | -- | 7.00.01 |
| 10 | -- | -- | -- | REAL FSPF | TM | -- | SBID←REAL BID WHEN (REAL BID)-(SBID)=3 | 43 | 0 | 7.10.00 |
| | | | | | | -- | SBID←REAL BID WHEN (REAL BID)-(SBID)≠3 | 10 | -- | 7.10.01 |
| | | | | | OTHERS | -- | -- | 00 | -- | 7.10.02 |
| 20 | -- | -- | -- | REAL FSPF | TM | -- | SBID←REAL BID WHEN (REAL BID)-(SBID)=3 | 41 | 0 | 7.20.00 |
| | | | | | | -- | SBID←REAL BID WHEN (REAL BID)-(SBID)≠3 | 10 | -- | 7.20.01 |
| | | | | | OTHERS | -- | -- | 00 | -- | 7.20.02 |
| 30 | -- | -- | -- | REAL FSPF | TM | -- | SBID←REAL BID WHEN (REAL BID)-(SBID)=3 | 40 | 0 | 7.30.00 |
| | | | | | | -- | SBID←REAL BID WHEN (REAL BID)-(SBID)≠3 | 10 | -- | 7.30.01 |
| | | | | | OTHERS | -- | -- | 00 | -- | 7.30.02 |
| 40 | -4 | -- | -- | EMULATE | -- | -- | -- | 40 | -3 | 7.40.00 |
| | -3 | -- | -- | EMULATE | -- | -- | -- | 40 | 0 | 7.40.10 |
| | -2 | -- | -- | EMULATE | -- | -- | -- | 40 | 0 | 7.40.20 |
| | -1 | -- | -- | EMULATE | -- | -- | -- | 40 | 0 | 7.40.30 |
| | 0 | -- | -- | REAL FSPF | TM | -- | SBID←REAL BID WHEN (REAL BID)-(SBID)=3 | 43 | 0 | 7.40.40 |
| | | | | | | -- | SBID←REAL BID WHEN (REAL BID)-(SBID)=1 | 50 | -- | 7.40.41 |
| | | | | | | -- | SBID←REAL BID WHEN (REAL BID)-(SBID)≠1AND3 | 10 | -- | 7.40.42 |
| | | | | | OTHERS | -- | -- | 00 | -- | 7.40.43 |
| | | | | | EOD | -- | -- | 80 | +1 | 7.40.44 |
| 50 | -- | -- | -- | REAL FSPF | TM | -- | SBID←REAL BID WHEN (REAL BID)-(SBID)=3 | 43 | 0 | 7.50.00 |
| | | | | | | -- | SBID←REAL BID WHEN (REAL BID)-(SBID)≠3 | 10 | -- | 7.50.01 |
| | | | | | OTHERS | -- | -- | 00 | -- | 7.50.02 |

FIG. 241

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 60 | -4 | -- | -- | EMULATE | -- | -- | -- | 60 | -3 | 7.60.00 |
| | -3 | -- | -- | EMULATE | -- | -- | -- | 60 | 0 | 7.60.10 |
| | -2 | -- | -- | EMULATE | -- | -- | -- | 60 | 0 | 7.60.20 |
| | -1 | -- | -- | EMULATE | -- | -- | -- | 60 | 0 | 7.60.30 |
| | 0 | -- | -- | EMULATE | -- | -- | -- | 60 | +1 | 7.60.40 |
| | +1 | SBID+EP | -- | REAL FSPF | TM | -- | SBID←REAL BID WHEN (REAL BID)-(SBID)=3 | 43 | 0 | 7.60.50 |
| | | | | | | -- | SBID←REAL BID WHEN (REAL BID)-(SBID)≠3 | 10 | -- | 7.60.51 |
| | | | | | OTHERS | -- | -- | 00 | -- | 7.60.52 |
| 70 | -4 | -- | -- | EMULATE | -- | -- | -- | 70 | -3 | 7.70.00 |
| | -3 | -- | -- | EMULATE | -- | -- | -- | 70 | 0 | 7.70.10 |
| | -2 | -- | -- | EMULATE | -- | -- | -- | 70 | 0 | 7.70.20 |
| | -1 | -- | -- | EMULATE | -- | -- | -- | 70 | 0 | 7.70.30 |
| | 0 | -- | -- | EMULATE | -- | -- | -- | 70 | +1 | 7.70.40 |
| | +1 | WTM | -- | REAL FSPF | TM | -- | SBID←REAL BID WHEN (REAL BID)-(SBID)=3 | 43 | 0 | 7.70.50 |
| | | | | | | -- | SBID←REAL BID WHEN (REAL BID)-(SBID)≠3 | 10 | -- | 7.70.51 |
| | | | | | OTHERS | -- | -- | 00 | -- | 7.70.52 |
| 80 | -4 | -- | -- | EMULATE | -- | -- | -- | 80 | -3 | 7.80.00 |
| | -3 | -- | -- | EMULATE | -- | -- | -- | 80 | 0 | 7.80.10 |
| | -2 | -- | -- | EMULATE | -- | -- | -- | 80 | 0 | 7.80.20 |
| | -1 | -- | -- | EMULATE | -- | -- | -- | 80 | 0 | 7.80.30 |
| | 0 | -- | -- | EMULATE | -- | -- | -- | 80 | +1 | 7.80.40 |
| | +1 | -- | -- | REAL FSPF | EOD | -- | -- | 00 | -- | 7.80.50 |

FIG. 242

| PRE - PROCESS | | | OPERATION | POST - PROCESS | | | ES | EP | PROCESS ID |
|---|---|---|---|---|---|---|---|---|---|
| ES | EP | RE-POSITION | RESTORE | | BLOCK | SAVE | BID PROCESS | | | |
| 31 | -- | -- | -- | REAL FSPF | TM | -- | SBID←REAL BID WHEN (REAL BID)-(SBID)=3 | 41 | 0 | 7.31.00 |
| | | | | | | -- | SBID←REAL BID WHEN (REAL BID)-(SBID)≠3 | 10 | -- | 7.31.01 |
| | | | | | OTHERS | -- | -- | 00 | -- | 7.31.02 |
| 41 | -4 | -- | -- | EMULATE | -- | -- | -- | 41 | -3 | 7.41.00 |
| | -3 | -- | -- | EMULATE | -- | -- | -- | 41 | 0 | 7.41.10 |
| | -2 | -- | -- | EMULATE | -- | -- | -- | 41 | 0 | 7.41.20 |
| | -1 | -- | -- | EMULATE | -- | -- | -- | 41 | 0 | 7.41.30 |
| | 0 | -- | -- | REAL FSPF | TM | -- | SBID←REAL BID WHEN (REAL BID)-(SBID)=3 | 43 | 0 | 7.41.40 |
| | | | | | | -- | SBID←REAL BID WHEN (REAL BID)-(SBID)=1 | 51 | -- | 7.41.41 |
| | | | | | | -- | SBID←REAL BID WHEN (REAL BID)-(SBID)≠1AND3 | 10 | -- | 7.41.42 |
| | | | | | OTHERS | -- | -- | 00 | -- | 7.41.43 |
| | | | | | EOD | -- | -- | 81 | +1 | 7.41.44 |
| 51 | -- | -- | -- | REAL FSPF | TM | -- | SBID←REAL BID WHEN (REAL BID)-(SBID)=3 | 43 | 0 | 7.51.00 |
| | | | | | | -- | SBID←REAL BID WHEN (REAL BID)-(SBID)≠3 | 10 | -- | 7.51.01 |
| | | | | | OTHERS | -- | -- | 00 | -- | 7.51.02 |
| 61 | -4 | -- | -- | EMULATE | -- | -- | -- | 61 | -3 | 7.61.00 |
| | -3 | -- | -- | EMULATE | -- | -- | -- | 61 | 0 | 7.61.10 |
| | -2 | -- | -- | EMULATE | -- | -- | -- | 61 | 0 | 7.61.20 |
| | -1 | -- | -- | EMULATE | -- | -- | -- | 61 | 0 | 7.61.30 |
| | 0 | -- | -- | EMULATE | -- | -- | -- | 61 | +1 | 7.61.40 |
| | +1 | SBID+EP | -- | REAL FSPF | TM | -- | SBID←REAL BID WHEN (REAL BID)-(SBID)=3 | 43 | 0 | 7.61.50 |
| | | | | | | -- | SBID←REAL BID WHEN (REAL BID)-(SBID)≠3 | 10 | -- | 7.61.51 |
| | | | | | OTHERS | -- | -- | 00 | -- | 7.61.52 |

FIG. 243

| PRE – PROCESS | | | | OPERATION | POST – PROCESS | | | ES | EP | PROCESS ID |
|---|---|---|---|---|---|---|---|---|---|---|
| ES | EP | RE-POSITION | RESTORE | | BLOCK | SAVE | BID PROCESS | | | |
| 71 | -4 | -- | -- | EMULATE | -- | -- | -- | 71 | -3 | 7.71.00 |
| | -3 | -- | -- | EMULATE | -- | -- | -- | 71 | 0 | 7.71.10 |
| | -2 | -- | -- | EMULATE | -- | -- | -- | 71 | 0 | 7.71.20 |
| | -1 | -- | -- | EMULATE | -- | -- | -- | 71 | 0 | 7.71.30 |
| | 0 | -- | -- | EMULATE | -- | -- | -- | 71 | +1 | 7.71.40 |
| | +1 | WTM | -- | REAL FSPF | TM | -- | SBID←REAL BID WHEN (REAL BID)−(SBID)=3 | 43 | 0 | 7.71.50 |
| | | | | | | -- | SBID←REAL BID WHEN (REAL BID)−(SBID)≠3 | 10 | -- | 7.71.51 |
| | | | | | OTHERS | -- | -- | 00 | -- | 7.71.52 |
| 81 | -4 | -- | -- | EMULATE | -- | -- | -- | 81 | -3 | 7.81.00 |
| | -3 | -- | -- | EMULATE | -- | -- | -- | 81 | 0 | 7.81.10 |
| | -2 | -- | -- | EMULATE | -- | -- | -- | 81 | 0 | 7.81.20 |
| | -1 | -- | -- | EMULATE | -- | -- | -- | 81 | 0 | 7.81.30 |
| | 0 | -- | -- | EMULATE | -- | -- | -- | 81 | +1 | 7.81.40 |
| | +1 | -- | -- | REAL FSPF | EOD | -- | -- | 00 | -- | 7.81.50 |

FIG. 244

| PRE - PROCESS | | | | OPERATION | POST - PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 22 | -- | -- | -- | REAL FSPF | TM | -- | SBID←REAL BID WHEN (REAL BID)-(SBID)=3 | 43 | 0 | 7.22.00 |
| | | | | | | -- | SBID←REAL BID WHEN (REAL BID)-(SBID)≠3 | 10 | -- | 7.22.01 |
| | | | | | OTHERS | -- | -- | 00 | -- | 7.22.02 |
| 32 | -- | -- | -- | REAL FSPF | TM | -- | SBID←REAL BID WHEN (REAL BID)-(SBID)=3 | 42 | 0 | 7.32.00 |
| | | | | | | -- | SBID←REAL BID WHEN (REAL BID)-(SBID)≠3 | 10 | -- | 7.32.01 |
| | | | | | OTHERS | -- | -- | 00 | -- | 7.32.02 |
| 42 | -4 | -- | -- | EMULATE | -- | -- | -- | 42 | -3 | 7.42.00 |
| | -3 | -- | -- | EMULATE | -- | -- | -- | 42 | 0 | 7.42.10 |
| | -2 | -- | -- | EMULATE | -- | -- | -- | 42 | 0 | 7.42.20 |
| | -1 | -- | -- | EMULATE | -- | -- | -- | 42 | 0 | 7.42.30 |
| | 0 | -- | -- | REAL FSPF | TM | -- | SBID←REAL BID WHEN (REAL BID)-(SBID)=3 | 43 | 0 | 7.42.40 |
| | | | | | | -- | SBID←REAL BID WHEN (REAL BID)-(SBID)=1 | 52 | -- | 7.42.41 |
| | | | | | | -- | SBID←REAL BID WHEN (REAL BID)-(SBID)≠1AND3 | 10 | -- | 7.42.42 |
| | | | | | OTHERS | -- | -- | 00 | -- | 7.42.43 |
| | | | | | EOD | -- | -- | 82 | +1 | 7.42.44 |
| 52 | -- | -- | -- | REAL FSPF | TM | -- | SBID←REAL BID WHEN (REAL BID)-(SBID)=3 | 43 | 0 | 7.52.00 |
| | | | | | | -- | SBID←REAL BID WHEN (REAL BID)-(SBID)≠3 | 10 | -- | 7.52.01 |
| | | | | | OTHERS | -- | -- | 00 | -- | 7.52.02 |
| 62 | -4 | -- | -- | EMULATE | -- | -- | -- | 62 | -3 | 7.62.00 |
| | -3 | -- | -- | EMULATE | -- | -- | -- | 62 | 0 | 7.62.10 |
| | -2 | -- | -- | EMULATE | -- | -- | -- | 62 | 0 | 7.62.20 |
| | -1 | -- | -- | EMULATE | -- | -- | -- | 62 | 0 | 7.62.30 |
| | 0 | -- | -- | EMULATE | -- | -- | -- | 62 | +1 | 7.62.40 |
| | +1 | SBID+EP | -- | REAL FSPF | TM | -- | SBID←REAL BID WHEN (REAL BID)-(SBID)=3 | 43 | 0 | 7.62.50 |
| | | | | | | -- | SBID←REAL BID WHEN (REAL BID)-(SBID)≠3 | 10 | -- | 7.62.51 |
| | | | | | OTHERS | -- | -- | 00 | -- | 7.62.52 |

FIG. 245

| PRE – PROCESS | | | | OPERATION | POST – PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 72 | -4 | -- | -- | EMULATE | -- | -- | -- | 72 | -3 | 7.72.00 |
| | -3 | -- | -- | EMULATE | -- | -- | -- | 72 | 0 | 7.72.10 |
| | -2 | -- | -- | EMULATE | -- | -- | -- | 72 | 0 | 7.72.20 |
| | -1 | -- | -- | EMULATE | -- | -- | -- | 72 | 0 | 7.72.30 |
| | 0 | -- | -- | EMULATE | -- | -- | -- | 72 | +1 | 7.72.40 |
| | +1 | WTM | -- | REAL FSPF | TM | -- | SBID←REAL BID WHEN (REAL BID)-(SBID)=3 | 43 | 0 | 7.72.50 |
| | | | | | | -- | SBID←REAL BID WHEN (REAL BID)-(SBID)≠3 | 10 | -- | 7.72.51 |
| | | | | | OTHERS | -- | -- | 00 | -- | 7.72.52 |
| 82 | -4 | -- | -- | EMULATE | -- | -- | -- | 82 | -3 | 7.82.00 |
| | -3 | -- | -- | EMULATE | -- | -- | -- | 82 | 0 | 7.82.10 |
| | -2 | -- | -- | EMULATE | -- | -- | -- | 82 | 0 | 7.82.20 |
| | -1 | -- | -- | EMULATE | -- | -- | -- | 82 | 0 | 7.82.30 |
| | 0 | -- | -- | EMULATE | -- | -- | -- | 82 | +1 | 7.82.40 |
| | +1 | -- | -- | REAL FSPF | EOD | -- | -- | 00 | -- | 7.82.50 |

FIG. 246

| PRE - PROCESS | | | OPERATION | POST - PROCESS | | | | | PROCESS ID |
|---|---|---|---|---|---|---|---|---|---|
| ES | EP | RE-POSITION | RESTORE | | BLOCK | SAVE | BID PROCESS | ES | EP | |
| 33 | -- | -- | -- | REAL FSPF | TM | -- | SBID←REAL BID WHEN (REAL BID)-(SBID)=3 | 43 | 0 | 7.33.00 |
| | | | | | | -- | SBID←REAL BID WHEN (REAL BID)-(SBID)≠3 | 10 | -- | 7.33.01 |
| | | | | | OTHERS | -- | -- | 00 | -- | 7.33.02 |
| 43 | -4 | -- | -- | EMULATE | -- | -- | -- | 43 | -3 | 7.43.00 |
| | -3 | -- | -- | EMULATE | -- | -- | -- | 43 | 0 | 7.43.10 |
| | -2 | -- | -- | EMULATE | -- | -- | -- | 43 | 0 | 7.43.20 |
| | -1 | -- | -- | EMULATE | -- | -- | -- | 43 | 0 | 7.43.30 |
| | 0 | -- | -- | REAL FSPF | TM | -- | SBID←REAL BID WHEN (REAL BID)-(SBID)=3 | 43 | 0 | 7.43.40 |
| | | | | | | -- | SBID←REAL BID WHEN (REAL BID)-(SBID)=1 | 53 | -- | 7.43.41 |
| | | | | | | -- | SBID←REAL BID WHEN (REAL BID)-(SBID)≠1AND3 | 10 | -- | 7.43.42 |
| | | | | | OTHERS | -- | -- | 00 | -- | 7.43.43 |
| | | | | | EOD | -- | -- | 83 | +1 | 7.43.44 |
| 53 | -- | -- | -- | REAL FSPF | TM | -- | SBID←REAL BID WHEN (REAL BID)-(SBID)=3 | 43 | 0 | 7.53.00 |
| | | | | | | -- | SBID←REAL BID WHEN (REAL BID)-(SBID)≠3 | 10 | -- | 7.53.01 |
| | | | | | OTHERS | -- | -- | 00 | -- | 7.53.02 |
| 63 | -4 | -- | -- | EMULATE | -- | -- | -- | 63 | -3 | 7.63.00 |
| | -3 | -- | -- | EMULATE | -- | -- | -- | 63 | 0 | 7.63.10 |
| | -2 | -- | -- | EMULATE | -- | -- | -- | 63 | 0 | 7.63.20 |
| | -1 | -- | -- | EMULATE | -- | -- | -- | 63 | 0 | 7.63.30 |
| | 0 | -- | -- | EMULATE | -- | -- | -- | 63 | +1 | 7.63.40 |
| | +1 | SBID+EP | -- | REAL FSPF | TM | -- | SBID←REAL BID WHEN (REAL BID)-(SBID)=3 | 43 | 0 | 7.63.50 |
| | | | | | | -- | SBID←REAL BID WHEN (REAL BID)-(SBID)≠3 | 10 | -- | 7.63.51 |
| | | | | | OTHERS | -- | -- | 00 | -- | 7.63.52 |

FIG. 247

| PRE – PROCESS | | | OPERATION | POST – PROCESS | | | | | PROCESS ID |
|---|---|---|---|---|---|---|---|---|---|
| ES | EP | RE-POSITION | RESTORE | | BLOCK | SAVE | BID PROCESS | ES | EP | |
| 73 | -4 | -- | -- | EMULATE | -- | -- | -- | 73 | -3 | 7.73.00 |
| | -3 | -- | -- | EMULATE | -- | -- | -- | 73 | 0 | 7.73.10 |
| | -2 | -- | -- | EMULATE | -- | -- | -- | 73 | 0 | 7.73.20 |
| | -1 | -- | -- | EMULATE | -- | -- | -- | 73 | 0 | 7.73.30 |
| | 0 | -- | -- | EMULATE | -- | -- | -- | 73 | +1 | 7.73.40 |
| | +1 | WTM | -- | REAL FSPF | TM | -- | SBID←REAL BID WHEN (REAL BID)-(SBID)=3 | 43 | 0 | 7.73.50 |
| | | | | | | -- | SBID←REAL BID WHEN (REAL BID)-(SBID)≠3 | 10 | -- | 7.73.51 |
| | | | | | OTHERS | -- | -- | 00 | -- | 7.73.52 |
| 83 | -4 | -- | -- | EMULATE | -- | -- | -- | 83 | -3 | 7.83.00 |
| | -3 | -- | -- | EMULATE | -- | -- | -- | 83 | 0 | 7.83.10 |
| | -2 | -- | -- | EMULATE | -- | -- | -- | 83 | 0 | 7.83.20 |
| | -1 | -- | -- | EMULATE | -- | -- | -- | 83 | 0 | 7.83.30 |
| | 0 | -- | -- | EMULATE | -- | -- | -- | 83 | +1 | 7.83.40 |
| | +1 | -- | -- | REAL FSPF | EOD | -- | -- | 00 | -- | 7.83.50 |

FIG. 248

| PRE - PROCESS | | | OPERATION | POST - PROCESS | | | | | PROCESS ID |
|---|---|---|---|---|---|---|---|---|---|
| ES | EP | RE-POSITION | RESTORE | | BLOCK | SAVE | BID PROCESS | ES | EP | |
| 00 | -- | -- | -- | REAL WTM | -- | -- | SBID←REAL BID | 10 | -- | 8.00.00 |
| 10 | -- | -- | -- | REAL WTM | -- | -- | SBID←REAL BID | 10 | -- | 8.10.00 |
| 20 | -- | -- | -- | REAL WTM | -- | -- | SBID←REAL BID | 10 | -- | 8.20.00 |
| 30 | -- | -- | -- | REAL WTM | -- | -- | SBID←REAL BID WHEN (REAL BID)-(SBID)=3 | 40 | 0 | 8.30.00 |
| 40 | -4 | SBID+EP | -- | REAL WTM | -- | -- | SBID←REAL BID | 10 | -- | 8.40.00 |
| | -3 | SBID+EP | -- | REAL WTM | -- | -- | SBID←REAL BID | 10 | -- | 8.40.10 |
| | -2 | SBID+EP | -- | REAL WTM | -- | -- | SBID←REAL BID | 10 | -- | 8.40.20 |
| | -1 | -- | -- | EMULATE | -- | -- | -- | 40 | 0 | 8.40.30 |
| | 0 | -- | -- | EMULATE | -- | -- | -- | 70 | +1 | 8.40.40 |
| 50 | -- | -- | -- | REAL WTM | -- | -- | SBID←REAL BID | 10 | -- | 8.50.00 |
| 60 | -4 | SBID+EP | -- | REAL WTM | -- | -- | SBID←REAL BID | 10 | -- | 8.60.00 |
| | -3 | SBID+EP | -- | REAL WTM | -- | -- | SBID←REAL BID | 10 | -- | 8.60.10 |
| | -2 | SBID+EP | -- | REAL WTM | -- | -- | SBID←REAL BID | 10 | -- | 8.60.20 |
| | -1 | SBID+EP | -- | REAL WTM | -- | -- | SBID←REAL BID | 10 | -- | 8.60.30 |
| | 0 | -- | -- | EMULATE | -- | -- | -- | 60 | +1 | 8.60.40 |
| | +1 | SBID+EP | -- | REAL WTM | -- | -- | SBID←REAL BID | 10 | -- | 8.60.50 |
| 70 | -4 | SBID+EP | -- | REAL WTM | -- | -- | SBID←REAL BID | 10 | -- | 8.70.00 |
| | -3 | SBID+EP | -- | REAL WTM | -- | -- | SBID←REAL BID | 10 | -- | 8.70.10 |
| | -2 | SBID+EP | -- | REAL WTM | -- | -- | SBID←REAL BID | 10 | -- | 8.70.20 |
| | -1 | SBID+EP | -- | REAL WTM | -- | -- | SBID←REAL BID | 10 | -- | 8.70.30 |
| | 0 | -- | -- | EMULATE | -- | -- | -- | 70 | +1 | 8.70.40 |
| | +1 | WTM | -- | REAL WTM | -- | -- | SBID←REAL BID | 10 | -- | 8.70.50 |
| 80 | -4 | SBID+EP | -- | REAL WTM | -- | -- | SBID←REAL BID | 10 | -- | 8.80.00 |
| | -3 | SBID+EP | -- | REAL WTM | -- | -- | SBID←REAL BID | 10 | -- | 8.80.10 |
| | -2 | SBID+EP | -- | REAL WTM | -- | -- | SBID←REAL BID | 10 | -- | 8.80.20 |
| | -1 | SBID+EP | -- | REAL WTM | -- | -- | SBID←REAL BID | 10 | -- | 8.80.30 |
| | 0 | -- | -- | EMULATE | -- | -- | -- | 80 | +1 | 8.80.40 |
| | +1 | WTM | -- | REAL WTM | -- | -- | SBID←REAL BID | 10 | -- | 8.80.50 |

FIG. 249

| PRE - PROCESS | | | OPERATION | POST - PROCESS | | | | | PROCESS ID |
|---|---|---|---|---|---|---|---|---|---|
| ES | EP | RE-POSITION | RESTORE | | BLOCK | SAVE | BID PROCESS | ES | EP | |
| 31 | -- | -- | -- | REAL WTM | -- | -- | SBID←REAL BID WHEN (REAL BID)-(SBID)=3 | 41 | 0 | 8.31.00 |
| 41 | -4 | SBID+EP | -- | REAL WTM | -- | -- | SBID←REAL BID | 10 | -- | 8.41.00 |
| | -3 | SBID+EP | -- | REAL WTM | -- | -- | SBID←REAL BID | 10 | -- | 8.41.10 |
| | -2 | SBID+EP | -- | REAL WTM | -- | -- | SBID←REAL BID | 10 | -- | 8.41.20 |
| | -1 | -- | -- | EMULATE | -- | -- | -- | 41 | 0 | 8.41.30 |
| | 0 | -- | -- | EMULATE | -- | -- | -- | 71 | +1 | 8.41.40 |
| 51 | -- | -- | -- | REAL WTM | -- | -- | SBID←REAL BID | 10 | -- | 8.51.00 |
| 61 | -4 | SBID+EP | -- | REAL WTM | -- | -- | SBID←REAL BID | 10 | -- | 8.61.00 |
| | -3 | SBID+EP | -- | REAL WTM | -- | -- | SBID←REAL BID | 10 | -- | 8.61.10 |
| | -2 | SBID+EP | -- | REAL WTM | -- | -- | SBID←REAL BID | 10 | -- | 8.61.20 |
| | -1 | SBID+EP | -- | REAL WTM | -- | -- | SBID←REAL BID | 10 | -- | 8.61.30 |
| | 0 | -- | -- | EMULATE | -- | -- | -- | 61 | +1 | 8.61.40 |
| | +1 | SBID+EP | -- | REAL WTM | -- | -- | SBID←REAL BID | 10 | -- | 8.61.50 |
| 71 | -4 | SBID+EP | -- | REAL WTM | -- | -- | SBID←REAL BID | 10 | -- | 8.71.00 |
| | -3 | SBID+EP | -- | REAL WTM | -- | -- | SBID←REAL BID | 10 | -- | 8.71.10 |
| | -2 | SBID+EP | -- | REAL WTM | -- | -- | SBID←REAL BID | 10 | -- | 8.71.20 |
| | -1 | SBID+EP | -- | REAL WTM | -- | -- | SBID←REAL BID | 10 | -- | 8.71.30 |
| | 0 | -- | -- | EMULATE | -- | -- | -- | 71 | +1 | 8.71.40 |
| | +1 | WTM | -- | REAL WTM | -- | -- | SBID←REAL BID | 10 | -- | 8.71.50 |
| 81 | -4 | SBID+EP | -- | REAL WTM | -- | -- | SBID←REAL BID | 10 | -- | 8.81.00 |
| | -3 | SBID+EP | -- | REAL WTM | -- | -- | SBID←REAL BID | 10 | -- | 8.81.10 |
| | -2 | SBID+EP | -- | REAL WTM | -- | -- | SBID←REAL BID | 10 | -- | 8.81.20 |
| | -1 | SBID+EP | -- | REAL WTM | -- | -- | SBID←REAL BID | 10 | -- | 8.81.30 |
| | 0 | -- | -- | EMULATE | -- | -- | -- | 81 | +1 | 8.81.40 |
| | +1 | WTM | -- | REAL WTM | -- | -- | SBID←REAL BID | 10 | -- | 8.81.50 |

FIG. 250

| PRE - PROCESS | | | | OPERATION | POST - PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 22 | -- | -- | -- | REAL WTM | -- | -- | SBID←REAL BID | 10 | -- | 8.22.00 |
| 32 | -- | -- | -- | REAL WTM | -- | -- | SBID←REAL BID WHEN (REAL BID)-(SBID)=3 | 42 | 0 | 8.32.00 |
| 42 | -4 | SBID+EP | -- | REAL WTM | -- | -- | SBID←REAL BID | 10 | -- | 8.42.00 |
| | -3 | SBID+EP | -- | REAL WTM | -- | -- | SBID←REAL BID | 10 | -- | 8.42.10 |
| | -2 | SBID+EP | -- | REAL WTM | -- | -- | SBID←REAL BID | 10 | -- | 8.42.20 |
| | -1 | -- | -- | EMULATE | -- | -- | -- | 42 | 0 | 8.42.30 |
| | 0 | -- | -- | EMULATE | -- | -- | -- | 72 | +1 | 8.42.40 |
| 52 | -- | -- | -- | REAL WTM | -- | -- | SBID←REAL BID | 10 | -- | 8.52.00 |
| 62 | -4 | SBID+EP | -- | REAL WTM | -- | -- | SBID←REAL BID | 10 | -- | 8.62.00 |
| | -3 | SBID+EP | -- | REAL WTM | -- | -- | SBID←REAL BID | 10 | -- | 8.62.10 |
| | -2 | SBID+EP | -- | REAL WTM | -- | -- | SBID←REAL BID | 10 | -- | 8.62.20 |
| | -1 | SBID+EP | -- | REAL WTM | -- | -- | SBID←REAL BID | 10 | -- | 8.62.30 |
| | 0 | -- | -- | EMULATE | -- | -- | -- | 62 | +1 | 8.62.40 |
| | +1 | SBID+EP | -- | REAL WTM | -- | -- | SBID←REAL BID | 10 | -- | 8.62.50 |
| 72 | -4 | SBID+EP | -- | REAL WTM | -- | -- | SBID←REAL BID | 10 | -- | 8.72.00 |
| | -3 | SBID+EP | -- | REAL WTM | -- | -- | SBID←REAL BID | 10 | -- | 8.72.10 |
| | -2 | SBID+EP | -- | REAL WTM | -- | -- | SBID←REAL BID | 10 | -- | 8.72.20 |
| | -1 | SBID+EP | -- | REAL WTM | -- | -- | SBID←REAL BID | 10 | -- | 8.72.30 |
| | 0 | -- | -- | EMULATE | -- | -- | -- | 72 | +1 | 8.72.40 |
| | +1 | WTM | -- | REAL WTM | -- | -- | SBID←REAL BID | 10 | -- | 8.72.50 |
| 82 | -4 | SBID+EP | -- | REAL WTM | -- | -- | SBID←REAL BID | 10 | -- | 8.82.00 |
| | -3 | SBID+EP | -- | REAL WTM | -- | -- | SBID←REAL BID | 10 | -- | 8.82.10 |
| | -2 | SBID+EP | -- | REAL WTM | -- | -- | SBID←REAL BID | 10 | -- | 8.82.20 |
| | -1 | SBID+EP | -- | REAL WTM | -- | -- | SBID←REAL BID | 10 | -- | 8.82.30 |
| | 0 | -- | -- | EMULATE | -- | -- | -- | 82 | +1 | 8.82.40 |
| | +1 | WTM | -- | REAL WTM | -- | -- | SBID←REAL BID | 10 | -- | 8.82.50 |

FIG. 251

| PRE - PROCESS | | | | OPERATION | POST - PROCESS | | | | | PROCESS ID |
|---|---|---|---|---|---|---|---|---|---|---|
| ES | EP | RE-POSITION | RESTORE | | BLOCK | SAVE | BID PROCESS | ES | EP | |
| 33 | -- | -- | -- | REAL WTM | -- | -- | SBID←REAL BID WHEN (REAL BID)-(SBID)=3 | 43 | 0 | 8.33.00 |
| 43 | -4 | SBID+EP | -- | REAL WTM | -- | -- | SBID←REAL BID | 10 | -- | 8.43.00 |
| | -3 | SBID+EP | -- | REAL WTM | -- | -- | SBID←REAL BID | 10 | -- | 8.43.10 |
| | -2 | SBID+EP | -- | REAL WTM | -- | -- | SBID←REAL BID | 10 | -- | 8.43.20 |
| | -1 | -- | -- | EMULATE | -- | -- | -- | 43 | 0 | 8.43.30 |
| | 0 | -- | -- | EMULATE | -- | -- | -- | 73 | +1 | 8.43.40 |
| 53 | -- | -- | -- | REAL WTM | -- | -- | SBID←REAL BID | 10 | -- | 8.53.00 |
| 63 | -4 | SBID+EP | -- | REAL WTM | -- | -- | SBID←REAL BID | 10 | -- | 8.63.00 |
| | -3 | SBID+EP | -- | REAL WTM | -- | -- | SBID←REAL BID | 10 | -- | 8.63.10 |
| | -2 | SBID+EP | -- | REAL WTM | -- | -- | SBID←REAL BID | 10 | -- | 8.63.20 |
| | -1 | SBID+EP | -- | REAL WTM | -- | -- | SBID←REAL BID | 10 | -- | 8.63.30 |
| | 0 | -- | -- | EMULATE | -- | -- | -- | 63 | +1 | 8.63.40 |
| | +1 | SBID+EP | -- | REAL WTM | -- | -- | SBID←REAL BID | 10 | -- | 8.63.50 |
| 73 | -4 | SBID+EP | -- | REAL WTM | -- | -- | SBID←REAL BID | 10 | -- | 8.73.00 |
| | -3 | SBID+EP | -- | REAL WTM | -- | -- | SBID←REAL BID | 10 | -- | 8.73.10 |
| | -2 | SBID+EP | -- | REAL WTM | -- | -- | SBID←REAL BID | 10 | -- | 8.73.20 |
| | -1 | SBID+EP | -- | REAL WTM | -- | -- | SBID←REAL BID | 10 | -- | 8.73.30 |
| | 0 | -- | -- | EMULATE | -- | -- | -- | 73 | +1 | 8.73.40 |
| | +1 | WTM | -- | REAL WTM | -- | -- | SBID←REAL BID | 10 | -- | 8.73.50 |
| 83 | -4 | SBID+EP | -- | REAL WTM | -- | -- | SBID←REAL BID | 10 | -- | 8.83.00 |
| | -3 | SBID+EP | -- | REAL WTM | -- | -- | SBID←REAL BID | 10 | -- | 8.83.10 |
| | -2 | SBID+EP | -- | REAL WTM | -- | -- | SBID←REAL BID | 10 | -- | 8.83.20 |
| | -1 | SBID+EP | -- | REAL WTM | -- | -- | SBID←REAL BID | 10 | -- | 8.83.30 |
| | 0 | -- | -- | EMULATE | -- | -- | -- | 83 | +1 | 8.83.40 |
| | +1 | WTM | -- | REAL WTM | -- | -- | SBID←REAL BID | 10 | -- | 8.83.50 |

| COMMAND | WITHOUT EMULATION | WITH EMULATION | REMARKS |
|---|---|---|---|
| WR | 0.000731 | 0.000731 | (1) |
| WTM | 0.713581 | 0.713581 | (2) |
| WR | 0.003502 | 0.003502 | (3) |
| WR | 0.000641 | 0.000641 | (4) |
| WTM | 0.596851 | 0.596851 | (5) |
| WTM | 0.298012 | 0.000500 | (6) |
| BSPF | 0.460880 | 0.000500 | (7) |
| NOP | 0.000548 | 0.000500 | |
| LDSP | 0.000521 | 0.000521 | |
| LDSP | 0.000469 | 0.000469 | |
| LDSP | 0.000493 | 0.000493 | |
| NOP | 0.000524 | 0.000524 | |
| SNIO | 0.002945 | 0.002945 | |
| RDVC | 0.000580 | 0.000580 | |
| NOP | 0.000529 | 0.000529 | |
| SNS | 0.002731 | 0.002731 | |
| LDSP | 0.000420 | 0.000420 | |
| BSPF | 0.000583 | 0.000500 | (8) |
| BSPF | 0.291417 | 0.000500 | (9) |
| FSPF | 0.291342 | 0.000500 | (10) |
| RD | 0.531535 | 0.000500 | (11) |
| FSPF | 1.410659 | 0.000500 | (12) |
| RD | 0.581191 | 0.000500 | (13) |
| BSPF | 0.000606 | 0.000500 | (14) |
| BSPF | 0.455999 | 0.000500 | (15) |
| BSPF | 0.293099 | 0.000500 | (16) |
| FSPF | 0.290969 | 0.000500 | (17) |
| RD | 0.531411 | 0.000500 | (18) |
| FSPF | 1.414089 | 0.000500 | (19) |
| NOP | 0.290595 | 0.000500 | |
| WR | 0.000615 | 0.000615 | (20) |
| WR | 0.000615 | 0.000615 | (21) |
| WTM | 0.639278 | 0.339278 | (22) |
| WR | 0.003324 | 0.003324 | (23) |
| WR | 0.000641 | 0.000641 | (24) |
| TOTAL | 9.111926 | 1.981191 | SECOND |

FIG.275

| COMMAND | WITHOUT EMULATION | WITH EMULATION | REMARKS |
|---|---|---|---|
| WR | 0.000700 | 0.000700 | (1) |
| WTM | 0.843145 | 0.541334 | (2) |
| WR | 0.011607 | 0.011771 | (3) |
| WR | 0.005543 | 0.005291 | (4) |
| WTM | 0.615312 | 0.310921 | (5) |
| WTM | 0.308603 | 0.005847 | (6) |
| BSPF | 0.482427 | 0.005927 | (7) |
| NOP | 0.003681 | 0.003799 | |
| LDSP | 0.006880 | 0.006852 | |
| LDSP | 0.006785 | 0.006929 | |
| NOP | 0.003463 | 0.003419 | |
| NOP | 0.003500 | 0.003514 | |
| SNS | 0.011085 | 0.011727 | |
| LDSP | 0.006662 | 0.006966 | |
| BSPF | 0.300570 | 0.005836 | (8) |
| BSPF | 0.305450 | 0.005990 | (9) |
| FSPF | 0.474757 | 0.005934 | (10) |
| RD | 0.097280 | 0.008346 | (11) |
| FSPF | 0.205869 | 0.005892 | (12) |
| RD | 0.306587 | 0.004664 | (13) |
| BSPF | 0.476655 | 0.005798 | (14) |
| LDSP | 0.006960 | 0.006918 | |
| WR | 0.004667 | 0.004711 | (15) |
| WR | 0.005425 | 0.005041 | (16) |
| WTM | 1.833579 | 0.308303 | (17) |
| WR | 0.003300 | 0.003300 | (18) |
| WR | 0.000600 | 0.000600 | (19) |
| TOTAL | 6.331092 | 1.296330 | SECOND |

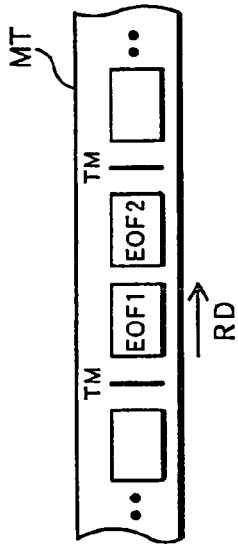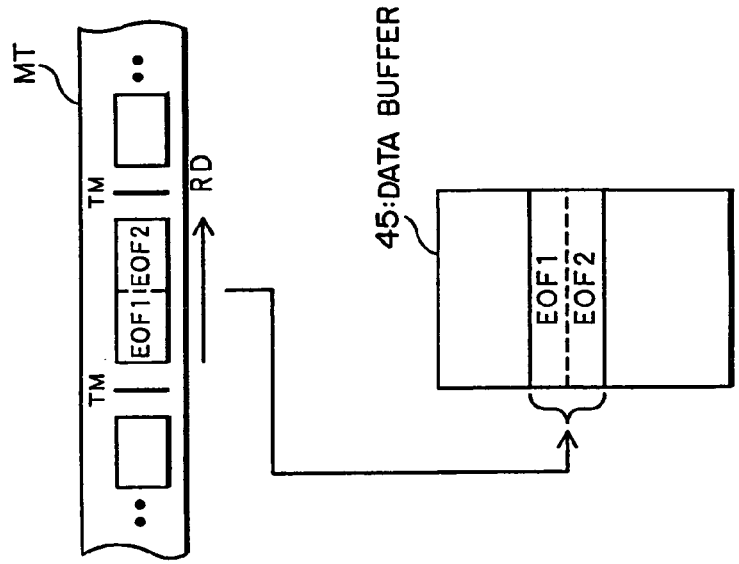
FIG. 276(A) LOGICAL IMAGE
FIG. 276(B) PHYSICAL IMAGE
FIG. 276(C)

METHOD FOR CONTROLLING MAGNETIC TAPE UNIT

BACKGROUND OF THE INVENTION

1) Field of the Invention

The present invention relates to a method for controlling a tape operation of a magnetic tape unit in response to a command from a command issuing apparatus (for example, a host computer/upper apparatus such as a CPU).

2) Description of the Related Art

With an increasing demand for higher-speed computer systems in recent years, there is a requirement for a more efficient backup/restore operation to copy data between a DASD (Direct Access Storage Device) and a magnetic tape.

In order to store large amounts of data on a magnetic tape at a high speed, there is provided a technique called streaming. The streaming is a process of successively performing READ or WRITE from/on a magnetic tape by buffering.

When an upper apparatus such as a CPU accesses to a magnetic tape via a magnetic tape controller having a data buffer, for example, the magnetic tape controller such controls that a read/write process between the upper apparatus and the buffer, and a read/write process between the buffer and the magnetic tape are carried out asynchronously to perform a streaming process.

As above, the streaming control (asynchronous control by buffering) is performed when successively reading/writing a data block on the magnetic tape unit, thereby lessening the frequency of the start/stop operation of the magnetic tape, thus improving the read/write performance of the magnetic tape unit.

When the upper apparatus issues a command to reverse the direction of travel of the magnetic tape, or when a tape mark is detected, or when the upper apparatus issues a command in the read/write control system while the magnetic tape unit carries out such the streaming, it is necessary to stop the streaming for a time to synchronize the process carried out on the channel's side connected to the upper apparatus with the process carried out on the magnetic tape unit's side.

With reference to FIGS. 175 through 201, a structure of a known magnetic tape controller and streaming process/command processing by the magnetic tape controller will be described hereinafter.

FIG. 175 is a block diagram showing a hardware structure of the magnetic tape controller. As shown in FIG. 175, a magnetic tape controller (MTC; Magnetic Tape Controller) 10 is disposed between a CPU 20 (host computer, upper apparatus) 20 and a magnetic tape unit (MTU; Magnetic Tape Unit) 30 to control operations of the MTU 30 in response to commands from the CPU 20.

The MTC 10 comprises a channel interface circuit 11, a data compressing circuit 12, a data decompressing circuit 13, a host interface controller (HIC; Host Interface Controller) 14, a format controller (FMT: ForMaT controller) 15, a command buffer 16 and a data buffer 17.

The channel interface circuit 11 controls a channel interface with the CPU 20. The data compressing circuit 12 performs data compression in, for example, EDRC (Enhanced Data Recording Capability) system. The data decompressing circuit 13 decompresses the compressed data.

The HIC 14 performs format conversions and controls in order to send/receive data with the CPU 20. The FMT 15 performs format conversions and controls in order to send/receive data with the MTU 30. The command buffer 16 is to communicate between the HIC 14 and the FMT 15, storing commands directing operations and the like that should be performed by the HIC 14 and the FMT 15. The data buffer 17 temporarily stores each block of data (write data) that should be written on the magnetic tape or data (read data) that has been read out from the magnetic tape as a unit.

The command buffer 16 comprises, as shown in FIG. 176, a command pointer table for HIC (HQP) 16-1, a command list table for HIC (HQL) 16-2, a command pointer table for FMT (FQP) 16-3 and a command list table for MFT (FQL) 16-4.

In the HQP 16-1, there are set a prefetch direction flag for urging the FMT 15 to perform preferentially a read operation or a read-back operation, a command pointer indicating a position of the latest command in the HQL 16-2, and a BID showing an ID (Identification: hereinafter abbreviated as BID) of the latest block in the data butter 17.

In the FQP 16-3, there are set a prefetch completion flag showing that the read operation or the read-back operation has been carried out preferentially in response to the prefetch direction and the preferential operation has been completed, a command pointer indicating a position of the latest command in the FQL 16-4, and the latest BID in the data buffer 17.

The data buffer 17 functions as an intermediate buffer between the HIC 14 and the FMT 15 when a reading or writing is performed. Namely, at the time of writing, the HIC 14 stores data transferred from the CPU 20 in the data butter 17, and the FMT 15 transfers the write data in the data buffer 17 to the MTU 30 and records the data on the magnetic tape. On the other hand, at the time of reading, the FMT 15 reads data on the magnetic tape from the MTU 30 and stores the data in the data buffer 17, and the HIC 14 transfers the read data in the data buffer 17 to the CPU 20.

The HQL 16-2 functions as a command queue for storing commands directing operations that should be carried out by the HIC 14 in response to directions from the CPU 20 (commands 1 to 3 in FIG. 176) in the order they were generated. In the HQL 16-2, there are recorded block pointers (BPNT) indicating positions in the data buffer 17 of data blocks (DATA 1 to DATA 3 in FIG. 176) corresponding to respective commands, block lengths (BLEN) of the data blocks, block IDs (BID) of the data blocks, etc.

The FQL 16-4 functions as a command queue storing commands having been carried out by the FMT 15 in accordance with the directions from the CPU 20 (commands 1 and 2 in FIG. 176) in the order their processes were completed. In the FQL 16-4, there are recorded block pointers (BPNT)-indicating positions in the data buffer 17 of data blocks (DATA 1 to DATA 3 in FIG. 176) corresponding to respective commands, block lengths (BLEN) of the data blocks, block IDs (BID) of the data blocks, flags (TM) each showing that a tape mark recorded on the magnetic tape has been detected in the MTU 30, etc.

In the FMT 15, information XBID about a block ID managed by the FMT 15 is stored in a register 15a. The XBID indicates a position of a head relative to the magnetic tape (ID of a data block at which the head is really positioned) in the MTU 30.

Next, operations of the MTC 10 structured as above will be described.

With reference to FIGS. 177 through 182, streaming sequences by the MTC 10 will be described.

[Read Streaming Sequence]

FIGS. 177 and 178 are diagrams for illustrating states of the command buffer 16 and the data buffer 17 when a read streaming sequence is executed.

In the MTC 10, when the channel interface circuit 11 receives a read command issued from the CPU 20, the HIC 14 sets a prefetch direction flag in the HQP 16-1. The FMT 15 has a look at the prefetch direction flag set in the HQP 16-1, makes the MTU 30 read a plurality of data blocks from the magnetic tape, writes the data in the data buffer 17, and registers command lists for the read blocks in the FQL 16-4.

In the MTU 30, a mechanical operation is such carried out that the head of the MTU 30 is moved in the forward direction relative to the magnetic tape MT, at this time. For instance, data blocks "DATA 1, DATA 2, DATA 3" are read in order. Here, the three data blocks are written in the data buffer 17. The number of data blocks to be preferentially read is set according to a capacity of the data buffer 17, for example, and the preferentially read operation is such controlled as to be halted when a quantity of the write data exceeds the capacity of the data buffer 17.

As shown in FIG. 177, commands "READ 1, READ 2, READ 3" corresponding to the respective data blocks written in the data buffer 17 are set in order in the command queue of the FQL 16-4.

A predetermined number (here, 3) of the data blocks are written in the data buffer 17 as in the above manner, the latest command pointer and the latest block ID are then stored in the FQP 16-3, and a prefetch completion flag is set as well.

After the prefetch completion flag is set in the FQP 16-3, the HIC 14 compares a value of the command pointer in the HQP 16-1 with a value of the command pointer in the FQP 16-3, and transfers a data block corresponding to a difference therebetween to the CPU 20. At this time, the HQP 16-1 and the HQL 16-2 are successively updated as shown in FIG. 178. Namely, each time a data block in the data buffer 17 is transferred to the CPU 20, a command having been executed is recorded in the FQL 16-2, the command pointer in the FQP 16-1 is updated and a block ID of the latest data block having been transferred is stored.

FIG. 178 depicts a state in which transfer (reading) of all the three data blocks to the CPU 20 is completed. In the state shown in FIG. 178, both the block IDs in the HQP 16-1 and the FQP 16-3 indicate an ID (for example, 3) of the third data block.

In data transfer to the CPU 20, if data read out from the magnetic tape has been compressed, the data is first inputted to the data decompressing circuit 13, then transferred to the CPU 20.

The MTC 10 can send read data to the channel to transfer the same to the CPU 20 in response to read commands successively issued from the CPU 20 after carrying out the above preferential read operation as long as read data exists in the data buffer 17, without any mechanical operation (real read operation) of the MTU 30. Accordingly, the MTU 30 is not required to perform the mechanical operation for each data block, so that the data transfer efficiency at the time of read operation is improved.

When the FMT 15 detects a tape mark during the read operation, a TM flag is set in the FQL 16-4.

[Write Streaming Sequence]

Next, description will be made of a case where the MTC 10 such controls the MTU 30 as to record predetermined data (data blocks "DATA 1", "DATA 2", "DATA 3") on the magnetic tape according to directions from the CPU 20, with reference to FIGS. 179 and 180. FIGS. 179 and 180 are diagrams depicting states of the command buffer 16 and the data buffer 17 when a write streaming sequence is executed. Incidentally, the prefetch direction flag and prefetch completion flag are not set in the HQP 16-1 and the HQP 16-3, respectively, when a write operation is performed, as shown in FIGS. 179 and 180.

In the MTC 10, when the channel interface circuit 11 receives write commands issued from the CPU 20, the HIC 14 successively stores the write commands (WRITE 1, WRITE 2, WRITE 3) in the HQL 16-2, and registers the latest command pointer and the latest block ID in the HQP 16-1. The data blocks, "DATA 1", "DATA 2" and "DATA 3", are successively written in the data buffer 17 in response to the respective write commands.

When completing a writing of a predetermined number of data blocks (here, 3) in the data buffer 17, the HIC 14 stores the latest command pointer and the latest block ID in the HQP 16-1, and reports completion of the writing to the CPU 20.

Note that when intending to write data that should be written on the magnetic tape in a compressed form, that data is first inputted to the data compressing circuit 12 from the channel interface circuit 11 to be compressed in the EDRC system therein, then written in the data buffer 17.

On the other hand, the FMT 15 compares a value of the command pointer in the HQP 16-1 with a value of the command pointer in the FQP 16-3. When the FMT 15 detects that a difference therebetween is generated, the FMT 15 recognizes that commands are registered in the HQL 16-2, thus successively transfers data blocks corresponding to the difference from the data buffer 17 to the MTU 30 to store the data on the magnetic tape.

At this time, the FQP 16-3 and the FQL 16-4 are successively updated, as shown in FIG. 180. Namely, each time a data block in the data buffer 17 is transferred to the MTU 30 to be recorded in the magnetic tape, a command having been executed is recorded in the FQL 16-4, and the latest command pointer and the latest block ID are registered in the FQP 16-3.

FIG. 180 depicts a state in which a writing of the second data block "DATA 2" on the magnetic tape is completed. In the state shown in FIG. 180, a block ID in the HQP 16-1 indicates an ID (for example, 3) of the third data block, whereas a block ID in the HQP 16-3 indicates an ID (for example, 2) of the second data block.

As above, the MTC 10 stores write commands successively issued from the CPU 20 and data blocks that should be written on the magnetic tape in the HQL 16-2 and the data buffer 17, respectively, for a time, thereby processing the write commands asynchronously with the MTU 30.

Since the FMT 15 can perform a write streaming operation such as writing data on the magnetic tape when data blocks are accumulated to some extent in the data buffer 17, the frequency of execution of the start/stop operation of the MTU 30 is decreased, which increases a write performance of the MTU 30.

[Other Command Sequence]

FIGS. 181 and 182 are diagrams illustrating states of the command buffer 16 and the data buffer 17 when a command sequence other than a read command and a write command is executed.

Other than a read command and a write command, there are, for example, a read backward command (RB), a back space block command (BSP), a back space file command (BSPF), a forward space block command (SP) a forward space file command (FSPF) and a write tape mark command (WTM) as commands causing tape operations of the MTU 30.

When the CPU 20 issues such a command and the channel interface circuit 11 receives the command in the MTC 10, the HIC 14 registers the command in the HQL 16-2 and stores the latest command pointer in the HQP 16-1 as shown in FIG. 181.

On the other hand, the FMT 15 compares a value of the command pointer in the HQP 16-1 with a value of the command pointer in the FQP 16-3. When the FMT 15 detects that a difference is generated therebetween, the FMT 15 recognizes that a command is registered in the HQL 16-2, thus carries out a process according to the command (command processing), then registers the command in the FQL 16-4 and the latest command pointer in the FQP 16-3 as well, as shown in FIG. 182.

When the HIC 14 has a look at a difference between a value of the command pointer in the FQP 16-3 and a value of the command pointer in the HQP 16-1 and recognizes that the FMT 15 completes the command processing, the HIC 14 reports completion of the command processing to the CPU 20.

When processing a command other than a read command and a write command, the process is serially carried out without the streaming process as above, whereby a process (process by the HIC 14) on the channel's side connected to the CPU 20 is synchronized with a process (process by the FMT 15) on the side of the MTU 30.

Next, a command processing by the FMT 15 will be described with reference to FIGS. 183 through 199.

[Idle Process]

FIG. 183 is a flowchart (Steps S11 to S30) for illustrating an idle process by the FMT 15. As shown in FIG. 183, the FMT 15 periodically reads the HQP 16-1 of the command buffer 16 in the idle process to refer to it (Step S11).

When the prefetch direction flag is set in the HQP 16-1 (YES route at Step S12), it is determined whether or not a command corresponding to the prefetch direction flag is a read command (RD command) (Step S22). When the command is an RD command (YES route at Step S22), the FMT 15 executes a read process (RD process) while referring to FIGS. 184 and 185 (Step S23), and goes back to Step S11. When the command is not an RD command (NO route at Step S22), the FMT 15 executes a read backward process (RB process) to be described later while referring to FIGS. 186 and 187 (Step S24), then goes back to Step S11.

On the other hand, when the prefetch direction flag is not set in the HQP 16-1 (NO route at Step S12), the FMT 15 compares a value of the command pointer in the HQP 16-1 with a value of the command pointer in the FQP 16-3 (Step S13). When [a value of the command pointer in the HQP 16-1] is not larger than [a value of the command pointer in the FQP 16-3] (NO route at Step S13), the FMT 15 determines that a command to be processed is not registered in the command buffer 16, and goes back to Step S11.

When it is determined that [a value of the command pointer in the HQP 16-1] is larger than [a value of the command pointer in the FQP 16-3] (YES route), the FMT 15 refers to the HQL 16-2 (Step S14), and determines a type of the command registered in the HQL 16-2 (Steps S15 to S20).

Namely, when the command is a write command (WR command) (YES route at Step S15), the FMT 15 executes a write process (WR process) to be described later while referring to FIGS. 188 and 189 (Step S25), then goes back to Step S11.

When the command is a back space block command (BSP command) (from NO route at Step S15 to YES route at Step S16), the FMT 15 executes a back space block process (BSP process) to be described later while referring to FIGS. 190 and 191 (Step S26), then goes back to Step S11. When the command is a back space file command (BSPF command) (from NO route at Step S16 to YES route at Step S17), the FMT 15 executes a back space file process (BSPF process) to be described later while referring to FIGS. 192 and 193 (Step S27), then goes back to Step S11.

When the command is a forward space block command (SP command) (from NO route at Step S17 to YES route at Step S18), the FMT 15 executes a forward space block process (SP process) to be described later while referring to FIGS. 194 and 195 (Step S28), then goes back to Step S11. When the command is a forward space block command (FSPF command) (from NO route at Step S18 to YES route at Step S19), the FMT 15 executes a forward space file process (FSPF process) to be described later while referring to FIGS. 196 and 197 (Step S29), then goes back to Step S11.

When the command is a write tape mark command (WTM command) (from NO route at Step S19 to YES route at Step S20), the FMT 15 executes a write tape mark process (WTM process) to be described later while referring to FIGS. 198 and 199 (Step S30), then goes back to Step S11.

When the command is not a WTM command (NO route at Step S20), the FMT 15 executes a process according to the command (other command processing) (Step S21), then goes back to Step S11.

[Read Process (RD Process)]

FIG. 184 is a flowchart for illustrating a read process by the FMT 15. FIG. 185 is a diagram in which a part of the flowchart shown in FIG. 184 (processes A1, B1 and C1) is tabulated in order to explain the read process by the FMT 15.

As shown in FIGS. 184 and 185, process A1, process B1 and process C1 are repeatedly executed at the time of the RD process by the FMT 15 until the streaming is stopped.

In the process A1, the FMT 15 makes the MTU 30 execute a read operation according to the RD command, besides updating XBID by adding 1 to XBID registered in the register 15*a*.

In the process B1, the FMT 15 determines whether or not a tape mark is read out in the read operation by the MTU 30 executed in the process A1 (Step S31). When a tape mark (TM) is read out (YES route at Step S31), the FMT 15 sets a TM flag and sets "0" as the block length BLEN (Step S32), and sets XBID as BID (Step S34). On the other hand, when data other than the tape mark (TM) is read out (NO route at Step S31), the FMT 15 clears the TM flag and sets "LEN" as the block length BLEN (Step S33), then reads XBID as BID from the register 15*a* and sets the same (Step S34). Here, "LEN" is a block length set in a hard register after the data is transferred from the MTU 30 to the data buffer 17.

In the process C1, the FMT 15 registers BID, BLEN and TM flag obtained in the process B1 in the FQL 16-4 in the command buffer 16, registers a value obtained by adding BLEN to BPNT of the next command ahead as a block pointer BPNT, and updates the command pointer and BID in the FQP 16-3.

[Read Backward Process (RB Process)]

FIG. 186 is a flowchart for illustrating a read backward process by the FMT 15. FIG. 187 is a diagram in which the flowchart (processes A2, B2 and C2) shown in FIG. 186 is tabulated in order to explain the read backward process by the FMT 15.

As shown in FIGS. 186 and 187, the process A2, the process B2 and the process C2 are executed at the time of the RB process by the FMT 15.

In the process A2, the FM 15 makes the MTU 30 execute a back read operation according to the RB command, and updates XBID by subtracting 1 from XBID registered in the register 15*a*.

In the process B2, the FMT 15 determines whether or not a tape mark is read out in the real back read operation by the MTU 30 executed in the process A2 (Step S41) as does, in the RD process. When the tape mark (TM) is read out (YES route at Step S41), the FMT 15 sets a TM flag along with "0" as a block length BLEN (Step S42), and sets XBID as BID (Step S44). On the other hand, when data other than the tape mark (TM) is read out (NO route at Step S41), the FMT 15 clears the TM flag, sets "LEN" as the block length BLEN (Step S43), then reads out XBID as BID from the register 15*a* and sets the same (Step S44). Here, "LEN" is a block length to be set in the hard register after data is transferred from the MTU 30 to the data buffer 17.

In the process C2, the FMT 15 registers the BID, BLEN and TM flag obtained in the process B2 in the FQL 16-4 in the command buffer 16 as does in the RD process, registers a value obtained by adding BLEN to BPNT of the next command ahead as a block pointer BPNT, and updates the command pointer and BID in the FQP 16-3.

[Write Process (WR Process)]

FIG. 188 is a flowchart for illustrating a write process by the FMT 15. FIG. 189 is a diagram in which a part (processes A3, B3 and C3) of the flowchart shown in FIG. 188 is tabulated in order to explain the write process by the FMT 15.

As shown in FIGS. 188 and 189, the process A3, the process B3 and the process C3 are repeatedly executed at the time of the WR process by the FMT 15 until the streaming is stopped (until judged YES at Step S50).

In the process A3, the FMT 15 makes the MTU 30 execute a write operation according to a WR command, and updates XBID by adding 1 to XBID registered in the register 15*a*.

In the process B3, the FMT 15 sets "LEN" as a block length BLEN, reads XBID as BID from the register 15*a* and sets the same. Here, "LEN" is a block length to be set in the hard register after data is transferred from the CPU 20 to the data buffer 17.

In the process C3, the FMT 15 registers the BID and BLEN obtained in the process B3 in the FQL 16-4 in the command buffer 16, registers a value as a block pointer BPNT obtained by adding BLEN to BPNT of the next command ahead, and updates the command pointer and BID in the FQP 16-3.

[Back Space Block Process (BSP Process)]

FIG. 190 is a flowchart for illustrating aback space block process by the FMT 15. FIG. 191 is a diagram in which the flowchart (processes A4, B4 and C4) shown in FIG. 190 in order to explain a back space block process by the FMT 15.

As shown in FIGS. 190 and 191, the process A4, the process B4 and the process C4 are executed at the time of the BSP process by the FMT 15.

In the process A4, the FMT 15 makes the MTU 30 execute a back space operation (operation to move a position of the head backward by one data block relative to the magnetic tape) according to a BSP command, and updates XBID by subtracting 1 from XBID registered in the register 15*a*.

The FMT 15 reads XBID as BID from the register 15*a* and sets the same in the process B4. In the process C4, the FMT 15 registers the BID obtained in the process B4 in the FQL 16-4 in the command buffer 16, and updates the command pointer and BID in the FQP 16-3.

[Back Space File Process (BSPF Process)]

FIG. 192 is a flowchart for illustrating a back space file process by the FMT 15. FIG. 193 is a diagram in which a part (processes A5, B5 and C5) of the flowchart shown in FIG. 192 is tabulated in order to explain the back space file process by the FMT 15.

As shown in FIGS. 192 and 193, the process A5 and the process B5 are repeatedly executed at the time of the BSPF process by the FMT 15 until a tape mark (TM) is detected (until judged YES at Step S51). When a TM is detected (YES route at Step S51), the process C5 is executed.

In the process A5, the FMT 15 makes the MTU 30 execute a back space operation (operation to move a position of the head backward for one data block relative to the magnetic tape) according to the BSPF command, and updates XBID by subtracting 1 from XBID registered in the register 15*a*. Thereafter, the FMT 15 reads XBID as BID from the register 15*a* and sets the same in the process B5. By repeating the processes A5 and B5, the magnetic tape is driven backward until a position of the head relative to the magnetic tape reaches a position of the nearest TM (a position at the end of the file).

In the process C5, the FMT 15 registers the BID obtained in the process B5 in the FQL 16-4 in the command buffer 16, and updates the command pointer and BID in the FQP 16-3.

[Forward Space Block Process (SP Process)]

FIG. 194 is a flowchart for illustrating a forward space block process by the FMT 15. FIG. 195 is a diagram in which the flowchart (processes A6, B6 and C6) shown in FIG. 194 is tabulated in order to explain the forward space block process by the FMT 15.

As shown in FIGS. 194 and 195, the process A6, the process B6 and the process C6 are executed at the time of an SP process by the FMT 15.

In the process A6, the FMT 15 makes the MTU 30 execute a forward space operation (operation to move a position of the head forward by one data block relative to the magnetic tape) according to an SP command, and updates XBID by adding 1 to XBID registered in the register 15*a*.

In the process B6, the FMT 15 reads XBID as BID from the register 15*a* and sets the same. In the process C6, the FMT 15 registers BID obtained in the process B6 in the FQL 16-4 in the command buffer 16, and updates the command pointer and BID in the FQP 16-3.

[Forward Space File Process (FSPF Process)]

FIG. 196 is a flowchart for illustrating a forward space file process by the FMT 15. FIG. 197 is a diagram in which a part (processes A7, B7 and C7) of the flowchart shown in FIG. 196 is tabulated in order to explain the forward space file process by the FMT 15.

As shown in FIGS. 196 and 197, the process A7 and the process B7 are repeatedly executed at the time of the FSPF process by the FMT 15 until a tape mark (TM) is detected (until judged YES at Step S51). When a TM is detected (YES route at Step S52), the process C7 is executed.

In the process A7, the FMT 15 makes the MTU 30 execute a forward space operation (operation to move a position of the head forward by one data block relative to the magnetic tape) according to an FSPF command, and updates XBID by adding 1 to XBID registered in the register 15*a*. Thereafter, the FMT 15, in the process B7, reads XBID as BID from the register 15*a*, and sets the same. By repeating these processes A7 and B7, the magnetic tape is driven forward until a position of the head relative to the magnetic tape reaches a position of the nearest TM (position at the head of the file).

In the process C7, the FMT 15 registers the BID obtained in the process B7 in the FQL 16-4 in the command buffer 16, and updates the command pointer and BID in the FQP 16-3.

[Write Tape Mark Process (WTM Process)]

FIG. 198 is a flowchart for illustrating a write tape mark process by the FMT 15. FIG. 199 is a diagram in which the flowchart (processes A8, B3 and C8) shown in FIG. 198 is tabulated in order to explain the write tape mark process by the FMT 15.

As shown in FIGS. 198 and 199, the process A8, the process B8 and the process C8 are executed at the time of the WTM process by the FMT 15.

In the process A8, the FMT 15 makes the MTU 30 execute a write table mark operation (operation to write a tape mark on the magnetic tape) according to a WTM command, and updates XBID by adding 1 to XBID registered in the register 15*a*.

In the process B8, the FMT 15 sets a TM flag, reads XBID as BID from the register 15*a* and sets the same. In the process C8, the FMT 15 registers the BID and TM flag obtained in the process B8 in the FQL 16-4 in the command buffer 16, and updates the command pointer and BID in the FQP 16-3.

FIGS. 200(A) and 200(B) are diagrams for illustrating a state of data writing on the magnetic tape, commands issued from the CPU 20 when a process of additionally writing a multi-file is carried out, and tape operations in the MTU 30 in response to the commands.

FIG. 200(A) depicts a state of data writing on the magnetic tape MT immediately after a writing of a file consisting of a plurality of data blocks (data 1 in the drawing) on the magnetic tape MT is completed. FIG. 200(B) depicts a state of data writing on the magnetic tape MT after a file consisting of a plurality of data blocks (data 2 in the drawing) is additionally written in the state shown in FIG. 200(A).

In FIGS. 200(A) and 200(B), each arrow indicates a tape operation (a direction and a quantity of movement of the head H relative to the magnetic tape MT) carried out in response to each command from the CPU 20. Each arrow is given a type of command (capital letters) directing execution of the tape operation indicated by the arrow. Further, the types of the commands are given numbers in parentheses, (1) to (24), arranged in order the commands were issued from the CPU 20. In FIGS. 200(A) and 200(B), the rightward direction signifies a forward direction of the tape, whereas the leftward direction signifies a backward direction of the same.

As shown in FIG. 200(A), after the last data block (data 1 in the drawings) of a certain file is written on the magnetic tape MT in response to a WR command [cf. (1)], a close process [cf. (2) to (7)] for the file is carried out. Namely, a tape mark TM-a is written on the magnetic tape MT in response to a WTM command [cf. (2)], two end-of-file labels (hereinafter abbreviated as EOF; EOF1, EOF2 in the drawings) are successively written on the magnetic file MT according to a WR command [cf. (3), (4)], two tape marks, TM-b and TM-c, are successively written on the magnetic tape in response to WTM commands [cf. (5), (6)], and the magnetic tape MT is moved backward until TM-b is detected by the head H in response to a BSPF command [cf. (7)]. The MTU 30 waits in a state in which the head H is located between the last two tape marks, TM-b and TM-c, after writing the file.

When the CPU 20 additionally write the second file on the magnetic tape in which the file has been written as shown in FIG. 200(A), an open process [cf. (8) to (22)] for the second file is carried out. Incidentally, it is assumed that an OS (Operating System) actuated by the CPU 20 reads EOF1 twice so as to recognize it, thereby issuing a command such as to recognize a position at which the second file should be additionally written, in the open process at the time of data writing.

In the file open process at the time of data writing, the magnetic tape MT is moved until TM-b is detected by the head H in response to a BSPF command [cf. (8)], then moved backward until TM-a is detected by the head H so as to skip EOF1 and EOF2 in response to a BSPF command [cf. (9)]. Thereafter, the magnetic tape is moved forward until TM-a is detected by the head H in response to an FSPF command [cf. (10)]. After EOF1 is once read in response to an RD command, the magnetic tape is moved forward until TM-b is detected by the head H so as to skip EOF 2 in response to an FSPF command [cf. (12)]. When TM-c is read in response to an RD command [cf. (13)], a Unit Exception report is made.

As shown in FIGS. 200(A) and 200(*b*), processes [cf. (14) to (19)] similar to those described above (7) to (12) are again carried out, the second reading of EOF 1 is completed, the head H is located between TM-b and TM-c, the tape mark TM-c is overwritten with two headers (hereinafter abbreviated as HDR; HDR1, HDR2 in the drawing) by successively writing the same on the magnetic tape MT in response to WR commands [cf. (20), (21)]. Further, the tape mark TM-d is written on the magnetic tape MT in response to a WTM command [cf. (22)], the file open process is thereby completed. Thereafter, a plurality of data blocks (data 2 in the drawing) belonging to the second file are successively written in response to WR commands [cf. (23), (24)]

FIG. 201 is a diagram for illustrating a state of data writing on the magnetic tape MT, commands issued from the CPU 20 when data is read out from two successive files, and tape operations in the MTU 30 in response to the commands.

FIG. 201 shows a state of data writing on the magnetic tape MT after two files are successively written in the manner as described above with reference to FIGS. 200(A) and 200(B).

In FIG. 201, each arrow indicates a tape operation (a direction and a quantity of movement of the head H relative to the magnetic tape MT) performed in response to each command from the CPU 20. Each arrow is given a type (capital letters) of command directing execution of a tape operation indicated by the arrow. The types of the commands are given numbers in parentheses (1) to (13) in order the commands were issued from the CPU 20. In FIG. 201, the rightward direction signifies a tape forward direction (forward), whereas the leftward direction signifies a tape backward direction (backward), as well.

As shown in FIG. 201, after the last data block (data 1 in the drawing) of the first file is read out from the magnetic tape MT in response to an RD command [cf. (1)], a close process [cf. (2), (3)] for the first file is carried out. Namely, the magnetic tape MT is moved forward in response an FSPF command [cf. (2)] until TM-a is detected by the head H, and moved forward according to an FSPF command [cf. (3)] until TM-b is detected by the head H so as to skip EOF1 and EOF2. The head H is thereby located at the leading position of the second file (between TM-b and HDR 1).

Next, the open process [cf. (4) to (11)] for the second file is executed. Incidentally, the OS (Operation System) actuated by the CPU 20 reads EOF 1 once to recognize the same, thereby issuing a command so as to recognize a position at which the second file is read out in the file open process at the time of data reading.

In the file open process at the time of data reading, the magnetic tape MT is moved backward until TM-b is detected by the head H in response to a BSPF command [cf. (4)], and moved backward until TM-a is detected by the head H to skip EOF1 and EOF 2 in response to a BSPF command [cf. (5)]. The magnetic tape MT is then moved forward until TM-a is detected by the head H in response to an FSPF command [cf. (6)] so as to read EOF 1 in response to an RD command [cf. (7)], and moved forward until TM-b is detected by the head H so as to skip EOF 2 in response to an FSPF command [cf. (8)], and two headers, HDR1 and HDR 2, are successively read according to RD commands [cf. (9), (10)]. Further, the magnetic tape MT is moved forward until TM-d is detected by the head H in response to an FSPF command [cf. (11)], the file open process is thereby completed. Thereafter, a plurality of data blocks (data 2 in the drawing) belonging to the second file are successively read according to RD commands [cf. (12), (13)].

In the MTU 30, when data blocks are successively written or read, the streaming control (asynchronous control by buffering) by the MTC 10 can lessen the frequency of the start/stop operation of the magnetic tape, thus improving the read/write performance, as described above.

However, when a tape mark is detected during the streaming operation or a tape operation according to a command (for example, SP command, BSPF command or the like) other than the RD command and the WR command, it is necessary to temporarily stop the tape operation (streaming operation) by the MTU 30, then carry out a re-position operation for a position of the head relative to the magnetic tape when the next command is executed to synchronize a process (process by the HIC 14) on the channel's side connected to the CPU 20 with a process (process by the FMT 15) on the side of the MTU 30.

For instance, a magnetic tape on which data has been recorded in the multi-file form includes a lot of tape mark blocks. When the streaming process is carried out on such a magnetic tape, the start/stop operation of the magnetic tape is carried out each time a tape mark is detected.

Particularly, on such the magnetic tape, the close/open process as described above with reference to FIGS. 200(A), 200(B) and 201 is carried out for the file, the end (a part including two tape marks, TM-a and TM-b, and two EOFs, EOF1 and EOF2) of the file on the magnetic tape MT is moved back and forth relative to the head H in response to commands from the CPU 20. For this reason, the frequency of the start/stop operation of the magnetic tape is increased, thus throughput of the job by the CPU 20 is noticeably decreased.

In the file open process, the OS of the CPU 20 reads EOF1 at least once to recognize it in order to accurately confirm a position at which the second file is additionally written or read, as described above.

Some type of the MTU 30 has a low accuracy of positioning of the head relative to the magnetic tape MT, while some type of the MTU 30 has a high accuracy of positioning of the head relative to the magnetic tape MT. Such the type having a high accuracy is not required to read/recognize EOF1 (or EOF2) in every occasion. In other words, the MTU 30 having a low accuracy (reliability) of positioning of the head is required to perform all the open process for a file as described above with reference to FIGS. 200(A), 200(B) and 201, but the MTU 30 having a high accuracy (reliability) of positioning of the head is not required to perform all the open process for a file.

It is possible that the CPU 20 such controls as to switch a command according to a type of the MTU 30 in order to issue a different command depending on the type of the MTU 30. In such case, it would be necessary to modify the OS and the like actuated by the CPU 20, in addition, a load of the processing on the CPU 20 would increase, which are undesirable.

In consequence, it is desirable to increase a speed of the file open/close process by not only the MTU 30 having a high accuracy of positioning of the head by but also the MTU 30 having a low accuracy of positioning of the head without modifying a command (OS and the like) issued from the side of the CPU 20 at the time of the file close/open process in order that the CPU 20 may cope with even the MTU 30 having a low accuracy of positioning of the head.

SUMMARY OF THE INVENTION

In the light of the above disadvantages, an object of the present invention is to provide a method for controlling a magnetic tape unit in which a tape operation relating to EOF identification in an open process for a file is emulated, thereby simplifying not only the tape operation in the open process but also an operation in a close process for the file. As a result, open-process performance, close-process performance, further a process performance of a system accessing to a magnetic tape unit can be improved.

To accomplish the above object, the present invention provides a method for controlling a magnetic tape unit in response to a command from a command issuing apparatus comprising the steps of, in an open process for a file recorded on a magnetic tape, fixing a position of a head (hereinafter referred to as a real head position) relative to the magnetic tape at a predetermined position in the magnetic tape unit, and when receiving a command from the command issuing apparatus, executing emulation in which a tape operation according to the command is virtually carried out in the magnetic tape unit without making the magnetic tape unit carry out a real tape operation.

In a close process for the file, an end-of-file label read by the magnetic tape unit in response to a command from the command issuing apparatus is saved in a save area, and in an open process for the file, the end-of-file label is transferred to the command issuing apparatus from the save area in response to a command directing to read the end-of-file label without making the magnetic tape unit carry out a real read operation.

In a close process for the file, an end-of-file label written by the magnetic tape unit in response to a command from the command issuing apparatus is saved in a save area, and in an open process for the file, the end-of-file label is transferred to the command issuing apparatus from the save area in response to a command directing to read the end-of-file label without making the magnetic tape unit carry out a real read operation.

In a close process for the file, the magnetic tape unit is made to carry out a real read operation to really read an end-of-file label, which is skipped in the magnetic tape unit in response to a command from the command issuing apparatus, the read end-of-file label is saved in a save area, and in an open process for the file, the end-of-file label is transferred to the command issuing apparatus from the save area in response to a command directing to read the end-of-file label without making the magnetic tape unit carry out a real read operation.

When, in an open process for the file, a command directing to read the end-of-file label is received in a state in which the end-of-file label is not saved in the save area, the magnetic tape unit is made to carry out a real read operation to really read the end-of-file label, and the read end-of-file label is transferred to the command issuing apparatus.

A data buffer for temporarily storing write data to the magnetic tape and read data from the magnetic tape therein is interposed between the command issuing apparatus and the magnetic tape unit to asynchronously carry out a read/write process between the command issuing apparatus and the data buffer and a read/write process between the data buffer and the magnetic tape unit.

A tape operation of the magnetic tape unit is such controlled that, on the magnetic tape, the first tape mark is written after the last data block of the file, the first end-of-file label (hereinafter referred to as EOF1) and the second end-of-file label (hereinafter referred to as EOF2) are written after the first tape mark, the second tape mark is written after the second end-of-file label, and the third tape mark is further written after the second tape mark when the file is the last on the magnetic tape, whereas the next file is written over the third tape mark to be written when the next file is additionally written after the file, and the emulation is executed between immediately before the first tape mark and immediately after the third tape mark while fixing the head at the predetermined position which is immediately after the second tape mark.

While the emulation is executed, a virtual position of the head (hereinafter referred to as a virtual head position) relative to the magnetic tape in the magnetic tape unit is managed as a relative position of the head relative to the predetermined position.

When a command requiring the real head position in the magnetic tape unit is received while the emulation is executed, a sum of the predetermined position and the relative position is generated, and the sum is reported as the real head position to the command issuing apparatus. When the magnetic tape unit is shifted to a real operation while the emulation is executed, the real head position in the magnetic tape unit is generated as a sum of the predetermined position and the relative position, and the head in the magnetic tape unit is re-positioned at the real head position.

According to this invention, emulation is executed under conditions [1] to [8] below.

[1] In a state in which both of EOF1 and EOF2 are saved in the save areas, and in a state in which reading/writing up to the second tape mark is completed and the real head position is the predetermined position in the magnetic tape unit, (1-1) when any one of a read back command (hereinafter abbreviated as RB command), a back space block command (hereinafter abbreviated as BSP command) and a back space file command (hereinafter abbreviated as BSPF command) is received, with the virtual head position being immediately after the second tape mark;

(1-2) when any one of a read command (hereinafter abbreviated as RD command), an RB command, a BSP command, a BSPF command, a forward space block command (hereinafter abbreviated as SP command), a forward space file command (hereinafter abbreviated as FSPF command) and a write tape mark command (hereinafter abbreviated as WTM command) is received, with the virtual head position being immediately after EOF2;

(1-3) when any one of an RD command, an RB command, a BSP command, a BSPF command, an SP command and an FSPF command is received, with the virtual head position being immediately after EOF1;

(1-4) when any one of an RD command, an RB command, a BSP block command, a BSPF command, an SP command and an FSPF command is received, with the virtual head position being immediately after the first tape mark; or (1-5) when any one of an RD command, an SP command and an FSPF command is received, with the virtual head position being immediately after the last data block.

[2] In a state in which both of EOF1 and EOF2 are saved in the save areas, and in a state in which reading/writing up to the third tape mark is completed and the real head position is the predetermined position in the magnetic tape unit, (2-1) when any one of an RB command, a BSP command and a BSPF command is received, with the virtual head position being immediately after the third tape mark;

(2-2) when any one of an RD command, an RB command, a BSP command, a BSPF command, an SP command, an FSPF command and a WTM command is received, with the virtual head position being immediately after the second tape mark;

(2-3) when any one of an RD command, an RB command, a BSP command, a BSPF command, an SP command and an FSPF command is received, with the virtual head position being immediately after EOF2;

(2-4) when any one of an RD command, an RB command, a BSP command, a BSPF command, an SP command and an FSPF command is received, with the virtual head position being immediately after EOF1;

(2-5) when any one of an RD command, an RB command, a BSP command, a BSPF command, an SP command and an FSPF command is received, with the virtual head position being immediately after the first tape mark; or (2-6) when any one of an RD command, an SP command and an FSPF command is received, with the virtual head position being immediately after the last data block.

[3] In a state in which only EOF1 is saved in the save area, and in a state in which reading/writing up to the second tape mark is completed and the real head position is the predetermined position in the magnetic tape unit, (3-1) when any one of an RB command, a BSP command and a BSPF command is received, with the virtual head position being immediately after the second tape mark;

(3-2) when any one of an RD command, an RB command, a BSP command, a BSPF command, an SP command, an FSPF command and a WTM command is received, with the virtual head position being immediately after EOF2;

(3-3) when any one of an RB command, a BSP command, a BSPF command, an SP command and an FSPF command is received, with the virtual head position being immediately after EOF1;

(3-4) when any one of an RD command, an RB command, a BSP command, a BSPF command, an SP command and an FSPF command is received, with the virtual head position being immediately after the first tape mark; or (3-5) when any one of an RD command, a SP command and an FSPF command is received, with the virtual head position being immediately after the last data block.

[4] In a state in which only EOF1 is saved in the save area, and in a state in which reading/writing up to the third tape mark is completed and the real head position is the predetermined position in the magnetic tape unit, (4-1) when any one of an RD command, a BSP command and a BSPF command is received, with the virtual head position being immediately after the third tape mark;

(4-2) when any one of an RD command, an RB command, a BSP command, a BSPF command, an SP command, an FSPF command and a WTM command is received, with the virtual head position being immediately after the second tape mark;

(4-3) when any one of an RD command, an RB command, a BSP command, a BSPF command, an SP command and an FSPF command is received, with the virtual head position being immediately after EOF2;

(4-4) when any one of an RB command, a BSP command, a BSPF command, an SP command and an FSPF command is received, with the virtual head position being immediately after EOF1;

(4-5) when any one of an RD command, an RB command, a BSP command, a BSPF command, an SP command and an FSPF command is received, with the virtual head position being immediately after the first tape mark; or (4-6) when any one of an RD command, an SP command and an FSPF command is received, with the virtual head position being immediately after the last data block.

[5] In a state in which only EOF2 is saved in the save area, and in a state in which reading/writing up to the second tape mark is completed and the real head position is the predetermined position in the magnetic tape unit, (5-1) when any one of an RB command, a BSP command and a BSPF command is received, with the virtual head position being immediately after the second tape mark;

(5-2) when any one of an RD command, an RB command, a BSP command, a BSPF command, an SP command, an FSPF command and a WTM command is received, with the virtual head position being immediately after EOF2;

(5-3) when any one of an RD command, an RB command, a BSP command, a BSPF command, an SP command and an FSPF command is received, with the virtual head position being immediately after EOF1;

(5-4) when any one of an RB command, a BSP command, a BSPF command, an SP command and an FSPF command is received, with the virtual head position being immediately after the first tape mark; or (5-5) when any one of an RD command, an SP command and an FSPF command is received, with the virtual head position being immediately after the last data block.

[6] In a state in which only EOF2 is saved in the save area, and in a state in which reading/writing up to the third tape mark is completed and the real head position is the predetermined position in the magnetic tape unit, (6-1) when any one of an RB command, a BSP command and a BSPF command is received, with the virtual head position being immediately after the third tape mark;

(6-2) when any one of an RD command, an RB command, a BSP command, a BSPF command, an SP command, an FSPF command and a WTM command is received, with the virtual head position being immediately after the second tape mark;

(6-3) when any one of an RD command, an RB command, a BSP command, a BSPF command, an SP command and an FSPF command is received, with the virtual head position being immediately after EOF2;

(6-4) when any one of an RD command, an RB command, a BSP command, a BSPF command, an SP command and an FSPF command is received, with the virtual head position being immediately after EOF1;

(6-5) when any one of an RB command, a BSP command, a BSPF command, an SP command and an FSPF command is received, with the virtual head position being immediately after the first tape mark; or (6-6) when any one of an RD command, an SP command and an FSPF command is received, with the virtual head position being immediately after the last data block.

[7] In a state in which neither EOF1 nor EOF2 is saved in the save area, and in a state in which reading/writing up to the second tape mark is completed and the real head position is the predetermined position in the magnetic tape unit, (7-1) when any one of an RB command, a BSP command and a BSPF command is received, with the virtual head position being immediately after the second tape mark;

(7-2) when any one of an RD command, an RB command, a BSP command, an SP command, an FSPF command and a WTM command is received, with the virtual head position being immediately after EOF2;

(7-3) when any one of an RB command, a BSP command, a BSPF command, a BSPF command, an SP command and an FSPF command is received, with the virtual head position being immediately after EOF1;

(7-4) when any one of an RB command, a BSP command, a BSPF command, an SP command and an FSPF command is received, with the virtual head position being immediately after the first tape mark; or (7-5) when any one of an RD command, an SP command and an FSPF command is received, with the virtual head position being immediately after the last data block.

[8] In a state in which neither EOF1 nor EOF2 is saved in the save area, and in a state in which reading/writing up to the third tape mark is completed and the real head position is the predetermined position in the magnetic tape unit, (8-1) when any one of an RB command, a BSP command and a BSPF command is received, with the virtual head position being immediately after the third tape mark;

(8-2) when any one of an RD command, an RB command, a BSP command, a BSPF command, an SP command, an FSPF command and a WTM command is received, with the virtual head position being immediately after the second tape mark;

(8-3) when any one of an RD command, an RB command, a BSP command, a BSPF command, an SP command and an FSPF command is received, with the virtual head position being immediately after EOF2;

(8-4) when any one of an RB command, a BSP command, a BSPF command, an SP command and an FSPF command is received, with the virtual head position being immediately after EOF1;

(8-5) when any one of an RB command, a BSP command, a BSPF command, an SP command and an FSPF command is received, with the virtual head position being immediately after the first tape mark; or (8-6) when any one of an RD command, an SP command and an FSPF command is received, with the virtual head position being immediately after the last data block.

When, in a close process for the file, a command requiring to write the third tape mark is received after the second tape mark is written on the magnetic tape, completion of a writing of the third tape mark is reported to the command issuing apparatus without writing the third tape mark.

In the above case, when a command directing to position the head outside a region from immediately before the first tape mark to immediately after the third tape mark is received, the third tape mark is written, and the magnetic tape unit is then made to carry out a tape operation according to the command. When EOD (End Of Data) is detected after the second tape mark in the magnetic tape unit during a tape operation in response to a command from the command issuing apparatus, detection of the third tape mark is reported in lieu of the EOD to the command issuing apparatus.

The present invention further provides a method for controlling a magnetic tape unit in response to a command from a command issuing apparatus comprising the steps of, in a close process for a file recorded on a magnetic tape, controlling a tape operation of the magnetic tape unit such that, on the magnetic tape, the first tape mark is written after the last data block of the file, at least one end-of-file label is written after the first tape mark, and the second tape mark is written after the end-of-file label, and reporting completion of a writing of the third tape mark to the command issuing apparatus without writing the third tape mark even if a command requiring to write the third tape mark is received.

When a command in a motion system involving unloading and rewinding is received, the third tape mark is written, and the magnetic tape unit is then made to carry out a tape operation according to the command in the motion system. When EOD (End Of Data) is detected after the second tape mark in the magnetic tape unit during a tape operation in response to a command from the command issuing apparatus, detection of the third tape mark is reported in lieu of detection of the EOD to the command issuing apparatus.

In the case where a plurality of end-of-file labels are recorded as one physical block on the magnetic tape by a packeting function, when a command directing to read one of the plurality of end-of-file labels is received in a close process for the file, the physical block including the end-of-file label to be read may be read out from the magnetic tape and stored in the data buffer, and, in an open process for the file, an end-of-file label corresponding to a command directing to read the one of the plurality of end-of-file labels may be read out from the data buffer in response to the command and transferred to the command issuing apparatus.

The method for controlling a magnetic tape unit according to this invention can provide the following effects and advantages:

(1) By emulating a tape operation relating to EOF identification in the open process for a file, it is possible to decrease a frequency of the mechanical tape operation in the magnetic tape unit, thus simplify the tape operation in the open process. As a result, a time required for the open process for a file is largely shortened, and open-process, close-process performance and process performance of a system accessing to the magnetic tape unit is largely improved.

(2) When head position accuracy of the magnetic tape unit is low, it is possible to carry out a command processing in response to a command from the command issuing apparatus as before if the emulation is not executed. Namely, it is possible to readily speed up the open process for a file in a magnetic tape unit having a high head positioning accuracy without modifying a command issued from the command issuing apparatus in the open process for the file, thereby coping with even a magnetic tape unit having a low head positioning accuracy.

(3) By emulating a tape operation relating to EOF identification in the open process for a file and emulating an operation of writing the third tape mark in the close process for the file, it is possible to simplify the tape operation in not only the open process but also the close process. Consequently, a time required for not only the open process but also the close process is shortened, thus a time required to process a job is further shortened. This largely improves file close/open process performance, further process performance of a system accessing to the magnetic tape unit.

(4) Even if a process is terminated while the third tape mark is not recorded on the magnetic tape due to a failure such as power-off or the like after an operation of writing the third tape mark is emulated, EOD immediately after the second tape mark is assumed to be the third tape mark after the recovery of the failure, the command processing can be continuously carried out as usual in the magnetic tape unit without making the magnetic tape unit carry out any special recovery process such as a writing of the third tape mark.

(5) By emulating an operation of writing the third tape mark in the close process for a file, it is possible to simplify the tape operation in the close process for the file. This improves file close process performance, further process performance of a system accessing to the magnetic tape unit.

(6) By using a packeting function of EDRC or the like, it is possible to emulate a larger number of tape operations, thus shorten a time required for the open process for a file. This leads to large improvements of the file open process performance, and further the processing performance of a system accessing to the magnetic tape unit via the interface converting apparatus.

BRIEF DESCRIPTION OF THE DRAWINGS

FIG. 2(A) is a diagram showing structures of a command buffer and a data buffer, and a register for XBID according to the first embodiment, whereas FIG. 2(B) is a diagram showing save areas and control areas in a RAM according to the first embodiment;

FIG. 5 is a diagram in which a part of the flowchart shown in FIG. 4 is tabulated in order to illustrate the command processing (read process) by the format controller in the magnetic tape controller according to the first embodiment;

FIG. 7 is a diagram in which a part of the flowchart shown in FIG. 6 is tabulated in order to illustrate the command processing (read backward process) by the format controller in the magnetic tape controller according to the first embodiment;

FIG. 9 is a diagram in which a part of the flowchart shown in FIG. 8 is tabulated in order to illustrate the command processing (write process) by the format controller in the magnetic tape controller according to the first embodiment;

FIG. 11 is a diagram in which a part of the flowchart shown in FIG. 10 is tabulated in order to illustrate the command processing (back space block process) by the format controller in the magnetic tape controller according to the first embodiment;

FIG. 13 is a diagram in which a part of the flowchart shown in FIG. 12 is tabulated in order to illustrate the command processing (back space file process) by the format controller in the magnetic tape controller according to the first embodiment;

FIG. 15 is a diagram in which a part of the flowchart shown in FIG. 14 is tabulated in order to illustrate the command processing (forward space block process) by the format controller in the magnetic tape controller according to the first embodiment;

FIG. 17 is a diagram in which a part of the flowchart shown in FIG. 16 is tabulated in order to illustrate the command processing (forward space file process) by the format controller in the magnetic tape controller according to the first embodiment;

FIG. 19 is a diagram in which a part of the flowchart shown in FIG. 18 is tabulated in order to illustrate the command processing (write tape mark process) by the format controller in the magnetic tape controller according to the first embodiment;

FIG. 20 is a diagram for illustrating emulation executing conditions according to the first embodiment;

FIG. 21 is a diagram for illustrating emulation executing conditions according to the first embodiment;

FIGS. 22(A) and 22(B) are diagrams showing a state of data writing on the magnetic tape, and for illustrating an example of commands issued from an upper apparatus when a multi-file is additionally written, and tape operations/emulation operations in response to the commands in the magnetic tape unit according to the first embodiment;

FIG. 47 is a diagram showing a state of data writing on the magnetic tape, and for illustrating an example of commands issued from the upper apparatus when data is read out from two consecutive files and tape operations/emulation operations in response to the commands in the magnetic tape unit according to the first embodiment;

FIG. 63 is a diagram in which, when a multi-file is additionally written as shown in FIGS. 22(A) and 22(B), a time required for a command processing carried out applying the method according to the first embodiment and executing emulation is compared with a time required for the command processing carried out applying a known method without executing emulation;

FIG. 64 is a diagram in which, when data is read out from two consecutive files as shown in FIG. 47, a time required for a command processing carried out applying the method according to the first embodiment and executing emulation is compared with a time required for the command processing carried out applying the known method without executing emulation;

FIG. 65 is a diagram in which, when a multi-file is additionally written as shown in FIGS. 61(A) and 61(B), a time required for a command processing carried out applying the method according to the first embodiment and executing emulation is compared with a time required for the command processing carried out applying the known method without executing emulation;

FIG. 66 is a diagram in which, when data is read out from two consecutive files, a time required for a command processing carried out applying the method according to the first embodiment and executing emulation is compared with a time required for the command processing carried out applying the known method without executing emulation;

FIG. 82 is a diagram showing structures of save areas and control areas in a RAM according to the second embodiment;

FIG. 84 is a diagram in which a part of a read process in Pattern 1 by the control unit in the interface converting apparatus according to the second embodiment is tabulated in order to illustrate the same;

FIG. 85 is a diagram in which a part of a read process in Pattern 2 by the control unit in the interface converting apparatus according to the second embodiment is tabulated in order to illustrate the same;

FIG. 86 is a diagram in which a part of a read process in Pattern 3 by the control unit in the interface converting apparatus according to the second embodiment is tabulated in order to illustrate the same;

FIG. 87 is a diagram in which a part of a read process in Pattern 4 by the control unit in the interface converting apparatus according to the second embodiment is tabulated in order to illustrate the same;

FIG. 88 is a diagram in which a part of a read backward process in Pattern 1 by the control unit in the interface converting apparatus according to the second embodiment is tabulated in order to illustrate the same;

FIG. 89 is a diagram in which a part of a read backward process in Pattern 2 by the control unit in the interface converting apparatus according to the second embodiment is tabulated in order to illustrate the same;

FIG. 90 is a diagram in which a part of a read backward process in Pattern 3 by the control unit in the interface converting apparatus according to the second embodiment is tabulated in order to illustrate the same;

FIG. 91 is a diagram in which a part of a read backward process in Pattern 4 by the control unit in the interface converting apparatus according to the second embodiment is tabulated in order to illustrate the same;

FIG. 92 is a diagram in which a part of a write process in Pattern 1 by the control unit in the interface converting apparatus according to the second embodiment is tabulated in order to illustrate the same;

FIG. 93 is a diagram in which a part of a write process in Pattern 2 by the control unit in the interface converting apparatus according to the second embodiment is tabulated in order to illustrate the same;

FIG. 94 is a diagram in which a part of a write process in Pattern 3 by the control unit in the interface converting apparatus according to the second embodiment is tabulated in order to illustrate the same;

FIG. 95 is a diagram in which a part of a write process in Pattern 4 by the control unit in the interface converting apparatus according to the second embodiment is tabulated in order to illustrate the same;

FIG. 96 is a diagram in which a part of a back space block process in Pattern 1 by the control unit in the interface converting apparatus according to the second embodiment is tabulated in order to illustrate the same;

FIG. 97 is a diagram in which a part of a back space block process in Pattern 2 by the control unit in the interface converting apparatus according to the second embodiment is tabulated in order to illustrate the same;

FIG. 98 is a diagram in which a part of a back space block process in Pattern 3 by the control unit in the interface converting apparatus according to the second embodiment is tabulated in order to illustrate the same;

FIG. 99 is a diagram in which a part of a back space block process in Pattern 4 by the control unit in the interface converting apparatus according to the second embodiment is tabulated in order to illustrate the same;

FIG. 100 is a diagram in which a part of a back space file process in Pattern 1 by the control unit in the interface converting apparatus according to the second embodiment is tabulated in order to illustrate the same;

FIG. 101 is a diagram in which a part of a back space file process in Pattern 2 by the control unit in the interface converting apparatus according to the second embodiment is tabulated in order to illustrate the same;

FIG. 102 is a diagram in which a part of a back space file process in Pattern 3 by the control unit in the interface converting apparatus according to the second embodiment is tabulated in order to illustrate the same;

FIG. 103 is a diagram in which a part of a back space file process in Pattern 4 by the control unit in the interface converting apparatus according to the second embodiment is tabulated in order to illustrate the same;

FIG. 104 is a diagram in which a part of a forward space block process in Pattern 1 by the control unit in the interface converting apparatus according to the second embodiment is tabulated in order to illustrate the same;

FIG. 105 is a diagram in which a part of a forward space block process in Pattern 2 by the control unit in the interface converting apparatus according to the second embodiment is tabulated in order to illustrate the same;

FIG. 106 is a diagram in which a part of a forward space block process in Pattern 3 by the control unit in the interface converting apparatus according to the second embodiment is tabulated in order to illustrate the same;

FIG. 107 is a diagram in which a part of a forward space block process in Pattern 4 by the control unit in the interface converting apparatus according to the second embodiment is tabulated in order to illustrate the same;

FIG. 108 is a diagram in which a part of a forward space file process in Pattern 1 by the control unit in the interface converting apparatus according to the second embodiment is tabulated in order to illustrate the same;

FIG. 109 is a diagram in which a part of a forward space file process in Pattern 2 by the control unit in the interface converting apparatus according to the second embodiment is tabulated in order to illustrate the same;

FIG. 110 is a diagram in which a part of a forward space file process in Pattern 3 by the control unit in the interface converting apparatus according to the second embodiment is tabulated in order to illustrate the same;

FIG. 111 is a diagram in which a part of a forward space file process in Pattern 4 by the control unit in the interface converting apparatus according to the second embodiment is tabulated in order to illustrate the same;

FIG. 112 is a diagram in which a part of a write tape mark process in Pattern 1 by the control unit in the interface converting apparatus according to the second embodiment is tabulated in order to illustrate the same;

FIG. 113 is a diagram in which a part of a write tape mark process in Pattern 2 by the control unit in the interface converting apparatus according to the second embodiment is tabulated in order to illustrate the same;

FIG. 114 is a diagram in which a part of a write tape mark process in Pattern 3 by the control unit in the interface converting apparatus according to the second embodiment is tabulated in order to illustrate the same;

FIG. 115 is a diagram in which a part of a write tape mark process in Pattern 4 by the control unit in the interface converting apparatus according to the second embodiment is tabulated in order to illustrate the same;

Figures 116A, 116B:
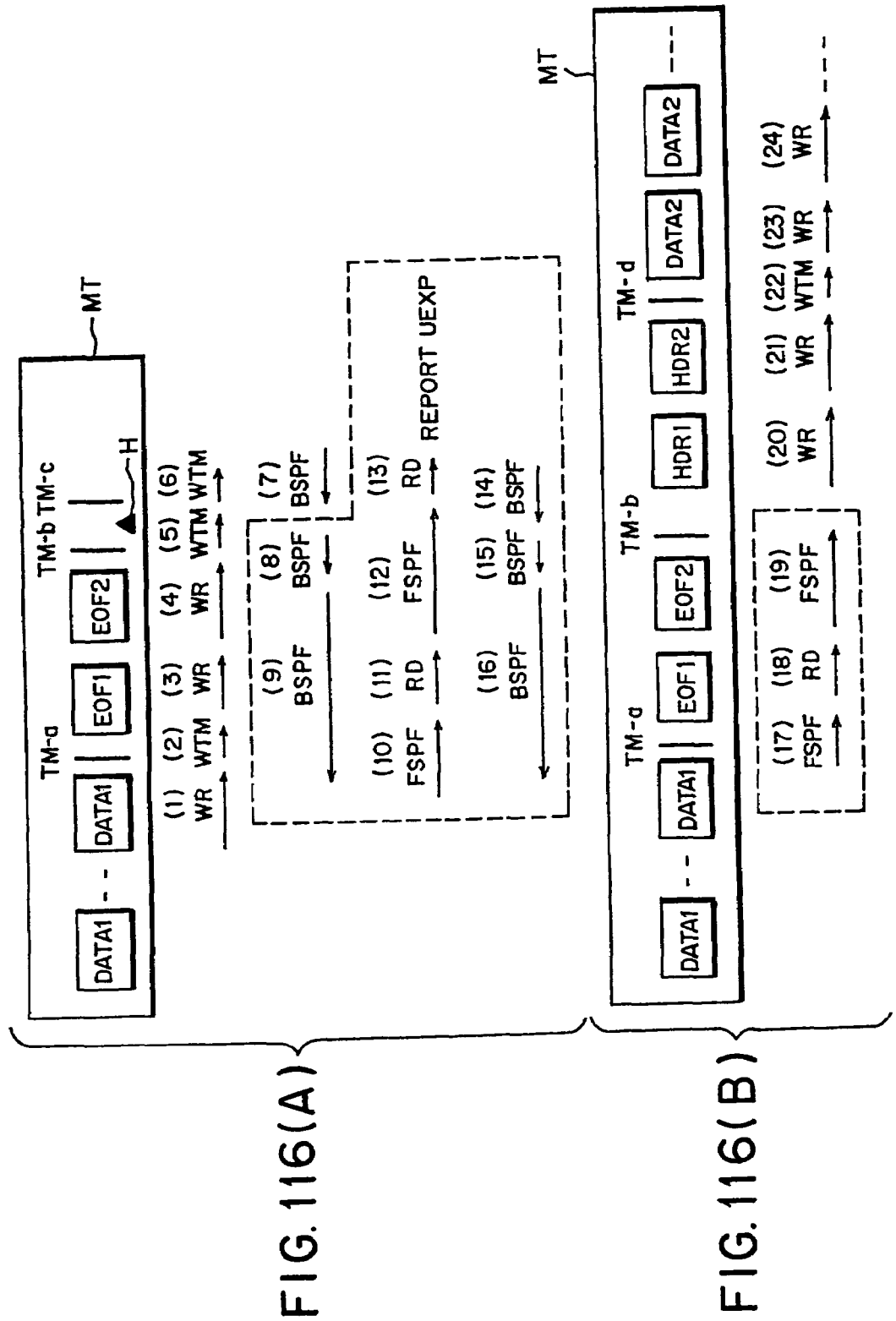
FIGS. 116(A) and 116(B) are diagrams showing a state of data writing on the magnetic tape, and for illustrating an example of commands issued from the upper apparatus when a multi-file is additionally written and tape operations/emulation operations in response to the commands in the magnetic tape unit according to the second embodiment.
Figure 120A:
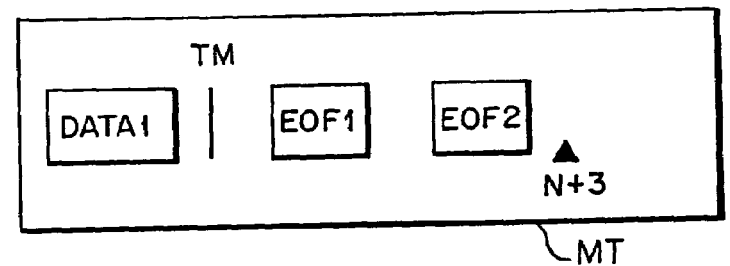
Figure 120B:
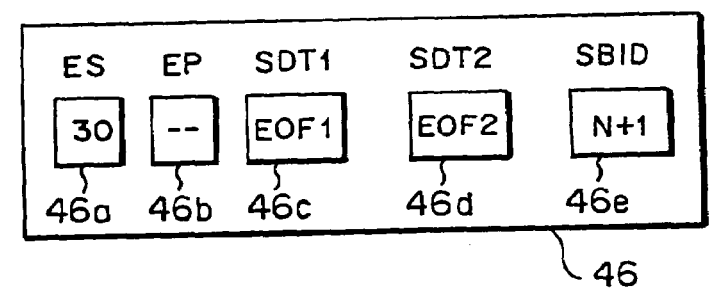
Figure 121A:
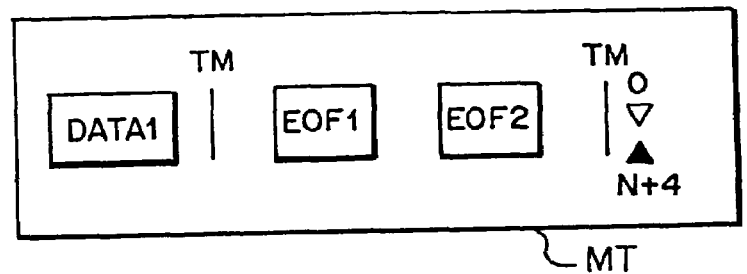
Figure 121B:
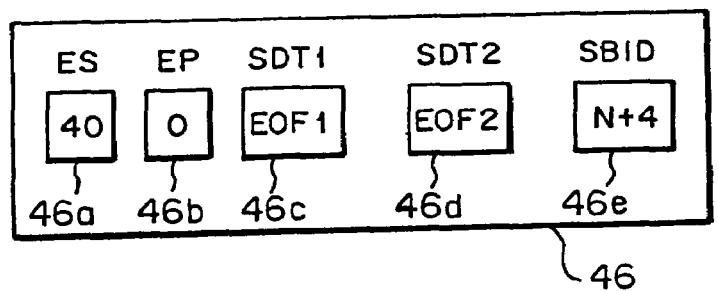
Figure 122A:
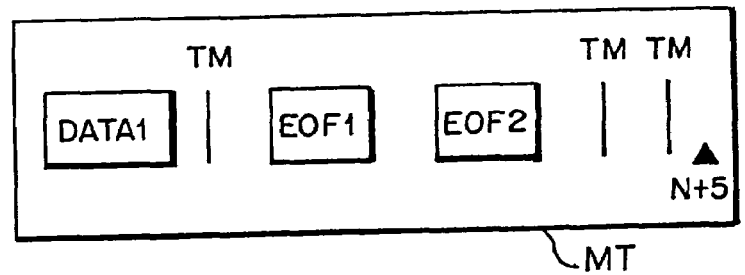
Figure 122B:
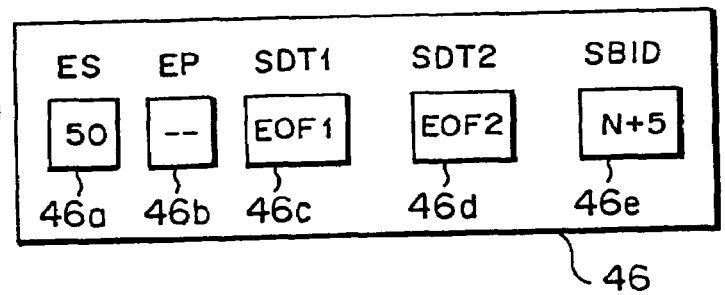
Figure 123A:
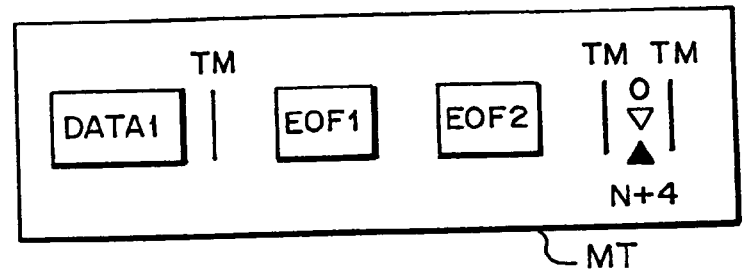
Figure 123B:
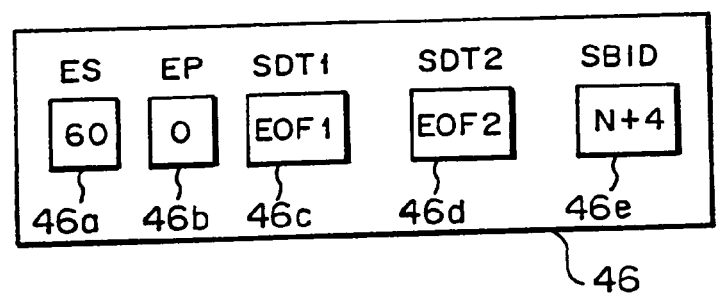
Figure 124A:
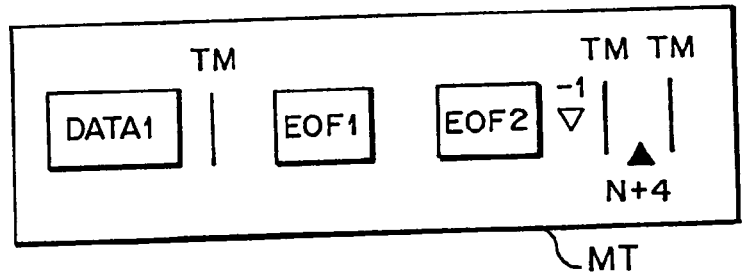
Figure 124B:
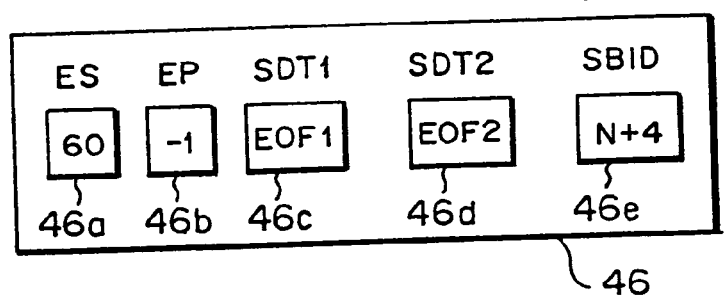
Figure 125A:
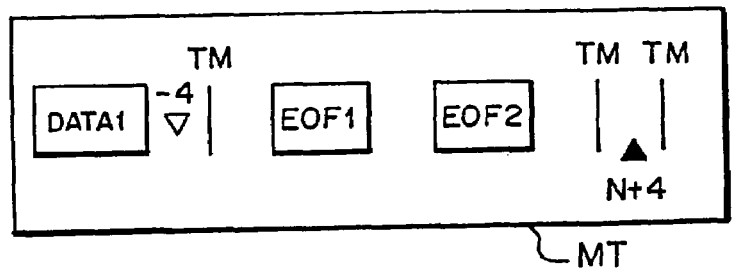
Figure 125B:
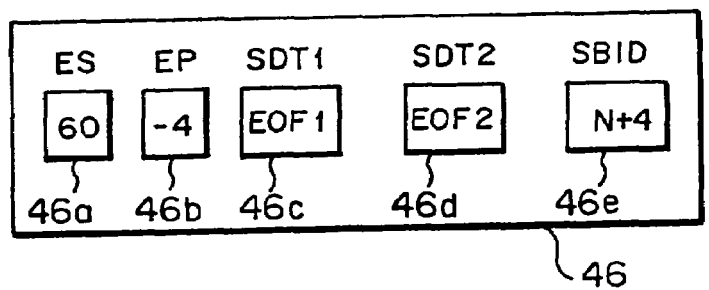
Figure 126A:
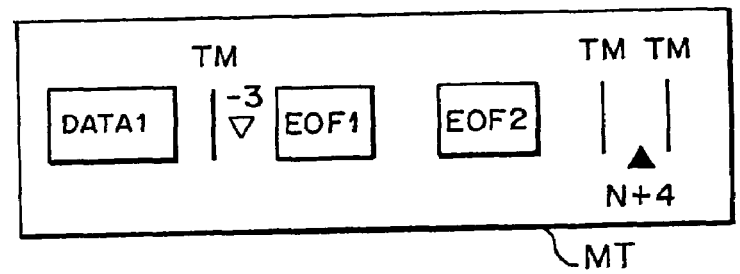
Figure 126B:
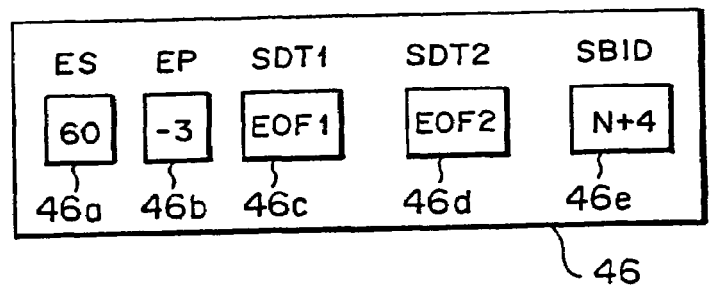
Figure 127A:
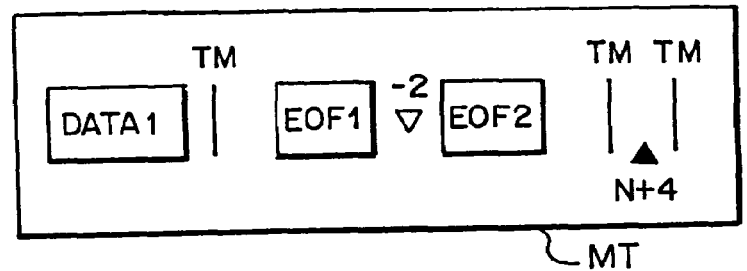
Figure 127B:
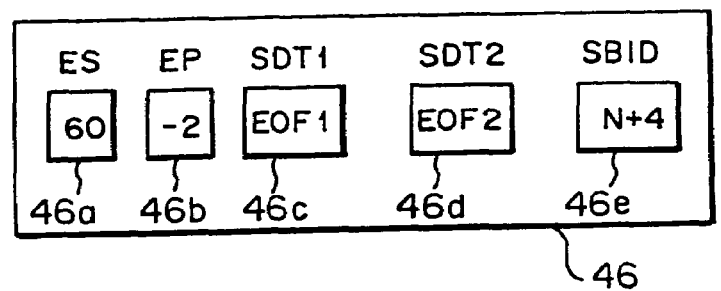
Figure 128A:
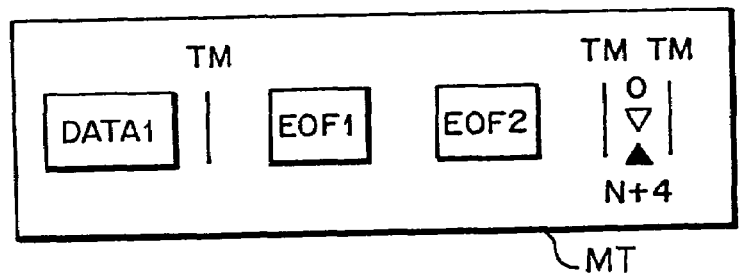
Figure 128B:
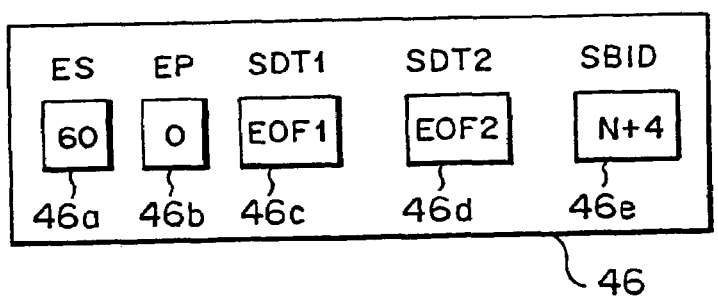
Figure 129A:
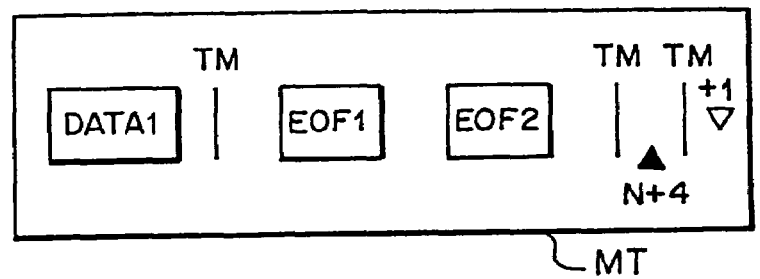
Figure 129B:
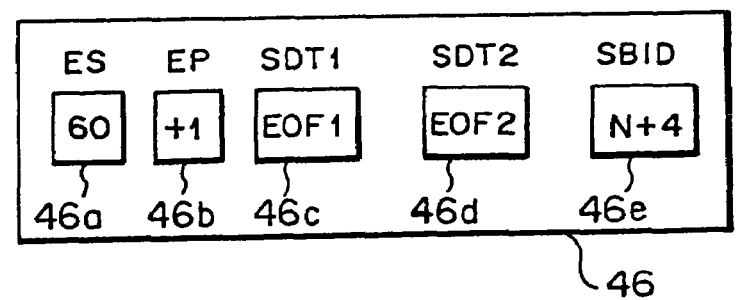
Figure 130A:
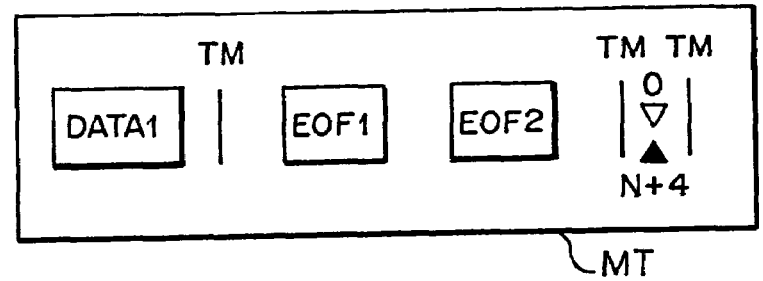
Figure 130B:
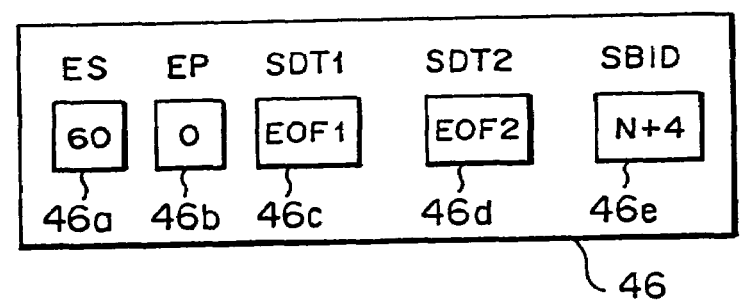
Figure 131A:
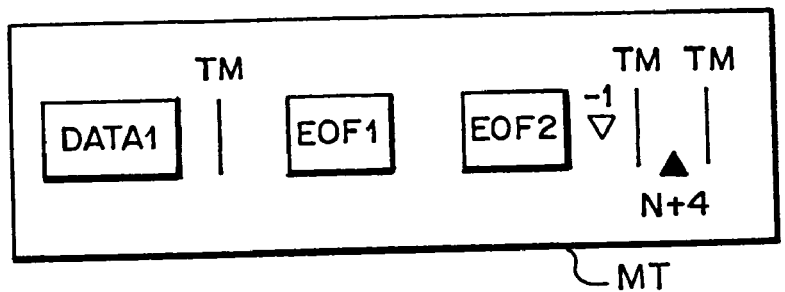
Figure 131B:
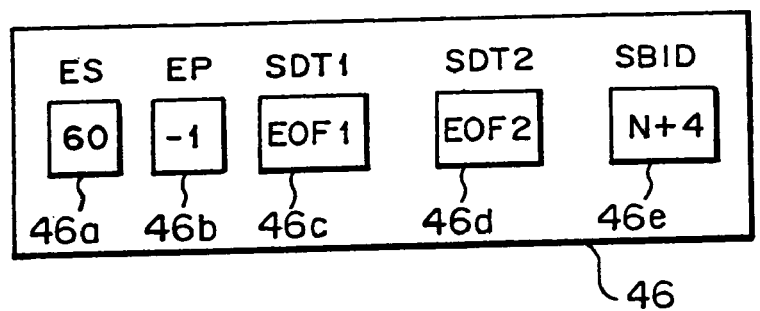
Figure 132A:
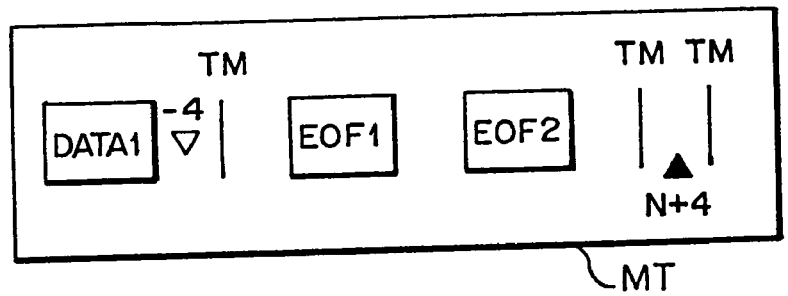
Figure 132B:
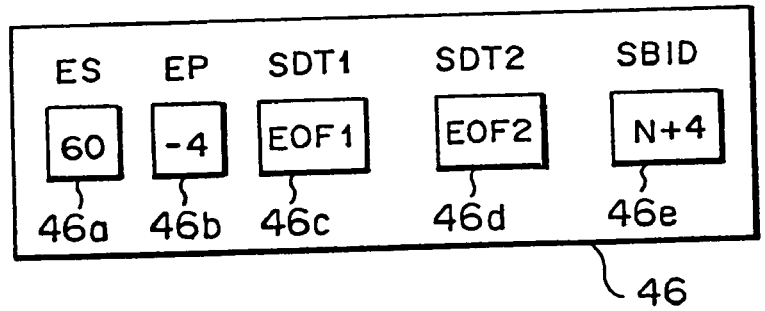
Figure 133A:
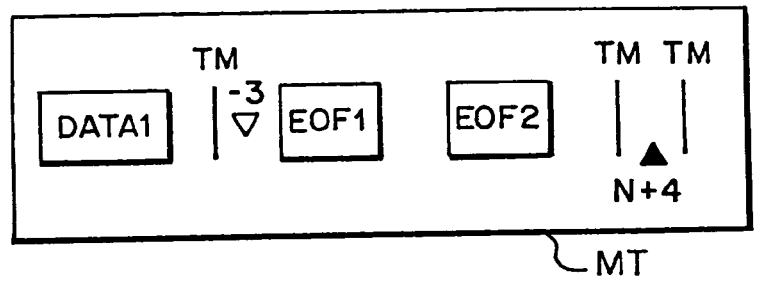
Figure 133B:
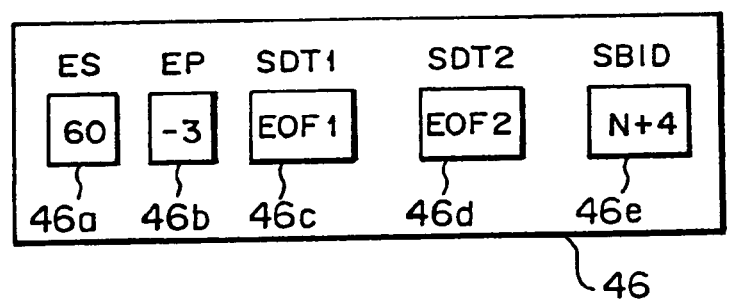
Figure 134A:
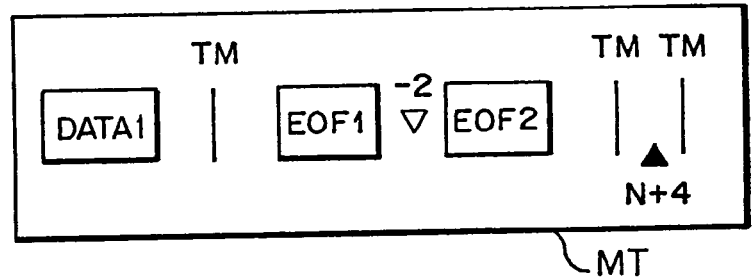
Figure 134B:
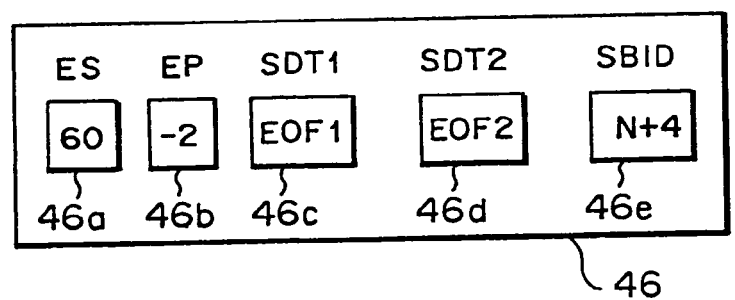
Figure 135A:
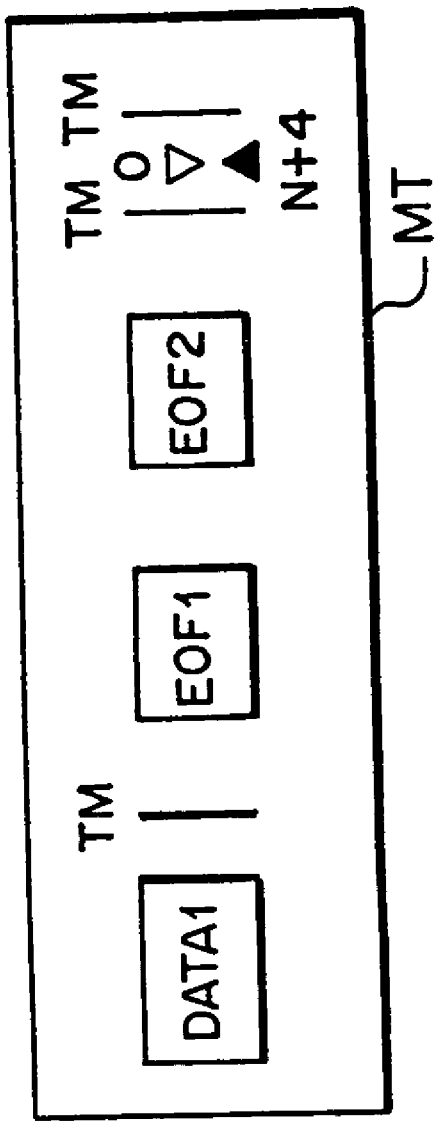
Figure 135B:
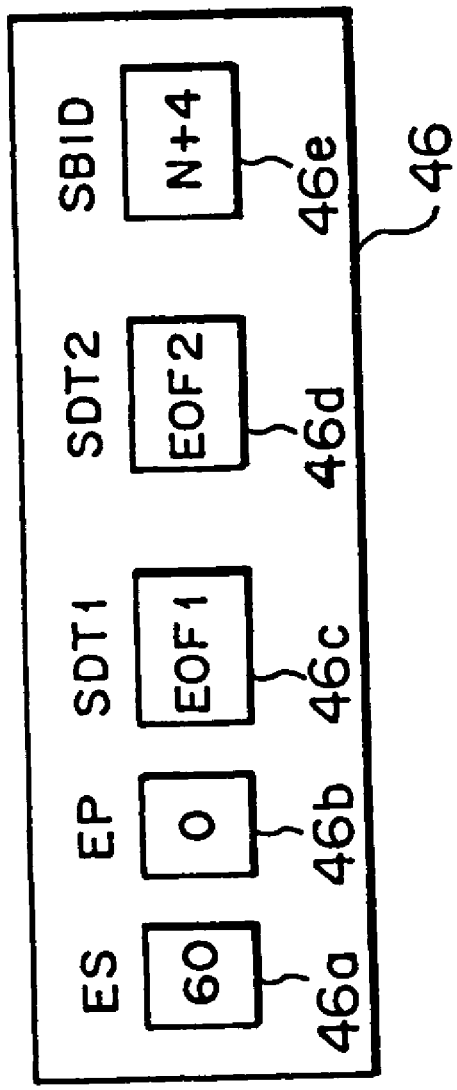
Figure 136A:
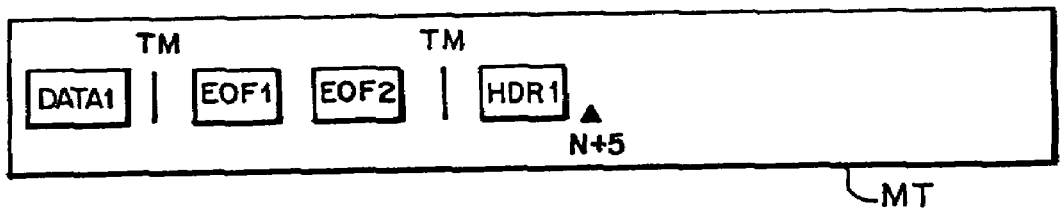
Figure 136B:
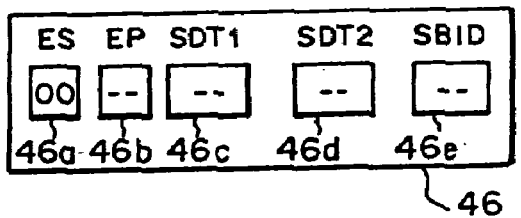
Figure 137A:
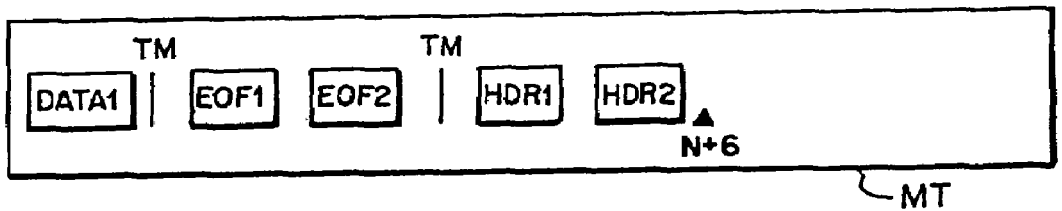
Figure 137B:
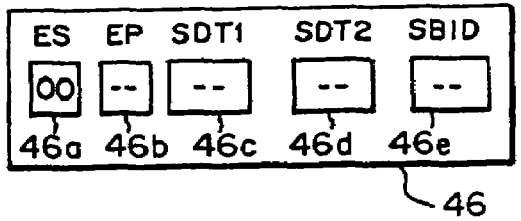
Figure 138A:
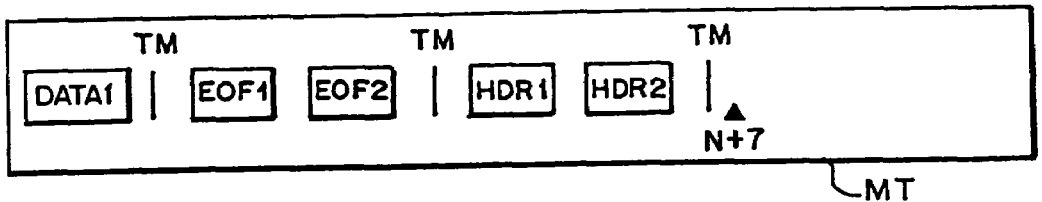
Figure 138B:
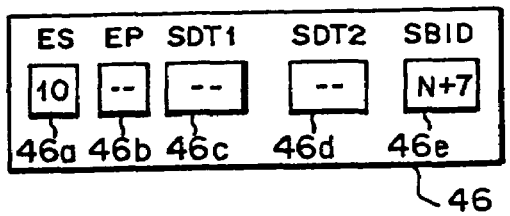
Figure 139A:
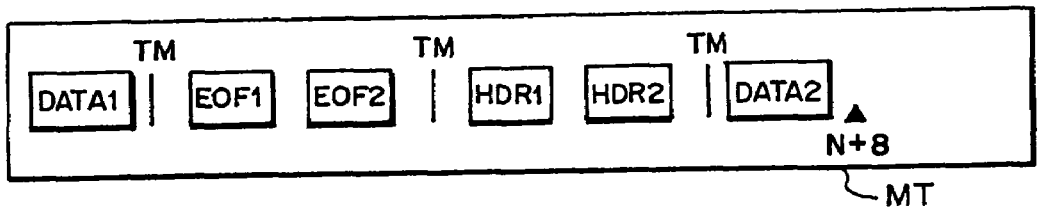
Figure 139B:
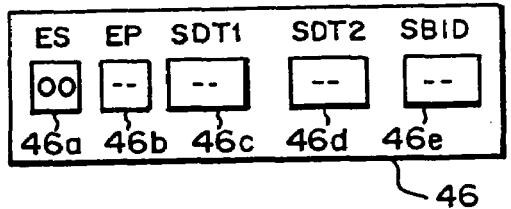
Figure 140A:
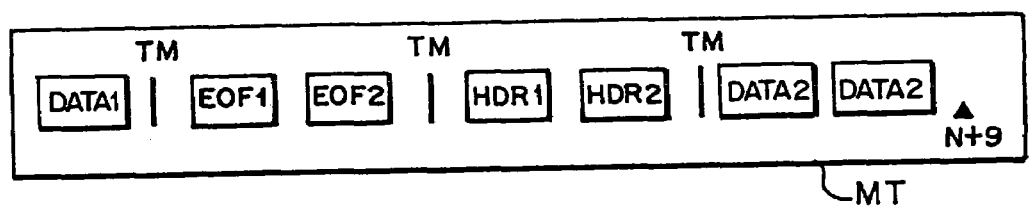
Figure 140B:
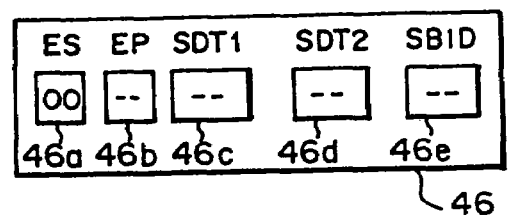
Figure 141:
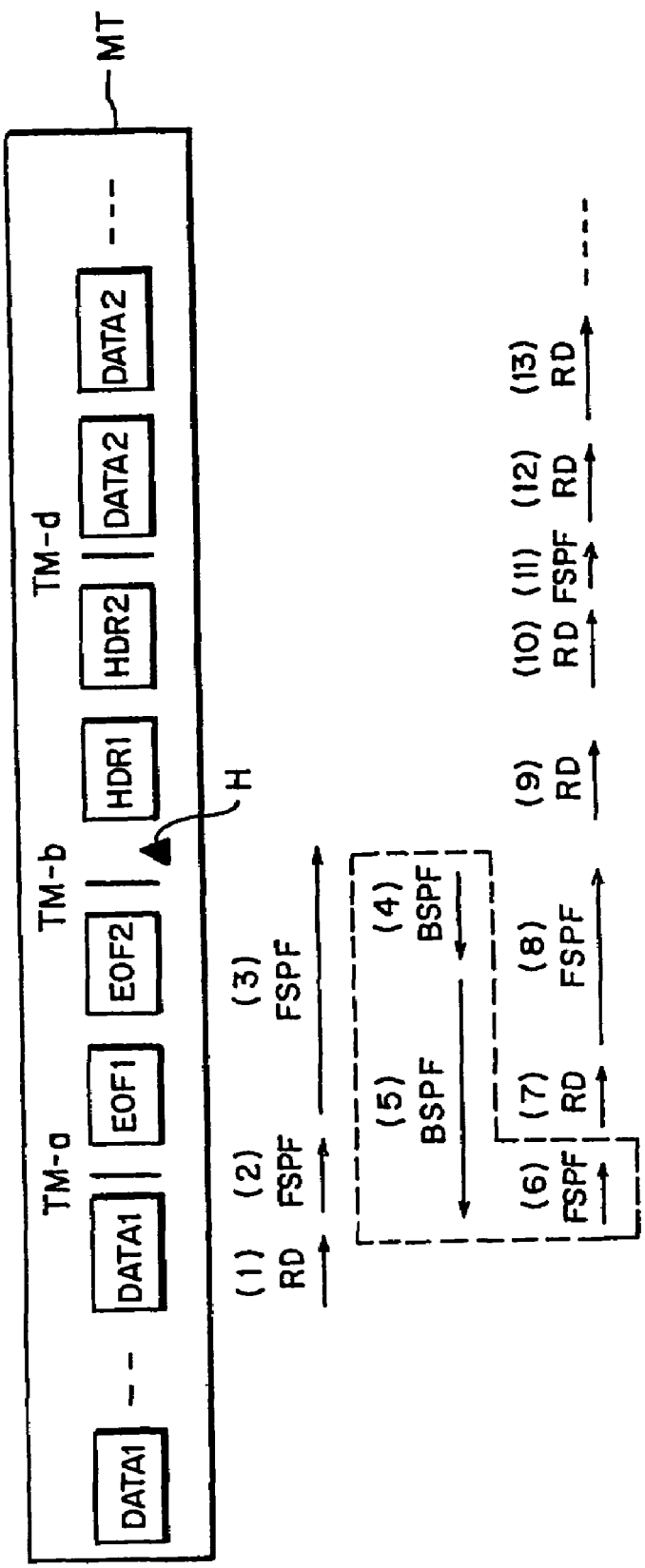
Figure 142A:
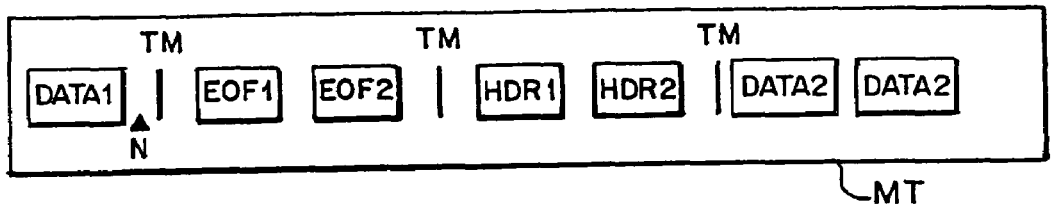
Figure 142B:
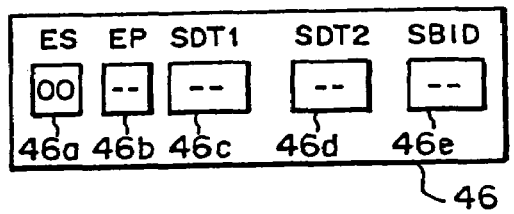
Figure 143A:
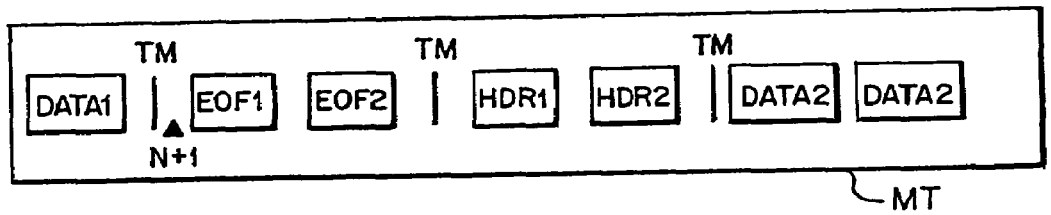
Figure 143B:
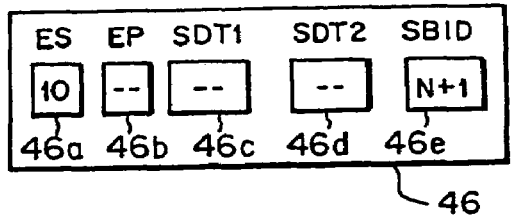
Figure 144A:
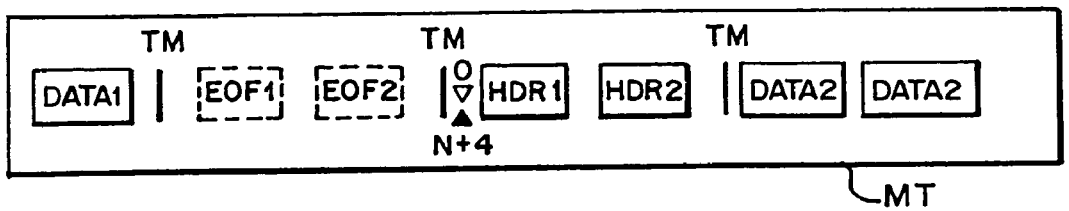
Figure 144B:
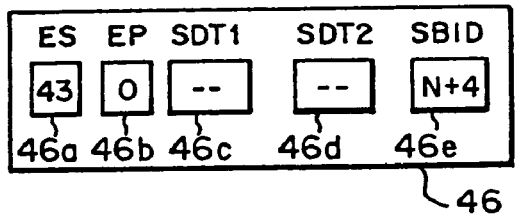
Figure 145A:
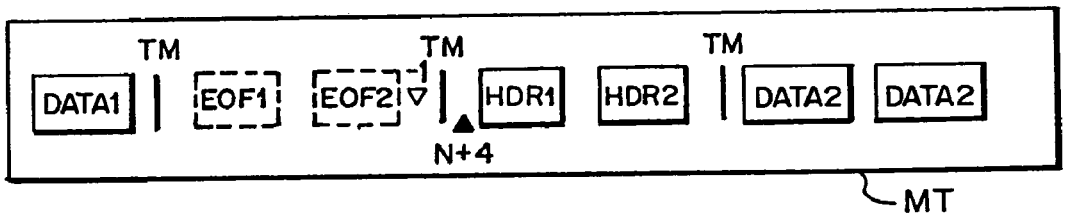
Figure 145B:
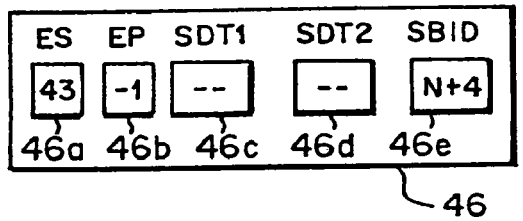
Figure 146A:
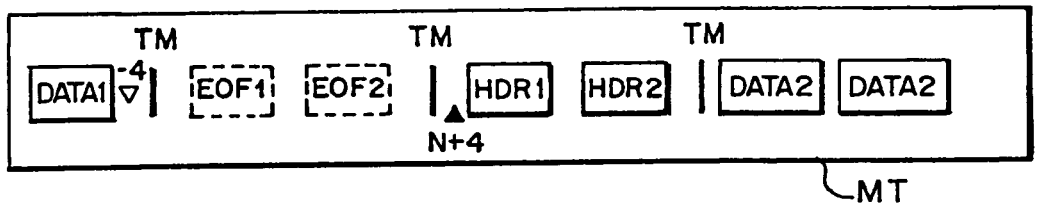
Figure 146B:
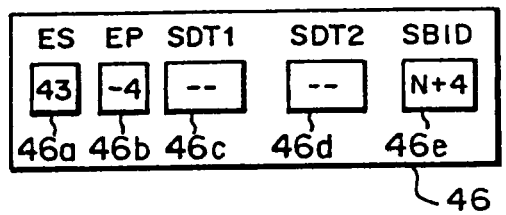
Figure 147A:
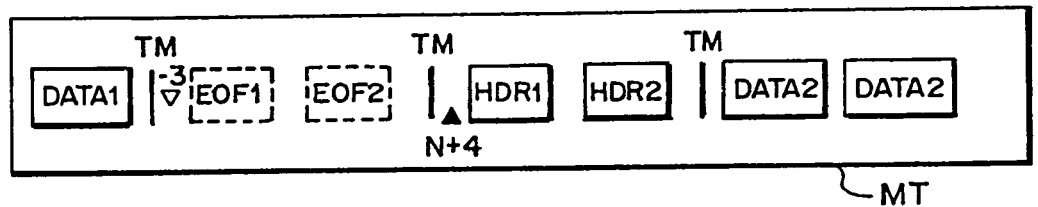
Figure 147B:
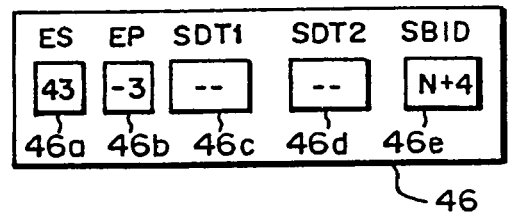
Figure 148A:
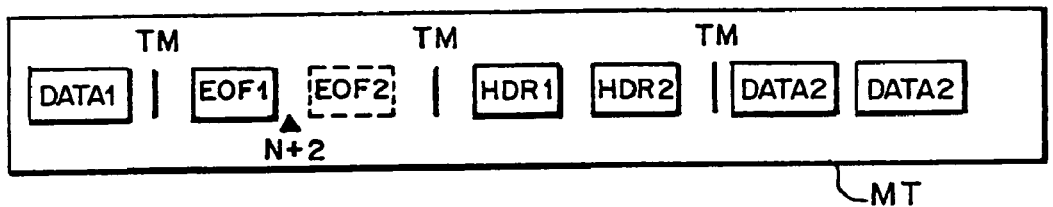
Figure 148B:
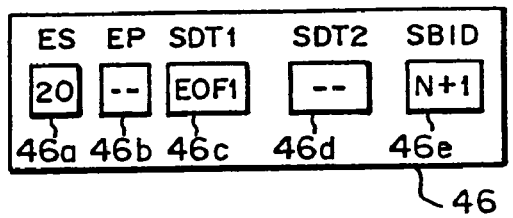
Figure 149A:
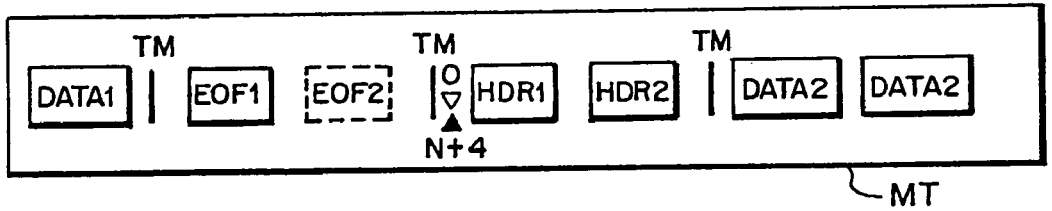
Figure 149B:
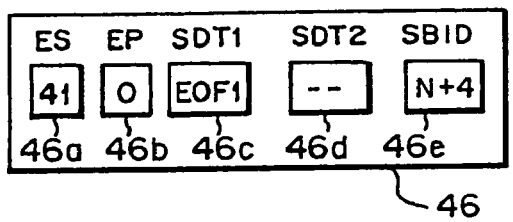
Figure 150A:
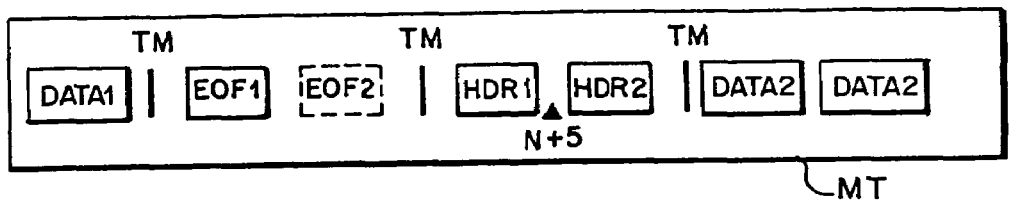
Figure 150B:
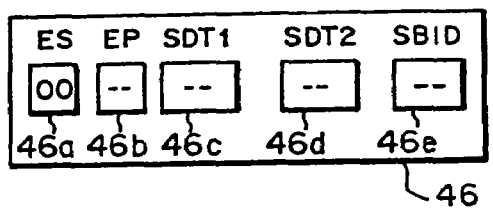
Figure 151A:
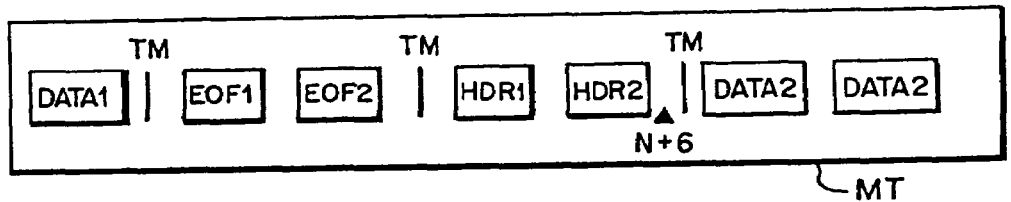
Figure 151B:
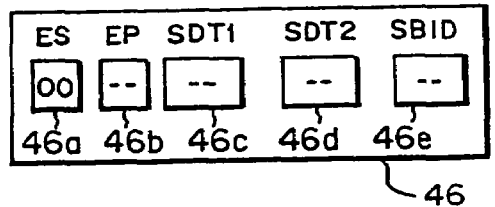
Figure 152A:
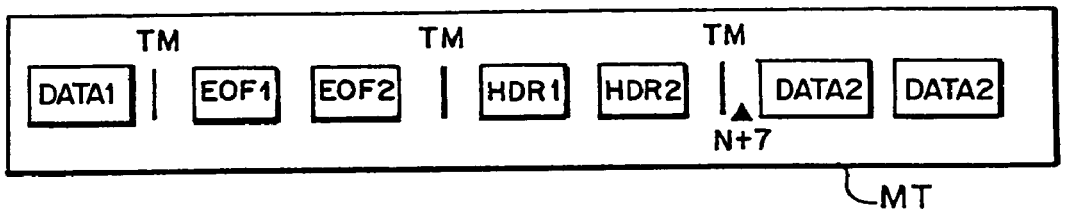
Figure 152B:
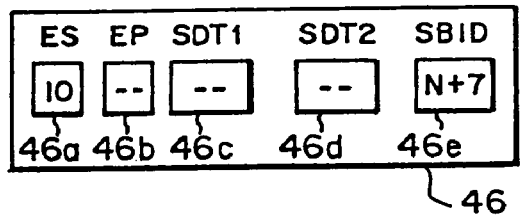
Figure 153A:
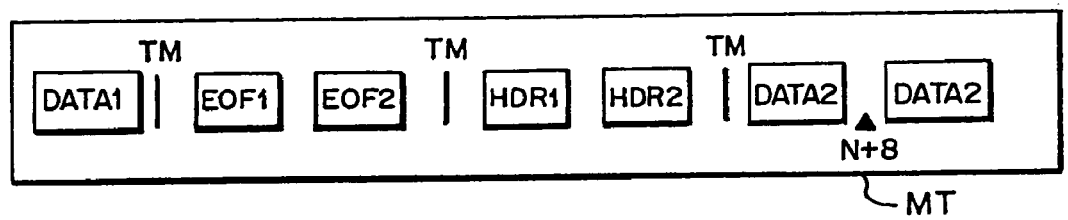
Figure 153B:
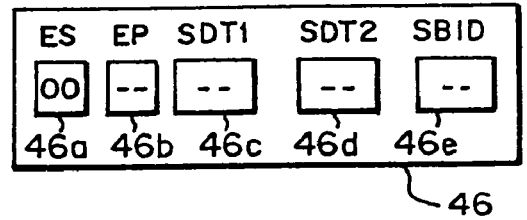
Figure 154A:
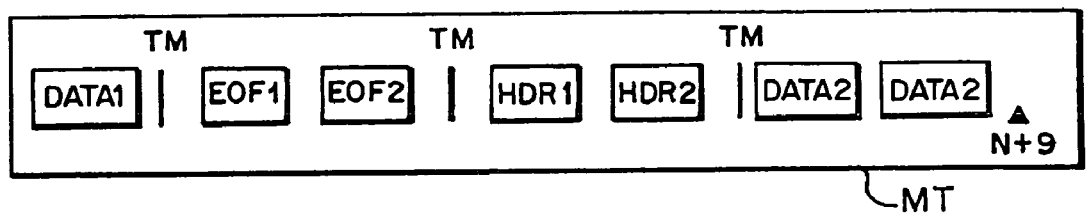
Figure 154B:
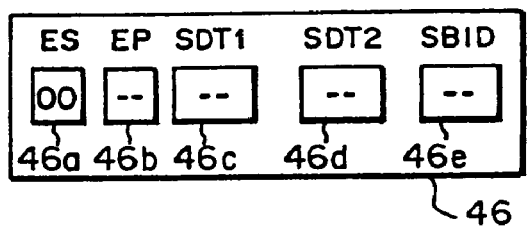
Figures 155A, 155B:
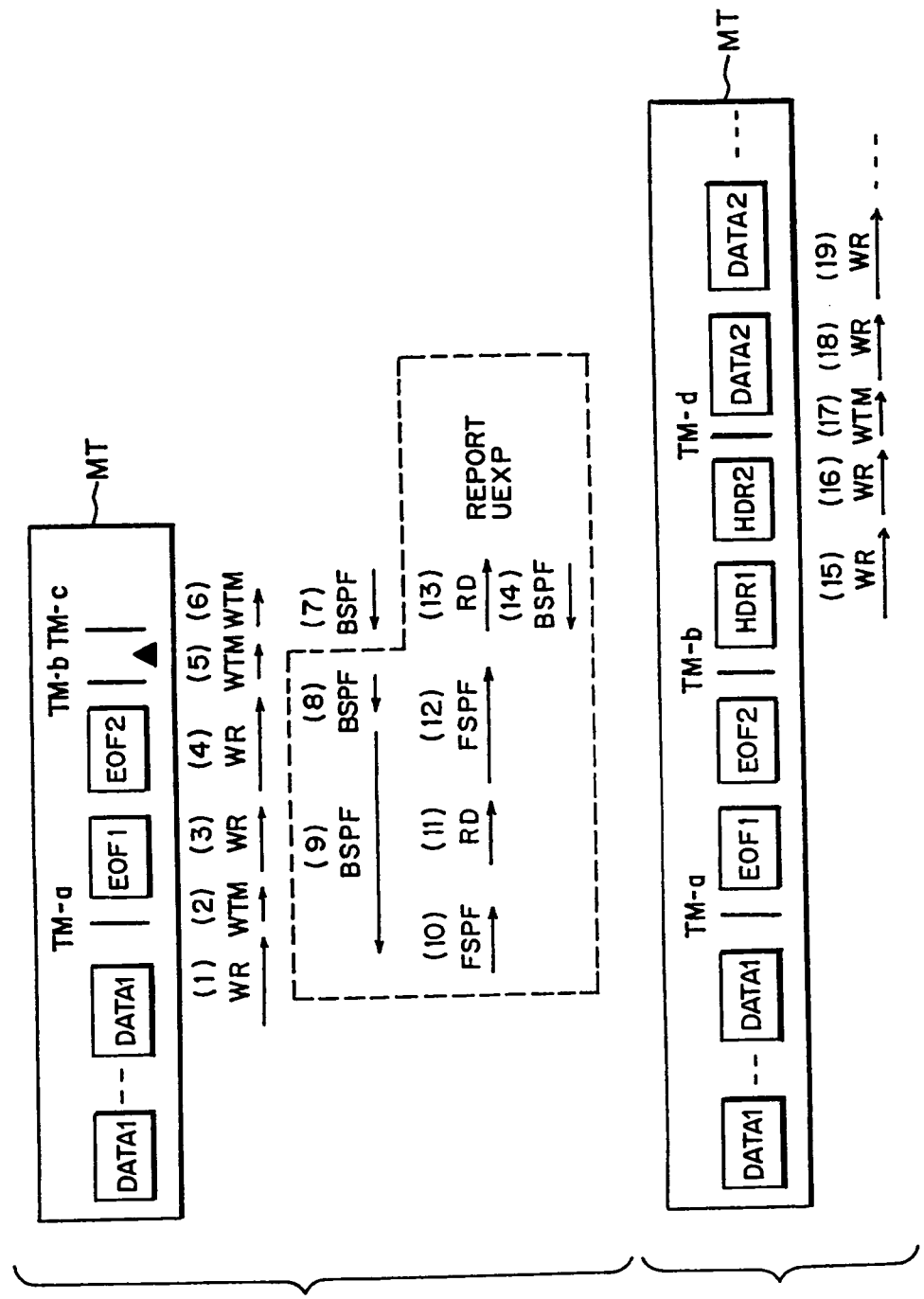
Figure 157A:
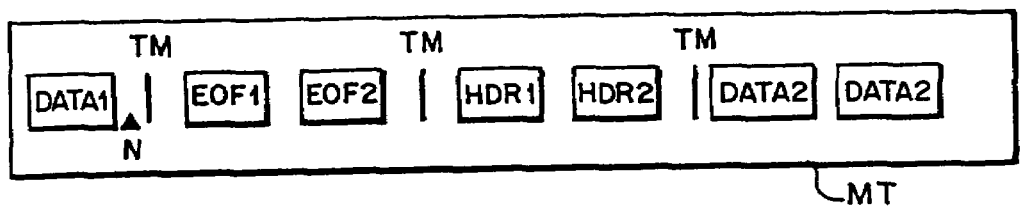
Figure 157B:
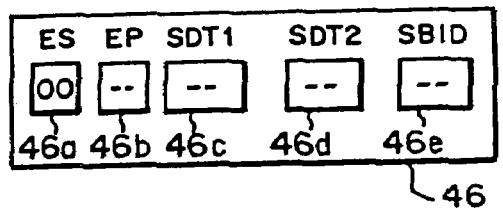
Figure 158A:
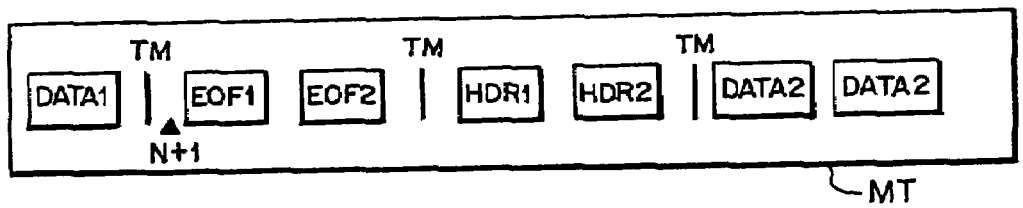
Figure 158B:
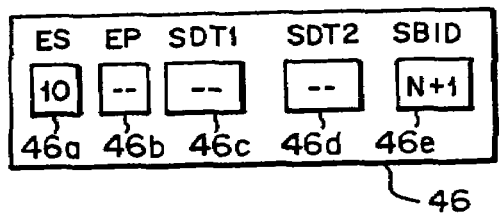
Figure 159A:
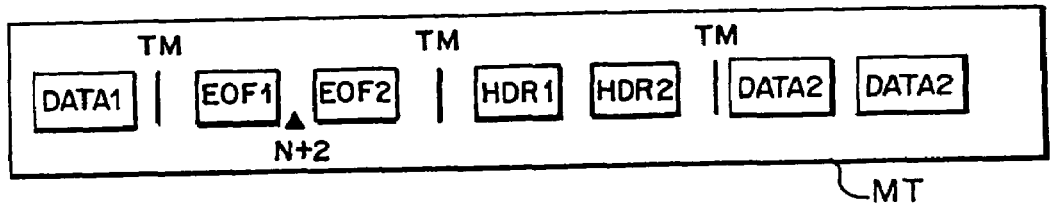
Figure 159B:
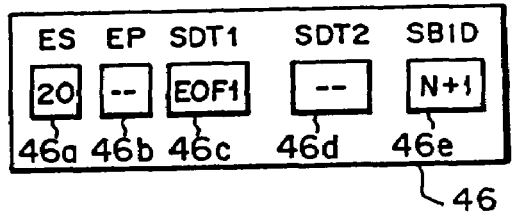
Figure 160A:
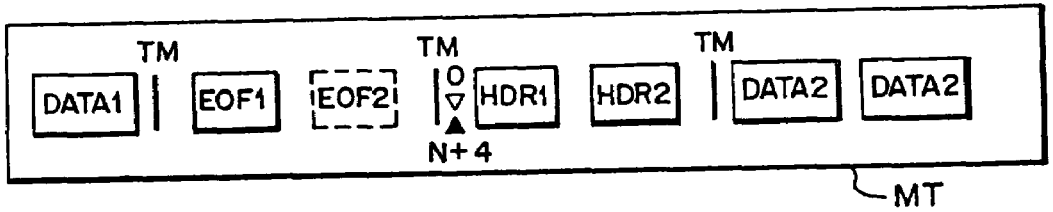
Figure 160B:
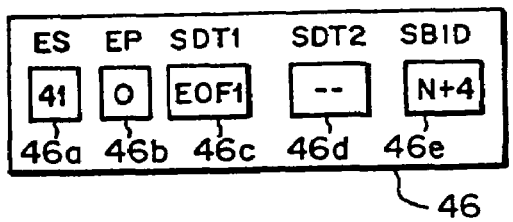
Figure 161A:
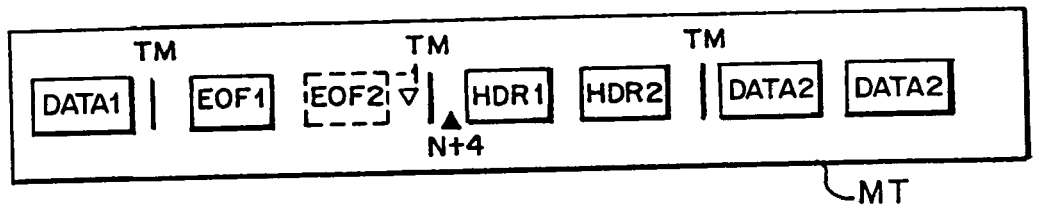
Figure 161B:
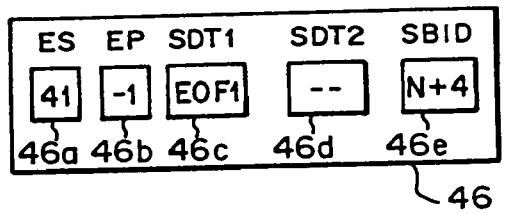
Figure 162A:
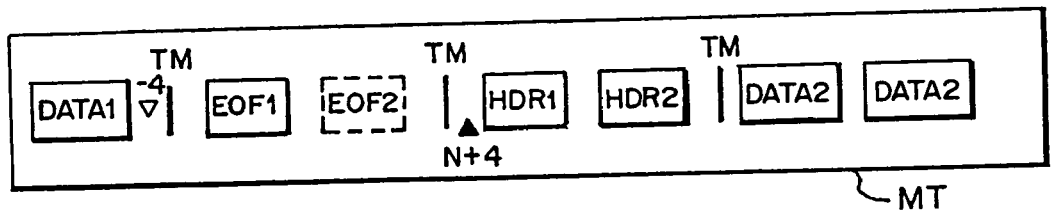
Figure 162B:
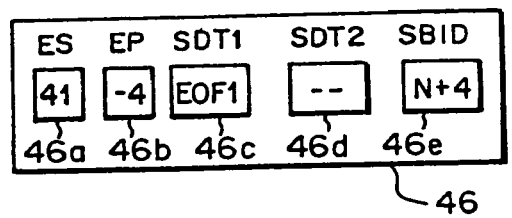
Figure 163A:
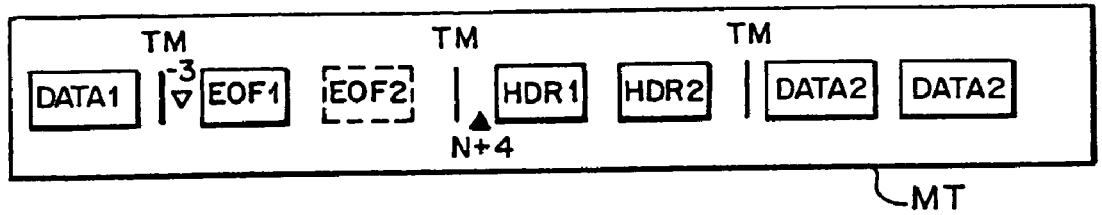
Figure 163B:
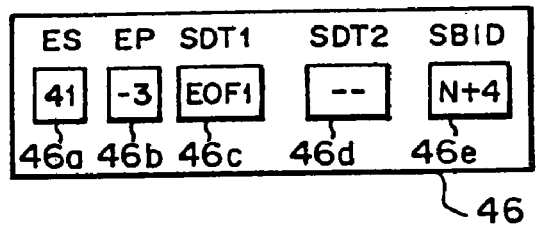
Figure 164A:
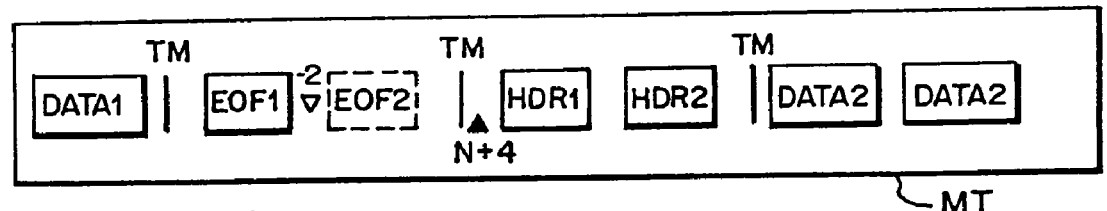
Figure 164B:
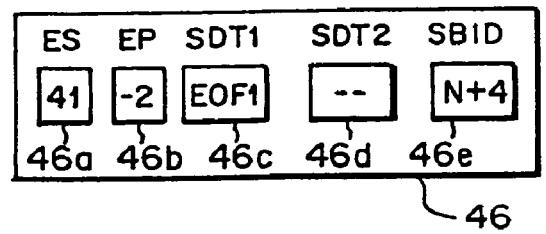
Figure 165A:
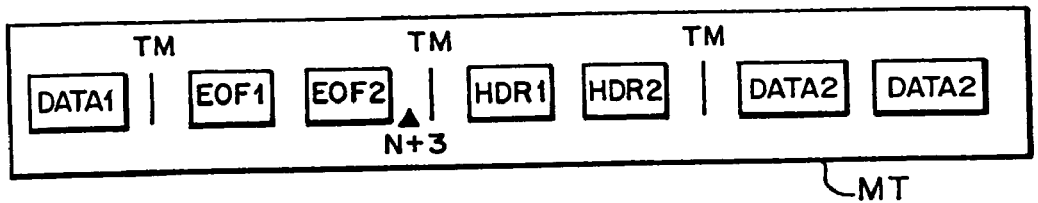
Figure 165B:
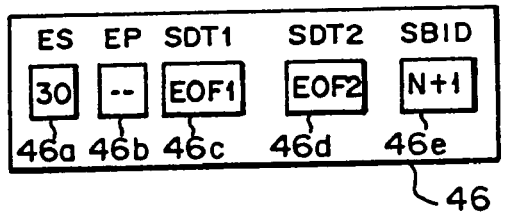
Figure 166A:
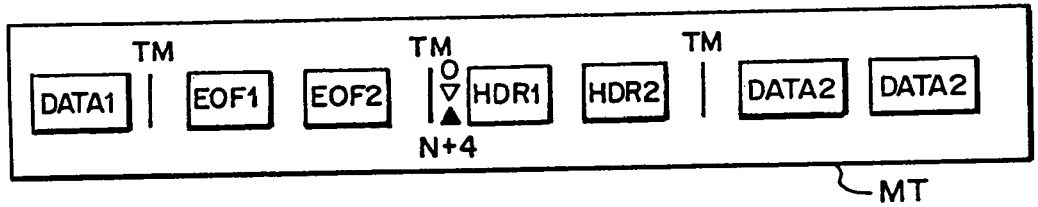
Figure 166B:
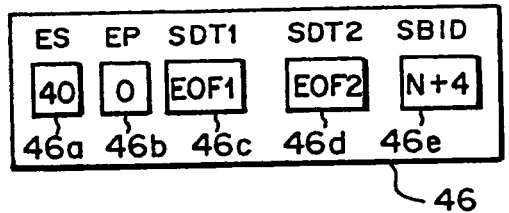
Figure 167A:
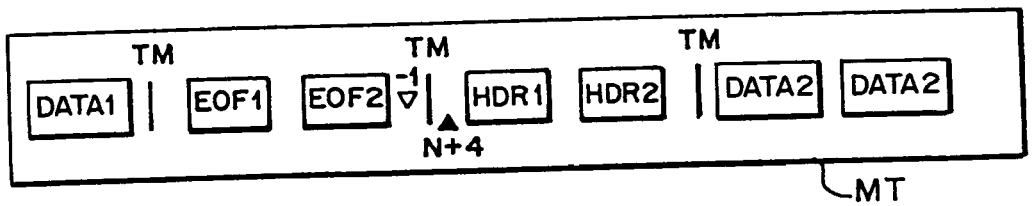
Figure 167B:
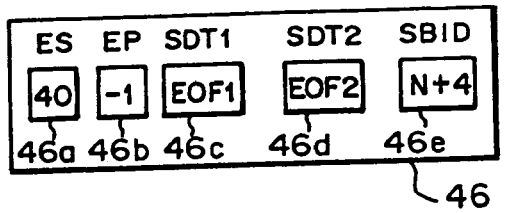
Figure 168A:
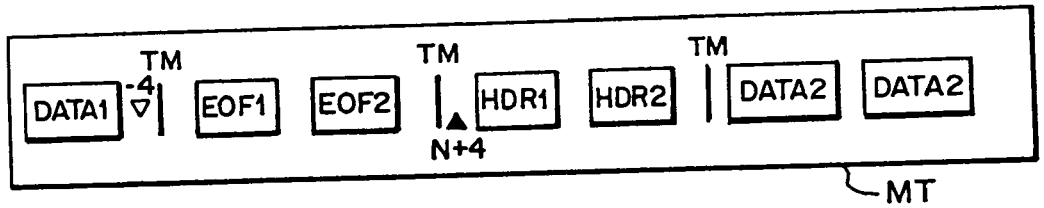
Figure 168B:
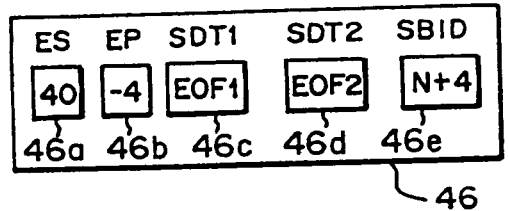
Figure 169A:
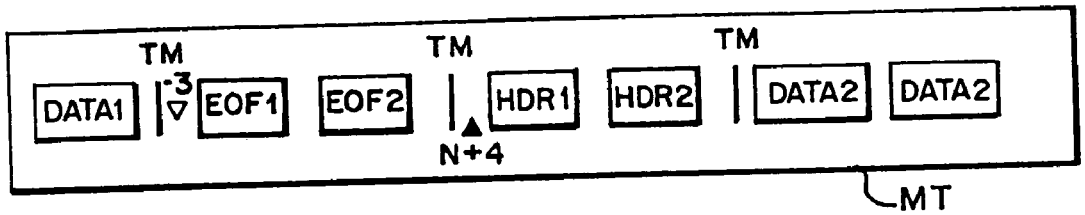
Figure 169B:
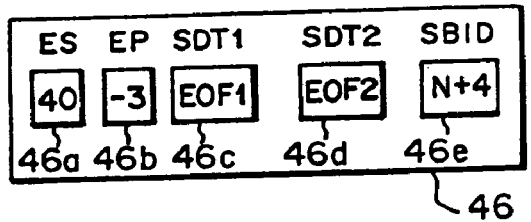
Figure 170A:
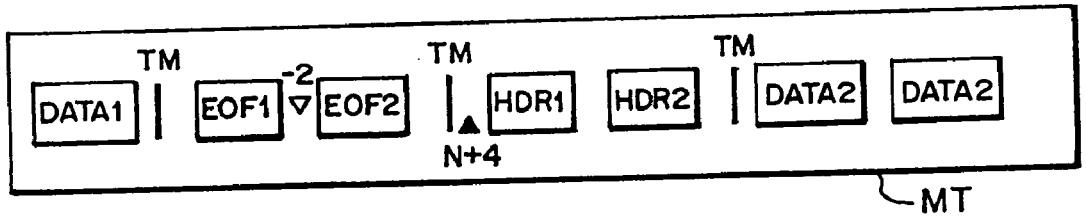
Figure 170B:
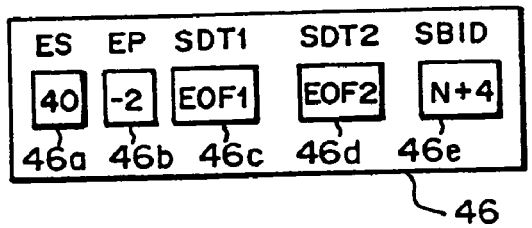
Figure 171A:
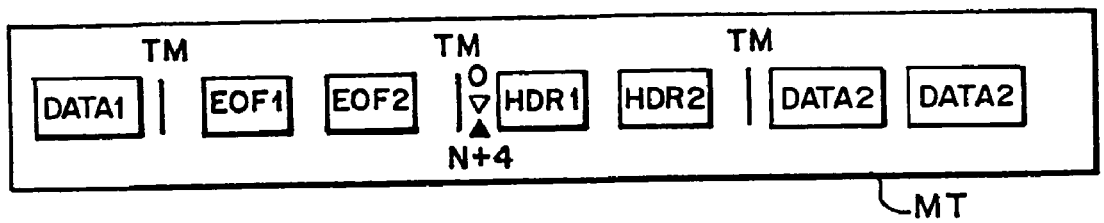
Figure 171B:
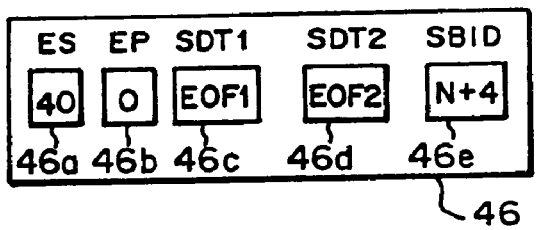
Figure 172A:
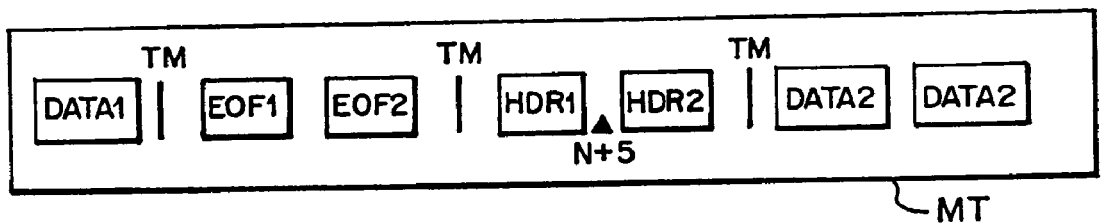
Figure 172B:
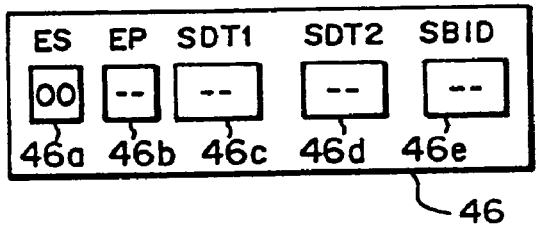
Figure 175:
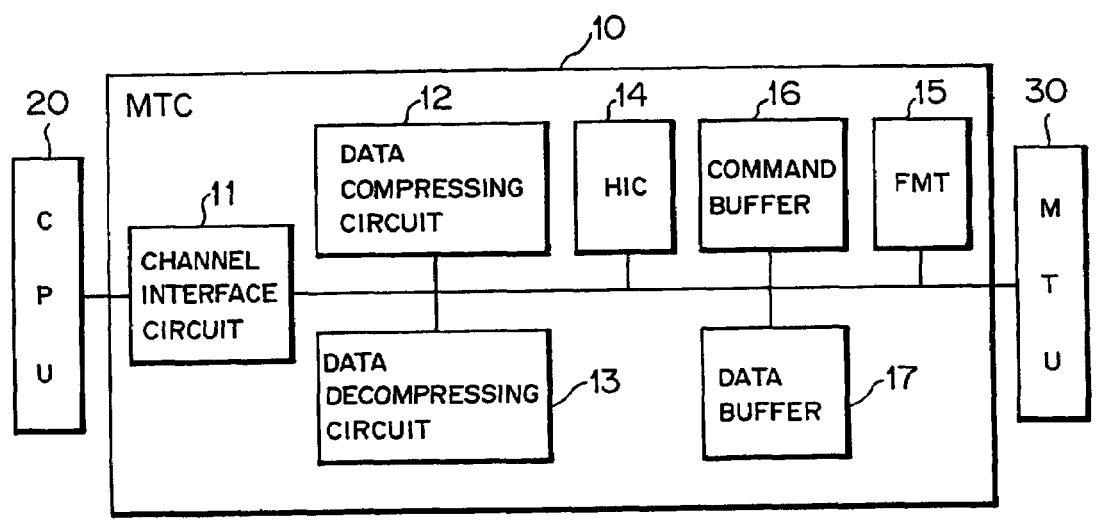
Figure 176:
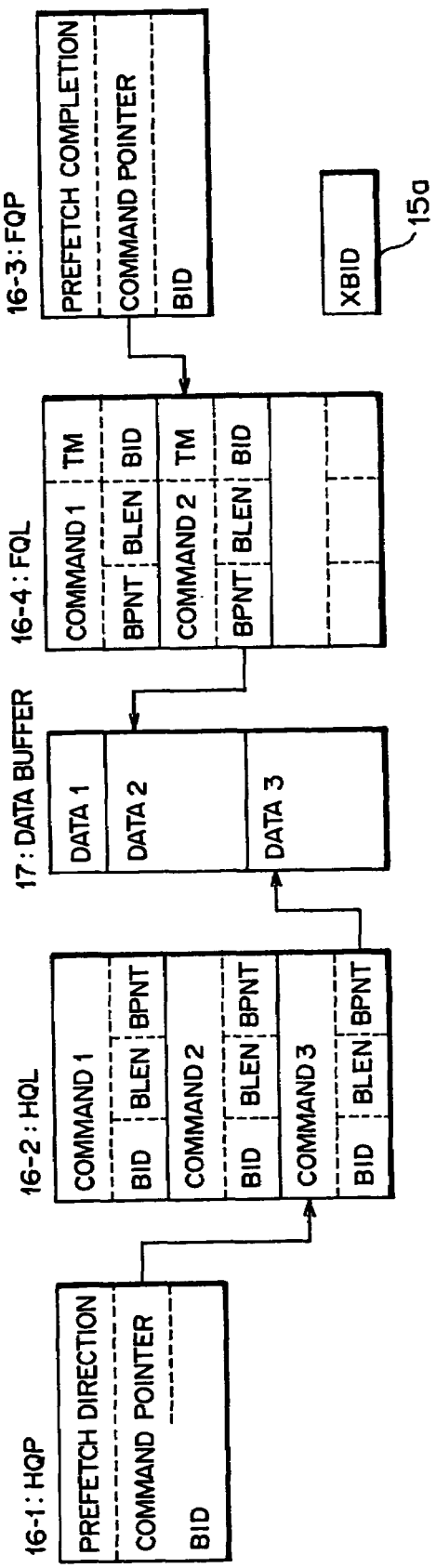
Figure 177:
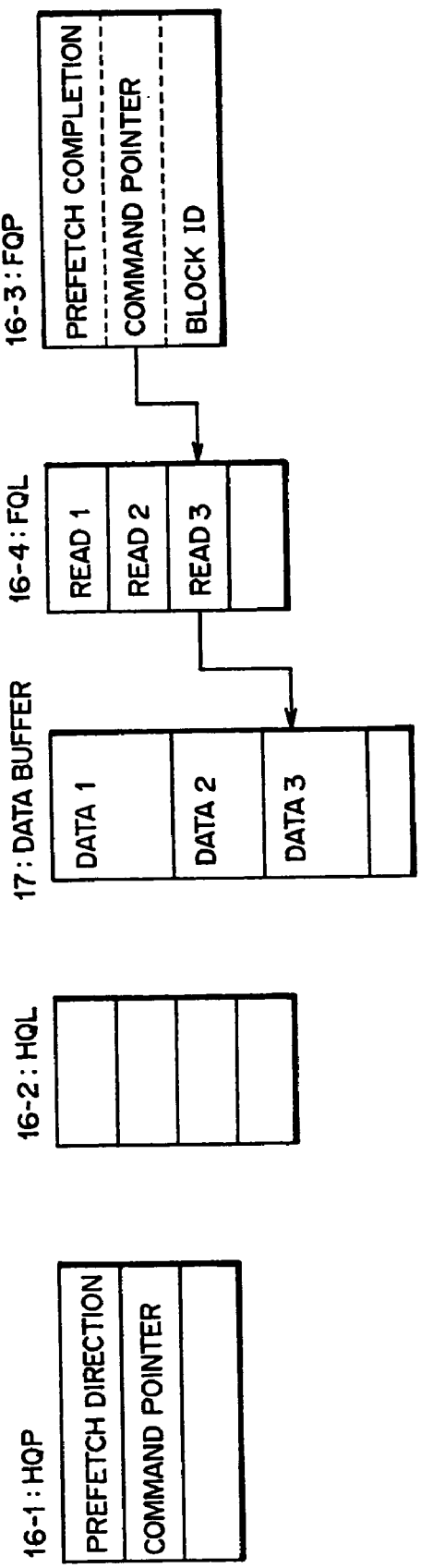
Figure 178:
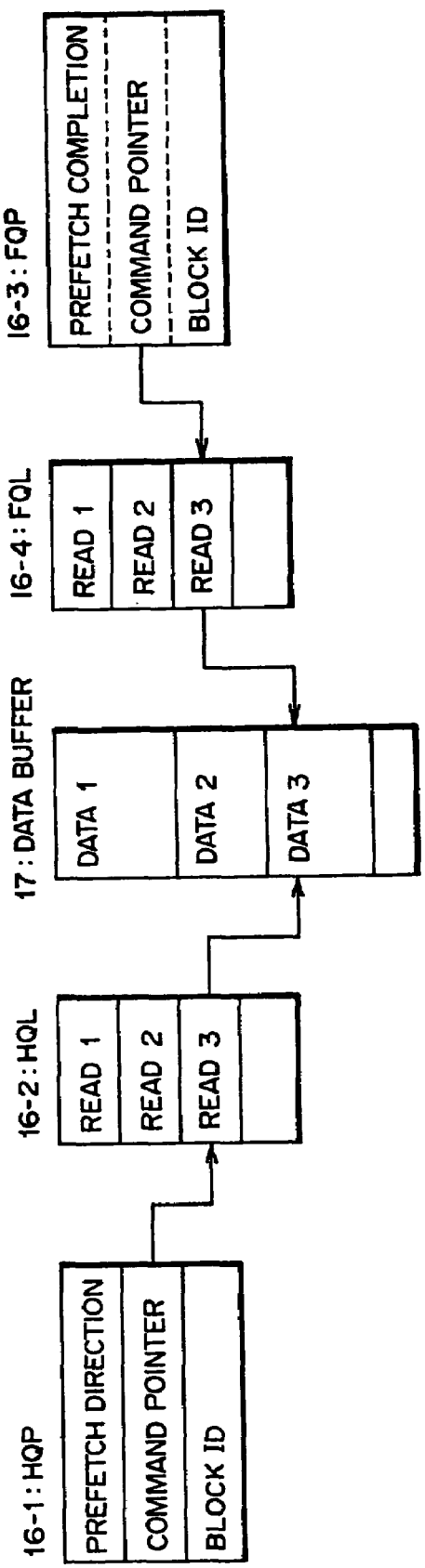
Figure 179:
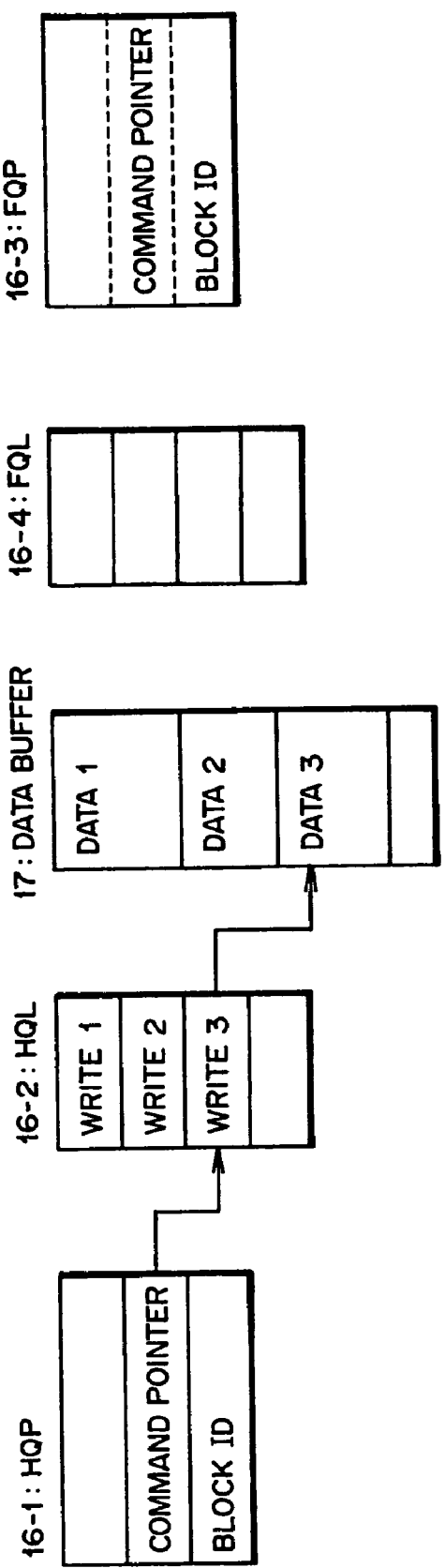
Figure 180:
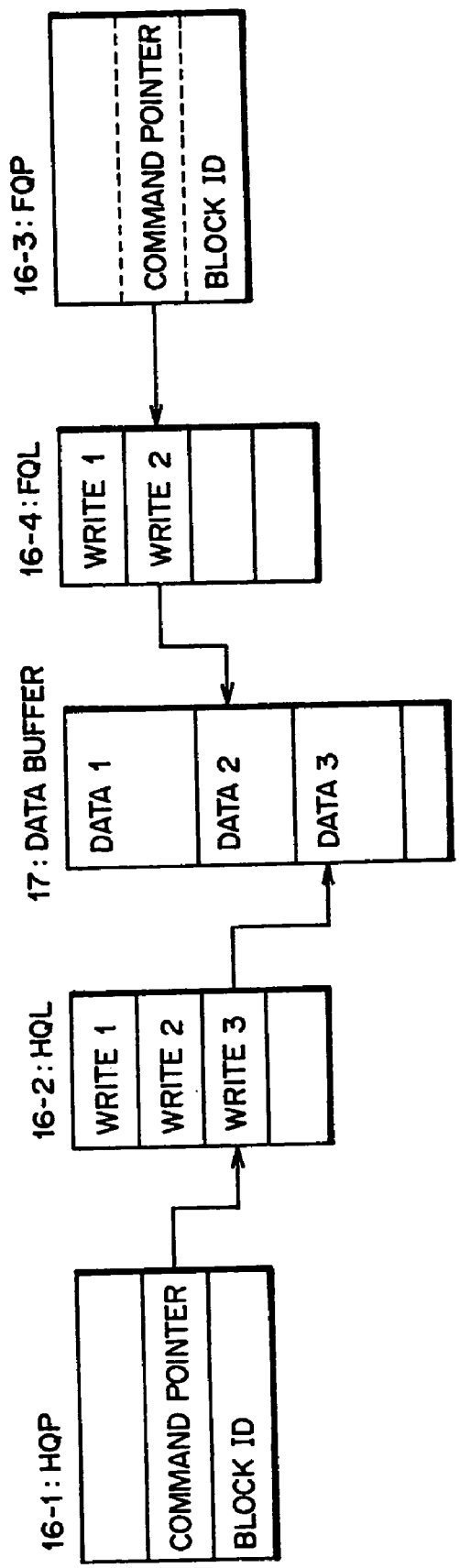
Figure 181:
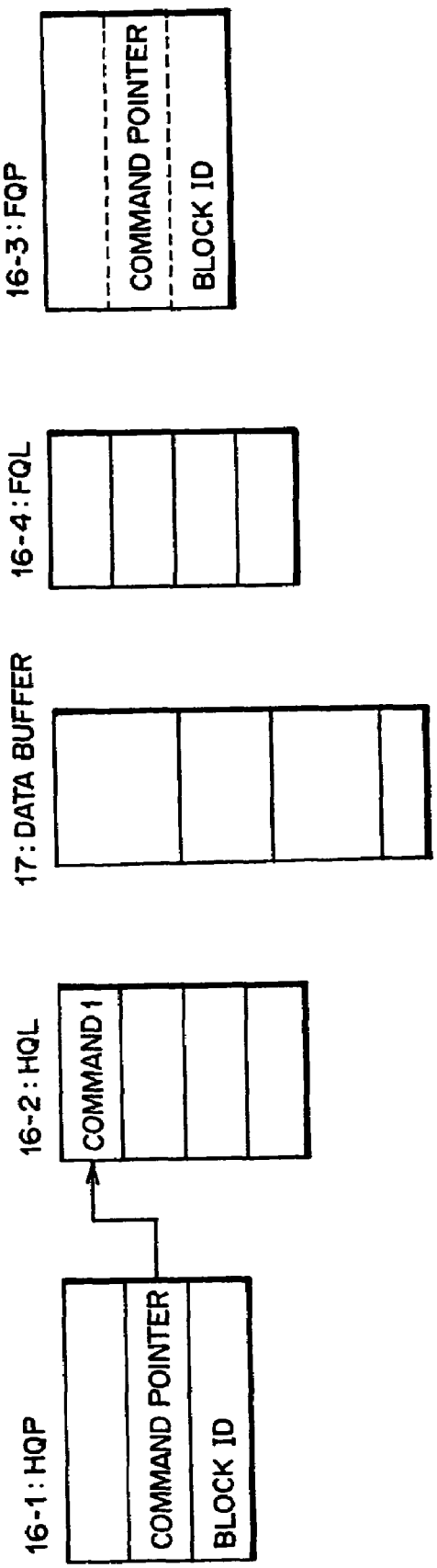
Figure 182:
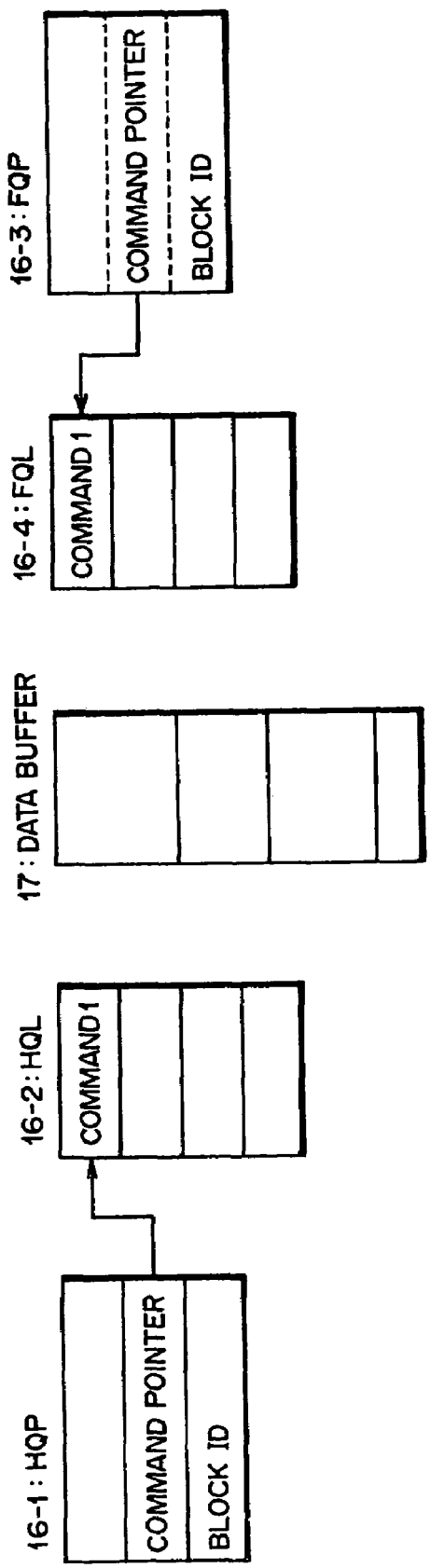
Figure 183:
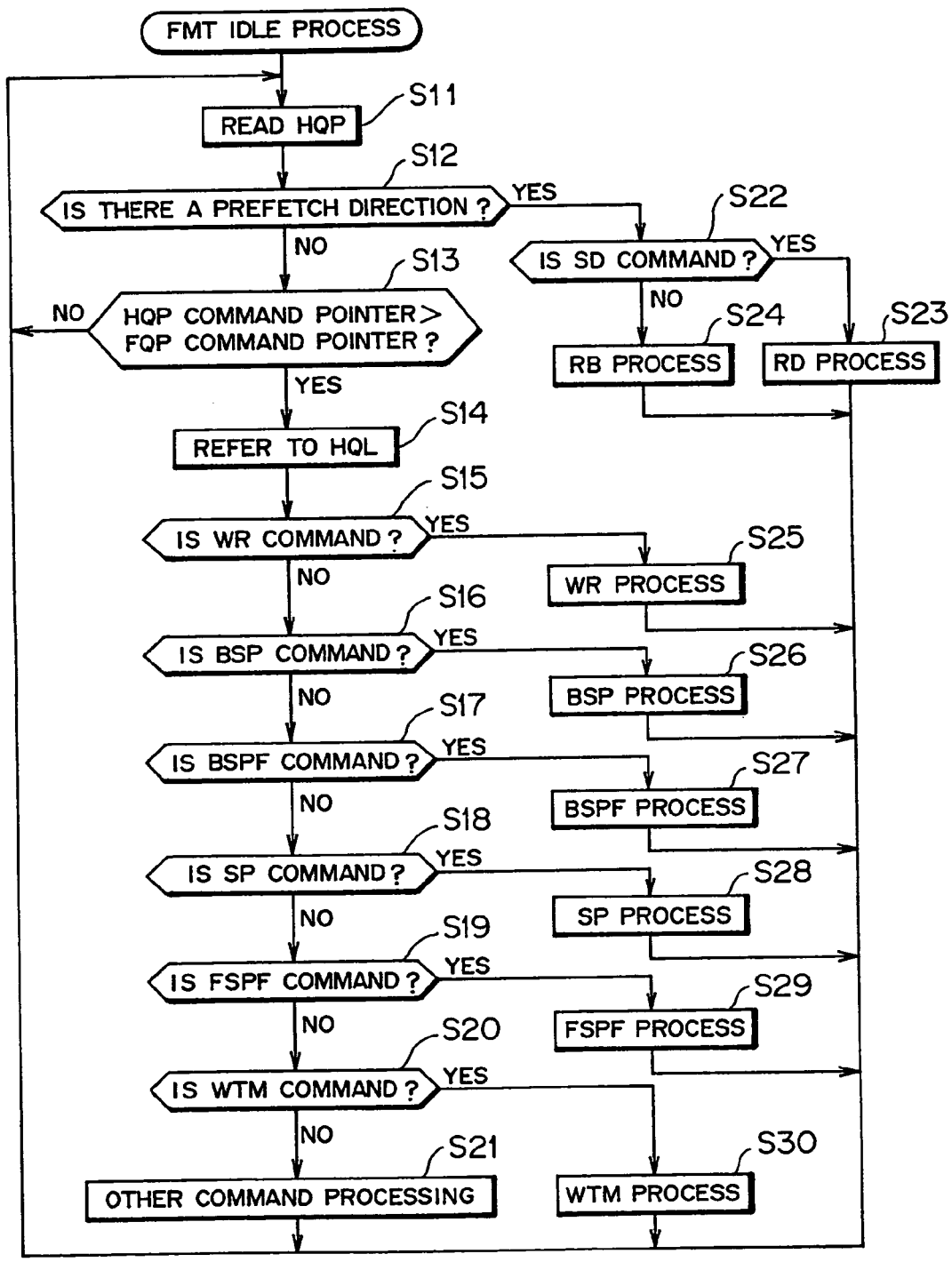
Figures 184, 185:
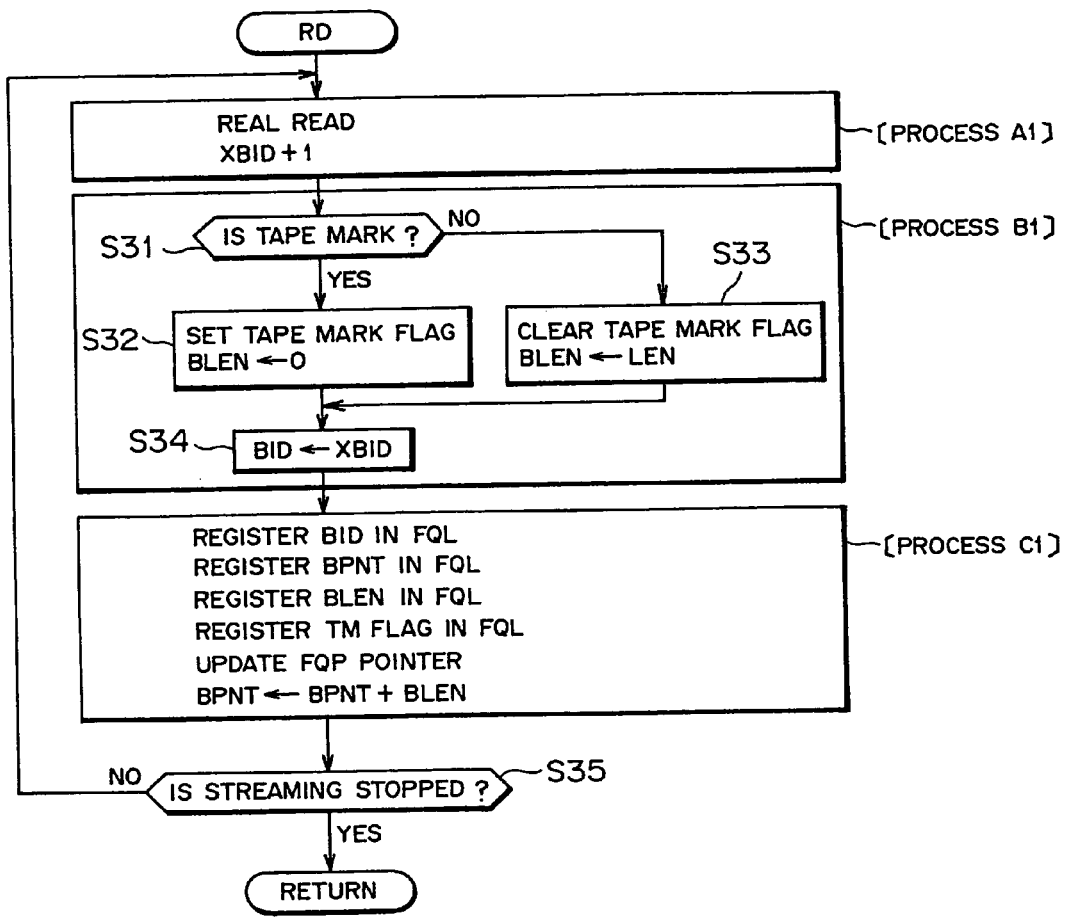
Figures 186, 187:
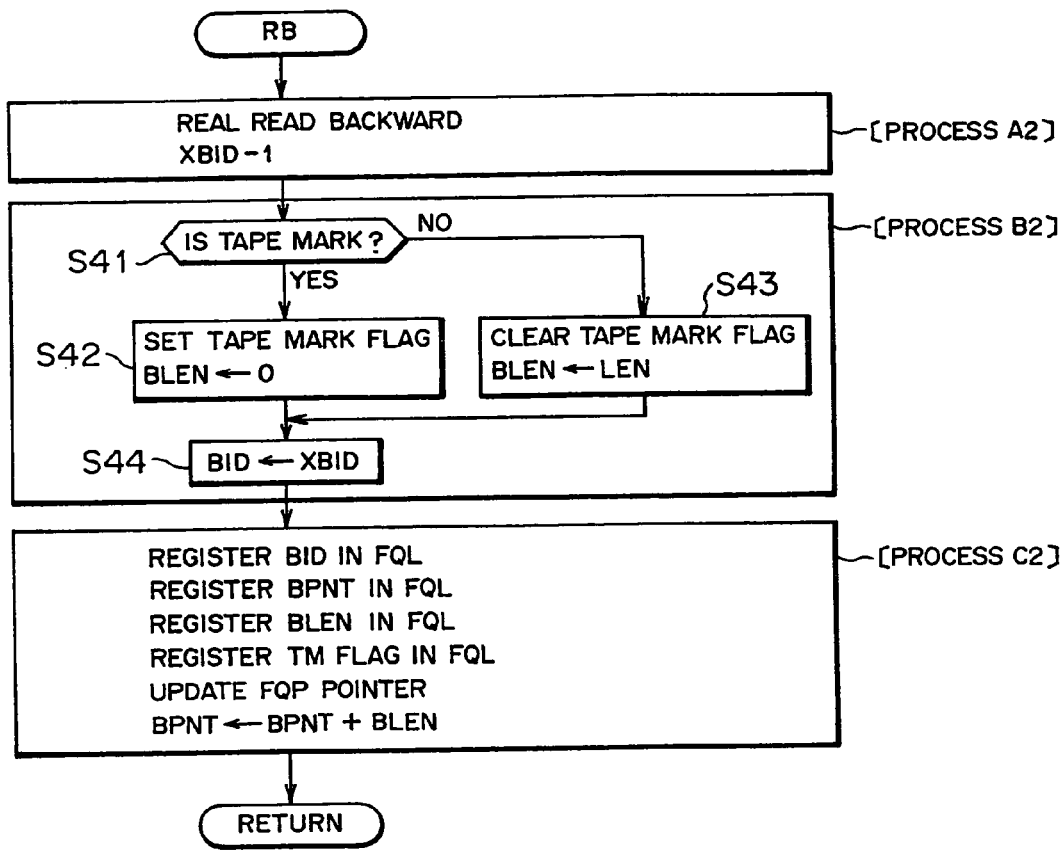
Figures 188, 189:
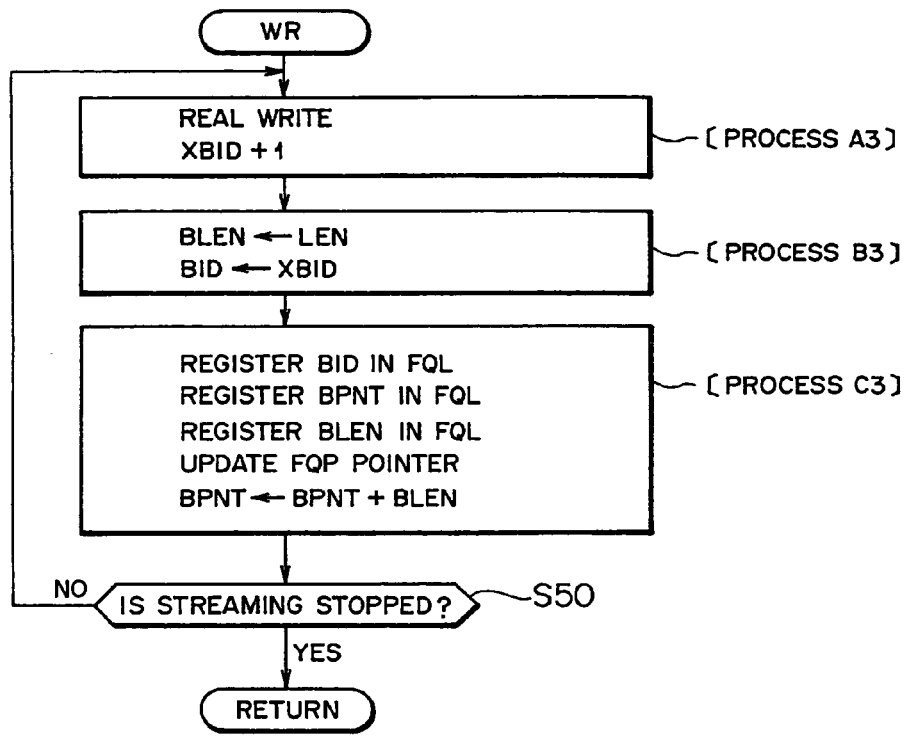
Figures 192, 193:
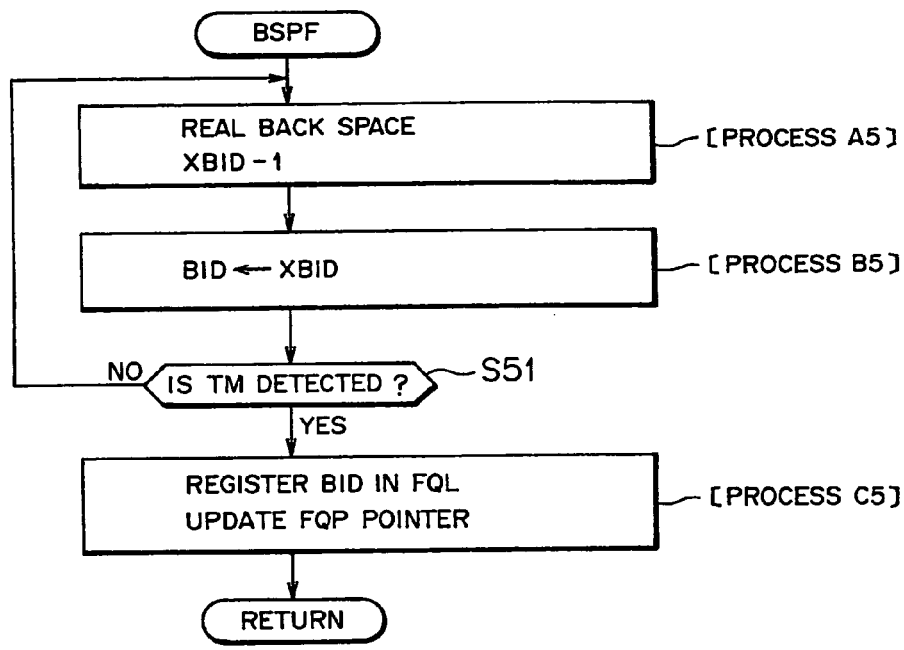
Figures 196, 197:
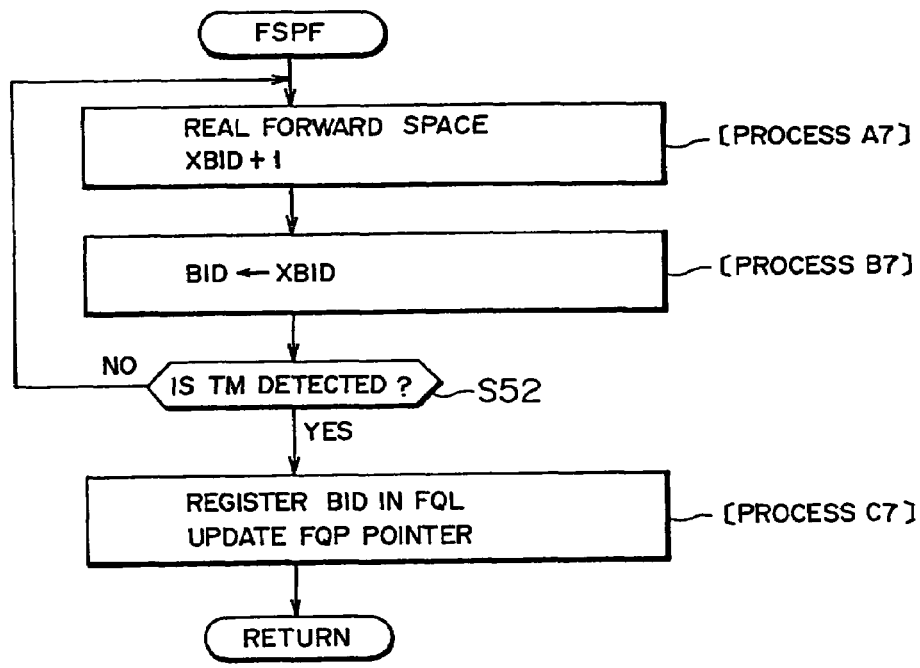
Figures 198, 199:
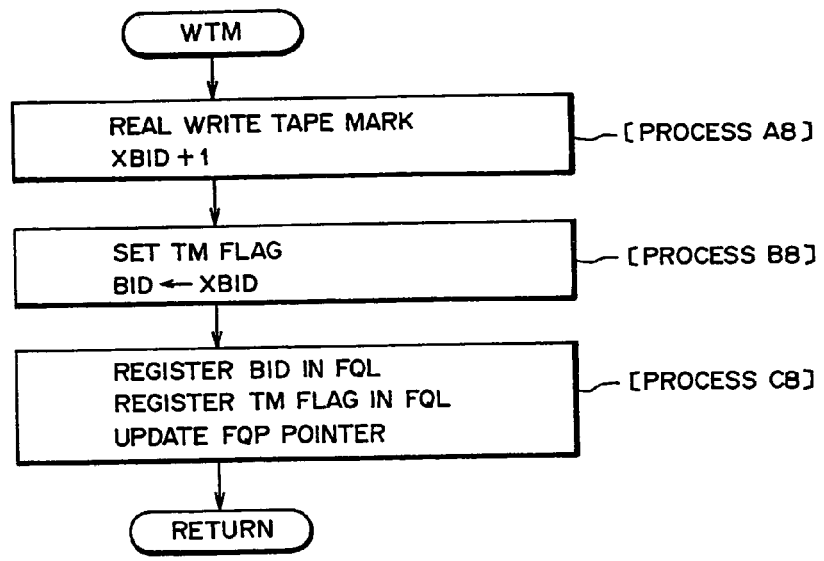
Figures 200A, 200B:
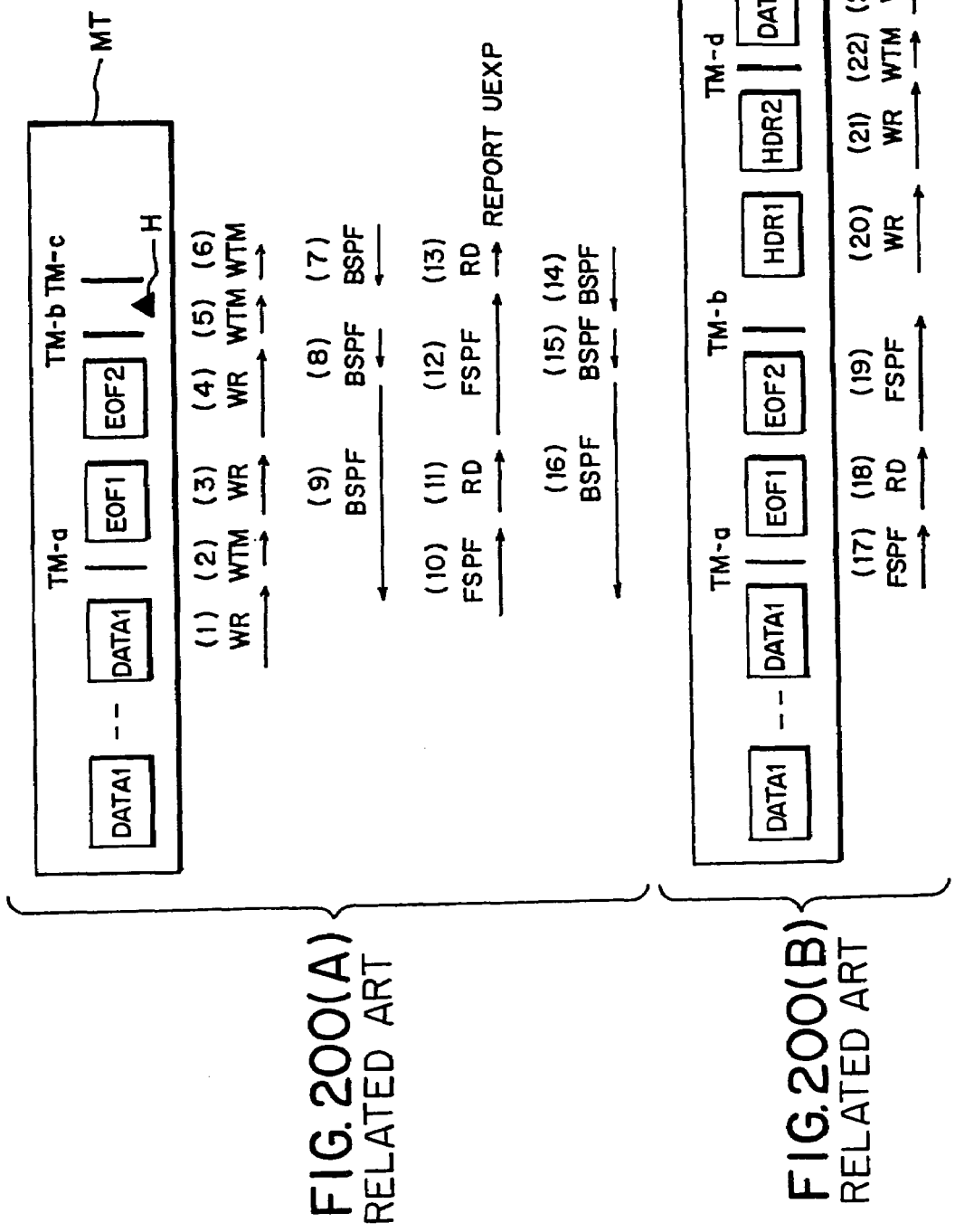
Figure 201:
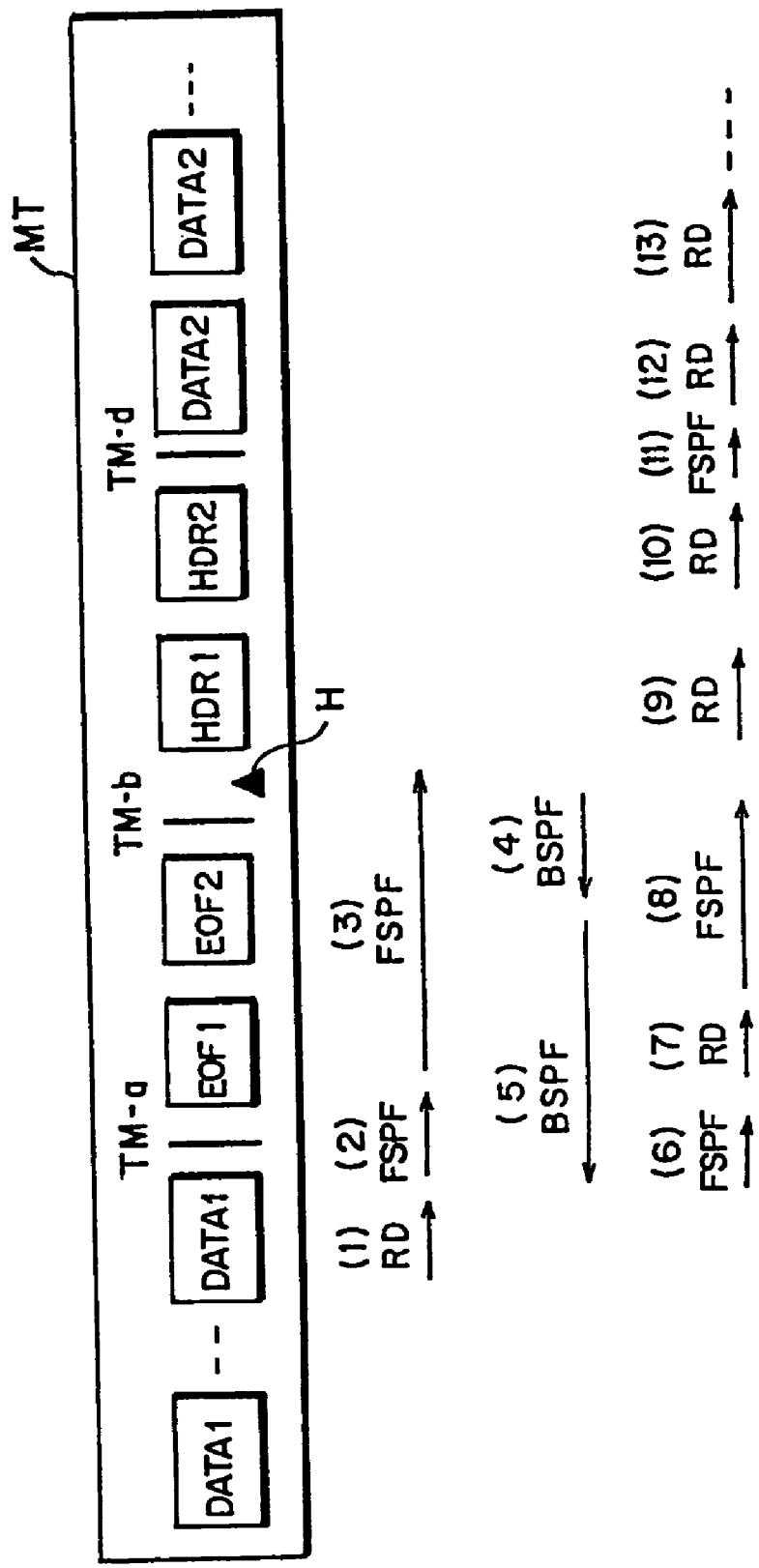
Figure 203:
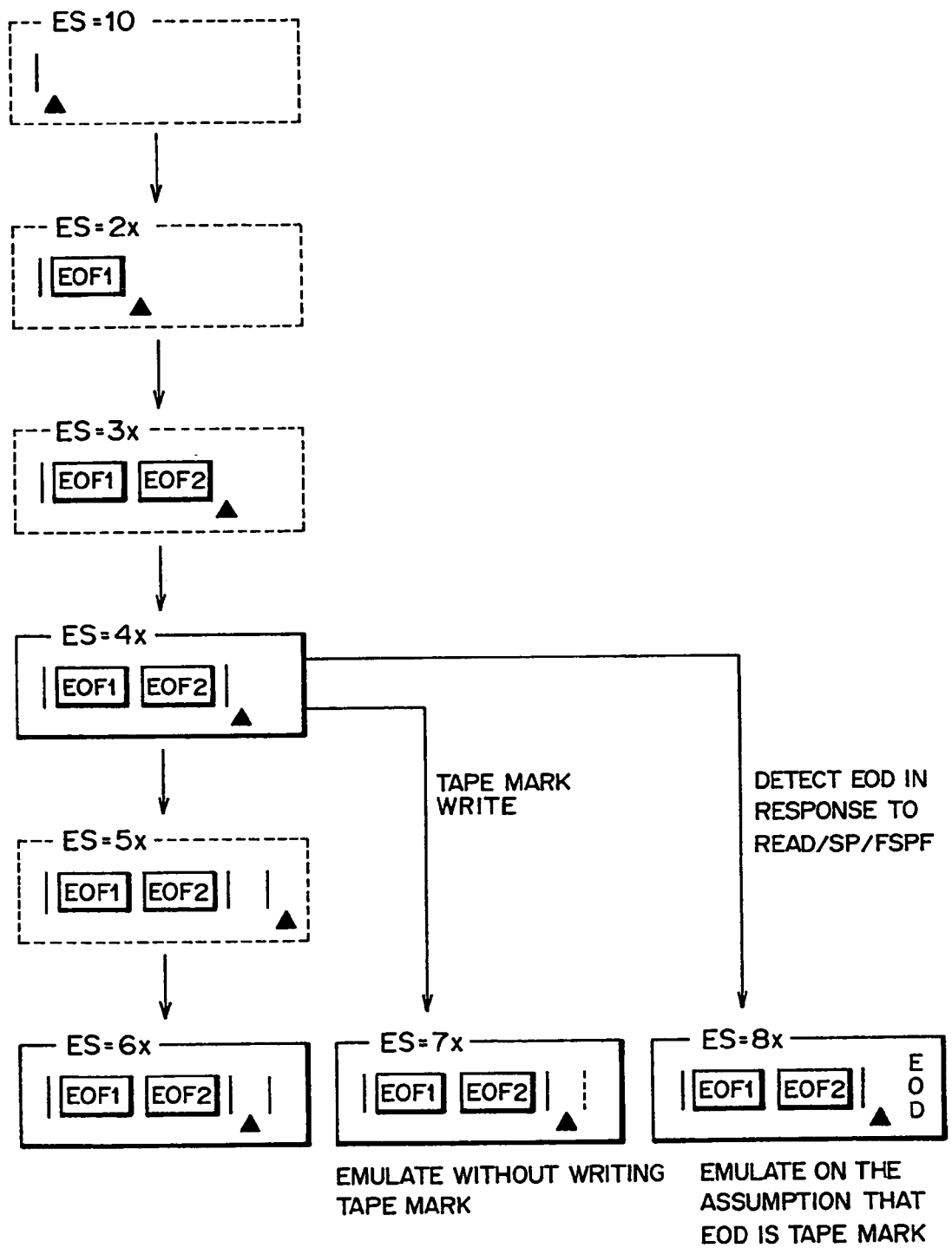
Figures 252A, 252B:
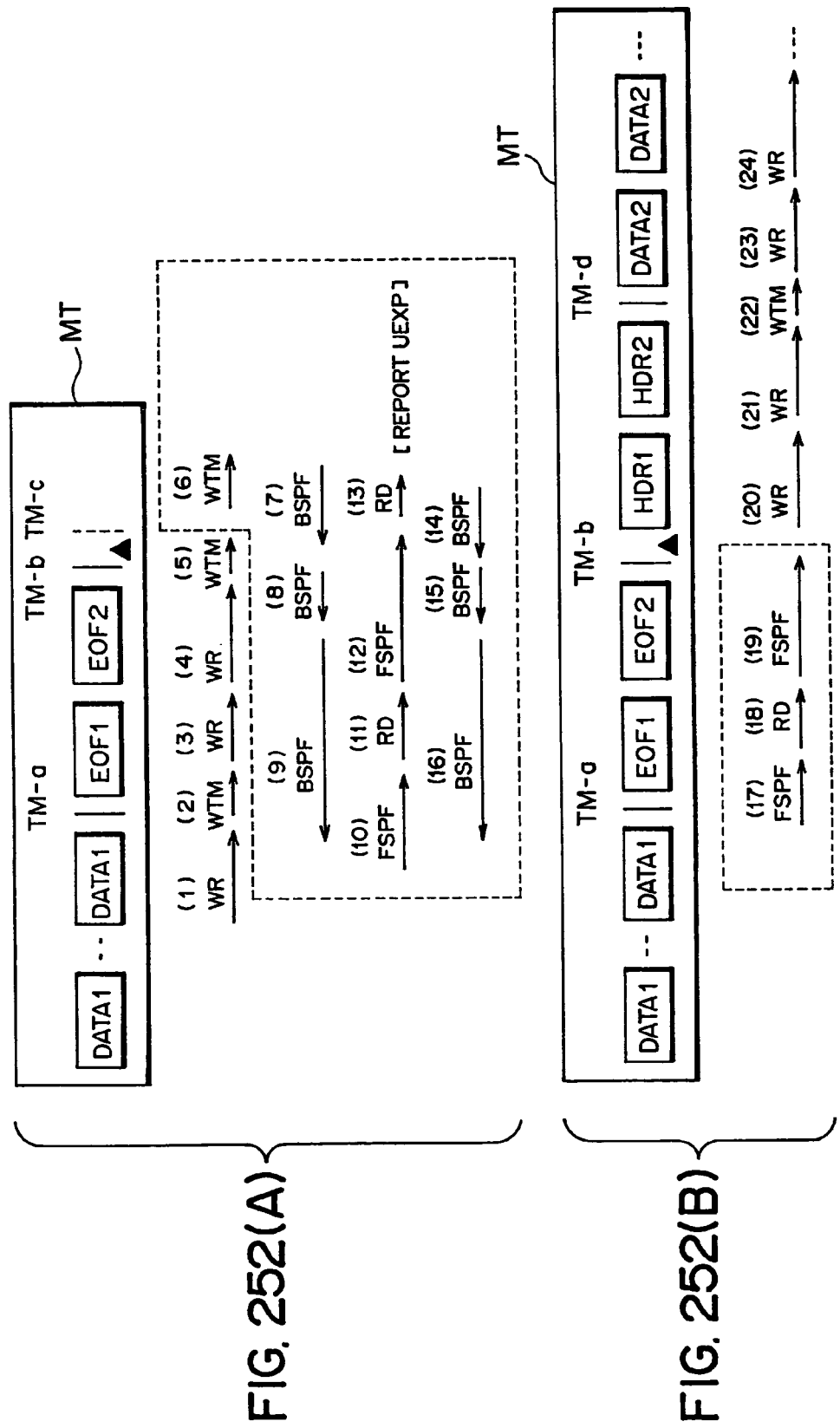
Figure 253A:
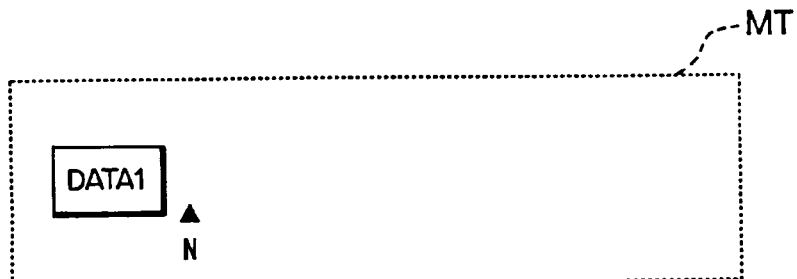
Figure 253B:
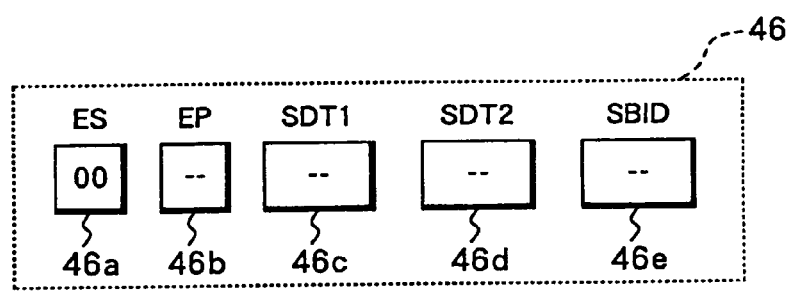
Figure 254A:
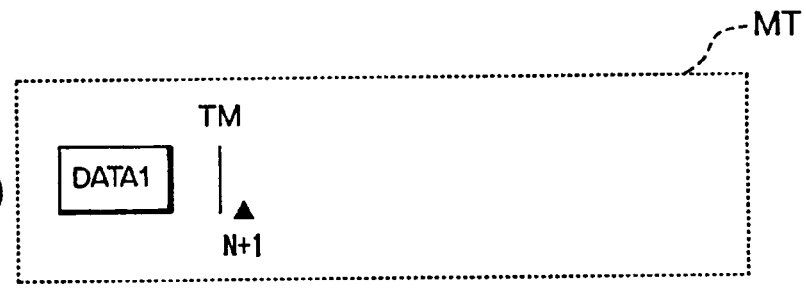
Figure 254B:
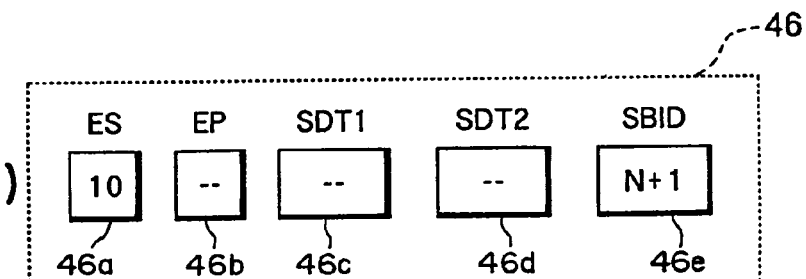
Figure 255A:
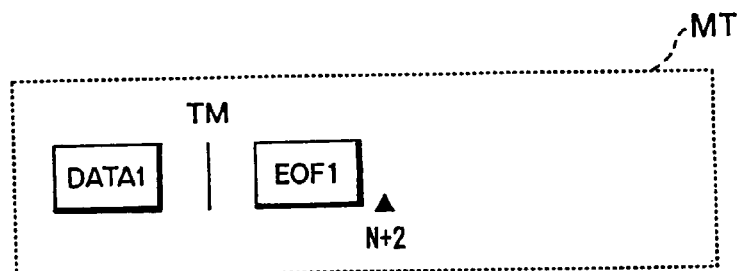
Figure 255B:
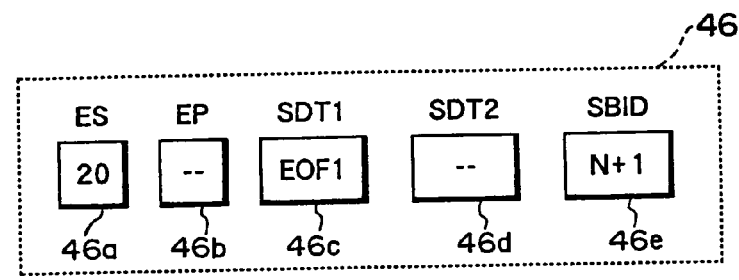
Figure 256A:
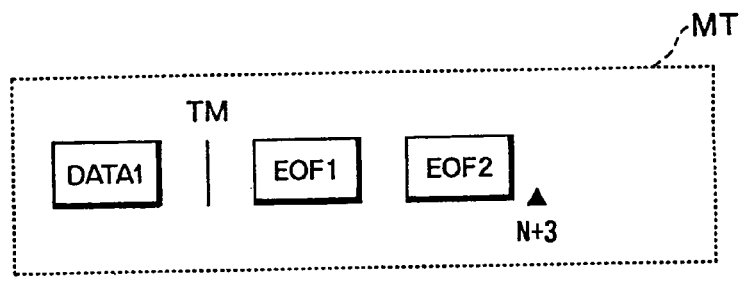
Figure 256B:
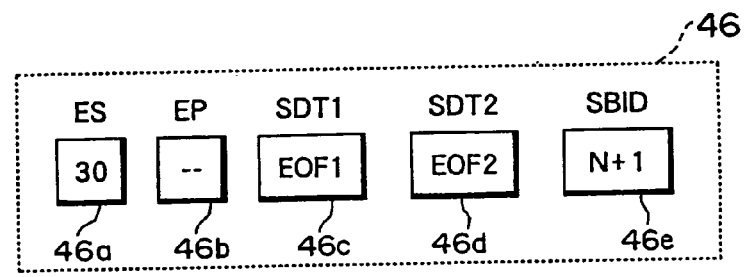
Figure 257A:
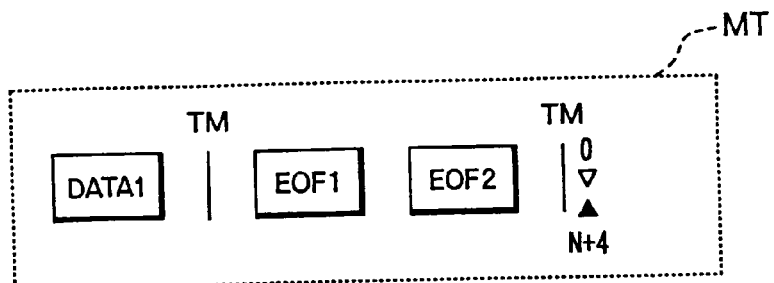
Figure 257B:
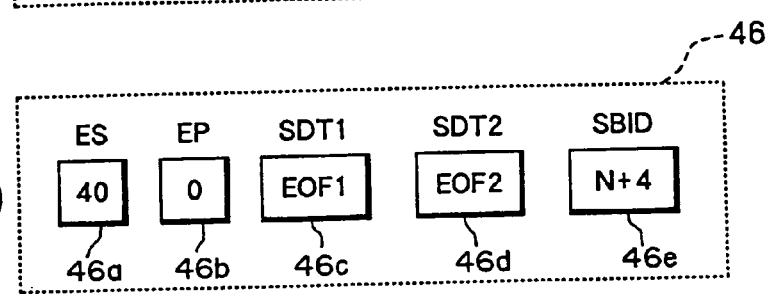
Figure 258A:
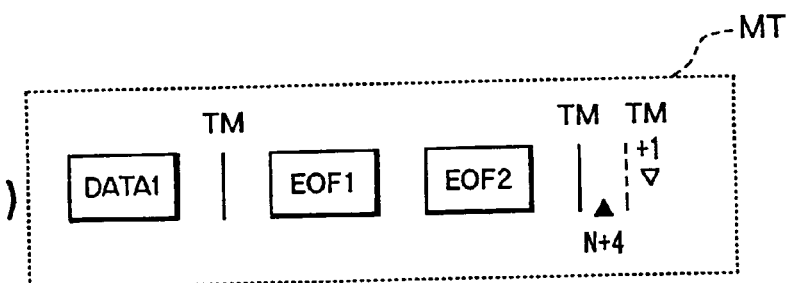
Figure 258B:
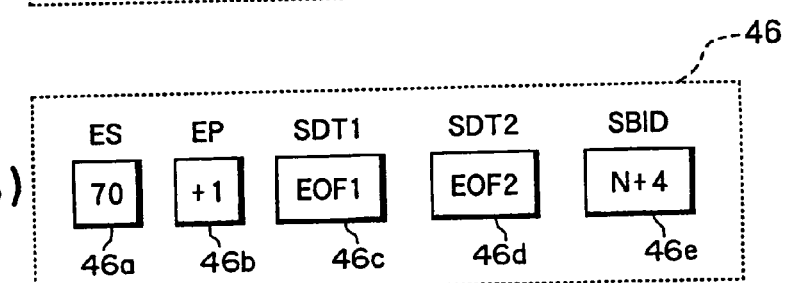
Figure 259A:
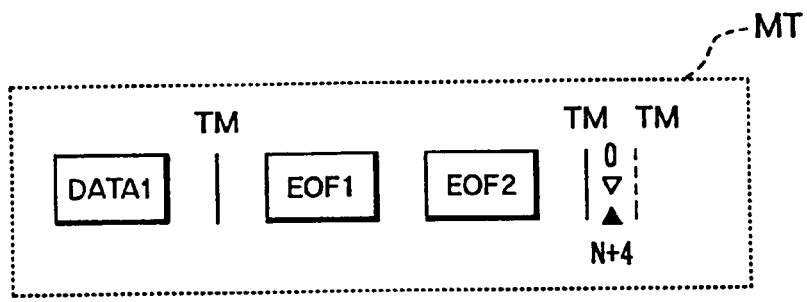
Figure 259B:
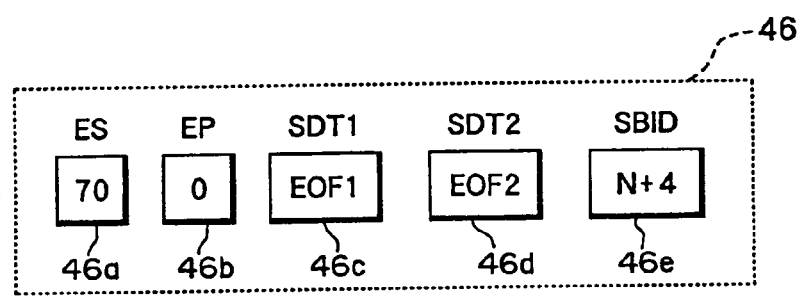
Figure 260A:
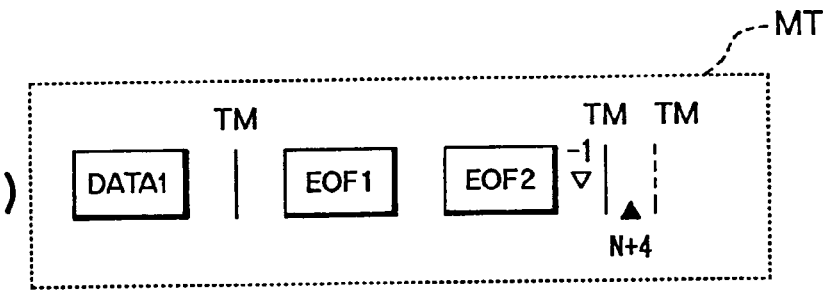
Figure 260B:
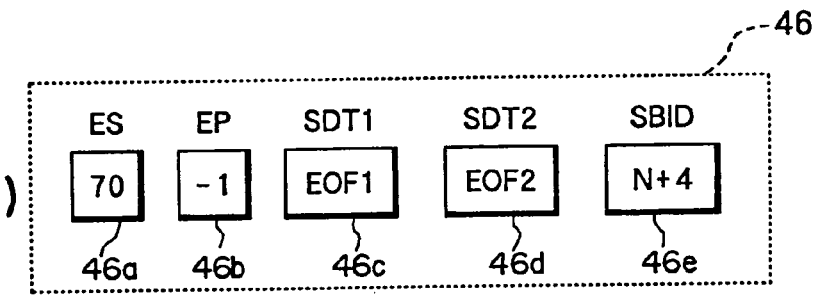
Figure 261A:
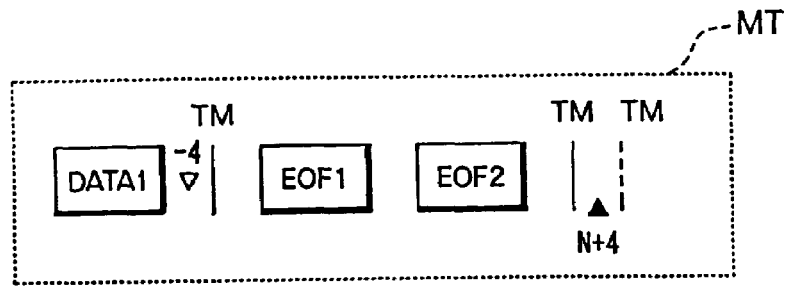
Figure 261B:
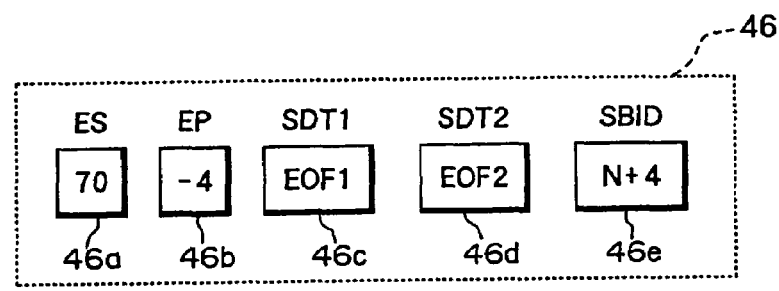
Figure 262A:
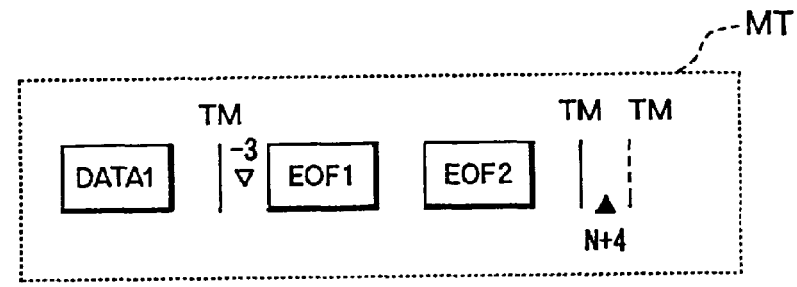
Figure 262B:
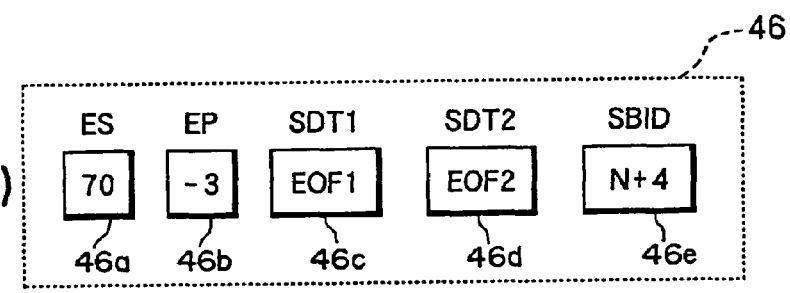
Figure 263A:
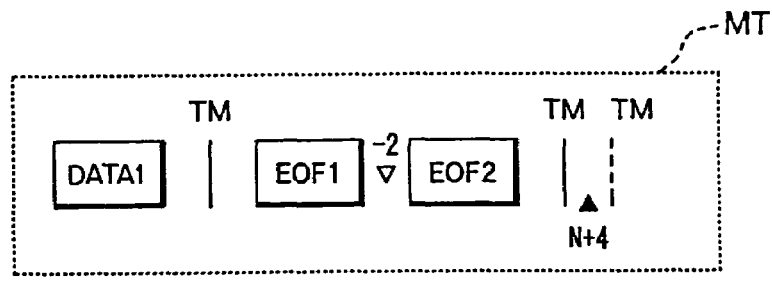
Figure 263B:
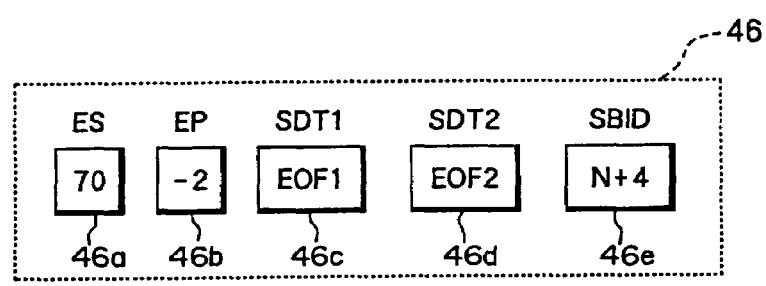
Figure 264A:
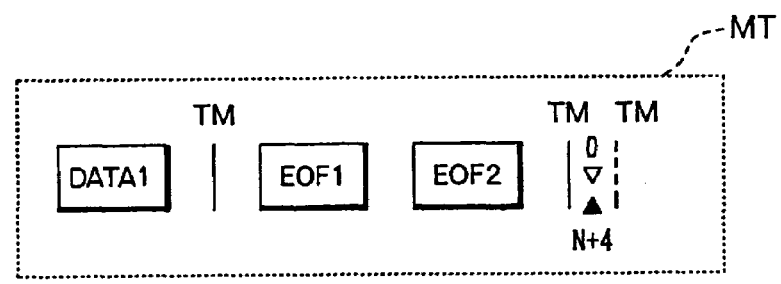
Figure 264B:
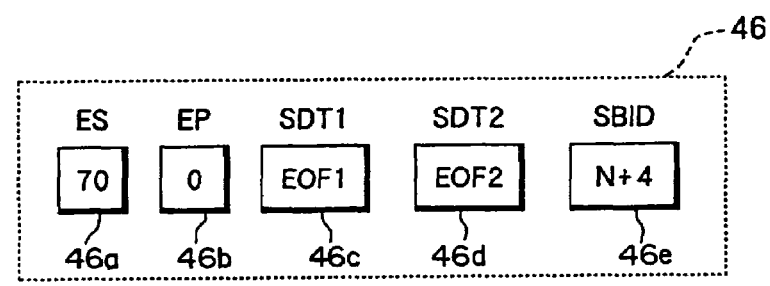
Figure 265A:
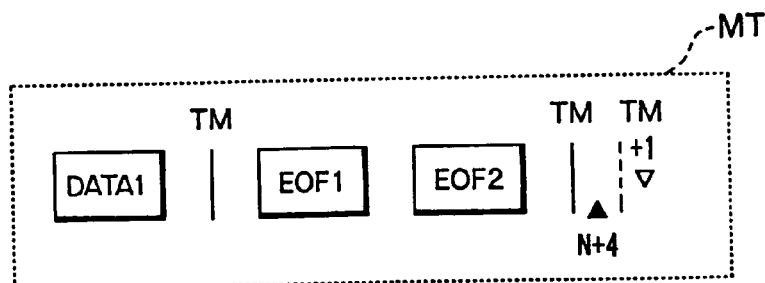
Figure 265B:
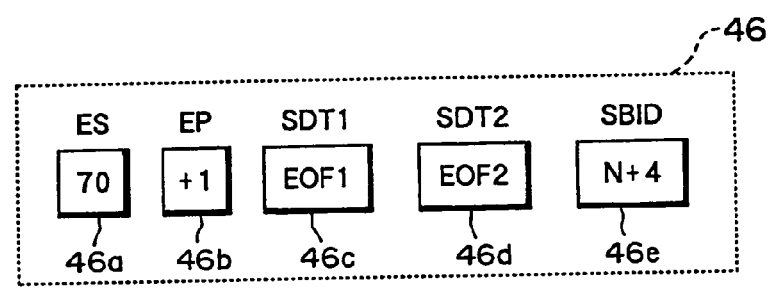
Figure 266A:
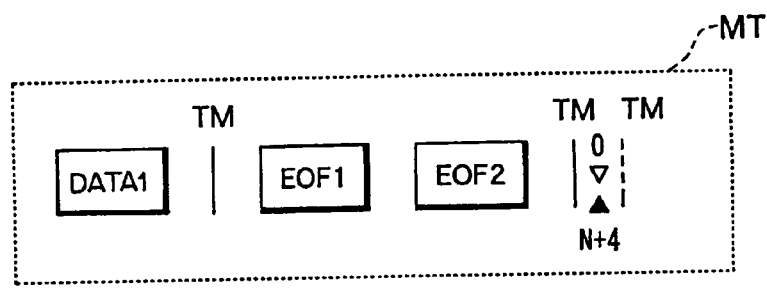
Figure 266B:
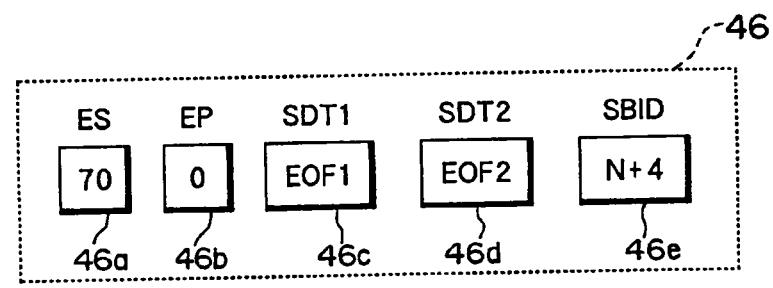
Figure 267A:
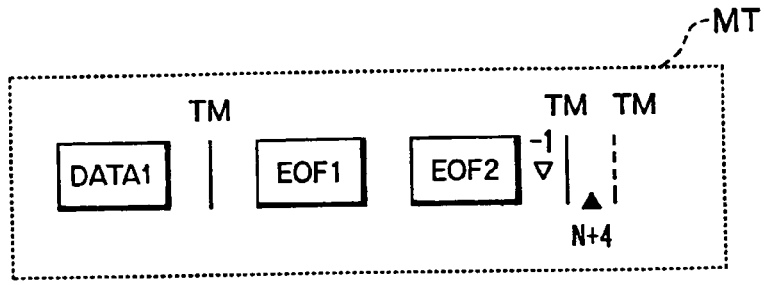
Figure 268A:
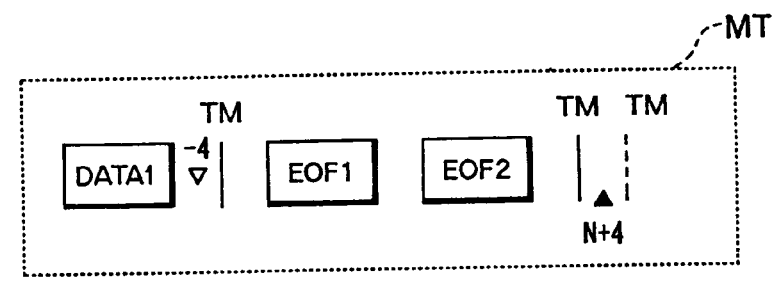
Figure 269A:
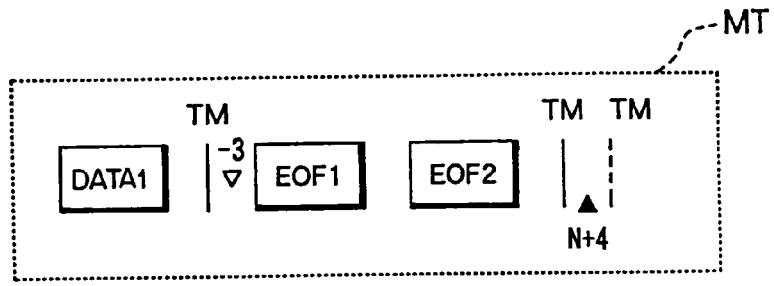
Figure 269B:
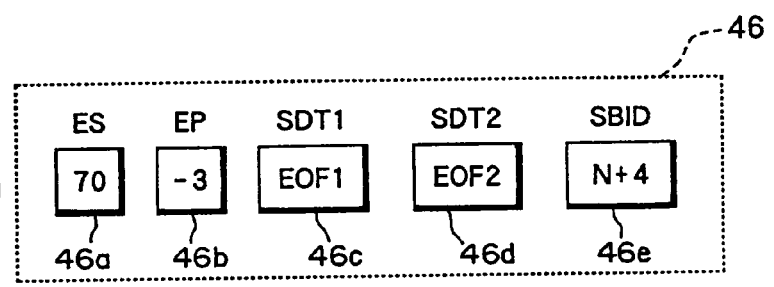
Figure 270A:
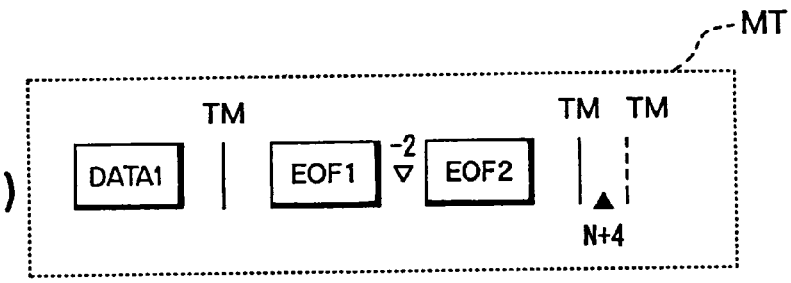
Figure 270B:
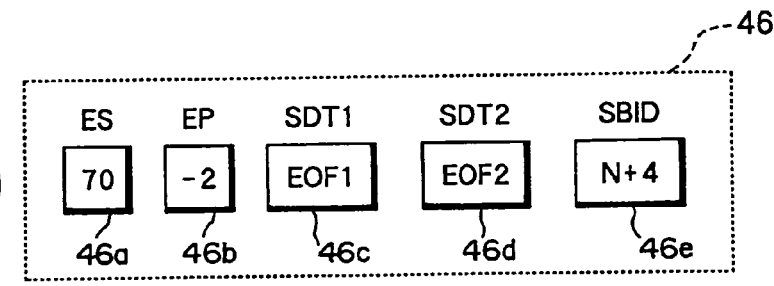
Figure 271A:
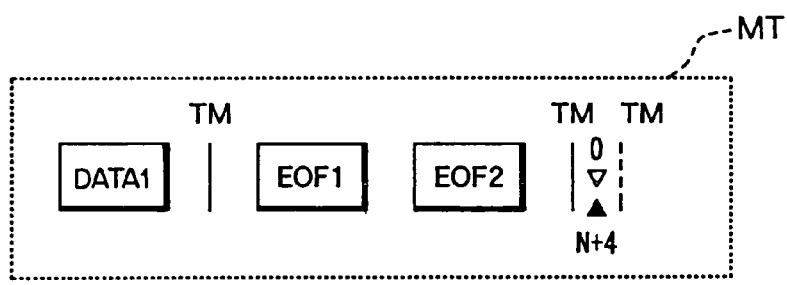
Figure 271B:
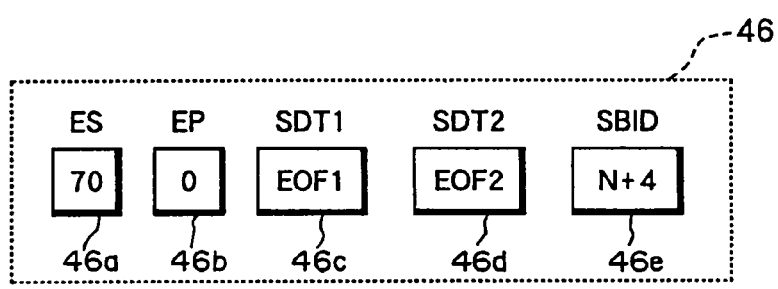
Figures 272A, 272B:
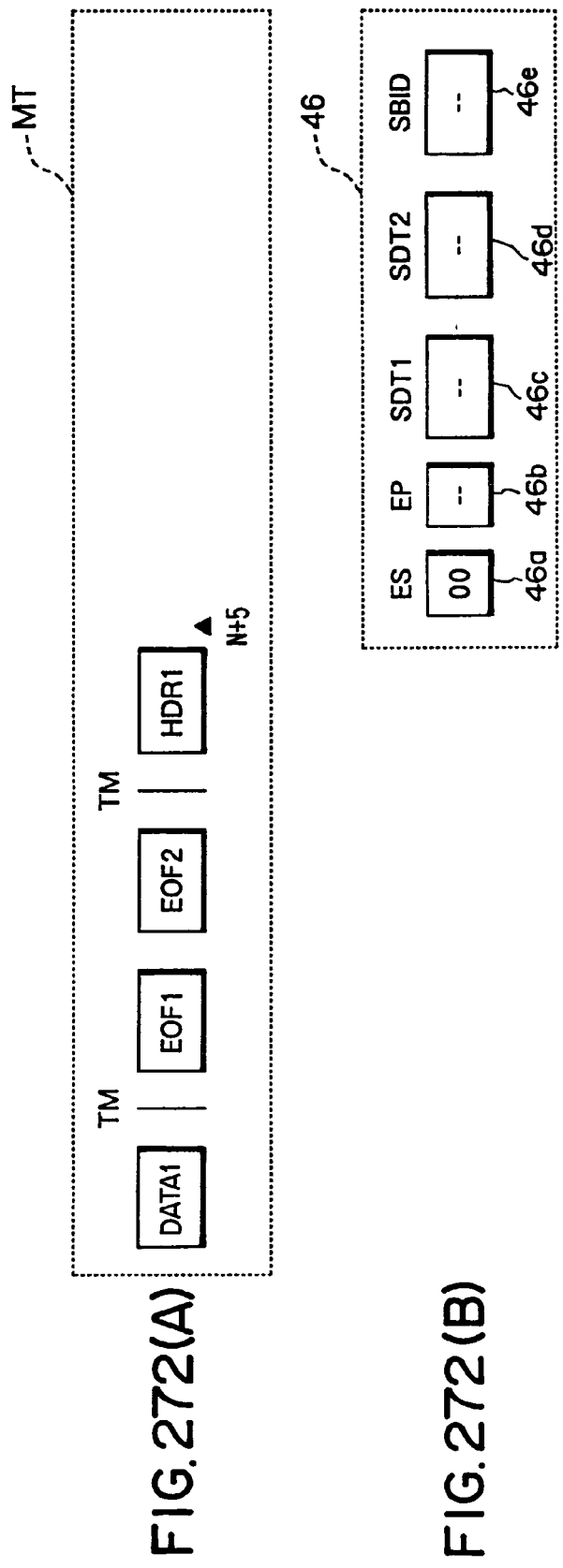
Figures 273A, 273B:
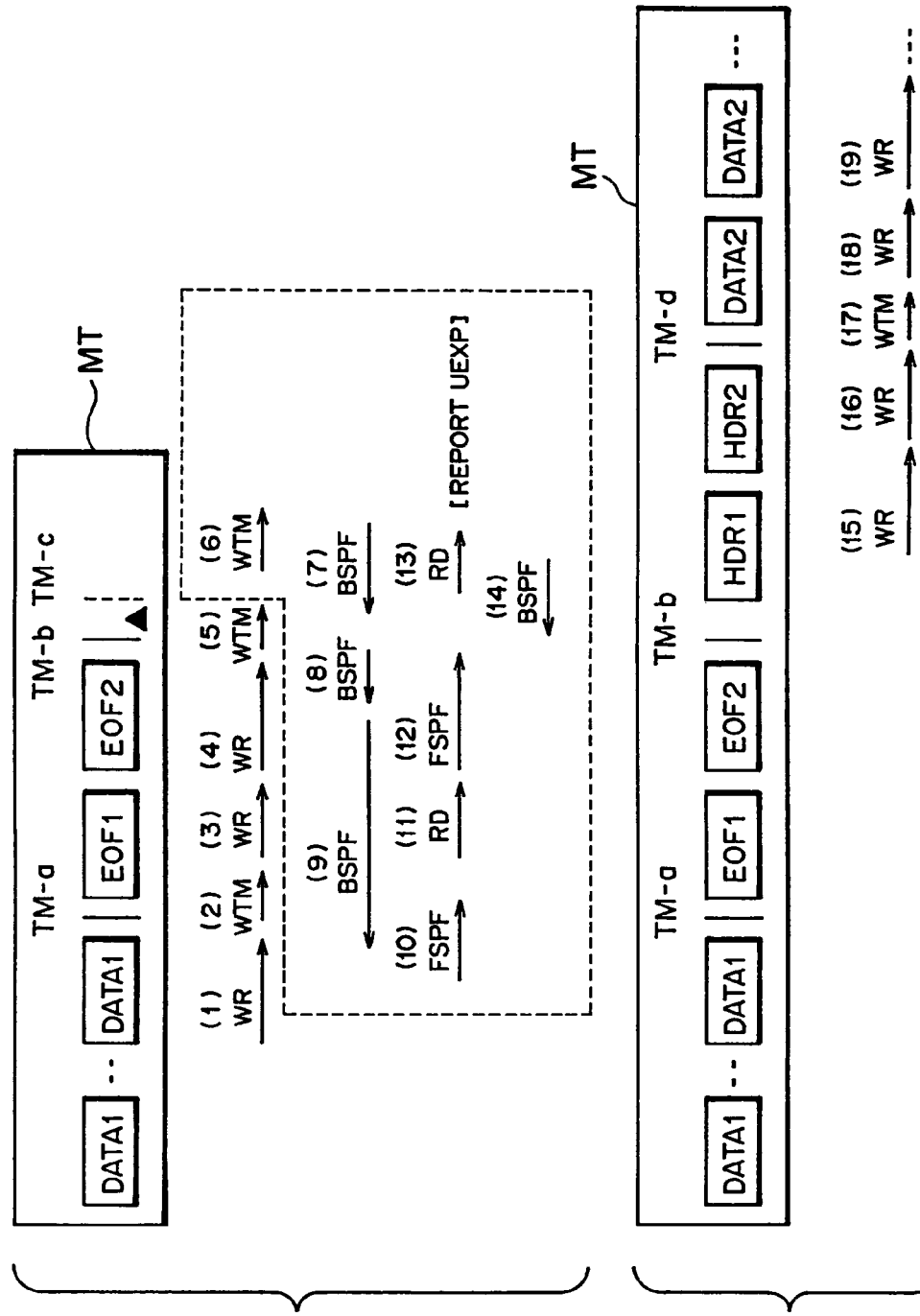

FIGS. 120(A) and 120(B) are diagrams for illustrating an operation [command processing (4) in FIG. 116(A)] according to the second embodiment, FIG. 120(A) showing a state of data writing on the magnetic tape, a real head position and a virtual head position, FIG. 120(B) showing a state of data saving/storing;

FIGS. 121(A) and 121(B) are diagrams for illustrating an operation [command processing (5) in FIG. 116(A)] according to the second embodiment, FIG. 121(A) showing a state of data writing on the magnetic tape, a real head position and a virtual head position, FIG. 121(B) showing a state of data saving/storing;

FIGS. 122(A) and 122(B) are diagrams for illustrating an operation [command processing (6) in FIG. 116(A)] according to the second embodiment, FIG. 122(A) showing a state of data writing on the magnetic tape, a real head position and a virtual head position, FIG. 122(B) showing a state of data saving/storing;

FIGS. 123(A) and 123(B) are diagrams for illustrating an operation [command processing (7) in FIG. 116(A)] according to the second embodiment, FIG. 123(A) showing a state of data writing on the magnetic tape, a real head position and a virtual head position, FIG. 123(B) showing a state of data saving/storing;

FIGS. 124(A) and 124(B) are diagrams for illustrating an operation [command processing (8) in FIG. 116(A)] according to the second embodiment, FIG. 124(A) showing a state of data writing on the magnetic tape, a real head position and a virtual head position, FIG. 124(B) showing a state of data saving/storing;

FIGS. 125(A) and 125(B) are diagrams for illustrating an operation [command processing (9) in FIG. 116(A)] according to the second embodiment, FIG. 125(A) showing a state of data writing on the magnetic tape, a real head position and a virtual head position, FIG. 125(B) showing a state of data saving/storing;

FIGS. 126(A) and 126(B) are diagrams for illustrating an operation [command processing (10) in FIG. 116(A)] according to the second embodiment, FIG. 126(A) showing a state of data writing on the magnetic tape, a real head position and a virtual head position, FIG. 126(B) showing a state of data saving/storing;

FIGS. 127(A) and 127(B) are diagrams for illustrating an operation [command processing (11) in FIG. 116(A)] according to the second embodiment, FIG. 127(A) showing a state of data writing on the magnetic tape, a real head position and a virtual head position, FIG. 127(B) showing a state of data saving/storing;

FIGS. 128(A) and 128(B) are diagrams for illustrating an operation [command processing (12) in FIG. 116(A)] according to the second embodiment, FIG. 128(A) showing a state of data writing on the magnetic tape, a real head position and a virtual head position, FIG. 128(B) showing a state of data saving/storing;

FIGS. 129(A) and 129(B) are diagrams for illustrating an operation [command processing (13) in FIG. 116(A)] according to the second embodiment, FIG. 129(A) showing a state of data writing on the magnetic tape, a real head position and a virtual head position, FIG. 129(B) showing a state of data saving/storing;

FIGS. 130(A) and 130(B) are diagrams for illustrating an operation [command processing (14) in FIG. 116(A)] according to the second embodiment, FIG. 130(A) showing a state of data writing on the magnetic tape, a real head position and a virtual head position, FIG. 130(B) showing a state of data saving/storing;

FIGS. 131(A) and 131(B) are diagrams for illustrating an operation [command processing (15) in FIG. 116(A)] according to the second embodiment, FIG. 131(A) showing a state of data writing on the magnetic tape, a real head position and a virtual head position, FIG. 131(B) showing a state of data saving/storing;

FIGS. 132(A) and 132(B) are diagrams for illustrating an operation [command processing (16) in FIG. 116(A)] according to the second embodiment, FIG. 132(A) showing a state of data writing on the magnetic tape, a real head position and a virtual head position, FIG. 132(B) showing a state of data saving/storing;

FIGS. 133(A) and 133(B) are diagrams for illustrating an operation [command processing (17) in FIG. 116(B)] according to the second embodiment, FIG. 133(A) showing a state of data writing on the magnetic tape, a real head position and a virtual head position, FIG. 133(B) showing a state of data saving/storing;

FIGS. 134(A) and 134(B) are diagrams for illustrating an operation [command processing (18) in FIG. 116(B)] according to the second embodiment, FIG. 134(A) showing a state of data writing on the magnetic tape, a real head position and a virtual head position, FIG. 134(B) showing a state of data saving/storing;

FIGS. 135(A) and 135(B) are diagrams for illustrating an operation [command processing (19) in FIG. 116(B)] according to the second embodiment, FIG. 135(A) showing a state of data writing on the magnetic tape, a real head position and a virtual head position, FIG. 135(B) showing a state of data saving/storing;

FIGS. 136(A) and 136(B) are diagrams for illustrating an operation [command processing (20) in FIG. 116(B)] according to the second embodiment, FIG. 136(A) showing a state of data writing on the magnetic tape, a real head position and a virtual head position, FIG. 136(B) showing a state of data saving/storing;

FIGS. 137(A) and 137(B) are diagrams for illustrating an operation [command processing (21) in FIG. 116(B)] according to the second embodiment, FIG. 137(A) showing a state of data writing on the magnetic tape, a real head position and a virtual head position, FIG. 137(B) showing a state of data saving/storing;

FIGS. 138(A) and 138(B) are diagrams for illustrating an operation [command processing (22) in FIG. 116(B)] according to the second embodiment, FIG. 138(A) showing a state of data writing on the magnetic tape, a real head position and a virtual head position, FIG. 138(B) showing a state of data saving/storing;

FIGS. 139(A) and 139(B) are diagrams for illustrating an operation [command processing (23) in FIG. 116(B)] according to the second embodiment, FIG. 139(A) showing a state of data writing on the magnetic tape, a real head position and a virtual head position, FIG. 139(B) showing a state of data saving/storing;

FIGS. 140(A) and 140(B) are diagrams for illustrating an operation [command processing (24) in FIG. 116(B)] according to the second embodiment, FIG. 140(A) showing a state of data writing on the magnetic tape, a real head position and a virtual head position, FIG. 140(B) showing a state of data saving/storing;

FIG. 141 is a diagram showing a state of data writing on the magnetic tape, and for illustrating an example of commands issued from the upper apparatus when data is read out from two consecutive files and tape operations/emulation operations in response to the commands in the magnetic tape unit according to the second embodiment;

FIGS. 142(A) and 142(B) are diagrams for illustrating an operation [command processing (1) in FIG. 141] according to the second embodiment, FIG. 142(A) showing a state of data writing on the magnetic tape, a real head position and a virtual head position, FIG. 142(B) showing a state of data saving/storing;

FIGS. 143(A) and 143(B) are diagrams for illustrating an operation [command processing (2) in FIG. 141] according to the second embodiment, FIG. 143(A) showing a state of data writing on the magnetic tape, a real head position and a virtual head position, FIG. 143(B) showing a state of data saving/storing;

FIGS. 144(A) and 144(B) are diagrams for illustrating an operation [command processing (3) in FIG. 141] according to the second embodiment, FIG. 144(A) showing a state of data writing on the magnetic tape, a real head position and a virtual head position, FIG. 144(B) showing a state of data saving/storing;

FIGS. 145(A) and 145(B) are diagrams for illustrating an operation [command processing (4) in FIG. 141] according to the second embodiment, FIG. 145(A) showing a state of data writing on the magnetic tape, a real head position and a virtual head position, FIG. 145(B) showing a state of data saving/storing;

FIGS. 146(A) and 146(B) are diagrams for illustrating an operation [command processing (5) in FIG. 141] according to the second embodiment, FIG. 146(A) showing a state of data writing on the magnetic tape, a real head position and a virtual head position, FIG. 146(B) showing a state of data saving/storing;

FIGS. 147(A) and 147(B) are diagrams for illustrating an operation [command processing (6) in FIG. 141] according to the second embodiment, FIG. 147(A) showing a state of data writing on the magnetic tape, a real head position and a virtual head position, FIG. 147(B) showing a state of data saving/storing;

FIGS. 148(A) and 148(B) are diagrams for illustrating an operation [command processing (7) in FIG. 141] according to the second embodiment, FIG. 148(A) showing a state of data writing on the magnetic tape, a real head position and a virtual head position, FIG. 148(B) showing a state of data saving/storing;

FIGS. 149(A) and 149(B) are diagrams for illustrating an operation [command processing (8) in FIG. 141] according to the second embodiment, FIG. 149(A) showing a state of data writing on the magnetic tape, a real head position and a virtual head position, FIG. 149(B) showing a state of data saving/storing;

FIGS. 150(A) and 150(B) are diagrams for illustrating an operation [command processing (9) in FIG. 141] according to the second embodiment, FIG. 150(A) showing a state of data writing on the magnetic tape, a real head position and a virtual head position, FIG. 150(B) showing a state of data saving/storing;

FIGS. 151(A) and 151(B) are diagrams for illustrating an operation [command processing (10) in FIG. 141] according to the second embodiment, FIG. 151(A) showing a state of data writing on the magnetic tape, a real head position and a virtual head position, FIG. 151(B) showing a state of data saving/storing;

FIGS. 152(A) and 152(B) are diagrams for illustrating an operation [command processing (11) in FIG. 141] according to the second embodiment, FIG. 152(A) showing a state of data writing on the magnetic tape, a real head position and a virtual head position, FIG. 152(B) showing a state of data saving/storing;

FIGS. 153(A) and 153(B) are diagrams for illustrating an operation [command processing (12) in FIG. 141] according to the second embodiment, FIG. 153(A) showing a state of data writing on the magnetic tape, a real head position and a virtual head position, FIG. 153(B) showing a state of data saving/storing;

FIGS. 154(A) and 154(B) are diagrams for illustrating an operation [command processing (13) in FIG. 141] according to the second embodiment, FIG. 154(A) showing a state of data writing on the magnetic tape, a real head position and a virtual head position, FIG. 154(B) showing a state of data saving/storing;

FIGS. 155(A) and 155(B) are diagrams showing a state of data writing on the magnetic tape, and for illustrating another example of commands issued from the upper apparatus when a multi-file is additionally written, and tape operations/emulation operations in response to the commands in the magnetic tape unit according to the second embodiment;

FIG. 156 is a diagram showing a state of data writing on the magnetic tape, and for illustrating another example of commands issued from the upper apparatus when data is read out from two consecutive files, and tape operations/emulation operations in the magnetic tape in response to the commands in the magnetic tape unit according to the second embodiment;

FIGS. 157(A) and 157(B) are diagrams for illustrating operations [command processing (1) in FIG. 156] according to the second embodiment, FIG. 157(A) showing a state of data writing on the magnetic head, a real head position and a virtual head position, FIG. 157(B) showing a state of data saving/storing;

FIGS. 158(A) and 158(B) are diagrams for illustrating operations [command processing (2) in FIG. 156] according to the second embodiment, FIG. 158(A) showing a state of data writing on the magnetic head, a real head position and a virtual head position, FIG. 158(B) showing a state of data saving/storing;

FIGS. 159(A) and 159(B) are diagrams for illustrating operations [command processing (3) in FIG. 156] according to the second embodiment, FIG. 158(A) showing a state of data writing on the magnetic head, a real head position and a virtual head position, FIG. 158(B) showing a state of data saving/storing;

FIGS. 160(A) and 160(B) are diagrams for illustrating operations [command processing (4) in FIG. 156] according to the second embodiment, FIG. 160(A) showing a state of data writing on the magnetic head, a real head position and a virtual head position, FIG. 160(B) showing a state of data saving/storing;

FIGS. 161(A) and 161(B) are diagrams for illustrating operations [command processing (5) in FIG. 156] according to the second embodiment, FIG. 161(A) showing a state of data writing on the magnetic head, a real head position and a virtual head position, FIG. 161(B) showing a state of data saving/storing;

FIGS. 162(A) and 162(B) are diagrams for illustrating operations [command processing (6) in FIG. 156] according to the second embodiment, FIG. 162(A) showing a state of data writing on the magnetic head, a real head position and a virtual head position, FIG. 162(B) showing a state of data saving/storing;

FIGS. 163(A) and 163(B) are diagrams for illustrating operations [command processing (7) in FIG. 156] according to the second embodiment, FIG. 163(A) showing a state of data writing on the magnetic head, a real head position and a virtual head position, FIG. 163(B) showing a state of data saving/storing;

FIGS. 164(A) and 164(B) are diagrams for illustrating operations [command processing (8) in FIG. 156] according to the second embodiment, FIG. 164(A) showing a state of data writing on the magnetic head, a real head position and a virtual head position, FIG. 164(B) showing a state of data saving/storing;

FIGS. 165(A) and 165(B) are diagrams for illustrating operations [command processing (9) in FIG. 156] according to the second embodiment, FIG. 165(A) showing a state of data writing on the magnetic head, a real head position and a virtual head position, FIG. 165(B) showing a state of data saving/storing;

FIGS. 166(A) and 166(B) are diagrams for illustrating operations [command processing (10) in FIG. 156] according to the second embodiment, FIG. 166(A) showing a state of data writing on the magnetic head, a real head position and a virtual head position, FIG. 166(B) showing a state of data saving/storing;

FIGS. 167(A) and 167(B) are diagrams for illustrating operations [command processing (11) in FIG. 156] according to the second embodiment, FIG. 167(A) showing a state of data writing on the magnetic head, a real head position and a virtual head position, FIG. 167(B) showing a state of data saving/storing;

FIGS. 168(A) and 168(B) are diagrams for illustrating operations [command processing (12) in FIG. 156] according to the second embodiment, FIG. 168(A) showing a state of data writing on the magnetic head, a real head position and a virtual head position, FIG. 168(B) showing a state of data saving/storing;

FIGS. 169(A) and 169(B) are diagrams for illustrating operations [command processing (13) in FIG. 156] according to the second embodiment, FIG. 169(A) showing a state of data writing on the magnetic head, a real head position and a virtual head position, FIG. 169(B) showing a state of data saving/storing;

FIGS. 170(A) and 170(B) are diagrams for illustrating operations [command processing (14) in FIG. 156] according to the second embodiment, FIG. 170(A) showing a state of data writing on the magnetic head, a real head position and a virtual head position, FIG. 170(B) showing a state of data saving/storing;

FIGS. 171(A) and 171(B) are diagrams for illustrating operations [command processing (15) in FIG. 156] according to the second embodiment, FIG. 171(A) showing a state of data writing on the magnetic head, a real head position and a virtual head position, FIG. 171(B) showing a state of data saving/storing;

FIGS. 172(A) and 172(B) are diagrams for illustrating operations [command processing (16) in FIG. 156] according to the second embodiment, FIG. 172(A) showing a state of data writing on the magnetic head, a real head position and a virtual head position, FIG. 172(B) showing a state of data saving/storing;

FIG. 173 is a diagram in which, when data is read out from two consecutive files as shown in FIG. 141, a time required for a command processing carried out applying the method according to the second embodiment and executing emulation is compared with a time required for the command processing carried out applying the known method without executing emulation;

FIG. 174 is a diagram in which, when data is read out from two consecutive files as shown in FIG. 156, a time required for a command processing carried out applying the method according to the second embodiment and executing emulation is compared with a time required for the command processing carried out applying the known method without executing emulation;

FIG. 175 is a block diagram showing a hardware structure of a known magnetic tape controller;

FIG. 176 is a diagram showing structures of a command buffer and a data buffer and a register for XBID for carrying out streaming;

FIG. 177 is a diagram for illustrating states of the command buffer and the data buffer when a read streaming sequence is executed;

FIG. 178 is a diagram for illustrating states of the command buffer and the data buffer when the read streaming sequence is executed;

FIG. 179 is a diagram for illustrating states of the command buffer and the data buffer when a write streaming sequence is executed;

FIG. 180 is a diagram for illustrating states of the command buffer and the data buffer when the write streaming sequence is executed;

FIG. 181 is a diagram for illustrating states of the command buffer and the data buffer when a command sequence other than the read command sequence and the write command sequence is executed;

FIG. 182 is a diagram for illustrating states of the command buffer and the data buffer when the command sequence other than the read command sequence and the write command sequence is executed;

FIG. 183 is a flowchart for illustrating a command processing (idle process) by a format controller in a known magnetic tape controller;

FIG. 184 is a flowchart for illustrating a command processing (read process) by the format controller in the known magnetic tape controller;

FIG. 185 is a diagram in which a part of the flowchart shown in FIG. 184 is tabulated in order to illustrate the command process (read process) by the format controller in the known magnetic tape controller;

FIG. 186 is a flowchart for illustrating a command processing (read backward process) by the format controller in the known magnetic tape controller;

FIG. 187 is a diagram in which a part of the flowchart shown in FIG. 186 is tabulated in order to illustrate the command processing (read backward process) by the format controller in the known magnetic tape controller;

FIG. 188 is a flowchart for illustrating a command processing (write process) by the format controller in the known magnetic tape controller;

FIG. 189 is a diagram in which a part of the flowchart shown in FIG. 188 is tabulated in order to illustrate the command processing (write process) by the format controller in the known magnetic tape controller;

FIG. 190 is a flowchart for illustrating a command processing (back space block process) by the format controller in the known magnetic tape controller;

FIG. 191 is a diagram in which a part of the flowchart shown in FIG. 190 is tabulated in order to illustrate the command processing (back space block process) by the format controller in the known magnetic tape controller;

FIG. 192 is a flowchart for illustrating a command processing (back space file process) by the format controller in the known magnetic tape controller;

FIG. 193 is a diagram in which a part of the flowchart shown in FIG. 192 is tabulated in order to illustrate the command processing (back space file process) by the format controller in the known magnetic tape controller;

FIG. 194 is a flowchart for illustrating a command processing (forward space block process) by the format controller in the known magnetic tape controller;

FIG. 195 is a diagram in which a part of the flowchart shown in FIG. 194 is tabulated in order to illustrate the command processing (forward space block process) by the format controller in the known magnetic tape controller;

FIG. 196 is a flowchart for illustrating a command processing (forward space file process) by the format controller in the known magnetic tape controller;

FIG. 197 is a diagram in which a part of the flowchart shown in FIG. 196 is tabulated in order to illustrate the command processing (forward space file process) by the format controller in the known magnetic tape controller;

FIG. 198 is a flowchart for illustrating a command processing (write tape mark process) by the format controller in the known magnetic tape controller;

FIG. 199 is a diagram in which a part of the flowchart shown in FIG. 198 is tabulated in order to illustrate the command processing (write tape mark process) by the format controller in the known magnetic tape controller;

FIGS. 200(A) and 200(B) are diagrams showing a state of data writing on the magnetic tape, and for illustrating commands issued from an upper apparatus when a multi-file is additionally written, and tape operations in response to the commands in the magnetic tape unit;

FIG. 201 is a diagram showing a state of data writing on the magnetic tape, and for illustrating command issued from the upper apparatus when data is read out from two consecutive files, and tape operations in response to the commands in the magnetic tape unit;

FIGS. 202(A) through 202(I) are diagrams for illustrating emulation status (ES) in a method for controlling a magnetic tape unit according to a third embodiment of this invention;

FIG. 203 is a diagram for illustrating main transition of the emulation status (ES) according to the third embodiment;

FIGS. 204 and 205 are diagrams in which a part of a read process in Pattern 1 by a control unit in an interface converting apparatus according to the third embodiment is tabulated in order to illustrate the same;

FIGS. 206 and 207 are diagrams in which a part of a read process in Pattern 2 by the control unit in the interface converting apparatus according to the third embodiment is tabulated in order to illustrate the same;

FIGS. 208 and 209 are diagrams in which a part of a read process in Pattern 3 by the control unit in the interface converting apparatus according to the third embodiment is tabulated in order to illustrate the same;

FIGS. 210 and 211 are diagrams in which a part of a read process in Pattern 4 by the control unit in the interface converting apparatus according to the third embodiment is tabulated in order to illustrate the same;

FIG. 212 is a diagram in which a part of a read backward process in Pattern 1 by the control unit in the interface converting apparatus according to the third embodiment is tabulated in order to illustrate the same;

FIG. 213 is a diagram in which a part of a read backward process in Pattern 2 by the control unit in the interface converting apparatus according to the third embodiment is tabulated in order to illustrate the same;

FIG. 214 is a diagram in which a part of a read backward process in Pattern 3 by the control unit in the interface converting apparatus according to the third embodiment is tabulated in order to illustrate the same;

FIG. 215 is a diagram in which a part of a read backward process in Pattern 4 by the control unit in the interface converting apparatus according to the third embodiment is tabulated in order to illustrate the same;

FIGS. 216 and 217 are diagrams in which a part of a write process in Pattern 1 by the control unit in the interface converting apparatus according to the third embodiment is tabulated in order to illustrate the same;

FIGS. 218 and 219 are diagrams in which a part of a write process in Pattern 2 by the control unit in the interface converting apparatus according to the third embodiment is tabulated in order to illustrate the same;

FIGS. 220 and 221 are diagrams in which a part of a read backward process in Pattern 3 by the control unit in the interface converting apparatus according to the third embodiment is tabulated in order to illustrate the same;

FIGS. 222 and 223 are diagrams in which a part of a read backward process in Pattern 4 by the control unit in the interface converting apparatus according to the third embodiment is tabulated in order to illustrate the same;

FIG. 224 is a diagram in which a part of a back space block process in Pattern 1 by the control unit in the interface converting apparatus according to the third embodiment is tabulated in order to illustrate the same;

FIG. 225 is a diagram in which a part of a back space block process in Pattern 2 by the control unit in the interface converting apparatus according to the third embodiment is tabulated in order to illustrate the same;

FIG. 226 is a diagram in which a part of a back space block process in Pattern 3 by the control unit in the interface converting apparatus according to the third embodiment is tabulated in order to illustrate the same;

FIG. 227 is a diagram in which a part of a back space block process in Pattern 4 by the control unit in the interface converting apparatus according to the third embodiment is tabulated in order to illustrate the same;

FIG. 228 is a diagram in which a part of a back space file process in Pattern 1 by the control unit in the interface converting apparatus according to the third embodiment is tabulated in order to illustrate the same;

FIG. 229 is a diagram in which a part of a back space file process in Pattern 2 by the control unit in the interface converting apparatus according to the third embodiment is tabulated in order to illustrate the same;

FIG. 230 is a diagram in which a part of a back space file process in Pattern 3 by the control unit in the interface converting apparatus according to the third embodiment is tabulated in order to illustrate the same;

FIG. 231 is a diagram in which a part of a back space file process in Pattern 4 by the control unit in the interface converting apparatus according to the third embodiment is tabulated in order to illustrate the same;

FIGS. 232 and 233 are diagrams in which a part of a forward space block process in Pattern 1 by the control unit in the interface converting apparatus according to the third embodiment is tabulated in order to illustrate the same;

FIGS. 234 and 235 are diagrams in which a part of a forward space block process in Pattern 2 by the control unit in the interface converting apparatus according to the third embodiment is tabulated in order to illustrate the same;

FIGS. 236 and 237 are diagrams in which a part of a forward space block process in Pattern 3 by the control unit in the interface converting apparatus according to the third embodiment is tabulated in order to illustrate the same;

FIGS. 238 and 239 are diagrams in which a part of a forward space block process in Pattern 4 by the control unit in the interface converting apparatus according to the third embodiment is tabulated in order to illustrate the same;

FIGS. 240 and 241 are diagrams in which a part of a forward space file process in Pattern 1 by the control unit in the interface converting apparatus according to the third embodiment is tabulated in order to illustrate the same;

FIGS. 242 and 243 are diagrams in which a part of a forward space file process in Pattern 2 by the control unit in the interface converting apparatus according to the third embodiment is tabulated in order to illustrate the same;

FIGS. 244 and 245 are diagrams in which a part of a forward space file process in Pattern 3 by the control unit in the interface converting apparatus according to the third embodiment is tabulated in order to illustrate the same;

FIGS. 246 and 247 are diagrams in which a part of a forward space file process in Pattern 4 by the control unit in the interface converting apparatus according to the third embodiment is tabulated in order to illustrate the same;

FIG. 248 is a diagram in which a part of a write tape mark process in Pattern 1 by the control unit in the interface converting apparatus according to the third embodiment is tabulated in order to illustrate the same;

FIG. 249 is a diagram in which a part of a write tape mark process in Pattern 2 by the control unit in the interface converting apparatus according to the third embodiment is tabulated in order to illustrate the same;

FIG. 250 is a diagram in which a part of a write tape mark process in Pattern 3 by the control unit in the interface converting apparatus according to the third embodiment is tabulated in order to illustrate the same;

FIG. 251 is a diagram in which a part of a write tape mark process in Pattern 4 by the control unit in the interface converting apparatus according to the third embodiment is tabulated in order to illustrate the same;

FIGS. 252(A) and 252(B) are diagrams showing a state of data writing on the magnetic tape, and for illustrating an example of commands issued from the upper apparatus when a multi-file is additionally written, and tape operations/emulation operations in response to the commands in the magnetic tape unit according to the third embodiment;

FIGS. 253(A) and 253(B) are diagrams for illustrating an operation [command processing (1) in FIG. 252(A)] according to the third embodiment, FIG. 253(A) showing a state of data writing on the magnetic tape, a real head position and a virtual head position, FIG. 253(B) showing a state of data saving/storing;

FIGS. 254(A) and 254(B) are diagrams for illustrating an operation [command processing (2) in FIG. 252(A)] according to the third embodiment, FIG. 254(A) showing a state of data writing on the magnetic tape, a real head position and a virtual head position, FIG. 254(B) showing a state of data saving/storing;

FIGS. 255(A) and 255(B) are diagrams for illustrating an operation [command processing (3) in FIG. 252(A)] according to the third embodiment, FIG. 255(A) showing a state of data writing on the magnetic tape, a real head position and a virtual head position, FIG. 255(B) showing a state of data saving/storing;

FIGS. 256(A) and 256(B) are diagrams for illustrating an operation [command processing (4) in FIG. 252(A)] according to the third embodiment, FIG. 256(A) showing a state of data writing on the magnetic tape, a real head position and a virtual head position, FIG. 256(B) showing a state of data saving/storing;

FIGS. 257(A) and 257(B) are diagrams for illustrating an operation [command processing (5) in FIG. 252(A)] according to the third embodiment, FIG. 257(A) showing a state of data writing on the magnetic tape, a real head position and a virtual head position, FIG. 257(B) showing a state of data saving/storing;

FIGS. 258(A) and 258(B) are diagrams for illustrating an operation [command processing (6) in FIG. 252(A)] according to the third embodiment, FIG. 258(A) showing a state of data writing on the magnetic tape, a real head position and a virtual head position, FIG. 258(B) showing a state of data saving/storing;

FIGS. 259(A) and 259(B) are diagrams for illustrating an operation [command processing (7) in FIG. 252(A)] according to the third embodiment, FIG. 259(A) showing a state of data writing on the magnetic tape, a real head position and a virtual head position, FIG. 259(B) showing a state of data saving/storing;

FIGS. 260(A) and 260(B) are diagrams for illustrating an operation [command processing (8) in FIG. 252(A)] according to the third embodiment, FIG. 260(A) showing a state of data writing on the magnetic tape, a real head position and a virtual head position, FIG. 260(B) showing a state of data saving/storing;

FIGS. 261(A) and 261(B) are diagrams for illustrating an operation [command processing (9) in FIG. 252(A)] according to the third embodiment, FIG. 261(A) showing a state of data writing on the magnetic tape, a real head position and a virtual head position, FIG. 261(B) showing a state of data saving/storing;

FIGS. 262(A) and 262(B) are diagrams for illustrating an operation [command processing (10) in FIG. 252(A)] according to the third embodiment, FIG. 262(A) showing a state of data writing on the magnetic tape, a real head position and a virtual head position, FIG. 262(B) showing a state of data saving/storing;

FIGS. 263(A) and 263(B) are diagrams for illustrating an operation [command processing (11) in FIG. 252(A)] according to the third embodiment, FIG. 263(A) showing a state of data writing on the magnetic tape, a real head position and a virtual head position, FIG. 263(B) showing a state of data saving/storing;

FIGS. 264(A) and 264(B) are diagrams for illustrating an operation [command processing (12) in FIG. 252(A)] according to the third embodiment, FIG. 264(A) showing a state of data writing on the magnetic tape, a real head position and a virtual head position, FIG. 264(B) showing a state of data saving/storing;

FIGS. 265(A) and 265(B) are diagrams for illustrating an operation [command processing (13) in FIG. 252(A)] according to the third embodiment, FIG. 265(A) showing a state of data writing on the magnetic tape, a real head position and a virtual head position, FIG. 265(B) showing a state of data saving/storing;

FIGS. 266(A) and 266(B) are diagrams for illustrating an operation [command processing (14) in FIG. 252(A)] according to the third embodiment, FIG. 266(A) showing a state of data writing on the magnetic tape, a real head position and a virtual head position, FIG. 266(B) showing a state of data saving/storing;

FIGS. 267(A) and 267(B) are diagrams for illustrating an operation [command processing (15) in FIG. 252(A)] according to the third embodiment, FIG. 267(A) showing a state of data writing on the magnetic tape, a real head position and a virtual head position, FIG. 267(B) showing a state of data saving/storing;

FIGS. 268(A) and 268(B) are diagrams for illustrating an operation [command processing (16) in FIG. 252(A)] according to the third embodiment, FIG. 268(A) showing a state of data writing on the magnetic tape, a real head position and a virtual head position, FIG. 268(B) showing a state of data saving/storing;

FIGS. 269(A) and 269(B) are diagrams for illustrating an operation [command processing (17) in FIG. 252(B)] according to the third embodiment, FIG. 269(A) showing a state of data writing on the magnetic tape, a real head position and a virtual head position, FIG. 269(B) showing a state of data saving/storing;

FIGS. 270(A) and 270(B) are diagrams for illustrating an operation [command processing (18) in FIG. 252(B)] according to the third embodiment, FIG. 270(A) showing a state of data writing on the magnetic tape, a real head position and a virtual head position, FIG. 270(B) showing a state of data saving/storing;

FIGS. 271(A) and 271(B) are diagrams for illustrating an operation [command processing (19) in FIG. 252(B)] according to the third embodiment, FIG. 271(A) showing a state of data writing on the magnetic tape, a real head position and a virtual head position, FIG. 271(B) showing a state of data saving/storing;

FIGS. 272(A) and 272(B) are diagrams for illustrating an operation [command processing (20) in FIG. 252(B)] according to the third embodiment, FIG. 272(A) showing a state of data writing on the magnetic tape, a real head position and a virtual head position, FIG. 272(B) showing a state of data saving/storing;

FIGS. 273(A) and 273(B) are diagrams showing a state of data writing on the magnetic tape, and for illustrating another example of commands issued from the upper apparatus when a multi-file is additionally written, and tape operations/emulation operations in response to the commands in the magnetic tape unit according to the third embodiment;

FIG. 274 is a diagram in which, when a multi-file is additionally written as shown in FIGS. 252(A) and 252(B), a time required for a command processing carried out applying the method according to the third embodiment and executing emulation is compared with a time required for the command processing carried out applying the known method without executing emulation; and FIG. 275 is a diagram in which, when a multi-file is additionally written as shown in FIGS. 273(A) and 273(B), a time required for a command processing carried out applying the method according to the third embodiment and executing emulation is compared with a time required for the command processing carried out applying the known method without executing emulation.

FIGS. 276(A) through 276(C) are diagrams for illustrating a modification of the method for controlling a magnetic tape unit according to the second embodiment of this invention.

DESCRIPTION OF THE PREFERRED EMBODIMENTS

Hereinafter, description will be made of embodiments of this invention referring to the drawings.

[1] Description of a First Embodiment

[1-1] Basic Structure

Figure 1:
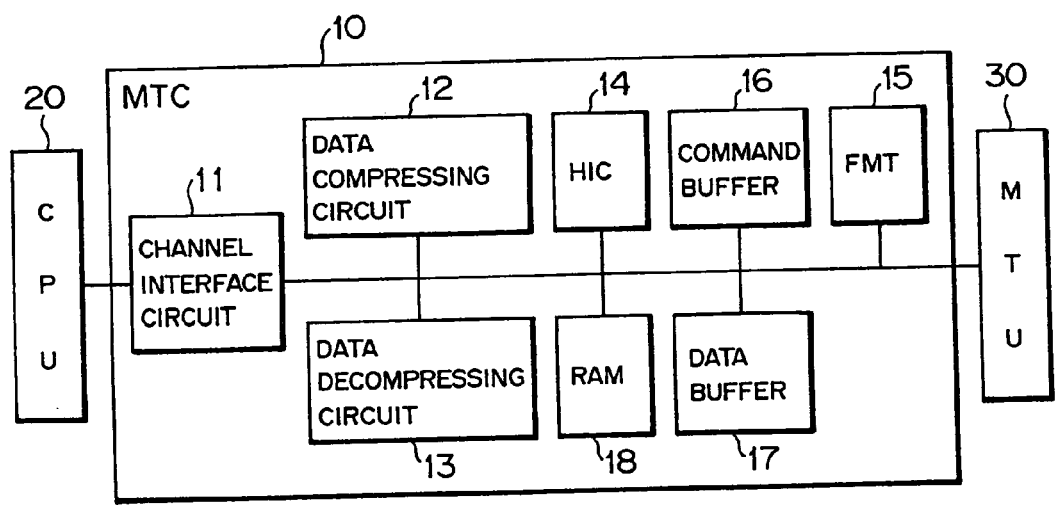
FIG. 1 is a block diagram showing a hardware structure of a magnetic tape controller to which a method for controlling a magnetic tape unit according to a first embodiment of this invention is applied.

FIG. 1 is a block diagram showing a hardware structure of a magnetic tape controller to which a method for controlling a magnetic tape unit according to a first embodiment of this invention is applied. FIG. 2(A) is a diagram showing structures of a command buffer and a data buffer, and a register for XBID according to the first embodiment. FIG. 2(B) is a diagram showing structures of save areas and control areas in a RAM according to the first embodiment.

As shown in FIGS. 1 and 2(A), hardware of the magnetic tape controller (MTC) 10 according to the first embodiment has almost a similar structure to that described above with reference to, FIGS. 175 and 176. Like reference characters designate like or corresponding parts in FIGS. 175 and 176, detailed descriptions of which are thus omitted.

According to this embodiment, when a CPU (command issuing apparatus, host computer, upper apparatus) 20 has an access to a magnetic tape MT (MTU 30) through the MTC 10 having a command buffer 16 and a data buffer 17, the MTC 10 so controls as to carry out a read/write process between the CPU 20 and the data buffer 17 and a read/write process between the data buffer 17 and the magnetic tape MT (MTU 30) asynchronously, thereby performing the above-described streaming process while referring to FIGS. 177 through 182.

On the magnetic tape MT according to this embodiment, data is stored in the multi-file form, as well. Namely, the MTU 30 successively writes a plurality of files on the magnetic tape MT or successively reads out a plurality of files recorded on the magnetic tape MT.

Figure 3A:
FIGS. 3(A) through 3(G) are diagrams for illustrating emulation status (ES) according to the first embodiment.
Figure 3B:
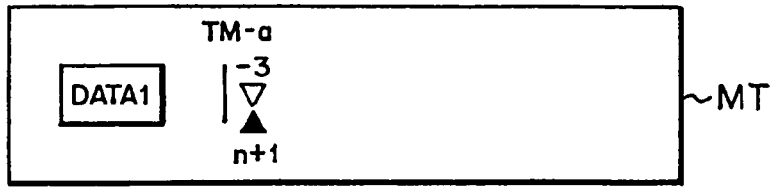
Figure 3C:
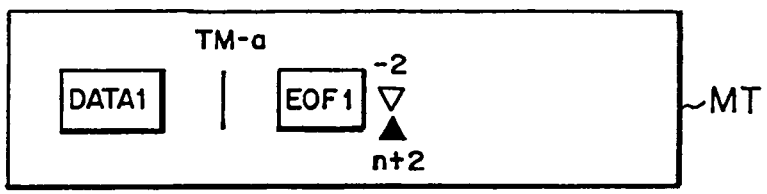
Figure 3D:
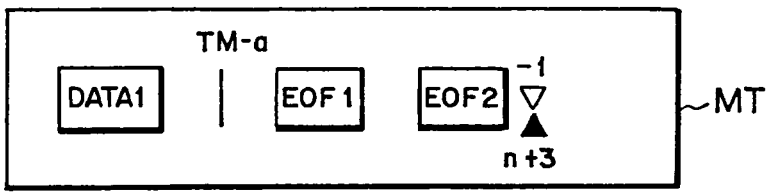
Figure 3E:
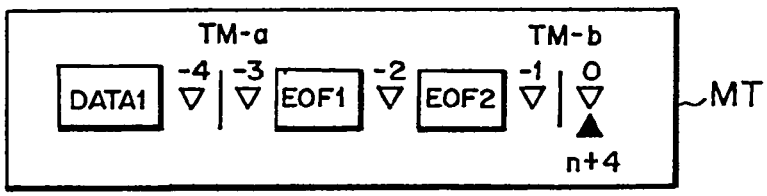
Figure 3F:
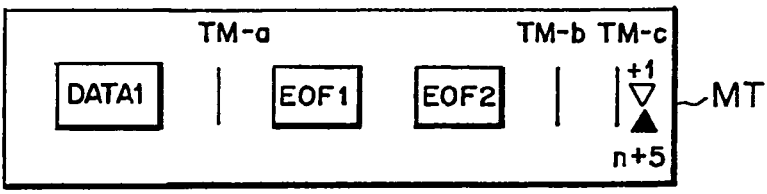

On the magnetic tape MT according to this embodiment, the first tape mark TM-a is written after the last data block (data 1 in the drawings) of a file as shown in FIG. 3(B), the first end-of-file label (hereinafter abbreviated as EOF1) and the second end-of-file label (hereinafter abbreviated as EOF2) are successively written after the first tape mark TM-a as shown in FIGS. 3(C) and 3(D), and the second tape mark TM-b is written after EOF 2 as shown in FIG. 3(E). After that, if the file is the last on the magnetic tape MT, the third tape mark TM-c is further written after the second tape mark TM-b, as shown in FIG. 3(F). When the next file is additionally written after the file, the third tape mark TM-c is overwritten with two headers (HDR 1, HDR 2), and the two headers (HDR1, HDR2) are written, as shown in FIG. 20, for example.

According to this embodiment, the CPU 20 issues various commands so as to read at least either EOF1 or EOF2 in order to recognize a position of the head relative to the magnetic tape MT in the MTU 30 in the close/open process for a file recorded as above on the magnetic tape TM.

According to this embodiment, no modification is made on both the hardware and software of the MTU 30 and the CPU 20, but modification is made on only firmware of the MTC 10.

Note that the MTC 10 according to this embodiment is provided with a RAM 18 accessible from an HIC 14 and an FMT 15. In the RAM 18, there are newly secured six areas 18a through 18f, as shown in FIG. 2(B).

The area 18a is a control area for monitoring a state of emulation to be described later, which being an area in which emulation status (ES; 0 to 6) to be described later is held.

The area 18b is a control area for monitoring a virtual position of the head (virtual head position) relative to the magnetic tape MT when the emulation to be described later is executed, which being an area in which an emulation pointer (EP; −4 to +1) to be described later is held.

The area 18c is a save area (Save Data Area 1: SDT1) for saving EOF1 when EOF1 is detected during a real operation of the MTU 30. The area 18d is a save area (Save Length Area 1: SLN1) for saving a block length of the EOF1.

The area 18e is a save area (Save Data Area 2: SDT2) for saving EOF2 when the EOF2 is detected during a real operation of the MTU 30. The area 18f is a save area (Save Length Area 2: SLN2) for saving a block length of the EOF2.

[1-2] Control Method According to the First Embodiment

Hereinafter, description will be made of a method for controlling a magnetic tape unit according to the first embodiment of this invention with reference to FIGS. 3 through 66.

[1-2-1] Basic Operation

First, description will be briefly made of a basic operation in the method according to the first embodiment. According to the first embodiment, in the open process for a file recorded on the magnetic tape MT, the MTC 10 fixes a position of the head (hereinafter referred to as a real head position) relative to the magnetic tape MT at a predetermined position [to be described later with reference to FIG. 3(E)] in the MTU 30, and carries out emulation in which a tape operation in response to a command from the CPU 20 is assumed to be virtually executed in the MTU 30 when receiving the command without making the MTU 30 carry out a real tape operation.

At this time, if EOF1 or EOF2 is read by the MTU 30 in response to an RD command from the CPU 20 in the close process for a file, the EOF1 or the EOF2 is saved in the save area 18c or 18e in the RAM 18. When an RD command directing a reading of the EOF1 or the EOF2 is issued from the CPU 20 in the open process for the file, the EOF1 or the EOF2 is read out from the save area 18c or 18e in response to the RD command, and transferred to the CPU 20.

When EOF1 or EOF2 is written by the MTU 30 in response to a WR command from the CPU 20 in the closing process for the file, the EOF1 or the EOF2 is saved in the save area 18c or 18e in the RAM 18. When an RD command directing a reading of the EOF1 or the EOF2 is issued from the CPU 20 in the opening process for the file, the EOF1 or the EOF2 is read out from the save area 18c or 18e in response to the RD command, and transferred to the CPU 20.

Further, when either EOF1 or EOF2 is skipped by the MTU 30 in response to an SP command or an FSPF command from the CPU 20 in the closing process for the file, the MTU 30 is made to carry out a real read operation to really read the EOF1/EOF2, and the read EOF1/EOF2 is saved in the save area 18c or 18e in the RAM 18. When an RD command directing a reading of the EOF1 or EOF2 is issued from the CPU 20 in the open process for the file, the EOF1 or the EOF2 is read out from the save area 18c or 18e in response to the RD command, and transferred to the CPU 20.

[1-2-2] Emulation Status

Next, description will be made of emulation status (hereinafter abbreviated as ES) according to the first embodiment with reference to FIGS. 3(A) through 3(G).

Described here are a relation between a value of ES held in the control area 18a in the RAM 18 and a real position of the head (a real head position; XBID to be stored in the register 15a of the FMT 15) relative to the magnetic tape MT, and a relation between a virtual head position (a virtual position of the head relative to the magnetic tape MT) that can be assumed when emulation is executed at each ES and a value of an emulation pointer (hereinafter abbreviated as EP) to be held in the control area 18b in the RAM 18 correspondingly to the virtual head position. Incidentally, a black triangle indicates a real head position, whereas a white triangle indicates a virtual head position in FIGS. 3(A) through 3(G).

FIG. 3(A) shows a state at the time that ES=0 (initial state). As shown in FIG. 3(A), the state at the time that ES=0 is a state in which a reading or a writing of an arbitrary data block (data 1 in the drawings) on the magnetic tape MT is completed, and a real head position relative to the magnetic tape MT is immediately after the data block. The real head position at the time that ES=0 (hereinafter referred to as XBID) is assumed to be n (BID of the arbitrary data block). At this time, a value of EP takes only −4.

FIG. 3(B) shows a state at the time that ES=1. As shown in FIG. 3(B), the state at the time that ES=1 is a state in which the first tape mark TM-a is detected or written, and the real head position is immediately after the first tape mark TM-a. XBID at the time that ES=1 is n+1. At this time, a value of EP takes only −3.

FIG. 3(C) shows a state at the time that ES=2. As shown in FIG. 3(C), the state at the time that ES=2 is a state in which EOF1 is detected or written, and the real head position is immediately after EOF1. XBID at the time that ES=2 is n+2. At this time, a value of EP takes only −2.

FIG. 3(D) shows a state at the time that ES=3. As shown in FIG. 3(D), the state at the time that ES=3 is a state in which EOF 2 is detected or written, and the real head position is immediately after EOF2. XBID at the time that ES=3 is n+3. At this time, a value of EP takes only −1.

FIG. 3(E) shows a state at the time that ES=4. As shown in FIG. 3(E), the state at the time that ES=4 is a state in which the second tape mark TM-b is detected or written, and the real head position is immediately after the second tape mark TM-b. XBID at the time that ES=4 is n+4. At this time, a value of EP can take five values, −4, −3, −2, −1 and 0.

FIG. 3(F) shows a state at the time that ES=5. As shown in FIG. 3(F), the state at the time that ES=5 is a state in which the third tape mark TM-c is detected or written, and the real head position is immediately after the third tape mark TM-c. XBID at the time that ES=5 is n+5. At this time, a value of EP takes only +1.

Figure 3G:
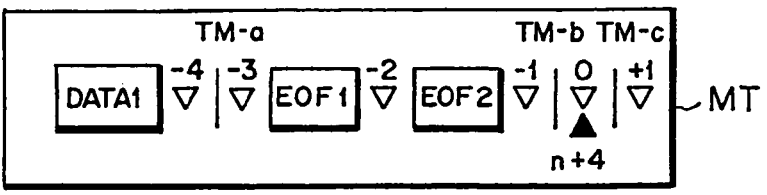

FIG. 3(G) shows a state at the time that ES=6. As shown in FIG. 3(G), the state at the time that ES=6 is a state in which the third tape mark TM-c is detected or written, and the real head position is between the second tape mark TM-b and the third tape mark TM-c. XBID at the time that ES=6 is n+4. At this time, a value of EP can take six values, −4, −3, −2, −1, 0 and +1.

According to this embodiment, emulation is executed when the real head position is immediately after the second tape mark TM-b, as shown in FIGS. 3(E) and 3(G). A predetermined position at which the head is fixed when the emulation is executed is set to a position immediately after the second tape mark TM-b. A virtual head position used in the emulation, i.e., a value of EP, is managed as a relative position of the head relative to the predetermined position. Namely, a value of EP takes 0 when the virtual head position is immediately after the second tape mark TM-b. A value of EP is subtracted 1 therefrom when the virtual head position is moved backward by one EOF or one take mark, while added 1 thereto when the virtual head position is moved forward by one EOF or one tape mark.

[1-2-3] Command Processing

The idle process by the FMT 15 is similar to the idle process described above with reference to FIG. 183, detailed descriptions of which are thus omitted. When being directed the command processing by the HIC 14, the FMT 15 takes a branched route to or shifts to a command processing (cf. Steps S24 to S30 in FIG. 183) corresponding to a type of the command directed by the HIC 14, in the idle process. In each command processing, the FMT 15 executes a control according to flowcharts or control tables (control matrices) shown in FIGS. 4 through 19.

Before explaining each command processing, distinctive operations ① through ⑥ of the method according to the first embodiment will be described:

① In processes A10 to A80 in the command processing, the FMT 15 determines which a real operation or emulation is carried out in the MTU 30 on the basis of a value of ES and a value of EP held in the control areas 18a and 18b, respectively, in the RAM 18, and controls the MTU 30 according to a result of the determination, as will be described later. At this time, when the real operation is carried out, a value of the real head position XBID held in the register 15a is updated.

② If a virtual head position differs from a real head position when the MTU 30 carries out a real operation in response to a command, a position of the re-positioned head is calculated by adding a relative position EP to the real head position XBID, and the head is repositioned at the above relative position in the MTU 30. After that, the MTU 30 performs a mechanical operation in response to the command, and a value of XBID in the register 15a is updated. Incidentally, a value of the real head position XBID to which the relative position EP should be added takes n+4 shown in FIG. 3(E) or 3(G) at this time.

③ When emulation is executed, the MTU 30 neither performs a mechanical operation nor updates a value of XBID in the register 15a, but reports a value obtained by adding the relative position EP to the real head position XBID as a present head position to the CPU 20 via the HIC 14. At this time, a value of the real head position XBID to which the relative position EP should be added takes n+4 as shown in FIG. 3(E) or 3(G), as well.

④ In processes B10 to B80 in the command processing, the FMT 15 updates ES and EP in the RAM 18 according to a command and a type of a data block that should be an object of the command processing, as will be described later. The ES and EP updated are used by the FMT 15 when a direction to carry out the next command processing is received from the HIC 14.

⑤ In processes B10, B30, B60 and B70 in the command processing, if it is determined that a data block that should be an object of a the processing is EOF1 or EOF2 when the RD process, the WR process, the SP process and the FSPF process involving a real operation of the MTU 30 is executed, the FMT 15 stores not only the data block in the save area 18c or 18e in the RAM 18, but also a block length of the data block in the save area 18d or 18f in the RAM 18. If emulation is executed in the RD process in response to an RD command when the open process for a file is carried out, for example, the FMT 15 stores the data block (EOF1 or EOF2) in the save area 18c or 18e in the data buffer 17 as data read out from the magnetic tape MT.

⑥ In processes C1 to C3 in the command processing, the FMT 15 registers a block ID (BID), a data buffer pointer (BPNT) and a block length (BLEN) updated in the processes B10 to B30 in the FQL 16-4, updates a command pointer (queue pointer) in the FQP 16-3 and updates a data buffer pointer when carrying out the RD process, the RB process and the WR process. In processes C4 to C8 in the command processing, the FMT 15 registers BID in the FQL 16-4 and updates a command pointer (queue pointer) in the FQP 16-3 when executing the BSP process, the BSPF process, the SP process, the FSPF process and the WTM process. Incidentally, the processes C1 through C8 according to the first embodiment are basically similar to those described above with reference to FIGS. 184 through 199.

[1-2-3-1] RD (Read) Process

Figure 4:
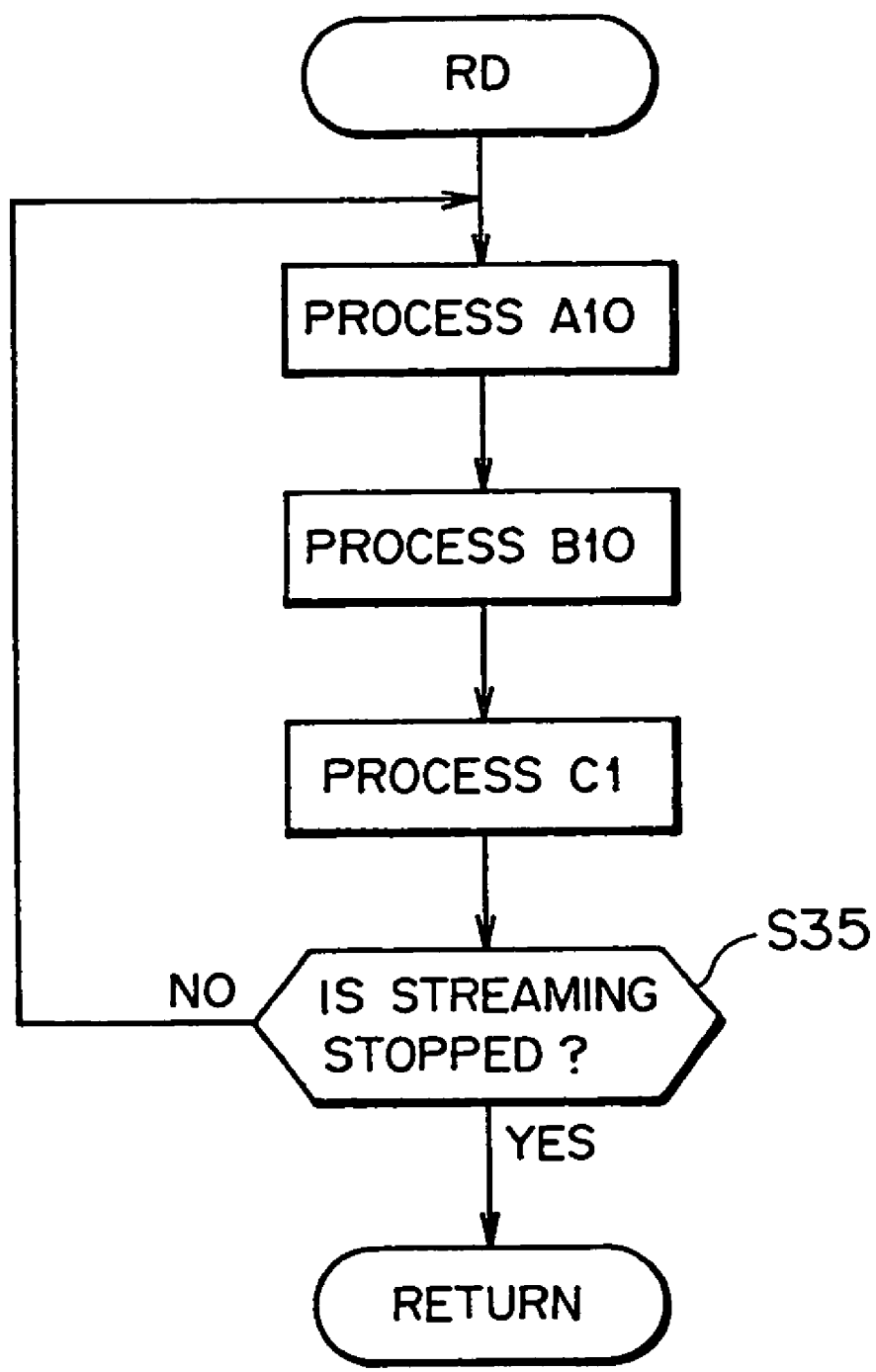
FIG. 4 is a flowchart for illustrating a command processing (read process) by a format controller of a magnetic tape controller according to the first embodiment.

FIG. 4 is a flowchart for illustrating the RD process by the FMT 15 in the MTC 10 according to the first embodiment. FIG. 5 is a diagram in which a part (processes A10 and B10) of the flowchart shown in FIG. 4 is tabulated in order to explain the RD process in more detail.

As shown in FIG. 4, in the RD process by the FMT 15, the process A10, the process B10 and the process C1 are repeatedly carried out until the streaming is stopped (until judged YES at Step S35). The process C1 is similar to that described above with reference to FIGS. 184 and 185, detailed descriptions of which are thus omitted. Hereinafter, the process A10 and the process B10 will be described in detail with reference to a control table (control matrix) shown in FIG. 5.

In the process A10, the FMT 15 refers to RAM 18 to recognize a value of ES and a value of EP. When recognizing that ES=0 and EP=−4 [cf. FIG. 3(A)], the FMT 15 makes the MTU 30 really execute a read operation (real READ), and adds 1 to a value of the real head position XBID in the register 15a. In the process B10, the FMT 15 determines whether the a type of a data block read by the MTU 30 is a tape mark (hereinafter abbreviated as TM) or any other. When determining that a type of the data block is TM, the FMT 15 updates ES to "1" in the RAM 18, updates EP to "−3", and sets "1" to TM flag, "0" to BLEN and "XBID" to BID in the FQL 16-4 (process ID=1000). When determining that the data block is other than TM in the process B10, the FMT 15 holds ES=0 and EP=−4 in the RAM 18, and sets "0" to TM flag, "LEN (block length of the data block)" to BLEN and "XBID" to BID in the FQL 16-4 (process ID=1001).

When recognizing ES=1 and EP=−3 [cf. FIG. 3(B)], the FMT 15 makes the MTU 30 really execute the read operating (real READ), and adds 1 to a value of the real head position XBID in the register 15a. In the process B10, the FMT 15 determines which one the type of the data block read in the MTU 30 is of EOF, TM or any other. When determining that the data block is EOF, the FMT 15 updates ES to "2" and EP to "−2" in the RAM 18, and sets "0" to TM flag, "LEN" to BLEN and "XBID" to BID in the FQL 16-4. The FMT 15 saves EOF (EOF1) read out from the magnetic tape MT in the save area (SDT1) in the RAM 18, and saves a block length LEN of the EOF in the save area (SLN1) in the RAM 18 (process ID=1100). When determining that the data block is TM in the process B10, the FMT 15 holds ES=1 and EP=−3 in the RAM 18, and sets "1" to TM flag, "0" to BLEN and "XBID" to BID in the FQL 16-4 (process ID=1101). When determining that the data block is other than EOF and TM in the process B10, the FMT 15 updates ES to "0" and EP to "−4" in the RAM 18, and sets "0" to TM flag, "LEN" to BLEN and "XBID" to BID in the FQL 16-4 (process ID=1102).

When recognizing that ES=2 and EP=−2 in the process A10 [cf. FIG. 3(C)], the FMT 15 makes the MTU 30 really carry out the read operation (real READ), and adds 1 to a value of the real head position XBID in the register 15a. In the process B10, the FMT 15 determines which one the type of a data block read by the MTU 30 is of EOF, TM or any other. When determining that the data block is EOF, the FMT updates ES to "3" and EP to "−1" in the RAM 18, and sets "0" to TM flag, "LEN" to BLEN and "XBID" to BID in the FQL 16-4. Further, the FMT 15 saves EOF (EOF2) read out from the magnetic tape MT to the data buffer 17 in the save area (SDT2) 18e in the RAM 18, and saves a block length LEN of the EOF in the save area (SLN2) 18f in the RAM 18 (process ID=1200). When determining that the data block is TM in the process B10, the FMT 15 updates EP to "1" and EP to "−3" in the RAM 18, and sets "1" to TM flag, "0" to BLEN and "XBID" to BID in the FQL 16-4 (process ID=1201). When determining that the data block is other than EOF and TM in the process B10, the FMT 15 updates ES to "0" and EP to "−4" in the RAM 18, and sets "0" to TM flag, "LEN" to BLEN and "XBID" to BID in the FQL 16-4 (process ID=1202).

When recognizing that ES=3 and EP=−1 in the process A10 [cf. FIG. 3(D)], the FMT 15 makes the MTU 30 really carry out the read operation (real READ), and adds 1 to a value of the real head position XBID in the register 15a. In the process B10, the FMT 15 determines whether the type of a data block read by the MTU 30 is TM or any other. When determining that the data block is TM, the FMT 15 updates ES to "4" and EP to "0" in the RAM 18, and sets "1" to TM flag, "0" to BLEN and "XBID" to BID in the FQL 16-4 (process ID=1300). When determining in the process B10 that the data block is other than TM, the FMT 15 updates ES to "0" and EP to "−4" in the RAM 18, and sets "0" to TM flag, "LEN" to BLEN and "XBID" to BID in the FQL 16-4 (process ID=1301).

When recognizing that ES=4 and EP=−4 in the process A10 [cf. FIG. 3(E)], the FMT 15 executes emulation of the MTU 30. In the process B10, the FMT updates EP to "−3" while holding ES at a value of "4" in the RAM 18, and sets "1" to TM flag, "0" to BLEN and "XBID+EP" to BID in the FQL 16-4 (process ID=1400).

When recognizing that ES=4 and EP=−3 in the process A10 [cf. FIG. 3(E)], the FMT 15 executes emulation of the MTU 30. In the process B10, the FMT 15 updates EP to "−2" while holding ES at a value of "4" in the RAM 18, writes EOF1 saved in the save area (SDT1) 18c in the RAM 18 into the data buffer 17, and sets "0" to TM flag, "SLN1 (block length of EOF1 saved in the save area 18d in the RAM 18) to BLEN and "XBID+EP" to BID in the FQL 16-4 (process ID=1410).

When recognizing that ES=4 and EP=−2 in the process A10 [cf. FIG. 3(E)], the FMT 15 executes emulation of the MTU 30. In the process B10, the FMT 15 updates EP to "−1" while holding ES at a value of "4" in the RAM 18, writes EOF2 saved in the save area (SDT2) 18e in the RAM 18 into the data buffer 17, and sets "0" to TM flag, "SLN2 (block length of EOF2 saved in the save area 18f in the RAM 18) to BLEN and "XBID+EP" to BID in the FQL 16-4 (process ID=1420).

When recognizing that ES=4 and EP=−1 in the process A10 [cf. FIG. 3(E)], the FMT 15 executes emulation of the MTU 30. In the process B10, the FMT 15 updates EP to "0" while holding ES at a value of "4" in the RAM 18, and sets "1" to TM flag, "0" to BLEN and "XBID+EP" to BID in the FQL 16-4 (process ID=1430).

When recognizing that ES=4 and EP=0 in the process A10 [cf. FIG. 3(E)], the FMT 15 makes the MTU 30 really carry out the read operation (real READ), and adds 1 to a value of the real head position XBID in the register 15a. In the process B10, the FMT determines which type of a data block read by the MTU 30 is EOF, TM or any other. When determining that the data block is EOF, the FMT 15 updates ES to "2" and EP to "−2" in the RAM 18, and sets "0" to TM flag and "XBID" to BID in the FQL 16-4. Further, the FMT 15 saves EOF (EOF1) read out from the magnetic tape MT to the data buffer 17 in the save area (SDT1) 18c in the RAM 18 and a block length LEN of the EOF in the save area (SLN1) in the RAM 18 (process ID=1440). When determining that the data block is TM in the process B10, the FMT 15 updates ES to "5" and EP to "+1" in the RAM 18, and sets "1" to TM flag and "XBID" to BID in the FQL 16-4 (process ID=1441). When determining that the data block is other than EOF and TM in the process B10, the FMT 15 updates ES to "0" and EP to "−4" in the RAM 18, and sets "0" to TM flag and "XBID" to BID in the FQL 16-4 (process ID=1442).

When recognizing that ES=5 and EP=+1 in the process A10 [cf. FIG. 3(F)], the FMT 15 makes the MTU 30 really carry out the read operation (real READ), and adds 1 to a value of the real head position XBID in the register 15a. In the process B10, the FMT 15 determines which one the type of a data block read by the MTU 30 is of EOF, TM or any other. When determining that the data block is EOF, the FMT 15 updates ES to "2" and EP to "−2" in the RAM 18, and sets "0" to TM flag and "XBID" to BID in the FQL 16-4. Further, the FMT 15 saves EOF (EOF1) read out from the magnetic tape MT to the data buffer 17 in the save area (SDT1) in the RAM 18 and a block length LEN of the EOF in the save area (SLN1) 18d in the RAM 18 (process ID=1500). When determining that the data block is TM in the process B10, the FMT 15 updates ES to "1" and EP to "−3" in the RAM 18, and sets "1" to TM flag and "XBID" to BID in the FQL 16-4 (process ID=1501). When determining that the data block is other than EOF and TM in the process B10, the FMT 15 updates ES to "0" and EP to "−4" in the RAM 18, and sets "0" to TM flag and "XBID" to BID in the FQL 16-4 (process ID=1502).

When recognizing that ES=6 and EP=−4 in the process A10 [cf. FIG. 3(G)], the FMT 15 executes emulation of the MTU 30. In the process B10, the FMT 15 updates EP to "−3" while holding ES at a value of "6" in the RAM 18, and sets "1" to TM flag, "0" to BLEN and "XBID+EP" to BID in the FQL 16-4 (process ID=1600).

When recognizing that ES=6 and EP=−3 in the process A10 [cf. FIG. 3(G)], the FMT 15 executes emulation of the MTU 30. In the process B10, the FMT 15 updates EP to "−2" while holding ES at a value of "6" in the RAM 18, writes EOF1 saved in the save area (SDT1) 18c in the RAM 18 into the data buffer 17, and sets "0" to FM flag, "SLN1" (block length of EOF1 saved in the save area 18d in the RAM 18) to BLEN and "XBID+EP" to BID in the FQL 16-4 (process ID=1610).

When recognizing that ES=6 and EP=−2 in the process A10 [cf. FIG. 3(G)], the FMT 15 executes emulates of the MTU 30. In the process B10, the FMT 15 updates EP to "−1" while holding ES at a value of "6" in the RAM 18, writes EOF2 saved in the save area (SDT2) 18e in the RAM 18 into the data buffer 17, and sets "0" to TM flag, "SLN2" (block length of EOF2 saved in the save area 18f in the RAM 18) to BLEN and "XBID+EP2" to BID in the FQL 16-4 (process ID=1620).

When recognizing that ES=6 and EP=−1 in the process A10 [cf. FIG. 3(G)], the FMT 15 executes emulation of the MT 30. In the process B10, the FMT 15 updates EP to "0" while holding ES at a value of "6" in the RAM 18, and sets "1" to TM flag, "0" to BLEN and "XBID+EP" to BID in the FQL 16-4 (process ID=1630).

When recognizing that ES=6 and EP=0 in the process A10 [cf. FIG. 3(G)], the FMT 15 executes emulation of the MTU 30. In the process B10, the FMT 15 updates EP to "+1" while holding ES at a value of "6" in the RAM 18, and sets "1" to TM flag, "0" to BLEN and "XBID+EP" to BID in the FQL 16-4 (process ID=1640).

When recognizing that ES=6 and EP=+1 in the process A10 [cf. FIG. 3(G)], the FMT 15 re-positions the head to a position XBID+EP [position n+5 in FIG. 3(G)] in the MTU 30, makes the MTU 30 really carry out the read operation (real READ), and adds 1 to a value of the real head position XBID in the register 15a. In the process B10, the FMT 15 determines whether the type of a data block read by the MTU 30 is TM or any other. When determining that the data block is TM, the FMT 15 updates ES to "1" and EP to "−3" in the RAM 18, and sets "1" to TM flag, "0" to BLEN and "XBID" to BID in the FQL 16-4 (process ID=1650). When determining that the data block is other than TM in the process B10, the FMT 15 updates ES to "0" and EP to "−4" in the RAM 18, and sets "0" to TM flag, "LEN" to BLEN and "XBID" to BID in the FQL 16-4 (process ID=1651).

[1-2-3-2] RB (Read Backward) Process

Figure 6:
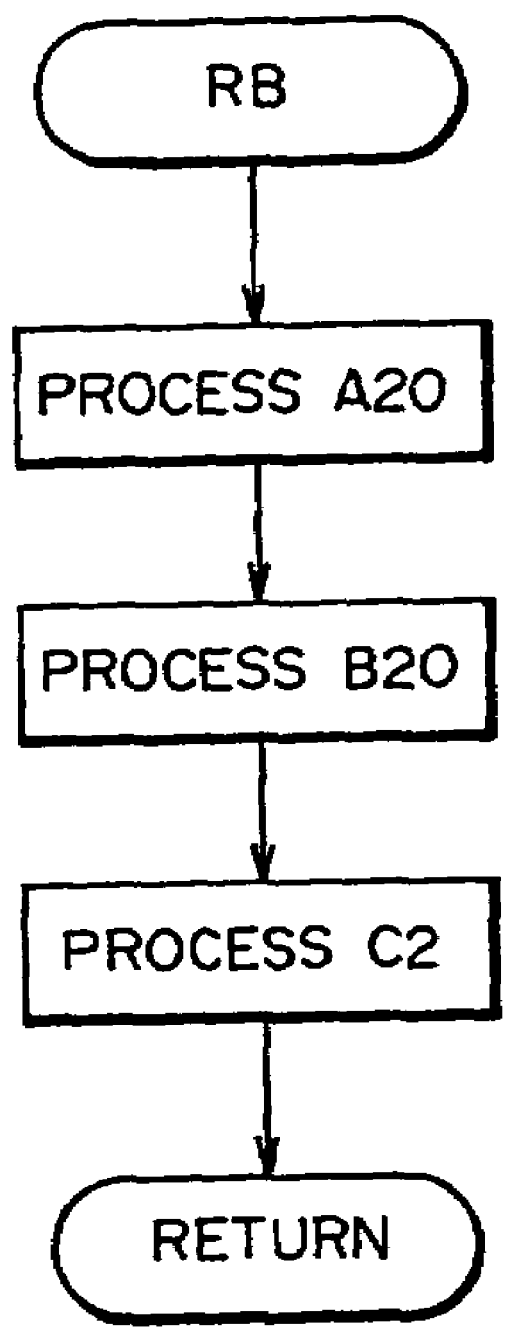
FIG. 6 is a flowchart for illustrating a command processing (read backward process) by the format controller in the magnetic tape controller according to the first embodiment.

FIG. 6 is a flowchart for illustrating the RB process by the FMT 15 in the MTC 10 according to the first embodiment. FIG. 7 is a diagram in which a part (processes A20 and B20) of the flowchart in FIG. 6 is tabulated in order to explain the RB process in more detail.

As shown in FIG. 6, the process A20, the process B20 and the process C2 are carried out in the RB process by the FMT 15. The process C2 is the same as that described above with reference to FIGS. 186 and 187, descriptions of which are thus omitted. Hereinafter, the process A20 and the process B20 will be described in detail with reference to a control table (control matrix) shown in FIG. 7.

When receiving an RM command from the CPU 20, the MTC 10 according to the first embodiment makes an error report to the CPU 20. In the RB process, when the MTC 10 makes the MTU 30 really carry out a read backward operation (real RB), the MTC 10 sets ES=0 and EP=−4. When the MTC 10 executes emulation of the MTU 30, the MTC 10 sets ES as undetermined and updates only EP.

In the process A20, the FMT 15 first refers to the RAM 18 to recognize a value of ES and a value of EP. When recognizing that ES=0 and EP=−4 [cf. FIG. 3(A)], the FMT 15 makes the MTU 30 really carry out a read backward operation (real RB), and subtracts 1 from a value of a real head position XBID in the register 15a. In the process B20, the FMT 15 determines whether the type of a data block read by the MTU 30 is TM or any other. When determining that the data block is TM, the FMT 15 holds ES=0 and EP=−4 in the RAM 18, and sets "1" to TM flag, "0" to BLEN and "XBID" to BID in the FQL 16-4 (process ID=2000). When determining that the data block is other than TM in the process B20, the FMT 15 holds ES=0 and EP=−4 in the RAM 18, and sets "0" to TM flag, "0" to BLEN and "XBID" to BID in the FQL 16-4 (process ID=2001).

When recognizing that ES=1 and EP=−3 in the process A20 [cf. FIG. 3(B)], the FMT 15 makes the MTU 30 really carry out the read backward operation (real RB), and subtracts 1 from a value of the real head position XBID in the register 15a. In the process B20, the FMT 15 determines whether the type of a data block read by the MTU 30 is TM or any other. When determining that the data block is TM, the FMT 15 updates ES to "0" and EP to "−4" in the RAM 18, and sets "1" to TM flag, "0" to BLEN and "XBID" to BID in the FQL 16-4 (process ID=2100). When determining that the data block is other than TM in the process B20, the FMT 15 updates ES to "0" and EP to "−4" in the RAM 18, and sets "0" to TM flag, "0" to BLEN and "XBID" to BID in the FQL 16-4 (process ID=2101).

When recognizing that ES=2 and EP=−2 [cf. FIG. 3(C)] in the process A20 or that ES=3 and EP=−1 in the process A20 [cf. FIG. 3(D)], processes similar to the processes of process IDs=2100 and 2101 described above are carried out in the process A20 and process B20 (process IDs=2200, 2201, 2300 and 2301).

When recognizing that ES=4 and EP=−4 in the process A20 [cf. FIG. 3(E)], the FMT 15 re-positions the head at a position XBID+EP [position n in FIG. 3(E)] in the MTU 30, makes the MTU 30 really carry out the read backward operation (real RB), and subtract 1 from a value of the real head position XBID in the register 15a. In the process B20, the FMT 15 carries out processes similar to the processes of process IDs=2100 and 2101 (process IDs=2400, 2401).

When recognizing that ES=4 and EP=−3 in the process A20 [cf. FIG. 3(E)], the FMT 15 executes emulation of the MTU 30. In the process B20, the FMT 15 sets ES as undetermined and updates EP to "−4" in the RAM 18, and sets "1" to TM flag, "0" to BLEN and "XBID+EP" to BID in the FQL 16-4 (process ID=2410).

When recognizing that ES=4 and EP=−2 in the process A20 [cf. FIG. 3(E)], the FMT executes emulation of the MTU 30. In the process B20, the FMT 15 sets ES as undetermined and updates EP to "−3", and sets "0" to TM flag, "0" to BLEN and "XBID+EP" to BID in the FQL 16-4 (process ID=2420).

When recognizing that ES=4 and EP=−1 in the process A20 [cf. FIG. 3(E)], the FMT 15 executes emulation of the MTU 30. In the process B20, the FMT 15 sets ES as undetermined and updates EP to "−2" in the RAM 18, and sets "0" to TM flag, "0" to BLEN and "XBID+EP" to BID in the FQL 16-4 (process ID=2430).

When recognizing that ES=4 and EP=0 in the process A20 [cf. FIG. 3(E)], the FMT 15 executes emulation of the MTU 30. In the process B20, the FMT 15 sets ES as undetermined and updates EP to "−1" in the RAM 18, and sets "1" to TM flag, "0" to BLEN and "XBID" to BID in the FQL 16-4 (process ID=2440).

When recognizing that ES=5 and SP=+1 in the process A20 [cf. FIG. 3(F)], the FMT 15 makes the MTU 30 really carry out the read backward operation (real RB), and subtract 1 from the real head position XBID in the register 15a. In the process B10, the FMT 15 updates ES to "6" and EP to "0" in the RAM 18, and sets "1" to TM flag, "0" to BLEN and "XBID" to BID in the FQL 16-4 (process ID=2500).

When the FMT 15 recognizes that ES=6 and EP=−4 in the process A20 [cf. FIG. 3(G)], processes similar to the processes of process IDs=2400 and 2401 described above are carried out in the process A20 and the process B20 (process IDs=2600, 2601).

When the FMT 15 recognizes that ES=6 and EP=−3 in the process A20 [cf. FIG. 3(G)], a process similar to the process of process ID=2410 described above is carried out in the process A20 and the process B20 (process ID=2610).

When the FMT 15 recognizes that ES=6 and EP=−2 in the process A20 [cf. FIG. 3(G)], a process similar to the process of process ID=2420 described above is carried out in the process A20 and the process B20 (process ID=2620).

When the FMT 15 recognizes that ES=6 and EP=−1 in the process A20 [cf. FIG. 3(G)], a process similar to the process of process ID=2430 described above is carried out in the process A20 and the process B20 (process ID=2630).

When recognizing that ES=6 and EP=0 in the process A20 [cf. FIG. 3(G)], the FMT 15 executes emulation of the MTU 30. In the process B20, the FMT 15 sets ES as undetermined and updates EP to "−1" in the RAM 18, and sets "1" to TM flag, "0" to BLEN and "XBID+EP" to BID in the FQL 16-4 (process ID=2640).

When recognizing that ES=6 and EP=+1 in the process A20 [cf. FIG. 3(G)], the FMT 15 executes emulation of the MTU 30. In the process B20, the FMT 15 sets ES as undetermined and update's EP to "0" in the RAM 18, and sets "1" to TM flag, "0" to BLEN and "XBID+EP" to BID in the FQL 16-4 (process ID=2650).

[1-2-3-3] WR (Write) Process

Figure 8:
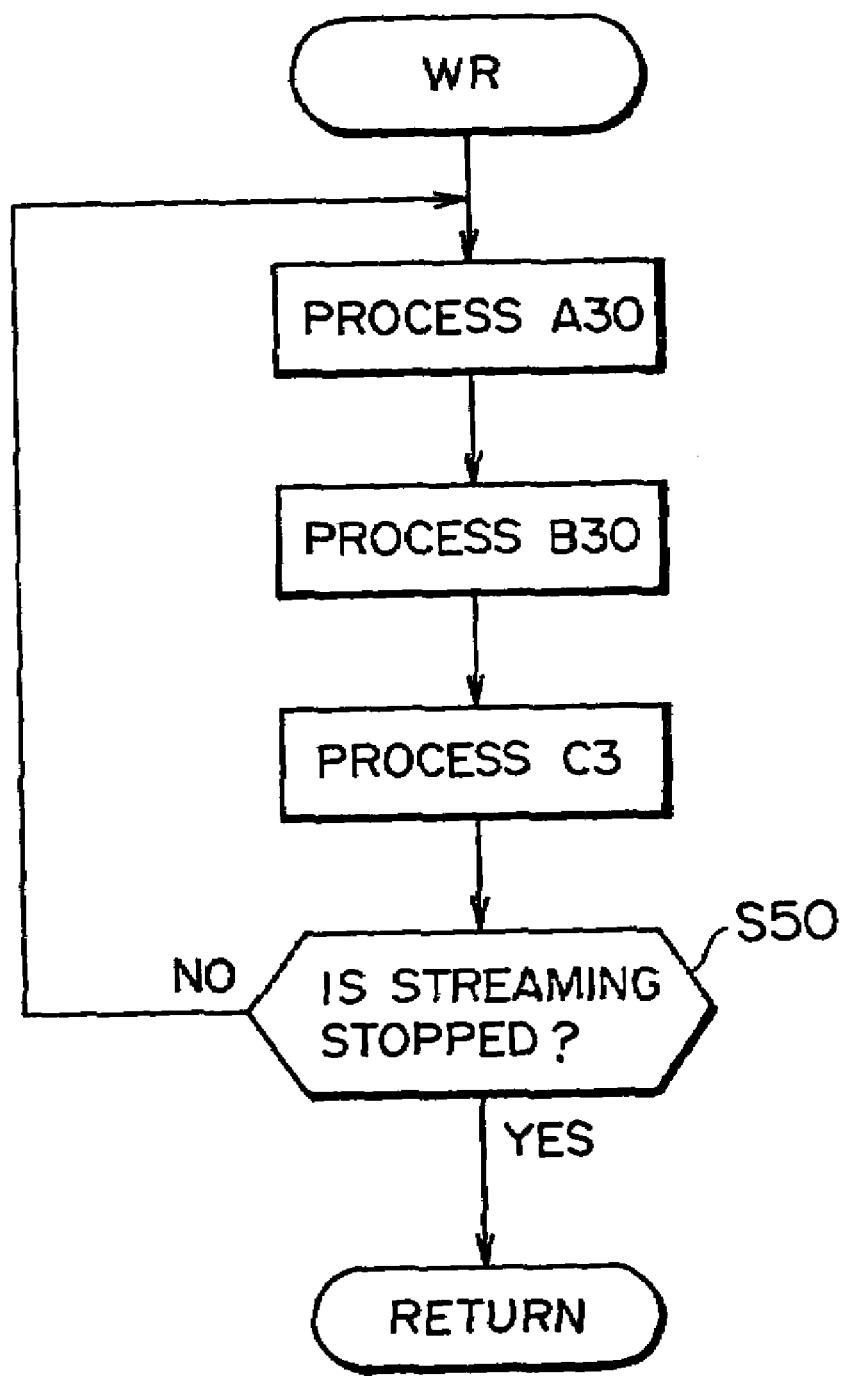
FIG. 8 is a flowchart for illustrating a command processing (write process) by the format controller in the magnetic tape controller according to the first embodiment.

FIG. 8 is a flowchart for illustrating a WR process by the FMT 15 in the MTC 10 according to the first embodiment. FIG. 9 is a diagram in which a part (processes A30 and B30) of the flowchart shown in FIG. 8 is tabulated in order to explain the WR process in more detail.

As shown in FIG. 8, the process A30, the process B30 and the process C3 are repeatedly carried out in the WR process by the FMT 15 until the streaming is stopped (until judged YES at Step S50). The process C3 is the same as that described above with reference to FIGS. 188 and 189, descriptions of which are thus omitted. Hereinafter, the process A30 and the process B30 will be described in detail with reference to a control table (control matrix) shown in FIG. 9.

In the process A30, the FMT 15 first refers to the RAM 15 to recognize a value of ES and a value of EP. When recognizing that ES=0 and EP=−4 [cf. FIG. 3(A)], the FMT 15 makes the MTU 30 really carry out a write operation (real WR), and adds 1 to a value of a real head position XBID in the register 15a. In the process B30, the FMT 15 holds ES=0 and EP=−4 in the RAM 18, and sets "LEN" to BLEN and "XBID" to BID in the FQL 16-4 (process ID=3000).

When recognizing that ES=1 and EP=−3 in the process A30 [cf. FIG. 3(B)], the FMT 15 makes the MTU 30 really carry out the write operation (real WR), and adds 1 to a value of the real head position XBID in the register 15a. In the process B30, the FMT 15 determines whether the type of a data block written by the MTU 30 is EOF or any other. When determining that the data block is EOF, the FMT 15 updates ES to "2" and EP to "−2", and sets "LEN" to BLEN and "XBID" to BID in the FQL 16-4. Further, the FMT 15 saves EOF (EOF1) stored in the data buffer 17 in the save area (SDT1) 18c in the RAM 18, and saves a block length LEN of the EOF in the save area (SLN1) 18d in the RAM 18. When determining that the data block is other than EOF in the process B30, the FMT 15 updates ES to "0" and EP to "−4" in the RAM 18, and sets "LEN" to BLEN and "XBID" to BID in the FQL 16-4 (process ID=3101).

When recognizing that ES=2 and EP=−2 in the process A30 [cf. FIG. 3(C)], the FMT 15 makes the MTU 30 really carry out the write operation (real WR), and adds 1 to a value of the real head position XBID in the register 15a. In the process B30, the FMT 15 determines whether the type of a data block written by the MTU 30 is EOF or any other. When determining that the data block is EOF, the FMT 15 updates ES to "3" and EP to "−1" in the RAM 18, and sets "LEN" to BLEN and "XBID" to BID in the FQL 16-4. Further, the FMT 15 saves EOF (EOF2) stored in the data buffer 17 in the save area (SDT2) 18e in the RAM 18, and saves a block length LEN of the EOF in the save area (SLN2) 18f in the RAM 18 (process ID=3200). When determining that the data block is other than EOF in the process B30, the FMT 15 updates ES to "0" and EP to "−4" in the RAM 18, and sets "LEN" to BLEN and "XBID" to BID in the FQL 16-4 (process ID=3201).

When recognizing that ES=3 and EP=−1 in the process A30 [cf. FIG. 3(D)], the FMT 15 makes the MTU really carry out the write operation (real WR), and adds 1 to a value of the real head position XBID in the register 15a. In the process B30, the FMT 15 updates ES to "0" and EP to "−4" in the RAM 18, and sets "LEN" to BLEN and "XBID" to BID in the FQL 16-4 (process ID=3300).

When recognizing that ES=4 and EP=−4 in the process A30 [cf. FIG. 3(E)], the FMT 15 re-positions the head at a position XBID+EP [position n in FIG. 3(E)] in the MTU 30, makes the MTU 30 really carry out the write operation (real WR), and adds 1 to a value of the real head position XBID in the register 15a. In the process B30, the FMT 15 updates ES to "0" and holds ES at a value of "−4" in the RAM 18, besides setting "LEN" to BLEN and "XBID" to BID in the FQL 16-4 (process ID=3400).

When recognizing that ES=4 and EP=−3 in the process A30 [cf. FIG. 3(E)], the FMT 15 re-positions the head at a position XBID+EP [position n+1 in FIG. 3(E)] in the MTU 30, makes the MTU 30 really carry out the write operation (real WR), and adds 1 to a value of the real head position XBID in the register 15a. In the process B30, the FMT 15 carries out processes similar to the processes of process IDs=3100 and 3101 described above (process IDs=3410, 3411).

When recognizing that ES=4 and SP=−2 in the process A30 [cf. FIG. 3(E)], the FMT 15 re-positions the head at a position XBID+EP [position n+2 in FIG. 3(E)] in the MTU 30, makes the MTU 30 really carry out the write operation (real WR), and adds 1 to a value of the real head position XBID in the register 15a. In the process B30, the FMT 15 carries out processes similar to the processes of process IDs=3200 and 3201 described above (process IDs=3420, 3421).

When recognizing that ES=4 and EP=−1 in the process A30 [cf. FIG. 3(E)], the FMT 15 re-positions the head at a position XBID+EP [position n+3 in FIG. 3(E)] in the MTU 30, makes the MTU 30 really carry out the write operation (real WR), and adds 1 to a value of the real head position XBID in the register 15a. In the process B30, the FMT 15 updates ES to "0" and EP to "−4" in the RAM 18, and sets "LEN" to BLEN and "XBID" to BID in the FQL 16-4, as does in the process of process ID=3300.

When recognizing that ES=4 and EP=0 in the process A30 [cf. FIG. 3(E)], the FMT 15 makes the MTU 30 really carry out the write operation (real WR), and adds 1 to a value of the real head position XBID in the register 15a. In the process B30, the FMT 15 carries out processes similar to the processes of process IDs=3100, 3101 described above (process IDs=3440, 3441).

When recognizing that ES=5 and EP=+1 in the process A30 [cf. FIG. 3(F)], the FMT 15 makes the MTU 30 really carry our the write operation (real WR), and adds 1 to a value of the real head position XBID in the register 15a. In the process B30, the FMT 15 carries out processes similar to the processes of process IDs=3100 and 3101 described above (process IDs=3500, 3501).

When recognizing that ES=6 and EP=−4 in the process A30 [cf. FIG. 3(G)], the FMT 15 carries out, in the process A30 and the process B30, a process similar to the process of process ID=3400 described above (process ID=3600).

When recognizing that ES=6 and EP=−3 in the process A30 [cf. FIG. 3(G)], the FMT 15 carries out, in the process A30 and the process B30, processes similar to the processes of process IDs=3410 and 3411 described above (process IDs=3610, 3611).

When recognizing that ES=6 and EP=−2 in the process A30 [cf. FIG. 3(G)], the FMT 15 carries out, in the process A30 and the process B30, processes similar to the processes of process IDs=3420 and 3421 described above (process IDs=3620, 3621).

When recognizing that ES=6 and EP=−1 in the process A30 [cf. FIG. 3(G)], the FMT 15 carries out, in the process A30 and the process B30, a process similar to the process of process ID=3430 described above (process ID=3630).

When recognizing that ES=6 and EP=0 in the process A30 [cf. FIG. 3(G)], the FMT carries out, in the process A30 and the process B30, processes similar to the processes of process IDs=3440 and 3441 described above (process IDs=3640, 3641).

When recognizing that ES=6 and EP=+1 in the process A30 [cf. FIG. 3(G)], the FMT 15 re-positions the head at a position XBID+EP [position n+5 in FIG. 3(G)] in the MTU 30, makes the MTU 30 really carry out the write operation (real WR), and adds 1 to a value of the real head position XBID in the register 15a. In the process B30, the FMT 15 executes processes similar to the processes of process IDs=3100 and 3101 described above (process IDs=3650, 3651).

[1-2-3-4] BSP (Back Space Block) Process

Figure 10:
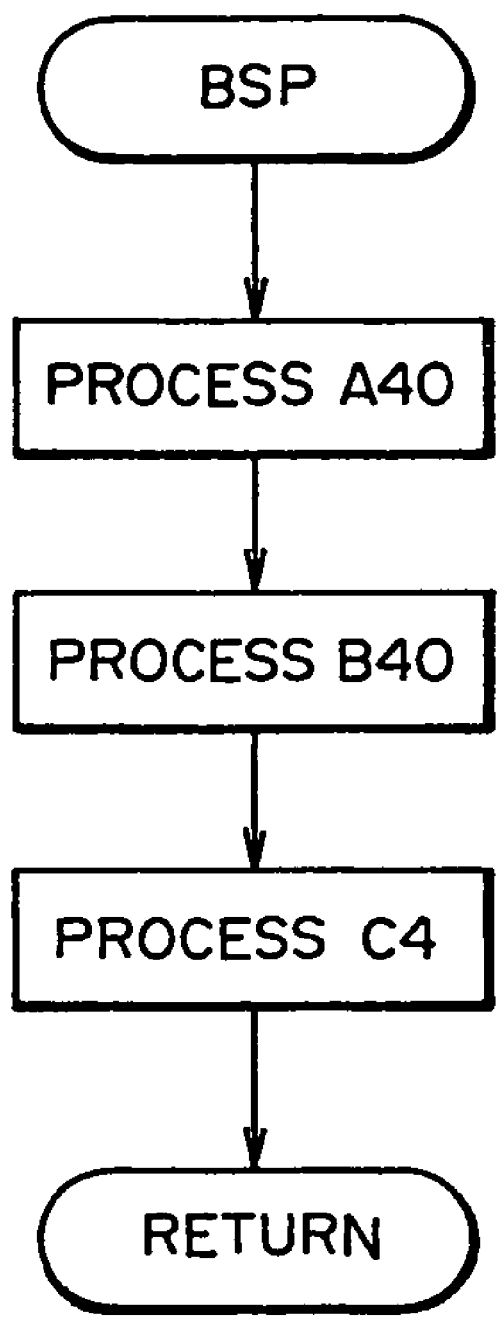
FIG. 10 is a flowchart for illustrating a command processing (back space block process) by the format controller in the magnetic tape controller according to the first embodiment.

FIG. 10 is a flowchart for illustrating a BSP process by the FMT 15 according to the first embodiment. FIG. 11 is a diagram in which a part (processes A40 and B40) of the flowchart shown in FIG. 10 is tabulated in order to explain the BSP process in more detail.

As shown in FIG. 10, the process A40, the process B40 and the process C4 are carried out in the BSP process by the FMT 15. The process C4 is the same as that described above with reference to FIGS. 190 and 191, descriptions of which are thus omitted. Hereinafter, the process A40 and the process B40 will be described in detail with reference to a control table (control matrix) shown in FIG. 11.

In the process A40, the FMT 15 refers to RAM 18 to recognize a value of ES and a value of EP. When recognizing that ES=0 and EP=−4 [cf. FIG. 3(A)], the FMT 15 makes the MTU 30 really carry out a back space operation (real BSP) for one data block, and subtracts 1 from a value of the real head position XBID in the register 15a. In the process B40, the FMT 15 holds ES=0 and EP=−4 in the RAM 18, and sets "0" to BLEN and "XBID" to BID in the FQL 16-4 (process ID=4000).

When recognizing that ES=1 and EP=−3 in the process A40 [cf. FIG. 3(B)], the FMT 15 makes the MTU 30 really carry out the back space operation (real BSP) for one data block, and subtracts 1 from a value of the real head position XBID in the register 15a. In the process B40, the FMT 15 updates ES to "0" and EP to "−4" in the RAM 18, and sets "0" to TM flag, "0" to BLEN and "XBID" to BID (process ID=4100).

When recognizing that ES=2 and EP=−2 in the process A40 [cf. FIG. 3(C)], or that ES=3 and EP=−1 in the process A40 [cf. FIG. 3(D)], the FMT 15 carries out, in the process A40 and the process B40, a process similar to the process of process ID=4100 described above (process ID=4200, 4300).

When recognizing that ES=4 and EP=−4 in the process A40 [cf. FIG. 3(E)], the FMT 15 re-positions the head at a position XBID+EP [position n in FIG. 3(E)] in the MTU 30, makes the MTU 30 really carry out the back space operation (real BSP) for one data block, and subtracts 1 from a value of the real head position XBID in the register 15a. In the process B40, the FMT 15 updates ES to "0" and holds EP at a value of "−4", besides setting "0" to TM flag, "0" to BLEN and "XBID" to BID in the FQL 16-4 (Process ID=4400).

When recognizing that ES=4 and EP=−3 in the process A40 [cf. FIG. 3(E)], the FMT 15 executes emulation of the MTU 30. In the process B40, the FMT 15 holds ES at a value of "4" and updates EP to "−4" in the RAM 18, besides setting "1" to TM flag, "0" to LBEN and "XBID+EP" to BID in the FQL 16-4 (process ID=4410).

When recognizing that ES=4 and EP=−2 in the process A40 [cf. FIG. 3(E)], the FMT 15 executes emulation of the MTU 30. In the process B40, the FMT 15 holds ES at a value of "4" and updates EP to "−3" in the RAM 18, besides setting "0" to TM flag, "0" to BLEN and "XBID+EP" to BID in the FQL 16-4 (process ID=4420).

When recognizing that ES=4 and EP=−1 in the process A40 [cf. FIG. 3(E)], the FMT 15 executes emulation of the MTU 30. In the process B40, the FMT 15 holds ES at a value of "4" and updates EP to "−2" in the RAM 18, besides setting "0" to TM flag, "0" to BLEN and "XBID+EP" to BID in the FQL 16-4 (process ID=4430).

When recognizing that ES=4 and EP=0 in the process A40 [cf. FIG. 3(E)], the FMT 15 executes emulation of the MTU 30. In the process B40, the FMT 15 holds ES at a value of "4" and updates EP to "−1" in the RAM 18, besides setting "1" to TM flag, "0" to BLEN and "XBID+EP" to BID in the FQL 16-4 (process ID=4440).

When recognizing that ES=5 and EP=+1 in the process A40 [cf. FIG. 3(F)], the FMT 15 makes the MTU 30 really carry out the back space operation (real BSP) for one data block, and subtracts 1 from a value of the real head position XBID in the register 15a. In the process B40, the FMT 15 updates ES to "6" and EP to "0", and sets "1" to TM flag, "0" to BLEN and "XBID" to BID in the FQL 16-4 (process ID=4500).

When recognizing that ES=6 and EP=−4 in the process A40 [cf. FIG. 3(G)], the FMT 15 carries out, in the process A40 and the process B40, a process similar to the process of process ID=4400 described above (process ID=4600).

When recognizing that ES=6 and EP=−3 in the process A40 [cf. FIG. 3(G)], the FMT 15 executes emulation of the MTU 30. In the process B40, the FMT 15 updates ES to "4" and EP to "−4" in the RAM 18, and sets "1" to TM flag, "0" to BLEN and "XBID+EP" to BID in the FQL 16-4 (process ID=4610).

When recognizing that ES=6 and EP=−2 in the process A40 [cf. FIG. 3(G)], the FMT 15 executes emulation of MTU 30. In the process B40, the FMT 15 updates ES to "4" and EP to "−3" in the RAM 18, and sets "0" to TM flag, "0" to BLEN and "XBID+EP" to BID in the FQL 16-4 (process ID=4620).

When recognizing that ES=6 and EP=−1 in the process A40 [cf. FIG. 3(G)], the FMT 15 executes emulation of MTU 30. In the process B40, the FMT 15 updates ES to "4" and EP to "−2" in the RAM 18, and sets "0" to TM flag, "0" to BLEN and "XBID+EP" to BID in the FQL 16-4 (process ID=4630).

When recognizing that ES=6 and EP=0 in the process A40 [cf. FIG. 3(G)], the FMT 15 executes emulation of the MTU 30. In the process B40, the FMT 15 updates ES to "4" and EP to "−1" in the RAM 18, and sets "1" to TM flag, "0" to BLEN and "XBID+EP" to BID in the FQL 16-4 (process ID=4640).

When recognizing that ES=6 and EP=+1 in the process A40 [cf. FIG. 3(G)], the FMT 15 executes emulation of the MTU 30. In the process B40, the FMT 15 updates ES to "4" and EP to "0" in the RAM 18, and sets "1" to TM flag, "0" to BLEN and "XBID+EP" to BID in the FQL 16-4 (process ID=4650).

[1-2-3-5] BSPF (Back Space File) Process

Figure 12:
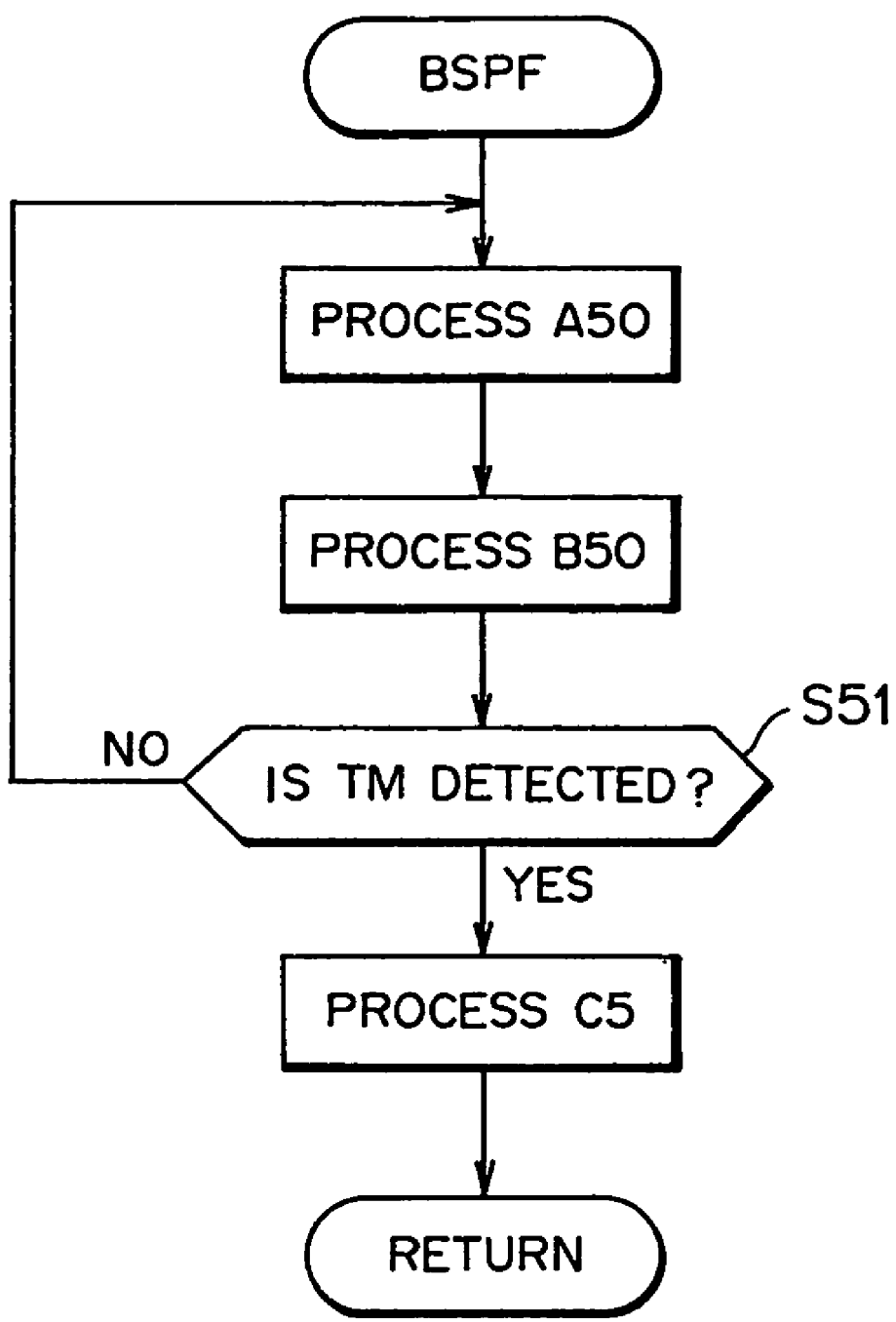
FIG. 12 is a flowchart for illustrating a command processing (back space file process) by the format controller in the magnetic tape controller according to the first embodiment.

FIG. 12 is a flowchart for illustrating a BSPF process by the FMT 15 in the MTC 10 according to the first embodiment. FIG. 13 is a diagram in which a part (processes A50 and B50) of the flowchart shown in FIG. 12 is tabulated in order to explain the BSPF process in more detail.

As shown in FIG. 12, the process A50 and the process B50 are repeatedly carried out until a tape mark TM is detected (until judged YES at Step S51) in the BSPF process by the FMT 15. When TM is detected (YES route at Step S51), a process C5 is carried out. The process C5 is the same as that described above with reference to FIGS. 192 and 193, descriptions of which are thus omitted. Hereinafter, the process A50 and the process B50 will be described with reference to a control table (control matrix) shown in FIG. 13.

As shown in FIG. 13, the process A50 and the process B50 are similar to the process A40 and the process B40 described above with reference to FIG. 11. Processes of process IDs=5000 to 5650 shown in FIG. 13 correspond to the processes of process IDs=4000 to 4650 shown in FIG. 11, respectively. Note that TM flag and BLEN are undetermined in FQL 16-4 in the process B50.

[1-2-3-6] SP (Forward Space File) Process

Figure 14:
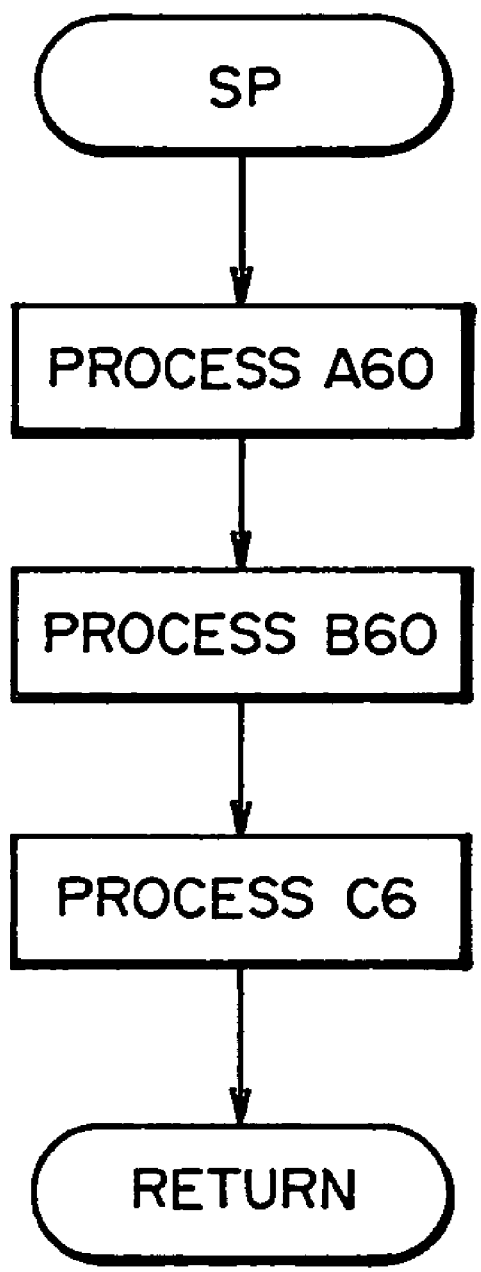
FIG. 14 is a flowchart for illustrating a command processing (forward space block process) by the format controller in the magnetic tape controller according to the first embodiment.

FIG. 14 is a flowchart for illustrating an SP process by the FMT 15 in the MTC 10 according to the first embodiment. FIG. 15 is a diagram in which a part (processes A60 and B60) of the flowchart shown in FIG. 14 is tabulated in order to explain the SP process in more detail.

As shown in FIG. 14, the process A60, the process B60 and a process C6 are carried out in the SP process by the FMT 15. The process C6 is the same as that described above with reference to FIGS. 194 and 195, descriptions of which are thus omitted. Hereinafter, the process A60 and the process B60 will be described with reference to a control table (control matrix) shown in FIG. 15.

As shown in FIG. 15, the process A60 and the process B60 are almost the same as the process A10 and the process B10 described above with reference to FIG. 5. Processes of process IDs=6000 to 6651 shown in FIG. 15 correspond to the processes of process IDs=1000 to 1651 shown in FIG. 5, respectively. Namely, the MTU 30 is generally required to carry out only the forward space operation for one data block in the SP process. However, according to the first embodiment, the MTU 30 is, in the SP process, made to carry out operations almost similar to those performed in the RD process.

Note that BLEN is undetermined in the FQL 16-4 in the process B60. In the processes of process IDs=6410, 6420, 6610 and 6620, the operation of writing data into the data buffer 17 from the RAM 18 performed in the processes of the process IDs=1410, 1420, 1610 and 1620 is omitted.

[1-2-3-7] FSPF (Forward Space File) Process

Figure 16:
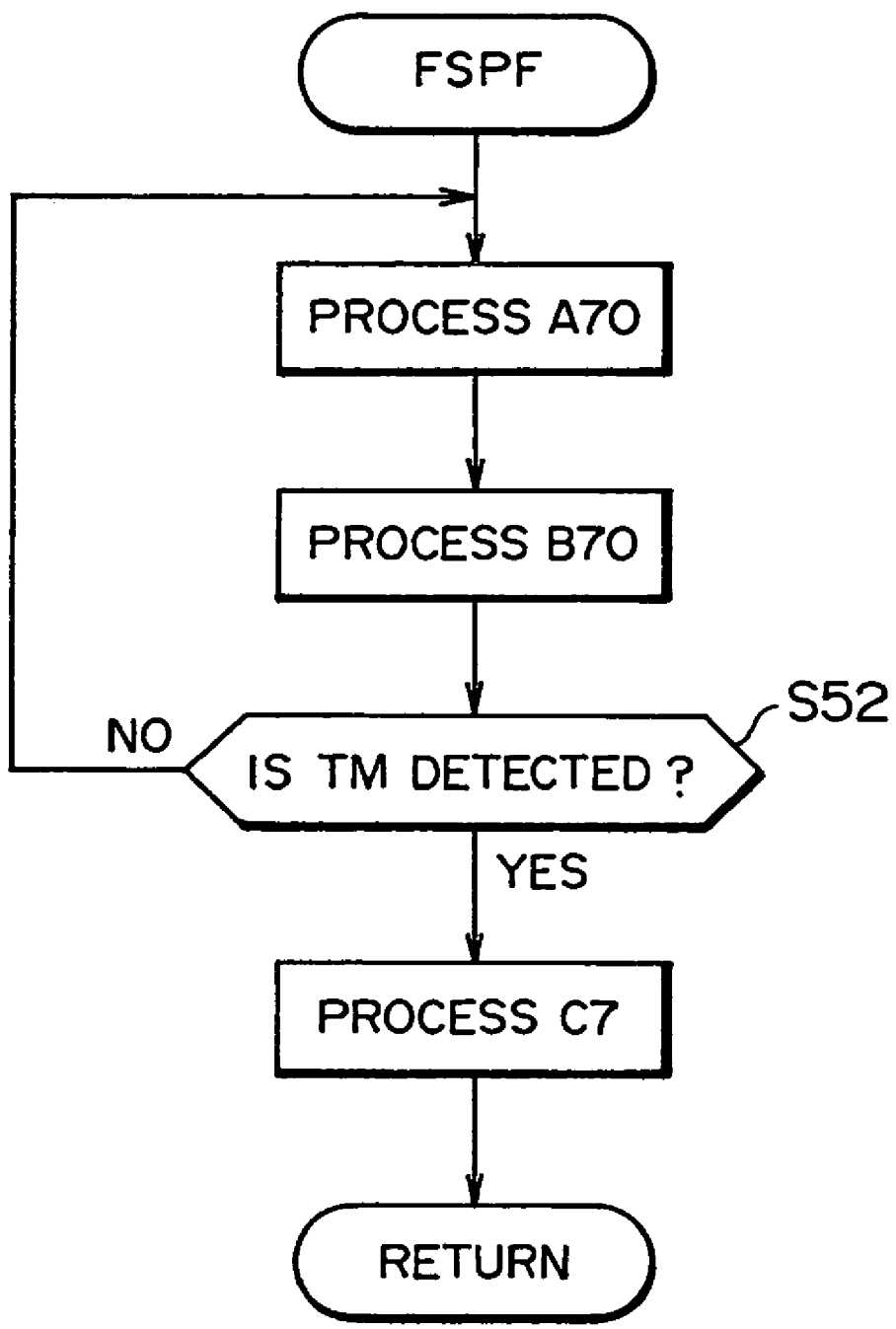
FIG. 16 is a flowchart for illustrating a command processing (forward space file process) by the format controller in the magnetic tape controller according to the first embodiment.

FIG. 16 is a flowchart for illustrating an FSPF process by the FMT 15 in the MTC 10 according to the first embodiment. FIG. 17 is a diagram in which a part (processes A70 and B70) of the flowchart shown in FIG. 16 is tabulated in order to explain the FSPF process in more detail.

As shown in FIG. 16, the process A70 and the process B70 are repeatedly carried out in the FSPF process by the FMT 15 until TM is detected (until judged YES at Step S51). When TM is detected (YES route at Step S52), the process C7 is carried out. The process C7 is the same as that described above with reference to FIGS. 196 and 197, descriptions of which are thus omitted. Hereinafter, the process A70 and the process B70 will be described with reference to a control table (control matrix) shown in FIG. 17.

As shown in FIG. 17, the process A70 and the process B70 are the same as the process A60 and the process B70 described above with reference to FIG. 15. Processes of process IDs=7000 to 7651 shown in FIG. 17 correspond to the processes of process IDs=5000 to 5651 shown in FIG. 15. Namely, the MTU 30 is generally required to carry out only the forward space operation for one data block in the FSPF process. However, according to the first embodiment, the MTU 30 is made to carry out operations almost similar to those performed in the RD process, in the FSPF process.

[1-2-3-8] WTM (Write Tape Mark) Process

Figure 18:
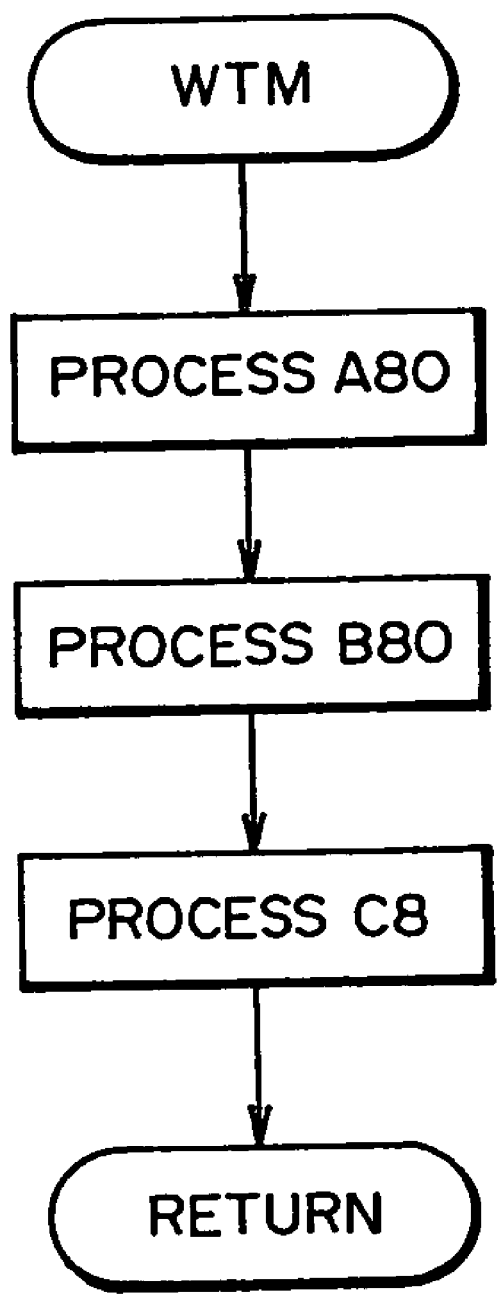
FIG. 18 is a flowchart for illustrating a command processing (write tape mark process) by the format controller in the magnetic tape controller according to the first embodiment.

FIG. 18 is a flowchart for illustrating a WTM process by the FMT 15 in the MTC 10 according to the first embodiment. FIG. 19 is a diagram in which a part (processes A80 and B80) of the flowchart shown in FIG. 18 is tabulated in order to explain the WTM process in more detail.

As shown in FIG. 18, the process A80, the process B80 and a process C8 are carried out in the WTM process by the FMT 15. The process C8 is the same as that described above with reference to FIGS. 198 and 199, descriptions of which are thus omitted. Hereinafter, the process A80 and the process B80 will be described in detail with reference to a control table (control matrix) shown in FIG. 19.

In the MTU 30, when a writing is carried out in response to a command in a write system (WR, WTM), an EOD (End Of DatA) mark is written after a written data block. Therefore, when a command in the write system is executed, the host (CPU 20) recognizes that there is no data block after a data block written in response to the command. In consequence, whenever a real write tape mark operation is carried out at the time that EP=−4, −3, −2 or +1, ES is updated to "1" and EP is updated to "−3", as will be described later with reference to FIG. 19.

In the process A80, the FMT 15 refers to the RAM 18 to recognize a value of ES and a value of EP. When recognizing that ES=0 and EP=−4 [cf. FIG. 3(A)], the FMT 15 makes the MTU 30 really carry out a write tape mark operation (real WTM), and adds 1 to a value of the real head position XBID in the register 15a. In the process B80, the FMT 15 updates ES to "1" and ES to "−3" in the RAM 18, and sets "1" to TM flag, "0" to BLEN and "XBID" to BID in the FQL 16-4 (process ID=8000).

When recognizing that ES=1 and EP=−3 in the process A80 [cf. FIG. 3(B)], the FMT 15 makes the MTU 30 really carry out the write tape mark operation (real WTM), and adds 1 to a value of the real head position XBID in the register 15a. In the process B80, the FMT 15 holds ES=1 and EP=−3 in the RAM 18, and sets "1" to TM flag, "0" to BLEN and "XBID" to BID in the FQL 16-4 (process ID=8100).

When recognizing that ES=2 and EP=−2 in the process A80 [cf. FIG. 3(C)], the FMT 15 carries out, in the process A80 and the process B80, a process similar to the process of process ID=8000 described above (process ID=8200).

When recognizing that ES=3 and EP=−1 in the process A80 [cf. FIG. 3(D)], the FMT 15 makes the MTU 30 really carry out the write tape mark operation (real WTM), and adds 1 to a value of the real head position XBID in the register 15a. In the process B80, the FMT 15 updates ES to "4" and EP to "0" in the RAM 18, and sets "1" to TM flag, "0" to BLEN and "XBID" to BID in the FQL 16-4 (process ID=8300).

When recognizing that ES=4 and EP=−4 in the process A80 [cf. FIG. 3(E)], the FMT 15 re-positions the head at a position XBID+EP [position n in FIG. 3(E)] in the MTU 30, makes the MTU 30 really carry out the write tape mark operation (real WTM), and adds 1 to a value of the real head position XBID in the register 15a. In the process B80, the FMT 15 updates ES to "1" and EP to "−3" in the RAM 18, and sets "1" to TM flag, "0" to BLEN and "XBID" to BID in the FQL 16-4 (process ID=8400).

When recognizing that ES=4 and EP=−3 in the process A80 [cf. FIG. 3(E)], the FMT 15 re-positions the head at a position XBID+EP [position n+1 in FIG. 3(E)] in the MTU 30, makes the MTU 30 really carry out the write tape mark operation (real WTM), and adds 1 to a value of the real head position XBID in the register 15a. In the process B80, the FMT 15 updates ES to "1" and holds EP at a value of "−3" in the RAM 18, besides setting "1" to TM flag, "0" to BLEN and "XBID" to BID in the FQL 16-4 (process ID=8410).

When recognizing that ES=4 and EP=−2 in the process A80 [cf. FIG. 3(E)], the FMT 15 re-positions the head at a position XBID+EP [position n+2 in FIG. 3(E)] in the MTU 30, makes the MTU 30 really carry out the write tape mark operation (real WTM), and adds 1 to a value of the real head position XBID in the register 15a. In the process B80, the FMT 15 updates ES to "1" and EP to "−3" in the RAM 18, and sets "1" to TM flag, "0" to BLEN and "XBID" to BID in the FQL 16-4 (process ID=8420).

When recognizing that ES=4 and EP=−1 in the process A80 [cf. FIG. 3(E)], the FMT 15 executes emulation of the MTU 30. In the process B80, the FMT 15 holds ES at a value of "4" and updates EP to "0" in the RAM 18, besides setting "1" to TM flag, "0" to BLEN and "XBID+EP" to BID in the FQL 16-4 (process ID=8430).

When recognizing that ES=4 and EP=0 in the process A80 [cf. FIG. 3(E)], the FMT 15 makes the MTU 30 really carry out the write tape mark operation (real WTM), and adds 1 to a value of the real head position XBID in the register 15a. In the process B80, the FMT 15 updates ES to "5" and EP to "+1" in the RAM 18, and sets "1" to TM flag, "0" to BLEN and "XBID" to BID in the FQL 16-4 (process ID=8440).

When recognizing that ES=5 and EP=+1 in the process A80 [cf. FIG. 3(F)], the FMT 15 makes the MTU 30 really carry out the write tape mark operation (real WTM), and adds 1 to a value of the real head position XBID in the register 15a. In the process B80, the FMT 15 updates ES to "1" and EP to "−3", and sets "1" to TM flag, "0" to BLEN and "XBID" to BID in the FQL 16-4 (process ID=8500).

When recognizing that ES=6 and EP=−4 in the process A80 [cf. FIG. 3(G)], the TMT 15 carries out, in the process A80 and the process B80, a process similar to the process of process ID=8400 described above (process ID=8600).

When recognizing that ES=6 and EP=−3 in the process A80 [cf. FIG. 3(G)], the FMT 15 carries out, in the process A80 and the process B80, a process similar to the process of process ID=8410 described above (process ID=8610).

When recognizing that ES=6 and EP=−2 in the process A80 [cf. FIG. 3(G)], the FMT 15 carries out, in the process A80 and the process B80, a process similar to the process of process ID=8420 described above (process ID=8620).

When recognizing that ES=6 and EP=−1 in the process A80 [cf. FIG. 3(G)], the FMT 15 re-positions the head at a position XBID+EP [position n+3 in FIG. 3(G)] in the MTU 30, makes the MTU 30 really carry out the write tape mark operation (real WTM), and adds 1 to a value of the real head position XBID in the register 15a. In the process B80, the FMT 15 updates ES to "1" and EP to "−3" in the RAM 18, and sets "1" to TM flag, "0" to BLEN and "XBID" to BID in the FQL 16-4 (process ID=8630).

When recognizing that ES=6 and EP=0 in the process A80 [cf. FIG. 3(G)], the FMT 15 executes emulation of the MTU 30. In the process B80, the FMT 15 holds ES at a value of "6" and updates EP to "+1" in the RAM 18, besides setting "1" to TM flag, "0" to BLEN and "XBID+EP" to BID in the FQL 16-4 (process ID=8640).

When recognizing that ES=6 and EP=+1 in the process A80 [cf. FIG. 3(G)], the FMT 15 re-positions the head at a position XBID+EP [position n+5 in FIG. 3(G)] in the MTU 30, makes the MTU 30 really carry out the write tape mark operation (real WTM), and adds 1 to a value of the real head position XBID in the register 15a. In the process B80, the FMT 15 updates ES to "1" and holds EP at a value of "−3" in the RAM 18, besides setting "1" to TM flag, "0" to BLEN and "XBID" to BID in the FQL 16-4 (process ID=8650).

[1-2-4] Emulation Executing Conditions

According to the first embodiment, emulation of the tape operation of the MTU 30 is executed by carrying out the processes of process IDs=1000 to 8650 described above with reference to FIGS. 4 through 19.

Now, emulation executing conditions according to the first embodiment will be described with reference to FIGS. 20 and 21. In FIGS. 20 and 21, there are summarized conditions applied when emulation of the MTU 30 is executed in the command processing described above with reference to FIGS. 4 through 19.

FIG. 20 shows a relation between a value of EP and a type of a command at the time that ES=4, at which emulation should be executed. As shown in FIG. 20, emulation executing conditions at the time that ES=4 are as follows:

In the case where any one of RB command, BSP command and BSPF command is executed when ES=4 and EP=0;

In the case where any one of RD command, RB command, BSP command, BSPF command, SP command, FSPF command and WTM command is executed when ES=4 and EP=−1;

In the case where any one of RD command, RB command, BSP command, BSPF command, SP command and FSPF command is executed when ES=4 and EP=−2;

In the case where any one of RD command, RB command, BSP command, BSPF command, SP command and FSPF command is executed when ES=4 and EP=−3; and In the case where any one of RD command, SP command and FSPF command is executed when ES=4 and EP=−4.

FIG. 21 shows a relation between a value of EP and a type of a command at the time that ES=6, at which emulation should be executed. As shown in FIG. 21, emulation executing conditions at the time that ES=6 are as follows:

In the case where any one of RB command, BSP command and BSPF command is executed when ES=6 and EP=+1;

In the case where any one of RD command, RB command, BSP command, BSPF command, SP command, FSPF command and WTM command is executed when ES=6 and EP=0;

In the case where any one of RD command, RB command, BSP command, BSPF command, SP command and FSPF command is executed when ES=6 and EP=−1;

In the case where any one of RD command, RB command, BSP command, BSPF command, SP command and FSPF command is executed when ES=6 and EP=−2;

In the case where any one of RD command, RB command, BSP command, BSPF command, SP command and FSPF command is executed when ES=6 and EP=−3; and In the case where any one of RD command, SP command and FSPF command is executed when ES=6 and EP=−4.

[1-3] Concrete Examples of Emulation Execution

Next, description will be made of concrete examples of emulation that is executed by applying the processes (process IDs=1000 to 8650) described above with reference to FIGS. 4 through 21 to the control process by the MTC 10, with reference to FIGS. 22 through 66.

[1-3-1] Example 1 of Emulation Execution

FIGS. 22(A) and 22(B) are diagrams showing a state of data writing on the magnetic tape MT, and for illustrating an example of commands issued from the CPU 20 when a multi-file is additionally written, and tape operations/emulation operations in the MTU 30 according to the first embodiment in response to the commands. The state of data writing on the magnetic tape MT, the commands issued from the CPU 20 and the tape operations (arrows) in the MTU 30 shown in FIGS. 22(A) and 22(B) are the same as those described above with reference to FIGS. 200(A) and 200(B).

Namely, the FIG. 22(A) shows a state of data writing on the magnetic tape MT immediately after a writing of a file consisting of a plurality of data blocks (data 1) on the magnetic tape MT is completed, similarly to FIG. 200(A). FIG. 22(B) shows a state of data writing on the magnetic tape MT after a file consisting of a plurality of data blocks (data 2) is additionally written in the state shown in FIG. 22(A), similarly to FIG. 200(B).

In FIGS. 22(A) and 22(B), each arrow designates a tape operation (a direction and a quantity of movement of the head H relative to the magnetic tape MT) performed in response to each command from the CPU 20, as well. Each arrow is given a type (capital letters) of command directing execution of a tape operation designated by the arrow. Further, the types of commands are given numbers in parentheses in the order the commands were issued from the CPU 20. Incidentally, the rightward direction signifies a tape forward direction, whereas the leftward direction signifies a tape backward direction, in FIGS. 22(A) and 22(B).

As shown in FIG. 22, after the last data block (data 1) of a certain file is written on the magnetic tape MT in response to a WR command [cf. (1)], the close process for the file is carried out [cf. (2) to (7)]. At this time, EOF1 is saved in the save area (SDT1) 18c and a block length thereof is also saved in the save area (SLN1) 18d when a WR command (3) is executed, according to the first embodiment. When a WR command (4) is executed, EOF1 is saved in the save area (SDT2) 18e and a block length thereof is also saved in the save area (SLN2) 18f. When finishing a writing of the file, the MTU 30 waits with the head H being located between the last two tape marks, TM-b and TM-c.

When the CPU 20 additionally writes the second file on the magnetic tape MT in which the file has been already written as shown in FIG. 22(A), the open process for the second file

[cf. (8) to (22)] is carried out. The OS (Operation System) actuated by the CPU 20 reads EOF1 two times to recognize the same when the file open process is carried out in the case of data writing, thereby issuing a command so as to recognize a position at which the file should be written.

When carrying out the open process [cf. (8) to (22) shown in FIGS. 22(A) and 22(B), the MTC 10 (FMT 15) emulates the command processing (8) to (19) enclosed by broken lines in the drawings, using the method according to the first embodiment. During which, the MTC 10 does not perform any mechanical operation with the head H being located between the last two tape marks, TM-b and TM-c, as shown in FIG. 22(A). According to the first embodiment, EOF1 having been saved in the save area (SDT1) 18c is read out and transferred to the CPU 20 via the data buffer 17 when emulation of an RD command (11) is executed.

Hereinafter, the command processing (1) to (24) shown in FIGS. 22(A) and 22(B) will be described in detail with reference to FIGS. 23 through 46.

(A) of FIGS. 23 through 46 shows a state of data block writing on the magnetic tape MT, a real head position (real pointer; XBID) and a virtual head position (EP) when each of the command processing (1) to (24) is carried out. (B) of FIGS. 23 through 46 shows a state of data saving/storing in the RAM 18 when each of the command processing (1) to (24) is carried out.

(1) WR Process

Figure 23A:
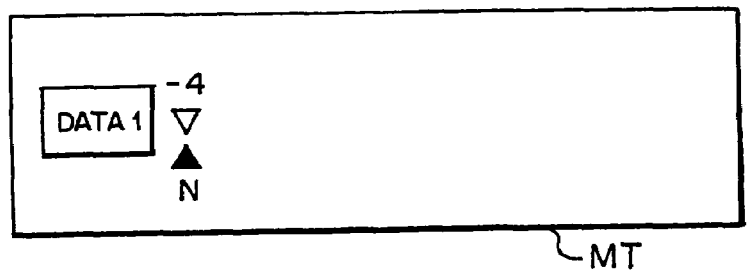
FIGS. 23(A) and 23(B) are diagrams for illustrating an operation [command processing (1) in FIG. 22(A)] according to the first embodiment, FIG. 23(A) showing a state of data writing on the magnetic tape, a real head position and a virtual head position, FIG. 23(B) showing a state of data saving/storing.
Figure 23B:
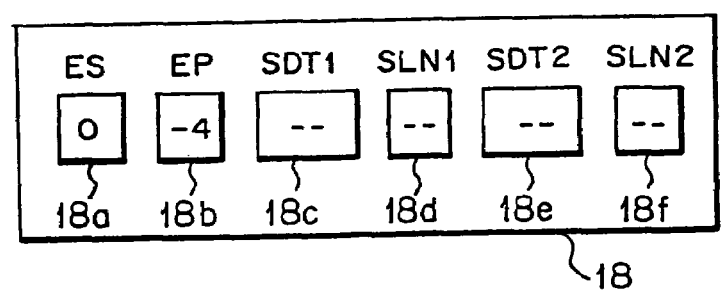

FIG. 23(A) shows a state in which the FMT 15 receives a WR command from the HIC 14, carries out a process of process ID=3000, completes a user data writing, then is about to shift to a the close process for a file. In which, the real head position (XBID) is N. At this time, EP and EP in the respective control areas 18a and 18b in the RAM 18 indicate the initial state (ES=0, EP=−4), as shown in FIG. 23(B). Incidentally, the save areas 18c to 18f in the RAM 18 indicate the undetermined state.

(2) WTM Process

Figure 24A:
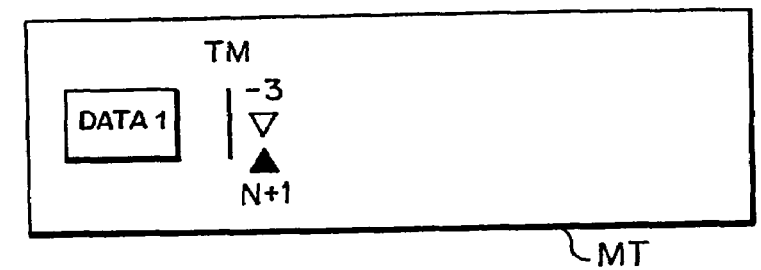
FIGS. 24(A) and 24(B) are diagrams for illustrating an operation [command processing (2) in FIG. 22(A)] according to the first embodiment, FIG. 24(A) showing a state of data writing on the magnetic tape, a real head position and a virtual head position, FIG. 24(B) showing a state of data saving/storing.
Figure 24B:
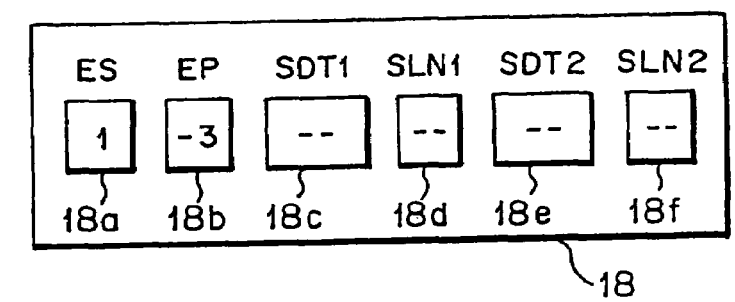

FIG. 24(A) shows a state in which the FMT 15 receives a WTM command at (2) in FIG. 22(A) from the HIC 14, carries out a process of process ID=8000, completes a writing of a tape mark TM-a so that the real head position (XBID) is N+1. At this time, "1" is held as ES in the control area 18a, whereas "−3" is held as EP in the control area 18b, as shown in FIG. 24(B).

(3) WR Process (EOF1 Write Process)

Figure 25A:
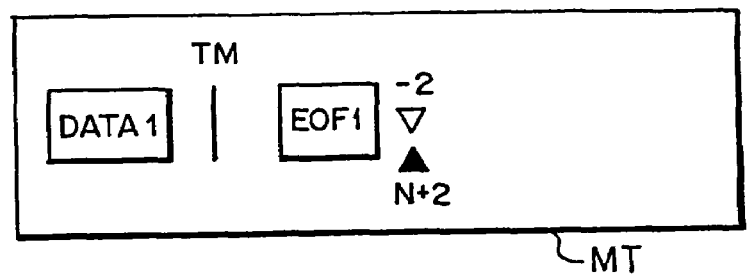
FIGS. 25(A) and 25(B) are diagrams for illustrating an operation [command processing (3) in FIG. 22(A)] according to the first embodiment, FIG. 25(A) showing a state of data writing on the magnetic tape, a real head position and a virtual head position, FIG. 25(B) showing a state of data saving/storing.
Figure 25B:
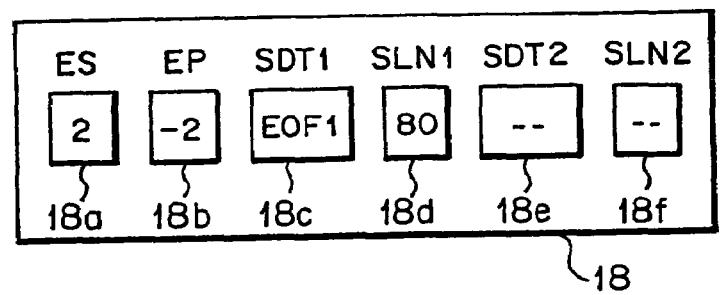

FIG. 25(A) shows a state in which the FMT 15 receives a WR command (direction to write EOF1) (3) in FIG. 22, carries out a process of process ID=3100, and completes a writing of EOF1, so that the real head position (XBID) is N+2. At this time, "2" is held as ES in the control area 18a, whereas "−2" is held as EP in the control area 18b, as shown in FIG. 25(B). EOF1 is stored in the save area (SDT1) 18c in the RAM 18, and a block length (80 bytes) thereof is stored in the save area (SLN1) 18d in the RAM 18. Thereafter, the EOF 1 and the block length thereof are held in the save areas 18c and 18d, respectively.

(4) WR Process (EOF2 Write Process)

Figure 26A:
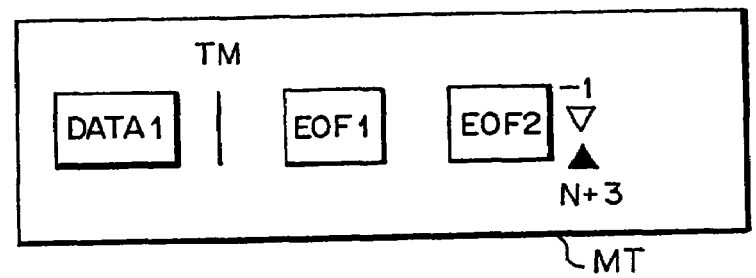
FIGS. 26(A) and 26(B) are diagrams for illustrating an operation [command processing (4) in FIG. 22(A)] according to the first embodiment, FIG. 26(A) showing a state of data writing on the magnetic tape, a real head position and a virtual head position, FIG. 26(B) showing a state of data saving/storing.
Figure 26B:
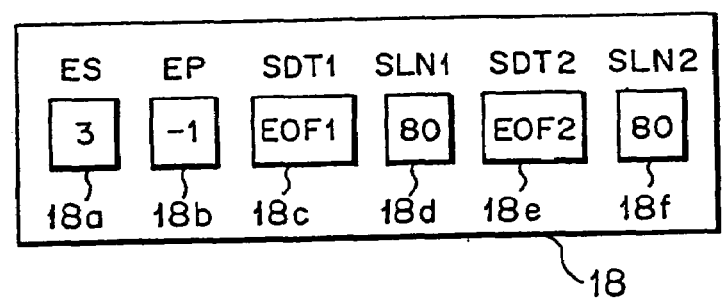

FIG. 26(A) shows a state in which the FMT 15 receives a WR command (direction to write EOF2) (4) in FIG. 22(A) from the HIC 14, carries out a process of process ID=3200, and completes a writing of EOF2 so that the real head position (XBID) is N+3. At this time, "3" is held as ES in the control area 18a, whereas "−1" is held as EP in the control area 18b, as shown in FIG. 26(B). EOF2 is stored in the save area (SDT2) 18e in the RAM 18, and a block length (80 bytes) thereof is stored in the save area (SLN2) 18f in the RAM 18. Thereafter, the EOF2 and the block length thereof are held in the save areas 18e and 18f, respectively.

(5) WTM Process

Figure 27A:
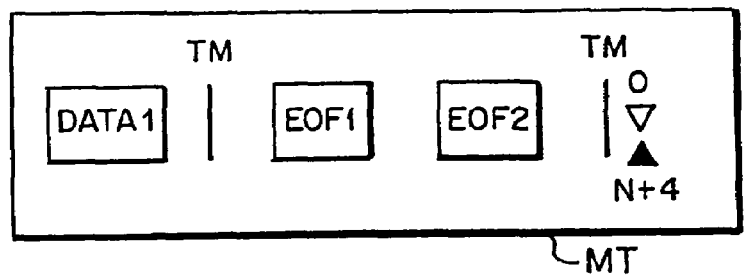
FIGS. 27(A) and 27(B) are diagrams for illustrating an operation [command processing (5) in FIG. 22(A)] according to the first embodiment, FIG. 27(A) showing a state of data writing on the magnetic tape, a real head position and a virtual head position, FIG. 27(B) showing a state of data saving/storing.
Figure 27B:
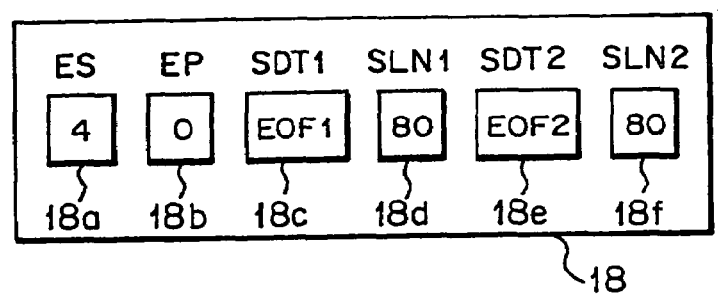

FIG. 27(A) shows a state in which the FMT 15 receives a WTM command (5) shown in FIG. 22(A) from the HIC 14, carries out a process of process ID=8300, and completes a writing of a tape mark TM-b so that the real head position (XBID) is N+4. At this time, "4" is held as ES in the control area 18a, whereas "0" is held as EP in the control area 18b, as shown in FIG. 27(B).

(6) WTM Process

Figure 28A:
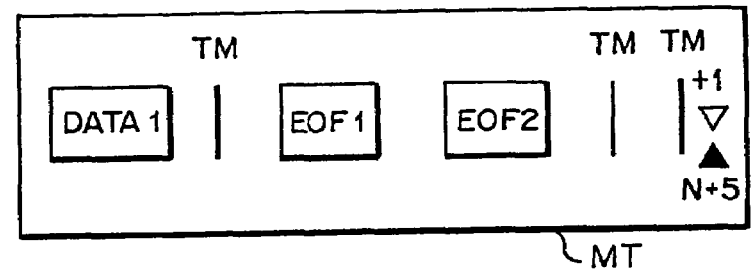
FIGS. 28(A) and 28(B) are diagrams for illustrating an operation [command processing (6) in FIG. 22(A)] according to the first embodiment, FIG. 28(A) showing a state of data writing on the magnetic tape, a real head position and a virtual head position, FIG. 28(B) showing a state of data saving/storing.
Figure 28B:
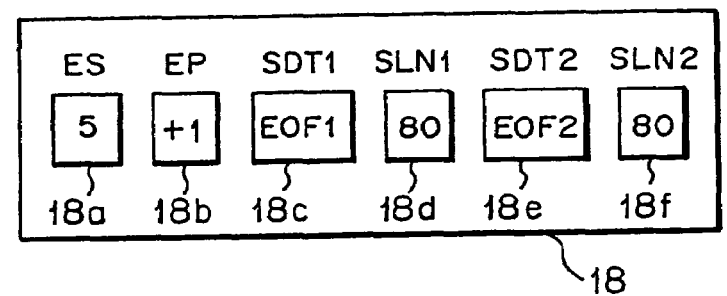

FIG. 28(A) shows a state in which the FMT 15 receives the WTM command (6) in FIG. 22(A) from the HIC 14, carries out a process of process ID=8440, and completes a writing of a tape mark TM-c so that the real head position (XBID) is N+5. At this time, "5" is held as ES in the control area 18a, whereas "+1" is held as EP in the control area 18b, as shown in FIG. 28(B).

(7) BSPF Process

Figure 29A:
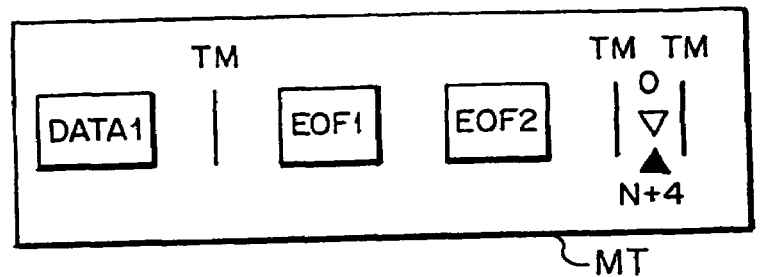
FIGS. 29(A) and 29(B) are diagrams for illustrating an operation [command processing (7) in FIG. 22(A)] according to the first embodiment, FIG. 29(A) showing a state of data writing on the magnetic tape, a real head position and a virtual head position, FIG. 29(B) showing a state of data saving/storing.
Figure 29B:
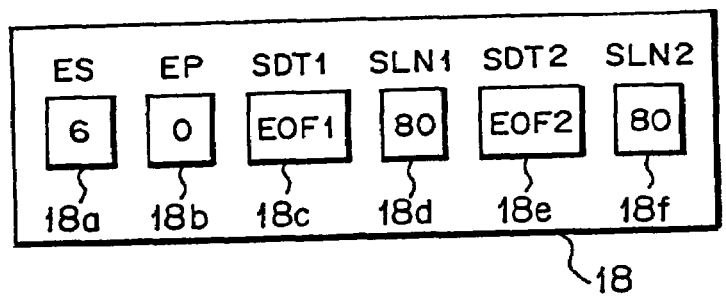

FIG. 29(A) shows a state in which the FMT 15 receives a BSPF command (7) shown in FIG. 22(A) from the HIC 14, carries out a process of process ID=5500, and completes the back space operation so that the real head position (XBID) is N+4. At this time, "6" is held as ES in the control area 18a, whereas "0" is held as EP in the control area 18b, as shown in FIG. 29(B).

(8) BSPF Process

Figure 30A:
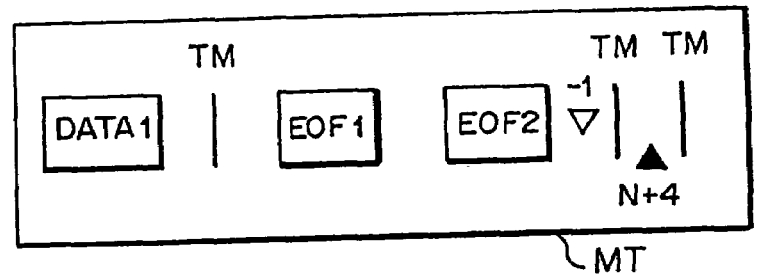
FIGS. 30(A) and 30(B) are diagrams for illustrating an operation [command processing (8) in FIG. 22(A)] according to the first embodiment, FIG. 30(A) showing a state of data writing on the magnetic tape, a real head position and a virtual head position, FIG. 30(B) showing a state of data saving/storing.
Figure 30B:
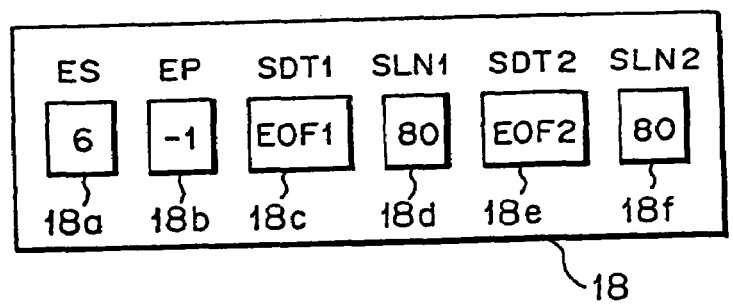

FIG. 30(A) shows a state in which the FMT 15 receives a BSPF command (8) shown in FIG. 22(A) from the HIC 14, and carries out a process of process ID=5640 so as to execute emulation. At this time, the real head position (XBID) is still N+4, not changed. As shown in FIG. 30(B), "6" is held as ES in the control area 18a, whereas "−1" is held as EP in the control area 18b. Further, XBID+EP=N+3 is registered as a value of BID in the FQL 16-4.

(9) BSPF Process

Figure 31A:
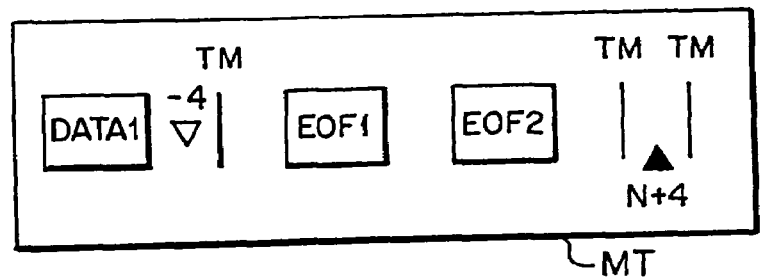
FIGS. 31(A) and 31(B) are diagrams for illustrating an operation [command processing (9) in FIG. 22(A)] according to the first embodiment, FIG. 31(A) showing a state of data writing on the magnetic tape, a real head position and a virtual head position, FIG. 31(B) showing a state of data saving/storing.
Figure 31B:
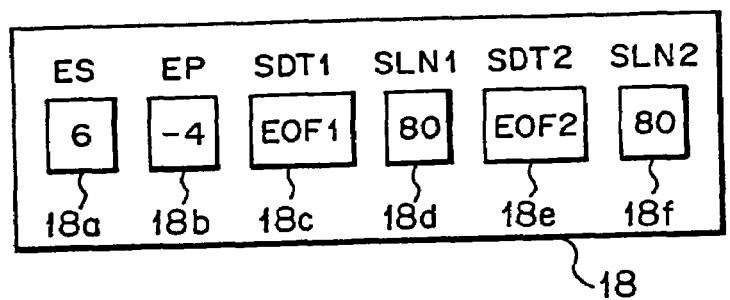

FIG. 31(A) shows a state in which the FMT 15 receives a BSPF command (9) shown in FIG. 22(A) from the HIC 14, and carries out processes of process IDs=5630, 5620 and 5610 in order so as to execute emulation. At this time, the real head position (XBID) is still N+4, not changed. As shown in FIG. 31(B), "6" of ES is kept in the control area 18a, whereas EP in the control area 18b is changed to "−2", "−3" and "−4" in order. As a value of BID in the FQL 16-4, XBID+EP=N is finally registered.

(10) FSPF Process

Figure 32A:
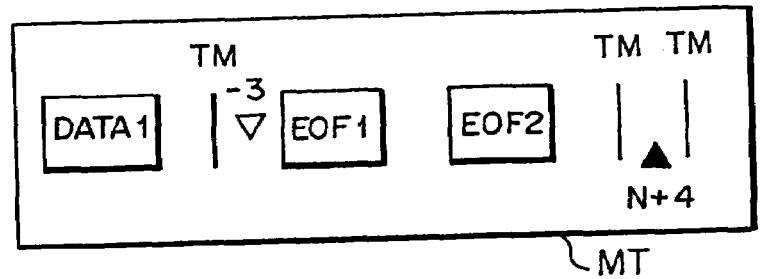
FIGS. 32(A) and 32(B) are diagrams for illustrating an operation [command processing (10) in FIG. 22(A)] according to the first embodiment, FIG. 32(A) showing a state of data writing on the magnetic tape, a real head position and a virtual head position, FIG. 32(B) showing a state of data saving/storing.
Figure 32B:
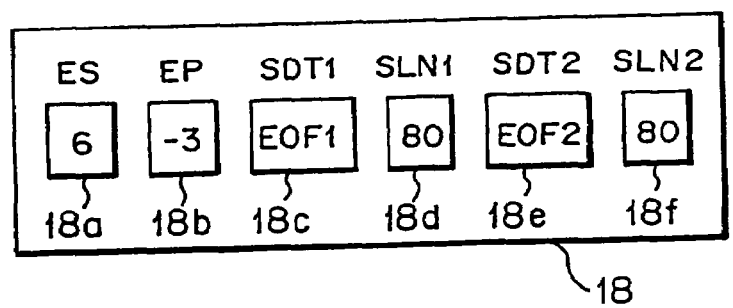

FIG. 32(A) shows a state in which the FMT 15 receives an FSPF command (10) shown in FIG. 22(A) from the HIC 14, carries out a process of process ID=7600 so as to execute emulation. At this time, the real head position (XBID) is still N+4, not changed. As shown in FIG. 32(B), "6" is held as ES in the control area 18a, whereas "−3" is held as EP in the control area 18b. Further, as a value of BID in the FQL 16-4, XBID+EP=N+1 is registered.

(11) RD Process

Figure 33A:
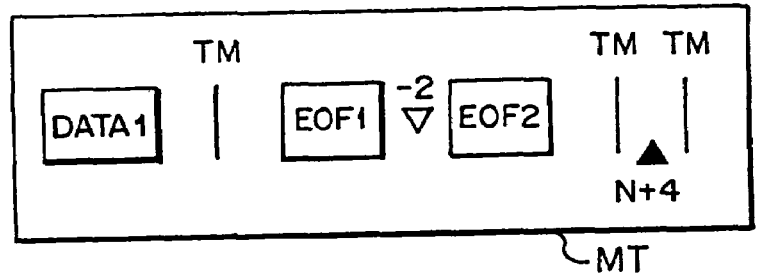
FIGS. 33(A) and 33(B) are diagrams for illustrating an operation [command processing (11) in FIG. 22(A)] according to the first embodiment, FIG. 33(A) showing a state of data writing on the magnetic tape, a real head position and a virtual head position, FIG. 33(B) showing a state of data saving/storing.
Figure 33B:
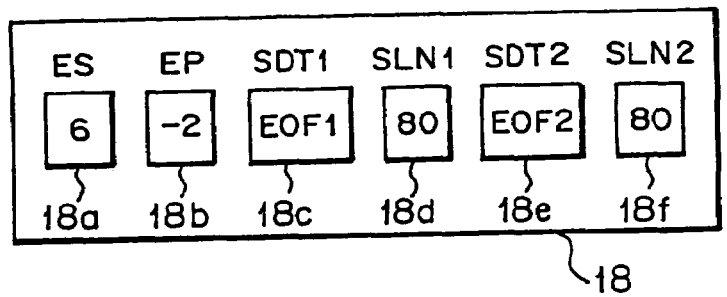

FIG. 33(A) shows a state in which the FMT 15 receives an RD command (11) shown in FIG. 22(A) from the HIC 14, and carries out a process of process ID=1610 so as to execute emulation. At this time, the real head position (XBID) is still N+4, not changed. AS shown in FIG. 33(B), "6" is held as ES in the control area 18a, whereas "−2" is held as EP in the control area 18b. When the emulation is executed, contents EOF1 in the save area 18c are stored in the data buffer 17, and transferred to the CPU 20. At that time, a value (80 bytes) in the save area 18d is registered as a block length in the FQL 16-4, and XBID+EP=N+2 is registered as a value of BID in the FQL 16-4.

(12) FSPF Process

Figure 34A:
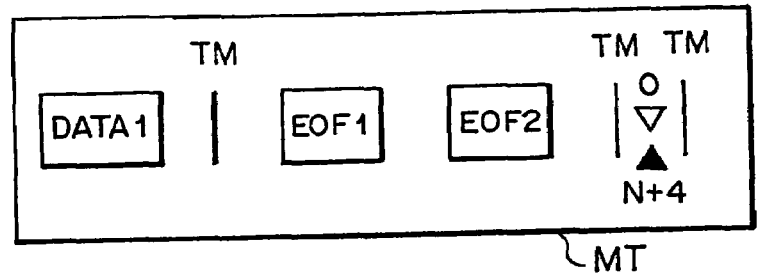
FIGS. 34(A) and 34(B) are diagrams for illustrating an operation [command processing (12) in FIG. 22(A)] according to the first embodiment, FIG. 34(A) showing a state of data writing on the magnetic tape, a real head position and a virtual head position, FIG. 34(B) showing a state of data saving/storing.
Figure 34B:
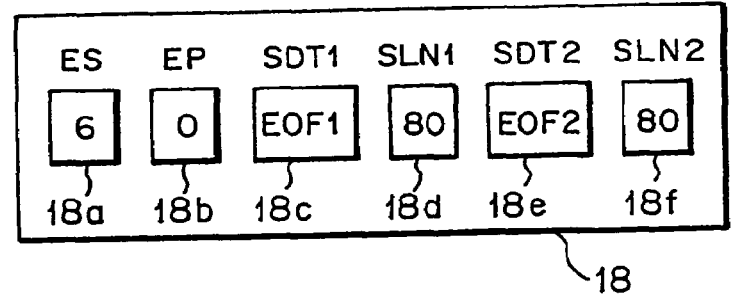

FIG. 34(A) shows a state in which the FMT 15 receives an FSPF command (12) shown in FIG. 22(A) from the HIC 14, and carries out processes of process IDs=7620 and 7630 in order so as to execute emulation. At this time, the real head position (XBID) is still N+4, not changed. As shown in FIG. 34(B), ES is held at a value of "6" in the save area 18a, whereas EP in the control area 18b is changed to "−1" and "0" in order. As a value of BID in the FQL 16-4, XBID+EP=N+4 is finally registered.

(13) RD Process

Figure 35A:
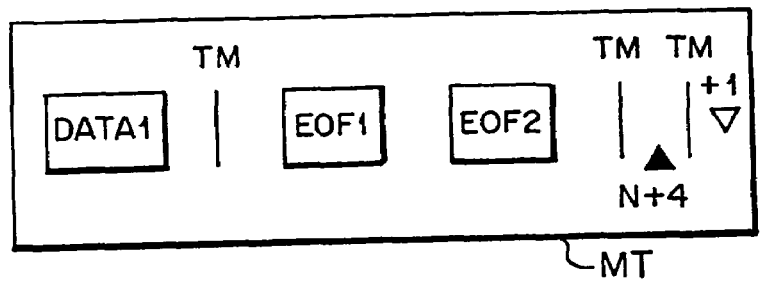
FIGS. 35(A) and 35(B) are diagrams for illustrating an operation [command processing (13) in FIG. 22(A)] according to the first embodiment, FIG. 35(A) showing a state of data writing on the magnetic tape, a real head position and a virtual head position, FIG. 35(B) showing a state of data saving/storing.
Figure 35B:
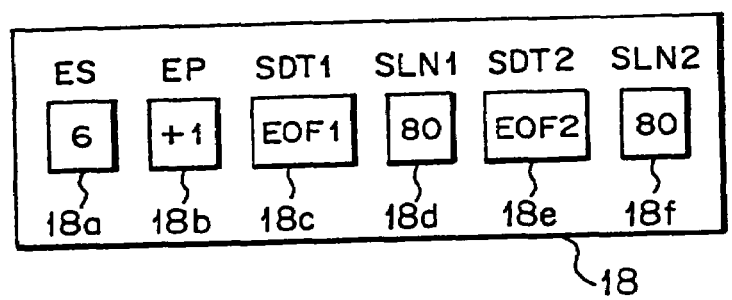

FIG. 35(A) shows a state in which the FMT 15 receives an RD command (13) shown in FIG. 22(A) from the HIC 14, and carries out a process of process ID=1640 so as to execute emulation. At this time, the real head position (XBID) is still N+4, not changed. As shown in FIG. 35(B), "6" is held as ES in the control area 18a, whereas "+1" is held as EP in the control area 18b. When the emulation is executed, "1" is set to a flag indicating tape mark detection in the FQL 16-4, and XBID+EP=N+2 is registered as a value of BID in the FQL 16-4.

(14) BSPF Process

Figure 36A:
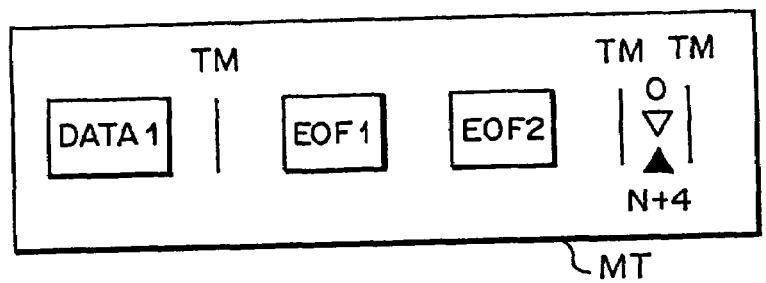
FIGS. 36(A) and 36(B) are diagrams for illustrating an operation [command processing (14) in FIG. 22(A)] according to the first embodiment, FIG. 36(A) showing a state of data writing on the magnetic tape, a real head position and a virtual head position, FIG. 36(B) showing a state of data saving/storing.
Figure 36B:
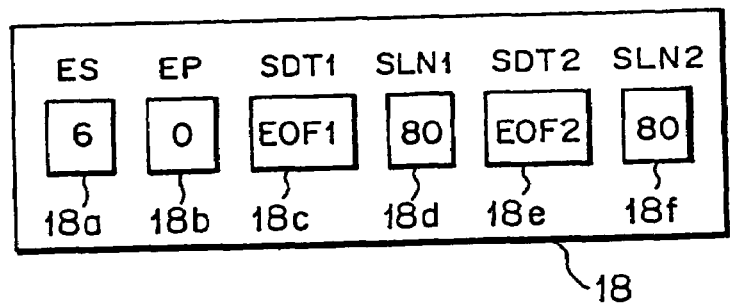

FIG. 36(A) shows a state in which the FMT receives a BSPF command (14) shown in FIG. 22(A) from the HIC 14, and carries out a process of process ID=5650 so as to execute emulation. At this time, the real head position (XBID) is still N+4, not changed. As shown in FIG. 36(B), "6" is held as ES in the control area 18a, whereas "0" is held as EP in the control area 18b. Further, XBID+EP=N+4 is registered as a value of BID in the FQL 16-4.

(15) BSPF Process

Figure 37A:
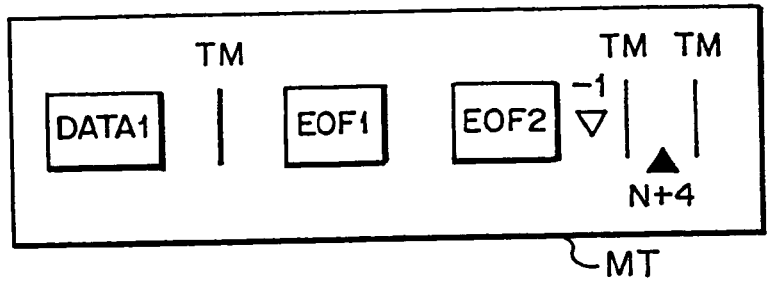
FIGS. 37(A) and 37(B) are diagrams for illustrating an operation [command processing (15) in FIG. 22(A)] according to the first embodiment, FIG. 37(A) showing a state of data writing on the magnetic tape, a real head position and a virtual head position, FIG. 37(B) showing a state of data saving/storing.
Figure 37B:
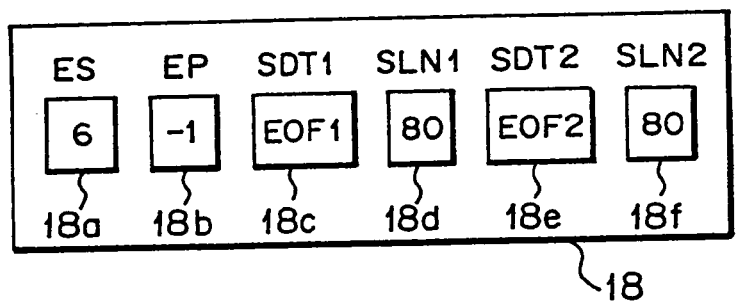

FIG. 37(A) shows a state in which the FMT 15 receives a BSPF command (15) shown in FIG. 22(A) from the HIC 14, and carries out a process of process ID=5640 so as to execute emulation. At this time, the real head position (XBID) is still N+4, not changed. As shown in FIG. 37(B), "6" is held as ES in the control area 18a, whereas "−1" is held as EP in the control area 18b. Further, XBID+EP=N+3 is registered as a value of BID in the FQL 16-4.

(16) BSPF Process

Figure 38A:
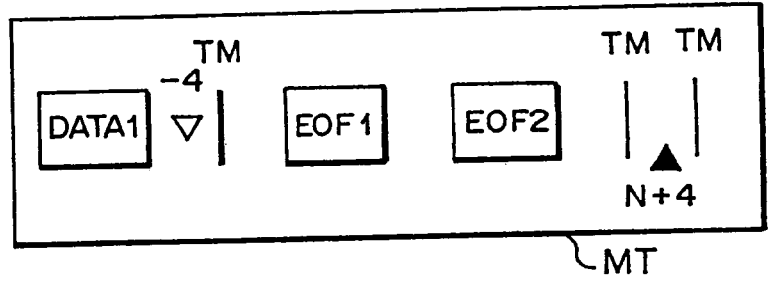
FIGS. 38(A) and 38(B) are diagrams for illustrating an operation [command processing (16) in FIG. 22(A)] according to the first embodiment, FIG. 38(A) showing a state of data writing on the magnetic tape, a real head position and a virtual head position, FIG. 38(B) showing a state of data saving/storing.
Figure 38B:
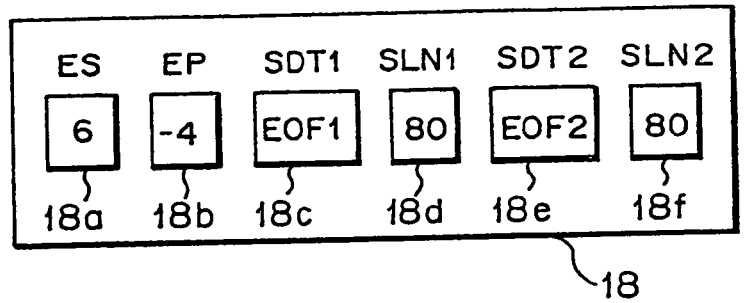

FIG. 38(A) shows a state in which the FMT 15 receives a BSPF command (16) shown in FIG. 22(A) from the HIC 14, and carries out processes of process IDs=5630, 5620 and 5610 in order so as to execute emulation. At this time, the real head position (XBID) is still N+4, not changed. As shown in FIG. 38(B), ES is held at a value of "6" in the control area 18a, whereas EP in the control area 18b is changed to "−2", "−3" and "−4" in order. XBID+EP=N is finally registered as a value of BID in FQL 16-4.

(17) FSPF Process

Figure 39A:
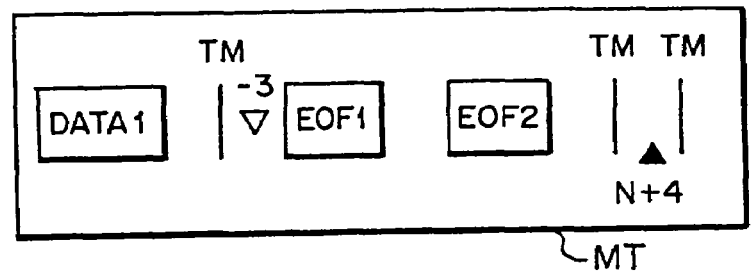
FIGS. 39(A) and 39(B) are diagrams for illustrating an operation [command processing (17) in FIG. 22(B)] according to the first embodiment, FIG. 39(A) showing a state of data writing on the magnetic tape, a real head position and a virtual head position, FIG. 39(B) showing a state of data saving/storing.
Figure 39B:
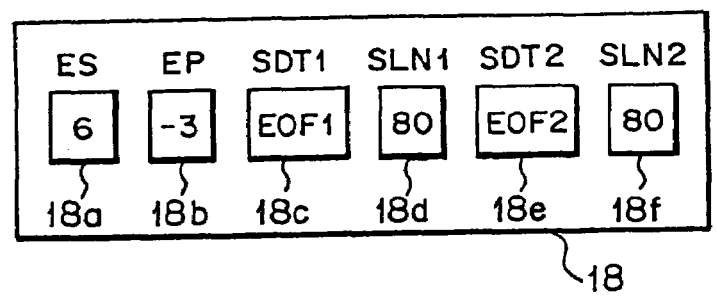

FIG. 39(A) shows a state in which the FMT 15 receives an FSPF command (17) shown in FIG. 22(B) from the HIC 14, and carries out a process of process ID=7600 so as to execute emulation, as does in the command process (10). At this time, the real head position (XBID) is still N+4, not changed. As shown in FIG. 39(B), "6" is held as ES in the control area 18a, whereas "−3" is held as EP in the control area 18b. Further, XBID+EP=N+1 is registered as a value of BID in the FQL 16-4.

(18) RD Process

Figure 40A:
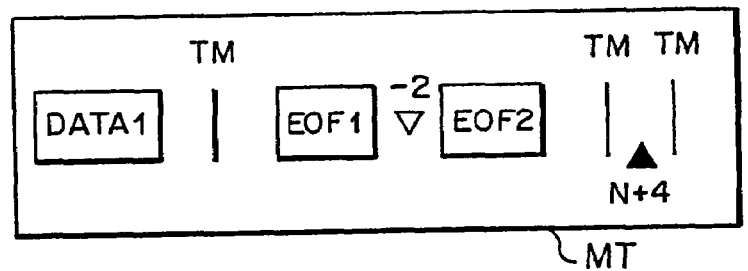
FIGS. 40(A) and 40(B) are diagrams for illustrating an operation [command processing (18) in FIG. 22(B)] according to the first embodiment, FIG. 40(A) showing a state of data writing on the magnetic tape, a real head position and a virtual head position, FIG. 40(B) showing a state of data saving/storing.
Figure 40B:
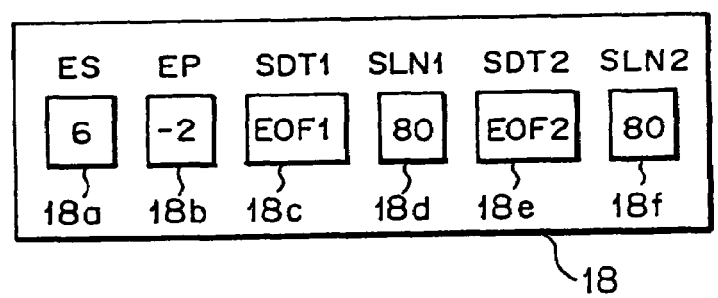

FIG. 40(A) shows a state in which the FMT 15 receives an RD command (18) shown in FIG. 22(B) from the HIC 14, and carries out a process of process ID=1610 so as to execute emulation, as does in the command process (11). At this time, the real head position (XBID) is still N+4, not changed. As shown in FIG. 40(B), "6" is held as ES in the control area 18a, whereas "−2" is held as EP in the control area 18b. When the emulation is executed, contents EOF1 in the save area 18c are again stored in the data buffer 17, then transferred to the CPU 2. On that occasion, a value (80 bytes) in the save area 18d is registered as a block length in the FQL 16-4, and XBID+EP=N+2 is registered as a value of BID in the FQL 16-4.

(19) FSPF Process

Figure 41A:
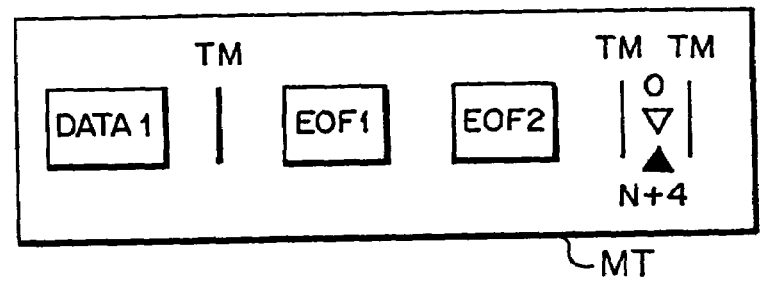
FIGS. 41(A) and 41(B) are diagrams for illustrating an operation [command processing (19) in FIG. 22(B)] according to the first embodiment, FIG. 41(A) showing a state of data writing on the magnetic tape, a real head position and a virtual head position, FIG. 41(B) showing a state of data saving/storing.
Figure 41B:
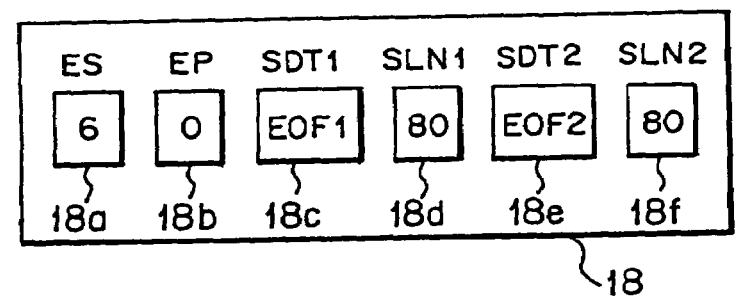

FIG. 41(A) shows a state in which the FMT 15 receives an FSPF command (19) shown in FIG. 22(B) from the HIC 14, and carries out processes of process IDs=7620 and 7630 in order so as to execute emulation, as does in the command process (12). At this time, the real head position (XBID) is still N+4, not changed. As shown in FIG. 41(B), ES is held at a value of "6" in the control area 18a, whereas EP in the control area 18b is changed to "−1" and "0" in order. As a value of BID in the FQL 16-4, XBID+EP=N+4 is finally registered.

(20) WR Process

Figure 42A:
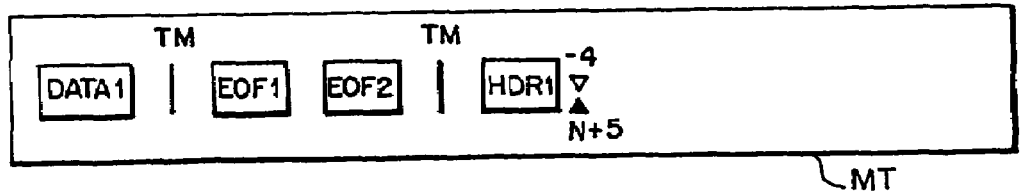
FIGS. 42(A) and 42(B) are diagrams for illustrating an operation [command processing (20) in FIG. 22(B)] according to the first embodiment, FIG. 42(A) showing a state of data writing on the magnetic tape, a real head position and a virtual head position, FIG. 42(B) showing a state of data saving/storing.
Figure 42B:
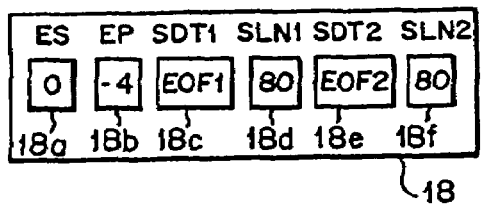

FIG. 42(A) shows a state in which the FMT 15 receives a WR command (direction to write HDR1) (20) shown in FIG. 22(B), carries out a process of process ID=3641, and completes the writing of HDR1 so that the real head position (XBID) is N+5. At this time, "0" is held as ES in the control area 18a, whereas "−4" is held as EP in the control area 18b, as shown in FIG. 42(B). As a value of BID in the FQL 16-4, XBID=N+5 is registered.

(21) WR Process (HRD2 Write Process)

Figure 43A:
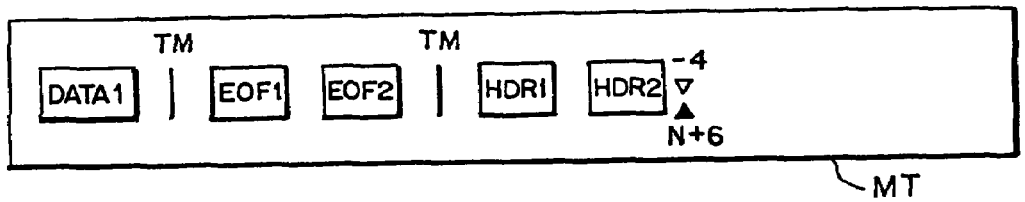
FIGS. 43(A) and 43(B) are diagrams for illustrating an operation [command processing (21) in FIG. 22(B)] according to the first embodiment, FIG. 43(A) showing a state of data writing on the magnetic tape, a real head position and a virtual head position, FIG. 43(B) showing a state of data saving/storing.
Figure 43B:
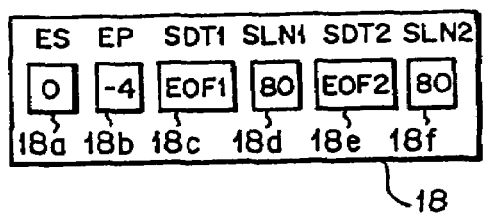

FIG. 43(A) shows a state in which the FMT 15 receives a WR command (direction to write HDR2) (21) shown in FIG. 22(B) from the HIC 14, carries out a process of process ID=3000, and completes the writing of HRD2 so that the real head position (XBID) is N+6. At this time, "0" is held as ES in the control area 18a, whereas "−4" is held as EP in the control area 18b, as shown in FIG. 43(B). As a value of BID in the FQL 16-4, XBID=N+6 is registered.

(22) WTM Process

Figure 44A:
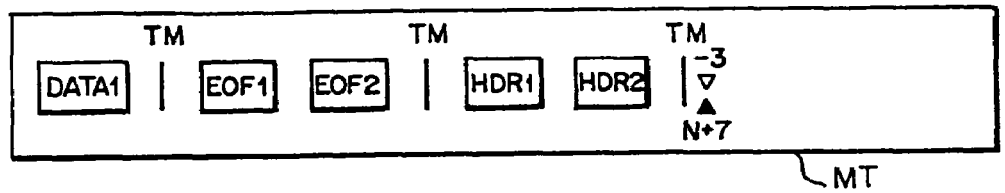
FIGS. 44(A) and 44(B) are diagrams for illustrating an operation [command processing (22) in FIG. 22(B)] according to the first embodiment, FIG. 44(A) showing a state of data writing on the magnetic tape, a real head position and a virtual head position, FIG. 44(B) showing a state of data saving/storing.
Figure 44B:
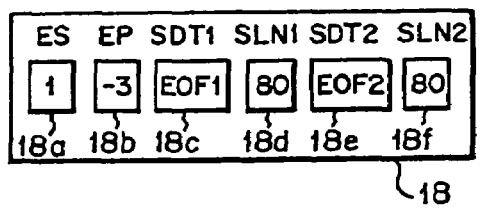

FIG. 44(A) shows a state in which the FMT 15 receives a WTM command (22) shown in FIG. 22(B) from the HIC 14, carries out a process of process ID=8000, and completes the writing of a tape mark TM-d so that the real head position (XBID) is N+7. At this time, "1" is held as ES in the control area 18a, whereas "−3" is held as EP in the control area 18a, as shown in FIG. 44(B). As a value of BID in the FQL 16-4, XBID=N+7 is registered.

(23) WR Process

Figure 45A:
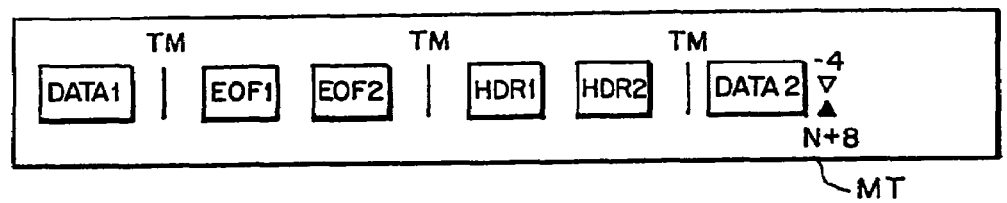
FIGS. 45(A) and 45(B) are diagrams for illustrating an operation [command processing (23) in FIG. 22(B)] according to the first embodiment, FIG. 45(A) showing a state of data writing on the magnetic tape, a real head position and a virtual head position, FIG. 45(B) showing a state of data saving/storing.
Figure 45B:
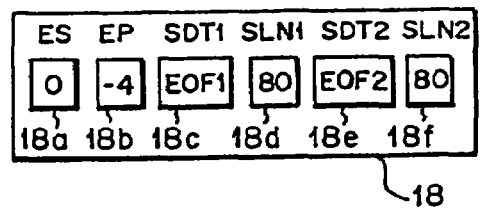

FIG. 45(A) shows a state in which the FMT 15 receives a WR command (direction to write data 2) (21) shown in FIG. 22(B) from the HIC 14, carries out a process of process ID=3101, and completes a writing of data 2 so that the real head position (XBID) is N+8. At this time, "0" is held as ES in the control area 18a, whereas "−4" is held as EP in the control area 18b, as shown in FIG. 45(B). As a value of BID in FQL 16-4, XBID=N+8 is registered.

(24) WR Process

Figure 46A:
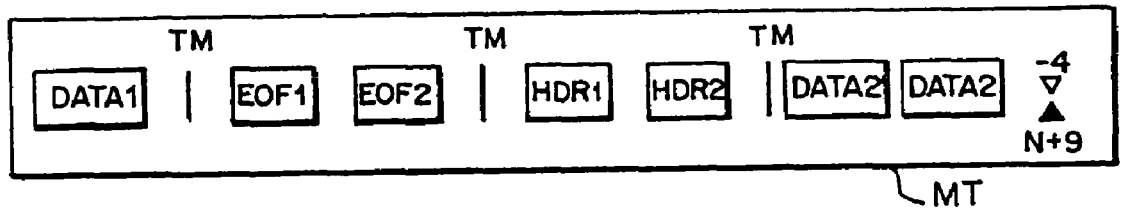
FIGS. 46(A) and 46(B) are diagrams for illustrating an operation [command processing (24) in FIG. 22(B)] according to the first embodiment, FIG. 46(A) showing a state of data writing on the magnetic tape, a real head position and a virtual head position, FIG. 46(B) showing a state of data saving/storing.
Figure 46B:
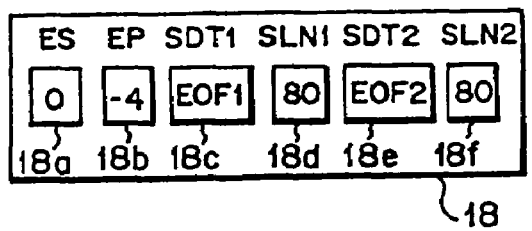

FIG. 46(A) shows a state in which the FMT 15 receives a WR command (direction to write data 2) (24) shown in FIG. 22(B) from the HIC 14, carries out a process of process ID=3000, and completes a writing of data 2 so that the real head position (XBID) is N+9. At this time, "0" is held as ES in the control area 18*a*, whereas "–4" is held as EP in the control area 18*b*. As a value of BID in the FQL 16-4, XBID=N+9 is registered.

[1-3-2] Example 2 of Emulation Execution

FIG. 47 is a diagram for illustrating a state of data writing on the magnetic tape MT, an example of commands issued from the CPU 20 when data is read out from two consecutive files, and tape operations/emulation operations in the MTU 30 according to the first embodiment performed in response to the commands. The state of data writing on the magnetic tape MT, the commands issued from the CPU 20 and the tape operations (arrows) in the MTU 30 are the same as those described above with reference to FIG. 201.

Namely, FIG. 47 shows a state of data writing on the magnetic tape MT when two files are successively written, similarly to FIG. 201.

In FIG. 47, each arrow indicates a tape operation (a direction and a quantity of movement of the head H relative to the magnetic tape MT) performed in response to a corresponding command from the CPU 20. A type of command (capital letters) directing execution of the tape operation indicated by each arrow is given to the arrow. Further, the types of the commands are given numbers in parentheses, (1) to (13), in the order the commands were issued from the CPU 20. Incidentally, the rightward direction signifies a tape forward direction, whereas the leftward direction signifies a tape backward direction, in FIG. 47.

As shown in FIG. 47, after the last data block (data 1) of the first file is read out from the magnetic tape MT according to an RD command [cf. (1)], the close process [cf. (2), (3)] is carried out.

When an FSPF command (3) is executed, a real read operation is carried out in the forward space operation in the MTU 30 to read EOF1 and EOF2, the EOF1 and a block length thereof are saved in the save area (SDT1) 18*c* and the save area (SLN1) 18*d*, respectively, whereas EOF2 and a block length thereof are saved in the save area (SDT2) 18*e* and the save area (SLN2) 18*f*, respectively, according to the first embodiment.

When the close operation is completed, the MTU 30 waits with the head H being located at the leading position (between TM-b and HDR1) of the second file. The open process for the second file [cf. (4) to (11)] is carried out. Wherein, the OS (Operating System) actuated by the CPU 20 reads once EOF1 to recognize the same, thereby issuing a command so as to confirm a position at which the second file is read out, when the file open process is carried out in order to read data.

When the open process [cf. (4) to (11)] shown in FIG. 47 is carries out, the MTC 10 (FMT 15) emulates the command processing (4) to (8) enclosed by a broken line in the drawing, using the method according to the first embodiment. During which, the MTC 10 does not perform any mechanical operation with the head H being stopped at the leading position (between TM-b and HDR1) of the second file, as shown in FIG. 47. According to the first embodiment, EOF1 having been saved in the save area (SDT1) 18*c* is read out and transferred to the CPU 20 via the data buffer 17, when emulation is executed in response to an RD command (7).

Hereinafter, command processing (1) to (13) shown in FIG. 47 will be described in detail with reference to FIGS. 48 through 60.

(A) of FIGS. 48 through 60 shows a state of data block writing on the magnetic tape MT, a real head position (real pointer: XBID) and a virtual head position (EP), when each of the command processing (1) to (13) is carried out. (B) of FIGS. 48 through 60 shows a state of data saving/storing in the RAM 18, when each of the command processing (1) to (13) is carried out.

(1) RD Process

Figure 48A:
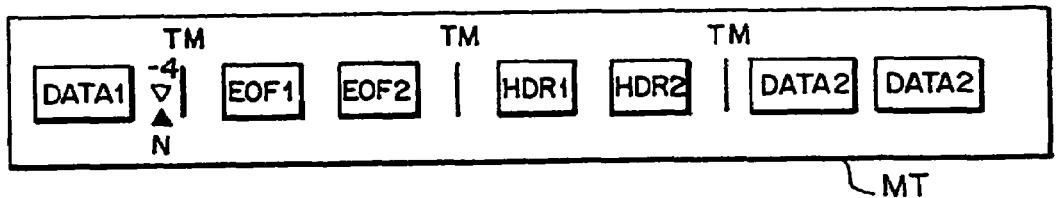
FIGS. 48(A) and 48(B) are diagrams for illustrating an operation [command processing (1) in FIG. 47] according to the first embodiment, FIG. 48(A) showing a state of data writing on the magnetic tape, a real head position and a virtual head position, FIG. 48(B) showing a state of data saving/storing.
Figure 48B:
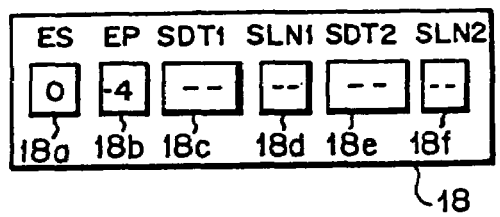

FIG. 48(A) shows a state in which the FMT 15 receives an RD command (1) shown in FIG. 47 from the HIC 14, carries out a process of process ID=1001, completes a reading of the last data block (data 1) of the first file, and is about to shift to the close process for the file. At this time, the real head position (XBID) is N. As shown in FIG. 48(B), ES and EP in the respective control areas 18*a* and 18*b* at this time indicate the initial state (ES=0, EP=–4). Incidentally, each of the save areas 18*c* to 18*f* in the RAM 18 indicates the undetermined state. As a value of BID in the FQL 16-4, XBID=N is registered.

(2) FSPF Process

Figure 49A:
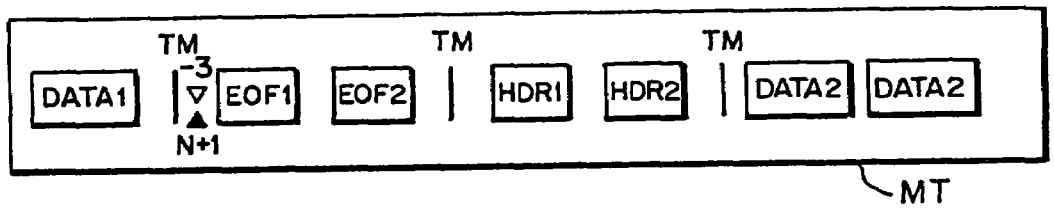
FIGS. 49(A) and 49(B) are diagrams for illustrating an operation [command processing (2) in FIG. 47] according to the first embodiment, FIG. 49(A) showing a state of data writing on the magnetic tape, a real head position and a virtual head position, FIG. 49(B) showing a state of data saving/storing.
Figure 49B:
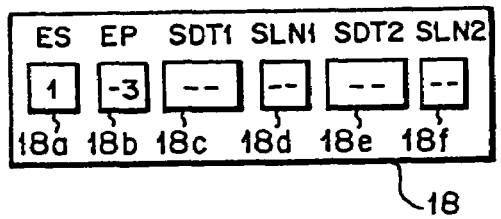

FIG. 49(A) shows a state in which the FMT 15 receives an FSPF command (2) shown in FIG. 47 from the HIC 14, carries out a process of process ID=7000, and completes the forward space operation so that the real head position (XBID) is N+1. At this time, "1" is held as ES in the control area 18*a*, whereas "–3" is held as EP in the control area 18*b*, as shown in FIG. 49(B). Further, as a value of BID in the FQL 16-4, XBID=N+1 is registered.

(3) FSPF Process

Figure 50A:
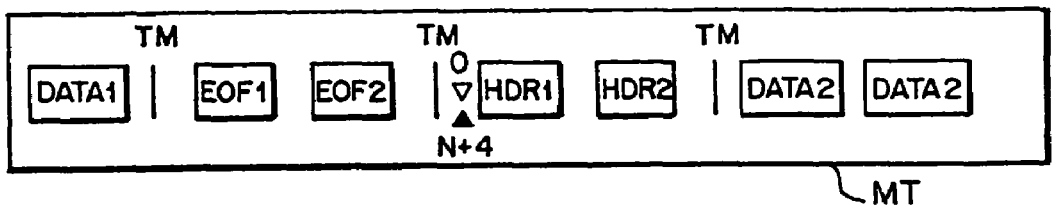
FIGS. 50(A) and 50(B) are diagrams for illustrating an operation [command processing (3) in FIG. 47] according to the first embodiment, FIG. 50(A) showing a state of data writing on the magnetic tape, a real head position and a virtual head position, FIG. 50(B) showing a state of data saving/storing.
Figure 50B:
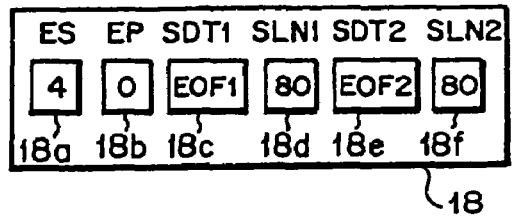

FIG. 50(A) shows a state in which the FMT 15 receives an FSPF command (3) shown in FIG. 47 from the HIC 14, carries out processes of process IDs=7100, 7200 and 7300 in order, and completes the real read operation (operation to read EOF1 and EOF2) in the forward space operation in the MTU 30 so that the real head position (XBID) is N+4. At this time, ES and EP in the control areas 18*a* and 18*b* are changed to (ES=2, EP=–2), (ES=3, EP=–1), and (ES=4, EP=0) in order. Finally, "4" is held as ES in the control area 18*a*, whereas "0" is held as EP in the control area 18*b*. EOF1 is stored in the save area (SDT1) 18C in the RAM 18, and a block length (80 bytes) thereof is stored in the save area (SLN1) 18*d* in the RAM 18. EOF2 is stored in the save area (SDT2) 18*e* in the RAM 18, and a block length (80 bytes) thereof is stored in the save area (SLN2) 18*f* in the RAM 18. Thereafter, EOF1 and a block length thereof are held in the save areas 18*c* and 18*d*, respectively, whereas EOD2 and a block length thereof are held in the save areas 18*e* and 18*f*, respectively. As a value of BID in the FQL 16-4, XBID=N+4 is finally registered.

(4) BSPF Process

Figure 51A:
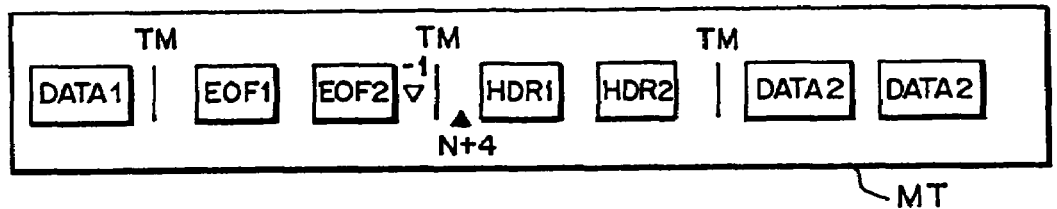
FIGS. 51(A) and 51(B) are diagrams for illustrating an operation [command processing (4) in FIG. 47] according to the first embodiment, FIG. 51(A) showing a state of data writing on the magnetic tape, a real head position and a virtual head position, FIG. 51(B) showing a state of data saving/storing.
Figure 51B:
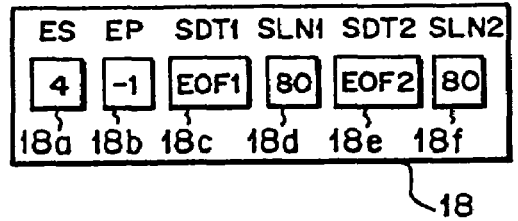

FIG. 51(A) shows a state in which the FMT 15 receives a BSPF command (4) shown in FIG. 47 from the HIC 14, and carries out a process of process ID=5440 so as to execute emulation. At this time, the real head position (XBID) is still N+4, not changed. As shown in FIG. 51(B), "4" is held as ES in the control area 18*a*, whereas "–1" is held as EP in the control area 18*b*. Further, as a value of BID in the FQL 16-4, XBID+EP=N+3 is registered.

(5) BSPF Process

Figure 52A:
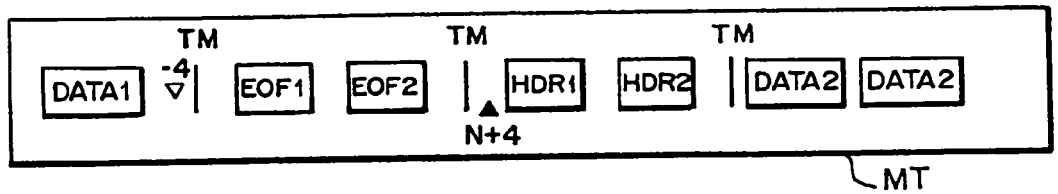
FIGS. 52(A) and 52(B) are diagrams for illustrating an operation [command processing (5) in FIG. 47] according to the first embodiment, FIG. 52(A) showing a state of data writing on the magnetic tape, a real head position and a virtual head position, FIG. 52(B) showing a state of data saving/storing.
Figure 52B:
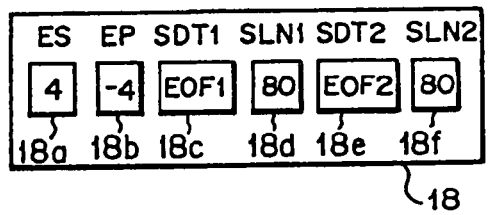

FIG. 52(A) shows a state in which the FMT 15 receives a BSPF command (5) shown in FIG. 47 from the HIC 14, and carries out processes of process IDs=5430, 5420 and 5410 in order so as to execute emulation. At this time, the real head position (XBID) is still N+4, not changed. As shown in FIG. 52(B), ES in the control area 18*a* is held at a value of "4", whereas EP in the control area 18*b* is changed to "–2", "–3" and "–4" in order. As a value of BID in the FQL 16-4, XBID+EP=N is finally registered.

(6) FSPF Process

Figure 53A:
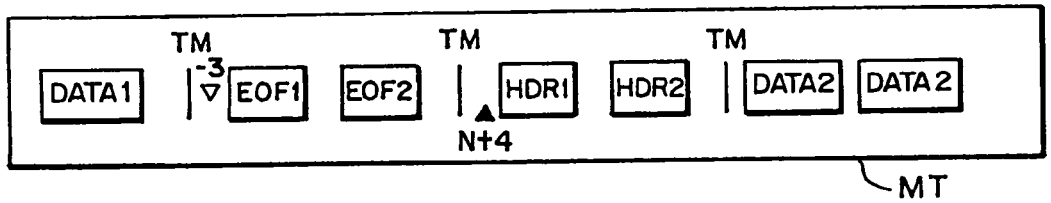
FIGS. 53(A) and 53(B) are diagrams for illustrating an operation [command processing (6) in FIG. 47] according to the first embodiment, FIG. 53(A) showing a state of data writing on the magnetic tape, a real head position and a virtual head position, FIG. 53(B) showing a state of data saving/storing.
Figure 53B:
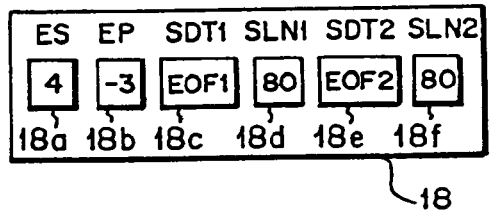

FIG. 53(A) shows a state in which the FMT 15 receives an FSPF command (6) shown in FIG. 47 from the HIC 14, and carries out a process of process ID=7400 so as to execute emulation. At this time, the real head position (XBID) is still N+4, not changed. As shown in FIG. 53(B), "4" is held as ES in the control area 18a, whereas "−3" is held as EP in the control area 18b. Further, as a value of BID in the FQL 16-4, XBID+EP=N+1 is registered.

(7) RD Process

Figure 54A:
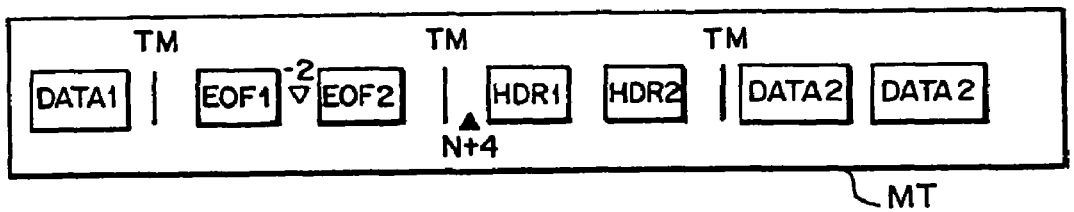
FIGS. 54(A) and 54(B) are diagrams for illustrating an operation [command processing (7) in FIG. 47] according to the first embodiment, FIG. 54(A) showing a state of data writing on the magnetic tape, a real head position and a virtual head position, FIG. 54(B) showing a state of data saving/storing.
Figure 54B:
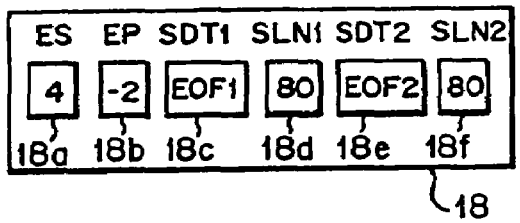

FIG. 54(A) shows a state in which the FMT 15 receives an RD command (7) shown in FIG. 47 from the HIC 14, and carries out a process of process ID=1410 so as to execute emulation. At this time, the real head position (XBID) is still N+4, not changed. As shown in FIG. 54(B), "4" is held as ES in the control area 18a, whereas "−2" is held as EP in the control area 18b. When the emulation is executed, contents EOF1 in the save area 18c are stored in the data buffer 17, then transferred to the CPU 20. At that time, a value (80 bytes) in the save area 18d is registered as a block length in the FQL 16-4, and XBID+EP=N+2 is registered as a value of BID in the FQL 16-4.

(8) FSPF Process

Figure 55A:
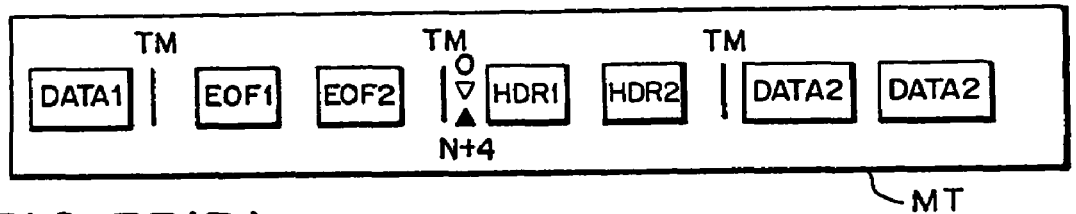
FIGS. 55(A) and 55(B) are diagrams for illustrating an operation [command processing (8) in FIG. 47] according to the first embodiment, FIG. 55(A) showing a state of data writing on the magnetic tape, a real head position and a virtual head position, FIG. 55(B) showing a state of data saving/storing.
Figure 55B:
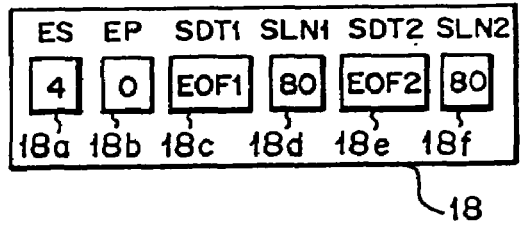

FIG. 55(A) shows a state in which the FMT 15 receives an FSPF command (8) shown in FIG. 47 from the HIC 14, and carries out processes of process IDs=7420 and 7430 in order so as to execute emulation. At this time, the real head position (XBID) is still N+4, not changed. As shown in FIG. 55(B), ES in the control area 18a is held at a value of "4", whereas EP in the control area 18b is changed to "−1" and "0" in order. As a value of BID in the FQL 16-4, XBID+EP=N+4 is finally registered.

(9) RD Process

Figure 56A:
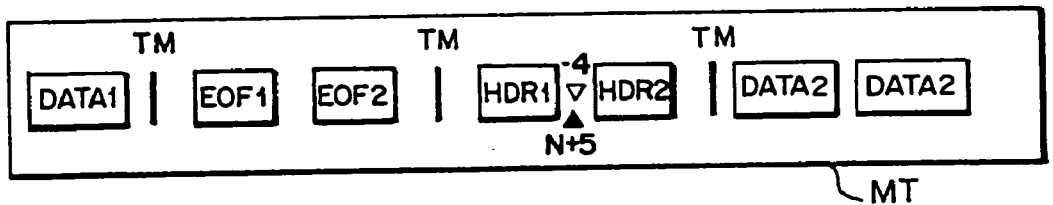
FIGS. 56(A) and 56(B) are diagrams for illustrating an operation [command processing (9) in FIG. 47] according to the first embodiment, FIG. 56(A) showing a state of data writing on the magnetic tape, a real head position and a virtual head position, FIG. 56(B) showing a state of data saving/storing.
Figure 56B:
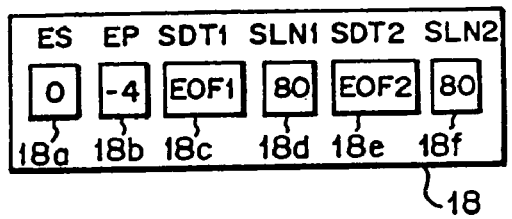

FIG. 56(A) shows a state in which the FMT 15 receives an RD command (9) shown in FIG. 47 from the HIC 14, carries out a process of process ID=1442, and completes a reading of HDR1 so that the real head position (XBID) is N+5. As shown in FIG. 56(B), "0" is held as ES in the control area 18a, whereas "−4" is held as EP in the control area 18b, at this time. As a value of BID in the FQL 16-4, XBID=N+5 is registered.

(10) RD Process

Figure 57A:
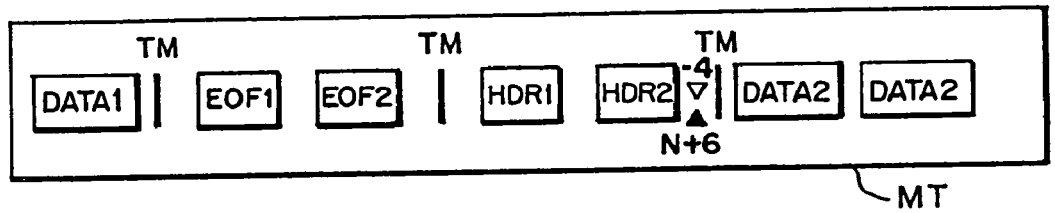
FIGS. 57(A) and 57(B) are diagrams for illustrating an operation [command processing (10) in FIG. 47] according to the first embodiment, FIG. 57(A) showing a state of data writing on the magnetic tape, a real head position and a virtual head position, FIG. 57(B) showing a state of data saving/storing.
Figure 57B:
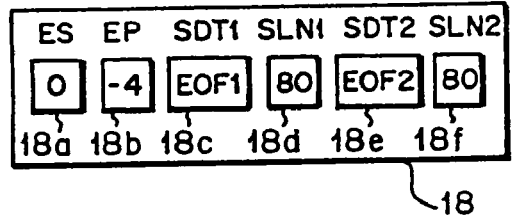

FIG. 57(A) shows a state in which the FMT 15 receives an RD command (10) shown in FIG. 47 from the HIC 14, carries out a process of process ID=1001, and completes a reading of HDR2 so that the real head position (XBID) is N+6. As shown in FIG. 57(B), "0" is held as ES in the control area 18b, whereas "−4" is held as EP in the control area 18b, at this time. As a value of BID in the FQL 16-4, XBID=N+6 is registered.

(11) FSPF Process

Figure 58A:
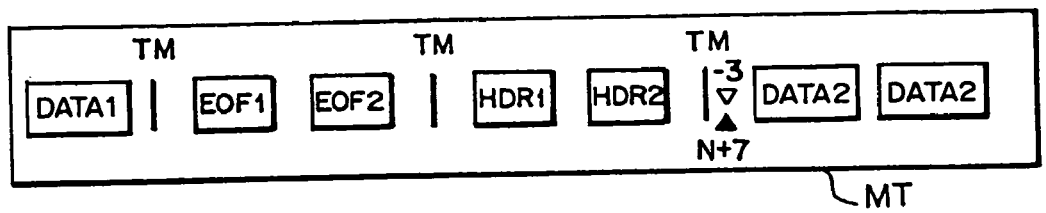
FIGS. 58(A) and 58(B) are diagrams for illustrating an operation [command processing (11) in FIG. 47] according to the first embodiment, FIG. 58(A) showing a state of data writing on the magnetic tape, a real head position and a virtual head position, FIG. 58(B) showing a state of data saving/storing.
Figure 58B:
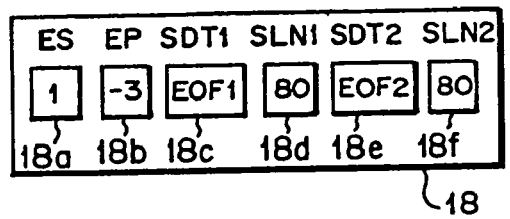

FIG. 58(A) shows a state in which the FMT 15 receives an FSPF command (11) shown in FIG. 47 from the HIC 14, carries out a process of process ID=7000, and completes the forward space operation so that the real head position (XBID) is N+7. As shown in FIG. 58(B), "1" is held as ES in the control area 18a, whereas "−3" is held as EP in the control area 18b, at this time. Further, as a value of BID in the FQL 16-4, XBID=N+7 is registered.

(12) RD Process

Figure 59A:
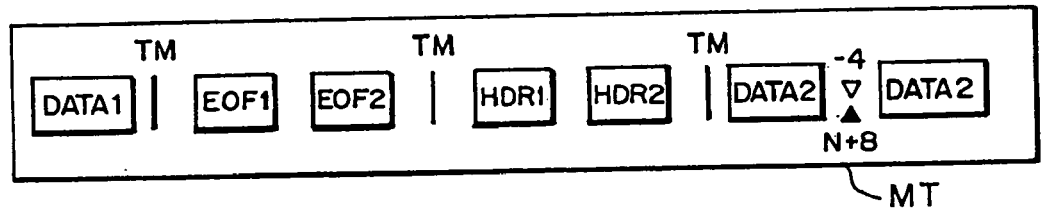
FIGS. 59(A) and 59(B) are diagrams for illustrating an operation [command processing (12) in FIG. 47] according to the first embodiment, FIG. 59(A) showing a state of data writing on the magnetic tape, a real head position and a virtual head position, FIG. 59(B) showing a state of data saving/storing.
Figure 59B:
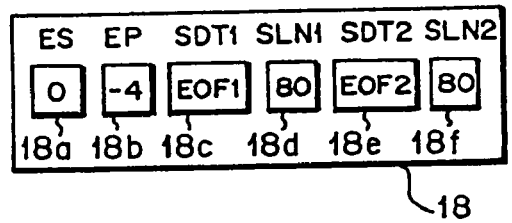

FIG. 59(A) shows a state in which the FMT 15 receives an RD command (12) shown in FIG. 47 from the HIC 14, carries out a process of process ID=1102, and completes a reading of data 2 so that the real head position (XBID) is N+8. As shown in FIG. 59(B), "0" is held as ES in the control area 18a, whereas "−4" is held as EP in the control area 18b, at this time. As a value of BID in the FQL 16-4, XBID=N+8 is registered.

(13) RD Process

Figure 60A:
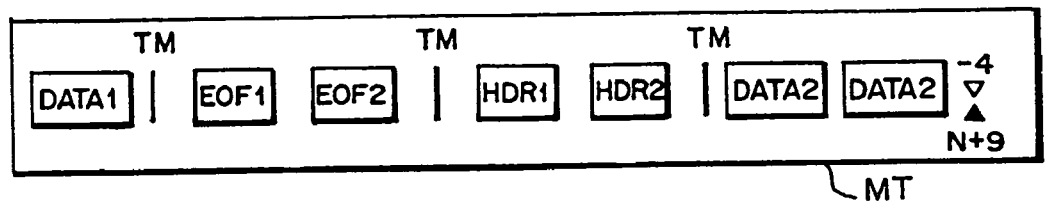
FIGS. 60(A) and 60(B) are diagrams for illustrating an operation [command processing (13) in FIG. 47] according to the first embodiment, FIG. 60(A) showing a state of data writing on the magnetic tape, a real head position and a virtual head position, FIG. 60(B) showing a state of data saving/storing.
Figure 60B:
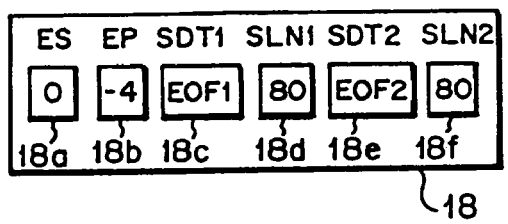

FIG. 60(A) shows a state in which the FMT 15 receives an RD command (13) shown in FIG. 47 from the HIC 14, carries out a process of process ID=1001, and completes a reading of data 2 so that the real head position (XBID) is N+9. As shown in FIG. 60(B), "0" is held as ES in the control area 18a, whereas "−4" is held as EP in the control area 18b, at this time. As a value of BID in the FQL 16-4, XBID=N+9 is registered.

[1-3-3] Example 3 of Emulation Execution

Figures 61A, 61B:
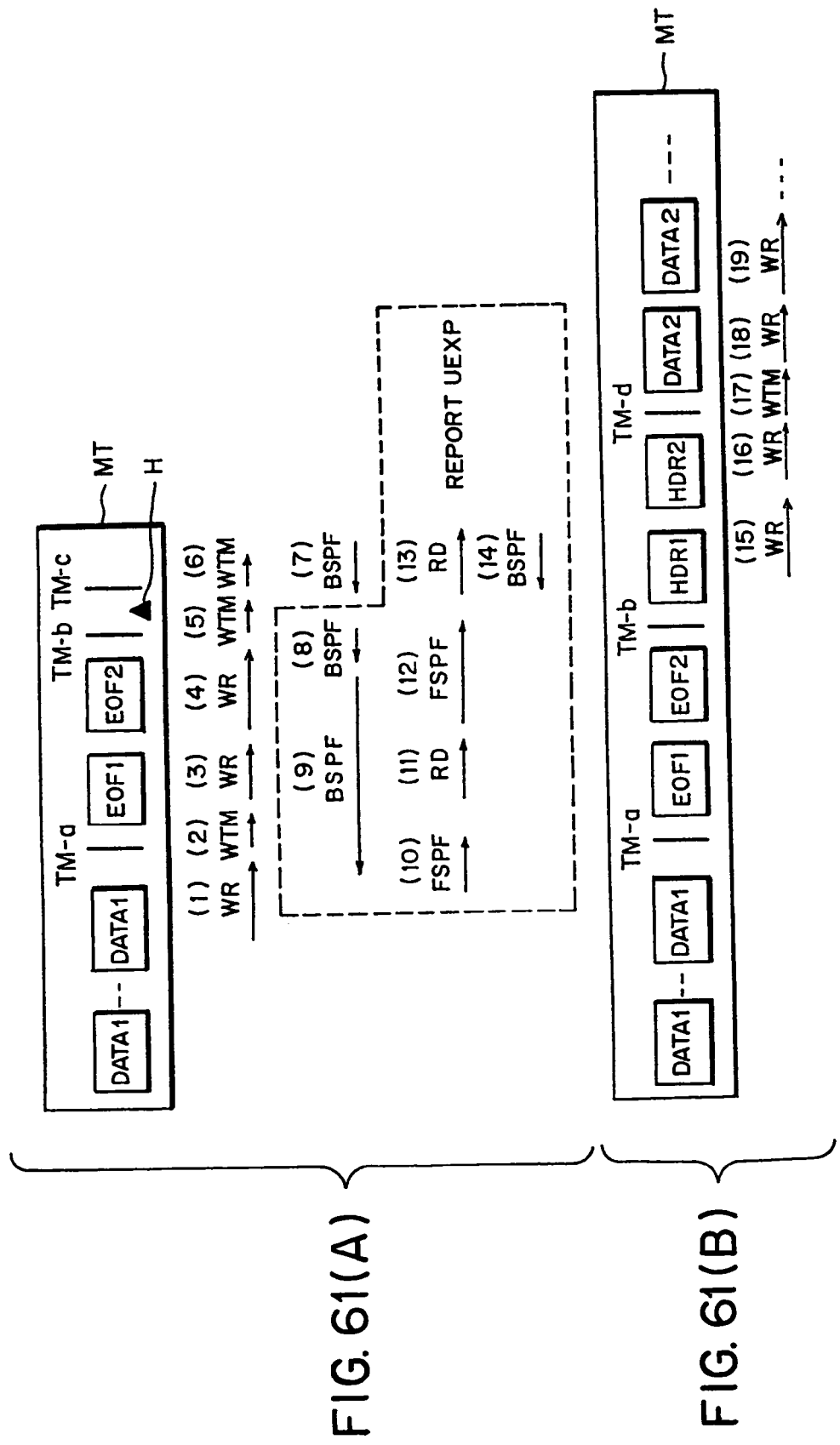
FIGS. 61(A) and 61(B) are diagrams showing a state of data writing on the magnetic tape, and for illustrating another example of commands issued from the upper apparatus when a multi-file is additionally written and tape operations/emulation operations in response to the commands in the magnetic tape unit according to the first embodiment.

FIGS. 61(A) and 61(B) are diagrams showing a state of data writing on the magnetic tape MT, and for illustrating another example of commands issued from the CPU 20 when a multi-file is additionally written, and tape operations/emulation operations in the MTU 30 according to the first embodiment in response to the commands.

FIG. 61(A) shows a state of data writing on the magnetic tape MT immediately after a writing of a file consisting of a plurality of data blocks (data 1) on the magnetic tape MT is completed, similarly to FIG. 22(A). FIG. 61(B) shows a state of data writing on the magnetic tape MT when a file consisting of a plurality of data blocks (data 2) is additionally written in a state shown in FIG. 61(A), similarly to FIG. 22(B).

In FIGS. 61(A) and 61(B), each arrow indicates a tape operation (a direction and a quantity of movement of the head H relative to the magnetic tape MT) performed in response to a corresponding command from the CPU 20. Each of the arrows is given a type (capital letters) of a command directing execution of a tape operation indicated by the arrow. Further, types of the command are given numbers in parentheses, (1) to (19), in the order the commands were issued from the CPU 20. Incidentally, the rightward direction signifies a tape forward direction, whereas the leftward direction signifies a tape backward direction, in FIGS. 61(A) and 61(B).

As shown in FIG. 61(A), the close process for a file [cf. (2) to (7)] is carried out after the last data block (data 1) of a certain file is written on the magnetic tape MT in response to a WR command [cf. (1)].

At this time, EOF1 is saved in the save area (SDT1) 18c, and a block length thereof is saved in the save area (SLN1) 18d when a WR command (3) is executed, according to the first embodiment. When a WR command (4) is executed, EOF2 is saved in the save area (SDT2) 18e, and a block length thereof is saved in the save area (SLN2) 18f.

When finishing a writing of the file, the MTU 30 waits with the head H being located between the last two tape marks, TM-b and TM-c.

When the CPU 20 additionally writes the second file on the magnetic tape MT in which the file has been written as shown in FIG. 61(A), the open process for the second file [cf. (8) to (17)] is carried out. Incidentally, unlike the OS (Operating System) described above with reference to FIGS. 22(A) and 22(B), the OS actuated by the CPU 20 reads once EOF1 to recognize the same such as to confirm a position at which the second file should be written when the file open process is carried out in order to write data, thereby issuing a command.

In the open process [cf. (8) to (17)] shown in FIGS. 61(A) and 61(B), the MTC 10 (FMT 15) emulates the command processing (8) through (14) enclosed by a broken line in the drawing, using the method according to the first embodiment. During which, the MTC 10 does not perform any mechanical operation with the head H being stopped between the last two tape marks, TM-b and TM-c, as shown in FIG. 61(A). According to the first embodiment, EOF1 having been saved in the save area (SDT1) 18c is read out, and transferred to the CPU 20 via the data buffer 17 when the emulation is executed in response to an RD command (11).

[1-3-4] Example 4 of Emulation Execution

Figure 62:
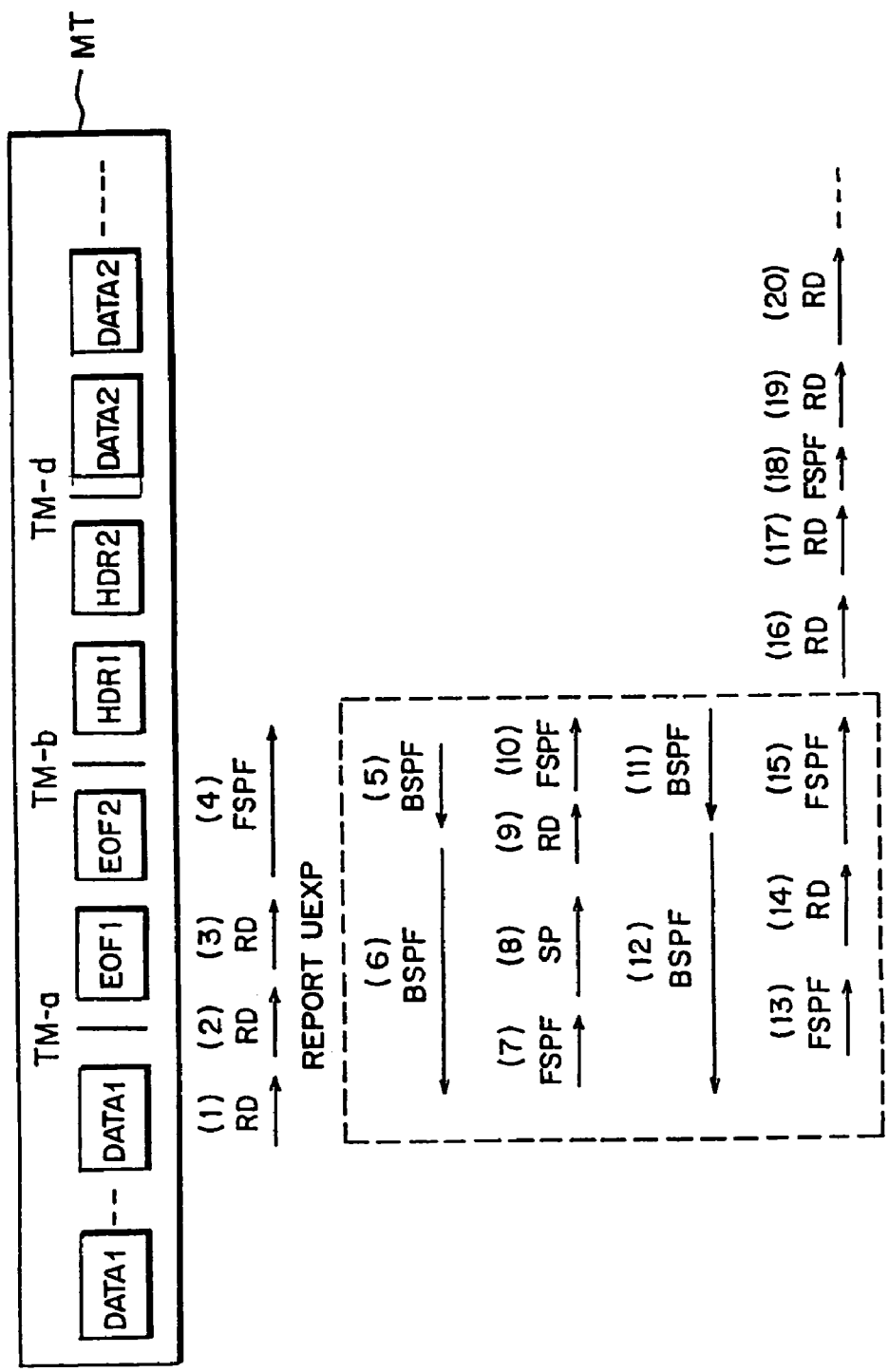
FIG. 62 is a diagram showing a state of data writing on the magnetic tape, and for illustrating still another example of commands issued from the upper apparatus when data is read out from two consecutive files and tape operations/emulation operations in response to the commands in the magnetic tape unit according to the first embodiment.

FIG. 62 is a diagram showing a state of data writing on the magnetic tape MT, and for illustrating still another example of commands issued from the CPU 20 when data is read out from two consecutive files and tape operations/emulation operations in the MTU 30 according to the first embodiment in response to the commands.

FIG. 62 shows a state of data writing on the magnetic tape MT when two files are consecutively written, similarly to FIG. 47.

In FIG. 62, each arrow indicates a tape operation (a direction and a quantity of movement of the head H relative to the magnetic tape MT) carried out in response to a corresponding command from the CPU 20. Each arrow is given a type (capital letters) of a command directing execution of a tape operation indicated by the arrow. Further, types of the command are given numbers in parentheses, (1) to (20), in the order the commands were issued from the CPU 20. Incidentally, the rightward direction signifies a tape forward direction, whereas the leftward direction signifies a tape backward direction, in FIG. 62.

As shown in FIG. 62, after the last data block (data 1) is read out from the magnetic tape MT in response to an RD command [cf. (1)], the close process for the first file [cf. (2) TO (4)] is carried out.

According to the first embodiment, EOF1 is saved in the save area (SDT1) 18c, and a block length thereof is saved in the save area (SLN1) 18d when an RD command (3) is executed. When an FSPF command (4) is executed, the real read operation is carried out in the MTU 30 to read EOF2, the EOF2 is saved in the save area (SDT2) 18e, and a block length thereof is saved in the save area (SLN2) 18f.

When finishing the close process, the MTU 30 waits with the head H being located at the leading position (between TM-b and HDR1) of the second file. Then, the open process for the second file [cf. (5) to (18)] is then carried out. Unlike the OS (Operating System) described above with reference to FIG. 47, the OS actuated by the CPU 20 reads once EOF2 and EOF1 to recognize the same, thereby issuing a command such as to confirm a position at which the second file is read.

When the open process [cf. (4) to (18)] shown in FIG. 72 is carried out, the MTC 10 (FMT 15) emulates the command processing (4) to (15) enclosed by a broken line in the drawing, using the method according to the first embodiment. During which, the MTC 10 does not perform any mechanical operation with the head H being located at the leading position (between TM-b and DHR1) of the second file as shown in FIG. 62.

According to the first embodiment, EOF2 having been saved in the save area (SDT2) is read out and transferred to the CPU 20 via the data buffer 17, when the emulation is executed in response to an RD command (9). When the emulation is executed in response to an RD command (11), EOF1 having been saved in the save area (SDT1) 18c is read out and transferred to the CPU 20 via the data buffer 17.

[1-3-5] Comparison of Performance (Comparison of Command Processing Times)

FIG. 63 is a diagram in which, when a process of additionally writing a multi-file is carried out as shown in FIGS. 22(A) and 22(B), a command processing time in the case where emulation is executed applying the method according to the first embodiment is compared with a command processing time in the case where the known method is applied without emulation.

FIG. 63 shows time periods required for each command processing, comparing a case with emulation with a case without emulation. As shown in FIG. 63, a number in parentheses is entered in a remarks column of a command corresponding to each of the command processing (1) to (24) shown in FIGS. 22(A) and 22(B). A command without a number in parentheses in its remarks column does not relate to the tape operation in the MTU 30, a process corresponding to which is completed within the MTC 10.

As shown in FIG. 63, with respect to the command processing (1) to (7), and (20) to (24) and a time required for each of command processing not relating to the tape operation, times required for each process are equal in either case where emulation is carried out or not. In contrast, a time required for each of the command processing (8) to (19) is uniformly 0.000500 second since the process is completed within the MTC 10 without the real tape operation (mechanical operation) in the MTC 10 when the emulation is executed. In consequence, a time required for all the command processing when emulation is executed is 2.734931 second, which is much shorter than 9.111926 second that is a time required for all the command processing without emulation.

FIG. 64 is a diagram in which, when data is read out from two consecutive files as shown in FIG. 47, a time required for command processing in the case where emulation is executed is compared with a time required for command processing in the case where a known method without emulation is applied.

FIG. 64 shows time periods required for each command processing, comparing a case where emulation is not executed with a case where emulation is executed. In FIG. 64, a number in parentheses is entered in a remarks column of a command corresponding to each of the command processing (1) to (13) shown in FIG. 47. A command without a number in parentheses in its remarks column does not relate to the tape operation of the MTU 30, a process corresponding to which is completed within the MTC 10.

As shown in FIG. 64, with respect to the command processing (1) to (3) and (9) to (13) in which no emulation is executed and command processing not relating to the tape operation, times required for each process are equal in either case where emulation is executed or not. In contrast, a time required for each of the command processing (4) to (8) is uniformly 0.000500 second since the process is completed within the MTC 10 without the real tape operation (mechanical operation) in the MTU 30 when emulation is executed. In consequence, a time required for all the command processing in the case where emulation is executed is 2.827571 second, which is much shorter than 5.514830 second that is a time required for all the command processing without emulation.

FIG. 65 is a diagram in which, when a process of additionally writing a multi-file is carried out as shown in FIGS. 61(A) and 61(B), a time required for command processing in the case where emulation is executed applying the method according to the first embodiment is compared with a time required for a processing in the case where a known method without emulation is applied.

FIG. 65 shows time periods required for each command processing, comparing command processing without emulation with command processing with emulation. In FIG. 65, a number in parentheses is entered in a remarks column of a command corresponding to each of the command processes (1) to (19) shown in FIGS. 61(A) and 61(B). A command without a number in parentheses in its remarks column has no relation to the tape operation of the MTU 30, a process corresponding to which is completed within the MTC 10.

As shown in FIG. 65, with respect to the command processing (1) to (7) and (15) to (19) in which no emulation is executed and the command processing not relating to the tape operation, times required for each process are equal in either case where emulation is executed or not. In contrast, a time required for each of the command processing (8) to (14) is uniformly 0.000500 second since the process is completed within the MTC 10 without the real tape operation (mechanical operation) in the MTU 30 when emulation is executed. In consequence, a time required for all the command processing when emulation is executed is 2.728100 second, which is much shorter than 5.831600 second that is a time required for all the command processing without emulation.

FIG. 66 is a diagram in which, when data is read out from two consecutive files as shown in FIG. 62, a time required for command processing with emulation applying the method according to the first embodiment is compared with a time required for command processing applying a known method without emulation.

FIG. 66 shows time periods required for each command processing, comparing a case where emulation is not executed with a case where emulation is executed. In FIG. 66, a number in parentheses is entered in a remarks column of a command corresponding to each of the command processing (1) to (20) shown in FIG. 62. A command without a number in parentheses in its remarks column has no relation to the tape operation in the MTU 30, a process corresponding to which is completed within the MTC 10.

As shown in FIG. 66, with respect to the command processing (1) to (4) and (16) to (20) in which no emulation is executed and command processing not relating to the tape operation, times required for each process are equal in either case where emulation is executed or not. In contrast, a time required for each of the command processing (5) to (15) is uniformly 0.000500 second since the process is completed within the MTC 10 without the real tape operation (mechanical operation) in the MTU 30 when emulation is executed. In consequence, a time required for all the command processing in the case where emulation is executed is 4.145200 second, which is largely shorter than 8.781900 second that is a time required for all the command processing without emulation.

[1-4] Effects of the First Embodiment

According to the method for controlling a magnetic tape unit of the first embodiment of this invention, the tape operation relating to EOF discrimination in the file open process in the MTC 10 is emulated to decrease the frequency of the mechanical tape operation in the MTU 30, thereby simplifying the tape operation required in the open process. It is thus possible to largely reduce a time required for the file open process (a time required to process a job), and improve a performance of the file open process, further a process performance of the system accessing to the MTU 30.

When a head positioning accuracy of the MTU 30 is low, it is possible to carry out the command processing as before according to a command from the CPU 20 without emulation. Namely, there is no necessity of any modification on the command (OS or the like) issued from the CPU 20 at the time of a file open process, so that the method according to the first embodiment is applied to a MTU 30 having a low head positioning accuracy. On the other hand, it is possible to readily speed-up the file open process in a MTU 30 having a high-accuracy of head positioning.

[2] Description of a Second Embodiment

[2-1] Basic Structure

Figure 67:
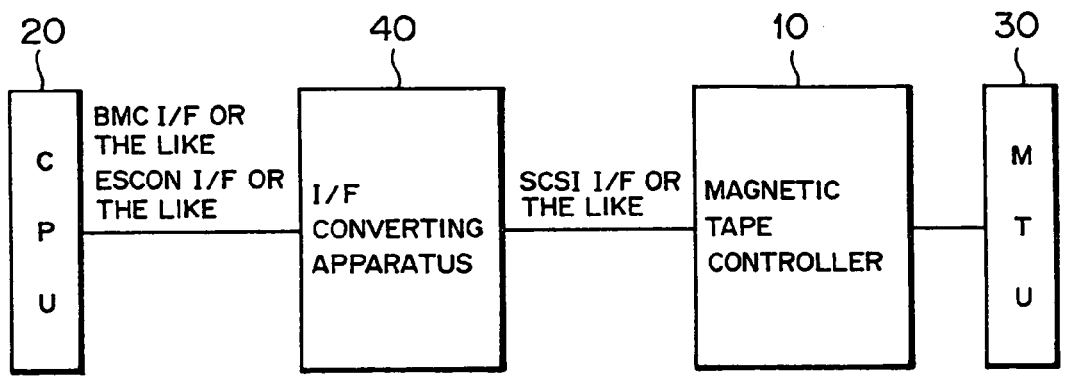
FIG. 67 is a block diagram showing a hardware structure of a system to which a method for controlling a magnetic tape unit according to a second embodiment of this invention is applied.

FIG. 67 is a block diagram showing a hardware structure of a system to which a method for controlling a magnetic tape unit according to a second embodiment of this invention is applied. As shown in FIG. 67, in a system according to the second embodiment, an interface converting apparatus 40 is interposed between the MTC 10 and the CPU 20. Hereinafter, "interface" is abbreviated as "I/F". According to the second embodiment, emulation, which is executed in a process in the MTC 10 according to the first embodiment, is executed in a process in the I/F converting apparatus 40.

Figure 68:
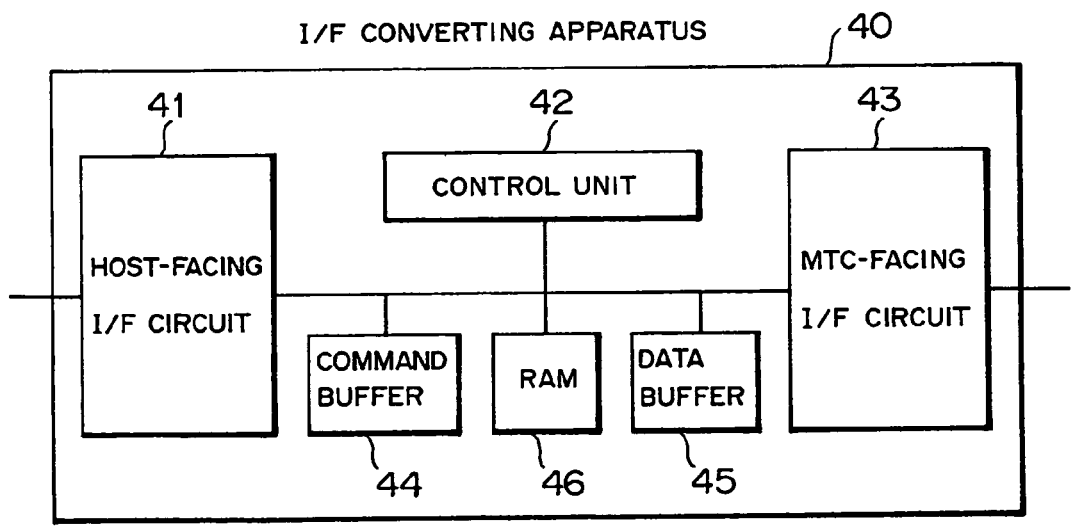
FIG. 68 is a block diagram showing a hardware structure of an interface converting apparatus to which the method for controlling a magnetic tape unit according to the second embodiment of this invention is applied.

FIG. 68 is a block diagram showing a hardware structure of the I/F converting apparatus 40. As shown in FIG. 68, the I/F converting apparatus 40 comprises a host-facing I/F circuit 41, a control unit 42, an MTC-facing I/F circuit 43, a command buffer 44, a data buffer 45 and a RAM 46.

The host-facing I/F circuit 41 controls an interface with the CPU 20, which is connected to, for example, BMC (Block Multiplexer Channel), ESCON (Enterprise System Connection) channel or the like.

The control unit 42 converts/processes a command issued from the CPU 20 to a command suited to the MTC 10, or controls transfer of write data or read data.

The MTC-facing I/F circuit 43 controls an interface with the MTC 10, which is connected to, for example, SCSI (Small Computer System Interface) or the like.

The command buffer 44 temporarily stores a command issued from the CPU 20. The data buffer 45 temporarily stores write data that should be transferred from the CPU 20 to MTC 10 and written on the magnetic tape MT, or read data read out from the magnetic tape MT by the MTU 30 that should be transferred from the MTC 10 to the CPU 20.

The RAM 46 is generally used as a working area or the like when the control unit 42 carries out a process. According to the second embodiment, five areas 46a to 46e are secured in the RAM 46 as shown in FIG. 82 in order to store data necessary to execute emulation in the I/F converting unit 40, as will be described later.

The area 46a is a control area for monitoring a state of emulation to be described later, in which emulation status (ES; 00 to 63) to be described later is held. The area 46b is a control area for monitoring a virtual position of the head (virtual head position) relative to the magnetic tape MT when emulation to be described later is executed, in which an emulation pointer (EP; −4 to +1) to be described later is held.

The area 46c is a control area (SDT1) used to save a data block (EOF1) when the data block is relayed if the data block read out while the MTU 30 is in a real operation is EOF1. The area 46d is a save area (SDT2) used to save a data block (EOF2) when the data block is relayed if the data block read out while the MTU 30 is in a real operation is EOF2.

The area 46e is a save area (SBID: Save BID) used to save a real BID of a tape mark if a data block read out while the MTU 30 is in a real operation is a tape mark (TM).

When the I/F converting apparatus 40 is connected to a plurality of MTUs 30 (MTCs 10) so that the CPU 20 can access to the plurality of MTUs 30 via the I/F converting apparatus 40, the five areas 46a to 46e in the RAM 46 are provided for each MTU 30. When the I/F converting apparatus 40 is connected to MTUs 30 of machine numbers #0 to #F, the five areas 46a to 46e are secured for each machine number, as shown in FIG. 82, and ES, EP, SDT1, SDT2 and SBID are managed for each machine number in the I/F converting apparatus 40.

[2-2] Controlling Method According to the Second Embodiment

Hereinafter, description will be made of a method for controlling a magnetic tape unit according to the second embodiment of this invention with reference to FIGS. 69 through 174.

[2-2-1] Basic Operation

The basic operation of the method according to the second embodiment is almost similar to the that according to the first embodiment described above. Unlike a case where emulation is executed by the MTC 10 as in the first embodiment, there may occur a situation where EOF1 or EOF 2 cannot be saved in the area 46c or 46d in the RAM 46 in the file open process when emulation of the tape operation of the MTU 30 is executed by the I/F converting apparatus 40 according to the second embodiment.

Namely, when a command issued form the CPU 20 at the time of the file open process is a command in a skip system such as SPF command, FSPF command or the like, the MTC 10 is capable of making the MTU 30 carry out a real read operation as described above when processing the command [cf. FIGS. 15, 17, 50(A) and 50(B) in the first embodiment, for example]. However, since the I/F converting apparatus 40 does not directly control the MTU 30, the I/F converting apparatus 40 cannot identify which a data block skipped by a command in the skip system is EOF1, EOF2 or any other than they. Identification patterns for EOF1 and EOF2 by the I/F converting apparatus 40 will be described later with reference to FIGS. 69(A) to 69(D).

According to the method of the second embodiment, when an RD command directing a reading of EOF1/EOFS is issued from the CPU 20 in a state in which the EOF1/EOF2 is not saved in the save area 46c/46d in the RAM 46 at the time of the file open process, the MTU 30 is made to carry out a real read process to really read EOF1/EOF2 in response to the RD command without executing emulation, and the EOF1/EOF2 read out by the MTU 30 is transferred to the CPU 20.

[2-2-2] Identification Patterns for EOFs

FIGS. 69(A) through 69(D) are diagrams for illustrating four identification patterns (Pattern 1 to Pattern 4) for EOFs by the I/F converting apparatus 40 according to the second embodiment.

If emulation is executed by the I/F converting apparatus 40, the I/F converting apparatus 40 cannot identify EOF1 or EOF2 when EOF1 or EOF2 is skipped by a command in the skip system at the time of file open process, thus cannot save EOF1 or EOF2 in the save area 46c or 46d in the RAM 46, as described above. As identification patterns for EOF1 and EOF 2, there are provided four kinds of patterns, 1 to 4, below.

Figure 69A:
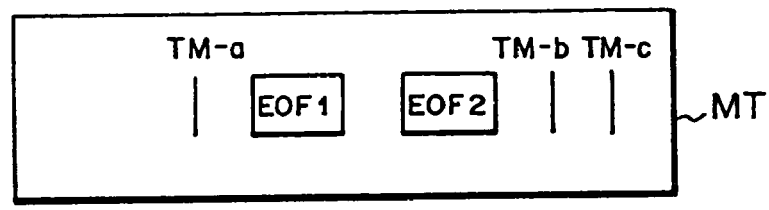
FIGS. 69(A) through 69(D) are diagrams for illustrating four identification patterns for EOFs (Pattern 1 to Pattern 4) according to the second embodiment.

Pattern 1 shown in FIG. 69(A) is in the case where both EOF1 and EOF2 can be identified and saved in the save areas 46c and 46d in the RAM 46. When emulation is executed by the MTC 10 as in the first embodiment, the identification pattern for EOF1 and EOF2 is always Pattern 1.

Figure 69B:
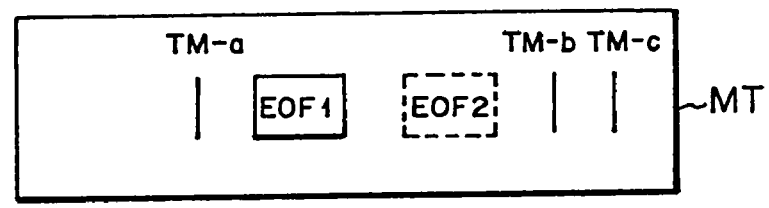

Pattern 2 shown in FIG. 69(B) is in the case where only EOF1 can be identified and saved in the save area 46c in the RAM 46.

Figure 69C:
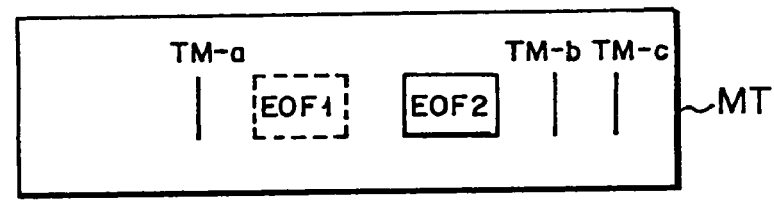

Pattern 3 shown in FIG. 69(C) is in the case where only EOF2 can be identified and saved in the save area 46d in the RAM 46.

Figure 69D:
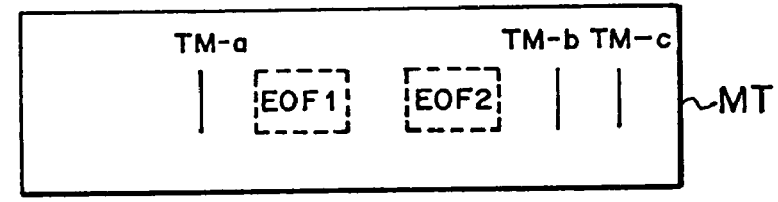

Pattern 4 shown in FIG. 69(D) is in the case where neither EOF1 nor EOF2 can be identified and saved in the save area 46c or 46d in the RAM 46.

Hereinafter, various types of command processing will be described with respect to the above four patterns, 1 to 4.

[2-2-3] Emulation Status

Now, description will be made of emulation status (hereinafter abbreviated as ES) according to the second embodiment with reference to FIGS. 70 through 73.

Here is described a relation between a value of ES held in the control area 46a in the RAM 46 and a real head position (real BID) relative to the magnetic tape MT.

Status monitoring is carried out on the basis of a value of ES in the I/F converting apparatus 40 according to the second embodiment. Particularly, when a value of ES is "4x" or "6x" (X=0, 1, 2 or 3), execution of emulation is possible. In a state in which execution of emulation is possible as this (ES=4x or 6x), a virtual head position (a virtual position of the head relative to the magnetic tape MT) is managed with an emulation pointer (hereinafter abbreviated as EP). A value of EP is expressed as a relative position from the real head position. In FIGS. 70 through 73, a black triangle indicates the real head position, whereas a white triangle indicated the virtual head position when execution of emulation is possible.

(1) Emulation Status (ES) in Pattern 1

FIGS. 70(A) through 70(G) are diagrams for illustrating emulation status (ES) in Pattern 1 according to the second embodiment.

Figure 70A:
FIGS. 70(A) through 70(G) are diagrams for illustrating emulation status (ES) in Pattern 1 according to the second embodiment.

FIG. 70(A) shows a state at the time that ES=00 (initial state). As shown in FIG. 70(A), a state at the time that ES 00 is a state in which reading/writing of an arbitrary data block (data 1 in the drawings) from/on the magnetic tape TM is completed, and the real head position relative to the magnetic tape MT is immediately after the data block. The real head position (hereinafter referred to as real BID) in a state at the time that ES=00 is assumed to be n (BID of an arbitrary data block). At this time, a value of EP is undetermined.

Figure 70B:

FIG. 70(B) shows a state at the time that ES=10. As shown in FIG. 70(B), a state at the time that ES=10 is a state in which the first tape mark TM-a is detected or written, and the real head position is immediately after the first tape mark TM-a. The real BID at the time that ES=10 is n+1. At this time, a value of EP is undetermined.

Figure 70C:
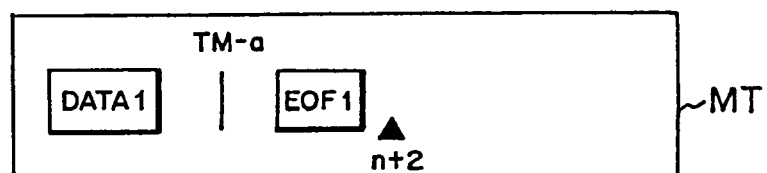

FIG. 70(C) shows a state at the time that ES=20. As shown in FIG. 70(C), a state at the time that ES=20 is a state in which EOF1 is detected or written, and the real head position is immediately after EOF1. The real BID is n+2 when ES=20. At this time, a value of EP is undetermined.

Figure 70D:
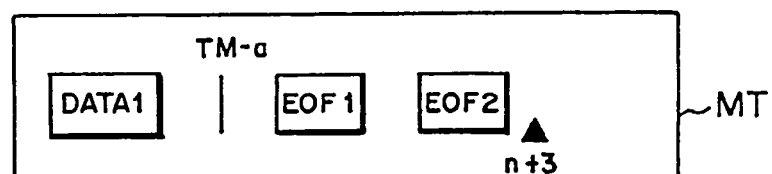

FIG. 70(D) shows a state at the time that ES=30. As shown in FIG. 70(D), the state at the time that ES=30 is a state in which EOF2 is detected or written, and the real head position is immediately after EOF2. The real BID in the state at the time that ES=30 is n+3. At this time, a value of EP is undetermined.

Figure 70E:
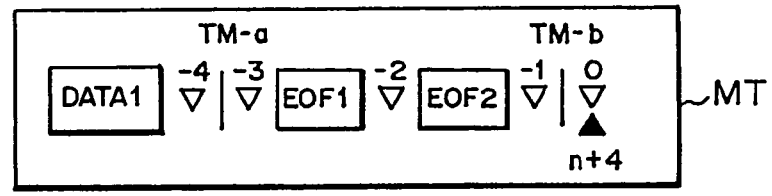

FIG. 70(E) shows a state at the time that ES=40. As shown in FIG. 70(E), the state at the time that ES=40 is a state in which the second tape mark TM-b is detected or written, and the real head position is immediately after the second tape mark TM-b. The real BID is n+4 when ES=4. At this time, a value of EP can take five values, -4, -3, -2, -1 and 0.

Figure 70F:
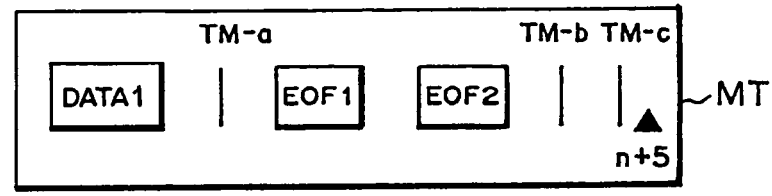

FIG. 70(F) shows a state at the time that ES=50. As shown in FIG. 70(F), the state at the time that ES=50 is a state in which the third tape mark TM-c is detected or written, and the real head position is immediately after the third tape mark TM-c. The real BID is n+5 when ES=50. At this time, a value of EP is undetermined.

Figure 70G:
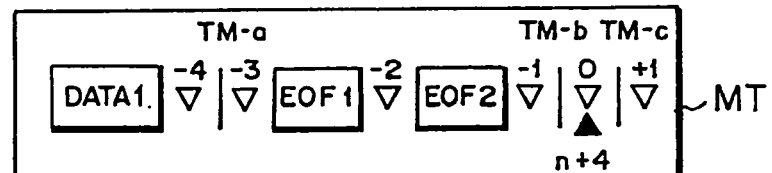

FIG. 70(G) shows a state at the time that ES=60. As shown in FIG. 70(G), the state at the time that ES=60 is a state in which the third tape mark TM-c is detected or written, and the real head position is between the second tape mark TM-b and the third tape mark TM-c. The real BID at the time that ES=60 is n+4. At this time, a value of EP can take six values, −4, −3, −2, −1, 0 and +1.

(2) Emulation Status (ES) in Pattern 2

FIGS. 71(A) through 71(G) are diagrams for illustrating emulation status (ES) in Pattern 2 according to the second embodiment.

Like FIGS. 70(A) through 70(C), FIG. 71(A) through 71(C) show states at the time that ES=00, and 20.

Figure 71A:
FIGS. 71(A) through 71(G) are diagrams for illustrating emulation status (ES) in Pattern 2 according to the second embodiment.
Figure 71B:
Figure 71C:
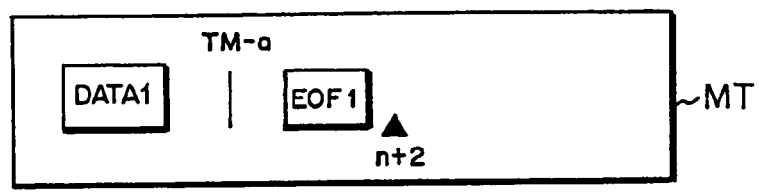
Figure 71D:
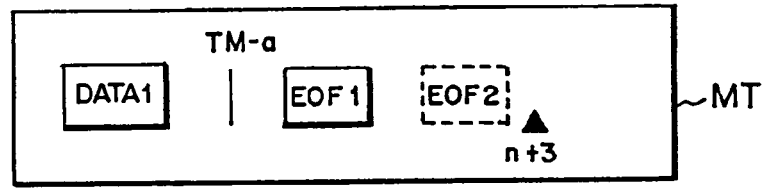

FIG. 71(D) shows a state at the time that ES=31. As shown in FIG. 71(D), the state at the time that ES=31 is a state in which EOF2 is skipped, and the real head position is immediately after EOF2. The real BID at the time that ES=31 is n+3. At this time, a value of EP is undetermined.

Figure 71E:
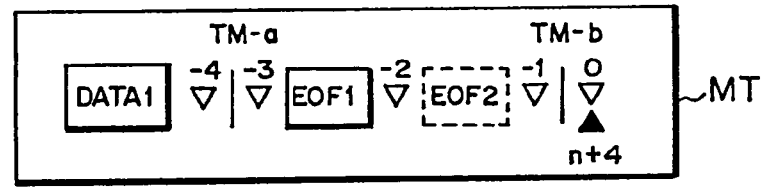

FIG. 71(E) shows a state at the time that ES=41. As shown in FIG. 71(E), the state at the time that ES=41 is a state in which EOF2 is skipped, the second tape mark TM-b is then detected or written, and the real head position is immediately after the second tape mark TM-b. The real BID at the time that ES=41 is n+4. At this time, a value of EP can take five values, −4, −3, −2, −1 and 0.

Figure 71F:
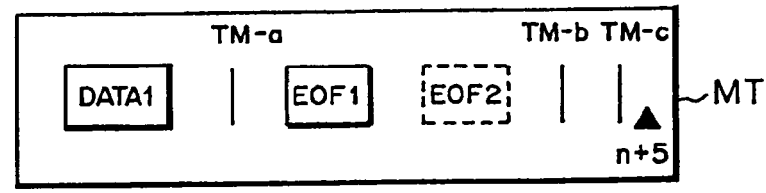

FIG. 71(F) shows a state at the time that ES=51. As shown in FIG. 71(F), the state at the time that ES=51 is a state in which the EOF2 is skipped, the third tape mark TM-c is then detected or written, and the real head position is immediately after the third tape mark TM-c. The real BID at the time that ES=51 is n+5. At this time, a value of EP is undetermined.

Figure 71G:
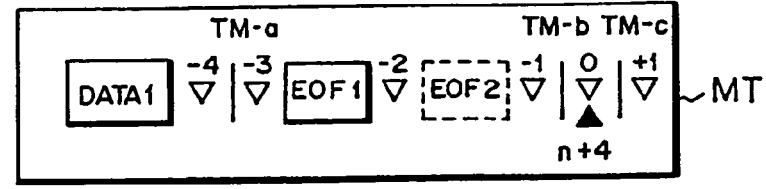

FIG. 71(G) shows a state at the time that ES=61. As shown in FIG. 71(G), the state at the time that ES=61 is a state in which EOF2 is skipped, the third tape mark TM-c is then detected or written, and the real head position is between the second tape mark TM-b and the third tape mark TM-C. The real BID at the time that ES=61 is n+4. At this time, a value of EP can take six values, −4, −3, −2, −1, 0 and +1.

(3) Emulation Status (ES) in Pattern 3

FIGS. 72(A) through 72(G) are diagrams for illustrating emulation status (ES) in Pattern 3 according to the second embodiment.

Like FIGS. 70(A) and 70(B), FIGS. 72(A) through 72(B) show states at the time that ES=00 and 10.

Figure 72A:
FIGS. 72(A) through 72(G) are diagrams for illustrating emulation status (ES) in Pattern 3 according to the second embodiment.
Figure 72B:
Figure 72C:
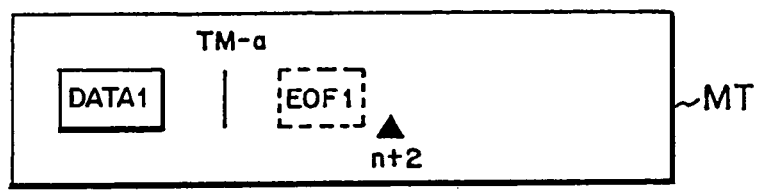

FIG. 72(C) shows a state at the time that ES=22. As shown in FIG. 72(C), the state at the time that ES=22 is a state in which EOF1 is skipped, and the real head position is immediately after EOF1. The real BID at the time that ES=22 is n+2. At this time, a value of EP is undetermined.

Figure 72D:
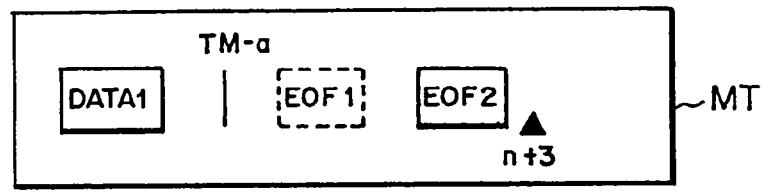

FIG. 72(D) shows a state at the time that ES=32. As shown in FIG. 72(D), the state at the time that ES=32 is a state in which EOF1 is skipped, EOF2 is then detected or written, and the real head position is immediately after EOF2. The real BID at the time that ES=32 is n+3. At this time, a value of EP is undetermined.

Figure 72E:
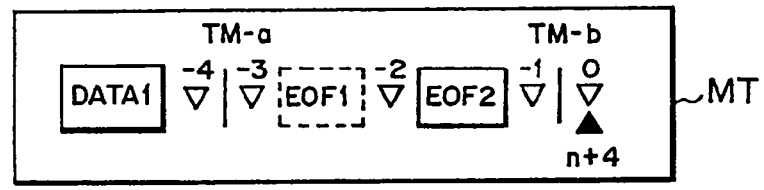

FIG. 72(E) shows a state at the time that ES=42. As shown in FIG. 72(E), the state at the time that ES=42 is a state in which EOF1 is skipped, the second tape mark TM-b is then detected or written, and the real head position is immediately after the second tape mark TM-b. The real BID at the time that ES=42 is n+4. At this time, a value of EP can take five values, −4, −3, −2, −1 and 0.

Figure 72F:
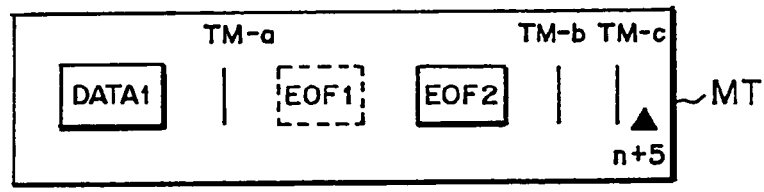

FIG. 72(F) shows a state at the time that ES=52. As shown in FIG. 72(F), the state at the time that ES=52 is a state in which EOF1 is skipped, the third tape mark TM-c is then detected or written, and the real head position is immediately after the third tape mark TM-c. The real BID at the time that ES=52 is n+5. At this time, a value of EP is undetermined.

Figure 72G:
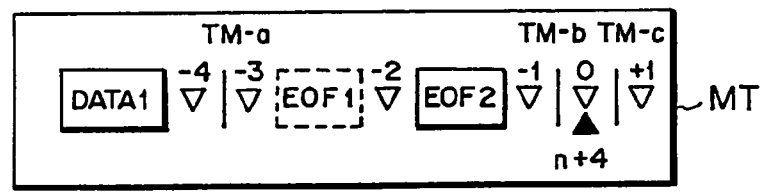

FIG. 72(G) shows a state at the time that ES=62. As shown in FIG. 72(G), the state at the time that ES=62 is a state in which EOF1 is skipped, the third tape mark TM-c is then detected or written, and the real head position is between the second tape mark TM-b and the third tape mark TM-c. The real BID at the time that ES=62 is n+4. At this time, a value of EP can take six values, −4, −3, −2, −1, 0 and +1.

(4) Emulation Status (ES) in Pattern 4

FIGS. 73(A) through 73(G) are diagrams for illustrating emulation status in Pattern 4 according to the second embodiment.

Figure 73A:
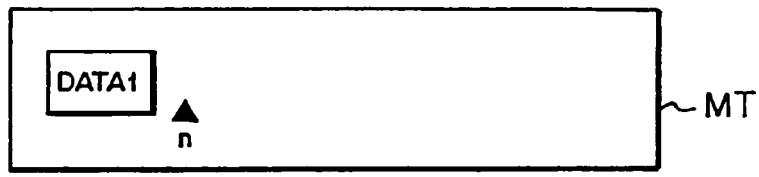
FIGS. 73(A) through 73(G) are diagrams for illustrating emulation status (ES) in Pattern 4 according to the second embodiment.
Figure 73B:
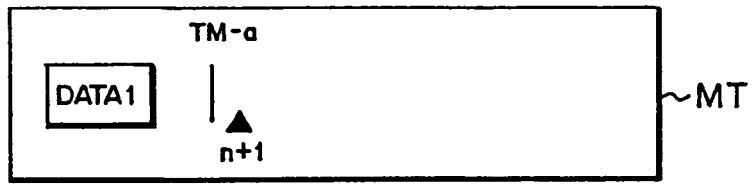
Figure 73C:
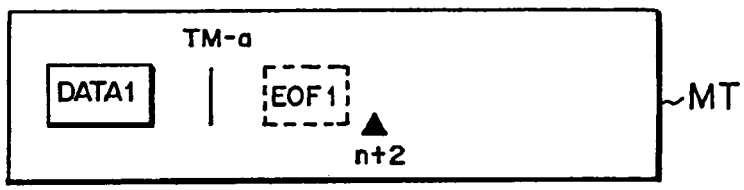

Like FIGS. 70(A) and 70(B), FIGS. 73(A) and 73(B) show states at the time that ES=00 and 10. Like FIG. 72(C), FIG. 73(C) shows a state at the time that ES=22.

Figure 73D:
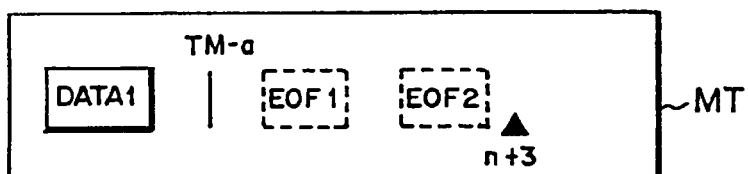

FIG. 73(D) shows a state at the time that ES=33. As shown in FIG. 73(D), the state at the time that ES=33 is a state in which EOF1 is skipped, EOF2 is then skipped, and the real head position is immediately after EOF2. The real BID at the time that ES=33 is n+3. At this time, a value of EP is undetermined.

Figure 73E:
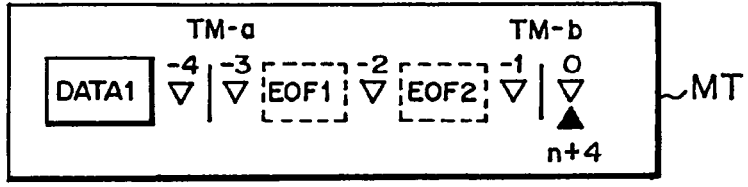

FIG. 73(E) shows a state at the time that ES=43. As shown in FIG. 73(E), the state at the time that ES=43 is a state in which EOF1 and EOF2 are skipped, the second tape mark TM-b is then detected or written, and the real head position is immediately after the second tape mark TM-b. The real BID at the time that ES=43 is n+4. At this time, a value of EP can take five values, −4, −3, −2, −1 and 0.

Figure 73F:
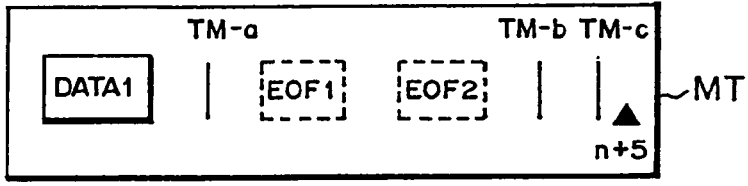
Figure 73G:
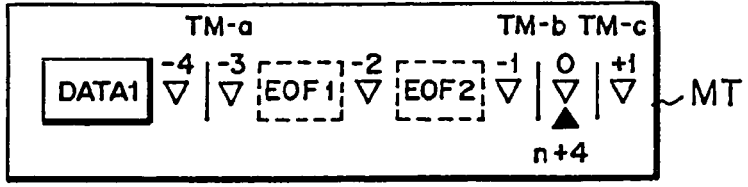

FIG. 73(F) shows a state at the time that ES=53. As shown in FIG. 73(G), the state at the time that ES=53 is a state in which EOF1 and EOF2 are skipped, the third tape mark TM-c is then detected or written, and the real head position is immediately after the third tape mark TM-c. The real BID at the time that ES=53 is n+5. At this time, a value of EP is undetermined.

FIG. 73(G) shows a state at the time that ES=63. As shown in FIG. 73(G), the state at the time that ES=63 is a state in which EOF1 and EOF2 are skipped, the third tape mark TM-c is then detected or written, and the real head position is between the second tape mark TM-b and the third tape mark TM-c. The real BID at the time that ES=63 is n+4. At this time, a value of EP can take 6 values, −4, −3, −2, −1, 0 and +1.

[2-2-4] Emulation Executing Conditions

According to the second embodiment, processes to be described later with reference to FIGS. 83 through 115 are carried out, whereby emulation of the tape operation of the MTU 30 is executed.

Hereinafter, emulation executing conditions according to the second embodiment will be described with reference to FIGS. 74 through 81.

(1) Emulation Executing Conditions for Pattern 1

FIGS. 74(A), 74(B), 75(A) and 75(B) are diagrams for illustrating emulation executing conditions for Pattern 1 according to the second embodiment.

Figures 74A, 74B:
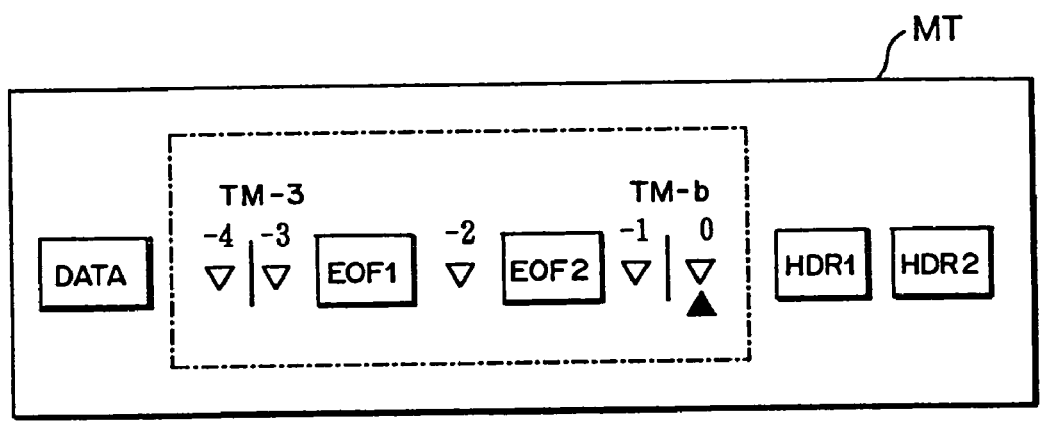
FIGS. 74(A) and 74(B) are diagrams for illustrating emulation executing conditions in Pattern 1 according to the second embodiment.

As shown in FIG. 74(A), emulation executing conditions at the time that ES=40 are as below, shown in FIG. 74(B). The state at the time that ES=40 is in Pattern 1 (where both of EOF1 and EOF2 are saved in the save areas 46c and 46d), and is a state in which reading/writing of data up to the second tape mark TM-b is completed in the MTU 30 so that the real head position is immediately after the second tape mark TM-b, as stated above.

① In a case where, when ES=40 and EP=0, any one of RB command, BSP command and BSPF command is executed;

② In a case where, when ES=40 and EP=−1, any one of RD command, RB command, BSP command, BSPF command, SP command, FSPF command and WTM command is executed;

③ In the case where, when ES=40 and EP=−2, any one of RD command (involving data transfer), RB command, BSP command, BSPF command, SP command and FSPF command is executed;

④ In the case where, when ES=40 and EP=−3, any one of RD command (involving data transfer), RB command, BSP command, BSPF command, SP command and FSPF command is executed; and ⑤ In the case where, when ES=40 and EP=−4, any one of RD command, SP command and FSPF command is executed.

Figures 75A, 75B:
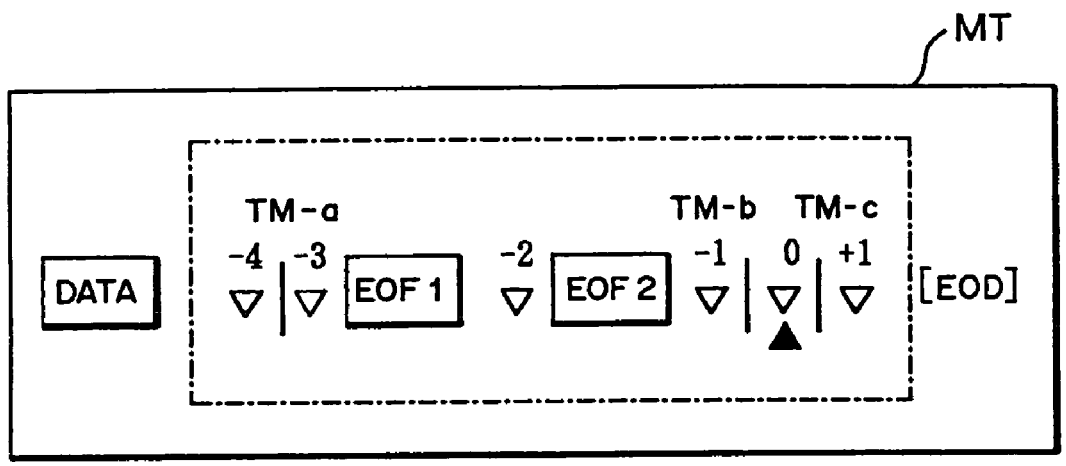
FIGS. 75(A) and 75(B) are diagrams for illustrating emulation executing conditions in Pattern 1 according to the second embodiment.

As shown in FIG. 75(A), emulation executing conditions at the time that ES=60 are as below, shown in FIG. 75(B). The state at the time that ES=60 is in Pattern 1 (where both of EOF1 and EOF2 are saved in the save areas 46c and 46d), and is a state in which reading/writing of data up to the third tape mark TM is completed in the MTU 30 so that the real head position is immediately after the second tape mark TM-b, as stated above.

①In the case where, when ES=60 and EP=+1, any one of RB command, BSP command and BSPF command is executed;

②In the case where, when ES=60 and EP=0, any one of RD command, RB command, BSP command, BSPF command, SP command, FSPF command and WTM command is executed;

③In the case where, when ES=60 and EP=−1, any one of RD command, RB command, BSP command, BSPF command, SP command and FSPF command is executed;

④In the case where, when ES=60 and EP=−2, any one of RD command (involving data transfer), RB command, BSP command, BSPF command, SP command and FSPF command is executed;

⑤In the case where, when ES=60 and EP=−3, any one of RD command (involving data transfer), RB command, BSP command, BSPF command, SP command and FSPF command is executed; and ⑥In the case where, when ES=60 and EP=−4, any one of RD command, SP command and FSPF command is executed.

(2) Emulation Executing Conditions in Pattern 2

FIGS. 76(A), 76(B), 77(A) and 77(B) are diagrams for illustrating emulation executing conditions in Pattern 2 according to the second embodiment.

Figures 76A, 76B:
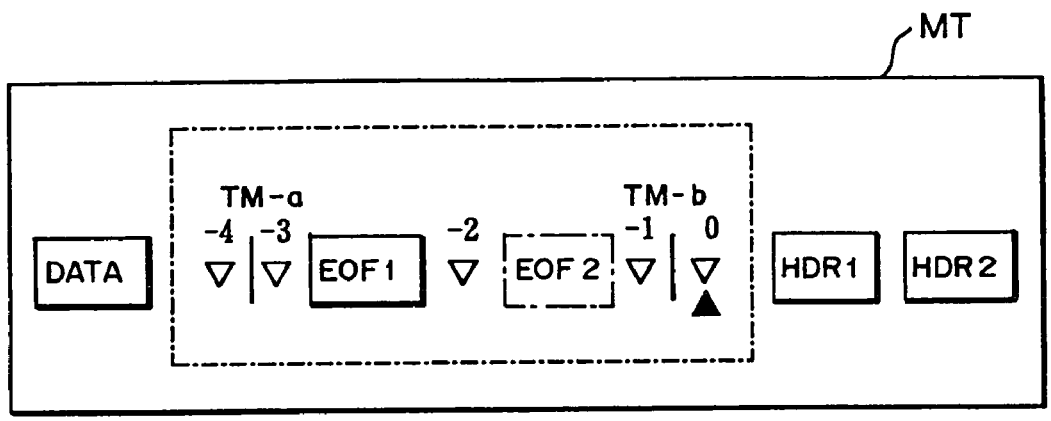
FIGS. 76(A) and 76(B) are diagrams for illustrating emulation executing conditions in Pattern 2 according to the second embodiment.

As shown in FIG. 76(A), emulation execution conditions at the time that ES=41 are as below, shown in FIG. 76(B). The state at the time that ES=41 is in Pattern 2 (state in which only EOF1 is saved in the save area 46c), and is a state in which reading/writing of data up to the second tape mark TM-b is completed in the MTU 30 and the real head position is immediately after the second tape mark TM-b, as stated above.

Figures 77A, 77B:
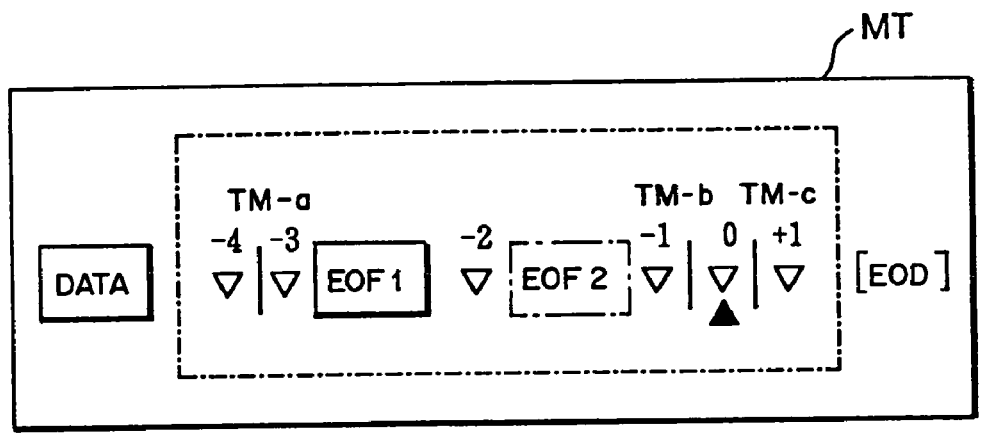
FIGS. 77(A) and 77(B) are diagrams for illustrating emulation executing conditions in Pattern 2 according to the second embodiment.

①In the case where, when ES=41 and EP=0, any one of RB command, BSP command and SBPF command is executed;

②In the case where, when ES=41 and EP=−1, any one of RD command, RB command, BSP command, BSPF command SP command, FSPF command and WTM command is executed;

③In the case where, when ES=41 and EP=−2, any one of RB command, BSP command, BSPF command, SP command and FSPF command is executed;

④In the case where, when ES=41 and EP=−3, any one of RD command (involving data transfer), RB command, BSP command, BSPF command, SP command and FSPF command is executed; and ⑤In the case where, when ES=41 and EP=−4, any one of RD command, SP command and FSPF command is executed;

As shown in FIG. 77(A), emulation executing conditions at the time that ES=61 are as below, shown in FIG. 77(B). The state at the time that ES=61 is in Pattern 2 (state in which only EOF1 is saved in the save area 46c), and is a state in which reading/writing of data up to the third tape mark TM-c is completed and the real head position is immediately after the second tape mark TM-b in MTU 30, as stated above.

①In the case where, when ES=61 and EP=+1, any one of RB command, BSP command and BSPF command is executed;

②In the case where, when ES=61 and EP=0, any one of RD command, RB command, BSP command, BSPF command, SP command, FSPF command and WTM command is executed;

③In the case where, when ES=61 and EP=−1, any one of RD command, RB command, BSP command, BSPF command, SP command and FSPF command is executed;

④In the case where, when ES=61 and EP=−2, any one of RB command, BSP command, BSPF command, SP command and FSPF command is executed;

⑤In the case where, when ES=61 and EP=−3, any one of RD command (involving data transfer), RB command, BSP command, BSPF command, SP command and FSPF command is executed; and ⑥In the case where, when ES=61 and EP=−4, any one of RD command, SP command and FSPF command is executed;

(3) Emulation Executing Conditions in Pattern 3

FIGS. 78(A), 78(B), 79(A) and 79(B) are diagrams for illustrating emulating execution conditions according to the second embodiment.

Figures 78A, 78B:
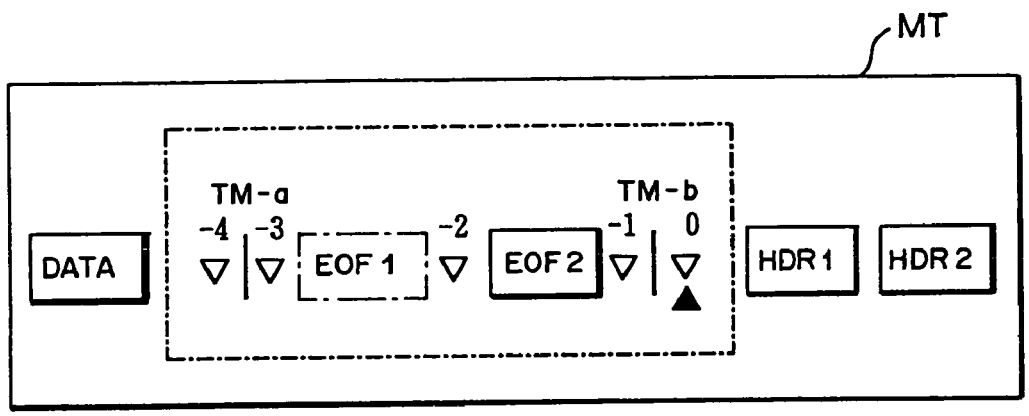
FIGS. 78(A) and 78(B) are diagrams for illustrating emulation executing conditions in Pattern 3 according to the second embodiment.

As shown in FIG. 78(A), the emulation executing conditions at the time that ES=42 are as below, shown in FIG. 78(B). The state at the time that ES=42 is in Pattern 3 (state in which only EOF2 is saved in the save area 46d), and is a state in which reading/writing data up to the second tape mark TM-b is completed in the MTU 30 and the real head position is immediately after the second tape mark TM-b, as stated above.

①In the case where, when ES=42 and EP=0, any one of RB command, BSP command and BSPF command is executed;

②In the case where, when ES=42 and EP=−1, any one of RD command, RB command, BSP command, BSPF command, SP command, FSPF command and WTM command is executed;

③In the case where, when ES=42 and EP=−2, any one of RD command (involving data transfer), RB command, BSP command, BSPF command, SP command and FSPF command is executed;

④In the case where, when ES=42 and EP=−3, any one of RB command, BSP command, BSPF command, SP command and FSPF command is executed; and ⑤In the case where, when ES=42 and EP=−4, any one of RD command, SP command and FSPF command is executed.

Figures 79A, 79B:
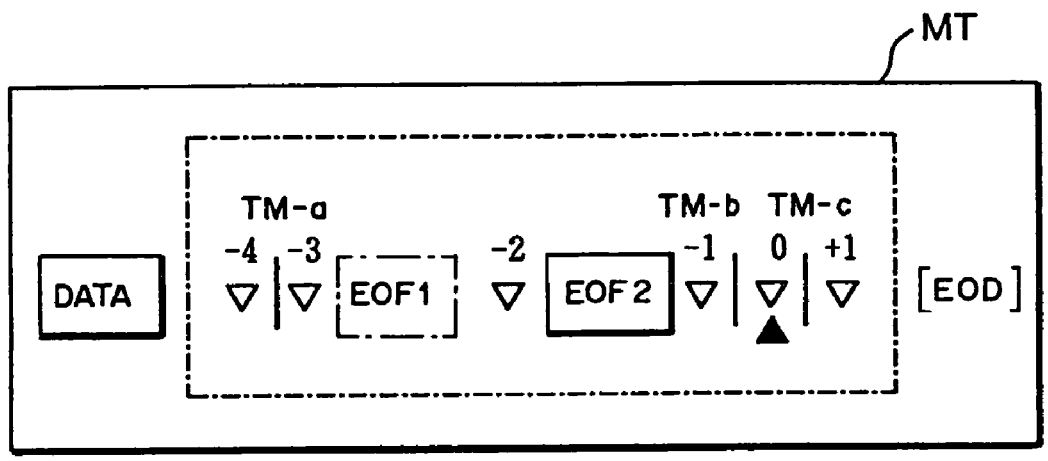
FIGS. 79(A) and 79(B) are diagrams for illustrating emulation executing conditions in Pattern 3 according to the second embodiment.

As shown in FIG. 79(A), emulation executing conditions in a state at the time that ES=62 are as below, shown in FIG. 79(B). The state at the time that ES=62 is in Pattern 3 (state in which only EOF2 is saved in the save area 46d), and is a state in which reading/writing of data up to the third tape mark TM-c is completed in the MTU 30 and the real head position is immediately after the second tape mark TM-b, as stated above.

①In the case where, when ES=62 and EP=+1, any one of RB command, BSP command and BSPF command is executed;

②In the case where, when ES=62 and EP=0, any one of RD command, RB command, BSP command, BSPF command, SP command, FSPF command and WTM command is executed;

③ In the case where, when ES=62 and EP=−1, any one of RD command, RB command, BSP command, SBPF command, SP command and FSPF command is executed;

④ In the case where, when ES=62 and EP=−2, any one of RD command (involving data transfer), RB command, BSP command, BSPF command, SP command and FSPF command is executed;

⑤ In the case where, when ES=62 and EP=−3, any one of RB command, BSP command, BSPF command, SP command and FSPF command is executed; and ⑥ In the case where, when ES=62 and EP=−4, any one of RD command, SP command and FSPF command is executed.

(4) Emulation Executing Conditions in Pattern 4

FIGS. 80(A), 80(B), 81(A) and 81(B) are diagrams for illustrating emulation executing conditions in Pattern 4 according to the second embodiment.

Figures 80A, 80B:
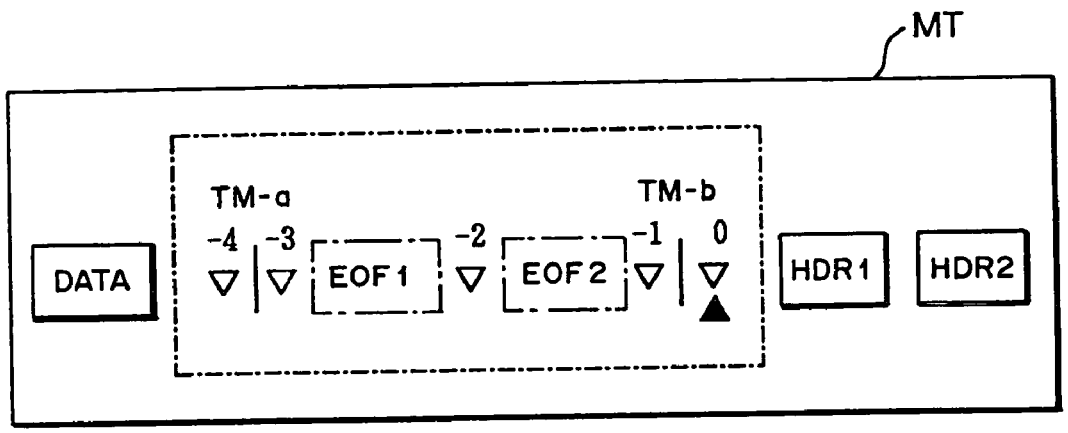
FIGS. 80(A) and 80(B) are diagrams for illustrating emulation executing conditions in Pattern 4 according to the second embodiment.

As shown in FIG. 80(A), emulation executing conditions at the time that ES=43 are as below, shown in FIG. 80(B). The state at the time that ES=43 is in Pattern 4 (state in which neither EOF1 nor EOF2 is saved in the save area 46c or 46d), and is a state in which reading/writing of data up to the second tape mark TM-b is completed in the MTU 30 and the real head position is immediately after the second tape mark TM-b, as stated above.

① In the case where, when ES=43 and EP=0, any one of RB command, BSP command and BSPF command is executed;

② In the case where, when ES=43 and EP=−1, any one of RD command, RB command, BSP command, BSPF command, SP command, FSPF command and WTM command is executed;

③ In the case where, when ES=43 and EP=−2, any one of RB command, BSP command, BSPF command, SP command and FSPF command is executed;

④ In the case where, when ES=43 and EP=−3, any one of RB command, BSP command, BSPF command, SP command and FSPF command is executed; and ⑤ In the case where, when ES=43 and EP=−4, any one of RD command, SP command and FSPF command is executed.

Figures 81A, 81B:
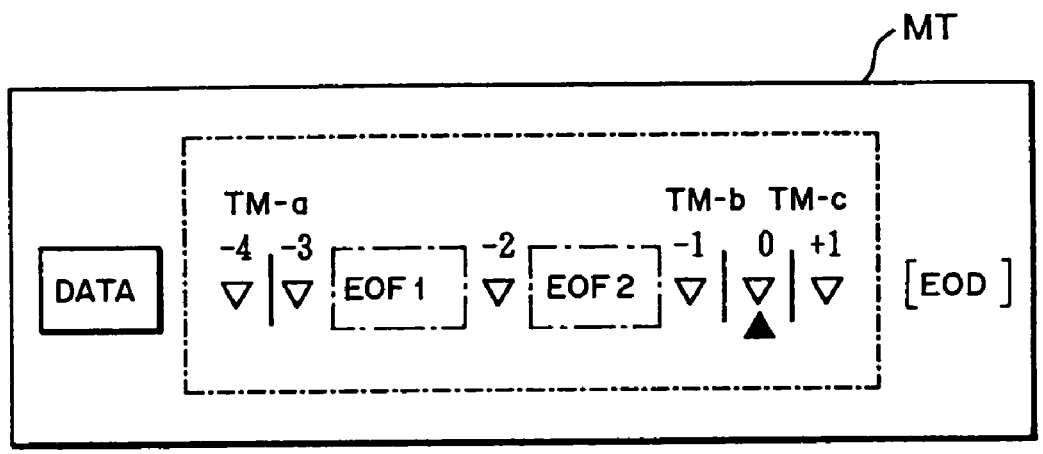
FIGS. 81(A) and 81(B) are diagrams for illustrating emulation executing conditions in Pattern 4 according to the second embodiment.

As shown in FIG. 81(A), emulation executing conditions at the time that ES=63 are as shown in FIG. 81(B). The state at the time that ES=63 is in Pattern 4 (neither EOF1 nor EOF2 is not saved in the save area 46c or 46d), and is a state in which reading/writing of data up to the third tape mark TM-c is completed in the MTU 30 and the real head position is immediately after the second tape mark TM-b, as stated above.

① In the case where, when ES 63 and EP=+1, any one of RB command, BSP command and BSPF command is executed;

② In the case where, when ES=63 and EP=0, any one of RD command, RB command, BSP command, BSPF command, SP command, FSPF command and WTM command is executed;

③ In the case where, when ES=63 and EP=−1, any one of RD command, RB command, BSP command, BSPF command, SP command and FSPF command is executed;

④ In the case where, when ES=63 and EP=−2, any one of RB command, BSP command, BSPF command, SP command and FSPF command is executed;

⑤ In the case where, when ES=63 and EP=−3, any one of RB command, BSP command, BSPF command, SP command and FSPF command is executed; and ⑥ In the case where, when ES=63 and EP=−4, any one of RD command, SP command and FSPF command is executed.

Incidentally, when the emulation executing conditions shown in FIGS. 74(B) through 81(B) are not satisfied (conditions marked X in the drawings), execution of emulation is impossible, so that a real operation is carried out in the MTU 30.

[2-2-5] Command Processing

Next, a command processing by the control unit 42 in the I/F converting apparatus 40 according to the second embodiment will be described with reference to a flowchart (Steps S1 to S5) shown in FIG. 83.

Figure 83:
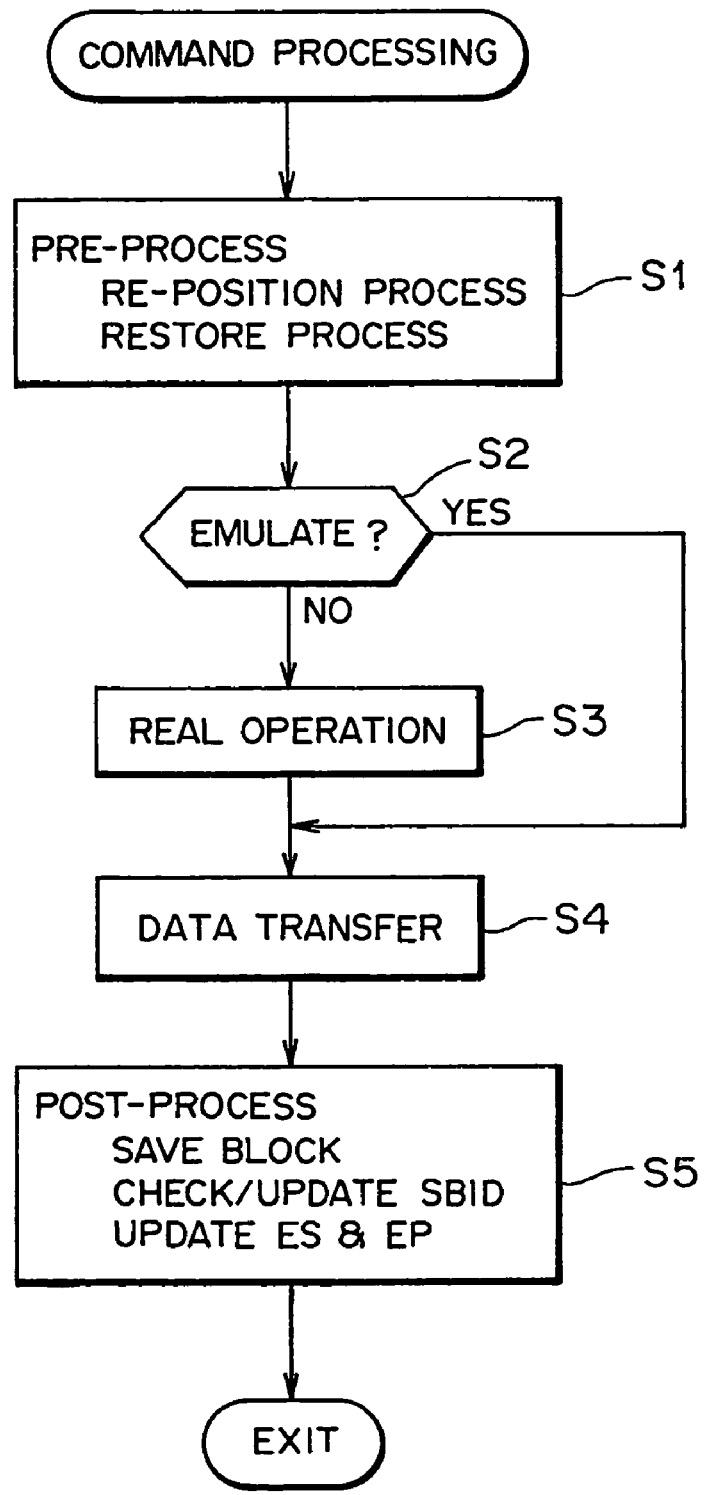
FIG. 83 is a flowchart for illustrating command processing by a control unit in the interface converting apparatus according to the second embodiment.

When receiving a command from the CPU 20, the control unit 42 of the I/F converting apparatus 40 carries out a command processing shown in FIG. 83 for each command.

In the pre-process (Step S1), it is determined which a real operation is carried out in the MTU 30 or emulation is executed according to a type of the command (command code) and values of ES and EP stored in the control areas 46a and 46b in the RAM 46. In addition, a process of re-positioning the magnetic head, and a process of re-storing EOF1/EOF2 are carried out.

At this time, if a relative position (EP) and a real head position differ from each other when a real operation is carried out in the MTU 30, the control unit 42 makes to carry out a process of re-positioning the magnetic head. If emulation of EOF1/EOF2 can be executed in the read command processing (RD process), the control unit 42 restores a data block (EOF1/EOF2) in the save area 46c/46d in the RAM 46 into the data buffer 45, and transfers the data block to the CPU 20 at Step S4 to be described later.

After the pre-process is completed, it is determined at Step S2 whether emulation is possible or not (whether or not decision on that emulation is executed or not is made in the pre-process). When emulation is impossible (NO route), a real operation (SCSI process; Step S3) is carried out, then data is transferred (Step S4). When emulation is possible (YES route), data is transferred without the real operation at Step S3 (Step S4). Incidentally, data transfer at Step S4 is carried out when a process in response to an RD command or a WR command is carried out.

In a post-process (Step S5), EOF1/EOF2 read out from the magnetic tape MT is saved in the save area 46c/46d in the RAM 46. Besides, a process of checking and updating SBID held in the save area 46e in the RAM 46 is carried out, and a process of updating ES and EP stored in the control areas 46a and 46b in the RAM 64 is carried out.

Namely, in the post-process, ES and EP stored in the control areas 46a and 46b in the RAM 46 are updated according to a type of a data block after the real operation or the emulation operation. When it is determined that a data block obtained in the real operation is EOF1 or EOF2, the data block is stored in the save area 46c or 46d in the RAM 46. When it is determined that a data block obtained in the real operation is a tape mark (TM), a real BID (real head position) is stored in the save area (SBID) 46e in the RAM 46, and an identification pattern for EOFs, i.e., "TM, EOF1, EOF2, TM and TM", is confirmed (confirmation on which the identification pattern is Pattern 1, 2, 3 or 4).

If a command directing to identify a channel block ID (a logical position of the magnetic head) such as a read BID command or the like is issued from the CPU 20 when emulation is executed (when ES is 40, 41, 42, 43, 60, 61, 62 or 63), the control unit 42 of the I/F converting apparatus 40 according to the second embodiment sends back a value of SBID+EP as a channel block ID to the CPU 20, along with a value of SBID as a device ID. If a command such as a read BID command or the like is issued from the CPU 20 when emulation is not executed (when ES is 00, 10, 20, 22, 30, 31, 32, 33, 50, 51, 52 or 53), the control unit 42 of the I/F converting apparatus 40 according to the second embodiment issues a read position command to the device (MCU10/MTU30) to obtain ID, and reports it to the CPU 20, as before.

The pre-process (Step S1) and the post-process (Step S5) described above are carried out according to control tables (control matrices; cf. FIGS. 84 to 115) according to a type of command and an identification pattern for EOFs. Hereinafter, the pre-process and the post-process carried out according to a type of command and an identification pattern for EOFs will be described in detail with reference to FIGS. 84 through 115.

[2-2-5-1] RD (Read) Process

① RD Process in Pattern 1 (cf. FIG. 84)

When the I/F converting apparatus 40 receives an RD command, the control unit 42 first refers to the RAM 46 to recognize a value of ES and a value of EP in the pre-process. When the control unit 42 recognizes that ES=00 [cf. FIG. 70(A)], the control unit 42 makes the MTU 30 carry out a real operation (real READ). In the post-process, the control unit 42 determines whether a type of a data block read by the MTU 30 is a tape mark (hereinafter abbreviated as TM) or any other than it. When it is determined that the data block is TM, the control unit 42 stores a real BID of the TM in the save area (SBID) 46*e* in the RAM 46, and updates ES (control area 46*a*) to "10" in the RAM 46 (process ID=1.00.00). When it is determined that the data block is other than TM in the post-process, the control unit 42 holds ES=00 in the RAM 46 (process ID=1.00.01).

When it is recognized that ES=10 in the pre-process [cf. FIG. 70(B)], the control unit 42 makes the MTU 30 carry out the real operation (real READ). In the post-process, the control unit 42 determines which one the type of a data block read by the MTU 30 is of EOF, TM or any other. When it is determined that the data block is EOF (EOF1), the control unit 42 saves the data block (EOF1) in the save area (SDT1) 46*c* in the RAM 46, and updates ES to "20" in the RAM 46 (process ID=1.10.00). When it is determined in the post-process that the data block is TM, the control unit 42 stores a real BID of the TM in the save area (SBID) 46*e* in the RAM 46, and holds ES=10 in the RAM 46 (process ID=1.10.01). When it is determined in the post-process that the data block is other than EOF and TM, the control unit 42 updates ES to "00" in the RAM 46 (process ID=1.10.02).

When it is recognized in the pre-process that ES=20 [cf. FIG. 70(C)], the control unit 42 makes the MTU 30 carry out the real operation (real READ). In the post-process, the control unit 42 determines which one the type of a data block read by the MTU 30 is of EOF, TM or any other. When it is determined that the data block is EOF (EOF2), the control unit 42 saves the data block (EOF2) in the save area (SDT2) 46*d* in the RAM 46, and updates ES to "30" in the RAM 46 (process ID=1.20.00). When it is determined in the post-process that the data block is TM, the control unit 42 stores a real BID of the TM in the save area (SBID) 46*e* in the RAM 46, and updates ES to "10" in the RAM 46 (process ID=1.20.01). When it is determined in the post-process that the data block is other than EOF and TM, the control unit 42 updates ES to "00" in the RAM 46 (process ID=1.20.02).

When it is recognized in the pre-process that ES=30 [cf. FIG. 70(D)], the control unit 42 makes the MTU 30 carry out the real operation (real READ). In the post-process, the control unit 42 determines whether the type of a data block read in the MTU 30 is TM or any other. When it is determined that the data block is TM, the control unit 42 determines a difference between a real BID of the TM and SBID stored in the save area 46*e* [(real BID)–(SBID)]. When confirming that the difference is "3", the control unit 42 stores a real BID of the TM in the save area (SBID) 46*e*, and updates ES to "40" and EP to "0" in the RAM 46 (process ID=1.30.00). When it is determined that the data block is other than EOF and TM, the control unit 42 updates ES to "00" in the RAM 46 (process ID=1.30.01).

When it is recognized in the pre-process that ES=40 and EP=–4 [cf. FIG. 70(E)], the control unit 42 executes emulation of the MTU 30. In the post-process, the control unit 42 updates EP to "–3" while holding ES at a value of "40" in the RAM 46 (process ID=1.40.00).

When it is recognized in the pre-process that ES=40 and EP=–3 [cf. FIG. 70(E)], the control unit 42 executes emulation of MTU 30, and restores the data block (EOF1) in the save area (SDT1) 46*c* in the RAM 46 into the data buffer 45. In the post-process, the control unit 42 updates EP to "–2" while holding ES at a value of "40" in the RAM 46 (process ID=1.40.10).

When it is recognized in the pre-process that ES=40 and EP=–2 [cf. FIG. 70(E)], the control unit 42 executes emulation of the MTU 30, and restores the data block (EOF2) in the save area (SDT2) 46*e* in the RAM 46 into the data buffer 45. In the post-process, the control unit 42 updates EP to "–1" while holding ES at a value of "40" in the RAM 46 (process ID=1.40.20).

When it is recognized in the pre-process that ES=40 and EP=–1 [cf. FIG. 70(E)], the control unit 42 executes emulation of the MTU 30. In the post-process, the control unit 42 updates EP to "0" while holding ES at a value of "40" in the RAM 46 (process ID=1.40.30).

When it is recognized in the pre-process that ES=40 and EP=0 [cf. FIG. 70(E)], the control unit 42 makes the MTU 30 carry out the real operation (real READ). In the post-process, the control unit 42 determines which one the type of a data block read by the MTU 30 is of EOF, TM or any other. When it is determined that the data block is EOF (EOF1), the control unit 42 saves the data block (EOF1) in the save area (SDT1) 46*c* in the RAM 46, and updates ES to "20" in the RAM 46 (process ID=1.40.40). When it is determined in the post-process that the data block is TM, the control unit 42 determines a difference between a real BID of the TM and SBID stored in the save area 46*e* [(real BID)–(SBID)]. When confirming that the difference is "1", the control unit 42 stores a real BID of the TM in the save area (SBID) 46*e* in the RAM 46, and updates ES to "50" in the RAM 46 (process ID=1.40.41). When it is determined in the post-process that the data block is other than EOF and TM, the control unit 42 updates ES to "00" in the RAM 46 (process ID=1.40.42).

When it is recognized in the pre-process that ES=50 [cf. 70(F)], processes similar to the processes of process IDs=1.10.00, 1.10.01 and 1.10.02 described above are carried out in the pre-process and the post-process (process IDs=1.50.00. 1.50.01, 1.50.02).

When it is recognized in the pre-process that ES=60 and EP=–4 [cf. FIG. 70(G)], the control unit 42 executes emulation of MTU 30. In the post-process, the control unit 42 updates EP to "–3" while holding ES at a value of "60" in the RAM 46 (process ID=1.60.00).

When it is recognized in the pre-process that ES=60 and EP=–3 [cf. FIG. 70(G)], the control unit 42 executes emulation of the MTU 30, and restores a data block (EOF1) in the save area (SDT1) 46*c* in the RAM 46 into the data buffer 45.

In the post process, the control unit 42 updates EP to "−2" while holding ES at a value of "60" in the RAM 46 (process ID=1.60.10).

When it is recognized in the pre-process that ES=60 and EP=−2 [cf. FIG. 70(G)], the control unit executes emulation of the MTU 30, and restores a data block (EOF2) in the save area (SDT2) 46d in the RAM 46 into the data buffer 45. In the post-process, the control unit 42 updates EP to "−1" while holding ES at a value of "60" in the RAM 46 (process ID=1.60.20).

When it is recognized in the pre-process that ES=60 and EP=−1 [cf. FIG. 70(G)], the control unit 42 executes emulation of the MTU 30. In the post-process, the control unit 42 updates EP to "0" while holding ES at a value of "60" in the RAM 46 (process ID=1.60.30).

When it is recognized in the pre-process that ES=60 and EP=0 [cf. FIG. 70(G)], the control unit 42 executes emulation of the MTU 30. In the post-process, the control unit 42 updates EP to "+1" while holding ES at a value of "60" in the RAM 46 (process ID=1.60.40).

When it is recognized in the pre-process that ES=60 and EP=+1 [cf. FIG. 70(G)], the control unit 42 re-positions the head at a position SBID+EP [position n+5 in FIG. 70(G)] in the MTU 30, then makes the MTU 30 carry out the real operation (real REA). In the post-process, the control unit 42 determines which one the type of a data block read by the MTU 30 is of EOF, TM or any other. When it is determined that the data block is EOF (EOF1), the control unit 42 saves the data block (EOF1) in the save area (SDT1) 46c in the RAM 46, adds 1 to SBID in the RAM 46, and updates ES to "20" in the RAM 64 (process ID=1.60.50). When it is determined in the post-process that the data block is TM, the control unit 42 stores a real BID of the TM in the save area (SBID) 46e in the RAM 46, and updates ES to "10" in the RAM 46 (process ID=1.60.51). When it is determined in the post-process that the data block is other than EOF and TM, the control unit 42 updates ES to "00" in the RAM 46 (process ID=1.60.52).

② RD Process in Pattern 2 (cf. FIG. 85)

When it is recognized in the pre-process that ES=31 [cf. FIG. 71(D)], processes almost similar to the processes of process IDs=1.30.00 and 1.30.01 described above are carried out in the pre-process and the post-process (process IDs=1.31.00, 1.31.01). ES in the RAM 46 is updated to "41" in the post-process of process ID=1.31.00.

When it is recognized in the pre-process that ES=41 and EP=−4 [cf. FIG. 71(E)], the control unit 42 executes emulation of the MTU 30. In the post-process, the control unit 42 updates EP to "−3" while holding ES at a value of "41" in the RAM 46 (process ID=1.41.00).

When it is recognized in the pre-process that ES=41 and EP=−3 [cf. FIG. 71(E)], the control unit 42 executes emulation of the MTU 30, and restores the data block (EOF1) in the save area (SDT1) in the RAM 46 into the data buffer 45. In the post-process, the control unit 42 updates EP to "−2" while holding ES at a value of "41" in the RAM 46 (process ID=1.41.10).

When it is recognized in the pre-process that ES=41 and EP=−2 [cf. FIG. 71(E)], the control unit 42 re-positions the head at a position SBID+EP [position n+2 in FIG. 71(E)] in the MTU 30, then makes the MTU 30 carry out a real operation (real READ). In the post-process, the control unit 42 determines whether the type of a data block read by the MTU 30 is EOF or any other. When it is determined that the data block is EOF (EOF2), the control unit 42 saves the data block (EOF2) in the save area (SDT2) 46d in the RAM 46, subtracts 3 from SBID in the RAM 46, and updates ES to "30" in the RAM 46 (process ID=1.41.20). When it is determined in the post-process that the data block is other than EOF, the control unit 42 updates ES to "00" in the RAM 46 (process ID=1.41.21).

When it is recognized in the pre-process that ES=41 and EP=−1 [cf. FIG. 71(E)], the control unit 42 executes emulation of the MTU 30. In the post-process, the control unit 42 updates EP to "0" while holding EP at a value of "41" in the RAM 46 (process ID=1.41.30).

When it is recognized in the pre-process that ES=41 and EP=0 [cf. FIG. 71(E)], processes almost similar to those of process IDs=1.40.40, 1.40.41 and 1.40.42 described above are carried out in the pre-process and the post-process (process IDs=1.41.40, 1.41.41, 1.41.42). Note that ES is updated to "51" in the post-process of process ID=1.41.41.

When it is recognized in the pre-process that ES=51 [cf. FIG. 71(F)], processes almost similar to those of process IDs=1.10.00, 1.10.01 and 1.10.02 described above are carried out in the pre-process and the post-process (process IDs=1.51.00, 1.51.01, 1.51.02).

When it is recognized in the pre-process that ES=61 and EP=−4 [cf. FIG. 71(G)], the control unit 42 executes emulation of the MTU 30. In the post-process, the control unit 42 updates ES to "−3" while holding ES at a value of "61" in the RAM 46 (process ID=1.61.00).

When it is recognized in the pre-process that ES=61 and EP=−3 [cf. FIG. 71(G)], the control unit 42 executes emulation of the MTU 30, and restores a data block (EOF1) in the save area (SDT1) 46c in the RAM 46 into the data buffer 45. In the post-process, the control unit 42 updates EP to "−2" while holding ES at a value of "61" in the RAM 46 (process ID=1.61.10).

When it is recognized in the pre-process that ES=61 and EP=−2 [cf. FIG. 71(G)], processes almost similar to those of process IDs=1.41.20 and 1.41.21 described above are carried out in the pre-process and the post-process (process IDs=1.61.20, 1.61.21).

When it is recognized in the pre-process that ES=61 and EP=−1 [cf. FIG. 71(G)], the control unit 42 executes emulation of the MTU 30. In the post-process, the control unit 42 updates EP to "0" while holding ES at a value of "61" in the RAM 46 (process ID=1.61.30).

When it is recognized in the pre-process that ES=61 and EP=0 [cf. FIG. 71(G)], the control unit 42 executes emulation of the MTU 30. In the post-process, the control unit 42 updates EP to "+1" while holding ES at a value of "61" in the RAM 46 (process ID=1.61.4.0).

When it is recognized in the pre-process that ES=61 and EP=+1 [cf. FIG. 71(G)], processes almost similar to those of process IDs=1.60.50, 1.60.51 and 1.60.52 described above are carried out in the pre-process and the post-process (process IDs=1.61.50, 1.61.51, 1.61.52).

③ RD Process in Pattern 3 (cf. FIG. 86)

When it is recognized in the pre-process that ES=22 [cf. FIG. 72(C)], processes almost similar to those of process IDs=1.20.00, 1.20.01 and 1.20.02 described above are carried out in the pre-process and the post-process (process IDs=1.22.00, 1.22.01, 1.22.02). Note that ES in the RAM 46 is updated to "32" in the post-process of process ID=1.22.00.

When it is recognized in the pre-process that ES=32 [cf. FIG. 72(D)], processes almost similar to those of process IDs=1.31.00 and 1.31.01 described above are carried out in the pre-process and the post-process (process IDs=1.32.00, 1.32.01). Note that ES in the RAM 46 is updated to "42" in the post-process of process ID=1.32.00.

When it is recognized in the pre-process that ES=42 and EP=−4 [cf. FIG. 72(E)], the control unit 42 executes emulation of the MTU 30. In the post-process, the control unit 42 updates EP to "−3" while holding ES at a value of "42" of ES in the RAM 46 (process ID=1.42.00).

When it is recognized in the pre-process that ES=42 and EP=−3 [cf. FIG. 72(E)], the control unit 42 re-positions the head at a position SBID+EP [position at n+1 in FIG. 72(E)] in the MTU 30, and makes the MTU 30 carry out a real operation (real READ). In the post-process, the control unit 42 determines whether the type of a data block read by the MTU 30 is EOF or any other. When it is determined that the data block is EOF (EOF1), the control unit 42 saves the data block (EOF1) in the save area (SDT1) 46c in the RAM 46, subtracts 3 from SBID in the RAM 46, and updates ES to "20" in the RAM 46 (process ID=1.42.10). When it is determined in the post-process that the data block is other than EOF, the control unit 42 updates ES to "00" in the RAM 46 (process ID=1.42.11).

When it is recognized in the pre-process that ES=42 and EP=−2 [cf. FIG. 72(E)], the control unit 42 executes emulation of the MTU 30, and restores a data block (EOF2) in the save area (SDT2) 46d in the RAM 46 into the data buffer 45. In the post-process, the control unit 42 updates EP to "−1" while holding ES at a value of "42" in the RAM 46 (process ID=1.42.20).

When it is recognized in the pre-process that ES=42 and EP=−1 [cf. FIG. 72(E)], the control unit 42 executes emulation of the MTU 30. In the post-process, the control unit 42 updates EP to "0" while holding ES at a value of "42" in the RAM 46 (process ID=1.42.30).

When it is recognized in the pre-process that ES=42 and EP=0 [cf. FIG. 72(E)], processes almost similar to those of process IDs=1.40.40, 1.40.41 and 1.40.42 described above are carried out in the pre-process and the post-process (process IDs=1.42.40, 1.42.41, 1.42.42). Note that ES in the RAM 46 is updated to "52" in the post-process of process ID=1.42.41.

When it is recognized in the pre-process that ES=52 [cf. FIG. 72(F)], processes similar to those of process IDs=1.10.00, 1.10.01 and 1.10.02 described above are carried out in the pre-process and the post-process (process IDs=1.52.00, 1.52.01, 1.52.02).

When it is recognized in the pre-process that ES=62 and EP=−4 [cf. FIG. 72G]], the control unit 42 executes emulation of the MTU 30. In the post-process, the control unit 42 updates EP to "−3" while holding ES at a value of "62" in the RAM 46 (process ID=1.62.00).

When it is recognized in the pre-process that ES=62 and EP=−3 [cf. FIG. 72(G)], processes similar to those of process IDs=1.42.10 and 1.42.11 described above are carried out in the pre-process and the post-process (process IDs=1.62.10, 1.62.11).

When it is recognized in the pre-process that ES=62 and EP=−2 [cf. FIG. 72(G)], the control unit 42 executes emulation of the MTU 30, and restores a data block (EOF2) in the save area (SDT2) 46d in the RAM 46 into the data buffer 45. In the post-process, the control unit 42 updates EP to "−1" while holding ES at a value of "62" in the RAM 46 (process ID=1.62.20).

When it is recognized in the pre-process that ES=62 and EP=−1 [cf. FIG. 72(G)], the control unit 42 executes emulation of the MTU 30. In the post-process, the control unit 42 updates EP to "0" while holding ES at a value of "62" in the RAM 64 (process ID=1.62.30).

When it is recognized in the pre-process that ES=62 and EP=0 [cf. FIG. 72(G)], the control unit 42 executes emulation of the MTU 30. In the post-process, the control unit 42 updates EP to "+1" while holding ES at a value of "62" in the RAM 64 (process ID=1.62.40).

When it is recognized in the pre-process that ES=62 and EP=+1 [cf. FIG. 72(G)], processes similar to those of process IDs=1.60.50, 1.60.51 and 1.60.52 described above are carried out in the pre-process and the post-process (process IDs=1.62.50, 1.62.51, 1.62.52).

④ RD Process in Pattern 4 (cf. FIG. 87)

When it is recognized in the pre-process that ES=33 [cf. FIG. 73(D)], processes almost similar to those of process IDs=1.31.00 and 1.31.01 described above are carried out in the pre-process and the post-process (process IDs=1.33.00, 1.33.01). Note that ES in the RAM 46 is updated to "43" in the post-process of process ID=1.33.00.

When it is recognized in the pre-process that ES=43 and EP=−4 [cf. FIG. 73(E)], the control unit 42 executes emulation of the MTU 30. In the post-process, the control unit 42 updates EP to "−3" while holding ES at a value of "43" in the RAM 47 (process ID=1.43.00).

When it is recognized in the pre-process that ES=43 and EP=−3 [cf. FIG. 73(E)], processes similar to those of process IDs=1.42.10 and 1.42.11 described above are carried out in the pre-process and the post-process (process IDs=1.43.10, 1.43.11).

When it is recognized in the pre-process that ES=43 and EP=−2 [cf. FIG. 73(E)], processes almost similar to those of process IDs=1.42.20 and 1.42.21 are carried out in the pre-process and the post-process (process IDs=1.43.20, 1.43.21). Note that ES in the RAM 46 is updated to "32" in the post-process of process ID=1.43.20.

When it is recognized in the pre-process that ES=43 and EP=−1 [cf. FIG. 73(E)], the control unit 42 executes emulation of the MTU 30. In the post-process, the control unit 42 updates EP to "0" while holding ES at a value of "43" in the RAM 46 (process ID=1.43.30).

When it is recognized in the pre-process that ES=41 and EP=0 [cf. FIG. 73(E)], processes almost similar to those of process IDs=1.40.40, 1.40.41 and 1.40.42 described above are carried out in the pre-process and the post-process (process IDs=1.43.40, 1.43.41, 1.43.42). Note that ES in the RAM 46 is updated to "53" in the post-process of process ID=1.43.41.

When it is recognized in the pre-process that ES=53 [cf. FIG. 73(F)], processes similar to those of process IDs=1.10.00, 1.10.01 and 1.10.02 described above are carried out in the pre-process and the post-process (process IDs=1.53.00, 1.53.01, 1.53.02).

When it is recognized in the pre-process that ES=63 and EP=−4 [cf. FIG. 73(G)], the control unit 42 executes emulation of the MTU 30. In the post-process, the control unit 42 updates EP to "−3" while holding ES at a value of "63" in the RAM 46 (process ID=1.63.00).

When it is recognized in the pre-process that ES=63 and EP=−3 [cf. FIG. 73(G)], processes similar to those of process IDs=1.42.10 and 1.42.11 are carried out in the pre-process and the post-process (process IDs=1.63.10, 1.63.11).

When it is recognized in the pre-process that ES=63 and EP=−2 [cf. FIG. 73(G)], processes almost similar to those of process IDs=1.42.20, and 1.41.21 described above are carried out in the pre-process and the post-process (process IDs=1.63.20, 1.63.21). Note that ES in the RAM 46 is updated to "32" in the post-process of process ID=1.63.20.

When it is recognized in the pre-process that ES=63 and EP=−1 [cf. FIG. 73(G)], the control unit 42 executes emulation of the MTU 30. In the post-process, the control unit 42 updates EP to "0" while holding ES at a value of "63" in the RAM 46 (process ID=1.63.30).

When it is recognized in the pre-process that ES=63 and EP=0 [cf. FIG. 73(G)], the control unit 42 executes emulation of the MTU 30. In the post-process, the control unit 42 updates EP to "+1" while holding ES at a value of "63" in the RAM 46 (process ID=1.63.40).

When it is recognized in the pre-process that ES=63 and EP=+1 [cf. FIG. 73(G)], processes similar to those of process IDs=1.60.50, 1.60.51 and 1.60.52 are carried out in the pre-process and the post-process (process IDs=1.63.50, 1.63.51, 1.63.52).

[2-2-5-2] RB (Read Backward) Process

Like the MTC 10 according to the first embodiment, the I/F converting apparatus 40 according to the second embodiment makes an error report to the CPU 20 when receiving an RB command from the CPU 20. When making the MTU 30 really carry out a read backward operation (real RB) in the RB process, the I/F converting apparatus 40 updates ES to "00" as will be described later. When executing emulation of the MTU 10, the I/F converting unit 40 updates EP while holding ES=4x or 6x, as will be described later.

① RB Process in Pattern 1 (cf. FIG. 88)

When the I/F converting apparatus 40 receives an RB command, the control unit 42 first refers to the RAM 46 to recognize a value of ES and a value of EP in the pre-process. When it is recognized that ES=00 [cf. FIG. 70(A)], the control unit 42 makes the MTU 30 carry out a real operation (real RB). In the post-process, the control unit 42 holds ES=00 in the RAM 46 (process ID=2.00.00).

When it is recognized in the pre-process that ES=10 [cf. FIG. 70(B)], the control unit 42 makes the MTU 30 carry out the real operation (real RB). In the post-process, the control unit 42 updates ES to "00" in the RAM 46 (process ID=2.10.00).

When it is recognized in the pre-process that ES=20 [cf. FIG. 70(C)], the control unit 42 makes the MTU 30 carry out the real operation (real RB). In the post-process, the control unit 42 updates ES to "00" in the RAM 46 (process ID=2.20.00).

When it is recognized in the pre-process that ES=30 [cf. FIG. 70(D)], the control unit 42 makes the MTU 30 carry out the real operation (real RB). In the post-process, the control unit 42 updates ES to "00" in the RAM 46 (process ID=2.30.00).

When it is recognized in the pre-process that ES=40 and EP=−4 [cf. FIG. 70(E)], the control unit re-positions the head at a position SBID+EP [position at n in FIG. 70(E)] in the MTU 30, and makes the MTU 30 carry out the real operation (real RB). In the post-process, the control unit 42 updates ES to "00" in the RAM 64 (process ID=2.40.00).

When it is recognized in the pre-process that ES=40 and EP=−3 [cf. FIG. 70(E)], the control unit 42 executes emulation of the MTU 30. In the post-process, the control unit 42 updates EP to "−4" while holding ES at a value of "40" in the RAM 46 (process ID=2.40.10).

When it is recognized in the pre-process that ES=40 and EP=−2 [cf. FIG. 70(E)], the control unit 42 executes emulation of the MTU 30. In the post-process, the control unit 42 updates EP to "−3" while holding ES at a value of "40" in the RAM 46 (process ID=2.40.20).

When it is recognized in the pre-process that ES=40 and EP=−1 [cf. FIG. 70(E)], the control unit 42 executes emulation of the MTU 30. In the post-process, the control unit 42 updates EP to "−2" while holding ES at a value of "40" in the RAM 46 (process ID=2.40.30).

When it is recognized in the pre-process that ES=40 and EP=0 [cf. FIG. 70(E)], the control unit 42 executes emulation of the MTU 30. In the post-process, the control unit 42 updates EP to "−1" while holding ES at a value of "40" in the RAM 46 (process ID=2.40.40).

when it is recognized in the pre-process that ES=50 [cf. FIG. 70(F)], the control unit 42 makes the MTU 30 carry out the real operation (real RB). In the post-process, the control unit 42 determines a difference between a real BID of TM read in read-back and SBID stored in the save area 47*e* [(SBID)−(real BID)]. When confirming that the difference is "1", the control unit 42 stores a real BID of the TM in the save area (SBID) 46*e* in the RAM 46, and updates ES to "60" and EP to "0" in the RAM 46 (process ID=2.50.00).

When recognizing in the pre-process that ES=60 and EP=−4 [cf. FIG. 70(G)], the control unit 42 re-positions the head at a position SBID+EP [position at n in FIG. 70(G)] in the MTU 30, and makes the MTU 30 carry out the real operation (real RB). In the post-process, the control unit 42 updates ES to "00" in the RAM 46 (process ID=2.60.00).

When it is recognized in the pre-process that ES=60 and EP=−3 [cf. FIG. 70(G)], the control unit 46 executes emulation of the MTU 30. In the post-process, the control unit 42 updates EP to "−4" while holding ES at a value of "60" in the RAM 46 (process ID=2.60.10).

When it is recognized in the pre-process that ES=60 and EP=−2 [cf. FIG. 70(G)], the control unit 42 executes emulation of the MTU 30. In the post-process, the control unit 42 updates EP to "−3" while holding ES at a value of "60" in the RAM 46 (process ID=2.60.20).

When it is recognized in the pre-process that ES=60 and EP=−1 [cf. FIG. 70(G)], the control unit 42 executes emulation of the MTU 30. In the post-process, the control unit 42 updates EP to "−2" while holding ES at a value of "60" in the RAM 46 (process ID=2.60.30).

When it is recognized in the pre-process that ES=60 and EP=0 [cf. FIG. 70(G)], the control unit 42 executes emulation of the MTU 30. In the post-process, the control unit 42 updates EP to "−1" while holding ES at a value of "60" in the RAM 46 (process ID=2.60.40).

When it is recognized in the pre-process that ES=60 and EP=+1 [cf. FIG. 70(G)], the control unit 42 executes emulation of the MTU 30. In the post-process, the control unit 42 updates EP to "0" while holding ES at a value of "60" in the RAM 46 (process ID=2.60.50).

② RB Process in Pattern 2 (cf. FIG. 89)

As shown in FIG. 89, pre-processes and post-processes in the RB process in Pattern 2 are almost similar to the pre-processes and the post-processes in the RB process in Pattern 1 described above with reference to FIG. 88. Processes of process IDs=2.31.00 to 2.61.50 shown in FIG. 89 correspond to the processes of process IDs=2.30.00 to 2.60.50 shown in FIG. 88, respectively. Note that ES in the RAM 64 is updated to "41" in the post-processes of process ID=2.41.10 to 2.41.40, and ES in the RAM 46 is updated to "61" in the post-processes of process IDs=2.51.00 and 2.61.10, 2.61.40 to 2.61.50.

③ RB Process in Pattern 3 (cf. FIG. 90)

As shown in FIG. 90, pre-processes and post-processes in the RB process in Pattern 3 are almost similar to the pre-processes and the post-processes in the RM process in Pattern 1 described above with reference to FIG. 88. Processes of process IDs=2.32.00 to 2.62.50 shown in FIG. 90 correspond to the processes of process IDs=2.30.00 to 2.60.50 shown in FIG. 88, respectively. Note that ES in the RAM 46 is updated to "42" in the post-processes of process IDs=2.42.10 and 2.42.40, and ES in the RAM 46 is updated to "62" in the post-processes of process IDs=2.52.00 and 2.62.10, 2.62.40 to 2.62.50.

④ RB Process in Pattern 4 (cf. FIG. 91).

As shown in FIG. 91, pre-processes and post-processes in the RB process in Pattern 4 are almost similar to the pre-processes and the post-processes in the RB process in Pattern 1 described above with reference to FIG. 88. Processes of process IDs=2.33.00 to 2.63.50 shown in FIG. 91 correspond to the processes of process IDs=2.30.00 to 2.60.50 shown in FIG. 88, respectively. Note that ES in the RAM 46 is updated to "43" in the post-processes of process IDs=2.43.10 to 2.43.40, and ES in the RAM 46 is updated to "63" in the post-processes of process IDs=2.53.00 and 2.63.10 to 2.63.50.

[2-2-5-3] WR (Write) Process

① WR Process in Pattern 1 (cf. FIG. 92)

When the I/F converting apparatus 40 receives a WR command, the control unit 42 first refers to the RAM 46 to recognize a value of ES and a value of EP in the pre-process. When it is recognized that ES=00 [cf. 70(A)], the control unit 42 makes the MTU 30 carry out a real operation (real WR). In the post-process, the control unit 42 holds ES=00 in the RAM 46 (process ID=3.00.00).

When it is recognized in the pre-process that ES=10 [cf. FIG. 70(B)], the control unit 42 makes the MTU 30 carry out the real operation (real WR). In the post-process, the control unit 42 determines whether the type of a data block written by the MTU 30 is EOF or any other. When it is determined that the data block is OEF (EOF1), the control unit 42 saves the data block (EOF1) in the save area (SDT1) in the RAM 46, and updates ES to "20" in the RAM 46 (process ID=3.10.00). When it is determined in the post-process that the data block is other than EOF, the control unit 42 updates ES to "00" in the RAM 46 (process ID=3.10.01).

When it is recognized in the pre-process that ES=20 [cf. FIG. 70(C)], the control unit 42 makes the MTU 30 carry out the real operation (real WR). In the post-process, the control unit 42 determines whether the type of a data block written by the MTU 30 is EOF or any other. When it is determined that the data block is EOF (EOF2), the control unit saves the data block (EOF2) in the save area (SDT2) 46*d* in the RAM 46, and updates ES to "30" in the RAM 46 (process ID=3.20.00). When it is determined in the post-process that the data block is other than EOF, the control unit 42 updates ES to "00" in the RAM 46 (process ID=3.20.01).

When it is recognized in the pre-process that ES=30 [cf. FIG. 70(D)], the control unit 42 makes the MTU 30 carry out the real operation (real WR). In the post-process, the control unit 42 updates ES to "00" in the RAM 46 (process ID=3.30.00).

When it is recognized in the pre-process that ES=40 and EP=−4 [cf. FIG. 70(E)], the control unit 42 re-positions the head at a position SBID+EP [position n in FIG. 70(E)] in the MTU 30, and makes the MTU 30 carry out the real operation (real WR). In the post-process, the control unit 42 updates ES to "00" in the RAM 46 (process ID=3.40.00).

When it is recognized in the pre-process that ES=40 and EP=−3 [cf. FIG. 70(E)], the control unit 42 re-positions the head at a position SBID+EP [position n+1 in FIG. 70(E)] in the MTU 30, and makes the MTU 30 carry out the real operation (real WR). In the post-process, the control unit 42 determines whether the type of a data block written by the MTU 30 is EOF or any other. When it is determined that the data block is EOF (EOF1), the control unit 42 saves the data block in the save area (SDT1) 46*c* in the RAM 46, subtracts 3 from SBID in the RAM 46, and updates ES to "20" in the RAM 46 (process ID=3.40.10). When it is determined in the post-process that the data block is other than EOF, the control unit 42 updates ES to "00" in the RAM 46 (process ID=3.40.11).

When it is recognized in the pre-process that ES=40 and EP=−2 [cf. FIG. 70(E)], the control unit 42 re-positions the head at a position SBID+EP [position n+2 in FIG. 70(E)] in the MTU 30, and makes the MTU 30 carry out the real operation (real WR). In the post-process, the control unit 42 determines whether the type of a data block written by the MTU 30 is EOF or any other. When it is determined that the data block is EOF (EOF2), the control unit 42 saves the data block (EOF2) in the save area (SDT2) 46*d* in the RAM 46, subtracts 3 from SBID in the RAM 46, and updates ES to "30" in the RAM 46 (process ID=3.40.20). When it is determined in the post-process that the data block is other than EOF, the control unit 42 updates ES to "00" in the RAM 46 (process ID=3.40.21).

When it is recognized in the pre-process that ES=40 and EP=−1 [cf. FIG. 70(E)], the control unit 42 re-positions the head at a position SBID+EP [position at n+3 in FIG. 70(E)] in the MTU 30, and makes the MTU 30 carry out the real operation (real WR). In the post-process, the control unit 42 updates ES to "00" in the RAM 46 (process ID=3.40.30).

When it is recognized in the pre-process that ES=40 and EP=0 [cf. FIG. 70(E)], processes similar to those of process IDs=3.10.00 and 3.10.01 described above are carried out in the pre-process and the post-process (process IDs=3.40.40, 3.40.41).

When it is recognized in the pre-process that ES=50 [cf. FIG. 70(F)], processes similar to those of process IDs=3.10.00 and 3.10.01 described above are carried out in the pre-process and the post-process (process IDs=3.50.00, 3.50.01).

When it is recognized in the pre-process that ES=60 and EP=−4 [cf. FIG. 70(G)], a process similar to that of process ID=3.40.00 described above is carried out in the pre-process and the post-process (process ID=3.60.00).

When it is recognized in the pre-process that ES=60 and EP=−3 [cf. FIG. 70(G)], processes similar to those of process IDs=3.40.10 and 3.40.11 described above are carried out in the pre-process and the post-process (process IDs=3.60.10, 3.60.11).

When it is recognized in the pre-process that ES=60 and EP=−2 [cf. FIG. 70(G)], processes similar to those of process IDs=3.40.20 and 3.40.21 described above are carried out in the pre-process and the post-process (process IDs=3.60.20, 3.60.21).

When it is recognized in the pre-process that ES=60 and EP=−1 [cf. FIG. 70(G)], a process similar to that of process ID=3.40.30 described above is carried out in the pre-process and the post-process (process ID=3.60.30).

When it is recognized in the pre-process that ES=60 and EP=0 [cf. FIG. 70(G)], processes similar to those of process IDs=3.10.00 and 3.10.01 described above are carried out in the pre-process and the post-process (process IDs=3.60.40, 3.60.41).

When it is recognized in the pre-process that ES=60 and EP=+1 [cf. FIG. 70(G)], the control unit 42 re-positions the head at a position SBID+EP [position n+5 in FIG. 70(G)] in the MTU 30, and makes the MTU 30 carry out the real operation (real WR). In the post-process, the control unit 42 determines whether the type of a data block written by the MTU 30 is EOF or any other. When it is determined that the data block is EOF (EOF1), the control unit 42 saves the data block (EOF1) in the save area (SDT1) 46*c* in the RAM 46, adds 1 to SBID in the RAM 46, and updates ES to "20" in the RAM 46 (process ID=3.60.50). When it is determined in the post-process that the data block is other than EOF, the control unit updates ES to "00" in the RAM 46 (process ID -3.60.51).

② WR Process in Pattern 2 (cf. FIG. 93)

As shown in FIG. 93, pre-processes and post-processes in the WR process in Pattern 2 are similar to the pre-processes and the post-processes in the WR process in Pattern 1 described above with reference to FIG. 92. Processes of process IDs=3.31.00 to 3.61.51 shown in FIG. 93 correspond to the processes of process IDs=3.30.00 to 3.60.51 shown in FIG. 88, respectively.

③ WR Process in Pattern 3 (cf. FIG. 94)

As shown in FIG. 94, pre-processes and post-processes in the WR process in Pattern 3 are almost similar to the pre-processes and the post-processes in the WR process in Pattern 3 described above with reference to FIG. 92. Processes of process IDs=3.22.00 to 3.62.51 shown in FIG. 94 correspond to the processes of process IDs=3.20.00 to 3.60.51 shown in FIG. 92, respectively. Note that ES in the RAM 46 is updated to "32" in the post-processes of process IDs=3.22.00, 3.42.20 and 3.62.20.

④ WR Process in Pattern 4 (cf. FIG. 95)

As shown in FIG. 95, pre-processes and post-processes in the WR process in Pattern 4 are almost similar to the pre-processes and the post-processes in the WR process in Pattern 1 described above with reference to FIG. 92. Processes of process IDs=3.33.00 to 3.63.51 shown in FIG. 95 correspond to the processes of process IDs=3.30.00 to 3.60.51 shown in FIG. 92, respectively. Note that ES in the RAM 46 is updated to "32" in the post-processes of process IDs=3.43.20 and 3.63.20.

[2-2-5-4] BSP (Back Space Block) Process

① BSP Process in Pattern 1 (cf. FIG. 96)

When the I/F converting apparatus 40 receives a BSP command, the control unit 42 first refers to the RAM 46 to recognize a value of ES and a value of EP in the pre-process. When it is recognized that ES=00 [cf. FIG. 70(A)], the control unit 42 makes the MTU 30 carry out a real operation (real BSP). In the post-process, the control unit 42 holds ES=00 in the RAM 46 (process ID=4.00.00).

When it is recognized in the pre-process that ES=10 [cf. FIG. 70(B)], the control unit 42 makes the MTU 30 carry out the real operation (real BSP). In the post-process, the control unit 42 updates ES to "00" in the RAM 46 (process ID=4.10.00).

When it is recognized in the pre-process that ES=20 [cf. FIG. 70(C)], the control unit 42 makes the MTU 30 carry out the real operation (real BSP). In the post-process, the control unit 42 updates ES to "10" in the RAM 46 (process ID=4.20.00).

When it is recognized in the pre-process that ES=30 [cf. FIG. 70(D)], the control unit 42 makes the MTU 30 carry out the real operation (real BSP). In the post-process, the control unit 42 updates ES to "20" in the RAM 46 (process ID=4.30.00).

When it is recognized in the pre-process that ES=40 and EP=−4 [cf. FIG. 70(E)], the control unit re-positions the head at a position SBID+EP [position n in FIG. 70(E)] in the MTU 30, and makes the MTU 30 carry out the real operation (real BSP). In the post-process, the control unit 42 updates ES to "00" in the RAM 46 (process ID=4.40.00).

When it is recognized in the pre-process that ES=40 and EP=−3 [cf. FIG. 70(E)], the control unit 42 executes emulation of the MTU 30. In the post-process, the control unit 42 updates ES to "−4" while holding ES at a value of "40" in the RAM 46 (process ID=4.40.10).

When it is recognized in the pre-process that ES=40 and EP=−2 [cf. FIG. 70(E)], the control unit 42 executes emulation of the MTU 30. In the post-process, the control unit 42 updates EP to "−3" while holding ES at a value of "40" in the RAM 46 (process ID=4.40.20).

When it is recognized in the pre-process that ES=40 and EP=−1 [cf. FIG. 70(E)], the control unit 42 executes emulation of the MTU 30. In the post-process, the control unit 42 updates EP to "−2" while holding ES at a value of "40" in the RAM 46 (process ID=4.40.30).

When it is recognized in the pre-process that ES=40 and EP=0 [cf. FIG. 70(E)], the control unit 42 executes emulation of the MTU 30. In the post-process, the control unit 42 updates EP to "−1" while holding ES at a value of "40" in the RAM 46 (process ID=4.40.40).

When it is recognized in the preprocess that ES=50 [cf. FIG. 70(F)], the control unit 42 makes the MTU 30 carry out the real operation (real BSP). In the post-process, when TM is detected during the back space operation, the control unit 42 determines a difference between a real BID of the TM and BID stored in the save area 46e [(SBID)−(real BID)]. When confirming that the difference is "1", the control unit stores a real BID of the TM in the save area (SBID) 46e in the RAM 46, and updates ES to "60" and EP to "0" in the RAM 46 (process ID=4.50.00).

When it is recognized that ES=60 and EP=−4 [cf. FIG. 70(G)], the control unit 42 re-positions the head at a position SBID+EP [position n in FIG. 70(G)] in the MTU 30, and makes the MTU 30 carry out the real operation (real BSP). In the post-process, the control unit 42 updates ES to "00" in the RAM 46 (process ID=4.60.00).

When it is recognized in the pre-process that ES=60 and EP=−3 [cf. FIG. 70(G)], the control unit 42 executes emulation of the MTU 30. In the post-process, the control unit 42 updates EP to "−4" while holding ES at a value of "60" in the RAM 46 (process ID=4.60.10).

When it is recognized in the pre-process that ES=60 and EP=−2 [cf. FIG. 70(G)], the control unit 42 executes emulation of the MTU 30. In the post-process, the control unit 42 updates EP to "−3" while holding ES at a value of "60" in the RAM 46 (process ID=4.60.20).

When it is recognized in the pre-process that ES=60 and EP=−1 [cf. FIG. 70(G)], the control unit 42 executes emulation of the MTU 30. In the post-process, the control unit 42 updates EP to "−2" while holding ES at a value of "60" in the RAM 46 (process ID=4.60.30).

When it is recognized in the pre-process that ES=60 and EP=0 [cf. FIG. 70(G)], the control unit 42 executes emulation of the MTU 30. In the post-process, the control unit 42 updates EP to "−1" while holding ES at a value of "60" in the RAM 46 (process ID=4.60.40).

When it is recognized in the pre-process that ES=60 and EP=+1 [cf. FIG. 70(G)], the control unit 42 executes emulation of the MTU 30. In the post-process, the control unit 42 updates ES to "60" and EP to "0" in the RAM 46 (process ID=4.60.50).

② BSP process in Pattern 2 (cf. FIG. 97)

As shown in FIG. 97, pre-processes and post-processes in the BSP process in Pattern 2 are almost similar to the pre-processes and the post-processes in the BSP process in Pattern 1 described above with reference to FIG. 96. Processes of process IDs=4.31.00 to 4.61.50 shown in FIG. 97 correspond to the processes of process IDs=4.30.00 to 4.60.50 shown in FIG. 96, respectively. Note that ES in the RAM 46 is updated to "41" in the post-processes of process IDs=4.41.10 to 4.41.40, and ES in the RAM 46 is updated to "61" in the post-processes of process IDs=4.51.00 and 4.61.10 to 4.61.50.

③ BSP Process in Pattern 3 (cf. FIG. 98)

As shown in FIG. 98, pre-processes and post-processes in the BSP process in Pattern 3 are almost similar to the pre-processes and the post-processes in the BSP process in Pattern 1 described above with reference to FIG. 96. Processes of process IDs=4.22.00 to 4.62.50 shown in FIG. 98 correspond to the processes of process IDs=4.20.00 to 4.60.50 shown in FIG. 96, respectively. Note that ES in the RAM 46 is updated to "22" in the post-process of process ID=4.32.00, ES in the RAM 46 to "42" in the post-processes of process IDs=4.42.10 to 4.42.40, and ES in the RAM 46 to "62" in the post-processes of process IDs=4.52.00 and 4.62.10 to 4.62.50.

④ BSP Process in Pattern 4 (cf. FIG. 99)

As shown in FIG. 99, pre-processes and post-processes in the BSP process in Pattern 4 are almost similar to the pre-processes and the post-processes in the BSP process in Pattern 1 described above with reference to FIG. 96. Processes of process ID=4.33.00 to 4.63.50 shown in FIG. 99 correspond to the processes of process IDs=4.30.00 to 4.60.50 shown in FIG. 96, respectively. Note that ES in the RAM 46 is updated to "22" in the post-process of process ID=4.33.00, ES in the RAM 46 to "43" in the post-processes of process IDs=4.43.10 to 4.43.40, and ES in the RAM 46 to "63" in the post-processes of process IDs=4.53.00 and 4.63.10 to 4.63.50.

[2-2-5-4] SBPF (Back Space File) Process

① BSPF Process in Pattern 1 (cf. FIG. 100)

When the I/F converting apparatus 40 receives a BSPF command, the control unit 42 first refers to the RAM 46 to recognize a value of ES and a value of EP in the pre-process. When it is recognized that ES=00 [cf. FIG. 70(A)], the control unit 42 makes the MTU 30 carry out a real operation (real BSP). In the post-process, the control unit 42 holds ES=00 in the RAM 46 (process ID=5.00.00).

When it is recognized in the pre-process that ES=10 [cf. FIG. 70(B)], the control unit 42 makes the MTU 30 carry out the real operation (real BSPF). In the post-process, the control unit 42 updates ES to "00" in the RAM 47 (process ID=5.10.00).

When it is recognized in the pre-process that ES=20 [cf. FIG. 70(C)], the control unit 42 makes the MTU 30 carry out the real operation (real BSPF). In the post-process, the control unit 42 updates ES to "00" in the RAM 46 (process ID=5.20.00).

When it is recognized in the pre-process that ES=30 [cf. FIG. 70(D)], the control unit 42 makes the MTU 30 carry out the real operation (real BSPF). In the post-process, the control unit 42 updates ES to "00" in the RAM 46 (process ID=5.30.00).

When it is recognized in the pre-process that ES=40 and EP=−4 [cf. FIG. 70(E)], the control unit 42 re-positions the head at a position SBID+EP (position n in FIG. 70(E)) in the MTU 30, and makes the MTU 30 carry out the real operation (real BSPF). In the post-process, the control unit 42 updates ES to "00" (process ID=5.40.00).

When it is recognized in the pre-process that ES=40 and EP=−3 [cf. FIG. 70(E)], the control unit 42 executes emulation of the MTU 30. In the post-process, the control unit 42 updates EP to "−4" while holding ES at a value of "40" in the RAM 46 (process ID=5.40.10).

When it is recognized in the pre-process that ES=40 and EP=−2 [cf. FIG. 70(E)], the control unit 42 executes emulation of the MTU 30. In the post-process, the control unit 42 updates EP to "−4" while holding ES at a value of "40" in the RAM 46 (process ID=5.40.20).

When it is recognized in the pre-process that ES=40 and EP=−1 [cf. FIG. 70(E)], the control unit 42 executes emulation of the MTU 30. In the post-process, the control unit 42 updates EP to "−4" while holding ES at a value of "40" in the RAM 46 (process ID=5.40.30).

When it is recognized in the pre-process that Es=40 and EP=0 [cf. FIG. 70(E)], the control unit 42 executes emulation of the MTU 30. In the post-process, the control unit 42 updates EP to "−1" while holding ES at a value of "40" in the RAM 46 (process ID=5.40.40).

When it is recognized in the pre-process that ES=50 [cf. FIG. 70(F)], the control unit 42 makes the MTU 30 carry out the real operation (real BSPF). In the post-process, when TM is detected during the back space operation, the control unit 42 determines a difference between a real BID of the TM and SBID stored in the save area 46e [(SBID)−(real BID)]. When confirming that the difference is "1", the control unit 42 stores a real BID of the TM in the save area (SBID) 46e in the RAM 46, and updates ES to "60" and EP to "0" in the RAM 46 (process ID=5.50.00).

When it is recognized in the pre-process that ES=60 and EP=−4 [cf. FIG. 70(G)], the control unit 42 re-positions the head at a position SBID+EP [position n in FIG. 70(G)] in the MTU 30, and makes the MTU 30 carry out the real operation (real BSPF). In the post-process, the control unit 42 updates ES to "00" in the RAM 46 (process ID=5.60.00).

When it is recognized in the pre-process that ES=60 and EP=−3 [cf. FIG. 70(G)], the control unit 42 executes emulation of the MTU 30. In the post-process, the control unit 42 updates EP to "−4" while holding ES at a value of "60" in the RAM 46 (process ID=5.60.10).

When it is recognized in the pre-process that ES=60 and EP=−2 [cf. FIG. 70(G)], the control unit 42 executes emulation of the MTU 30. In the post-process, the control unit 42 updates EP to "−4" while holding ES at a value of "60" in the RAM 64 (process ID=5.60.20).

When it is recognized in the pre-process that ES=60 and EP=−1 [cf. FIG. 70(G)], the control unit 30 executes emulation of the MTU 30. In the post-process, the control unit 42 updates EP to "−4" while holding ES at a value of "60" in the RAM 46 (process ID=5.60.30).

When it is recognized in the pre-process that ES=60 and EP=0 [cf. FIG. 70(G)], the control unit 42 executes emulation of the MTU 30. In the post-process, the control unit 42 update EP to "−1" while holding ES at a value of "60" in the RAM 46 (process ID=5.60.40).

When it is recognized in the pre-process that ES=60 and EP=+1 [cf. FIG. 70(G)], the control unit 42 executes emulation of the MTU 30. In the post-process, the control unit 42 updates EP to "0" while holding ES at a value of "60" in the RAM 46 (process ID=5.60.50).

② BSPF Process in Pattern 2 (cf. FIG. 101)

As shown in FIG. 101, pre-processes and post-processes in the BSPF process in Pattern 2 are almost similar to the pre-processes and the post-processes in the BSPF process in Pattern 1 described above with reference to FIG. 100. Processes of process IDs=5.31.00 to 5.61.50 correspond to the processes of process IDs=5.30.00 to 5.60.50 shown in FIG. 100, respectively. Note that ES in the RAM 46 is updated to "41" in the post-processes of process IDs=5.41.10 to 5.41.40, and ES in the RAM 46 is updated to "61" in the post-processes of process IDs=5.51.00 and 5.61.10 to 5.61.50.

③ BSPF Process in Pattern 3 (cf. FIG. 102)

As shown in FIG. 102, pre-processes and post-processes in the BSPF process in Pattern 3 are almost similar to the pre-processes and the post-processes in the BSPF process in Pattern 1 described above with reference to FIG. 100. Processes of process IDs=5.22.00 to 5.62.50 correspond to the processes of process IDs=5.20.00 to 5.60.50 shown in FIG. 100, respectively. Note that ES in the RAM 46 is updated to "42" in the post-processes of process IDs=5.42.10 to 5.42.40, and ES in the RAM 46 is updated to "62" in the post-processes of process IDs=5.52.00 and 5.62.10 to 5.62.50.

④ BSPF Process in Pattern 4 (cf. FIG. 103)

As shown in FIG. 103, pre-processes and post-processes in the BSPF process in Pattern 4 are almost similar to the pre-processes and the post-processes in the BSPF process in Pattern 1 described above with reference to FIG. 100. Processes of process IDs=5.33.00 to 5.63.50 correspond to the processes of process IDs=5.30.00 to 5.60.50 shown in FIG. 100, respectively. Note that ES in the RAM 46 is updated to "43" in the post-processes of process IDs=5.43.10 to 5.43.40, and ES in the RAM 46 is updated to "63" in the post-processes of process IDs=5.53.00 and 5.63.10 to 5.63.50.

[2-2-5-6] SP (Forward Space Block) Process

① SP Process in Pattern 1 (cf. FIG. 104)

When the I/F converting apparatus 40 receives an SP command, the control unit 42 first refers to the RAM 46 to recognize a value of ES and a value of EP. When it is recognized that ES=00 [cf. FIG. 70(A)], the control unit 42 makes the MTU 30 carry out a real operation (real SP). In the post-process, the control unit 42 determines whether the type of a data block detected during the forward space operation in the MTU 30 is TM or any other. When it is determined that the data block is TM, the control unit 42 stored a real BID of the TM in the save area (SBID) 46e in the RAM 46, an updates ES (control area 46a) to "10" in the RAM 46 (process ID=6.00.00). When it is determined in the post-process that the data block is other than TM, the control unit 42 holds ES=00 in the RAM 46 (process ID=6.00.01).

When it is recognized in the pre-process that ES=10 [cf. FIG. 70(B)], the control unit 42 makes the MTU 30 carry out the real operation (real SP). In the post-process, the control unit 42 determines which one the type of the data block detected during the forward space operation in the MTU 30 is of EOF, TM or any other. When it is determined that the data block is EOF (EOF1), the control unit 42 updates ES to "22" in the RAM 46 (process ID=6.10.00). When it is determined in the post-process that the data block is TM, the control unit 42 stores a real BID of the TM in the save area (SBID) 46e, and holds ES=10 in the RAM 46 (process ID=6.10.01). When it is determined in the post-process that the data block is other than EOF and TM, the control unit 42 updates ES to "00" in the RAM 46 (process ID=6.10.02).

When it is recognized in the pre-process that ES=20 [cf. FIG. 70(C)], the control unit 42 makes the MTU 30 carry out the real operation (real SP). In the post-process, the control unit 42 determines which one the type of a data block detected during the forward space operation in the MTU 30 is of EOF, TM or any other. When it is determined that the data block is EOF (EOF2), the control unit 42 updates ES to "31" in the RAM 46 (process ID=6.20.00). when it is determined in the post-process that the data block is TM, the control unit 42 stores a real BID of the TM in the save area (SBID) 46e in the RAM 46, and updates ES to "10" in the RAM 46 (process ID=6.20.01). When it is determined in the post-process that the data block is other than EOF and TM, the control unit 42 updates ES to "00" in the RAM 46 (process ID=6.20.02).

When it is recognized in the pre-process that ES=30 [cf. FIG. 70(D)], the control unit 42 makes the MTU 30 carry out the real operation (real SP). In the post-process, the control unit 42 determines whether the type of a data block detected during the forward space operation in the MTU 30 is TM or any other. When it is determined that the data block is TM, the control unit 42 determines a difference between a real BID of the TM and SBID stored in the save area 46e [(real BID)–(SBID)]. When confirming that the difference is "3", the control unit 42 stores a real BID of the TM in the save area (SBID) 46e in the RAM 46, and updates ES to "40" and EP to "0" in the RAM 46 (process ID=6.30.00). When it is determined in the post-process that the data block is other than TM, the control unit 42 updates ES to "00" in the RAM 46 (process ID=6.30.01).

When it is recognized in the pre-process that ES=40 and EP=–4 [cf. FIG. 70(E)], the control unit 42 executes emulation of the MTU 30. In the post-process, the control unit 42 updates EP to "–3" while holding ES at a value of "40" in the RAM 46 (process ID=6.40.00).

When it is recognized in the pre-process that ES=40 and EP=–3 [cf. FIG. 70(E)], the control unit 42 executes emulation of the MTU 30. In the post-process, the control unit 42 updates EP to "–2" while holding ES at a value of "40" in the RAM 46 (process ID=6.40.10).

When it is recognized in the pre-process that ES=40 and EP=–2 [cf. FIG. 70(E)], the control unit 42 executes emulation of the MTU 30. In the post-process, the control unit 42 updates EP to "–1" while holding ES at a value of "40" in the RAM 46 (process ID=6.40.20).

When it is recognized in the pre-process that ES=40 and EP=–1 [cf. FIG. 70(E)], the control unit 42 executes emulation of the MTU 30. In the post-process, the control unit 42 updates EP to "0" while holding ES at a value of "40" in the RAM 46 (process ID=6.40.30).

When it is recognized in the pre-process that ES=40 and EP=0 [cf. FIG. 70(E)], the control unit 42 makes the MTU 30 carry out the real operation (real SP). In the post-process, the control unit 42 determines which one the type of a data block detected during the forward space operation is of EOF, TM or any other. When it is determined that the data block is EOF (EOF1), the control unit 42 updates ES to "22" in the RAM 46 (process ID=6.40.40). It is determined in the post-process that the data block is TM, the control unit 42 determines a difference between a real BID of the TM and SBID stored in the save area 46e [(real BID)–(SBID)]. When confirming that the difference is "1", the control unit 42 stores a real BID of the TM in the save area (SBID) 46e in the RAM 46, and updates Es to "50" in the RAM 46 (process ID=6.40.41). When it is determined that the data block is other than OEF and TM, the control unit 42 updates ES to "00" in the RAM 46 (process ID=6.40.42).

When it is recognized in the pre-process that ES=50 [cf. FIG. 70(F)], processes almost similar to the processes of process IDs=6.10.00, 6.10.01 and 6.10.02 described above are carry out in the pre-processes and the post-processes (process IDs=6.50.00, 6.50.01, 6.50.02). Note that ES in the RAM 46 is updated to "22" in the post-process of process ID=6.50.00.

When it is recognized in the pre-process that ES=60 and EP=–4 [cf. FIG. 70(G)], the control unit 42 executes emulation of the MTU 30. In the post-process, the control unit 42 updates ES to "–3" while holding ES at a value of "60" in the RAM 46 (process ID=6.60.00).

When it is recognized in the pre-process that ES=60 and EP=–3 [cf. FIG. 70(G)], the control unit 42 executes emulation of the MTU 30. In the post-process, the control unit 42 updates EP to "−2" while holding ES at a value of "60" in the RAM 46 (process ID=6.60.10).

When it is recognized in the pre-process that ES=60 and EP=−2 [cf. FIG. 70(G)], the control unit 42 executes emulation of the MTU 30. In the post-process, the control unit 42 updates EP to "−1" while holding ES at a value of "60" in the RAM 46 (process ID=6.60.20).

When it is recognized in the pre-process that ES=60 and EP=−1 [cf. FIG. 70(G)], the control unit 42 executes emulation of the MTU 30. In the post-process, the control unit 42 updates EP to "0" while holding ES at a value of "60" in the RAM 46 (process ID=6.60.30).

When it is recognized in the pre-process that ES=60 and EP=0 [cf. FIG. 70(G)], the control unit 42 executes emulation of the MTU 30. In the post-process, the control unit 42 updates EP to "+1" while holding ES at a value of "60" in the RAM 46 (process ID=6.60.40).

When it is recognized in the pre-process that ES=60 and EP=+1 [cf. FIG. 70(G)], the control unit 42 re-positions the head at a position SBID+EP [position at n+5 in FIG. 70(G)] in the MTU 30, and makes the MTU 30 carry out the real operation (real SP). In the post-process, the control unit 42 determines which one the type of a data block detected during the forward space operation in the MTU 30 is of EOF, TM or any other. When it is determined that the data block is EOF (EOF1), the control unit 42 adds 1 to SBID in the RAM 46, and updates ES to "22" in the RAM 46 (process ID=6.60.50). When it is determined in the post-process that the data block is TM, the control unit 42 stores a real BID of the TM in the save area (SBID) 46*e*, and updates ES to "10" in the RAM 46 (process ID=6.60.51). When it is determined in the post-process that the data block is other than OEF and TM, the control unit 42 updates ES to "00" in the RAM 46 (process ID=6.60.52).

② SP Process in Pattern 2 (cf. FIG. 105)

As shown in FIG. 105, pre-processes and post-processes in the SP process in Pattern 2 are almost similar to the pre-processes and the post-processes in the SP process in Pattern 1 described above with reference to FIG. 104. Processes of process IDs=6.31.00 to 6.61.52 shown in FIG. 105 correspond to the processes of process IDs=6.30.00 to 6.60.52 shown in FIG. 104, respectively.

Note that ES in the RAM 46 is updated to "41" in the post-processes of process IDs=6.31.00 and 6.41.00 to 6.41.30, ES in the RAM 46 to "51" in the post-process of process ID=6.41.41, and ES in the RAM 46 to "61" in the post-processes of process IDs=6.61.00 to 6.61.40.

③ SP Process in Pattern 3 (cf. FIG. 106)

As shown in FIG. 106, pre-processes and post-processes in the SP process in Pattern 3 are almost similar to the pre-processes and the post-processes in the SP process in Pattern 1 described above with reference to FIG. 104. Processes of process IDs=6.22.00 to 6.62.52 shown in FIG. 106 correspond to the processes of process IDs=6.20.00 to 6.60.52 shown in FIG. 104, respectively.

Note that ES in the RAM 46 is updated to "22" in the post-processes of process IDs=6.42.40, 6.52.00 and 6.62.50, ES in the RAM 46 to "33" in the post-process of process ID=6.22.00, ES in the RAM 46 to "42" in the post-processes of process IDs=6.32.00, and 6.42.00 to 6.42.30, ES in the RAM 46 to "52" in the post-process of process ID=6.42.41, and ES in the RAM 46 to "62" in the post-processes of process IDs=6.62.00 to 6.62.40.

④ SP Process in Pattern 4 (cf. FIG. 107)

As shown in FIG. 107, pre-processes and post-processes in the SP process in Pattern 4 are almost similar to the pre-processes and the post-processes in the SP process in Pattern 1 described above with reference to FIG. 104. Processes of process IDs=6.33.00 to 6.63.52 correspond to the processes of process IDs=6.30.00 to 6.60.52 shown in FIG. 104, respectively.

Note that ES in the RAM 46 is updated to "22" in the post-processes of process IDs=6.43.40, 6.53.00 and 6.63.50, ES in the RAM 46 to "43" in the post-processes of process IDs=6.33.00 and 6.43.00 to 6.43.30, ES in the RAM 46 to "53" in the post process of process ID=6.43.41, and ES in the RAM 46 to "63" in the post-processes of process IDs=6.63.00 to 6.63.40.

[2-2-5-7] FSPF (Forward Space File) Process

① FSPF Process in Pattern 1 (cf. FIG. 108)

When the I/F converting apparatus 40 receives an FSPF command, the control unit 42 first refers to the RAM 46 to recognize a value of ES and a value of EP in the pre-process. When it is recognized that ES=00 [cf. FIG. 70(A)], the control unit 42 makes the MTU 30 carry out a real operation (real FSPF). In the post-process, the control unit 42 determines whether the type of a data block detected during the forward space operation in the MTU 30 is TM or any other. When it is determined that the data block is TM, the control unit 42 stores a real BID of the TM in the save area (SBID) 46*e* in the RAM 46, and updates ES (control area 46*a*) to "10" in the RAM 46 (process ID=7.00.00). When it is determined that the data block is other than TM, the control unit 42 holds ES=00 in the RAM 46 (process ID=7.00.01).

When it is recognized in the pre-process that ES=10 [cf. FIG. 70(B)], the control unit 42 makes the MTU 30 carry out the real operation (real FSPF). In the post-process, the control unit 42 determines whether the type of a data block detected during the forward space operation in the MTU 30 is TM or any other. When it is determined that the data block is TM, the control unit 42 determines a difference between a real BID of the TM and SBID stored in the save area 46*e* [(real BID)−(SBID)]. When the difference is "3", the control unit 42 stores the real BID of the TM in the save area (SBID) in the RAM 46, and updates ES to "43" and EP to "0" in the RAM 46 (process ID=7.10.00). When the above difference is not "3", the control unit 42 stores the real BID of the TM in the save area (SBID) 46*e* in the RAM 46, and updates ES to "10" in the RAM 46 (process ID=7.10.01). When it is determined in the post-process that the data block is other than TM, the control unit updates ES to "00" in the RAM 46 (process ID=7.10.02).

When it is recognized in the pre-process that ES=20 [cf. FIG. 70(C)], in the pre-process and the post-process, processes almost similar to the post-processes of process IDs=7.10.00 to 7.10.02 described above are carried out (process IDs=7.20.00 to 7.20.02). Note that ES in the RAM 46 is updated to "41" in the post-process of process ID=7.20.00. When it is recognized in the pre-process that ES=30 [cf. FIG. 70(D)], in the pre-process and the post-processes, processes almost similar to the post-processes of process IDs=7.10.00 to 7.10.02 described above are carried out (process IDs=7.30.00 to 7.30.02). Note that ES in the RAM 46 is updated to "40" in the post-process of process ID=7.30.00.

When it is recognized in the pre-process that ES=40 and EP=−4 [cf. FIG. 70(E)], the control unit 42 executes emulation of the MTU 30. In the post-process, the control unit 42 updates EP to "0" while holding ES at a value of "40" in the RAM 46 (process ID=7.40.00).

When it is recognized in the pre-process that ES=40 and EP=−3 [cf. FIG. 70(E)] the control unit 42 executes emulation of the MTU 30. In the post-process, the control unit 42 updates EP to "0" while holding ES at a value of "40" in the RAM 46 (process ID=7.40.10).

When it is recognized in the pre-process that ES=40 and EP=−2 [cf. FIG. 70(E)], the control unit 42 executes emulation of the MTU 30. In the post-process, the control unit 42 updates EP to "0" while holding ES at a value of "40" in the RAM 46 (process ID=7.40.20).

When it is recognized in the pre-process that ES=40 and EP=−1 [cf. FIG. 70(E)], the control unit 42 executes emulation of the MTU 30. In the post-process, the control unit 42 updates EP to "0" while holding ES at a value of "40" in the RAM 46 (process ID=7.40.30).

When it is recognized in the pre-process that ES=40 and EP=0 [cf. FIG. 70(E)], the control unit 42 makes the MTU 30 execute the real operation (real FSPF). In the post-process, the control unit determines whether the type of a data block detected during the forward space operation in the MTU 30 is TM or any other. When it is determined that the data block is TM, the control unit 42 determines a difference between a real BID of the TM and SBID stored in the save area 46e [(real BID)−(SBID)]. When the difference is "3", the control unit 42 stores the real BID of the TM in the save area (SBID) 46e, and updates ES to "43" and EP to "0" in the RAM 46 (process ID=7.40.40). When the difference is "1", the control unit 42 stores the real BID of the TM in the save area (SBID) 46e in the RAM 46, and updates ES to "50" in the RAM 46 (process ID=7.40.41). When the difference is neither 1 nor 3, the control unit 42 stores the real BID of the TM in the save area (SBID) 46e in the RAM 46, and updates ES to "10" in the RAM 46 (process ID=7.40.42). When it is determined in the post-process that the data block is other than TM, the control unit 42 updates ES to "00" in the RAM 46 (process ID=7.40.43).

When it is recognized in the pre-process that ES=50 [cf. FIG. 70(F)], in the pre-process and the post-process, processes similar to the processes of process IDs=7.10.00, 7.10.01 and 7.10.02 described above are carried out (process IDs=7.50.00, 7.50.01, 7.50.02).

When it is recognized in the pre-process that ES=60 and EP=−4 [cf. FIG. 70(G)], the control unit 42 executes emulation of the MTU 30. In the post-process, the control unit 42 updates EP to "−3" while holding ES at a value of "60" in the RAM 46 (process ID=7.60.00).

When it is recognized in the pre-process that ES=60 and EP=−3 [cf. FIG. 70(G)], the control unit 42 executes emulation of the MTU 30. In the post-process, the control unit 42 updates EP to "0" while holding ES at a value of "60" in the RAM 46 (process ID=7.60.10).

When it is recognized in the pre-process that ES=60 and EP=−2 [cf. FIG. 70(G)], the control unit 42 executes emulation of the MTU 30. In the post-process, the control unit 42 updates EP to "0" while holding ES at a value of "60" in the RAM 46 (process ID=7.60.20).

When it is recognized in the pre-process that ES=60 and EP=−1 [cf. FIG. 70(G)], the control unit 42 executes emulation of the MTU 30. In the post-process, the control unit 42 updates EP to "0" while holding ES at a value of "60" in the RAM 46 (process ID=7.60.30).

When it is recognized in the pre-process that ES=60 and EP=0 [cf. FIG. 70(G)], the control unit 42 executes emulation of the MTU 30. In the post-process, the control unit 42 updates EP to "+1" while holding ES at a value of "60" in the RAM 46 (process ID=7.60.40).

When it is recognized in the pre-process that ES=60 and EP=+1 [cf. FIG. 70(G)], in the pre-processes and the post-processes, processes similar to the processes of process IDs=7.10.00, 7.10.01 and 7.10.02 are carried out (process IDs=7.60.50, 7.60.51, 7.60.52).

② FSPF Process in Pattern 2 (cf. FIG. 109)

As shown in FIG. 109, pre-processes and post-processes in the FSPF process in Pattern 2 are almost similar to the pre-processes and the post-processes in the FSPF process in Pattern 1 described above with reference to FIG. 108. Processes of process IDs=7.31.00 to 7.61.52 shown in FIG. 109 correspond to the processes of process IDs=7.30.00 to 7.60.52 shown in FIG. 108, respectively. Note that ES in the RAM 46 is updated to "41" in the post-processes of process IDs=7.31.00 and 7.41.00 to 7.41.30, ES in the RAM 46 to "43" in the post-processes of process IDs=7.41.40, 7.51.00 and 7.61.50, ES in the RAM 46 to "51" in the post-process of process ID=7.41.41, and ES in the RAM 46 to "61" in the post-processes of process IDs=7.61.00 to 7.61.40.

③ FSPF Process in Pattern 3 (cf. FIG. 110)

As shown in FIG. 110, pre-processes and post-processes in the FSPF process in Pattern 3 are almost similar to the pre-processes and the post-processes in the FSPF process in Pattern 1 described above with reference to FIG. 108. Processes of process IDs=7.22.00 to 7.62.52 shown in FIG. 110 correspond to the processes of process IDs=7.20.00 to 7.60.52 shown in FIG. 108, respectively. Note that ES in the RAM 46 is updated to "43" in the post-processes of process IDs=7.22.00, 7.42.40, 7.52.00 and 7.62.50, ES in the RAM 46 to "42" in the post-processes of process IDs=7.32.00 and 7.42.00 to 7.42.40, ES in the RAM 46 to "52" in the post-process of process ID=7.42.41, and ES in the RAM 46 to "62" in the post-processes of process IDs=7.62.00 to 7.62.40.

④ FSPF Process in Pattern 4 (cf. FIG. 111)

As shown in FIG. 111, pre-processes and post-processes in the FSPF process in Pattern 4 are almost similar to the pre-processes and the post-processes in the SFPF process in Pattern 1 described above with reference to FIG. 108. Processes of process IDs=7.33.00 to 7.63.52 correspond to the processes of process IDs=7.30.00 to 7.60.52 shown in FIG. 108. Note that ES in the RAM 46 is updated to "43" in the post-processes of process IDs=7.33.00, 7.43.00 to 7.43.40, 7.53.00, and 7.63.50, ES in the RAM 46 to "53" in the post-process of process ID=7.43.41, and ES in the RAM 46 to "63" in the post-processes of process IDs=7.63.00 to 7.63.40.

[2-2-5-8] WTM (Write Tape Mark) Process

In the MTU 30, when a writing is carried out in response to a command in the write system (WR, WTM), an EOD (End Of Data) mark is written after a written data block. Therefore, the host (CPU 20) recognizes that there is no data block after a data block having been written in response to a command in the write system after the command in the write system is carried out. According to the second embodiment, when ES=00, 10 or 2x, or when ES=4x and EP=−4, −3 or −2, or when ES=6x and EP=−4, −3, −2, −1 or +1, ES is updated to "10" whenever the real write tape mark operation is carried out, as will be described later with reference to FIGS. 112 through 115.

① WTM Process in Pattern 1 (cf. FIG. 112)

When the I/F converting apparatus 40 receives a WTM command, the control unit 42 first refers to the RAM 46 to recognize a value of ES and a value of EP. When it is recognized that ES=00 [cf. FIG. 70(A)], the control unit 42 makes the MTU 30 carry out a real operation (real WTM). In the post-process, the control unit 42 stores a real BID of a TM written by the MTU 30 in the save area (SBID) 46e in the RAM 46, and holds ES=10 in the RAM 46 (process ID=8.00.00).

When it is recognized in the pre-process that ES=10 [cf. FIG. 70(B)], the control unit 42 makes the MTU 30 carry out the real operation (real WTM). In the post-process, the control unit 42 stores a real BID of a TM written by the MTU 30 in a save area (SBID) 46e in the RAM 46, and holds ES at a value of "10" in the RAM 46 (process ID=8.10.00).

When it is recognized in the pre-process that ES=20 [cf. FIG. 70(C)], the control unit 42 makes the MTU 30 carry out the real operation (real WTM). In the post-process, the control unit 42 stores a real BID of a TM written by the MTU 30 in the save area (SBID) 46e in the RAM 46, and updates ES to "10" in the RAM 46 (process ID=8.20.00).

When it is recognized in the pre-process that ES=30 [cf. FIG. 70(D)], the control unit 42 makes the MTU 30 carry out the real operation (real WTM). In the post-process, the control unit 42 determines a difference between a real BID of a TM written by the MTU 30 and SBID stored in the save area 46e [(real BID)−(SBID)]. When confirming that the difference is "3", the control unit 42 stores the real BID of the TM in the save area (SBID) 46e in the RAM 46, and updates ES to "40" and EP to "0" in the RAM 46 (process ID=8.30.00).

When it is recognized in the pre-process that ES=40 and EP=−4 [cf. FIG. 70(E)], the control unit 42 re-positions the head at a position SBID+EP [position n in FIG. 70(E)] in the MTU 30, and makes the MTU 30 carry out the real operation (real WTM). In the post-process, the control unit 42 stores a real BID of a TM written by the MTU 30 in a save area (SBID) 46e in the RAM 46, and updates ES to "10" in the RAM 46 (process ID=8.40.00).

When it is recognized in the pre-process that ES=40 and EP=−3 [cf. FIG. 70(E)], the control unit 42 re-positions the head at a position SBID+EP [position n+1 in FIG. 70(E)] in the MTU 30, and makes the MTU 30 carry out the real operation (real WTM). In the post-process, the control unit 42 stores a real BID of a TM written by the MTU 30 in a save area (SBID) 46e, and updates ES to "10" in the RAM 46 (process ID=8.40.10).

When it is recognized in the pre-process that ES=40 and EP=−2 [cf. FIG. 70(E)], the control unit 42 re-positions the head at a position SBID+EP [position n+2 in FIG. 70(E)] in the MTU 30, and makes the MTU 30 carry out the real operation (real WTM). In the post-process, the control unit 42 stores a real BID of a TM written by the MTU 30 in the save area (SBID) 46e in the RAM 46, and updates ES to "10" in the RAM 46 (process ID=8.40.20).

When it is recognized in the pre-process that ES=40 and EP=−1 [cf. FIG. 70(E)], the control unit 42 executes emulation of the MTU 30. In the post-process, the control unit 42 updates EP to "0" while holding ES at a value of "40" in the RAM 46 (process ID=8.40.30).

When it is recognized in the pre-process that ES=40 and EP=0 [cf. FIG. 70(E)], the control unit 42 makes the MTU 30 carry out the real operation (real WTM). In the post-process, the control unit 42 determines a difference between a real BID of a TM written by the MTU 30 and SBID stored in the save area 46e [(real BID)−(SBID)]. When confirming that the difference is "1", the control unit 42 stores the real BID of the TM in the save area (SBID) 46e, and updates ES to "50" in the RAM 46 (process ID=8.40.40).

When it is recognized in the pre-process that ES=50 [cf. FIG. 70(F)], the control unit 42 makes the MTU 30 carry out the real operation (real WTM). In the post-process, the control unit 42 stores a real BID of a TM written by the MTU 30 in the save area (SBID) 46e in the RAM 46, and updates ES to "10" in the RAM 46 (process ID=8.50.00).

When it is recognized in the pre-process that ES=60 and EP=−4 [cf. FIG. 70(G)], the control unit 42 re-positions the head at a position SBID+EP [position n in FIG. 70(G)] in the MTU 30, and makes the MTU 30 carry out the real operation (real WTM). In the post-process, the control unit 42 stores a real BID of a TM written by the MTU 30 in the save area (SBID) 46e in the RAM 46, and updates ES to "10" in the RAM 46 (process ID=8.60.00).

When it is recognized in the pre-process that ES=60 and EP=−3 [cf. FIG. 70(G)], the control unit 42 re-positions the head at a position SBID+EP [position n+1 in FIG. 70(G)] in the MTU 30, and makes the MTU 30 carry out the real operation (real WTM). In the post-process, the control unit 42 stores a real BID of a TM written by the MTU 30 in the save area (SBID) 46e in the RAM 46, and updates ES to "10" in the RAM 46 (process ID=8.60.10).

When it is recognized in the pre-process that ES=60 and EP=−2 [cf. FIG. 70(G)], the control unit 42 re-positions the head at a position SBID+EP [position n+2 in FIG. 70(G)] in the MTU 30, and makes the MTU 30 carry out the real operation (real WTM). In the post-process, the control unit 42 stores a real BID of a TM written by the MTU 30 in the save area (SBID) 46e in the RAM 46, and updates ES to "10" in the RAM 46 (process ID=8.60.20).

When it is recognized in the pre-process that ES=60 and EP=−1 [cf. FIG. 70(G)], the control unit 42 re-positions the head at a position SBID+EP [position n+3 in FIG. 70(G)] in the MTU 30, and makes the MTU 30 carry out the real operation (real WTM). In the post-process, the control unit 42 stores a real BID of a TM written by the MTU 30 in the save area (SBID) 46e in the RAM 46, and updates ES to "10" in the RAM 46 (process ID=80.60.30).

When it is recognized in the pre-process that ES=60 and EP=0 [cf. FIG. 70(G)], the control unit 42 executes emulation of the MTU 30. In the post-process, the control unit 42 updates EP to "+1" while holding ES at a value of "60" in the RAM 46 (process ID=8.60.40).

When it is recognized in the pre-process that ES=60 and EP=+1 [cf. FIG. 70(G)], the control unit 42 re-positions the head at a position SBID+EP [position at n+5 in FIG. 70(G)] in the MTU 30, and makes the MTU 30 carry out the real operation (real WTM). In the post-process, the control unit 42 stores a real BID of a TM written by the MTU 30 in the save area (SBID) 46e in the RAM 46, and updates ES to "10" in the RAM 46 (process ID=8.60.50).

② WTM Process in Pattern 2 (cf. FIG. 113)

As shown in FIG. 113, pre-processes and post-processes in the WTM process in Pattern 2 are almost similar to the pre-processes and the post-processes in the WTM process in Pattern 1 described above with reference to FIG. 112. Processes of process IDs=8.31.00 to 8.61.50 shown in FIG. 113 correspond to the processes of process IDs=8.30.00 to 8.60.50 shown in FIG. 112, respectively.

Note that ES in the RAM 46 is updated to "41" in the post-processes of process IDs=8.31.00 and 8.41.30, ES in the RAM 46 to "51" in the post-process of process ID=8.41.40, and ES in the RAM 46 to "61" in the post-processes of process IDs=8.61.40.

③ WTM Process in Pattern 3 (cf. FIG. 114)

As shown in FIG. 114, pre-processes and post-processes in the WTM process in Pattern 3 are almost similar to the pre-processes and the post-processes in the WTM process in Pattern 1 described above with reference to FIG. 112. Processes of process IDs=8.22.00 to 8.62.50 shown in FIG. 114 correspond to the processes of process IDs=8.20.00 to 8.60.50 shown in FIG. 112.

Note that ES in the RAM 46 is updated to "42" in the post-processes of process IDs=8.32.00, 8.42.00 and 8.42.30, ES in the RAM 46 to "52" in the post-process of process ID=8.42.40, and ES in the RAM 46 to "62" in the post-processes of process IDs 8.62.00, 8.62.30 an 8.62.40.

④ WTM Process in Pattern 4 (cf. FIG. 115)

As shown in FIG. 115, pre-processes and post-processes in the WTM process in Pattern 4 are almost similar to the pre-processes and the post-processes in the WTM process in Pattern 1 described above with reference to FIG. 112. Processes of process IDs=8.33.00 to 8.63.50 shown in FIG. 115 correspond to the processes of process IDs=8.30.00 to 8.60.50 shown in FIG. 112, respectively.

Note that ES in the RAM 46 is updated to "43" in the post-processes of process IDs=8.33.00, 8.43.00 and 8.43.30, ES in the RAM 46 to "53" in the post-process of process ID=8.43.40, and ES in the RAM 46 to "63" in the post-processes of process IDs=8.63.00, 8.63.30 and 8.63.40.

[2-3] Practical Examples of Emulation Execution

With reference to FIGS. 116 through 174, description will be next made of practical examples of emulation executed applying the processes (including process IDs=1.00.00 to 8.63.50) described above with reference to FIGS. 83 through 115 to the control process of the I/F converting apparatus 40 (control unit 42).

[2-3-1] Example 1 of Emulation Execution

FIGS. 116(A) and 116(B) are diagrams showing a state of data writing on the magnetic tape MT, and for illustrating an example of commands issued from the CPU 20 when a multi-file is additionally written, and tape operations/emulation operations in the MTU 30 according to the second embodiment in response to the commands. The state of data writing on the magnetic tape MT, the commands issued from the CPU 20 and the tape operations (arrows) in the MTU 30 are similar to those described above with reference to FIGS. 22(A) and 22(B) in the first embodiment, descriptions of which are thus omitted. An identification pattern for EOF1 and EOF2 in the example shown in FIGS. 116(A) and 116(B) is Pattern 1 described above with reference to FIGS. 69 and 70(A) through 70(G)

When the open process [cf. (8) to (22)] shown in FIGS. 116(A) and 116(B) is carried out, the I/F converting apparatus 40 (control unit 42) uses the method according to the second embodiment to emulate command processes (8) to (19) enclosed by broken lines in the drawings, as does in the first embodiment. During which, the I/F converting apparatus 40 does not perform any mechanical operation with the head H being stopped between the last two tape marks TM-b and TM-c, as shown in FIG. 116(A). According to the second embodiment, EOF1 saved in the save area (SDT1) 46c in the RAM 46 is read out and transferred to the CPU 20 via the data buffer 45 when emulation is executed in response to an RD command (11).

Hereinafter, each of the command processing (1) to (24) shown in FIGS. 116(A) and 116(B) will be described in detail with reference to FIGS. 117 through 140.

(A) of FIGS. 117 to 140 shows a state of data block writing on the magnetic tape TM, a real head position (real BID) and a virtual head position (EP) when each of the command processing (1) through (24) are carried out. (B) of FIGS. 117 to 140 shows a state of data saving/storing in the RAM 46 when each of the command processing (1) through (24) are carried out.

(1) WR Process

Figure 117A:
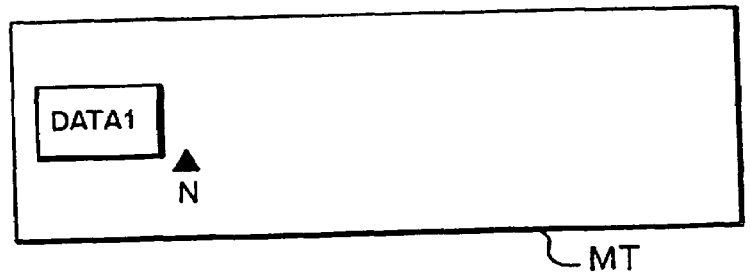
FIGS. 117(A) and 117(B) are diagrams for illustrating an operation [command processing (1) in FIG. 116(A)] according to the second embodiment, FIG. 117(A) showing a state of data writing on the magnetic tape, a real head position and a virtual head position, FIG. 117(B) showing a state of data saving/storing.
Figure 117B:
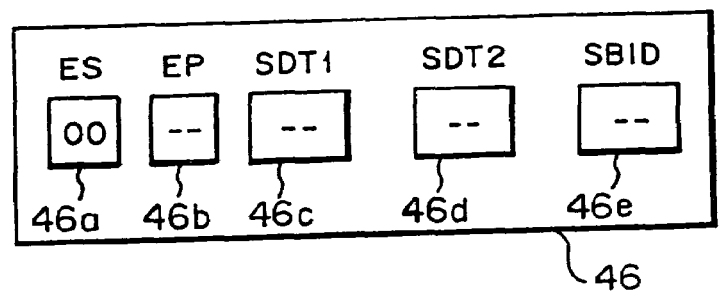

FIG. 117(A) shows a state in which the I/F converting apparatus 40 receives a WR command (1) shown in FIG. 116(A) from the CPU 20, completes a writing of user data and is about to shift to the close process for a file. In FIG. 117(A), the real head position (real BID) is N. At this time, ES in the control area 46a in the RAM 46 indicates the initial state (ES=00), as shown in FIG. 117(B). Incidentally, the control area (EP) 46b and the save areas 46c to 46e in the RAM 46 indicate the undetermined state.

(2) WTM Process

Figure 118A:
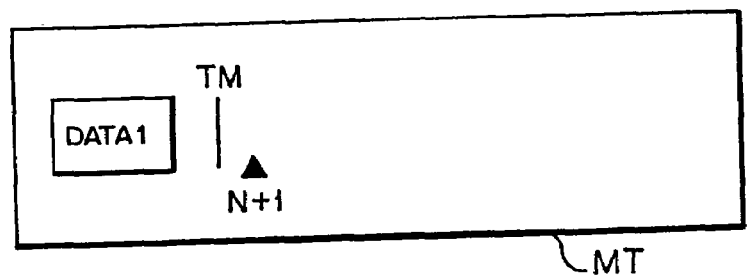
FIGS. 118(A) and 118(B) are diagrams for illustrating an operation [command processing (2) in FIG. 116(A)] according to the second embodiment, FIG. 118(A) showing a state of data writing on the magnetic tape, a real head position and a virtual head position, FIG. 118(B) showing a state of data saving/storing.
Figure 118B:
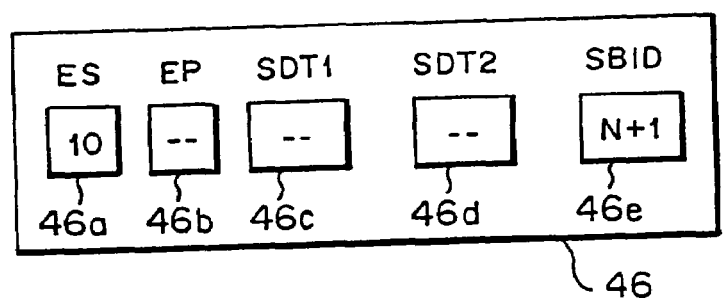

FIG. 118(A) shows a state in which the I/F converting apparatus 40 receives a WTM command (2) shown in FIG. 116(A) from the CPU 20, carried out a process of process ID=8.00.00 and completes a writing of a tape mark TM-a so that the real head position (real BID) is N+1. At this time, "10" is held as ES in the control area 46a and "N+1" is held as SBID in the save area 46e, as shown in FIG. 118(B).

(3) WR Process (EOF1 Write Process)

Figure 119A:
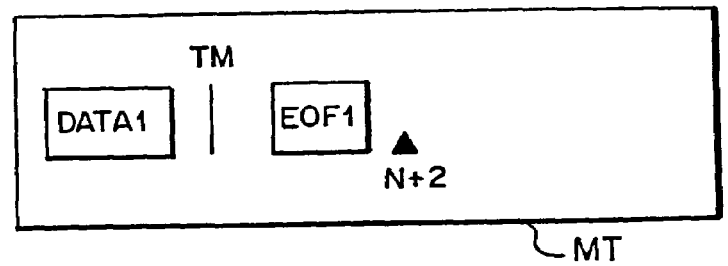
FIGS. 119(A) and 119(B) are diagrams for illustrating an operation [command processing (3) in FIG. 116(A)] according to the second embodiment, FIG. 119(A) showing a state of data writing on the magnetic tape, a real head position and a virtual head position, FIG. 119(B) showing a state of data saving/storing.
Figure 119B:
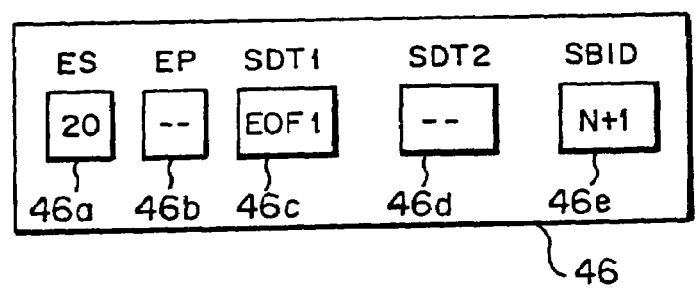

FIG. 119(A) shows a state in which the I/F converting apparatus 40 receives a WR command (3) (direction to write EOF1) shown in FIG. 116(A) from the CPU 20, carries out a process of process ID=3.10.00, and completes a writing of EOF1 so that the real head position (real BID) is N+2. At this time, "20" is held as ES in the control area 47a, and EOF1 is stored in the save area (SDT1) 46c, as shown in FIG. 119(B). Thereafter, EOF1 is held in the save area 46e.

(4) WR Process (EOF2 Write Process)

FIG. 120(A) shows a state in which the I/F converting apparatus 40 receives a WR command (4) (direction to write EOF2) shown in FIG. 116(A) from the CPU 20, carries out a process of process ID=3.20.00, and completes a writing of EOF2 so that the real head position (real BID) is N+3. At this time, "30" is held as ES in the control area 46a, and EOF2 is stored in the save area (SDT2) 46d, as shown in FIG. 120(B). Thereafter, EOF2 is held in the save area 46d.

(5) WTM Process

FIG. 121(A) shows a state in which the I/F converting apparatus 40 receives a WTM command (5) shown in FIG. 116(A) from the CPU 20, carried out a process of process ID=8.30.00, and completes a writing of a tape mark TM-b so that the real head position (real BID) is at N+4. At this time, the I/F converting apparatus 40 stores "N+4" as SBID in the save area 46e after checking that a difference between the real BID and SBID [(real BID)−(SBID)] is "3", as shown in FIG. 121(B). As shown in FIG. 121(B), "40" is held as ES in the control area 46a, and "0" is held as EP in the control area 46b.

(6) WTM Process

FIG. 122(A) shows a state in which the I/F converting apparatus 40 receives a WTM command (6) shown in FIG. 116(A) from the CPU 20, carries out a process of process ID=8.40.40, and completes a writing of a tape mark TM-c so that the real head position (real BID) is n+5. At this time, the I/F converting apparatus 40 stores "N+5" as SBID in the save area 46e after checking that a difference between the real BID and SBID [(real BID)−(SBID)] is "1", as shown in FIG. 122(B). As shown in FIG. 122(B), "50" is held as ES in the control area 46a.

(7) BSPF Process

FIG. 123(A) shows a state in which the I/F converting apparatus 40 receives a BSPF command (7) shown in FIG. 116(A) from the CPU 20, carries out a process of process ID=5.50.00, and completes the back space operation so that the real head position (real BID) is N+4. At this time, the I/F converting apparatus 40 stores "N+4" as SBID in the save area 46e after checking that a difference between the real BID and SBID [(real BID)−(SBID)] is "1", as shown in FIG. 123(B). As shown in FIG. 123(B), "60" is held as ES in the control area 46a, whereas "0" is held as EP in the control area 46b.

(8) BSPF Process

FIG. 123(A) shows a state in which the I/F converting apparatus 40 receives a BSPF command (8) shown in FIG. 116(A) from the CPU 20, and carries out a process of process ID=5.60.40 so as to execute emulation. At this time, the real head position (real BID) is still N+4, not changed. As shown in FIG. 124(B), "60" is held as ES in the control area 46a, whereas "−1" is held as EP in the control area 46b.

(9) BSPF Process

FIG. 125(A) shows a state in which the I/F converting apparatus 40 receives a BSPF command (9) shown in FIG. 116(A) from the CPU 20, and carries out a process of process ID=5.60.30 so as to execute emulation. At this time, the real head position (real BID) is still N+4, not changed. As shown in FIG. 125(B), "60" is held as ES in the control area 46a, whereas "−4" is held as EP in the control area 46b.

(10) FSPF Process

FIG. 126(A) shows a state in which the I/F converting apparatus 40 receives an FSPF command (10) shown in FIG. 116(A) from the CPU 20, and carries out a process of process ID=7.60.00 so as to execute emulation. At this time, the real head position (real BID) is still N+4, not changed. As shown in FIG. 126(B), "60" is held as ES in the control area 46a, whereas "−3" is held as EP in the control area 46b.

(11) RD Process

FIG. 127(A) shows a state in which the I/F converting apparatus 40 receives an RD command (11) shown in FIG. 116(A), and carries out a process of process ID=1.60.10 so as to execute emulation. At this time, the real head position (real BID) is still N+4, not changed. As shown in FIG. 127(B), "60" is held as ES in the control area 46a, whereas "−2" is held as EP in the control area 46b. When the emulation is executed, contents EOF1 in the save area 46c are re-stored in the data buffer 45, and transferred to the CPU 20.

(12) FSPF Process

FIG. 128(A) shows a state in which the I/F converting apparatus 40 receives an FSPF command (12) shown in FIG. 116(A) from the CPU 20, and carries out a process of process ID=7.60.20 so as to execute emulation. At this time, the real head position (real BID) is still N+4, not changed. As shown in FIG. 128(B), "60" is held as ES in the control area 46a, whereas "0" is held as EP in the control area 46b.

(13) RD Process

FIG. 129(A) shows a state in which the I/F converting apparatus 40 receives an RD command (13) shown in FIG. 116(A) from the CPU 20, and carries out a process of process ID=1.60.40 so as to execute emulation. At this time, the real head position (real BID) is still N+4, not changed. As shown in FIG. 129(B), "60" is held as ES in the control area 46a, whereas "+1" is held as EP in the control area 46b. When the emulation is execute, detection of a tape mark (Unit Exception) is reported to the CPU 20.

(14) BSPF Process

FIG. 130(A) shows a state in which the I/F converting apparatus 40 receives a BSPF command (14) shown in FIG. 116(A) from the CPU 20, and carries out a process of process ID=5.60.50 so as to execute emulation. At this time, the real head position (real BID) is still N+4, not changed. As shown in FIG. 130(B), "60" is held as ES in the control area 46a, whereas "0" is held as EP in the control area 46b.

(15) BSPF Process

FIG. 131(A) shows a state in which the I/F converting apparatus 40 receives a BSPF-command (15) shown in FIG. 116(A) from the CPU 20, and carries out a process of process ID=5.60.40 so as to execute emulation. At this time, the real head position (real BID) is still N+4, not changed. As shown in FIG. 131(B), "60" is held as ES in the control area 46a, whereas "−1" is held as EP in the control area 46b.

(16) BSPF Process

FIG. 132(A) shows a state in which the I/F converting apparatus 40 receives a BSPF command (16) shown in FIG. 116(A) from the CPU 20, and carries out the process of process ID=5.60.30 so as to execute emulation, as does in the command process (9). At this time, the real head position (real BID) is still N+4, not changed. As shown in FIG. 132(B), "60" is held as ES in the control area 46a, whereas "−4" is held as EP in the control area 46b.

(17) FSPF Process

FIG. 133(A) shows a state in which the I/F converting apparatus 40 receives an FSPF command (17) shown in FIG. 116(B) from the CPU 20, and carries out the process of process ID=7.60.00 so as to execute out emulation, as does in the command process (10). At this time, the real head position (real BID) is still N+4, not changed. As shown in FIG. 133(B), "60" is held as ES in the control area 46a, whereas "−3" is held as EP in the control area 46b.

(18) RD Process

FIG. 134(A) shows a state in which the I/F converting apparatus 40 receives an RD command (18) shown in FIG. 116(B) from the CPU 20, and carries out the process of process ID=1.60.10 so as to execute emulation, as does in the command process (11). At this time, the real head position (real BID) is still N+4, not changed. As shown in FIG. 134(B), "60" is held as ES in the control area 46a, whereas "−2" is held as EP in the control area 46b. When the emulation is executed, contents EOF1 in the save area 46c is again re-stored in the data buffer 45, and transferred to the CPU 20.

(19) FSPF Process

FIG. 135(A) shows a state in which the I/F converting apparatus 40 receives an FSPF command (19) shown in FIG. 116(B) from the CPU 20, and carries out the process of process ID=7.60.20 so as to execute emulation, as does in the command process (12). At this time, the real head position (real BID) is still N+4, not changed. As shown in FIG. 135(B), "60" is held as ES in the control area 46a, whereas "0" is held as EP in the control area 46b.

(20) WR Process (HDR1 Write Process)

FIG. 136(A) shows a state in which the I/F converting apparatus 40 receives a WR command (20) shown in FIG. 116(B) from the CPU 20, carries out a process of process ID=3.60.41, and completes a writing of HDR1 so that the real head position (real BID) is N+5. At this time, "00" is held as ES in the control area 46a, whereas the control area 46b and the save areas 46c to 46e are in the undetermined state, as shown in FIG. 136(B).

(21) WR Process (HDR2 Write Process)

FIG. 137(A) shows a state in which the I/F converting apparatus 40 receives a WR command (21) (direction to write HDR2) shown in FIG. 116(B) from the CPU 20, carries out a process of process ID=3.00.00, and completes a writing of HDR2 so that the real head position is N+6. At this time, "00" is held as ES in the control area 46a, whereas the control area 46b and the save areas 46c to 46e are in the undetermined state, as shown in FIG. 137(B).

(22) WTM Process

FIG. 138(A) shows a state in which the I/F converting apparatus 40 receives a WTM command (22) shown in FIG. 116(B) from the CPU 20, carries out a process of process ID=8.00.00, and completes a writing of a tape mark TM-d so that the real head position (real BID) is N+7. At this time, "10" is held as ES in the control area 46a, whereas "N+7" is held as EP in the control area 46b, as shown in FIG. 138(B).

(23) WR Process

FIG. 139(A) shows a state in which the I/F converting apparatus 40 receives a WR command (23) (direction to write data 2) shown in FIG. 116(B) from the CPU 20, carries out a process of process ID=3.10.01, and completes a writing of the data 2 so that the real head position (real BID) is N+8. At this time, "00" is held as ES in the control area 46a, whereas the control area 46b and the save areas 46c to 46e are in the undetermined state, as shown in FIG. 139(B).

(24) WR Process

FIG. 140(A) shows a state in which the I/F converting apparatus 40 receives a WR command (24) (direction to write data 2) shown in FIG. 116(B) from the CPU 20, carries out a process of process ID=3.00.00, and completes a writing of the data 2 so that the real head position (real BID) is N+9. At this time, "00" is held as ES in the control area 46a, whereas the control area 46b and the save areas 46c to 46e are in the undetermined state.

[2-3-2] Example 2 of Emulation Execution

FIG. 141 is a diagram showing a state of data writing on the magnetic tape MT, and for illustrating an example of commands issued from the CPU 20 when data is read out from two consecutive files, and tape operations/emulation operations in the MTU 30 according to the second embodiment in response to the commands. The state of data writing on the magnetic tape MT, the commands issued from the CPU 20 and the tape operations (arrows) in the MTU 30 are the same as those described above with reference to FIG. 47, descriptions of which are thus omitted. Incidentally, an identification pattern for EOF1 and EOF2 in the example shown in FIG. 141 is Pattern 4 described above with reference to FIGS. 69(D) and 72(A) through 72(C).

When performing the open process [cf. (4) to (11)] shown in FIG. 141, the I/F converting apparatus 40 (control unit 42) emulates the command processing (4) through (6) enclosed by a broken line in the drawing, using the method according to the second embodiment. During which, the I/F converting apparatus 40 does not perform any mechanical operation with the head H being stopped at the leading position (between TM-b and HDR1) of the second file, as shown in FIG. 141.

According to the second embodiment, since EOF1 and EOF2 are not stored in the respective save areas 46c and 46d in the RAM 46 at the time of the open process, the RD command processing (7) and the FSPF command processing (8) that are emulated in the first embodiment are not emulated according to the second embodiment, but carries out as real operations of the MTU 30. Therefore, EOF1 read out in the real operation of the MTU 30 in response to the RD command (7) is transferred to the CPU 20 via the data buffer 45.

Hereinafter, the command processing (1) to (13) will be described in detail with reference to FIGS. 142 through 154.

(A) of FIGS. 142 through 154 shows a state of data block writing on the magnetic tape MT, a real head position (real BID) and a virtual head position (EP) when each of the command processing (1) to (13) is carried out. (B) of FIGS. 142 through 154 shows a state of data saving/storing in the RAM 46 when each of the command processing (1) to (13) is carried out.

(1) RD Process

FIG. 142(A) shows a state in which the I/F converting apparatus 40 receives an RD command (1) shown in FIG. 141 from the CPU 20, carries out a process of process ID=1.00.01, completes a reading of the last block data (data 1) of the first file, and is about to shift to the close process for the file. In which, the real head position (real BID) is N. At this time, ES in the control area 46a in the RAM 46 indicates the initial state (ES=00), as shown in FIG. 142(B). Incidentally, the control area (EP) 46b and the save areas 46c to 46e in the RAM 46 indicate the undetermined state.

(2) FSPF Process

FIG. 143(A) shows a state in which the I/F converting apparatus 40 receives an FSPF command (2) shown in FIG. 141 from the CPU 20, carries out a process of process ID=7.00.00, and completes the forward space operation so that the real head position (real BID) is N+1. At this time, "10" is held as ES in the control area 46a, whereas "N+1" is held as SBID in the save area 46e, as shown in FIG. 143(B).

(3) FSPF Process

FIG. 144(A) shows a state in which the I/F converting apparatus 40 receives an FSPF command (3) shown in FIG. 141, carries out a process of process ID=7.10.00, and completes the forward space operation in the MTU 30 so that the real head position (real BID) is shifted from N+1 to N+4. According to the second embodiment, EOF1 and EOF2 are skipped in the MTU 30 at this time, so that the I/F converting apparatus 40 cannot capture entities of the EOF1 and the EOF2. After checking that a difference between the real BID and SBID [(real BID)−(SBID)] is "3", the I/F converting apparatus 40 stores "N+4" as SBID in the save area 46e, as shown in FIG. 144(B). As shown in FIG. 144(B), "43" is held as ES in the control area 46a, whereas "0" is held as EP in the control area 46b.

(4) BSPF Process

FIG. 145(A) shows a state in which the I/F converting apparatus 40 receives a BSPF command (4) shown in FIG. 141 from the CPU 20, and carries out a process of process ID=5.43.40 so as to execute emulation. At this time, the real head position (real BID) is still N+4, not changed. As shown in FIG. 145(B), "43" is held as ES in the control area 46a, whereas "−1" is held as EP in the control area 46b.

(5) BSPF Process

FIG. 146(A) shows a state in which the I/F converting apparatus 40 receives a BSPF command (5) shown in FIG. 141 from the CPU 20, and carries out a process of process ID=5.43.30 so as to execute emulation. At this time, the real head position (real BID) is still N+4, not changed. As shown in FIG. 146(B), "43" is held as ES in the control area 46a, whereas "−4" is held as EP in the control area 46b.

(6) FSPF Process

FIG. 147(A) shows a state in which the I/F converting apparatus 40 receives an FSPF command (6) shown in FIG. 141 from the CPU 20, and carries out a process of process ID=7.43.00 so as to execute emulation. At this time, the real head position (real BID) is still N+4, not changed. As shown in FIG. 147(B), "43" is held as ES in the control area 46*a*, whereas "–3" is held as EP in the control area 46*b*.

(7) RD Process

In FIG. 148(A), the I/F converting apparatus 40 receives an RD command (7) shown in FIG. 141 from the CPU 20, carries out a process of process ID=1.43.10 so as to make the MTU 30 carry out a re-positioning process and a real operation (real RD operation), and reads a data block (EOF 1). In the re-positioning process, the I/F converting apparatus 40 positions the head of the MTU 30 at a position of a real BID [=SBID+ EP=(N+4)+(–3)=N+1]. Thereafter, the real head position (real BID) is N+2 by carrying out the real operation. As shown in FIG. 148(B), "20" is held as ES in the control area 46*a*, whereas a value of SBID in the save area 46*e* is updated (SBID -3=N+1), at this time. The data block (EOF1) read by the MTU 30 is stored in the save area (SDT1) 46*c*, stored in the data buffer 45, then transferred to the CPU 20. At this point of time, the identification pattern for EOFs is Pattern 2 described above with reference to FIGS. 69(B) and 71(A) through 71(G).

(8) FSPF Process

FIG. 149(A) shows a state in which the I/F converting apparatus 40 receives an FSPF command (8) shown in FIG. 141 from the CPU 20, and carries out a process of process ID=7.20.00, and completes a real FSPF operation in the MTU 30 so that the real head position (real BID) is N+1. After checking that a difference between the real BID and SBID [(real BID)–(SBID)] is "3", the I/F converting apparatus 40 stores "N+4" as SBID in the save area, as shown in FIG. 149(B). As shown in FIG. 149(B), "41" is held as ES in the control area 46*a*, whereas "0" is held as EP in the control area 46*b*.

(9) RD Process

FIG. 150(A) shows a state in which the I/F converting apparatus 40 receives an RD command (9) shown in FIG. 141 from the CPU 20, carries out a process of process ID=1.41.42 and completes a reading of HDR1 so that the real head position (real BID) is N+5. At this time, "00" is held as ES in the control area 46*a*, whereas the control area 46*b* and the save areas 46*c* to 46*e* are in the undetermined state, as shown in FIG. 150(B).

(10) RD Process

FIG. 151(A) shows a state in which the I/F converting apparatus 40 receives an RD command (10) shown in FIG. 141 from the CPU 20, carries out a process of process ID=1.00.01, and completes a reading of HDR2 so that the real head position (real BID) is N+6. At this time, "00" is held as ES in the control area 46*a*, whereas the control area 46*b* and the save areas 46*c* to 46*e* are in the undetermined state, as shown in FIG. 151(B).

(11) FSPF Process

FIG. 152(A) shows a state in which the I/F converting apparatus 40 receives an FSPF command (11) shown in FIG. 141 from the CPU 20, carries out a process of process ID=7.00.00 and completes the forward space operation so that the real head position (real BID) is N+7. At this time, "10" is held as ES in the control area 46*a*, whereas "N+7" is held as EP in the control area 46*e*, as shown in FIG. 152(B).

(12) RD Process

FIG. 153(A) shows a state in which the I/F converting apparatus 40 receives an RD command (12) shown in FIG. 141 from the CPU 20, carries out a process of process ID=1.10.02, and completes a reading of data 2 so that the real head position (real BID) is at N+8. At this time, "00" is held as ES in the control area 46*a*, whereas the control area 46*b* and the save areas 46*c* to 46*e* are in the undetermined state, as shown in FIG. 153(B).

(13) RD Process

FIG. 154(A) shows a state in which the I/F converting apparatus 40 receives an RD command (13) shown in FIG. 141 from the CPU 20, carries out a process of process ID=1.00.01, and completes a reading of data 2 so that the real head position (real BID) is N+9. At this time, "00" is held as ES in the control area 46*a*, whereas the control area 46*b* and the save areas 46*c* to 46*e* are in the undetermined state, as shown in FIG. 154(B).

[2-3-3] Example 3 of Emulation Execution

FIGS. 155(A) and 155(B) are diagrams showing a state of data writing on the magnetic tape MT, and for illustrating another example of commands issued from the CPU 20 when a process of additionally writing a multi-file is carried out, and tape operations/emulation operations in the MTU 30 according to the second embodiment responsive to the commands. The state of data writing on the magnetic tape MT, the commands issued from the CPU 20 and the tape operations (arrows) in the MTU 30 shown in FIGS. 155(A) and 155(B) are the same as those described above with reference to FIGS. 61(A) and 61(B), descriptions of which are thus omitted. Note that the identification pattern for EOF1 and EOF2 in the example shown in FIGS. 155(A) and 155(B) is Pattern 1 described above with reference to FIGS. 69(A) and 70(A) through 70(G).

When the open process [cf. (8) to (17)] shown in FIGS. 155(A) and 155(B) is carried out, the I/F converting apparatus 40 (control unit 42) emulates the command processing (8) to (14) enclosed by a broken line in the drawings, using the method according to the second embodiment. During which, the I/F converting does not perform any mechanical operation with the head H being stopped between the last two tape marks, TM-b and TM-c, as shown in FIG. 155(A). According to the second embodiment, EOF1 saved in the save area (SDT1) 46*c* in the RAM 46 is read out and transferred to the CPU 20 via the data buffer 45 when the emulation is executed in response to an RD command (11).

The command processing (1) to (14) shown in FIG. 155(A) are the same as the command processing (1) to (14) described above with reference to FIGS. 116(A) and 117 through 130, and the command processing (15) to (19) shown in FIG. 155(B) are the same as the command processing (20) to (24) described above with reference to FIGS. 116(B) and 136 through 140, descriptions of which are thus omitted.

[2-3-4] Example 4 of Emulation Execution

FIG. 156 is a diagram showing a state of data writing on the magnetic tape MT, and for illustrating still another example of commands issued from the CPU 20 when data is read out from two consecutive files, and tape operations/emulation operations in the MTU 30 according to the second embodiment in response to the commands. The state of data writing on the magnetic tape MT, the commands issued from the CPU 20 and the tape operations (arrows) in the MTU 30 are the same as those described above with reference to FIG. 62, descriptions of which are thus omitted. The identification pattern for EOF1 and EOF2 in the example shown in FIG. 156 is Pattern 2 described above with reference to FIGS. 69(B) and 71(A) through 71(G).

When the open process [cf. (4) to (18)] shown in FIG. 156 is carried out, the I/F converting apparatus 40 (control unit 42) emulates the command processing (5) to (8) and (11) to (15) enclosed by broken lines in the drawing, using the method according to the second embodiment. During which, the I/F converting apparatus does not perform any mechanical operation with the head H being stopped at the leading position (between TM-b and HDR1) of the second file as shown in FIG. 156.

According to the second embodiment, since only EOF1 is stored in the save area 46c in the RAM 46 when the open process is carried out, the RD command processing (9) and the FSPF command processing (10) in which emulation is executed in the first embodiment is not emulated, but executed as a real operation of the MTU 30. Therefore, EOF2 read out in the real operation of the MTU 30 responsive to the RD command (9) is transferred to the CPU 20 via the data buffer 45.

Hereinafter, the command processing (1) to (20) shown in FIG. 156 will be described in detail with reference to FIGS. 157 through 172.

(A) of FIGS. 157 through 172 show a state of data block writing on the magnetic tape MT, a real head position (real BID) and a virtual head position (EP) when each of the command processing (1) to (16) is carried out. (B) of FIGS. 157 through 172 shows a state of data saving/storing in the RAM 46 when each of the command processing (1) to (16) is carried out.

(1) RD Process

FIG. 157(A) shows a state in which the I/F converting apparatus 40 receives an RD command (1) shown in FIG. 156 from the CPU 20, executes a process of process ID=1.00.01, completes a reading of the last data block (data 1) of the first file, and is about to shift to the close process for the file. The real head position (real BID) is N. At this time, ES in the control area 46a in the RAM 46 indicates the initial state (ES=00), as shown in FIG. 157(B). Incidentally, the control area (EP) 46b and the save areas 46c to 46e in the RAM 46 are in the undetermined state.

(2) RD Process

FIG. 158(A) shows a state in which the I/F converting apparatus 40 receives an RD command (2) shown in FIG. 156 from the CPU 20, carries out a process of process ID=1.00.00, and detects a tape mark TM-a so that the real head position (real BID) is N+1. At this time, TM detection (Unit Exception) is reported to the CPU 20, besides "10" is held as ES in the control area 46a and "N+1" is held as SBID in the save area 46e, as shown in FIG. 158(B).

(3) RD Process

FIG. 159(A) shows a state in which the I/F converting apparatus 40 receives an RD command (3) shown in FIG. 156 from the CPU 20, carries out a process of process ID=1.10.00, and completes a reading of EOF1 so that the real head position (real BID) is at N+2. At this time, "20" is held as ES in the control area 46a, whereas EOF1 is stored in the save area (SDT1) 46c, as shown in FIG. 159(B). Thereafter, EOF1 is held in the save area 46c.

(4) FSPF Process

FIG. 160(A) shows a state in which the I/F converting apparatus 40 receives an FSPF command (4) shown in FIG. 156 from the CPU 20, carries out a process of process ID=7.20.00, and completes the forward space operation in the MTU 30 so that the real head position (real BID) is shifted from N+1 to N+4. According to the second embodiment, EOF2 is skipped in the MTU 30 at this time so that the I/F converting apparatus 40 cannot capture an entity of the EOF2. After checking that a difference between the real BID and SBID [(real BID)−(SBID)] is "3", the I/F converting apparatus 40 stores "N+4" as SBID in the save area 46e, as shown in FIG. 160(B). As shown in FIG. 160(B), "41" is held as ES in the control area 46a, whereas "0" is held as EP in the control area 46b.

(5) BSPF Process

FIG. 161(A) shows a state in which the I/F converting apparatus 40 receives a BSPF command (5) shown in FIG. 156 from the CPU 20, and carries out a process of process ID=5.41.40 so as to execute emulation. At this time, the real head position (real BID) is still N+4, not changed. As shown in FIG. 161(B), "41" is held as ES in the control area 46a, whereas "−1" is held as EP in the control area 46b.

(6) BSPF Process

FIG. 162(A) shows a state in which the I/F converting apparatus 40 receives a BSPF command (6) shown in FIG. 156 from the CPU 20, and carries out a process of process ID=5.41.30 so as to execute emulation. At this time, the real head position (real BID) is still N+4, not changed. As shown in FIG. 162(B), "41" is held as ES in the control area 46a, whereas "−4" is held as EP in the control area 46b.

(7) FSPF Process

FIG. 163(A) shows a state in which the I/F converting apparatus 40 receives an FSPF command (7) shown in FIG. 156 from the CPU 20, and carries out a process of process ID=7.41.00 so as to execute emulation. At this time, the real head position (real BID) is still "N+4", not changed. As shown in FIG. 163(B), "41" is held as ES in the control area 46a, whereas "−3" is held as EP in the control area 46b.

(8) SP Process

FIG. 164(A) shows a state in which the I/F converting apparatus 40 receives an SP command (8) shown in FIG. 156 from the CPU 20, and carries out a process of process ID=6.41.10 so as to execute emulation. At this time, the real head position (real BID) is still "N+4", not changed. As shown in FIG. 164(B), "41" is held as ES in the control area 46a, whereas "−2" is held as EP in the control area 46b.

(9) RD Process

In FIG. 165(A), the I/F converting apparatus 40 receives an RD command (9) shown in FIG. 156 from the CPU 20, carries out a process of process ID=1.41.20, and makes the MTU 30 carry out a process of re-positioning and a real operation (real RD operation), thereby reading a data block (EOF2). In the re-positioning process, the head of the MTU 30 is re-positioned at the real BID [=SBID+EP=(N+4)+(−2)=N+2]. Thereafter, by carrying out the real operation, the real head position (real BID) is N+3. At this time, "30" is held as ES in the control area 46a, and a value of SBID in the save area 46e is updated (SBID−3=N+1), as shown in FIG. 165(B). The data block (EOF2) read by the MTU 30 is stored in the save area (SDT2) 46d, then stored in the data buffer 45 to be transferred to the CPU 20. At this point of time, the identification pattern for EOFs is Pattern 1 described above with reference to FIGS. 69(A) and 70(A) through 70(G).

(10) FSPF Process

FIG. 166(A) shows a state in which the I/F converting apparatus 40 receives an FSPF command (10) shown in FIG. 156 from the CPU 20, carries out a process of process ID=7.30.00, and completes the real FSPF operation in the MTU 30 so that the real head position (real BID) is N+4. After checking that a difference between the real BID and SBID [(real BID)−(SBID)] is "3", the I/F converting apparatus 40 stores "N+4" as SBID in the save area, as shown in FIG. 166(B). As shown in FIG. 166(B), "40" is held as ES in the control area 46a, whereas "0" is held as EP in the control area 46b.

(11) BSPF Process

FIG. 167(A) shows a state in which the I/F converting apparatus receives a BSPF command (11) shown in FIG. 156 from the CPU 20, and carries out a process of process ID=5.40.40 so as to execute emulation. At this time, the real head position (real BID) is still "N+4", not changed. As shown in FIG. 167(B), "40" is held as ES in the control area 46a, whereas "−1" is held as EP in the control area 46b.

(12) BSPF Process

FIG. 168(A) shows a state in which the I/F converting apparatus 40 receives a BSPF command (12) shown in FIG. 156 from the CPU 20, and carries out a process of process ID=5.40.30 so as to execute emulation. At this time, the real head position (real BID) is still N+4, not changed. As shown in FIG. 162(B), "40" is held as ES in the control area 46a, whereas "−4" is held as EP in the control area 46b.

(13) FSPF Process

FIG. 169(A) shows a state in which the I/F converting apparatus 40 receives an FSPF command (13) shown in FIG. 156 from the CPU 20, and carries out a process of process ID=7.40.00 so as to execute emulation. At this time, the real head position (real BID) is still N+4, not changed. As shown in FIG. 169(B), "40" is held as ES in the control area 46a, whereas "−3" is held as EP in the control area 46b.

(14) RD Process

FIG. 170(A) shows a state in which the I/F converting apparatus 40 receives an RD command (14) shown in FIG. 156 from the CPU 20, and carries out a process of process ID=1.40.10 so as to execute emulation. At this time, the real head position (real BID) is still "N+4", not changed. As shown in FIG. 170(B), "40" is held as ES in the control area 46a, whereas "−2" is held as EP in the control area 46b. When the emulation is executed, contents EOF1 in the save area 46c is again re-stored in the data buffer 45, and transferred to the CPU 20.

(15) FSPF Process

FIG. 171(A) shows a state in which the I/F converting apparatus 40 receives an FSPF command (15) shown in FIG. 156 from the CPU 20, and carries out a process of process ID=7.40.20 so as to execute emulation. At this time, the real head position (real BID) is still "N+4", not changed. As shown in FIG. 171(B), "40" is held as ES in the control area 46a, whereas "0" is held as EP in the control area 46b.

(16) RD Process

FIG. 172(A) shows a state in which the I/F converting apparatus 40 receives an RD command (16) shown in FIG. 156 from the CPU 20, carries out a process of process ID=1.40.42, and completes a reading of HDR1 so that the real head position (real BID) is N+5. At this time, "00" is held as ES in the control area 46a, and the control area 46b and the save areas 47c to 46e are in the undetermined state, as shown in FIG. 172(B).

Incidentally, the command processing (18) to (20) shown in FIG. 157 are the same as the command processing (11) to (13) described above with reference to FIGS. 141 and 152 through 154, descriptions of which are thus omitted.

[2-3-5] Comparison of Performance (Comparison of Command Processing Times)

When a multi-file is additionally written as shown in FIGS. 116(A) and 116(B), a time required for the command processing in which the emulation is executed, applying the method according to the second embodiment is equal to a time required for the command processing according to the first embodiment shown in FIG. 63. As shown in FIG. 63, a time required for all the command processing in which the emulation is not executed is 9.111926 second. In contrast, a time required for all the command processing in which the emulation is executed is 2.734931 second, which is much shorter.

FIG. 173 is a diagram in which a time required for the command processing in which the emulation is executed, applying the method according to the second embodiment is compared with a time required for the command processing applying the known method without executing the emulation, when data is read out from two consecutive files as shown in FIG. 141.

In FIG. 173, a time required for each command processing with emulation is compared with a time required for each command processing without emulation. In FIG. 173, a number in parentheses is entered in a remarks column corresponding to each of the command processing (1) to (13) shown in FIG. 141. A command without a number in parentheses in its remarks column does not relate to the tape operation of the MTU 30, a process corresponding to which is completed within the MTC 10.

As shown in FIG. 173, times required for each of the command processing (1) to (3) and (7) to (13) and command processing not relating to the tape operation are equal in either case where the emulation is carried out or not.

When the emulation is executed, a time required for each of the command processing (4) to (6) is uniformly 0.000500 second since the process is completed within the I/F converting apparatus 40 without a real operation (mechanical operation) in the MTU 30. In contrast to 5.514830 second required for all the command processing in which the emulation is not executed, a time required for all the command processing in which the emulation is executed is 4.768064 second, which is much shorter.

When a multi-file is additionally written as shown in FIGS. 155(A) and 155(B), a time required for command processing in which emulation is executed applying the method according to the second embodiment is equal to a time required for the command processing according to the first embodiment shown in FIG. 65. As shown in FIG. 65, a time required for all the command processing without emulation is 5.831600 second. In contrast, a time required for all the command processing with emulation is 2.728100 second, which is much shorter.

FIG. 174 is a diagram in which a time required for command processing in which emulation is executed, applying the method according to the second embodiment is compared with a time required for command processing applying the known process without emulation, when data is read out from two consecutive files as shown in FIG. 156.

In FIG. 174, a time required for each process without emulation is compared with a time required for the same process with emulation. In FIG. 174, a number in parentheses is entered in a remarks column of a command corresponding to each of the command processing (1) to (20) shown in FIG. 156. Incidentally, a command without a number in parentheses in its remarks column does not relate to the tape operation in the MTU 30, a process according to which is completed within the MTC 10.

As shown in FIG. 174, times required for each of the command processing (1) to (4), (9), (10), and (16) to (20) in which no emulation is executed and command processing not relating to the tape operation are equal in either case where the emulation is executed or not. In contrast, a time required for each the command processing (5) to (8) and (11) to (15) in which emulation is executed is uniformly 0.000500 second since the process is completed within the I/F converting apparatus 40 without a real tape operation (mechanical operation) in the MTU 30. Therefore, in contrast to 8.781900 second required for all the command processing without emulation, a time required for all the command processing with emulation is 4.817000 second, which is much shorter.

[2-4] Effects of the Second Embodiment

According to the method for controlling a magnetic tape unit of the second embodiment of this invention, a tape operation relating to EOF identification in the open process for a file is emulated in the I/F converting apparatus 40, thereby providing the similar effects and advantages to the first embodiment.

[2-5] Description of a Modification of the Second Embodiment

Meanwhile, when a technique such as EDRC (Enhanced Data Recording Capability) compression or the like is used, logical blocks of EOF1 and EOF2 are generally packeted in one physical block while they are not compressed by a packeting function for logical blocks.

For this, when a read direction (a direction to read) for either one of the EOF logical blocks is issued from the channel (CPU 20), packets (logical packets) of both EOF1 and EOF2 that are packeted in one physical block are simultaneously stored in the data buffer 45 by executing only one read command even without a read direction for the other EOF logical block.

For example, as shown in FIG. 276(A) EOF1 and EOF2 are handled as packeted in two respective packets and recorded on the magnetic tape MT in the logical image. In the physical image, as shown in FIG. 276(B), EOF1 and EOF2 are handled as packeted in one physical block and recorded on the magnetic tape MT. Accordingly, even if a read direction to read only EOF1 is issued from the CPU 20, the whole one physical block is practically read out, thus not only EOF1 but also EOF2 is stored in the data buffer 45, as shown in FIG. 276(C).

According to a modification of the second embodiment, by using the both packets (logical blocks) stored in the data buffer 45 as described above when the close process for a file is carried out, a state of emulation is monitored as if the both packets are read. When the open process for the file is carried out, emulation of the read process for EOF1 and EOF2 is realized.

EOF1 or EOF2 skipped in accordance with an SP command or an FSPF command at the time of the close process for a file are considered to be not read out from the magnetic tape MT in the logical image. For this, when a read direction (read command) for EOF1 or EOF2 skipped at the time of the open process for the file is issued from the CPU 20, the MTU 30 is made to carry out a real read operation.

When EDRC compression is used, both of EOFs are read out to the data buffer 45 if a read process for either one of EOF1 and EOF2 is carried out at the time of the close process, as stated above.

In such case, when a read direction for an EOF that has been an object of skip at the time of the close process is issued from the CPU 20 in the open process, emulation of reading the EOF is executed. Namely, the EOF stored in the data buffer 45 is read out from the data buffer 45 and transferred to the CPU 20 without making the MTU 30 carry out the real read process.

This will be described in more detail with reference to FIG. 156. In the example shown in FIG. 156, commands are issued from the CPU 20 such that only EOF1 is read in the RD process (3) in the close process for the file, and EOF2 is skipped in the FSPF process (4). At this time, if EOF1 and EOF 2 are recorded in one physical block on the magnetic tape MT by the packeting function of EDRC or the like, both of EOF1 and EOF2 are read out to the data buffer 45 in the RD process (3), as described above.

According to the modification of the second embodiment, pointers indicating positions (positions in the data buffer 45) of data of EOF1 and EOF2 are stored in the save areas 46*c* and 46*d* in the RAM 46, for example.

At this time, data in one physical block is identified when the physical block is read into the data buffer 45, and a result of the identification is held in the RAM 46 as control flags (EOF detection flags) V1 and V2. These control flags V1 and V2 are such set that valid/invalid of the save areas 46*c* and 46*d* is 1/0. The control flag V1 is set to "1" when there is EOF1 in the physical block. When there is EOF2 in the physical block, the control flag V2 is set to "1". Referring to states of the control flags V1 and V2, transition of the states is adjusted so that emulation of reading the two EOF packets is executed (adjustment of a value of ES).

For example, when a check on states of the control flags V1 and V2 results in both "1" after a command to read only EOF1 is executed, primarily, "41" (meaning that reading EOF1 can be emulated) should be set as a value of ES in the control area 46*a* in the RAM 46. However, according to this modification, "40" (both of reading EOF1 and reading EOF2 can be emulated) is set.

Similarly, when a check on states of the control flags V1 and V2 results in both "1" after a command to read only EOF2 is executed, primarily, "42" (reading EOF2 can be emulated) should be set as a value of ES in the control area 46*a* in the RAM 46. However, according to this modification, "40" (both of reading EOF1 and reading EOF2 can be emulated) is set.

When data other than EOF2 is stored in a physical block in which EOF1 is packeted although a command to read only EOF1 is executed, the control flag V1 is set to "1" while the control flag V2 is set to "0". In which case, "41" (reading EOF1 can be emulated) is set as usual as a value of ES in the control area 46*a* in the RAM 46.

Back to the example shown in FIG. 156, next description will be of a case where EOF2 is read out from the magnetic tape MT in the RD process (9) after both EOF1 and EOF2 are read out to the data buffer 45 in the RD process (3). In which case, the MTU 30 is made to carry out the real operation (real RD operation) according to the second embodiment. However, according to this modification, EOF2 is already read out to the data buffer 45, as stated above, "40" is thus held as ES in the control area 46*a* in the FSPF process (4). Accordingly, the RD process (9) and the following FSPF process (10) are emulated according to this modification.

According to the modification of the second embodiment, use of the packeting function of EDRC or the like enables emulation of a larger number of tape operations, which can thus more shorten a time required for the file open process. This leads to large improvements of the file open process performance, and further the processing performance of a system accessing to the MTU 30 via the I/F converting apparatus 40.

[3] Description of a Third Embodiment

[3-1] Basic Structure

A method for controlling a magnetic tape unit according to a third embodiment is applied to a system similar to that according to the second embodiment. According to the third embodiment, emulation of the MTU 30 is executed in a process in an I/F converting apparatus 40 similar to that according to the second embodiment.

The system or the I/F converting apparatus 40 to which the third embodiment is applied is structured similarly to that described above with reference to FIGS. 67 and 68 in the second embodiment, descriptions of which are thus omitted. Note that "70" to "83" to be described later are held as values of emulation status (ES) in the area 46a (cf. FIG. 68) in the RAM 46, in addition to "00" to "63".

[3-2] Control Method According to the Third Embodiment

Now, description will be made of the method for controlling a magnetic tape unit according to the third embodiment with reference to FIGS. 202 through 275.

[3-2-1] Basic Operation

The basic operation of the method according to the third embodiment is almost similar to that according to the second embodiment. According to the third embodiment, not only the operation according to the second embodiment can be carried out, but also the operation carried out in the file close process can be simplified. In concrete, an operation of writing the third tape mark TM-c after writing the second tape mark TM-b is emulated when the file close process is carried out, thereby decreasing the frequency of the mechanical tape operation in the MTU 30 in the close process, thus simplifying the tape operation in the close process.

The I/F converting apparatus 40 according to the third embodiment has a function for realizing the control method described in the second embodiment. In addition, the I/F converting apparatus 40 has a function of, when receiving a WTM command requiring to write the third tape mark TM-c on the magnetic tape MT after writing the second tape mark TM-c on the same in the file close process, reporting write completion of the third tape mark TM-c to the CPU 20 on the assumption that the writing of the third tape mark TM-c is virtually completed without really writing it. Namely, the I/F converting apparatus 40 executes emulation of an operation of writing the third tape mark TM-c.

According to the third embodiment, when the I/F converting apparatus 40 receives a command in the read system (RD command, RB command) or a command in the control system (BSP command, BSPF command, SP command, FSPF command) from the CPU 20 after executing emulation of an operation of writing the third tape mark TM-c [in a state at the time that ES=7x to be described later with reference to FIGS. 202(H) and 203] as stated above, the I/F converting apparatus 40 executes emulation of the command while managing a value of EP within a range of EP from −4 to +1, with the real head position being fixed at a position immediately after the second tape mark TM-b.

According to the third embodiment, when the I/F converting apparatus 40 receives a command directing to position the head outside a range of EP from −4 to +1 (i.e., a range from immediately before the first tape mark TM-a to immediately after the third tape mark TM-c) after executing emulation of an operation of writing the third tape mark TM-c as stated above, the I/F converting apparatus 40 writes the third tape mark TM-c, then makes the MTU 30 carry out a real tape operation in response to the command.

As a command directing to position the head outside a range of EP from −4 to +1, there are a command in the read system, a command in the control system, a command in the write system (WR command, WTM command) and a command in the motion system involving unloading and rewinding. Meanwhile, the unload command is a direction to rewind the magnetic tape MT up to the head, and eject a cassette including the magnetic tape MT from the MTU 30. The rewind command is a direction to rewind the magnetic tape MT up to the head. Note that when a multi-file is additionally written, a writing of data such as a header (HDR1) or the like is commenced immediately after the second tape mark TM-b without writing the third tape mark TM-c.

When the I/F converting apparatus 40 terminates a process while the third tape mark TM-c cannot be recorded on the magnetic tape MT due to a failure such as power-off or the like after carrying out emulation of an operation of writing the third tape mark TM-c is executed as stated above, immediately after the second tape mark TM-b is EOD (End Of Data) on the magnetic tape MT after the failure is recovered. Consequently, the I/F converting apparatus 40 detects the EOD after detecting or writing the second tape mark TM-b.

According to the method of the third embodiment, when the I/F converting apparatus 40 detects EOD after detecting or writing the second tape mark TM-b as above, the I/F converting apparatus 40 assumes that the third tape mark TM-c is detected, then makes a report about detection of the third tape mark TM-c instead of the EOD report (report about EOD detection) to the CPU 20. Thereafter, the CPU 20 issues a command to the MTU 30, on the assumption that the third tape mark TM-c has been detected.

According to the method of the third embodiment, when the I/F converting apparatus 40 receives a command in the read system or a command in the control system from the CPU 20 after making a third tape mark TM-c detection report [in a state at the time that ES=8x to be described later with reference to FIGS. 202(I) and 203] in stead of the EOD report as above, the I/F converting apparatus 40 executes emulation of the command while managing a value of ES within a range of EP from −4 to +1, with the real head position being fixed at a position immediately after the second tape mark TM-b.

According to the method of the third embodiment, when the I/F converting apparatus 40 receives a command directing to position the head outside a range of EP from −4 to +1 after making a third tape mark TM-c detection report instead of the EOD report as above, the I/F converting apparatus 40, basically, makes the MTU 30 carry out a real tape operation in response to the command on the assumption that the third tape mark TM-c has been written. When a multi-file is additionally written, a writing of data such as a header (HDR1) or the like is commenced immediately after the second tape mark TM-b.

[3-2-2] Identification Pattern for EOFs

Four identification pattern for EOFs by the I/F converting apparatus 40 according to the third embodiment are similar to those described above in the second embodiment. Depending on either a case where a data block can be identified as EOF1 or EOF2 by carrying out a read operation or a write operation in response to an RD command or a WR command, or a case where a data block can be identified as EOF1 or EOF2 by carrying out a skip operation in response to an SP command or an FSPF command, there are classified into four identification patterns (Pattern 1 to Pattern 4; cf. FIG. 69(A) to 69(D)).

[3-2-3] Emulation Status

Next, description will be made of the emulation status (ES) according to the third embodiment with reference to FIGS. 69(A) through 69(D), 202(A) through 202(I) and 203.

According to the third embodiment, similarly to the second embodiment, when both of EOF1 and EOF2 can be identified (Pattern 1) as shown in FIG. 69(A), ES=x0. When only EOF 1 can be identified and EOF2 is skipped (Pattern 2) as shown in FIG. 69(B), ES=x1. When EOF 1 is skipped and only EOF 2 can be identified (Pattern 3) as shown in FIG. 69(C), ES=x2. When both of EOF1 and EOF2 are skipped (Pattern 4) as shown in FIG. 69(D), ES=x3. Note that "x" is a value to be determined according to a position of the magnetic head, as will be described later.

In the I/F converting apparatus 40 according to the third embodiment, status monitoring is carried out on the basis of a value of ES. Particularly, according to the third embodiment, when a value of ES is "7x" or "8x" (x=0, 1, 2 or 3), in addition to when a value of ES is "4x" or "6x" (x=0, 1, 2 or 3) as in the second embodiment, execution of emulation is possible.

In a state in which execution of emulation is possible (ES=4x, 6x, 7x or 8x), the virtual head position (a virtual position of the head relative to the magnetic tape MT) is managed with the emulation pointer (EP). A value of EP is expressed as a relative position from the real head position. In FIGS. 202(A) through 202(I), a black triangle mark indicates the real head position, whereas a white triangle mark indicates the virtual head position when execution of emulation is possible.

FIGS. 202(A) through 202(I) are diagrams for illustrating emulation status (ES) in the third embodiment. In FIGS. 202(C) through 202(I), the identification pattern for EOF1 and EOF2 is Pattern 1.

Figure 202A:

FIG. 202(A) shows a state when ES=00 (initial state). As shown in FIG. 202(A), the state at the time that ES=00 is a state in which a writing of an arbitrary data block (data 1 in the drawings) on the magnetic tape MT is completed, where the actual head position relative to the magnetic tape MT is immediately after the data block. The real head position (hereinafter referred as real BID) at the time that ES=00 is n (BID of the arbitrary data block). At this time, a value of EP is undetermined.

Figure 202B:

FIG. 202(B) shows a state at the time that ES=10. As shown in FIG. 202(B), the state at the time that ES=10 is a state in which the first tape mark TM-a is detected or written, where the real head position is immediately after the first tape mark TM-a. The real BID at the time that ES=10 is n+1. At this time, a value of EP is undetermined.

Figure 202C:
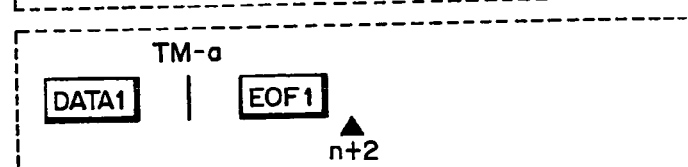

FIG. 202(C) shows a state at the time that ES=2x. As shown in FIG. 202(C), the state at the time that ES=2x is a state in which EOF1 is detected or written, where the real head position is immediately after EOF1. The real BID at the time that ES=2x is n+2. At this time, a value of EP is undetermined, and x is 0 or 2.

Figure 202D:
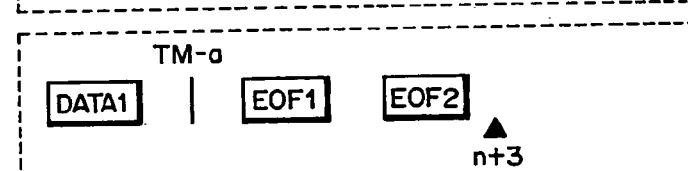

FIG. 202(D) shows a state at the time that ES=3x. As shown in FIG. 202(D), the state at the time that ES=3x is a state in which EOF2 is detected or written, where the real head position is immediately after EOF2. The real BID at the time that ES=3x is n+3. At this time, a value of EP is undetermined, and x takes any one of 0, 1, 2 and 3.

Figure 202E:
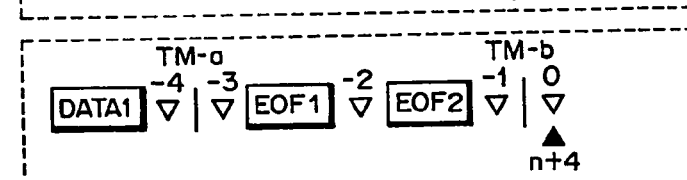

FIG. 202(E) shows a state at the time that ES=4x. As shown in FIG. 202(E), the state at the time that ES=4x is a state in which the second tape mark TM-b is detected or written, where the real head position is immediately after the second tape mark TM-b. The real BID at the time that ES=4x is n+4. At this time, a value of ES can take five values, −4, −3, −2, −1 and 0, and x takes any one of 0, 1, 2 and 3.

Figure 202F:
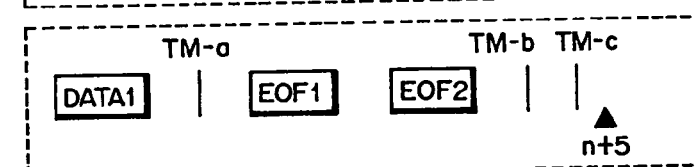

FIG. 202(F) is a diagram showing a state at the time that ES=5x. As shown in FIG. 202(F), the state at the time that ES=5x is a state in which the third tape mark TM-c is detected or written, where the real head position is immediately after the third tape mark TM-c. The real BID at the time that ES=5x is n+5. At this time, a value of EP is undetermined, and x takes any one of 0, 1, 2 and 3.

Figure 202G:
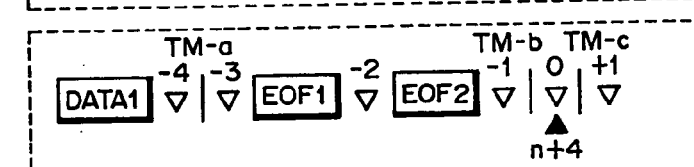

FIG. 202(G) shows a state at the time that ES=6x. As shown in FIG. 202(G), the state at the time that ES=6x is a state in which the third tape mark TM-c is detected or written, where the real head position is between the second tape mark TM-b and the third tape mark TM-c. The real BID at the time that ES=6x is n+4. At this time, a value of EP can take six values, −4, −3, −2, −1, 0 and +1, and x takes any one of 0, 1, 2 and 3.

Figure 202H:
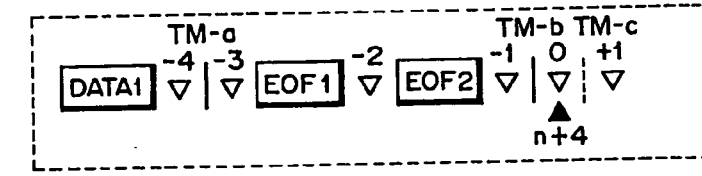

FIG. 202(H) is a diagram showing a state at the time that ES=7x. As shown in FIG. 202(H), the state at the time that ES=7x is a state in which the second tape mark TM-b is written in the file close process, after that, the third tape mark TM-c is spuriously written (i.e., state in which an operation of writing the third tape mark TM-c is emulated), where the real head position is immediately after the second tape mark TM-b. the real BID at the time that ES=7x is n+4. At this time, a value of ES can take six values, −4, −3, −2, −1, 0 and +1, and x takes any one of 0, 1, 2 and 3.

Figure 202I:
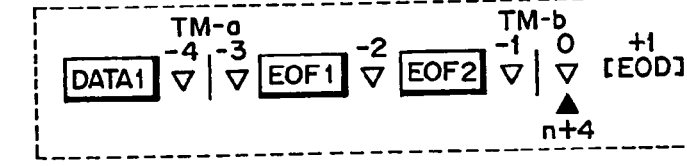

FIG. 202(I) shows a state at the time that ES=8x. As shown in FIG. 202(H), the state at the time that ES=8x is a state in which the second tape mark TM-b is detected or written, then EOD (End Of Data) is detected, where the real head position is immediately after the second tape mark TM-b. At this time, EOD emulation in which EOD is handled as the third tape mark TM-c is executed. The real BID at the time that ES=8x is n+4. A value of EP can take six values, −4, −3, −2, −1, 0 and +1, and x takes any one of 0, 1, 2 and 3.

Next, main transition of the emulation status in the third embodiment will be described with reference to FIG. 203. As shown in FIG. 203, a state at the time that ES=10 transits to a state at the time that ES=4x in the similar manner to the second embodiment. When the third tape mark TM-c is detected after the second tape mark TM-b in the state at the time that ES=4x, ES successively transits from "4x" to "5x", "6x" and so on, in the similar manner to the second embodiment.

When a TMW (Tape Mark Write) command is received in the state at the time that ES=4x, ES transits from "4x" to "7x", where a third tape mark writing completion is reported without writing the third tape mark TM-c, and an operation of writing the third tape mark TM-c is emulated.

When EOD is detected in response to an RD (READ) command, an SP command, or an FSPF command in the state at the time that ES=4x, ES transits from "4x" to "8x", where EOD emulation in which EOD is handled as the third tape mark TM-c is executed.

The state at the time that ES=4x, 6x, 7x or 8x is an object of emulation in the third embodiment, as stated above.

[3-2-4] Command Processing

A flow of command processing by the control unit 42 in the I/F converting apparatus 40 according to the third embodiment is similar to the flow of command processing according to the second embodiment described above with reference to FIG. 83. Namely, the control unit 42 of the I/F converting apparatus 40 carried out a command processing shown in FIG. 83 in response to each command when receiving the command from the CPU 20.

In the pre-process (Step 1), is it determined according to a type of a command (command code) and values of ES and EP stored in the respective control areas 46a and 46b in the RAM 46 which is carried out in the MTU 30, a real operation or emulation. In addition, a process of re-positioning the magnetic head or a process of restoring EOF1/EOF2 is carried out.

If a relative position (EP) and a real head position differ from each other when the real operation is carried out in the MTU 30, the control unit 42 makes the MTU 30 carry out a process of re-positioning the magnetic head. If execution of emulation of EOF/EOF2 is possible in the read command processing (RD process), the control unit 42 restores a data block (EOF1/EOF2) in the save areas 46*c*/46*d* in the RAM 36 into the data buffer 45, and transfers the data block to the CPU 20 at Step S4. According to the third embodiment, when receiving in a state at the time that ES=7x, a command directing to position the head outside a range of EP from −4 to +1 or an RD command to read EOF1 or EOF2 that cannot be identified, the control unit 42 carries out a third tape mark TM-c write process as the pre-process.

After the pre-process is completed, it is determined whether emulation is possible or not at Step S2 (whether a determination to execute emulation in the pre-process is made or not). When the emulation is impossible (NO route), the real operation (SCSI process; Step S3) is carried out, then data is transferred (Step S4). When the emulation is possible (YES route), the data is transferred without carrying out the real operation at Step S3 (Step S4). The data transfer at Step S4 would be carried out if a process in response to an RD command or a WR command is carried out.

In the post-process (Step S5), EOF1/EOF2 read out from the magnetic tape MT is saved in the save area 47*c*/46*d* in the RAM 46, a process of checking and updating SBID held in the save area 46*e* in the RAM 46 is carried out, and a process of updating ES and EP stored in the respective control areas 46*a* and 46*b* in the RAM 46 is carried out.

Namely, in the post-process, ES and EP stored in the control areas 46*a* and 46*b* in the RAM 46 are updated according to a type of a data block after the real operation or the emulation is carried out. When the data block obtained in the real operation is determined as EOF1 or EOF2, the data block is stored in the save area 46*c* or 46*d* in the RAM 46. When it is determined that the data block obtained in the real operation is a tape mark (TM), the real BID (real head position) is stored in the save area (SBID) 46*e* in the RAM 46, and an identification pattern for EOFs, that is, "TM, EOF1, EOF2, TM and TM", (confirmation on which Pattern it is, 1, 2, 3 or 4) is confirmed.

In the post-process according to the third embodiment, when EOD is detected in response to an RD command, an SP command or FSPF command in a state in which ES=4x, the third tape mark TM-c is assumed to be detected, and detection of the third tape mark TM-c is reported, in lieu of EOF report, to the CPU 20.

If a command directing to identify a channel block ID (a logical position of the magnetic head) such as a read BID command or the like is issued from the CPU 20 when the emulation is executed (when ES=40, 41, 42, 43, 60, 61, 62, 63, 70, 71, 72, 73, 80, 81, 82 or 83), the control unit 42 of the I/F converting apparatus 40 according to the third embodiment sends back a value of SBID+EP as a channel block ID, along with a value of SBID as a device ID to the CPU 20. If a command such as a read BID command or the like is issued from the CPU 20 when the emulation is not executed (when ES=00, 10, 20, 22, 30, 31, 32, 33, 50, 51, 52 or 53), the control unit 42 of the I/F converting apparatus 40 according to the third embodiment issues a read position command to the device (MCU10/MTU30) as before to obtain an ID, and reports it to the CPU 20.

According to the third embodiment, the pre-process (Step S1) and the post-process (Step S5) are carried out according to the control tables (control matrices; cf. FIGS. 204 through 251) according to a type of a command and an identification pattern for EOFs. Hereinafter, the pre-process and the post-process carried out according to a type of command and an identification pattern for EOFs will be described in detail with reference to FIGS. 204 through 251.

[3-2-4-1] RD (Read) Process

①　RD Process in Pattern 1 (cf. FIGS. 204 and 205)

When the I/F converting apparatus 40 receives an RD command, the control unit 42 first refers to the RAM 46 to recognize a value of ES and a value of EP in the pre-process. When it is determined that ES is any one of 00, 10, 20, 30, 40, 50 and 60, according to the third embodiment, the control unit 42 carries out, as shown in FIG. 204, pre-processes and post-processes almost similar to those according to the second embodiment shown in FIG. 84.

When it is recognized that ES=40 and EP=0 in the pre-process [cf. FIG. 202(E)] as shown in FIG. 204, the control unit 42 makes the MTU 30 carry out a real operation (real READ). In the post-process, the control unit 42 then determines which one the type of a data block read by the MTU 30 is of EOF, TM (tape mark), EOD or any other.

When it is determined that the data block is EOF (EOF1), the control unit 42 saves the data block (EOF1) in the save area (SDT1) 46*c* in the RAM 46, and updates ES to "20" in the RAM 40, as does in the second embodiment (process ID=1.40.40). When it is determined that the data block is TM in the post-process, the control unit 42 determines a difference between a real BID of the TM and SBID stored in the save area 46*e* [(real BID)−(SBID)], as does in the second embodiment. When confirming that the difference is "1", the control unit 42 stores the read BID of the TM in the save area (SBID) 46*e* in the RAM 46, and updates ES to "50" in the RAM 46 (process ID=1.40.41).

When it is determined in the post-process that the data block is EOD, the control unit 42 updates ES to "80" and EP to "+1" in the RAM 46 (process ID=1.40.43). At this time, the control unit 42 makes a report that the third tape mark TM-c is detected in lieu of EOF report to the CPU 20 on the assumption that the third tape mark TM-c is detected.

When it is determined in the post-process that the data block is other than OEF, TM and EOD, the control unit 42 updates ES to "00" in the RAM 46, as does in the second embodiment (process ID=1.40.42).

When it is recognized in the pre-process that ES=70 and EP=−4 [cf. FIG. 202(H)] as shown in FIG. 205, the control unit 42 executes emulation of the MTU 30. In the post-process, the control unit 42 updates EP to "−3" while holding ES at a value of "70" in the RAM 46 (process ID=1.70.00).

When it is recognized in the pre-process that ES=70 and EP=−3 [cf. FIG. 202(H)], the control unit 42 executes emulation of the MTU 30, and restores the data block (EOF1) in the save area (SDT1) 46*c* in the RAM 46 into the data buffer 45. In the post-process, the control unit 42 updates EP to "−2" while holding ES at a value of "70" in the RAM 46 (process ID=1.70.10).

When it is recognized in the pre-process that ES=70 and EP=−2 [cf. FIG. 202(H)], the control unit 42 executes emulation of the MTU 30, and restores the data block (EOF2) in the save area (SDT2) 46*d* in the RAM 46 into the data buffer 45. In the post-process, the control unit 42 updates EP to "−1" while holding ES at a value of "70" in the RAM 46 (process ID=1.70.20).

When it is recognized in the pre-process that ES=70 and EP=−1 [cf. FIG. 202(H)], the control unit 42 executes emulation of the MTU 30. In the post-process, the control unit 42 updates EP to "0" while holding ES at a value of "70" in the RAM 46 (process ID=1.70.30).

When it is recognized in the pre-process that ES=70 and EP=0 [cf. FIG. 202(H)], the control unit 42 executes emulation of the MTU 30. In the post-process, the control unit 42 updates EP to "+1" while holding ES at a value of "70" in the RAM 46 (process ID=1.70.40).

When it is recognized in the pre-process that ES=70 and EP=+1 [cf. FIG. 202(H)], the control unit 42 makes the MTU 30 carry out the WTM process to write the third tape mark TM-c on the magnetic tape MT, then makes the MTU 30 carry out the real operation (real READ). In the post-process, the control unit 42 determines which one the type of the data block read by the MTU 30 is EOF, TM or any other. When it is determined that the data block is EOF (EOF1), the control unit 42 saves the data block (EOF1) in the save area (SDT1) 46c in the RAM 46, adds 1 to SBID in the RAM 46, and updates ES to "20" in the RAM 46 (process ID=1.70.50). When it is determined that the data block is TM, the control unit 42 stores a real BID of the TM in the save area (SBID) 46e in the RAM 46, and updates ES to "10" in the RAM 46 (process ID=1.70.51). When it is determined in the post-process that the data block is other than EOF and TM, the control unit 42 updates ES to "00" in the RAM 46 (process ID=1.70.52).

When it is recognized in the pre-process that ES=80 and EP=-4 [cf. FIG. 202(I)], the control unit 42 executes emulation of the MTU 30. In the post-process, the control unit 42 updates EP to "-3" while holding ES at a value of "80" in the RAM 46 (process ID=1.80.00).

When it is recognized in the pre-process that ES=80 and EP=-3 [cf. FIG. 202(I)], the control unit 42 executes emulation of the MTU 30, and restores the data block (EOF1) in the save area (SDT1) 46c in the RAM 46 into the data buffer 45. In the post-process, the control unit 42 updates EP to "-2" while holding ES at a value of "80" in the RAM 46 (process ID=1.80.10).

When it is recognized in the pre-process that ES=80 and EP=-2 [cf. FIG. 202(I)], the control unit 42 executes emulation of the MTU 30, and restores the data block (EOF2) in the save area (SDT2) 46d in the RAM 46 into the data buffer 45. In the post-process, the control unit 42 updates EP to "-1" while holding ES at a value of "80" in the RAM 46 (process ID=1.80.20).

When it is recognized in the pre-process that ES=80 and EP=-1 [cf. FIG. 202(I)], the control unit 42 executes emulation of the MTU 30. In the post-process, the control unit 42 updates EP to "0" while holding ES at a value of "80" in the RAM 46 (process ID=1.80.30).

When it is recognized in the pre-process that ES=80 and EP=0 [cf. FIG. 202(I)], the control unit 42 executes emulation of the MTU 30. In the post-process, the control unit 42 updates EP to "+1" while holding ES at a value of "80" in the RAM 46 (process ID=1.80.40).

When it is recognized in the pre-process that ES=80 and EP=+1 [cf. FIG. 202(I)], the control unit 42 makes the MTU 30 carry out the real operation (real READ). At this time, the real head position is immediately after the second tape mark TM-b, and EOD is detected in the read operation. In the post-process, the control unit 42 updates ES to "00" (process ID=1.80.50), and carries out the following processes.

② RD Process in Pattern 2 (cf. FIGS. 206 and 207)

When it is recognized in the pre-process that ES is any one of 31, 41, 51 and 61, pre-processes and post-processes almost similar to those according to the second embodiment shown in FIG. 85 are carried out as shown in FIG. 206 in the third embodiment.

Note that when it is recognized in the pre-process that ES=41 and EP=0 [cf. FIG. 202(E)], the control unit 42 makes the MTU 30 carry out the real operation (real READ). In the post-process, the control unit 42 then determines which one the type of a data block read by the MTU 30 is of EOF, TM, EOD or any other than they, and updates ES and EP, as shown in FIG. 206.

namely, when it is recognized in the pre-process that ES=41 and EP=0, processes almost similar to the processes of process IDs=1.40.40, 1.40.41, 1.40.42 and 1.40.43 described above are carried out in the pre-processes and the post-processes (process IDs=1.41.40, 1.41.41, 1.41.42, 1.41.43). In the post-process of process ID=1.41.41, ES in the RAM 46 is updated to "51". In the post-process of process ID=1.41.43, ES in the RAM 46 is updated to "81".

When it is recognized in the pre-process that ES=71 and EP=-4 [cf. FIG. 202(H)] as shown in FIG. 207, the control unit 42 executes emulation of the MTU 30. In the post-process, the control unit 42 updates EP to "-3" while holding ES at a value of "71" in the RAM 46 (process ID=1.71.00).

When it is recognized in the pre-process that ES=71 and EP=-3 [cf. FIG. 202(H)], the control unit 42 executes emulation of the MTU 30, and restores the data block (EOF1) in the save area (SDT1) 46c in the RAM 46 into the data buffer 45. In the post-process, the control unit 42 updates EP to "-2" while holding ES at a value of "71" in the RAM 46 (process ID=1.71.10).

When it is recognized in the pre-process that ES=71 and EP=-2 [cf. FIG. 202(H)], the control unit 42 makes the MTU 30 carry out the WTM process to write the third tape mark TM-c on the magnetic tape MT, re-positions the head at a position SBID+EP [position n+2 in FIG. 202(H)] in the MTU 30, then makes the MTU 30 carry out the real operation (real READ). In the post-process, the control unit 42 determines whether the type of the data block read by the MTU 30 is EOF or any other. When it is determined that that data block is EOF (EOF2), the control unit 42 saves the data block (EOF2) in the save area (SDT2) 46e in the RAM 46, subtracts 3 from SBID in the RAM 46, and updates ES to "30" in the RAM 46 (process ID=1.71.20). When it is determined in the post-process that the data block is other than EOF, the control unit 42 updates ES to "00" in the RAM 46 (process ID=1.71.21).

When it is recognized in the pre-process that ES=71 and EP=-1 [cf. FIG. 202(H)], the control unit 42 executes emulation of the MTU 30. In the post-process, the control unit 42 updates EP to "0" while holding ES at a value of "71" in the RAM 46 (process ID=1.71.30).

When it is recognized in the pre-process that ES=71 and EP=0 [cf. FIG. 202(H)], the control unit 42 executes emulation of the MTU 30. In the post-process, the control unit 42 updates EP to "+1" while holding ES at a value of "71" in the RAM 46 (process ID=1.71.40).

When it is recognized in the pre-process that ES=71 and EP=+1 [cf. FIG. 202(H)], processes similar to the processes of process IDs=1.70.50, 1.70.51 and 1.70.52 described above are carried out in the pre-process and post-process (process IDs=1.71.50, 1.71.51, 1.71.52).

When it is recognized in the pre-process that ES=81 and EP=-4 [cf. FIG. 202(I)], the control unit 42 executes emulation of the MTU 30. In the post-process, the control unit 42 updates EP to "-3" while holding ES at a value of "81" in the RAM 46 (process ID=1.81.00).

When it is recognized in the pre-process that ES=81 and EP=-3 [cf. FIG. 202(I)], the control unit 42 executes emulation of the MTU 30, and restores the data block (EOF1) in the save area (SDT1) 46c in the RAM 46 into the data buffer 45. In the post-process, the control unit 42 updates EP to "-2" while holding ES at a value of "81" in the RAM 46 (process ID=1.81.10).

When it is recognized in the pre-process that ES=81 and EP=−2 [cf. FIG. 202(I)], the control unit 42 re-positions the head at a position SBID+EP [position n+2 in FIG. 202(I)] in the MTU 30, and makes the MTU 30 carry out the real operation (real READ). In the post-process, the control unit 42 determines whether the type of a data block read by the MTU 30 is EOF or any other. When it is determined that the data block is EOF (EOF2), the control unit 42 saves the data block in the save area (SDT2) 46d in the RAM 46, subtracts 3 from SBID in the RAM 46, and updates ES to "30" in the RAM 46 (process ID=1.81.20). When it is determined in the post-process that the data block is other than EOF, the control unit 42 updates ES to "00" in the RAM 46 (process ID=1.81.21).

When it is recognized in the pre-process that ES=81 and EP=−1 [cf. FIG. 202(I)], the control unit 42 executes emulation of the MTU 30. In the post-process, the control unit 42 updates EP to "0" while holding ES at a value of "81" in the RAM 46 (process ID=1.81.30).

When it is recognized in the pre-process that ES=81 and EP=0 [cf. FIG. 202(I)], the control unit 42 executes emulation of the MTU 30. In the post-process, the control unit 42 updates EP to "+1" while holding ES at a value of "81" in the RAM 46 (process ID=1.81.40).

When it is recognized in the pre-process that ES=81 and EP=+1 [cf. FIG. 202(I)], a process similar to the process of process ID=1.80.50 described above is carried out in the pre-process and the post-process (process ID=1.81.50).

③ RD Process in Pattern 3 (cf. FIGS. 208 and 209)

When it is recognized in the pre-process that ES is any one of 22, 32, 42, 52 and 62, pre-processes and post-processes almost similar to the pre-processes and the post-processes according to the second embodiment shown in FIG. 86 are carried out in the third embodiment as shown in FIG. 208.

When it is recognized in the pre-process that ES=42 and EP=0 [cf. FIG. 202(E)], the control unit 42 makes the MTU 30 carry out the real operation (real READ), as shown in FIG. 208. In the post-process, the control unit 42 then determines which one the type of a data block read by the MTU 30 is of EOF, TM, EOD or any other than they, and updates ES and EP.

Namely, when it is recognized in the pre-process that ES=42 and EP=0, processes almost similar to the processes of process IDs=1.40.40, 1.40.41, 1.40.42 and 1.40.43 described above are carried out in the pre-processes and the post-processes (process IDs=1.42.40, 1.42.41, 1.42.42, 1.42.43). Note that ES in the RAM 46 is updated to "52" in the post-process of process ID=1.42.41. In the post-process of process ID=1.42.43, ES in the RAM 46 is updated to "82".

As shown in FIG. 209, when it is recognized in the pre-process that ES=72 and EP=−4 [cf. FIG. 202(H)], the control unit 42 executes emulation of the MTU 30. In the post-process, the control unit 42 updates EP to "−3" while holding ES at a value of "72" in the RAM 46 (process ID=1.72.00).

When it is recognized in the pre-process that ES=72 and EP=−3 [cf. FIG. 202(H)], the control unit 42 makes the MTU 30 carry out the WTM process to write the third tape mark TM-c on the magnetic tape MT, re-positions the head at a position SBID+EP [position at n+1 in FIG. 202(H)] in the MTU 30, then makes the MTU 30 carry out the real operation (real READ). In the post-process, the control unit 42 determines whether the type of a data block read by the MTU 30 is EOF or any other. When it is determined that the data block is EOF (EOF1), the control unit 42 saves the data block (EOF1) in the save area (SDT1) 46c in the RAM 46, subtracts 3 from SBID in the RAM 46, and updates ES to "20" in the RAM 46 (process ID=1.72.10). When it is determined in the post-process that the data block is other than EOF, the control unit 42 updates ES to "00" in the RAM 46 (process ID=1.72.11).

When it is recognized in the pre-process that ES=72 and EP=−2 [cf. FIG. 202(H)], the control unit 42 executes emulation of the MTU 30, and restores the data block (EOF2) in the save area (SDT2) 46d in the RAM 46 into the data buffer 45. In the post-process, the control unit 42 updates EP to "−1" while holding ES at a value of "72" in the RAM 46 (process ID=1.72.20).

When it is recognized in the pre-process that ES=72 and EP=−1 [cf. FIG. 202(H)], the control unit 42 executes emulation of the MTU 30. In the post-process, the control unit 42 updates EP to "0" while holding ES at a value of "72" in the RAM 46 (process ID=1.72.30).

When it is recognized in the pre-process that ES=72 and EP=0 [cf. FIG. 202(H)], the control unit 42 executes emulation of the MTU 30. In the post-process, the control unit 42 updates EP to "+1" while holding ES at a value of "72" in the RAM 46 (process ID=1.72.40).

When it is recognized in the pre-process that ES=72 and EP=+1 [cf. FIG. 202(H)], processes similar to the processes of process IDs=1.70.50, 1.70.51 and 1.70.52 described above are carried out in the pre-processes and post-processes (process IDs=1.72.50, 1.72.51, 1.72.52).

When it is recognized in the pre-process that ES=82 and EP=−4 [cf. FIG. 202(I)], the control unit 42 executes emulation of the MTU 30. In the post-process, the control unit 42 updates EP to "−3" while holding ES at a value of "82" in the RAM 46 (process ID=1.82.00).

When it is recognized in the pre-process that ES=82 and EP=−3 [cf. FIG. 202(I)], the control unit 42 re-positions the head at a position SBID+EP [position n+1 in FIG. 202(I)] in the MTU 30, and makes the MTU 30 carry out the real operation (real READ). In the post-process, the control unit 42 determines whether the type of a data block read by the MTU 30 is EOF or any other. When it is determined that the data block is EOF (EOF1), the control unit 42 saves the data block (EOF1) in the save area (SDT1) 46c in the RAM 46, subtracts 3 from SBID in the RAM 46, and updates ES to "20" in the RAM 46 (process ID=1.82.10). When it is determined that the data block is other than EOF, the control unit 42 updates ES to "00" in the RAM 46 (process ID=1.82.11).

When it is recognized in the pre-process that ES=82 and EP=−2 [cf. FIG. 202(I)], the control unit 42 executes emulation of the MTU 30, and restores a data block (EOF2) in the save area (SDT2) 46d in the RAM 46 into the data buffer 45. In the post-process, the control unit 42 updates EP to "−1" while holding ES at a value of "82" in the RAM 46 (process ID=1.82.20).

When it is recognized in the pre-process that ES=82 and EP=−1 [cf. FIG. 202(I)], the control unit 42 executes emulation of the MTU 30. In the post-process, the control unit 42 updates EP to "0" while holding ES at a value of "82" in the RAM 46 (process ID=1.82.30).

When it is recognized in the pre-process that ES=82 and EP=0 [cf. FIG. 202(I)], the control unit 42 executes emulation of the MTU 30. In the post-process, the control unit 42 updates EP to "+1" while holding ES at a value of "82" (process ID=1.82.40).

When it is recognized in the pre-process that ES=82 and EP=+1 [cf. FIG. 202(I)], a process similar to the process of process ID=1.80.50 described above is carried out in the pre-process and post-process (process ID=1.82.50).

④ RD Process in Pattern 4 (cf. FIGS. 210 and 211)

When it is recognized in the pre-process that ES is any one of 33, 43, 53 and 63, pre-processes and post-processes almost similar to those according to the second embodiment shown in FIG. 87 are carried out in the third embodiment, as shown in FIG. 210.

As shown in FIG. 210, when it is recognized in the pre-process that ES=43 and EP=0 [cf. FIG. 202(E)], the control unit 42 makes the MTU 30 carry out the real operation (real READ). In the post-process, the control unit 42 then determines which one the type of a data block read by the MTU 30 is of EOF, TM, EOD or any other, and updates ES and EP.

Namely, when it is recognized in the pre-process that ES=43 and EP=0, processes almost similar to the processes of process IDs=1.40.40, 1.40.41, 1.40.42 and 1.40.43 described above are carried out in the pre-processes and post-processes (process IDs=1.43.40, 1.43.41, 1.43.42, 1.43.43). In the post-process of process ID=1.43.41, ES in the RAM 46 is updated to "53". In the post-process of process ID=1.43.43, ES in the RAM 46 is updated to "83".

As shown in FIG. 211, when it is recognized in the pre-process that ES=73 and EP=−4 [cf. FIG. 202(H)], the control unit 42 executes emulation of the MTU 30. In the post-process, the control unit 42 updates EP to "−3" while holding ES at a value of "73" in the RAM 46 (process ID=1.73.00).

When it is recognized in the pre-process that ES=73 and EP=−3 [cf. FIG. 202(H)], processes similar to the processes of process IDs=1.72.10 and 1.72.11 described above are carried out in the pre-process and the post-process (process IDs=1.73.10, 1.73.11).

When it is recognized in the pre-process that ES=73 and EP=−2 [cf. FIG. 202(H)], processes almost similar to the processes of process IDs=1.71.20 and 1.71.21 described above are carried out in the pre-process and post-process. (process IDs=1.73.20, 1.73.21). In the post-process of process ID=1.73.20, ES in the RAM 46 is updated to "32".

When it is recognized in the pre-process that ES=73 and EP=−1 [cf. FIG. 202(H)], the control unit 42 executes emulation of the MTU 30. In the post-process, the control unit 42 updates EP to "0" while holding ES at a value of "73" in the RAM 46 (process ID=1.73.30).

When it is recognized in the pre-process that ES=73 and EP=0 [cf. FIG. 202(H)], the control unit 42 executes emulation of the MTU 30. In the post-process, the control unit 42 updates EP to "+1" while holding ES at a value of "73" in the RAM 46 (process ID=1.73.40).

When it is recognized in the pre-process that ES=73 and EP=+1 [cf. FIG. 202(H)], processes similar to the processes of process IDs=1.70.50, 1.70.51 and 1.70.52 described above are carried out in the pre-process and post-process (process IDs=1.73.50, 1.73.51, 1.73.52).

When it is recognized in the pre-process that ES=83 and EP=−4 [cf. FIG. 202(I)], the control unit 42 executes emulation of the MTU 30. In the post-process, the control unit 42 updates EP to "−3" while holding ES at a value of "83" in the RAM 46 (process ID=1.83.00).

When it is recognized in the pre-process that ES=83 and EP=−3 [cf. FIG. 202(I)], processes similar to the processes of process IDs=1.82.10 and 1.82.11 described above are carried out in the pre-process and post-process (process IDs=1.83.10, 1.83.11).

When it is recognized in the pre-process that ES=83 and EP=−2 [cf. FIG. 202(I)], processes almost similar to the processes of process IDs=1.81.20 and 1.81.21 described above are carried out in the pre-process and post-process (process IDs=1.83.20, 1.83.21). In the post-process of process ID=1.83.20, ES in the RAM 46 is updated to "32".

When it is recognized in the pre-process that ES=83 and EP=−1 [cf. FIG. 202(I)], the control unit 42 executes emulation of the MTU 30. In the post-process, the control unit 42 updates EP to "0" while holding ES at a value of "83" in the RAM 46 (process ID=1.83.30).

When it is recognized in the pre-process that ES=83 and EP=0 [cf. FIG. 202(I)], the control unit 42 executes emulation of the MTU 30. In the post-process, the control unit 42 updates EP to "+1" while holding ES at a value of "83" in the RAM 46 (process ID=1.83.40).

When it is recognized in the pre-process that ES=83 and EP=+1 [cf. FIG. 202(I)], a process similar to the process of process ID=1.80.50 described above is carried out in the pre-process and post-process (process ID=1.83.50).

[3-2-4-2] RB Process (Read Backward) Process

When the I/F converting apparatus 40 according to the third embodiment receives an RB command from the CPU 20, the I/F converting apparatus 40 makes an error report to the CPU 20, like the MTC 10 according to the first embodiment or the I/F converting apparatus 40 according to the second embodiment. When the I/F converting apparatus 40 makes the MTU 30 really carry out the read backward operation (real RB) in the RB process, the I/F converting apparatus 40 updates ES to "00". When executing emulation of the MTU 30, the I/F converting apparatus 40 updates EP while holding ES=4x, 6x, 7x or 8x.

① RB Process in Pattern 1 (cf. FIG. 212)

When the I/F converting apparatus 40 receives an RB command, the control unit 42 first refers to the RAM 46 to recognize a value of ES and a value of EP in the pre-process. When it is recognized that ES is any one of 00, 10, 20, 30, 40, 50 and 60, pre-processes and post-processes similar to those in the second embodiment shown in FIG. 88 are carried out in the third embodiment, as shown in FIG. 212.

According to the third embodiment, when it is recognized in the pre-process that ES=70 and EP=−4 [cf. FIG. 202(H)], the control unit 42 makes the MTU 30 carry out the WTM process to write the third tape mark TM-c on the magnetic tape MT, re-positions the head at a position SBID+EP [position n in FIG. 202(H)] in the MTU 30, and makes the MTU 30 carry out a real operation (real RB) as shown in FIG. 212. In the post-process, the control unit 42 updates ES to "00" in the RAM 46 (process ID=2.70.00).

When it is recognized in the pre-process that ES=70 and EP=−3 [cf. FIG. 202(H)], the control unit 42 executes emulation of the MTU 30. In the post-process, the control unit 42 updates EP to "−4" while holding ES at a value of "70" in the RAM 46 (process ID=2.70.10).

When it is recognized in the pre-process that ES=70 and EP=−2 [cf. 202(H)], the control unit 42 executes emulation of the MTU 30. In the post-process, the control unit 42 updates EP to "−3" while holding ES at a value of "70" in the RAM 46 (process ID=2.70.20).

When it is recognized in the pre-process that ES=70 and EP=−1 [cf. FIG. 202(H)], the control unit 42 executes emulation of the MTU 30. In the post-process, the control unit 42 updates EP to "−2" while holding ES at a value of "70" in the RAM 46 (process ID=2.70.30).

When it is recognized in the pre-process that ES=70 and EP=0 [cf. FIG. 202(H)], the control unit 42 executes emulation of the MTU 30. In the post-process, the control unit 42 updates EP to "−1" while holding ES at a value of "70" in the RAM 46 (process ID=2.70.40).

When it is recognized in the pre-process that ES=70 and EP=+1 [cf. FIG. 202(H)], the control unit 42 executes emulation of the MTU 30. In the post-process, the control unit 42 updates EP to "0" while holding ES at a value of "70" in the RAM 46 (process ID=2.70.50).

When it is recognized in the pre-process that ES=80 and EP=−4 [cf. FIG. 202(I)], the control unit 42 re-positions the head at a position SBID+EP [position n in FIG. 202(I)] in the MTU 30, and makes the MTU 30 carry out the real operation (real RB). In the post-process, the control unit 42 updates ES to "00" in the RAM 46 (process ID=2.80.00).

When it is recognized in the pre-process that ES=80 and EP=−3 [cf. FIG. 202(I)], the control unit 42 executes emulation of the MTU 30. In the post-process, the control unit 42 updates EP to "−4" while holding ES at a value of "80" in the RAM 46 (process ID=2.80.10).

When it is recognized in the pre-process that ES=80 and EP=−2 [cf. FIG. 202(I)], the control unit 42 executes emulation of the MTU 30. In the post-process, the control unit 42 updates EP to "−3" while holding ES at a value of "80" in the RAM 46 (process ID=2.80.20).

When it is recognized in the pre-process that ES=80 and EP=−1 [cf. FIG. 202(I)], the control unit 42 executes emulation of the MTU 30. In the post-process, the control unit 42 updates EP to "−2" while holding ES at a value of "80" in the RAM 46 (process ID=2.80.30).

When it is recognized in the pre-process that ES=80 and EP=0 [cf. FIG. 202(I)], the control unit 42 executes emulation of the MTU 30. In the post-process, the control unit 42 updates EP to "−1" while holding ES at a value of "80" in the RAM 46 (process ID=2.80.40).

When it is recognized in the pre-process that ES=80 and EP=+1 [cf. FIG. 202(I)], the control unit 42 executes emulation of the MTU 30. In the post-process, the control unit 42 updates EP to "0" while holding ES at a value of "80" in the RAM 46 (process ID=2.80.50).

② RB Process in Pattern 2 (cf. FIG. 213)

When it is recognized in the pre-process that ES is any one of 31, 41, 51 and 61, pre-processes and post-processes similar to those in the second embodiment shown in FIG. 89 are carried out in the third embodiment, as shown in FIG. 213.

According to the third embodiment, when it is recognized in the pre-process that ES=71 [cf. FIG. 202(h)], processes almost similar to the processes of process IDs=2.70.00 to 2.70.50 described above are carried out in the pre-processes and post-processes, as shown in FIG. 213 (process IDs=2.71.00 to 2.71.50). In the post-processes of process IDs=2.71.10 to 2.71.50, ES in the RAM 46 is held at a value of "71".

When it is recognized in the pre-process that ES=81 [cf. FIG. 202(I)], processes almost similar to the processes of process IDs=2.80.00 to 2.80.50 described above are carried out in the pre-processes and post-processes (process IDs=2.81.00 to 2.81.50). In the post-processes of process IDs=2.81.10 to 2.81.50, ES in the RAM 46 is held at a value of "81".

③ RB Process in Pattern 3 (cf. FIG. 214)

When it is recognized in the pre-process that ES is any one of 32, 42, 52 and 62, pre-processes and post-processes similar to those in the second embodiment shown in FIG. 90 are carried out in the third embodiment, as shown in FIG. 214.

According to the third embodiment, when it is recognized in the pre-process that ES=72 [cf. FIG. 202(H)], processes almost similar to the processes of process IDs=2.70.00 to 2.70.50 described above are carried out in the pre-processes and post-processes, as shown in FIG. 214 (process IDs=2.72.00 to 2.72.50). In the post-processes of process IDs=2.72.10 to 2.72.50, ES in the RAM 46 is held at a value of "72".

When it is recognized that ES=82 [cf. FIG. 202(I)], processes almost similar to the processes of process IDs=2.80.00 to 2.80.50 described above are carried out in the pre-processes and post-processes. In the post-processes of process IDs=2.82.10 to 2.82.50, ES in the RAM 46 is held at a value of "82" in the RAM 46.

④ RB Process in Pattern 4 (cf. FIG. 215)

When it is recognized in the pre-process that ES is any one of 33, 43, 53 and 63, pre-processes and post-processes similar to those in the second embodiment shown in FIG. 91 are carried out in the third embodiment, as shown in FIG. 215.

According to the third embodiment, when it is recognized in the pre-process that ES=73 [cf. FIG. 202(H)], processes almost similar to the processes of process IDs=2.70.00 to 2.70.50 described above are carried out in the pre-processes and post-processes, as shown in FIG. 215 (process IDs=2.73.00 to 2.73.50). In the post-processes of process IDs=2.73.10 to 2.73.50, ES in the RAM 46 is held at a value of "73".

When it is recognized in the pre-process that ES=83 [cf. FIG. 202(I)], processes almost similar to the processes of process IDs=2.80.00 to 2.80.50 described above are carried out in the pre-processes and post-processes (process IDs=2.83.00 to 2.83.50). In the post-processes of process IDs=2.83.10 to 2.83.50, ES in the RAM 46 is held at a value of "83".

[3-2-4-3] WR (Write) Process

① WR Process in Pattern 1 (cf. FIGS. 216 and 217)

When the I/F converting apparatus 40 receives a WR command, the control unit 42 first refers to the RAM 46 to recognize a value of ES and a value of EP in the pre-process. When it is recognized that ES is any one of 00, 10, 20, 30, 40, 50 and 60, pre-processes and post-processes similar to those in the second embodiment shown in FIG. 92 are carried out in the third embodiment as shown in FIG. 216.

According to the third embodiment, when it is recognized in the pre-process that ES=70 and EP=−4 [cf. FIG. 202(H)], the control unit 42 re-positions the head at a position SBID+EP [position n in FIG. 202(H)] in the MTU 30, and makes the MTU 30 carry out a real operation (real WR), as shown in FIG. 217. In the post-process, the control unit 42 updates ES to "00" in the RAM 46 (process ID=3.70.00).

When it is recognized in the pre-process that ES=70 and EP=−3 [cf. FIG. 202(H)], the control unit 42 re-positions the head at a position SBID+EP [position n+1 in FIG. 202(H)] in the MTU 30, and makes the MTU 30 carry out the real operation (real WR). In the post-process, the control unit 42 determines whether the type of a data block written by the MTU 30 is EOF or any other. When it is determined that the data block is EOF (EOF1), the control unit 42 saves the data block (EOF1) in the save area (SDT1) 46c in the RAM 46, subtracts 3 from SBID in the RAM 46, and updates ES to "20" in the RAM 46 (process ID=3.70.10). When it is determined in the post-process that the data block is other than EOF, the control unit 42 updates ES to "00" in the RAM 46 (process ID=3.70.11).

When it is recognized in the pre-process that ES=70 and EP=−2 [cf. FIG. 202(H)], the control unit 42 re-positions the head at a position SBID+EP [position n+2 in FIG. 202(H)] in the MTU 30, and makes the MTU 30 carry out the real operation (real WR). In the post-process, the control unit 42 determines whether the type of a data block written by the MTU 30 is EOF or any other. When it is determined that the data block is EOF (EOF2), the control unit 42 saves the data block (EOF2) in the save area (SDT2) 46d in the RAM 46, subtracts 3 from SBID in the RAM 46, and updates ES to "30" in the RAM 46 (process ID=3.70.20). When it is determined in the post-process that the data block is other than EOF, the control unit 42 updates ES to "00" in the RAM 46 (process ID=3.70.21).

When it is recognized in the pre-process that ES=70 and EP=−1 [cf. FIG. 202(H)], the control unit 42 re-positions the head at a position SBID+EP [position n+3 in FIG. 202(H)] in the MTU 30, and makes the MTU 30 carry out the real operation (real WR). In the post-process, the control unit 42 updates ES to "00" in the RAM 46 (process ID=3.70.30).

When it is recognized in the pre-process that ES=70 and EP=0 [cf. FIG. 202(H)], the control unit 42 makes the MTU 30 carry out the real operation (real WR). In the post-process, the control unit 42 determines whether the type of a data block written by the MTU 30 is EOF or any other. When it is determined that the data block is EOF (EOF1), the control unit 42 saves the data block (EOF1) in the save area (SDT1) 46c in the RAM 46, and updates ES to "20" in the RAM 46 (process ID=3.70.40). When it is determined in the post-process that the data block is other than EOF, the control unit 42 updates ES to "00" in RAM 46 (process ID=3.70.41).

When it is recognized in the pre-process that ES=70 and EP=+1 [cf. FIG. 202(H)], the control unit 42 makes the MTU 30 carry out the WTM process to write the third tape mark TM-c on the magnetic tape MT, and makes the MTU 30 carry out the real operation (real WR). In the post-process, the control unit 42 determines whether the type of a data block written by the MTU 30 is EOF or any other. When it is determined that the data block is EOF (EOF1), the control unit 42 saves the data block (EOF1) in the save area (SDT1) 46c in the RAM 46, adds 1 to SBID in the RAM 46, and updates ES to "20" in the RAM 46 (process ID=3.70.50). When it is determined that the data block is other than EOF, the control unit 42 updates ES to "00" in the RAM 46 (process ID=3.70.51).

When it is recognized in the pre-process that ES=80 [cf. FIG. 202(I)], processes similar to the processes of process IDs=3.70.00 to 3.70.51 described above are carried out in the pre-processes and post-processes (process IDs=3.80.00 to 3.80.51).

② WR Process in Pattern 2 (cf. FIGS. 218 and 219)

When it is recognized in the pre-process that ES is any one of 31, 41, 51 and 61, pre-processes and post-processes similar to those in the second embodiment shown in FIG. 93 are carried out in the third embodiment, as shown in FIG. 218.

According to the third embodiment, when it is recognized in the pre-process that ES=71 [cf. FIG. 202(H)], processes similar to the processes of process IDs=3.70.00 to 3.70.51 described above are carried out in the pre-processes and post-processes, as shown in FIG. 219 (process IDs=3.71.00 to 3.71.51).

When it is recognized in the pre-process that ES=81 [cf. FIG. 202(I)], processes similar to the processes of process IDs=3.70.00 to 3.70.51 described above are carried out in the pre-processes and post-processes (process IDs=3.81.00 to 3.81.51).

③ WR Process in Pattern 3 (cf. FIGS. 220 and 221)

When it is recognized in the pre-process that ES is any one of 22, 32, 42, 52 and 62, pre-processes and post-processes similar to those in the second shown in FIG. 94 are carried out in the third embodiment, as shown in FIG. 220.

According to the third embodiment, when it is recognized in the pre-process that ES=72 [cf. FIG. 202(H)], processes similar to the processes of process IDs=3.70.00 to 3.70.51 described above are carried out in the pre-processes and post-processes, as shown in FIG. 221 (process IDs=3.72.00 to 3.72.51). In the post-process of process ID=3.72.20, ES in the RAM 46 is updated to "32".

When it is recognized in the pre-process that ES=82 [cf. FIG. 202(I)], processes almost similar to the processes of process IDs=3.70.00 to 3.71.51 described above are carried out in the pre-processes and post-processes (process IDs=3.82.00 to 3.82.51). In the post-process of process ID=3.82.20, ES in the RAM 46 is updated to "32".

④ WR Process in Pattern 4 (cf. FIGS. 222 and 223)

When it is recognized in the pre-process that ES is any one of 33, 43, 53 and 63, pre-processes and post-processes similar to those in the second embodiment shown in FIG. 95 are carried out in the third embodiment, as shown in FIG. 222.

According to the third embodiment, when it is recognized in the pre-process that ES=73 [cf. FIG. 202(H)], processes almost similar to the processes of process IDs=3.70.00 to 3.70.51 described above are carried out in the pre-processes and post-processes, as shown in FIG. 223 (process IDs=3.73.00 to 3.73.51). In the post-process of process ID=3.73.20, ES in the RAM 46 is updated to "32".

When it is recognized in the pre-process that ES=83 [cf. FIG. 202(I)], processes almost similar to the processes of process IDs=3.70.00 to 3.70.51 described above are carried out in the pre-processes and post-processes (process IDs=3.83.00 to 3.83.51). In the post-process of process ID=3.83.20, ES in the RAM 46 is updated to "32".

[3-2-4-4] BSP (Back Space Block) Process

① BSP Process in Pattern 1 (cf. FIG. 224)

When the I/F converting apparatus 40 receives a BSP command, the control unit 42 first refers to the RAM 46 to recognize a value of ES and a value of EP in the pre-process. When it is recognized that ES is any one of 00, 10, 20, 30, 40, 50 and 60, pre-processes and post-processes similar to those in the second embodiment shown in FIG. 96 are carried out in the third embodiment, as shown in FIG. 224.

According to the third embodiment, when it is recognized in the pre-process that ES=70 and EP=−4 [cf. FIG. 202(H)], the control unit 42 makes the MTU 30 carry out the WTM process to write the third tape mark TM-c on the magnetic tape MT, re-positions the head at a position SBID+EP [position n in FIG. 202(H)] in the MTU 30, and makes the TMU carry out a real operation (real BSP), as shown in FIG. 224. In the post-process, the control unit 42 updates ES to "00" in the RAM 46 (process ID=4.70.00).

When it is recognized in the pre-process that ES=70 and EP=−3 [cf. FIG. 202(H)], the control unit 42 executes emulation of the MTU 30. In the post-process, the control unit 42 updates EP to "−4" while holding ES at a value of "70" in the RAM 46 (process ID=4.70.10).

When it is recognized in the pre-process that ES=70 and EP=−2 [cf. FIG. 202(H)], the control unit 42 executes emulation of the MTU 30. In the post-process, the control unit 42 updates EP to "−3" while holding ES at a value of "70" in the RAM 46 (process ID=4.70.20).

When it is recognized in the pre-process that ES=70 and EP=−1 [cf. FIG. 202(H)], the control unit 42 executes emulation of the MTU 30. In the post-process, the control unit 42 updates EP to "−2" while holding ES at a value of "70" in the RAM 46 (process ID=4.70.30).

When it is recognized in the pre-process that ES=70 and EP=0 [cf. FIG. 202(H)], the control unit 42 executes emulation of the MTU 30. In the post-process, the control unit 42 updates EP to "−1" while holding ES at a value of "70" in the RAM 46 (process ID=4.70.40).

When it is recognized in the pre-process that ES=70 and EP=+1 [cf. FIG. 202(H)], the control unit 42 executes emulation of the MTU 30. In the post-process, the control unit 42 updates EP to "0" while holding ES at a value of "70" in the RAM 46 (process ID=4.70.50).

When it is recognized in the pre-process that ES=80 and EP=−4 [cf. FIG. 202(I)], the control unit 42 re-positions the head at a position SBID+EP [position n in FIG. 202(I)] in the MTU 30, and makes the MTU 30 carry out the real operation (real BSP). In the post-process, the control unit 42 updates ES to "00" in the RAM 46 (process ID=4.80.00).

When it is recognized in the pre-process that ES=80 and EP=−3 [cf. FIG. 202(I)], the control unit 42 executes emulation of the MTU 30. In the post-process, the control unit 42 updates EP to "−4" while holding ES at a value of "80" in the RAM 46 (process ID=4.80.10).

When it is recognized in the pre-process that ES=80 and EP=−2 [cf. FIG. 202(I)], the control unit 42 executes emulation of the MTU 30. In the post-process, the control unit 42 updates EP to "−3" while holding ES at a value of "80" in the RAM 46 (process ID=4.80.20).

When it is recognized in the pre-process that ES=80 and EP=−1 [cf. FIG. 202(I)], the control unit 42 executes emulation of the MTU 30. In the post-process, the control unit 42 updates EP to "−2" while holding ES at a value of "80" in the RAM 46 (process ID=4.80.30).

When it is recognized in the pre-process that ES=80 and EP=0 [cf. FIG. 202(I)], the control unit 42 executes emulation of the MTU 30. In the post-process, the control unit 42 updates EP to "−1" while holding ES at a value of "80" in the RAM 46 (process ID=4.80.40).

When it is recognized in the pre-process that ES=80 and EP=+1 [cf. FIG. 202(I)], the control unit 42 executes emulation of the MTU 30. In the post-process, the control unit 42 updates EP to "0" while holding ES at a value of "80" in the RAM 46 (process ID=4.80.50).

② BSP Process in Pattern 2 (cf. FIG. 225)

When it is recognized in the pre-process that ES is any one of 31, 41, 51 and 61, pre-processes and post-processes similar to those in the second embodiment shown in FIG. 97 are carried out in the third embodiment, as shown in FIG. 225.

According to the third embodiment, when it is recognized in the pre-process that ES=71 [cf. FIG. 202(H)], processes almost similar to the processes of process IDs=4.70.00 to 4.70.50 described above are carried out in the pre-processes and post-processes, as shown in FIG. 225 (process IDs=4.71.00 to 4.71.50). In the post-processes of process IDs=4.71.10 to 4.71.50, ES in the RAM 46 is held at a value of "71".

When it is recognized in the pre-process that ES=81 [cf. FIG. 202(I)], processes almost similar to the processes of process IDs=4.80.00 to 4.80.50 described above are carried out in the pre-processes and post-processes (process IDs=4.81.00 to 4.81.50). In the post-processes of process IDs=4.81.10 to 4.81.50, ES in the RAM 46 is held at a value of "81".

③ BSP Process in Pattern 3 (cf. FIG. 226)

When it is recognized in the pre-process that ES is any one of 32, 42, 52 and 62, pre-processes and post-processes similar to those in the second embodiment shown in FIG. 98 are carried out in the third embodiment, as shown in FIG. 226.

According to the third embodiment, when it is recognized in the pre-process that ES=72 [cf. FIG. 202(H)], processes almost similar to the processes of process IDs=4.70.00 to 4.70.50 described above are carried out in the pre-processes and post-processes, as shown in FIG. 226 (process IDs=4.72.00 to 4.72.50). In the post-processes of process IDs=4.72.10 to 4.72.50, ES in the RAM 46 is held at a value of "72".

When it is recognized in the pre-process that ES=82 [cf. FIG. 202(I)], processes almost similar to the processes of process IDs=4.80.00 to 4.80.50 described above are carried out in the pre-processes and post-processes (process IDs=4.82.00 to 4.82.50). In the post-processes of process IDs=4.82.10 to 4.82.50, ES in the RAM 46 is held at a value of "82".

④ SBP Process in Pattern 4 (cf. FIG. 227)

When it is recognized in the pre-process that ES is any one of 33, 43, 53 and 63, pre-processes and post-processes similar to those in the second embodiment shown in FIG. 99 are carried out in the third embodiment, as shown in FIG. 227.

According to the third embodiment, when it is recognized in the pre-process that ES=73 [cf. FIG. 202(H)], processes almost similar to the processes of process IDs=4.70.00 to 4.70.50 described above are carried out in the pre-processes and post-processes, as shown in FIG. 227 (process IDs=4.73.00 to 4.73.50). In the post-processes of process IDs=4.73.10 to 4.73.50, ES in the RAM 46 is held at a value of "73".

When it is recognized in the pre-process that ES=83 [cf. FIG. 202(I)], processes almost similar to the processes of process IDs=4.80.00 to 4.80.50 described above are carried out in the pre-processes and post-processes (process IDs=4.83.00 to 4.83.50). In the post-processes of process IDs=4.83.16 to 4.83.50, ES in the RAM 46 is held at a value of "83".

[3-2-4-4] SBPF (Back Space File) Process

① BSPF Process in Pattern 1 (cf. FIG. 228)

When the I/F converting apparatus 40 receives a BSPF command, the control unit 42 first refers to the RAM 46 to recognize a value of ES and a value of EP in the pre-process. When it is recognized that ES is any one of 00, 10, 20, 30, 40, 50 and 60, pre-processes and post-processes similar to those in the second embodiment shown in FIG. 100 are carried out in the third embodiment, as shown in FIG. 228.

According to the third embodiment, when it is recognized in the pre-process that ES=70 and EP=−4 [cf. FIG. 202(H)], the control unit 42 makes the MTU 30 carry out the WTM process to write the third tape mark TM-c on the magnetic tape MT, re-positions the head at a position SBID+EP [position n in FIG. 202(H)] in the MTU 30, and makes the MTU carry out a real operation (real BSPF), as shown in FIG. 228. In the post-process, the control unit 42 updates ES to "00" in the RAM 46 (process ID=5.70.00).

When it is recognized in the pre-process that ES=70 and EP=−3 [cf. FIG. 202(H)], the control unit 42 executes emulation of the MTU 30. In the post-process, the control unit 42 updates EP to "−4" while holding ES at a value of "70" in the RAM 46 (process ID=5.70.10).

When it is recognized in the pre-process that ES=70 and EP=−2 [cf. FIG. 202(H)], the control unit 42 executes emulation of the MTU 30. In the post-process, the control unit 42 updates EP to "−4" while holding ES at a value of "70" in the RAM 46 (process ID=5.70.20).

When it is recognized in the pre-process that ES=70 and EP=−1 [cf. FIG. 202(H)], the control unit 42 executes emulation of the MTU 30. In the post-process, the control unit 42 updates EP to "−4" while holding ES at a value of "70" in the RAM 46 (process ID=5.70.30).

When it is recognized in the pre-process that ES=70 and EP=0 [cf. FIG. 202(H)], the control unit 42 executes emulation of the MTU 30. In the post-process, the control unit 42 updates EP to "−1" while holding ES at a value of "70" in the RAM 46 (process ID=5.70.40).

When it is recognized in the pre-process that ES=70 and EP=+1 [cf. FIG. 202(H)], the control unit 42 executes emulation of the MTU 30. In the post-process, the control unit 42 updates EP to "0" while holding ES at a value of "70" in the RAM 46 (process ID=5.70.50).

When it is recognized in the pre-process that ES=80 and EP=−4 [cf. FIG. 202(I)], the control unit 42 re-positions the head at a position SBID+EP [position n in FIG. 202(I)] in the MTU 30, and makes the MTU 30 carry out the real operation (real BSPF). In the post-process, the control unit 42 updates ES to "00" in the RAM 46 (process ID=5.80.00).

When it is recognized in the pre-process that ES=80 and EP=−3 [cf. FIG. 202(I)], the control unit 42 executes emulation of the MTU 30. In the post-process, the control unit 42 updates EP to "−4" while holding ES at a value of "80" in the RAM 46 (process ID=5.80.10).

When it is recognized in the pre-process that ES=80 and EP=−2 [cf. FIG. 202(I)], the control unit 42 executes emulation of the MTU 30. In the post-process, the control unit 42 updates EP to "−4" while holding ES at a value of "80" in the RAM 46 (process ID=5.80.20).

When it is recognized in the pre-process that ES=80 and EP=−1 [cf. FIG. 202(I)], the control unit 42 executes emulation of the MTU 30. In the post-process, the control unit 42 updates EP to "−4" while holding ES at a value of "80" in the RAM 46 (process ID=5.80.30).

When it is recognized in the pre-process that ES=80 and EP=0 [cf. FIG. 202(I)], the control unit 42 executes emulation of the MTU 30. In the post-process, the control unit 42 updates EP to "−1" while holding ES at a value of "80" in the RAM 46 (process ID=5.80.40).

When it is recognized in the pre-process that ES=80 and EP=+1 [cf. FIG. 202(I)], the control unit 42 executes emulation of the MTU 30. In the post-process, the control unit 42 updates EP to "0" while holding ES at a value of "80" in the RAM 46 (process ID=5.80.50).

② BSPF Process in Pattern 2 (cf. FIG. 229)

When it is recognized in the pre-process that ES is any one of 31, 41, 51 and 61, pre-processes and post-processes similar to those in the second embodiment shown in FIG. 101 are carried out in the third embodiment, as shown in FIG. 229.

According to the third embodiment, when it is recognized in the pre-process that ES=71 [cf. FIG. 202(H)], processes almost similar to the processes of process IDs=5.70.00 to 5.70.50 described above are carried out in the pre-processes and post-processes, as shown in FIG. 229 (process IDs=5.71.00 to 5.71.50). In the post-processes of process IDs=5.71.10 to 5.17.50, ES is held at a value of "71" in the RAM 46.

When it is recognized in the pre-process that ES=81 [cf. 202(I)], processes almost similar to the processes of process IDs=5.80.00 to 5.80.50 described above are carried out in the pre-processes and post-processes (process IDs=5.81.00 to 5.81.50). In the post-processes of process IDs=5.81.10 to 5.81.50, ES in the RAM 46 is held at a value of "81".

③ BSPF Process in Pattern 3 (cf. FIG. 230)

When it is recognized in the pre-process that ES is any one of 32, 42, 52 and 62, pre-processes and post-processes almost similar to those in the second embodiment shown in FIG. 102 are carried out in the third embodiment, as shown in FIG. 230.

According to the third embodiment, when it is recognized in the pre-process that ES=72 [cf. FIG. 202(H)], processes almost similar to the processes of process IDs=5.70.00 to 5.70.50 described above are carried out in the pre-processes and post-processes, as shown in FIG. 230 (process IDs=5.72.00 to 5.72.50). In the post-processes of process IDs=5.72.10 to 5.72.50, ES in the RAM 46 is held at a value of "72".

When it is recognized in the pre-process that ES=82 [cf. FIG. 202(I)], processes almost similar to the processes of process IDs=5.80.00 to 5.80.50 described above are carried out in the pre-processes and post-processes (process IDs=5.82.00 to 5.82.50). In the post-processes of process IDs=5.82.10 to 5.82.50, ES in the RAM 46 is held at a value of "82".

④ BSPF Process in Pattern 4 (cf. FIG. 231)

When it is recognized in the pre-process that ES is any one of 33, 43, 53 and 63, pre-processes and post-processes similar to those in the second embodiment shown in FIG. 103 are carried out in the third embodiment, as shown in FIG. 231.

According to the third embodiment, when it is recognized in the pre-process that ES=73 [cf. FIG. 202(H)], processes almost similar to the processes of process IDs=5.70.00 to 5.70.50 described above are carried out in the pre-processes and post-processes, as shown in FIG. 231. In the post-processes of process IDs=5.73.10 to 5.73.50, ES in the RAM 46 is held at a value of "73".

When it is recognized in the pre-process that ES=83 [cf. FIG. 202(I)], processes almost similar to the processes of process IDs=5.80.00 to 5.80.50 described above are carried out in the pre-processes and post-processes (process IDs=5.83.00 to 5.83.50). In the post-processes of process IDs=5.83.10 to 5.83.50, ES in the RAM 46 is held at a value of "83".

[3-2-4-6] SP (Forward Space Block) Process

① SP Process in Pattern 1 (cf. FIGS. 232 and 233)

When the I/F converting apparatus 40 receives an SP command, the control unit 42 first refers to the RAM 46 to recognize a value of ES and a value of EP in the pre-process. When it is recognized that ES is any one of 00, 10, 20, 30, 40, 50 and 60, pre-processes and post-processes almost similar to those in the second embodiment shown in FIG. 104 are carried out in the third embodiment, as shown in FIG. 232.

When it is recognized in the pre-process that ES=40 and EP=0 [cf. FIG. 202(E)], the control unit 42 makes the MTU 30 carry out a real operation (real SP) as shown in FIG. 232. In the post-process, the control unit 42 determines which one the type of a data block detected in the forward space operation by the MTU 30 is of EOF, TM, EOD or any other.

When it is determined that the data block is EOF, the control unit 42 updates ES to "22" in the RAM 46, as does in the second embodiment (process ID=6.40.40). When it is determined in the post-process that the data block is TM, the control unit 42 determines a difference between a real BID of the TM and SBID stored in the save area 46*e* [(real BID)−(SBID)]. When recognizing that the difference is "1", the control unit 42 stores the real BID of the TM in the save area (SBID) 46*e* in the RAM 46, and updates ES to "50" in the RAM 46 (process ID=6.40.41).

When it is determined in the post-process that the data block is EOD, the control unit 42 updates ES to "80" and EP to "+1" in the RAM 46 (process ID=6.40.43). At this time, it is assumed that the third tape mark TM-c is detected, and a report about detection of the third tape mark TM-c is made instead of the EOD report to the CPU 20.

When it is determined in the post-process that the data block is other than EOF, TM and EOD, the control unit 42 updates ES to "00" in the RAM 46, as does in the second embodiment (process ID=6.40.42).

When it is recognized in the pre-process that ES=70 and EP=−4 [cf. FIG. 202(H)], the control unit 42 executes emulation of the MTU 30, as shown in FIG. 233. In the post-process, the control unit 42 updates EP to "−3" while holding ES at a value of "70" in the RAM 46 (process ID=6.70.00).

When it is recognized in the pre-process that ES=70 and EP=−3 [cf. FIG. 202(H)], the control unit 42 executes emulation of the MTU 30. In the post-process, the control unit 42 updates EP to "−2" while holding ES at a value of "70" (process ID=6.70.10).

When it is recognized in the pre-process that ES=70 and EP=−2 [cf. FIG. 202(H)], the control unit 42 executes emulation of the MTU 30. In the post-process, the control unit 42 updates EP to "−1" while holding ES at a value of "70" in the RAM 46 (process ID=6.70.20).

When it is recognized in the pre-process that ES=70 and EP=−1 [cf. FIG. 202(H)], the control unit 42 executes emulation of the MTU 30. In the post-process, the control unit 42 updates EP to "0" while holding ES at a value of "70" (process ID=6.70.30).

When it is recognized in the pre-process that ES=70 and EP=0 [cf. FIG. 202(H)], the control unit 42 executes emulation of the MTU 30. In the post-process, the control unit 42 updates EP to "+1" while holding ES at a value of "70" (process ID=6.70.40).

When it is recognized in the pre-process that ES=70 and EP=+1 [cf. FIG. 202(H)], the control unit 42 makes the MTU 30 carry out the WTM process to write the third tape mark on the magnetic tape MT, and makes the MTU 30 carry out the real operation (real SP). In the post-process, the control unit 42 determines which one the type of a data block detected in the forward space operation by the MTU 30 is of EOF, TM or any other. When it is determined that the data block is EOF, the control unit 42 adds 1 to SBID in the RAM 46, and updates ES to "22" in the RAM 46 (process ID=6.70.50). When it is determined in the post-process that the data block is TM, the control unit 42 stores a real BID of the TM in the save area (SBID) 46e in the RAM 46, and updates ES to "10" in the RAM 46 (process ID=6.70.51). When it is determined in the post-process that the data block is other than OEF and TM, the control unit 42 updates ES to "00" in the RAM 46 (process ID=6.70.52).

When it is recognized in the pre-process that ES=80 and EP=−4 [cf. FIG. 202(I)], the control unit 42 executes emulation of the MTU 30. In the post-process, the control unit 42 updates EP to "−2" while holding ES at a value of "80" in the RAM 46 (process ID=6.80.00).

When it is recognized in the pre-process that Es=80 and EP=−3 [cf. FIG. 202(I)], the control unit 42 executes emulation of the MTU 30. In the post-process, the control unit 42 updates EP to "−2" while holding ES at a value of "80" in the RAM 46 (process ID=6.80.10).

When it is recognized in the pre-process that Es=80 and EP=−2 [cf. FIG. 202(I)], the control unit 42 executes emulation of the MTU 30. In the post-process, the control unit 42 updates EP to "−1" while holding ES at a value of "80" in the RAM 46 (process ID=6.80.20).

When it is recognized in the pre-process that ES=80 and EP=−1 [cf. FIG. 202(I)], the control unit 42 executes emulation of the MTU 30. In the post-process, the control unit 42 updates EP to "0" while holding ES at a value of "80" (process ID=6.80.30).

When it is recognized in the pre-process that ES=80 and EP=0 [cf. FIG. 202(I)], the control unit 42 executes emulation of the MTU 30. In the post-process, the control unit 42 updates EP to "+1" while holding ES at a value of "80" (process ID=6.80.40).

When it is recognized in the pre-process that ES=80 and EP=+1 [cf. FIG. 202(I)], the control unit 42 makes the MTU 30 carry out the real operation (real SP). At this time, a real head position is immediately after the second tape mark TM-b so that EOD is detected in the forward space operation. In the post-process, the control unit 42 updates ES to "00" (process ID=6.80.50), and carried out the following processes.

② SP Process in Pattern 2 (cf. FIGS. 234 and 235)

When it is recognized in the pre-process that ES is any one of 31, 41, 51 and 61, pre-processes and post-processes almost similar to those in the second embodiment shown in FIG. 105 are carried out in the third embodiment, as shown in FIG. 234.

When it is recognized in the pre-process that ES=41 and EP=0 as shown in FIG. 234 [cf. FIG. 202(E)], the control unit 42 makes the MTU 30 carry out the real operation (real SP). In the post-process, the control unit 42 determines which one the type of a data block detected in the forward space operation by the MTU 30 is of EOF, TM, EOD or any other, and updates ES and EP.

Namely, when it is recognized in the pre-process that ES=41 and EP=0, processes almost similar to the processes of process IDs=6.40.40, 6.40.41, 6.40.42 and 6.40.43 described above are carried out in the pre-processes and post-processes (process IDs=6.41.40, 6.41.41, 6.41.42, 6.41.43). In the post-process of process ID=6.41.41, ES in the RAM 46 is updated to "51". In the post-process of process ID=6.41.43, ES in the RAM 46 is updated to "81".

When it is recognized in the pre-process that ES=71 [cf. 202(H)] as shown in FIG. 235, processes almost similar to the processes of process IDs=6.70.00 to 6.70.52 described above are carried out in the pre-processes and post-processes (process IDs=6.71.00 to 6.71.52). In the post-processes of process IDs=6.71.00 to 6.71.40, ES in the RAM 46 is held at a value of "71".

When it is recognized in the pre-process that ES=81 [cf. FIG. 202(I)], processes almost similar to the processes of process IDs=6.80.00 to 6.80.50 described above are carried out in the pre-processes and post-processes (process IDs=6.81.00 to 6.81.50). In the post-processes of process IDs=6.81.00 to 6.81.40, ES in the RAM 46 is held at a value of "81".

③ SP Process in Pattern 3 (cf. FIGS. 236 and 237)

When it is recognized in the pre-process that ES is any one of 22, 32, 42, 52 and 62, pre-processes and post-processes almost similar to those in the second embodiment shown in FIG. 106 are carried out in the third embodiment, as shown in FIG. 236.

When it is recognized in the pre-process that ES=42 and EP=0 [cf. FIG. 202(E)] as shown in FIG. 236, the control unit 42 makes the MTU 30 carry out the real operation (real SP). In the post-process, the control unit 42 then determines which one the type of a data block detected in the forward space operation by the MTU 30 is of EOF, TM, EOD or any other, and updates ES and EP.

Namely, when it is recognized in the pre-process that ES=42 and EP=0, processes almost similar to the processes of process IDs=6.40.40, 6.40.41, 6.40.42 and 6.40.43 described above are carried out in the pre-processes and post-processes (process IDs=6.42.40, 6.42.41, 6.42.42, 6.42.43). In the post-process of process ID=6.42.41, ES in the RAM 46 is updated to "52". In the post-process of process ID=6.42.43, ES in the RAM 46 is updated to "82".

When it is recognized in the pre-process that ES=72 [cf. FIG. 202(H)] as shown in FIG. 237, processes almost similar to the processes of process IDs=6.70.00 to 6.70.52 described above are carried out in the pre-processes and post-processes (process IDs=6.72.00 to 6.72.52). In the post-processes of process IDs=6.72.00 to 6.72.40, ES in the RAM 46 is held at a value of "72".

When it is recognized in the pre-process that ES=82 [cf. FIG. 202(I)], processes almost similar to the processes of process IDs=6.80.00 to 6.80.50 described above are carried out in the pre-processes and post-processes (process IDs=6.82.00 to 6.82.50). In the post-processes of process IDs=6.82.00 to 6.82.40, ES in the RAM 46 is held at a value of "82".

④ SP Process in Pattern 4 (cf. FIGS. 238 and 239)

When it is recognized in the pre-process that ES is any one of 33, 43, 53 and 63, pre-processes and post-processes almost similar to those in the second embodiment shown in FIG. 107 are carried out in the third embodiment, as shown in FIG. 238.

When it is recognized in the pre-process that ES=43 and EP=0 [cf. FIG. 202(E)] as shown in FIG. 238, the control unit 42 makes the MTU 30 carry out the real operation (real SP). In the post-process, the control unit 42 then determines which one the type of a data block detected in the forward space operation by the MTU 30 is of EOF, TM, EOD or any other, and updates ES and EP.

Namely, when it is recognized in the pre-process that ES=43 and EP=0, processes almost similar to the processes of process IDs=6.40.40, 6.40.41. 4.40.42 and 6.40.43 described above are carried out in the pre-processes and post-processes (process IDs=6.43.40, 6.43.41, 6.43.42, 6.43.43). In the post-process of process ID=6.43.41, ES in the RAM 46 is updated to "53". In the post-process of process ID=6.43.43, ES in the RAM 46 is updated to "83".

When it is recognized in the pre-process that ES=73 [cf. FIG. 202(H)] as shown in FIG. 239, processes almost similar to the processes of process IDs=6.70.00 to 6.70.52 described above are carried out in the pre-processes and post-processes (process IDs=6.73.00 to 6.73.52) In the post-processes of process IDs=6.73.00 to 6.73.40, ES in the RAM 46 is held at a value of "73".

When it is recognized in the pre-process that ES=83 [cf. FIG. 202(I)], processes almost similar to the processes of process IDs=6.80.00 to 6.80.50 described above are carried out in the pre-processes and post-processes (process IDs=6.83.00 to 6.83.50). In the post-processes of process IDs=6.83.00 to 6.83.40, ES in the RAM 46 is held at a value of "83".

[3-2-4-7] FSPF (Forward Space File) Process

① FSPF Process in Pattern 1 (cf. FIGS. 240 and 241)

When the I/F converting apparatus 40 receives an FSPF command, the control unit 42 first refers to the RAM 46 to recognize a value of ES and a value of EP in the pre-process. When it is recognized that ES is any one of 00, 10, 20, 30, 40, 50 and 60, pre-processes and post-processes almost similar to those in the second embodiment shown in FIG. 108 are carried out in the third embodiment, as shown in FIGS. 240 and 241.

When it is recognized in the pre-process that ES=40 and EP=0 [cf. FIG. 202(E)] as shown in FIG. 240, the control unit 42 makes the MTU 30 carry out a real operation (real FSPF). In the post-process, the control unit 42 then determines which one the type of a data block detected in the forward space operation by the MTU 30 is of TM, EOF or any other.

When it is determined that the data block is TM, the control unit 42 determines a difference between a real BID of the TM and SBID stored in the save area 46e [(real BID)–(SBID)], as does in the second embodiment. When the difference is "3", the control unit 42 stores the real BID of the TM in the save area (SBID) 46e in the RAM 46, and updates ES to "43" and EP to "0" in the RAM 46 (process ID=7.40.40). When the difference is "1", the control unit 42 stores the real BID of the TM in the save area (SBID) 46e in the RAM 46, and updates ES to "50" in the RAM 46 (process ID=7.40.41). When the above difference is neither "1" nor "3", the control unit 42 stores the real BID of the TM in the save area (SBID) 46e in the RAM 46, and updates ES to "10" in the RAM 46 (process ID=7.40.42).

When it is determined in the post-process that the data block is EOD, the control unit 42 updates ES to "80" and EP to "+1" in the RAM 46 (process ID=7.40.44). At this time, the third tape mark TM-c is assumed to be detected so that a report about detection of the third tape mark TM-c is made in lieu of EOD report to the CPU 20.

When it is determined in the post-process that the data block is other than TM and EOD, the control unit 42 updates ES to "00" in the RAM 46, as does in the second embodiment (process ID=7.40.43).

When it is recognized in the pre-process that ES=70 and EP=–4 [cf. FIG. 202(H)] as shown in FIG. 241, the control unit 42 executes emulation of the MTU 30. In the post-process, the control unit 42 updates EP to "–3" while holding ES at a value of "70" in the RAM 46 (process ID=7.70.00).

When it is recognized in the pre-process that ES=70 and EP=–3 [cf. FIG. 202(H)], the control unit 42 executes emulation of the MTU 30. In the post-process, the control unit 42 updates EP to "0" while holding the ES at a value of "70" in the RAM 46 (process ID=7.70.10).

When it is recognized in the pre-process that ES=60 and EP=–2 [cf. FIG. 202(H)], the control unit 42 executes emulation of the MTU 30. In the post-process, the control unit 42 updates EP to "0" while holding ES at a value of "70" in the RAM 46 (process ID=7.70.20).

When it is recognized in the pre-process that ES=70 and EP=–1 [cf. FIG. 202(H)], the control unit 42 executes emulation of the MTU 30. In the post-process, the control unit 42 updates EP to "0" while holding ES at a value of "70" in the RAM (process ID=7.70.30).

When it is recognized in the pre-process that ES=70 and EP=0 [cf. FIG. 202(H)], the control unit 42 executes emulation of the MTU 30. In the post-process, the control unit 42 updates EP to "+1" while holding ES at a value of "70" in the RAM 46 (process ID=7.70.40).

When it is recognized in the pre-process that ES=70 and EP=+1 [cf. FIG. 202(H)], the control unit 42 makes the MTU 30 carry out a real operation (real FSPF). In the post-process, the control unit 42 then determines whether the type of a data block detected in the forward space operation by the MTU 30 is TM or any other. When it is determined that the data block is TM, the control unit 42 determines a difference between a real BID of the TM and SBID stored in the save area 46e [(real BID)–(SBID)]. When the difference is "3", the control unit 42 stores the real BID of the TM in the save area (SBID) 46e in the RAM 46, and updates ES to "43" and EP to "0" in the RAM 46 (process ID=7.70.50). When the difference is not "3", the control unit 42 stores the real BID of the TM in the save area (SBID) 46e in the RAM 46, and updates ES to "10" in the RAM 46 (process ID=7.70.51). When it is determined in the post-process that the data block is other than EOF and TM, the control unit 42 updates ES to "00" in the RAM 46 (process ID=7.70.52).

When it is recognized in the pre-process that ES=80 and EP=–4 [cf. FIG. 202(I)], the control unit 42 executes emulation of the MTU 30. In the post-process, the control unit 42 updates EP to "–3" while holding ES at a value of "80" in the RAM 46 (process ID=7.80.00).

When it is recognized in the pre-process that ES=80 and EP=−3 [cf. FIG. 202(I)], the control unit 42 executes emulation of the MTU 30. In the post-process, the control unit 42 updates EP to "0" while holding ES at a value of "80" (process ID=7.80.10).

When it is recognized in the pre-process that ES=80 and EP=−2 [cf. FIG. 202(I)], the control unit 42 carries out emulation of the MTU 30. In the post-process, the control unit 42 updates EP to "0" while holding ES at a value of "80" in the RAM 46 (process ID=7.80.20).

When it is recognized in the pre-process that ES=80 and EP=−1 [cf. FIG. 202(I)], the control unit 42 executes emulation of the MTU 30. In the post-process, the control unit 42 updates EP to "0" while holding ES at a value of "80" in the RAM 46 (process ID=7.80.30).

When it is recognized in the pre-process that ES=80 and EP=0 [cf. FIG. 202(I)], the control unit 42 executes emulation of the MTU 30. In the post-process, the control unit 42 updates EP to "+1" while holding ES at a value of "80" in the RAM 46 (process ID=7.80.40).

When it is recognized in the pre-process that ES=80 and EP=+1 [cf. FIG. 202(I)], the control unit 42 makes the MTU 30 carry out the real operation (real FSPF). At this time, a real position of the head is immediately after the second tape mark TM-b so that EOD is detected in the forward space operation. In the post-process, the control unit 42 updates ES to "00" (process ID=7.80.50), and carries out the following process.

② FSPF Process in Pattern 2 (cf. FIGS. 242 and 243)

When it is recognized in the pre-process that ES is any one of 31, 41, 51 and 61, pre-processes and post-processes almost similar to those in the second embodiment shown in FIG. 109 are carried out in the third embodiment, as shown in FIG. 242.

When it is recognized in the pre-process that ES=41 and EP=0 [cf. FIG. 202(E)], the control unit 42 makes the MTU 30 carry out the real operation (real FSPF), as shown in FIG. 242. In the post-process, the control unit 42 then determines which one the type of a data block detected in the forward space operation by the MTU 30 is of TM, EOD or any other, and updates ES and EP.

Namely, when it is recognized in the pre-process that ES=41 and EP=0, processes almost similar to the processes of process IDs=7.40.40 to 7.40.44 described above are carried out in the pre-processes and post-processes (process IDs=7.41.40 to 7.41.44). In the post-process of process ID=7.41.41, ES in the RAM 46 is updated to "51". In the post-process of process ID=7.41.44, ES in the RAM 46 is updated to "81".

When it is recognized in the preprocess that ES=71 [cf. FIG. 202(H)], processes almost similar to the processes of process IDs=7.70.00 to 7.70.52 described above are carried out in the pre-processes and post-processes, as shown in FIG. 243 (process IDs=7.71.00 to 7.71.52). In the post-processes of process IDs=7.71.00 to 7.71.40, ES in the RAM 46 is held at a value of "71".

When it is recognized in the pre-process that ES=81 [cf. FIG. 202(I)], processes almost similar to the processes of process IDs=7.80.00 to 7.80.50 described above are carried out in the pre-processes and post-processes (process IDs=7.81.00 to 7.81.50). In the post-processes of process IDs=7.81.00 to 7.81.40, ES in the RAM 46 is held at a value of "81".

③ FSPF Process in Pattern 3 (cf. FIGS. 244 and 245)

When it is recognized in the pre-process that ES is any one of 22, 32, 42, 52 and 62, pre-processes and post-processes almost similar to those in the second embodiment shown in FIG. 110 are carried out in the third embodiment, as shown in FIG. 244.

When it is recognized in the pre-process that ES=42 and EP=0 [cf. FIG. 202(E)], the control unit 42 makes the MTU 30 carry out the real operation (real FSPF), as shown in FIG. 244. In the post-process, the control unit 42 determines which one the type of a data block detected in the forward space operation by the MTU 30 is of TM, EOD or any other, and updates ES and EP.

Namely, when it is recognized in the pre-process that ES=42 and EP=0, processes almost similar to the processes of process IDs=7.40.40 to 7.40.44 described above are carried out in the pre-processes and post-processes (process IDs=7.42.40 to 7.42.44). In the post-process of process ID=7.42.41, ES in the RAM 46 is updated to "52". In the post-process of process ID=7.42.44, ES in the RAM 46 is updated to "82".

When it is recognized in the pre-process that ES=72 [cf. FIG. 202(H)], processes almost similar to the processes of process IDs=7.70.00 to 7.70.52 described above are carried out in the pre-processes and post-processes, as shown in FIG. 245 (process IDs=7.72.00 to 7.72.52). In the post-processes of process IDs=7.72.00 to 7.72.40, ES in the RAM 46 is held at a value of "72".

When it is recognized in the pre-process that ES=82 [cf. FIG. 202(I)], processes almost similar to the processes of process IDs=7.80.00 to 7.80.50 described above are carried out in the pre-processes and post-processes (process IDs=7.82.00 to 7.82.50). In the post-processes of process IDs=7.82.00 to 7.82.40, ES in the RAM 46 is held at a value of "82".

④ FSPF Process in Pattern 4 (cf. FIGS. 246 and 247)

When it is recognized in the pre-process that ES is any one of 33, 43, 53 and 63, pre-processes and post-processes almost similar to those in the second embodiment shown in FIG. 111 are carried out in the third embodiment, as shown in FIG. 246.

When it is recognized in the preprocess that ES=43 and EP=0 [cf. FIG. 202(E)], the control unit 42 makes the MTU 30 carry out the real operation (real FSPF), as shown in FIG. 246. In the post-process, the control unit 42 determines which one the type of a data block detected in the forward space operation by the MTU 30 is of TM, EOD or any other, and updates ES and EP.

Namely, when it is recognized in the pre-process that ES=43 and EP=0, processes almost similar to the processes of process IDs=7.40.40 to 7.40.44 described above are carried out in the pre-processes and post-processes (process IDs=7.43.40 to 7.43.44). In the post-process of process ID=7.43.41, ES in the RAM 46 is updated to "53". In the post-process of process ID=7.43.44, ES in the RAM 46 is updated to "83".

When it is recognized in the pre-process that ES=73 [cf. FIG. 202(H)], processes almost similar to the processes of process IDs=7.70.00 to 7.70.52 described above are carried out in the pre-processes and post-processes, as shown in FIG. 247 (process IDs=7.73.00 to 7.73.52). In the post-processes of process IDs=7.73.00 to 7.73.40, ES in the RAM 46 is held at a value of "73".

When it is recognized in the pre-process that ES=83 [cf. FIG. 202(I)], processes almost similar to the processes of process IDs=7.80.00 to 7.80.50 described above are carried out in the pre-processes and post-processes (process IDs=7.83.00 to 7.83.50). In the post-processes of process IDs=7.83.00 to 7.83.40, ES in the RAM 46 is held at a value of "83".

[3-2-4-8] WTM (Write Tape Mark) Process

When a writing is carried out in response to a command in the write system (WR, WTM) in the MTU 30, an EOD (End Of Data) mark is written after a written data block. Therefore, the host (CPU 20) recognizes that there is no data block after a data block written in response to a command in the write system after the command is executed. According to the third embodiment, ES is updated to "10" whenever a real write tape mark operation is carried out in a state at the time that ES=00, 10 or 2x, or that ES=4x and EP=−4, −3 or −2, or that ES=6x, 7x or 8x and EP=−4, −3, −2, −1 or +1, as will be described later with reference to FIGS. 248 through 251.

① WTM Process in Pattern 1 (cf. FIG. 248)

When the I/F converting apparatus 40 receives a WTM command, the control unit 42 first refers to the RAM 46 to recognize a value of ES and a value of EP in the pre-process. When it is recognized that ES is any one of 00, 10, 20, 30, 40, 50 and 60, pre-processes and post-processes almost similar to those in the second embodiment shown in FIG. 112 are carried out in the third embodiment, as shown in FIG. 248.

When it is recognized in the pre-process that ES=40 and EP=0 [cf. FIG. 202(E)], the control unit 42 executes emulation of the MTU 30, as shown in FIG. 248. In the post-process, the control unit 42 updates ES to "70 and EP to "+1" in the RAM 46 (process ID=8.40.40).

When it is recognized in the pre-process that ES=70 and EP=−4 [cf. FIG. 202(H)], the control unit 42 re-positions the head at a position SBID+EP [position n in FIG. 202(H)] in the MTU 30, and makes the MTU 30 carry out a real operation (real WTM), as shown in FIG. 248. In the post-process, the control unit 42 stores a real BID of a TM written by the MTU 30 in the save area (SBID) 46e in the RAM 46, and updates ES to "10" in the RAM 46 (process ID=8.70.00).

When it is recognized in the pre-process that ES=70 and EP=−3 [cf. FIG. 202(H)], the control unit 42 re-positions the head at a position SBID+EP [position n+1 in FIG. 202(H)] in the MTU 30, and makes the MTU 30 carry out the real operation (real WTM). In the post-process, the control unit 42 stores a real BID of a TM written by the MTU 30 in the save area (SBID) 46e in the RAM 46, and updates ES to "10" in the RAM 46 (process ID=8.70.10).

When it is recognized in the pre-process that ES=70 and EP=−2 [cf. FIG. 202(H)], the control unit 42 re-positions the head at a position SBID+EP [position n+2 in FIG. 202(H)] in the MTU 30, and makes the MTU 30 carry out the real operation (real WTM). In the post-process, the control unit 42 stores a real BID of a TM written by the MTU 30 in the save area (SBID) 46e in the RAM 46, and updates ES to "10" in the RAM 46 (process ID=8.70.20).

When it is recognized in the pre-process that ES=70 and EP=−1 [cf. FIG. 202(H)], the control unit 42 re-positions the head at a position SBID+EP [position n+3 in FIG. 202(H)] in the MTU 30, and makes the MTU 30 carry out the real operation (real WTM). In the post-process, the control unit 42 stores a real BID of a TM written by the MTU 30 in the save area (SBID) 46e in the RAM 46, and updates ES to "10" in the RAM 46 (process ID=8.70.30).

When it is recognized in the pre-process that ES=70 and EP=0 [cf. FIG. 202(H)], the control unit 42 executes emulation of the MTU 30. In the post-process, the control unit 42 updates ES to "70" and EP to "+1" in the RAM 46 (process ID=8.70.40).

When it is recognized in the pre-process that ES=70 and EP=+1 [cf. FIG. 202(H)], the control unit 42 makes the MTU 30 carry out the WTM process to write the third tape mark TM-c on the magnetic tape MT, and makes the MTU 30 carry out the real operation (real WTM). In the post-process, the control unit 42 stores a real BID of a TM written by the MTU 30 in the save area (SBID) 46e in the RAM 46, and updates ES to "10" in the RAM 46 (process ID=8.70.50).

When it is recognized in the pre-process that ES=80 [cf. FIG. 202(I)], processes almost similar to the processes of process IDs=8.70.00 to 8.70.50 described above are carried out in the pre-processes and post-processes (process IDs=8.80.00 to 8.80.50). In the post-process of process ID=8.80.40, ES in the RAM 46 is updated to "80".

② WTM Process in Pattern 2 (cf. FIG. 249)

When it is recognized in the pre-process that ES is any one of 31, 41, 51 and 61, pre-processes and post-processes almost similar to those in the second embodiment shown in FIG. 113 are carried out in the third embodiment, as shown in FIG. 249.

When it is recognized in the pre-process that ES=41 and EP=0 [cf. FIG. 202(E)], the control unit 42 executes emulation of the MTU 30, as shown in FIG. 249. In the post-process, the control unit 42 updates ES to "71" and EP to "+1" in the RAM 46 (process ID=8.41.40).

When it is recognized in the pre-process that ES=71 [cf. FIG. 202(H)], processes almost similar to the processes of process IDs=8.70.00 to 8.70.50 described above are carried out in the pre-processes and post-processes, as shown in FIG. 249 (process IDs=8.71.00 to 8.71.50). In the post-process of process ID=8.71.40, ES in the RAM 46 is held at a value of "71".

When it is recognized in the pre-process that ES=81 [cf. FIG. 202(I)], processes almost similar to the processes of process IDs=8.70.00 to 8.70.50 described above are carried out in the pre-processes and post-processes (process IDs=8.81.00 to 8.81.50). In the post-process of process ID=8.81.40, ES in the RAM 46 is held at a value of "81".

③ WTM Process in Pattern 3 (cf. FIG. 250)

When it is recognized in the pre-process that ES is any one of 22, 32, 42, 52 and 62, pre-processes and post-processes almost similar to those in the second embodiment shown in FIG. 114 are carried out in the third embodiment, as shown in FIG. 250.

When it is recognized in the pre-process that ES=42 and EP=0 [cf. FIG. 202(E)], the control unit 42 executes emulation of the MTU 30, as shown in FIG. 250. In the post-process, the control unit 42 updates ES to "72" and EP to "+1" in the RAM 46 (process ID=8.42.40).

When it is recognized in the pre-process that ES=72 [cf. FIG. 202(H)], processes almost similar to the processes of process IDs=8.70.00 to 8.70.50 described above are carried out in the pre-processes and post-processes, as shown in FIG. 250 (process IDs=8.72.00 to 8.72.50). In the post-process of process ID=8.72.40, ES in the RAM 46 is held at a value of "72".

When it is recognized in the pre-process that ES=82 [cf. FIG. 202(I)], processes almost similar to the processes of process IDs=8.70.00 to 8.70.50 described above are carried out in the pre-processes and post-processes (process IDs=8.82.00 to 8.82.50). In the post-process of process ID=8.82.40, ES in the RAM 46 is held at a value of "82".

④ WTM Process in Pattern 4 (cf. FIG. 251)

When it is recognized in the pre-process that ES is any one of 33, 43, 53 and 63, pre-processes and post-processes almost similar to those in the second embodiment shown in FIG. 115 are carried out in the third embodiment, as shown in FIG. 251.

When it is recognized in the pre-process that ES=43 and EP=0 [cf. FIG. 202(E)], the control unit 42 executes emulation of the MTU 30, as shown in FIG. 251. In the post-process, the control unit 42 updates ES to "73 and EP to "+1" in the RAM 46 (process ID=8.43.40).

When it is recognized in the pre-process that ES=73 [cf. FIG. 202(H)], processes almost similar to the processes of process IDs=8.70.00 to 8.70.50 described above are carried out in the pre-processes and post-processes, as shown in FIG. 251 (process IDs=8.73.00 to 8.73.50). In the post-process of process ID=8.73.40, ES in the RAM 46 is held at a value of "73".

When it is recognized in the pre-process that ES=83 [cf. FIG. 202(I)], processes almost similar to the processes of process IDs=8.70.00 to 8.70.50 described above are carried out in the pre-processes and post-processes (process IDs=8.83.00 to 8.83.50). In the post-process of process ID=8.83.40, ES in the RAM 46 is held at a value of "83".

[3-3] Concrete Examples of Emulation Execution

Next, concrete examples of emulation executed by applying the processes (process IDs=1.00.00 to 8.83.50) described above with reference to FIGS. 204 through 251 to the control process by the I/F converting apparatus 40 (control unit 42) will be described with reference to FIGS. 252 through 275.

[3-3-1] Example 1 of Emulation Execution

FIGS. 252(A) and 252(B) are diagrams showing a state of data writing on the magnetic tape MT, and for illustrating an example of commands issued from the CPU 20 when a multifile is additionally written, and tape operations/emulation operations in the MTU 30 according to the third embodiment in response to the commands. The state of data writing on the magnetic tape MT, the commands issued from the CPU 20 and the tape operations (arrows) by the MTU 30 shown in FIGS. 252(A) and 252(B) are the same as those described above with reference to FIGS. 22(A) and 22(B) in the first embodiment, descriptions of which are thus omitted. Incidentally, an identification pattern for EOF1 and EOF2 in the example shown in FIGS. 252(A) and 252(B) is Pattern 1 described above with reference to FIGS. 69 and 70(A) through 70(G) in the second embodiment.

Using the method according to the third embodiment, the I/F converting apparatus 40 (control unit 42) can execute, not only emulation of command processing (8) to (19) similar to those in the second embodiment [cf. FIGS. 116(A) and 116 (B)] in the open process [cf. (8) to (22)] shown in FIGS. 252(A) and 252(B), but also emulation of command processing (6) and (7) in the close process [cf. (2) to (7)] shown in FIG. 252(A).

Namely, the command processing (6) to (19) enclosed by broken lines in FIGS. 252(A) and 252(B) are emulated, according to the third embodiment. During which, no mechanical operation is performed without writing the third tape mark TM-c with the head H being stopped immediately after the second tape mark TM-b, as shown in FIG. 252(A). At this time, EOF1 saved in the save area (SDT1) 46c in the RAM 46 is read out, and transferred to the CPU 20 via the data buffer 45 when emulation is executed in response to an RD command (11), according to the third embodiment.

Hereinafter, the command processing (1) to (20) shown in FIGS. 252(A) and 252(B) will be described in detail with reference to FIGS. 253 through 272.

(A) of FIGS. 253 through 272 shows a state of data block writing on the magnetic tape MT, a real head position (real BID) and a virtual head position (EP), when each of the command processing (1) to (20) is carried out. (B) of FIGS. 253 and 272 shows a state of data saving/storing in the RAM 46, when each of the command processing (1) to (20) is carried out.

(1) WR process

FIG. 253(A) shows a state in which the I/F converting apparatus receives a WR command (1) shown in FIG. 252(A) from the CPU 20, completes a writing of user data, and is about to shift to the close process for a file. The real head position (real BID) is N. At this time, ES in the control area 46a in the RAM 46 indicates the initial state (ES=00), as shown in FIG. 253(B). The control area (EP) 46b and the save areas 46c through 46e in the RAM 46 indicate the undetermined state.

(2) WTM process (First Tape Mark TM-a Write Process)

FIG. 254(A) shows a state in which the I/F converting apparatus 40 receives a WTM command (2) shown in FIG. 252(A) from the CPU 20, carries out a process of process ID=8.00.00, and completes a writing of the first tape mark TM-a so that the real head position (real BID) is N+1. At this time, ES in the control area 46a is updated to "10", and "N+1" is stored as SBID in the save area 46e, as shown in FIG. 254(B).

(3) WR Process (EOF1 Write Process)

FIG. 255(A) shows a state in which the I/F converting apparatus 40 receives a WR command (direction to write EOF1) (3) shown in FIG. 252(A) from the CPU 20, carries out a process of process ID=3.10.00, and completes a writing of EOF1 so that the real head position (real BID) is N+2. At this time, ES in the control area 46a is updated to "20, and EOF1 is stored in the save area (SDT1) 46c, as shown in FIG. 255(B). Thereafter, EOF1 is held in the save area 46c.

(4) WR Process (EOF2 Write Process)

FIG. 256(A) shows a state in which the I/F converting apparatus 40 receives a WR command (direction to write EOF2) (4) shown in FIG. 252(A) from the CPU 20, carries out a process of process ID=3.20.00, and completes a writing of EOF2 so that the real head position (real BID) is N+3. At this time, ES in the control area 46a is updated to "30", and EOF2 is stored in the save area (SDT2) 46d, as shown in FIG. 256(B). Thereafter, EOF2 is held in the save area 46d.

(5) WTM Process (Second Tape Mark TM-b Write Process)

FIG. 257(A) shows a state in which the I/F converting apparatus 40 receives a WTM command (5) shown in FIG. 252(A) from the CPU 20, carries out a process of process ID=8.30.00 and completes a writing of the second tape mark TM-b so that the real head position (real BID) is N+4. At this time, after checking that a difference between the real BID and SBID [(real BID)−(SBID)] is "3", the I/F converting apparatus 40 stores "N+4" in the save area, as shown in FIG. 257(B). As shown in FIG. 257(B), ES in the control area 46a is updated to "40", whereas "0" is set as EP in the control area 46b.

(6) WTM Process (Third Tape Mark TM-c Write Process)

FIG. 258(A) shows a state in which the I/F converting apparatus 40 receives a WTM command (6) shown in FIG. 252(A) from the CPU 20, carries out a process of process ID=8.40.40 and completes a virtual operation (emulation) of writing the third tape mark TM-c. At this time, the real head position (real BID) is still N+4, not changed. As shown in FIG. 258(B), ES in the control area 46a is updated to "70" and EP in the control area 46b is updated to "+1". Thereafter, a writing of the third tape mark TM-c is assumed to be completed without really writing the third tape mark TM-c so that completion of writing of the third tape mark TM-c is reported to the CPU 20, according to the third embodiment.

(7) BSPF Process

FIG. 259(A) shows a state in which the I/F converting apparatus 40 receives a BSPF command (7) shown in FIG. 252(A) from the CPU 20, and carries out a process of process ID=5.70.50 so as to execute emulation. At this time, the real head position (real BID) is still N+4, not changed. As shown in FIG. 259(B), ES in the control area 46a is held at a value of "70", whereas EP in the control area 46b is updated to "0".

(8) BSPF Process

FIG. 260(A) shows a state in which the I/F converting apparatus 40 receives a BSPF command (8) shown in FIG. 252(A) from the CPU 20, and carries out a process of process ID=5.70.40 so as to execute emulation. At this time, the real head position (real BID) is still N+4, not changed. As shown in FIG. 260(B), ES in the control area 46a is held at a value of "70", whereas EP in the control area 46b is updated to "−1".

(9) BSPF Process

FIG. 261(A) shows a state in which the I/F converting apparatus 40 receives a BSPF command (9) shown in FIG. 252(A) from the CPU 20, and carries out a process of process ID=5.70.30 so as to execute emulation. At this time, the real head position (real BID) is still N+4, not changed. As shown in FIG. 261(B), ES in the control area 46a is held at a value of "70", whereas EP in the control area 46b is updated to "−4".

(10) FSPF Process

FIG. 262(A) shows a state in which the I/F converting apparatus 40 receives an FSPF command (10) shown in FIG. 252(A) from the CPU 20, and carries out a process of process ID=7.70.00 so as to execute emulation. At this time, the real head position (real BID) is still N+4, not changed. As shown in FIG. 262(B), ES in the control area 46a is held at a value of "70", whereas EP in the control area 46b is updated to "−3".

(11) RD Process

FIG. 263(A) shows a state in which the I/F converting apparatus 40 receives an RD command (11) shown in FIG. 252(A) from the CPU 20, and carries out a process of process ID=1.70.10 so as to execute emulation. At this time, the real head position (real BID) is still N+4, not changed. As shown in FIG. 263(B), ES in the control area 46a is held at a value of "70", whereas EP in the control area 46b is updated to "−2". When the emulation is executed, contents EOF1 in the save area 46c are restored in the data buffer 45, and transferred to the CPU 20.

(12) FSPF Process

FIG. 264(A) shows a state in which the I/F converting apparatus 40 receives an FSPF command (12) shown in FIG. 252(A) from the CPU 20, and carries out a process of process ID=7.70.20 so as to execute emulation. At this time, the real head position (real BID) is still N+4, not changed. As shown in FIG. 264(B), ES in the control area 46a is held at a value of "70", whereas EP in the control area 46b is updated to "0".

(13) RD Process

FIG. 265(A) shows a state in which the I/F converting apparatus 40 receives an RD command (13) shown in FIG. 252(A) from the CPU 20, and carries out a process of process ID=1.70.40 so as to execute emulation. At this time, the real head position (real BID) is still N+4, not changed. As shown in FIG. 265(B), ES in the control area 46a is held at a value of "70", whereas EP in the control area 46b is updated to "+1". When the emulation is executed, tape mark detection (Unit Exception) is reported to the CPU 20.

(14) BSPF Process

FIG. 266(A) shows a state in which the I/F converting apparatus 40 receives a BSPF command (14) shown in FIG. 252(A) from the CPU 20, and carries out a process of process ID=5.70.50 so as to execute emulation. At this time, the real head position (real BID) is still N+4, not changed. As shown in FIG. 266(B), ES in the control area 46a is held at a value of "70", whereas EP in the control area 46b is updated to "0".

(15) BSPF Process

FIG. 267(A) shows a state in which the I/F converting apparatus 40 receives a BSPF command (15) shown in FIG. 252(A) from the CPU 20, and carries out a process of process ID=5.70.40 so as to execute emulation. At this time, the real head position (real BID) is still N+4, not changed. As shown in FIG. 267(B), ES in the control area 46a is held at a value of "70", whereas EP in the control area 46b is updated to "−1".

(16) BSPF Process

FIG. 268(A) shows a state in which the I/F converting apparatus 40 receives a BSPF command (16) shown in FIG. 252(A) from the CPU 20, and carries out a process of process ID=5.70.30 so as to execute emulation, as does in the command processing (9). At this time, the real head position (real BID) is still at N+4, not changed. As shown in FIG. 268(B), ES in the control area 47a is held at a value of "70", whereas EP in the control area 46b is updated to "−4".

(17) FSPF Process

FIG. 269(A) shows a state in which the I/F converting apparatus 40 receives an FSPF command (17) shown in FIG. 252(B) from the CPU 20, and carries out a process of process ID 7.70.00 so as to execute emulation, as does in the command process (10). At this time, the real head position (real BID) is still at N+4, not changed. As shown in FIG. 269(B), ES in the control area 46a is held at a value of "70", whereas EP in the control area 46b is updated to "−3".

(18) RD Process

FIG. 270(A) shows a state in which the I/F converting apparatus 40 receives an RD command (18) shown in FIG. 252(B) from the CPU 20, and carries out a process of process ID=1.70.10 so as to execute emulation, as does in the command processing (11). At this time, the real head position (real BID) is still N+4, not changed. As shown in FIG. 270(B), ES in the control area 46a is held at a value of "70", whereas EP in the control area 46b is updated to "−2". When the emulation is executed, contents EOF1 in the save area 46c are restored in the data buffer 35, and transferred to the CPU 20.

(19) FSPF Process

FIG. 271(A) shows a state in which the I/F converting apparatus 40 receives an FSPF command (19) shown in FIG. 252(B) from the CPU 20, and carries out a process of process ID=7.70.20 so as to execute emulation. At this time, the real head position (real BID) is still N+4, not changed. As shown in FIG. 271(B), ES in the control area 46a is held at a value of "70", whereas EP in the control area 46b is updated to "0".

(20) WR Process (HRD1 Write Process)

FIG. 272(A) shows a state in which the I/F converting apparatus 40 receives a WR command (20) (direction to write HDR1) shown in FIG. 252(B) from the CPU 20, carries out a process of process ID=3.70.41, and completes a writing of HDR1 so that the real head position (real BID) is N+5. At this time, ES in the control area 46a is updated to "00", whereas the control area 46b and the save areas 46c to 46e are in the undetermined state, as shown in FIG. 272(B). According to the third embodiment, when a multi-file is additionally written, a writing of data of a header (HDR) is commenced immediately after the second tape mark TM-b without really writing the third tape mark TM-c, as above.

Thereafter, a WR process (21) (HDR2 write process), a WTM process (22), a WR process (23) and a WR process (24) are carried out in the similar manner to the second embodiment (as described above with reference to FIGS. 137 through 140), descriptions of which are thus omitted.

[3-3-2] Example 2 of Emulation Execution

FIGS. 273(A) and 273(B) are diagrams showing a state of data writing on the magnetic tape MT, and for illustrating another example of commands issued from the CPU 20 when a multi-file is additionally written, and tape operations/emulation operations in the MTU 30 according to the third embodiment in response to the commands. The state of data writing on the magnetic tape MT, the commands issued from the CPU 20 and the tape operations (arrows) in the MTU 30 shown in FIGS. 273(A) and 273(B) are the same as those described above with reference to FIGS. 61(A) and 61(B), descriptions of which are thus omitted. An identification pattern for EOF1 and EOF2 in the example shown in FIGS. 273(A) and 273(B) is Pattern 1 described above with reference to FIGS. 69(A) and 70(A) through 70(G) in the second embodiment.

Using the method according to the third embodiment, the I/F converting apparatus 40 (control unit 42) can execute emulation of, not only the command processing (8) to (14) similar to those in the second embodiment [cf. FIG. 155(A)] in the open process [cf. (8) to (17)] shown in FIGS. 273(A) and 273(B), but also the command processing (6) and (7) in the close process [cf. (2) to (7)] shown in FIG. 273(A).

Namely, the command processing (6) to (14) enclosed by a broken line in FIG. 273(A) are emulated in the third embodiment. During which, no mechanical operation is performed with the head H being stopped immediately after the second tape mark TM-b without writing the third tape mark TM-c. According to the third embodiment, EOF1 saved in the save area (SDT1) 46c in the RAM 46 is read out, and transferred to the CPU 20 via the data buffer 45 when the emulation is executed in response to an RD command (11).

Meanwhile, the command processing (1) to (14) shown in FIG. 273(A) are identical to the command processing (1) to (14) described above with reference to FIGS. 252(A) and 253 through 266, and the command processing (15) to (19) shown in FIG. 273(B) are identical to the command processing (20) to (24) described above with reference to FIGS. 252(B), 272 and 137 through 140, descriptions of which are thus omitted.

[3-3-3] Comparison of Performance (Comparison of Command Processing Times)

FIG. 274 is a diagram in which, when a multi-file is additionally written as shown in FIGS. 252(A) and 252(B), a time required for command processing when the emulation is executed applying the method according to the third embodiment is compared with a time required for command processing applying the know manner without emulation.

In FIG. 274, a time required for each command processing in which emulation is not executed is compared with a time required for the same processing in which emulation is executed side by side. In FIG. 274, a number in parentheses is entered in a remarks column of a command corresponding to each of the command processing (1) to (24) shown in FIGS. 252(A) and 252(B). Incidentally, a command without a number in parentheses in its remarks column does not relate to the tape operation in the MTU 30, a process corresponding to which is completed within the MTC 10.

The command processing (6) to (19) in which emulation is executed are completed within the I/F converting apparatus 40 without the real tape operation (mechanical operation) of the MTU 30 so that a time required for each of the command processing (6) to (19) is uniformly 0.000500 second, as shown in FIG. 274. Not only that the process time is shortened by emulation as above, a time required for a part of command processing not relating to emulation is also shortened in the system executing emulation by applying the method of the third embodiment. In contrast to 9.111926 second that is a time required for all the command processing without emulation, a time required for all the command processing in the system to which the method of the third embodiment is applied is 1.981191 second, which is much shorter.

FIG. 275 is a diagram in which, when a multi-file is additionally written as shown in FIGS. 273(A) and 273(B), a time required for command processing in which emulation is carried out by applying the method of the third embodiment is compared with a time required for the command processing in which emulation is not carried out by applying the known method.

In FIG. 275, a time required for each command processing when emulation is not executed is compared with a time required for the same command processing when emulation is executed side by side. In FIG. 275, a number in parentheses is entered in a remarks column of a command corresponding to each of the command processing (1) to (19) shown in FIGS. 273(A) and 273(B). Incidentally, a command without a number in parentheses in its remarks column does not relate to the tape operation in the MTU 30, a process corresponding to which is completed within the MTC 10.

The command processing (6) to (14) in which emulation is executed are completed within the I/F converting apparatus 40 without the real tape operation (mechanical operation) of the MTU 30 so that a time required for each of the command processing (6) to (14) is uniformly shorter than a case where emulation is not executed. Not only a time required for the command processing is shortened by emulation, but also a time required for a part of the command processing not relating to emulation is also shortened in a system executing emulation by applying the method of the third embodiment. In contrast to 6.331092 second that is a time required for all the command processing in which emulation is not carried out, a time required for all the command processing in a system to which the method of the third embodiment is applied is 1.296330 second, which is much shorter.

Meanwhile, estimated values of performance in FIG. 275 are calculated on the bases of measured values obtained by performance measurement using an actual machine. Accordingly, there are variations in measuring environments such as a performance of the actual machine and the like. As a result, with respect to a command processing not relating to emulation, a value obtained when the emulation is not executed (value on the left in FIG. 275) and a value obtained when the emulation is executed (value on the right in FIG. 275) are not equal.

[3-4] Effects of the Third Embodiment

The method for controlling a magnetic tape unit according to the third embodiment of this invention can give effects similar to those given by the first embodiment and second embodiment. In addition, the third embodiment can simplify the tape operations in not only the open process but also the close process by emulating both the tape operations for identifying EOF when the open process for a file is carried out and the operation of writing the third tape mark TM-c when a close process for the file is carried out in the I/F converting apparatus 40. In consequence, not only a time required for the open process but also a time required for the close process can be shortened, a time required to process a job is thus further shortened. This further improves a performance when the close/open process is carried out, which leads to an improvement of a processing performance of a system accessing to the MTU 30.

Even if the apparatus terminates a process with the third tape mark TM-c not being recorded on the magnetic tape due to a failure such as power-off or the like after executing emulation of an operation of writing the third tape mark TM-c, EOD immediately after the second tape mark TM-b is assumed to be the third tape mark TM-c after recovery of the failure, according to the third embodiment. The CPU 20 can thereby issue a command to the CPU 20 as usual to continuously carry out the process without making the MTU 30 carry out a special process for recovery such as third tape mark TM-c writing or the like.

[4] Others

Note that the present invention is not limited to the above examples, but can be modified in various ways without departing from the scope of the invention.

According to the third embodiment, not only a writing of the third tape mark TM-c is emulated in the close process for a file, but also emulation similar to that according to the second embodiment is executed in the close process for the file. For example, it is also possible to execute emulation of only a writing of the third tape mark TM-c in the close process for the file. Even only executing emulation of a writing of the third tape mark can simplify the tape operations in the close process for a file as above, which improves a file close process performance, further a processing performance of a system accessing to the MTU 30.

In the description of the third embodiment, emulation of a writing of the third tape mark TM-c carried out in the file close process is executed by the I/F converting apparatus 40. It is alternatively possible to apply the manner of the emulation to a system executing the emulation by the MTC 10 as in the first embodiment.

What is claimed is:

1. A method for controlling a magnetic tape unit in response to a command from a command issuing apparatus, the method comprising:

in an open process for a file recorded on a magnetic tape, fixing a position of a head (hereinafter referred to as a real head position) relative to said magnetic tape at a predetermined position in said magnetic tape unit; and when receiving a command directing to read an end-of-file label from said command issuing apparatus, executing emulation in which a tape operation of reading said end-of-file label according to said command is virtually carried out in said magnetic tape unit without making said magnetic tape unit carry out a real tape operation, wherein in a close process for said file, an end-of-file label read by said magnetic tape unit in response to a command from said command issuing apparatus is saved in a save area, and in an open process for said file, said end-of-file label is transferred to said command issuing apparatus from said save area in response to a command directing to read said end-of-file label without making said magnetic tape unit carry out a real read operation.

2. The method for controlling a magnetic tape unit according to claim 1, wherein in a close process for said file, an end-of-file label written by said magnetic tape unit in response to a command from said command issuing apparatus is saved in a save area; and in an open process for said file, said end-of-file label is transferred to said command issuing apparatus from said save area in response to a command directing to read said end-of-file label without making said magnetic tape unit carry out a real read operation.

3. The method for controlling a magnetic tape unit according to claim 1, wherein in a close process for said file, said magnetic tape unit is made to carry out a real read operation to really read an end-of-file label, which is skipped in said magnetic tape unit in response to a command from said command issuing apparatus, said read end-of-file label is saved in a save area; and in an open process for said file, said end-of-file label is transferred to said command issuing apparatus from said save area in response to a command directing to read said end-of-file label without making said magnetic tape unit carry out a real read operation.

4. The method for controlling a magnetic tape unit according to claim 1, wherein in a close process for said file, an end-of-file label skipped in said magnetic tape unit is response to a command from said command issuing apparatus and really read by a real read operation in said magnetic tape unit is saved in a save area; and in an open process for said file, when a command directing to read said end-of-file label is received in a state in which said end-of-file label has failed to be saved in said save area at the time of the close process for said file, said magnetic tape unit is made to carry out a real read operation to really read said end-of-file label, and said read end-of-file label is transferred to said command issuing apparatus.

5. The method for controlling a magnetic tape unit according to claim 1, wherein a data buffer for temporarily storing write data to said magnetic tape and read data from said magnetic tape therein is interposed between said command issuing, apparatus and said magnetic tape unit to asynchronously carry out a read/write process between said command issuing apparatus and said data buffer and a read/write process between said data buffer and said magnetic tape unit.

6. The method for controlling a magnetic tape unit according to claim 1, wherein a tape operation of said magnetic tape unit is such controlled that, on said magnetic tape, the first tape mark is written after additionally written after said file; and the last data block of said file, the first end-of-file label and the second end-of-file label are written after said first tape mark, the second tape mark is written after said second end-of-file label, and the third tape mark is further written after said second tape mark when said file is the last on said magnetic tape, whereas the next file is written over said third tape mark to be written when the next file is additionally written after said file; and said emulation is executed between immediately before said first tape mark and immediately after said third tape mark while fixing said head at said predetermined position which is immediately after said second tape mark.

7. The method for controlling a magnetic tape unit according to claim 6, wherein while said emulation is executed, a virtual position of said head (hereinafter referred to as a virtual head position) relative to said magnetic tape in said magnetic tape unit is managed as a relative position of said head relative to said predetermined position.

8. The method for controlling a magnetic tape unit according to claim 7, wherein when a command requiring the real head position in said magnetic tape unit is received while said emulation is executed, a sum of said predetermined position and said relative position is generated, and said sum is reported as the real head position to said command issuing apparatus.

9. The method for controlling a magnetic tape unit according to claim 7, wherein when said magnetic tape unit is shifted to a real operation while said emulation is executed, the real head position in said magnetic tape unit is generated as a sum of said predetermined position and said relative position, and said head in said magnetic tape unit is re-positioned at said real head position.

10. The method for controlling the magnetic tape unit according to claim 6, wherein in a state in which both of said first end-of-file label and said second end-of-file label are saved in said save areas, and in a state in which reading/writing up to said second tape mark is completed and the real head position is said predetermined position in said magnetic tape unit;

when any one of a read backward command, a back space block command and a back space file command is received, with said virtual head position being immediately after said second tape mark;

when any one of a read command, a read backward command, a back space block command, a back space file command, a forward space block command, a forward space file command, and a write tape mark command is received, with said virtual head position being immediately after said second end-of-file label;

when any one of a read command, a read backward command, a back space block command, a back space file command, a forward space block command and a forward space-file command is received, with said virtual head position being immediately after said first end-of-file label;

when any one of a read command, a read back command, a back space block command, a back space file command, a forward space block command and a forward space file command is received, with said virtual head position being immediately after said first tape mark; or when any one of a read command, a forward space block command and a forward space file command is received, with said virtual head position being immediately after said last data block, said emulation is executed.

11. The method for controlling a magnetic tape unit according to claim 6, wherein in a state in which both of said first end-of-file label and said second end-of-file label are saved in said save areas, and in a state in which reading/writing up to said third tape mark is completed and the real head position is said predetermined position in said magnetic tape unit;

when any one of a read backward command, a back space block command and a back space file command is received, with said virtual head position being immediately after said third tape mark;

when any one of a read command, a read backward command, a back space block command, a back space file command, a forward space block command, a forward space file command and a write tape mark command is received, with said virtual head position being immediately after said second tape mark;

when any one of a read command, a read backward command, a back space block command, a back space file command, a forward space block command and a forward space file command is received, with said virtual head position being immediately after said second end-of-file label;

when any one of a read command, a read backward command, a back space block command, a back space file command, a forward space block command and a forward space file command is received, with said virtual head position being immediately after said first end-of-file label;

when any one of a read command, a read backward command, a back space block command, a back space file command, a forward space block command and a forward space file command is received, with said virtual head position is immediately after said first tape mark; or when any one of a read command, a forward space block command and a forward space file command is received, with said virtual head position being immediately after said last data block, said emulation is executed.

12. The method for con-trolling a magnetic tape unit according to claim 6, wherein in a state in which only said first end-of-file label is saved in said save area, and in a state in which reading/writing up to said second tape mark is completed and the real head position is said predetermined position in said magnetic tape unit;

when any one of a read backward command, a back space block command and a back space file command is received, with said virtual head position being immediately after said second tape mark;

when any one of a read command, a read backward command, a back space block command, a back space file command, a forward space block command, a forward space file command and a write tape mark command is received, with said virtual head position being immediately after said second end-of-file label;

when any one of a read backward command, a back space block command, a back space file command, a forward space block command and a forward space file command is received, with said virtual head position being immediately after said first end-of-file label;

when any one of a read command, a read backward command, a back space block command, a back space file command, a forward space block command and a forward space file command is received, with said virtual head position being immediately after said first tape mark; or when any one of a read command, a forward space block command and a forward space file command is received, with said virtual head position being immediately after said last data block, said emulation is executed.

13. The method for controlling a magnetic tape unit according to claim 6, wherein in a state in which only said first end-of-file label is saved in said save area, and in a state in which reading/writing up to said third tape mark is completed and the real head position is said predetermined position in said magnetic tape unit;

when any one of a read backward command, a back space block command and a back space file command is received, with said virtual head position being immediately after said third tape mark;

when any one of a read command, a read backward command, a back space block command, a back space file command, a forward space block command, a forward space file command and a write tape mark command is received, with said virtual head position being immediately after said second tape mark;

when any one of a read command, a read backward command, a back space block command, a back space file command, a forward space block command and a forward space file command is received, with said virtual head position being immediately after said second end-of-file label;

when any one of a read backward command, a back space block command, a back space file command, a forward space block command and a forward space file command is received, with said virtual head position being immediately after said first end-of-file label;

when any one of a read command, a read backward command, a back space block command, a back space file command, a forward space block command and a forward space file command is received, with said virtual head position being immediately after said first tape mark; or when any one of a read command, a forward space block command and a forward space file command is received, with said virtual head position being immediately after said last data block, said emulation is executed.

14. The method for controlling a magnetic tape unit according to claim 6, wherein in a state in which only said second end-of-file label is saved in said save area, and in a state in which reading/writing up to said second tape mark is completed and the real head position is said predetermined position in said magnetic tape unit;

when any one of a read backward command, a back space block command and a back space file command is received, with said virtual head position being immediately after said second tape mark;

when any one of a read command, a read backward command, a back space block command, a back space file command, a forward space block command, a forward space file command and a write tape mark command is received, with said virtual head position being immediately after said second end-of-file label;

when any one of a read command, a read backward command, a back space block command, a back space file command, a forward space block command and a forward space file command is received, with said virtual head position being immediately after said first end-of-file label;

when any one of a read backward command, a back space block command, a back space file command, a forward space block command and a forward space file command is received, with said virtual head position being immediately after said first tape mark; or when any one of a read command, a forward space block command and a forward space file command is received, with said virtual head position being immediately after said last data block, said emulation is executed.

15. The method for controlling a magnetic tape unit according to claim 6, wherein in a state in which only said second end-of-file label is saved in said save area, and in a state in which reading/writing up to said third tape mark is completed and the real head position is said predetermined position in said magnetic tape unit;

when any one of a read backward command, a back space block command and a back space file command is received, with said virtual head position being immediately after said third tape mark;

when any one of a read command, a read backward command, a back space block command, a back space file command, a forward space block command, a forward space file command and a write tape mark command is received, with said virtual head position being immediately after said second tape mark;

when any one of a read command, a read backward command, a back space block command, a back space file command, a forward space block command and a forward space file command is received, with said virtual head position being immediately after said second end-of-file label;

when any one of a read command, a read backward command, a back space block command, a back space file command, a forward space block command and a forward space file command is received, with said virtual head position being immediately after said first end-of-file label;

when any one of a read backward command, a back space block command, a back space file command, a forward space block command and a forward space file command is received, with said virtual head position being immediately after said first tape mark; or when any one of a read command, a forward space block command and a forward space file command is received, with said virtual head position being immediately after said last data block, said emulation is executed.

16. The method for controlling a magnetic tape unit according to claim 6, wherein in a state in which neither said first end-of-file label nor said second end-of-file label is saved in said save area, and in a state in which reading/writing up to said second tape mark is completed and the real head position is said predetermined position in said magnetic tape unit;

when any one of a read backward command, a back space block command and a back space file command is received, with said virtual head position being immediately after said second tape mark;

when any one of a read command, a read backward command, a back space block command, a back space file command, a forward space block command, a forward space file command and a write tape mark command is received, with said virtual head position being immediately after said second end-of-file label;

when any one of a read backward command, a back space block command, a back space file command, a forward space block command and a forward space file command is received, with said virtual head position being immediately after said first end-of-file label;

when any one of a read backward command, a: back space block command, a back space file command, a forward space block command and a forward space file command is received, with said virtual head position being immediately after said first tape mark; or when any one of a read command, a forward space block command and a forward space file command is received, with said virtual head position being immediately after said last data block, said emulation is executed.

17. The method for controlling a magnetic tape unit according to claim 6, wherein in a state in which neither said first end-of-file label nor said second end-of-file label is saved in said save area, and in a state in which reading/writing up to said third tape mark is completed and the real head position is said predetermined position in said magnetic tape unit;

when any one of a read backward command, a back space block command and a back space file command is received, with said virtual head position being immediately after said third tape mark;

when any one of a read command, a read backward command, a back space block command, a back space file command, a forward space block command, a forward space file command and a write tape mark command is received, with said virtual head position being immediately after said second tape mark;

when any one of a read command, a read backward command, a back space block command, a back space file command, a forward space block command and a forward space file command is received, with said virtual head position being immediately after said second end-of-file label;

when any one of a read backward command, a back space block command, a back space file command, a forward space block command and a forward space file command is received, with said virtual head position being immediately after said first end-of-file label;

when one of a read backward command, a back space block command, a back space file command, a forward space block command and a forward space file command is received, with said virtual head position being immediately after said first tape mark; or when one of a read command, forward space block command and a forward space file command is received, with said virtual head position being immediately after said last data block, said emulation is executed.

18. The method for controlling a magnetic tape unit according to claim 6, wherein when, in a close process for said file, a command requiring to write said third tape mark is received after said second tape mark is written on said magnetic tape, completion of a writing of said third tape mark is reported to said command issuing apparatus without writing said third tape mark.

19. The method for controlling a magnetic tape unit according to claim 18, wherein when a command directing to position said head outside a region from immediately before said first tape mark to immediately after said third tape mark is received, said third tape mark is written, and said magnetic tape unit is then made to carry out a tape operation according to said command.

20. The method for controlling a magnetic tape unit according to claim 18, wherein when EOD (End Of Data) is detected after said second tape mark in said magnetic tape unit during a tape operation in response to a command from said command issuing apparatus, detection of said third tape mark is reported in lieu of detection of said EOD to said command issuing apparatus.

21. The method for controlling a magnetic tape unit according to claim 5, wherein a plurality of end-of-file labels are recorded as one physical block on said magnetic tape by a packeting function;

when a command directing to read one of said plurality of end-of-file labels is received in a close process for said file, said one physical block including the end-of-file label to be read is read out from said magnetic tape and stored in said data buffer; and in an open process for said file, an end-of-file label corresponding to a command directing to read the one of said plurality of end-of-file labels is read out from said data buffer in response to said command and transferred to said command issuing apparatus.

22. A method for controlling a magnetic tape unit in an open process for a file recorded on a magnetic tape, the method comprising:

receiving a command from a command issuing apparatus, the command directing to read an end-of-file label; and executing emulation in which a tape operation of reading said end-of-file label according to said command is virtually carried out in said magnetic tape unit without making said magnetic tape unit carry out a real tape operation, wherein in a close process for said file, the end-of-file label read by said magnetic tape unit in response to the command from said command issuing apparatus is saved in a save area, and in the open process for the file, the end-of-file label is transferred to the command issuing apparatus from the save area in response to a command directing to read said end-of-file label without making said magnetic tape unit carry out a real read operation.

* * * * *

UNITED STATES PATENT AND TRADEMARK OFFICE
CERTIFICATE OF CORRECTION

PATENT NO. : 7,568,067 B1
APPLICATION NO. : 09/539805
DATED : July 28, 2009
INVENTOR(S) : Tomonori Mase et al.

It is certified that error appears in the above-identified patent and that said Letters Patent is hereby corrected as shown below:

On the Title Pg. Item (57) (Abstract), Line 10, change "the" to --to the--.

Column 146, Line 37, change "issuing," to --issuing--.

Column 146, Lines 44-45, change "after additionally written after said file; and" to --after--.

Column 148, Line 14, change "con-trolling" to --controlling--.

Column 150, Line 40, change "a:" to --a--.

Signed and Sealed this

Fifteenth Day of December, 2009

David J. Kappos
*Director of the United States Patent and Trademark Office*